US006963812B2

(12) United States Patent

Yamaguchi et al.

(10) Patent No.: US 6,963,812 B2
(45) Date of Patent: Nov. 8, 2005

(54) PRODUCT MARKET QUALITY INFORMATION ANALYZING BACK UP APPARATUS, PRODUCT MARKET QUALITY INFORMATION ANALYZING BACK UP SYSTEM AND PROGRAM FOR PRODUCT MARKET QUALITY INFORMATION ANALYZING BACK UP

(75) Inventors: Yasuhiro Yamaguchi, Tokyo (JP); Hitoshi Fujiwara, Tokyo (JP); Sadayoshi Hori, Tokyo (JP); Hidenori Umeda, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 141 days.

(21) Appl. No.: 10/187,960

(22) Filed: Jul. 3, 2002

(65) Prior Publication Data

US 2003/0028418 A1 Feb. 6, 2003

(30) Foreign Application Priority Data

Jul. 3, 2001 (JP) ...................................... 2001-201864

(51) Int. Cl.[7] .................................................. G06F 7/60
(52) U.S. Cl. ......................................................... 702/81
(58) Field of Search ................... 702/81, 184; 235/376, 235/375; 705/28, 2, 10, 7, 29; 700/86, 19, 2, 214, 131, 108, 116, 9; 210/86, 85; 436/125; 347/7; 434/350; 137/554; 364/478, 468; 395/203; 710/16

(56) References Cited

U.S. PATENT DOCUMENTS

| | | | | | |
|---|---|---|---|---|---|
| 4,942,534 | A | * | 7/1990 | Yokoyama et al. | 700/9 |
| 5,321,619 | A | * | 6/1994 | Matsuda et al. | 700/116 |
| 5,781,442 | A | * | 7/1998 | Engleson et al. | 700/214 |
| 6,629,009 | B1 | * | 9/2003 | Tamaki | 700/108 |
| 2002/0087419 | A1 | * | 7/2002 | Andersson et al. | 705/26 |

* cited by examiner

*Primary Examiner*—John Barlow
*Assistant Examiner*—Tung S Lau
(74) *Attorney, Agent, or Firm*—Oblon, Spivak, McClelland, Maier & Neustadt, P.C.

(57) ABSTRACT

Disclosed is a product market quality analyzing back up apparatus which can contribute to improve and realize a betterment of market quality of a product in the market, quick close of the quality trouble, a prevention of recurrence, and prevention of occurrence in advance. The product market quality analyzing back up apparatus accesses to a maintenance record information storing device 1 in which the maintenance record information on the product delivered to customers is stored; extracts a market quality information which relates to the market quality of the product in the predetermined period of term from the maintenance record information based on a product item of the product; processes the extracted result of market quality information to analyze; and displays a market quality transition situation on a display screen 3*a*.

80 Claims, 213 Drawing Sheets

TIME SERIES DATA OF EVERY OUTPUT MENU (A) SITUATION OF TROUBLE OCCURRENCE BASED ON PRODUCTION PROCESS

| NO | NAME OF PROCESS | COUNT | GRAPH | RATE(%) | 8 | 9 | 10 | 11 | 12 | 13 | 14 | 15 | 16 | 17 | 18 | 19 | 20- |
|---|---|---|---|---|---|---|---|---|---|---|---|---|---|---|---|---|---|
| 0 | TOTAL | 27 | | 100.0 | 2 | 4 | 2 | 2 | | 7 | 1 | 1 | 5 | 2 | | | |
| 1 | IMAGE INSPECTION 01 | 17 | | 63.0 | 1 | 2 | | 2 | | 5 | 1 | | 4 | 2 | | | |
| 2 | COMPLETION INSPECTION 01 | 6 | | 22.2 | 1 | 1 | 2 | | | | | 1 | 1 | | | | |
| 3 | MACHINE INSPECTION 01 | 3 | | 11.1 | | 1 | | | | 1 | | | 1 | | | | |
| 4 | BODY ASSEMBLING 01 | 1 | | 3.7 | | | | | | 1 | | | | | | | |

(B) SITUATION OF TROUBLE OCCURRENCE BASED ON EVERY TROUBLE ITEM

| NO | NAME OF TROUBLE ITEMS | COUNT | GRAPH | RATE(%) | 8 | 9 | 10 | 11 | 12 | 13 | 14 | 15 | 16 | 17 | 18 | 19 | 20- |
|---|---|---|---|---|---|---|---|---|---|---|---|---|---|---|---|---|---|
| 0 | TOTAL | 27 | | 100.0 | 2 | 4 | 2 | 2 | | 7 | 1 | 1 | 6 | 2 | | | |
| 1 | TROUBLE OF IMAGE | 15 | | 59.3 | 1 | 2 | | 2 | | 5 | 1 | | 3 | 2 | | | |
| 2 | OTHER | 2 | | 7.4 | | | 1 | | | | | | 1 | | | | |
| 3 | TROUBLE OF OPERATION | 2 | | 7.4 | 1 | | | | | | | 1 | | | | | |
| 4 | TROUBLE OF ASSEMBLING | 2 | | 7.4 | | | | | | 1 | | | 1 | | | | |
| 5 | TROUBLE OF CHARACTERISTICS | 1 | | 3.7 | | | | | | 1 | | | | | | | |

(C) SITUATION OF TROUBLE OCCURRENCE BASED ON EVERY RESPONSIBLE DEPARTMENT

| NO | NAME OF RESPONSIBLE DEPARTMENT | COUNT | GRAPH | RATE(%) | 8 | 9 | 10 | 11 | 12 | 13 | 14 | 15 | 16 | 17 | 18 | 19 | 20- |
|---|---|---|---|---|---|---|---|---|---|---|---|---|---|---|---|---|---|
| 0 | TOTAL | 27 | | 100.0 | 2 | 4 | 2 | 2 | | 7 | 1 | 1 | 6 | 2 | | | |
| 1 | RESPONSIBLE DEPARTMENT NOT YET INPUT | 26 | | 96.3 | 2 | 4 | 2 | 2 | | 5 | 1 | | 5 | 2 | | | |
| 2 | TECHNOLOGY | 1 | | 3.7 | | | | | | | | | 1 | | | | |

FIG. 3B (D) SITUATION OF TROUBLE OCCURRENCE BASED ON EVERY RANK

| NO | NAME OF RANK | COUNT | GRAPH | RATE(%) | 8 | 9 | 10 | 11 | 12 | 13 | 14 | 15 | 16 | 17 | 18 | 19 | 20- |
|---|---|---|---|---|---|---|---|---|---|---|---|---|---|---|---|---|---|
| 0 | TOTAL | 27 | | 100.0 | 2 | 4 | 2 | 2 | | 7 | | 1 | 6 | 2 | | | |
| 1 | NOTHING | 27 | | 100.0 | 2 | 4 | 2 | 2 | | 7 | 1 | 1 | 6 | 2 | | | |

(E) SITUATION OF TROUBLE OCCURRENCE LINE OUT/RELEASE

| NO | NAME OF DATA ITEM | COUNT | GRAPH | RATE(%) | 8 | 9 | 10 | 11 | 12 | 13 | 14 | 15 | 16 | 17 | 18 | 19 | 20- |
|---|---|---|---|---|---|---|---|---|---|---|---|---|---|---|---|---|---|
| 1 | AMOUNT OF PRODUCTION (COMPLETION) | 38 | | 100.0 | 1 | 5 | 5 | 5 | 1 | 7 | 5 | 3 | 5 | 1 | | | |
| 2 | AMOUNT OF OUT OF LINE | 4 | | 10.5 | | 1 | | 1 | | | 1 | | 1 | 1 | | | |
| 3 | AMOUNT OF OUT OF LINE RELEASE | 4 | | 100.0 | | 1 | | 1 | | | | | 1 | 1 | | | |

(F) SITUATION OF TROUBLE OCCURRENCE BASED ON EVERY CONTENT OF TROUBLE

| NO | NAME OF CONTENT OF TROUBLE | COUNT | GRAPH | RATE(%) | 8 | 9 | 10 | 11 | 12 | 13 | 14 | 15 | 16 | 17 | 18 | 19 | 20- |
|---|---|---|---|---|---|---|---|---|---|---|---|---|---|---|---|---|---|
| 0 | TOTAL | 27 | | 100.0 | 2 | 4 | 2 | 2 | | 7 | 1 | 1 | 5 | 2 | | | |
| 1 | HOLIZONTAL WHITE STREAK | 15 | | 18.5 | | 1 | | 1 | | | 1 | | 1 | 1 | | | |
| 2 | STRANGE IMAGE | 2 | | 14.8 | | 1 | | | | 2 | | | 1 | | | | |
| 3 | NOIZY IMAGE | 2 | | 14.8 | | | | 1 | | 2 | | | | 1 | | | |
| 4 | MANUAL PAPER FEED | 2 | | 11.1 | 1 | | 1 | | | | | 1 | | | | | |
| 5 | MISALIGNMENT OF PRINTING HORIZONTAL RULE | 1 | | 7.4 | 1 | | | | | 1 | | | | | | | |

FIG. 4

| 1 | 2 | 3 | 4 | 5 | 6 | 7 | 8 |
|---|---|---|---|---|---|---|---|
| ITEM CODE | NAME OF | PRODUCT | DATE OF | CLASSIFICATION | NAME OF | COUNTER | COUNTER |
| BREVITY | ITEM | SERIAL | MAINTENANCE | OF REASON OF | ITEM 1 | 1 | 2 |
| CODE | …OR2800 | NUMBER | 19990804 | VISIT | DELIVERY(NEW) | 0 | 0 |
| 3106 | …OR2800 | 117690 | 19990806 | 10010 | PERIODICAL | 231 | 381 |
| 3106 | …OR2800 | 112046 | 19990806 | 46000 | INSPECTION/ | 1643 | 25 |
| 3106 | · | 113945 | · | 60000 | CALL | · | · |
| · | · | · | · | · | · | · | · |
| · | · | · | · | · | · | · | · |

| 9 | 10 | 11 | 12 | 13 | 14 | 15 | 16 | 17 |
|---|---|---|---|---|---|---|---|---|
| ACV | ACV2 | DATE OF | YEAR AND | ELAPSED | COMMENT OF | SYMPTOM 1 | NAME OF | DETAILED |
| 0 | 0 | DELIVERY | MONTH OF | OPERATION | MAINTENANCE 1 | 16 | ITEM 2 | PORTION OF |
| 97 | 62 | 19991025 | PRODUCTION | MONTH | IRREGULAR | 53 | OUT OF | SYMPTOM 1 |
| 392 | 5 | 19990226 | 199907 | 2 | · | · | FOCUS | 26 |
| · | · | 19990326 | 199902 | 5 | · | · | OIL ATTACHED | 1 |
| · | · | · | 199903 | 4 | · | · | /STREAK | · |
| · | · | · | · | · | · | · | · | · |
| · | · | · | · | · | · | · | · | · |

| 18 | 19 | 20 | 21 | 22 | 23 | 24 | 25 | 26 |
|---|---|---|---|---|---|---|---|---|
| NAME OF | CAUSE OF | NAME OF | CORRECTIVE | NAME OF | DETAILED | NAME OF | RESULT | NAME OF |
| ITEM 3 | TROUBLE 1 | ITEM 4 | ACTION 1 | ITEM 5 | PORTION OF | ITEM 6 | 5 | ITEM 7 |
| PARTIAL | 10 | STAIN | 7 | CLEANING | CORRECTIVE | PORTION OF | 1 | WITH OR |
| OCCURRENCE | 36 | JAMMING | 12 | REMOVAL BY | ACTION 1 | TRANSFERRING | · | WITHOUT |
| WHOLE AREA | · | · | · | DISASSEMBLY | 119 | PORTION OF | · | CHANGE |
| · | · | · | · | · | 122 | FIXING | · | OF PARTS |
| · | · | · | · | · | · | · | · | GOOD |
| · | · | · | · | · | · | · | · | · |

| | 00/02 | 00/03 | 00/04 | 00/05 | 00/06 | 00/07 | 00/08 | 00/09 | 00/10 | 00/11 | 00/12 | 01/01 |
|---|---|---|---|---|---|---|---|---|---|---|---|---|
| COUNT OF CALL | 531 | 669 | 331 | 470 | 316 | 185 | 116 | 30 | 20 | 10 | 0 | 0 |
| AMOUNT OF OPERATION | 1446 | 1545 | 805 | 1008 | 748 | 498 | 259 | 72 | 61 | 63 | 0 | 0 |
| RATE OF CALL | 36.72 | 43.30 | 41.12 | 46.63 | 42.25 | 37.15 | 44.40 | 41.67 | 32.79 | 15.37 | 0.00 | 0.00 |

| | 00/02 | 00/03 | 00/04 | 00/05 | 00/06 | 00/07 | 00/08 | 00/09 | 00/10 | 00/11 | 00/12 | 01/01 |
|---|---|---|---|---|---|---|---|---|---|---|---|---|
| COUNT OF CALL | 531 | 669 | 331 | 470 | 316 | 185 | 116 | 30 | 20 | 10 | 0 | 0 |
| AMOUNT OF OPERATION | 1446 | 1545 | 805 | 1008 | 748 | 498 | 259 | 72 | 61 | 63 | 0 | 0 |
| RATE OF CALL | 36.72 | 43.30 | 41.12 | 46.63 | 42.25 | 37.15 | 44.40 | 41.67 | 32.79 | 15.37 | 0.00 | 0.00 |

32

36

| COUNT OF CALL MAINTENANCE | 0002 | 0003 | 0004 | 0005 | 0006 | 0007 | 0008 | 0009 | 0010 | 0011 | 0012 | 0101 | TOTAL | |
|---|---|---|---|---|---|---|---|---|---|---|---|---|---|---|
| JAMMING AT FIXER | 2 | 7 | 2 | 8 | 3 | 2 | 1 | | 1 | | | | 26 | |
| JAMMING | 1 | 12 | 1 | 6 | 5 | 1 | | | | | | | 26 | |
| ION | 7 | 11 | 4 | | | | | | | | | | 22 | |
| SC542 | | 7 | 2 | 6 | 6 | 1 | | | | | | | 22 | |
| IMPURITY | 2 | 6 | 1 | 2 | | 2 | | | | | | | 13 | |
| SG450 | 2 | 4 | | 3 | 1 | 1 | 1 | | | | | | 12 | |

| | | | | | | | | | ACV | ACV2 | | SYMPTOM 1 | |
|---|---|---|---|---|---|---|---|---|---|---|---|---|---|
| 1 | 3103 | 111621 | 1 | 200006 | 20000726 | 200001212 | 14032 | 20681 | 0 | 0 | | | FIXING PORTION |
| 1 | 3101 | 111934 | 1 | 200005 | 20000523 | 200001219 | 3068 | 44053 | 396 | 4311 | | | FIXING PORTION |
| 1 | 3103 | 111393 | 1 | 200005 | 20000614 | 200001214 | 27422 | 3877 | 0 | 0 | | | FIXING PORTION |
| 1 | 3101 | 111678 | 1 | 200004 | 20000519 | 200001002 | 1126 | 1364 | 0 | 0 | | | FIXING PORTION |
| 1 | 3103 | 111733 | 1 | 200006 | 20000809 | 200001111 | 1343 | 23090 | 0 | 0 | | | FIXING PORTION |

| FIG. 12A |
|---|
| FIG. 12B |

Figure 12B:
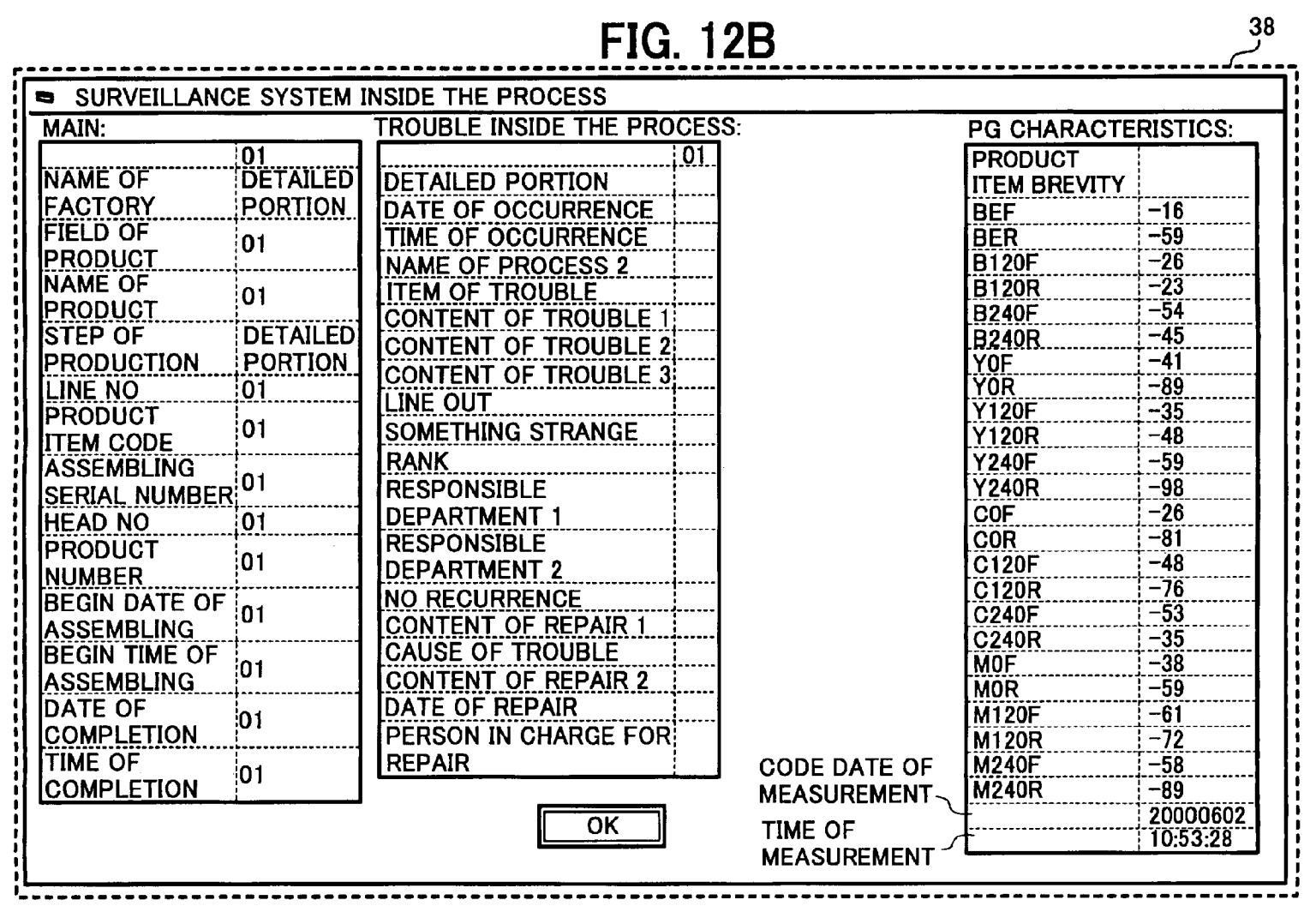

SURVEILLANCE SYSTEM INSIDE THE PROCESS

MAIN:

| | 01 |
|---|---|
| NAME OF FACTORY | DETAILED PORTION |
| FIELD OF PRODUCT | 01 |
| NAME OF PRODUCT | 01 |
| STEP OF PRODUCTION | DETAILED PORTION |
| LINE NO | 01 |
| PRODUCT ITEM CODE | 01 |
| ASSEMBLING SERIAL NUMBER | 01 |
| HEAD NO | 01 |
| PRODUCT NUMBER | 01 |
| BEGIN DATE OF ASSEMBLING | 01 |
| BEGIN TIME OF ASSEMBLING | 01 |
| DATE OF COMPLETION | 01 |
| TIME OF COMPLETION | 01 |

TROUBLE INSIDE THE PROCESS:

| | 01 |
|---|---|
| DETAILED PORTION | |
| DATE OF OCCURRENCE | |
| TIME OF OCCURRENCE | |
| NAME OF PROCESS 2 | |
| ITEM OF TROUBLE | |
| CONTENT OF TROUBLE 1 | |
| CONTENT OF TROUBLE 2 | |
| CONTENT OF TROUBLE 3 | |
| LINE OUT | |
| SOMETHING STRANGE | |
| RANK | |
| RESPONSIBLE DEPARTMENT 1 | |
| RESPONSIBLE DEPARTMENT 2 | |
| NO RECURRENCE | |
| CONTENT OF REPAIR 1 | |
| CAUSE OF TROUBLE | |
| CONTENT OF REPAIR 2 | |
| DATE OF REPAIR | |
| PERSON IN CHARGE FOR REPAIR | |

OK

PG CHARACTERISTICS:

| | |
|---|---|
| PRODUCT ITEM BREVITY | |
| BEF | −16 |
| BER | −59 |
| B120F | −26 |
| B120R | −23 |
| B240F | −54 |
| B240R | −45 |
| Y0F | −41 |
| Y0R | −89 |
| Y120F | −35 |
| Y120R | −48 |
| Y240F | −59 |
| Y240R | −98 |
| C0F | −26 |
| C0R | −81 |
| C120F | −48 |
| C120R | −76 |
| C240F | −53 |
| C240R | −35 |
| M0F | −38 |
| M0R | −59 |
| M120F | −61 |
| M120R | −72 |
| M240F | −58 |
| M240R | −89 |
| | 20000602 |
| | 10:53:28 |

CODE DATE OF MEASUREMENT

TIME OF MEASUREMENT

FIG. 14B

YEAR AND MONTH OF PRODUCTION

DETAILED PORTION AT CITE 1

45

| | ACV 2 | DATE OF DELIVER | | COMMENT ON MAINTENANCE 1 | SYMPTOM 1 | NAME OF ITEM 2 | | ITEM NAME 3 | CAUSE 1 | ITEM NAME 4 |
|---|---|---|---|---|---|---|---|---|---|---|
| 01 | | 19990416 | 199903 | | 017 | RUBBING OFF | 003 | | 014 | |
| 02 | | 19990512 | 199903 | | 006 | THIN SPOT | 001 | | 020 | |
| 03 | | 19990609 | 199904 | | 006 | THIN SPOT | 026 | | 201 | |
| 04 | | 19990422 | 199903 | | 017 | RUBBING OFF | 026 | | 034 | |
| 05 | | 19990528 | 199904 | | 006 | THIN SPOT | 001 | | 504 | |
| 06 | | 19990401 | 199903 | | 006 | THIN SPOT | 003 | | 001 | |
| 07 | | 19990527 | 199904 | | 006 | THIN SPOT | 099 | | 014 | |
| 08 | | 19990815 | 199904 | | 006 | THIN SPOT | 026 | | 010 | |
| 09 | | 19990614 | 199904 | | 006 | THIN SPOT | 026 | | 001 | |
| 10 | | 19990423 | 199904 | MORB 2 | 006 | THIN SPOT | 011 | | 014 | |
| 11 | | 19990423 | 199904 | | 006 | THIN SPOT | 099 | | 999 | |
| 12 | | 19990510 | 199904 | | 006 | THIN SPOT | 006 | | 001 | |
| 13 | | 19990624 | 199904 | KASURE 2 | 006 | THIN SPOT | 002 | | 014 | |
| 14 | | 19990624 | 199904 | KASURE 2 | 006 | THIN SPOT | 011 | | 014 | |
| 15 | | 19990421 | 199903 | | 017 | RUBBING OFF | 119 | | 036 | |
| 16 | | 19990323 | 199903 | | 006 | RUBBING OFF | 026 | | 014 | |
| 17 | | 19990617 | 199904 | | 006 | THIN SPOT | 001 | | 011 | |
| 18 | | 19990329 | 199903 | | 006 | THIN SPOT | 001 | | 010 | |
| 19 | | 19990601 | 199904 | | 017 | RUBBING OFF | 041 | | 504 | |
| 20 | | 19990730 | 199903 | | 006 | THIN SPOT | 001 | | 001 | |
| 21 | | 19990629 | 199905 | | 017 | RUBBING OFF | 026 | | 010 | |
| 22 | | 19990801 | 199905 | | 006 | THIN SPOT | 008 | | 014 | |
| 23 | | 19990801 | 199905 | | 006 | THIN SPOT | 026 | | 020 | |
| 24 | | 19990803 | 199905 | | 017 | RUBBING OFF | 001 | | 035 | |
| 25 | | 19990729 | 199905 | | 017 | RUBBING OFF | 041 | | 022 | |
| 26 | | 19991130 | 199903 | | 006 | THIN SPOT | 026 | | 014 | |
| 27 | | 19990825 | 199905 | | 006 | THIN SPOT | 026 | | 504 | |
| 28 | | 19990715 | 199903 | | 017 | RUBBING OFF | 011 | | 504 | |
| 29 | | 19990901 | 199903 | | 017 | RUBBING OFF | 010 | | 014 | |

1MONTH 2MONTH

46

| | 1MONTH | 2MONTH | 3MONTH | 4MONTH | 5MONTH | 6MONTH | 7MONTH | 8MONTH | 9MONTH | 10MONTH | 11MONTH | 12MONTH |
|---|---|---|---|---|---|---|---|---|---|---|---|---|
| 200002 | 47 | 47 | 62 | 52 | 47 | 62 | 73 | 79 | 23 | 0 | 2 | |
| 200002 | 68 | 69 | 47 | 71 | 47 | 73 | 47 | 73 | 7 | 0 | 0 | 0 |
| 200002 | 34 | 47 | 40 | 57 | 60 | 47 | 72 | 47 | 0 | 0 | 0 | 0 |
| 200002 | 70 | 62 | 66 | 73 | 47 | 72 | 23 | 47 | 0 | 0 | 0 | 0 |
| 200002 | 12 | 60 | 65 | 44 | 36 | 23 | 4 | 0 | 0 | 0 | 0 | 0 |
| 200002 | 62 | 61 | 47 | 23 | 11 | 1 | 0 | 0 | 0 | 0 | 0 | 0 |
| 200002 | 12 | 47 | 19 | 5 | 0 | 0 | 0 | 0 | 0 | 0 | 0 | 0 |
| 200002 | 19 | 11 | 0 | 0 | 0 | 0 | 0 | 0 | 0 | 0 | 0 | 0 |
| 200002 | 15 | 5 | 0 | 0 | 0 | 0 | 0 | 0 | 0 | 0 | 0 | 0 |
| 200002 | 9 | 1 | 0 | 0 | 0 | 0 | 0 | 0 | 0 | 0 | 0 | 0 |
| 200002 | 0 | 0 | 0 | 0 | 0 | 0 | 0 | 0 | 0 | 0 | 0 | 0 |
| 200002 | 0 | 0 | 0 | 0 | 0 | 0 | 0 | 0 | 0 | 0 | 0 | 0 |

INPUT SYSTEM
CLIENT (210 TO 208) 8)

APPLICATION

FUNCTION

- ◆INPUT FUNCTION
- ◆REVISION FUNCTION
- ◆REGISTER FUNCTION
- ◆CANCELLATION FUNCTION
- ◆SELECTION FUNCTION
- ◆GUIDING FUNCTION
- ◆AUTOMATICAL INPUT FUNCTION
- ◆POP UP FUNCTION
- ◆ASSOCIATING BAR CODE FUNCTION
- ◆PRINT PREVIEW FUNCTION
- ◆CUT SHEET INPUT FUNCTION
- ◆PREVENTION OF INPUT LEAKAGE FUNCTION

- ◆NO INSPECTION SHEET
- ◆NO CHECK SHEET

} ASSOCIATING PAPERLESS

INPUT INFORMATION

| | | |
|---|---|---|
| PRODUCTION INFORMATION | ◆NAME OF FACTORY<br>◆FIELD OF PRODUCT<br>◆PRODUCT ITEM<br>◆STEP OF PRODUCTION<br>◆LINE NUMBER<br>◆NAME OF PROCESS | ◆PRODUCT ITEM CODE<br>◆ASSEMBLING SERIAL NUMBER<br>◆HEAD NUMBER<br>◆MACHINE NUMBER<br>◆DATE OF PRODUCTION<br>◆DATE OF COMPLETION ... ETC. |
| TROUBLE INFORMATION | ◆DATE OF OCCURRENCE<br>◆TIME OF OCCURRENCE<br>◆PROCESS OCCURRED<br>◆ITEM OF TROUBLE<br>◆CONTENT TO TROUBLE<br>◆RANK | ◆RESPONSIBLE DEPARTMENT<br>◆CAUSE OF TROUBLE<br>◆CONTENTS OF REPAIR<br>◆PERSON IN CHARGE FOR REPAIR<br>◆CONTENT OF CORRECTIVE ACTION<br>◆CORRECTIVE ACTION<br>◆DATE OF CORRECTIVE ACTION ETC. |
| OTHERS | ◆INSPECTION SHEET INSPECTION DATA<br>◆CHECK SHEET CHECK DATA<br>◆NAME OF INSPECTOR /PASSING STATUS | |

FIG. 30

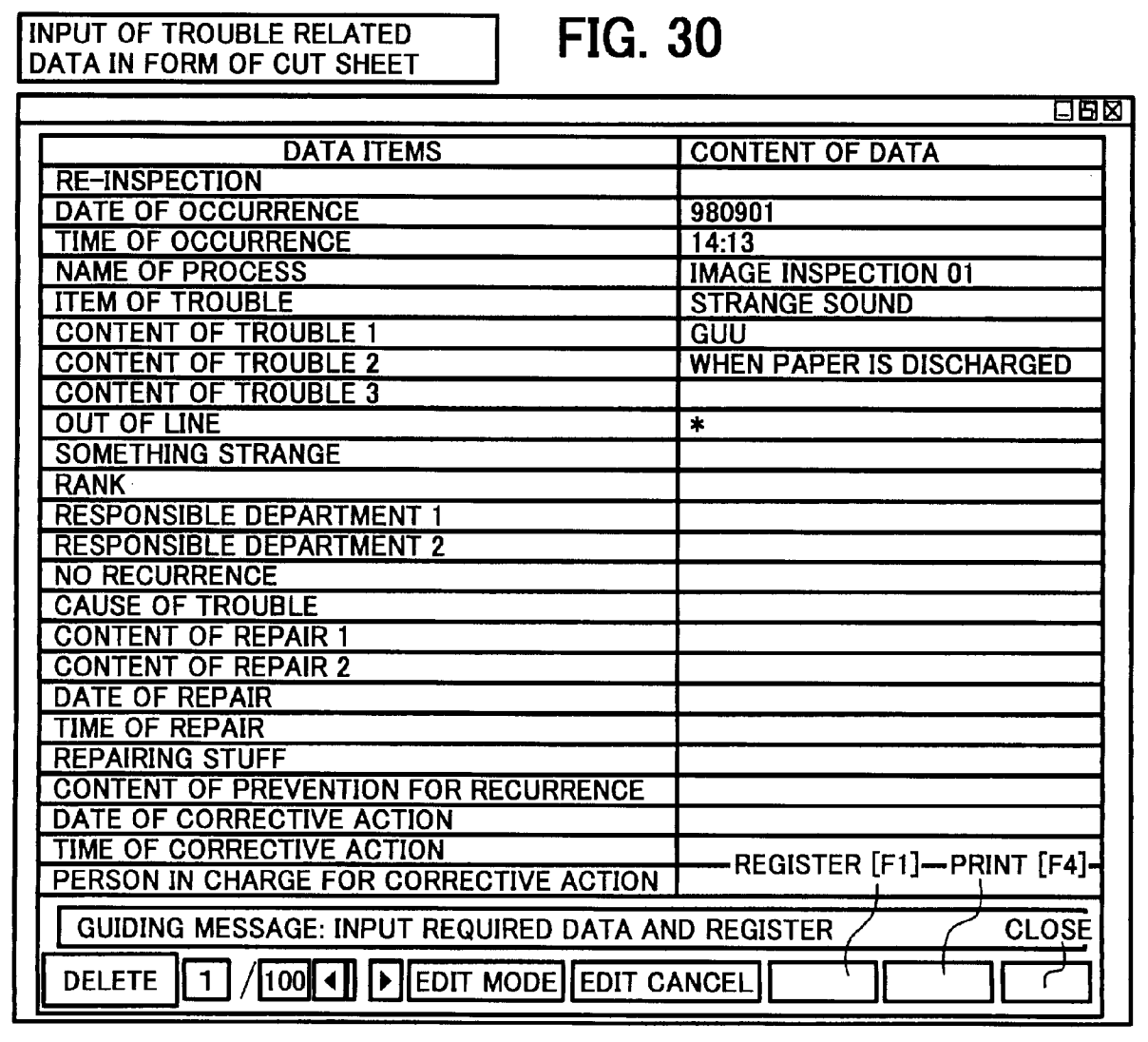

INPUT OF TROUBLE RELATED DATA IN FORM OF CUT SHEET

| DATA ITEMS | CONTENT OF DATA |
|---|---|
| RE-INSPECTION | |
| DATE OF OCCURRENCE | 980901 |
| TIME OF OCCURRENCE | 14:13 |
| NAME OF PROCESS | IMAGE INSPECTION 01 |
| ITEM OF TROUBLE | STRANGE SOUND |
| CONTENT OF TROUBLE 1 | GUU |
| CONTENT OF TROUBLE 2 | WHEN PAPER IS DISCHARGED |
| CONTENT OF TROUBLE 3 | |
| OUT OF LINE | * |
| SOMETHING STRANGE | |
| RANK | |
| RESPONSIBLE DEPARTMENT 1 | |
| RESPONSIBLE DEPARTMENT 2 | |
| NO RECURRENCE | |
| CAUSE OF TROUBLE | |
| CONTENT OF REPAIR 1 | |
| CONTENT OF REPAIR 2 | |
| DATE OF REPAIR | |
| TIME OF REPAIR | |
| REPAIRING STUFF | |
| CONTENT OF PREVENTION FOR RECURRENCE | |
| DATE OF CORRECTIVE ACTION | |
| TIME OF CORRECTIVE ACTION | |
| PERSON IN CHARGE FOR CORRECTIVE ACTION | |

REGISTER [F1] — PRINT [F4]

GUIDING MESSAGE: INPUT REQUIRED DATA AND REGISTER

CLOSE

DELETE | 1 | / 100 | ◀ | ▶ | EDIT MODE | EDIT CANCEL

FIG. 37B

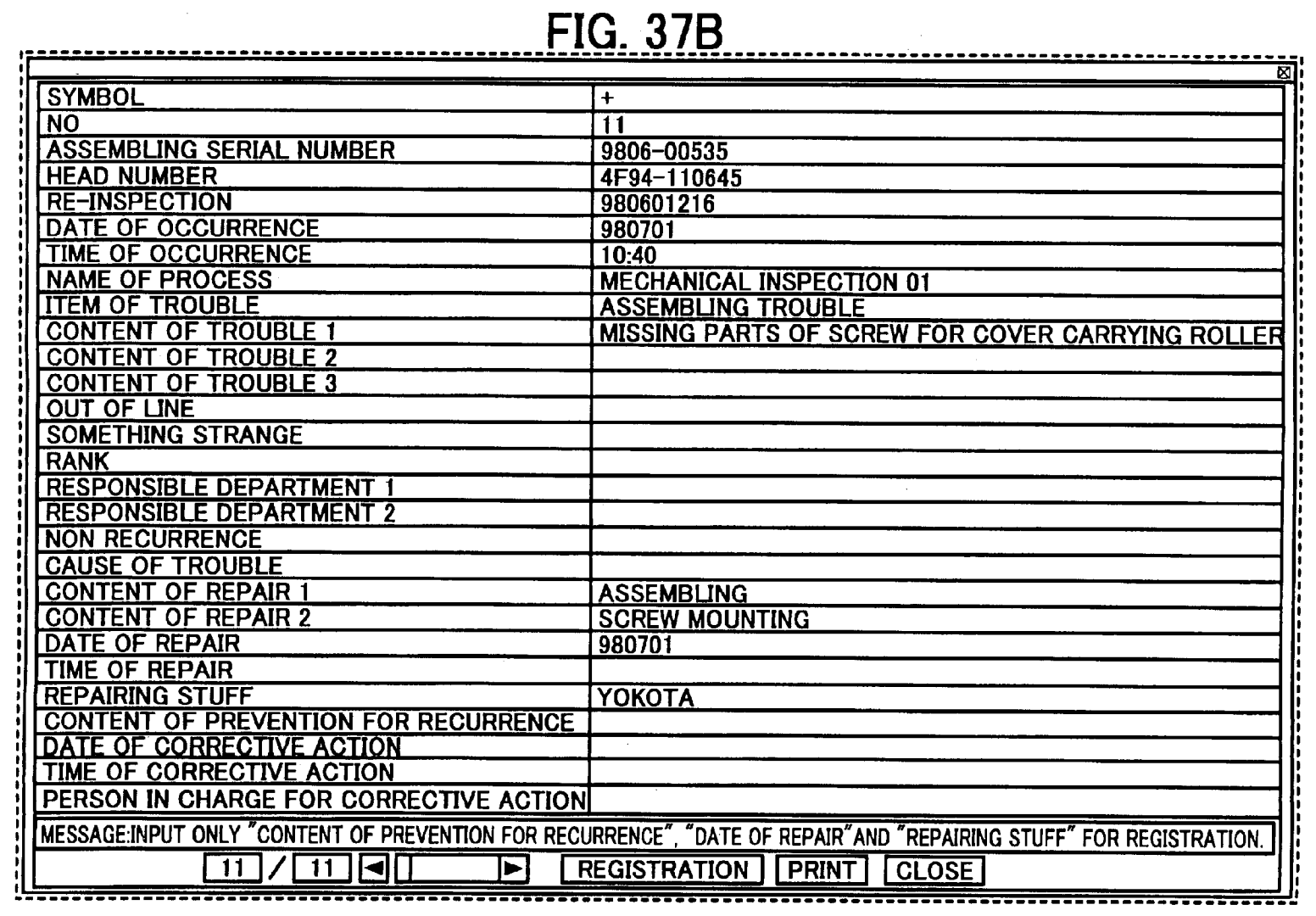

| | |
|---|---|
| SYMBOL | + |
| NO | 11 |
| ASSEMBLING SERIAL NUMBER | 9806-00535 |
| HEAD NUMBER | 4F94-110645 |
| RE-INSPECTION | 980601216 |
| DATE OF OCCURRENCE | 980701 |
| TIME OF OCCURRENCE | 10:40 |
| NAME OF PROCESS | MECHANICAL INSPECTION 01 |
| ITEM OF TROUBLE | ASSEMBLING TROUBLE |
| CONTENT OF TROUBLE 1 | MISSING PARTS OF SCREW FOR COVER CARRYING ROLLER |
| CONTENT OF TROUBLE 2 | |
| CONTENT OF TROUBLE 3 | |
| OUT OF LINE | |
| SOMETHING STRANGE | |
| RANK | |
| RESPONSIBLE DEPARTMENT 1 | |
| RESPONSIBLE DEPARTMENT 2 | |
| NON RECURRENCE | |
| CAUSE OF TROUBLE | |
| CONTENT OF REPAIR 1 | ASSEMBLING |
| CONTENT OF REPAIR 2 | SCREW MOUNTING |
| DATE OF REPAIR | 980701 |
| TIME OF REPAIR | |
| REPAIRING STUFF | YOKOTA |
| CONTENT OF PREVENTION FOR RECURRENCE | |
| DATE OF CORRECTIVE ACTION | |
| TIME OF CORRECTIVE ACTION | |
| PERSON IN CHARGE FOR CORRECTIVE ACTION | |

MESSAGE:INPUT ONLY "CONTENT OF PREVENTION FOR RECURRENCE", "DATE OF REPAIR" AND "REPAIRING STUFF" FOR REGISTRATION.

11 / 11 ◀ ▶ REGISTRATION PRINT CLOSE

| NO | NAME OF DATA ITEM | TOTAL | GRAPH | RATE(%) | 8 | 9 | 10 | 11 | 12 | 13 | 14 | 15 | 16 | 17 | 18 | 19 | 20 |
|---|---|---|---|---|---|---|---|---|---|---|---|---|---|---|---|---|---|
| 1 | AMOUNT OF COMPLETION | 35 | | 100.0 | 1 | 5 | 5 | 5 | 1 | 7 | 5 | 3 | 3 | | | | |
| 2 | AMOUNT OF NO DEFECT | 22 | | 62.9 | | 4 | 4 | 3 | 1 | 3 | 4 | 2 | 1 | | | | |
| 3 | COUNT OF DEFECT | 21 | | 60.0 | 2 | 4 | 2 | 2 | | 7 | 1 | 1 | 2 | | | | |
| 4 | RATE OF NO DEFECT | 52.45 | | 62.86 | 0.0 | 80.0 | 80.0 | 60.0 | 100.0 | 42.9 | 80.0 | 55.7 | 33.2 | | | | |
| 5 | COUNT OF DEFECT PER PIECE | 0.571 | | 0.571 | 2.000 | 0.600 | 0.400 | 0.400 | 0.600 | 1.000 | 0.200 | 0.333 | 0.557 | | | | |
| 6 | PC VALUE | 0.500 | | 0.600 | 2.000 | 0.800 | 0.400 | 0.400 | 0.800 | 1.000 | 0.200 | 0.233 | 0.557 | | | | |
| 7 | AMOUNT OF OUT OF LINE | 32 | | 0.8 | | 1 | | 1 | | | | | 1 | | | | |

FIG. 41D

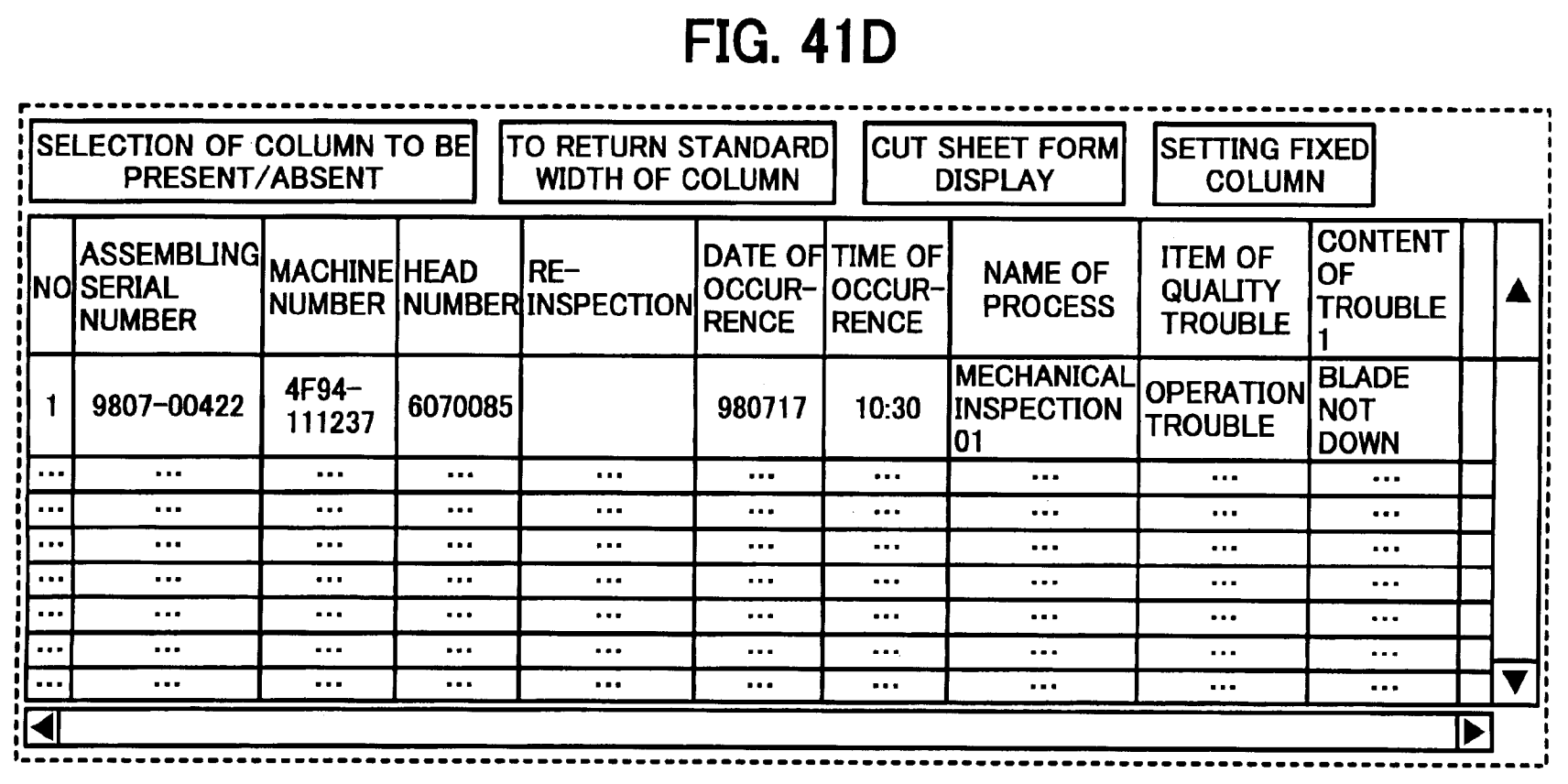

SELECTION OF COLUMN TO BE PRESENT/ABSENT | TO RETURN STANDARD WIDTH OF COLUMN | CUT SHEET FORM DISPLAY | SETTING FIXED COLUMN

| NO | ASSEMBLING SERIAL NUMBER | MACHINE NUMBER | HEAD NUMBER | RE-INSPECTION | DATE OF OCCUR-RENCE | TIME OF OCCUR-RENCE | NAME OF PROCESS | ITEM OF QUALITY TROUBLE | CONTENT OF TROUBLE 1 |
|---|---|---|---|---|---|---|---|---|---|
| 1 | 9807-00422 | 4F94-111237 | 6070085 | | 980717 | 10:30 | MECHANICAL INSPECTION 01 | OPERATION TROUBLE | BLADE NOT DOWN |
| ... | ... | ... | ... | ... | ... | ... | ... | ... | ... |
| ... | ... | ... | ... | ... | ... | ... | ... | ... | ... |
| ... | ... | ... | ... | ... | ... | ... | ... | ... | ... |
| ... | ... | ... | ... | ... | ... | ... | ... | ... | ... |
| ... | ... | ... | ... | ... | ... | ... | ... | ... | ... |
| ... | ... | ... | ... | ... | ... | ... | ... | ... | ... |
| ... | ... | ... | ... | ... | ... | ... | ... | ... | ... |

| FIG. 42A |
| --- |
| FIG. 42B |

TIME SERIES DATA OF EVERY OUTPUT MENU (A) SITUATION OF TROUBLE OCCURRENCE BASED ON PRODUCTION PROCESS

| NO | NAME OF PROCESS | COUNT | GRAPH | RATE(%) | 8 | 9 | 10 | 11 | 12 | 13 | 14 | 15 | 16 | 17 | 18 | 19 | 20- |
| --- | --- | --- | --- | --- | --- | --- | --- | --- | --- | --- | --- | --- | --- | --- | --- | --- | --- |
| 0 | TOTAL | 27 | | 100.0 | 2 | 4 | 2 | 2 | | 7 | 1 | 1 | 5 | 2 | | | |
| 1 | IMAGE INSPECTON 01 | 17 | | 63.0 | 1 | 2 | | 2 | | 5 | 1 | | 4 | 2 | | | |
| 2 | COMPLETION INSPECTION 01 | 6 | | 22.2 | 1 | 1 | 2 | | | | | 1 | 1 | | | | |
| 3 | MACHINE INSPECTION 01 | 3 | | 11.1 | | 1 | | | | 1 | | | 1 | | | | |
| 4 | BODY ASSEMBLING 01 | 1 | | 3.7 | | | | | | 1 | | | | | | | |

(B) SITUATION OF TROUBLE OCCURRENCE BASED ON EVERY TROUBLE ITEM

| NO | NAME OF TROUBLE ITEMS | COUNT | GRAPH | RATE(%) | 8 | 9 | 10 | 11 | 12 | 13 | 14 | 15 | 16 | 17 | 18 | 19 | 20- |
| --- | --- | --- | --- | --- | --- | --- | --- | --- | --- | --- | --- | --- | --- | --- | --- | --- | --- |
| 0 | TOTAL | 27 | | 100.0 | 2 | 4 | 2 | 2 | | 7 | 1 | 1 | 6 | 2 | | | |
| 1 | TROUBLE OF IMAGE | 15 | | 59.3 | 1 | 2 | | 2 | | 5 | 1 | | 3 | 2 | | | |
| 2 | OTHER | 2 | | 7.4 | | | 1 | | | | | | 1 | | | | |
| 3 | TROUBLE OF OPERATION | 2 | | 7.4 | 1 | | | | | | | 1 | | | | | |
| 4 | TROUBLE OF ASSEMBLING | 2 | | 7.4 | | | | | | 1 | | | 1 | | | | |
| 5 | TROUBLE OF CHARACTERISTICS | 1 | | 3.7 | | | | | | 1 | | | | | | | |

(C) SITUATION OF TROUBLE OCCURRENCE BASED ON EVERY RESPONSIBLE DEPARTMENT

| NO | NAME OF RESPONSIBLE DEPARTMENT | COUNT | GRAPH | RATE(%) | 8 | 9 | 10 | 11 | 12 | 13 | 14 | 15 | 16 | 17 | 18 | 19 | 20- |
| --- | --- | --- | --- | --- | --- | --- | --- | --- | --- | --- | --- | --- | --- | --- | --- | --- | --- |
| 0 | TOTAL | 27 | | 100.0 | 2 | 4 | 2 | 2 | | 7 | 1 | 1 | 6 | 2 | | | |
| 1 | RESPONSIBLE DEPARTMENT NOT YET INPUT | 26 | | 96.3 | 2 | 4 | 2 | 2 | | 7 | 1 | 1 | 5 | 2 | | | |
| 2 | TECHNOLOGY | 1 | | 3.7 | | | | | | | | | 1 | | | | |

FIG. 42B (D) SITUATION OF TROUBLE OCCURRENCE BASED ON EVERY RANK

| NO | NAME OF RANK | COUNT | GRAPH | RATE(%) | 8 | 9 | 10 | 11 | 12 | 13 | 14 | 15 | 16 | 17 | 18 | 19 | 20- |
|---|---|---|---|---|---|---|---|---|---|---|---|---|---|---|---|---|---|
| 0 | TOTAL | 27 | | 100.0 | 2 | 4 | 2 | 2 | | 7 | 1 | 1 | 6 | 2 | | | |
| 1 | NOTHING | 27 | | 100.0 | 2 | 4 | 2 | 2 | | 7 | 1 | 1 | 6 | 2 | | | |

(E) SITUATION OF TROUBLE OCCURRENCE LINE OUT/RELEASE

| NO | NAME OF DATA ITEM | COUNT | GRAPH | RATE(%) | 8 | 9 | 10 | 11 | 12 | 13 | 14 | 15 | 16 | 17 | 18 | 19 | 20- |
|---|---|---|---|---|---|---|---|---|---|---|---|---|---|---|---|---|---|
| 1 | AMOUNT OF PRODUCTION (COMPLETION) | 38 | | 100.0 | 1 | 5 | 5 | 5 | 1 | 7 | 5 | 3 | 5 | 1 | | | |
| 2 | AMOUNT OF OUT OF LINE | 4 | | 10.5 | | 1 | | 1 | | | | | 1 | 1 | | | |
| 3 | AMOUNT OF OUT OF LINE RELEASE | 4 | | 100.0 | | 1 | | 1 | | | | | 1 | 1 | | | |

(F) SITUATION OF TROUBLE OCCURRENCE BASED ON EVERY CONTENT OF TROUBLE

| NO | NAME OF CONTENT OF TROUBLE | COUNT | GRAPH | RATE(%) | 8 | 9 | 10 | 11 | 12 | 13 | 14 | 15 | 16 | 17 | 18 | 19 | 20- |
|---|---|---|---|---|---|---|---|---|---|---|---|---|---|---|---|---|---|
| 0 | TOTAL | 27 | | 100.0 | 2 | 4 | 2 | 2 | | 7 | 1 | 1 | 6 | 2 | | | |
| 1 | HORIZONTAL WHITE STREAK | 5 | | 18.5 | 2 | 4 | 2 | 2 | | 7 | 1 | 1 | 5 | 2 | | | |
| 2 | STRANGE IMAGE | 4 | | 14.8 | | | | | | | | | 1 | | | | |
| 3 | NOISY IMAGE | 4 | | 14.8 | 2 | 4 | 2 | 2 | | 7 | 1 | 1 | 5 | 2 | | | |
| 4 | MANUAL PAPER FEED | 3 | | 11.1 | | | | | | | | | 1 | | | | |
| 5 | MISALIGNMENT OF PRINTING HORIZONTAL RULE | 2 | | 7.4 | | 1 | | 1 | | | | | 1 | 1 | | | |

FIG. 43A
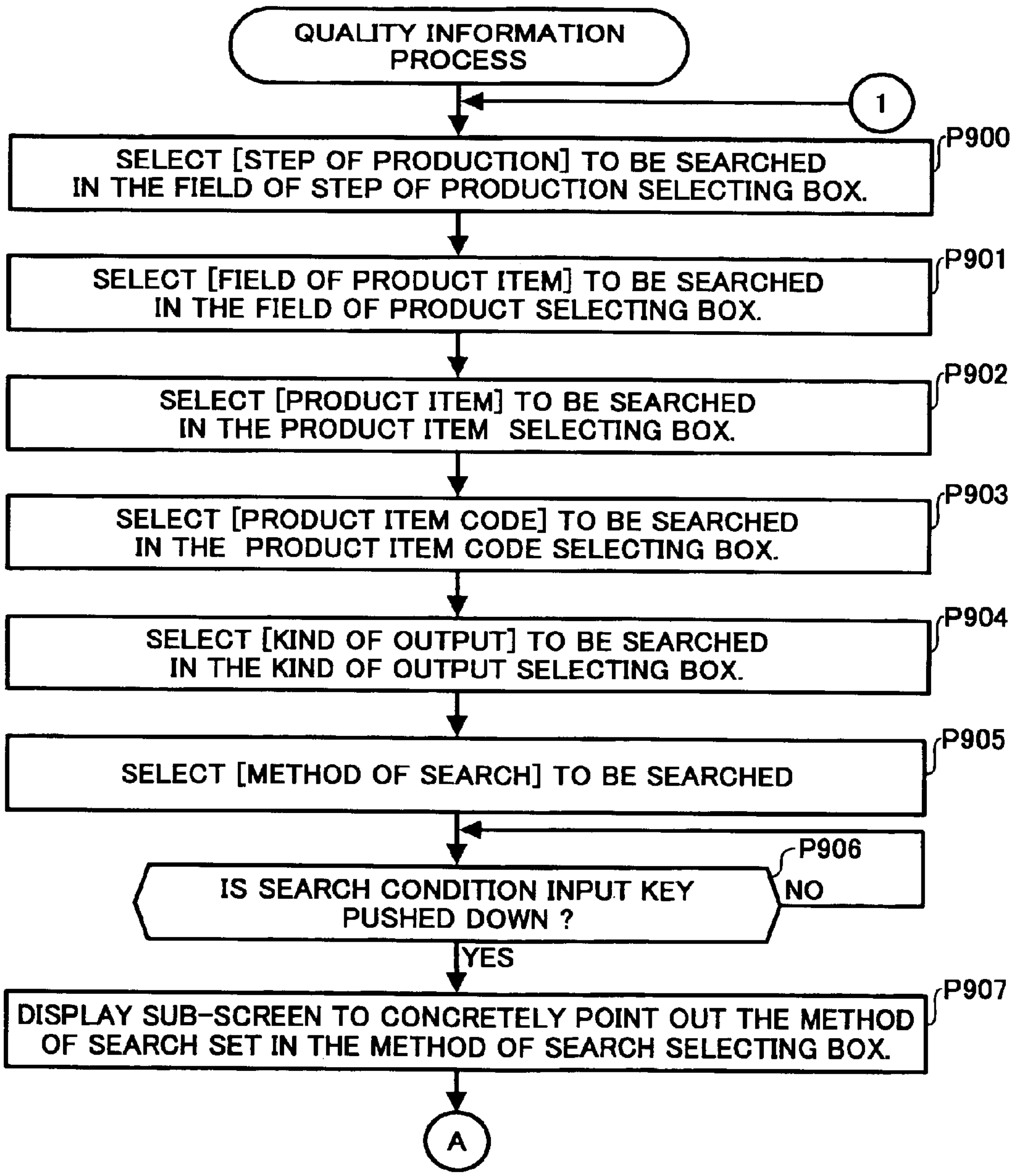

TOTAL GRAPH RATE(%)

| NO | NAME OF DATA ITEM | | | | 01 | 03 | 06 | 07 | 08 | 09 | 10 | 13 | 14 | 15 | 16 | 17 |
|---|---|---|---|---|---|---|---|---|---|---|---|---|---|---|---|---|
| 1 | AMOUNT OF COMPLETION | 697 | | 100.0 | 24 | 09 | 42 | 45 | 46 | 50 | 49 | 45 | 40 | 42 | 49 | |
| 2 | AMOUNT OF NO DEFECT | 349 | | 50.1 | 10 | 15 | 19 | 26 | 25 | 21 | 25 | 23 | 22 | 22 | 24 | |
| 3 | COUNT OF DEFECT | 520 | | 74.6 | 19 | 42 | 33 | 28 | 26 | 38 | 37 | 30 | 27 | 35 | 40 | |
| 4 | RATE OF NO DEFECT | 50.07 | | 50.1 | 41.7 | 38.5 | 45.2 | 57.8 | 54.3 | 42.0 | 51.0 | 51.1 | 55.0 | 52.4 | 49.0 | |
| 5 | COUNT OF DEFECT PER PIECE | 0.6801 | | 0.6801 | 0.7083 | 0.9714 | 0.7143 | 0.6000 | 0.5652 | 0.6600 | 0.6939 | 0.6444 | 0.5250 | 0.8095 | 0.7347 | 0.65 |
| 6 | PQ VALUE | 0.7461 | | 0.7461 | 0.7917 | 1.0769 | 0.7857 | 0.6222 | 0.6087 | 0.7600 | 0.7551 | 0.6667 | 0.6750 | 0.8333 | 0.8163 | 0.7 |
| 7 | AMOUNT OF OUT OF LINE | 56 | | 8.0 | | | | | 1 | | 2 | 3 | | 8 | 11 | |

FIG. 46D

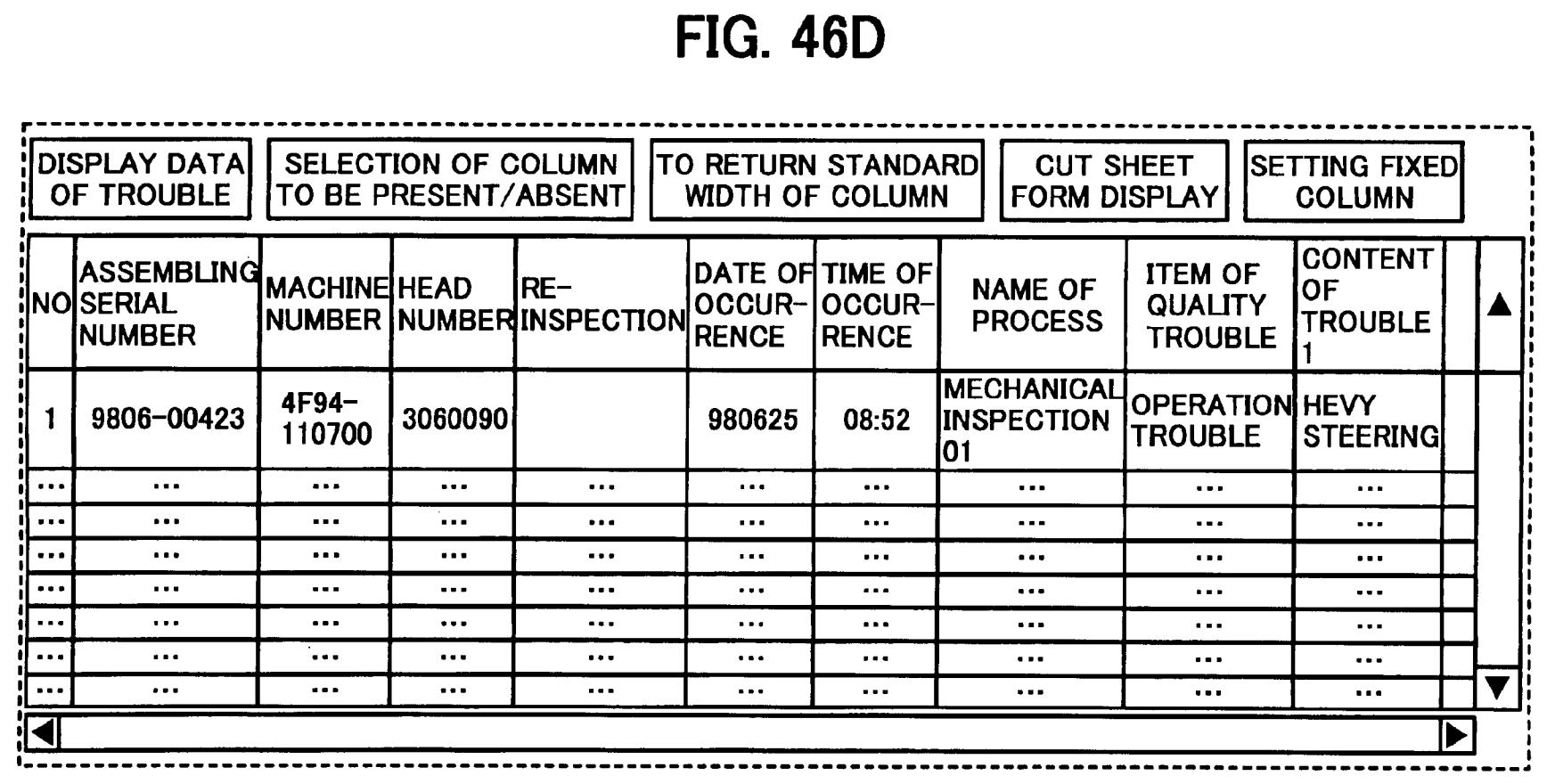

DISPLAY DATA OF TROUBLE | SELECTION OF COLUMN TO BE PRESENT/ABSENT | TO RETURN STANDARD WIDTH OF COLUMN | CUT SHEET FORM DISPLAY | SETTING FIXED COLUMN

| NO | ASSEMBLING SERIAL NUMBER | MACHINE NUMBER | HEAD NUMBER | RE-INSPECTION | DATE OF OCCUR-RENCE | TIME OF OCCUR-RENCE | NAME OF PROCESS | ITEM OF QUALITY TROUBLE | CONTENT OF TROUBLE 1 |
|---|---|---|---|---|---|---|---|---|---|
| 1 | 9806-00423 | 4F94-110700 | 3060090 | | 980625 | 08:52 | MECHANICAL INSPECTION 01 | OPERATION TROUBLE | HEVY STEERING |
| ... | ... | ... | ... | ... | ... | ... | ... | ... | ... |
| ... | ... | ... | ... | ... | ... | ... | ... | ... | ... |
| ... | ... | ... | ... | ... | ... | ... | ... | ... | ... |
| ... | ... | ... | ... | ... | ... | ... | ... | ... | ... |
| ... | ... | ... | ... | ... | ... | ... | ... | ... | ... |
| ... | ... | ... | ... | ... | ... | ... | ... | ... | ... |
| ... | ... | ... | ... | ... | ... | ... | ... | ... | ... |

FIG. 47A

| FIG. 47 |
|---|
| FIG. 47A |
| FIG. 47B |

TIME SERIES DATA OF EVERY OUTPUT MENU (A) SITUATION OF TROUBLE OCCURRENCE BASED ON PRODUCTION PROCESS

| NO | NAME OF PROCESS | COUNT | GRAPH | RATE(%) | 01 | 03 | 06 | 07 | 08 | 09 | 10 | 13 | 14 | 15 | 16 | 17 |
|---|---|---|---|---|---|---|---|---|---|---|---|---|---|---|---|---|
| 0 | TOTAL | 493 | | 100.0 | 17 | 41 | 31 | 27 | 26 | 36 | 36 | 29 | 22 | 34 | 37 | |
| 1 | IMAGE INSPECTON 01 | 380 | | 77.1 | 14 | 34 | 28 | 22 | 21 | 32 | 32 | 20 | 16 | 23 | 28 | |
| 2 | COMPLETION INSPECTION 01 | 85 | | 17.2 | 1 | 5 | 2 | 2 | 4 | 3 | 3 | 5 | 4 | 8 | 9 | |
| 3 | MACHINE INSPECTION 01 | 17 | | 3.4 | 1 | 1 | 1 | 1 | | 1 | | 4 | 1 | 2 | | |
| 4 | STA(QA) | 6 | | 1.2 | | | | 2 | 1 | | | | 1 | 1 | | |

(B) SITUATION OF TROUBLE OCCURRENCE BASED ON EVERY TROUBLE ITEM

| NO | NAME OF TROUBLE ITEMS | COUNT | GRAPH | RATE(%) | 01 | 03 | 06 | 07 | 08 | 09 | 10 | 13 | 14 | 15 | 16 | 17 |
|---|---|---|---|---|---|---|---|---|---|---|---|---|---|---|---|---|
| 0 | TOTAL | 493 | | 100.0 | 17 | 41 | 31 | 27 | 26 | 36 | 36 | 29 | 22 | 34 | 37 | |
| 1 | TROUBLE OF IMAGE | 346 | | 73.8 | 14 | 33 | 28 | 23 | 21 | 27 | 31 | 20 | 16 | 21 | 24 | |
| 2 | TROUBLE OF OPERATION | 33 | | 6.7 | 1 | | | | | 1 | | 2 | 1 | 4 | 5 | |
| 3 | APPEARANCE TROUBLE | 29 | | 5.9 | | 1 | 2 | 2 | | 3 | | 2 | 2 | 3 | 4 | |
| 4 | OTHER | 17 | | 3.4 | | 4 | | | 2 | | 3 | 2 | 1 | 1 | 1 | |
| 5 | ASSEMBLING TROUBLE | 15 | | 3.0 | 2 | 1 | 1 | | 1 | 1 | | 1 | 2 | 1 | | |

(C) SITUATION OF TROUBLE OCCURRENCE BASED ON EVERY RESPONSIBLE DEPARTMENT

| NO | NAME OF RESPONSIBLE DEPARTMENT | COUNT | GRAPH | RATE(%) | 01 | 03 | 06 | 07 | 08 | 09 | 10 | 13 | 14 | 15 | 16 | 17 |
|---|---|---|---|---|---|---|---|---|---|---|---|---|---|---|---|---|
| 0 | TOTAL | 493 | | 100.0 | 17 | 41 | 31 | 27 | 26 | 36 | 36 | 29 | 22 | 34 | 37 | |
| 1 | RESPONSIBLE DEPARTMENT NOT YET INPUT | 471 | | 95.5 | 17 | 41 | 31 | 25 | 25 | 35 | 34 | 25 | 18 | 31 | 35 | |
| 2 | ASSEMBLING | 11 | | 2.2 | | | | 2 | 1 | 1 | | 3 | 1 | 2 | | |
| 3 | TECHNOLOGY | 5 | | 1.0 | | | | | | | | | 3 | | | |

FIG. 47B (D) SITUATION OF TROUBLE OCCURRENCE BASED ON EVERY RANK

| NO | NAME OF PROCESS | COUNT | GRAPH | RATE(%) | 01 | 03 | 06 | 07 | 08 | 09 | 10 | 13 | 14 | 15 | 16 | 17 |
|---|---|---|---|---|---|---|---|---|---|---|---|---|---|---|---|---|
| 0 | TOTAL | 493 | | 100.0 | 17 | 41 | 31 | 27 | 26 | 36 | 36 | 29 | 22 | 34 | 37 | |
| 1 | NOTHING | 482 | | 97.8 | 17 | 41 | 31 | 25 | 25 | 36 | 35 | 29 | 20 | 31 | 36 | |
| 2 | ASSEMBLING | 7 | | 1.4 | | | | 2 | 1 | | | | 1 | 2 | | |
| 3 | TECHNOLOGY | 2 | | 0.4 | | | | | | | | | 1 | 1 | | |

(E) SITUATION OF TROUBLE OCCURRENCE LINE OUT/RELEASE

| NO | NAME OF DATA ITEM | COUNT | GRAPH | RATE(%) | 01 | 03 | 06 | 07 | 08 | 09 | 10 | 13 | 14 | 15 | 16 | 17 |
|---|---|---|---|---|---|---|---|---|---|---|---|---|---|---|---|---|
| 1 | AMOUNT OF PRODUCTION (COMPLETION) | 697 | | 100.0 | 17 | 41 | 31 | 25 | 25 | 36 | 35 | 29 | 20 | 31 | 36 | |
| 2 | AMOUNT OF OUT OF LINE | 56 | | 8.0 | | | | 2 | 1 | | | | 1 | 2 | | |
| 3 | AMOUNT OF OUT OF LINE RELEASE | 56 | | 100.0 | | | | | | | | | 1 | 1 | | |

(F) SITUATION OF TROUBLE OCCURRENCE BASED ON EVERY CONTENT OF TROUBLE

| NO | NAME OF RESPONSIBLE DEPARTMENT | COUNT | GRAPH | RATE(%) | 01 | 03 | 06 | 07 | 08 | 09 | 10 | 13 | 14 | 15 | 16 | 17 |
|---|---|---|---|---|---|---|---|---|---|---|---|---|---|---|---|---|
| 0 | TOTAL | 493 | | 100.0 | 7 | 41 | 31 | 27 | 26 | 36 | 36 | 29 | 22 | 34 | 37 | |
| 1 | HORIZONTAL WHITE STREAK | 133 | | 27.0 | 1 | 10 | 8 | 3 | 5 | 14 | 11 | 7 | 5 | 9 | 10 | |
| 2 | NOISY IMAGE | 79 | | 16.0 | 3 | 6 | 2 | 5 | 4 | 6 | 6 | 8 | 4 | 6 | 8 | |
| 3 | MISALIGNMENT OF PRINTING HORIZONTAL RULE | 69 | | 14.0 | 1 | 11 | 5 | 12 | 11 | 5 | 7 | 2 | | 4 | 3 | |
| 4 | STRANGE IMAGE | 39 | | 7.9 | | 3 | 8 | 1 | | 2 | 1 | 1 | | | | |

FIG. 48A
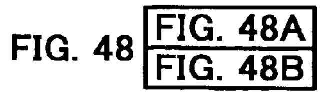
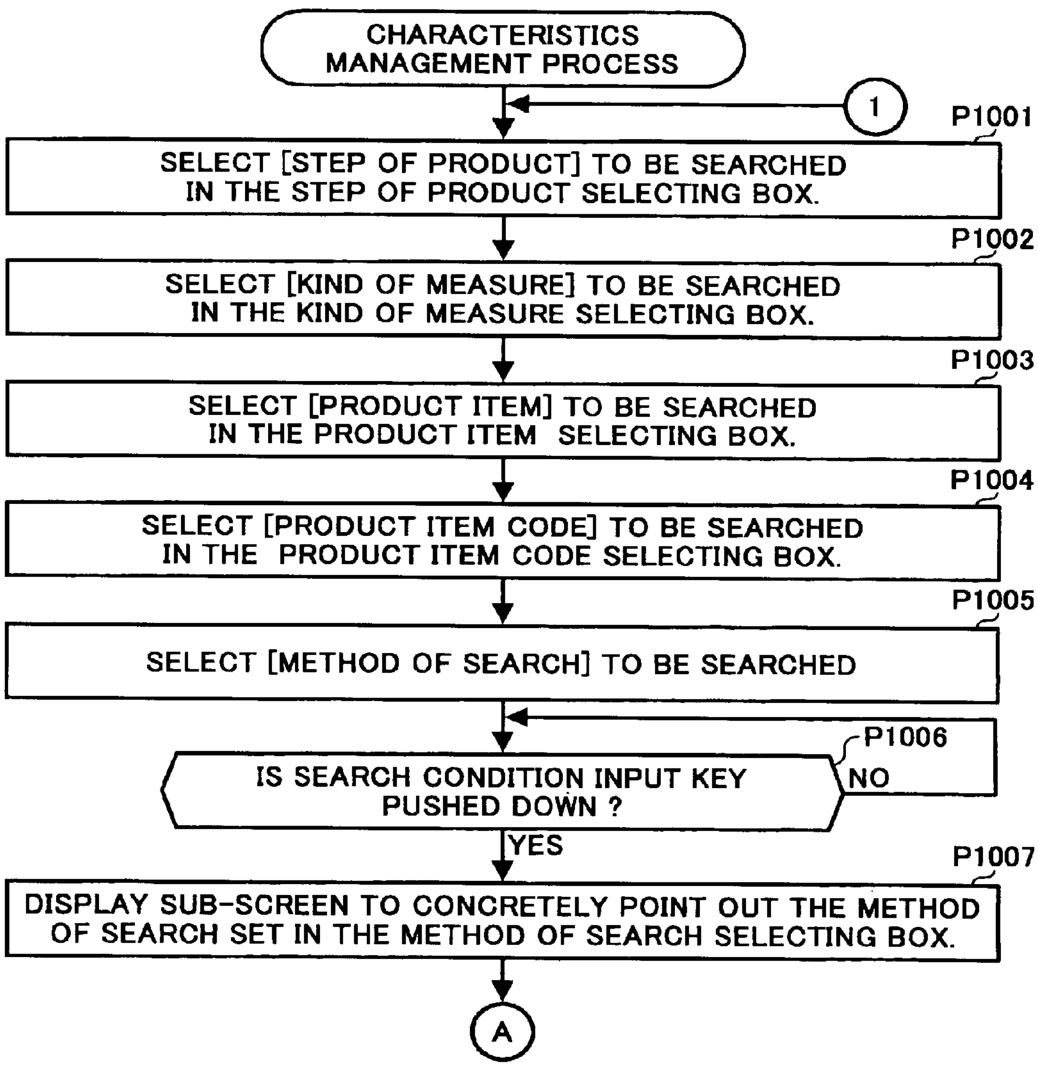

FIG. 51B
| COUNT | GRAPH | CLASS |
|---|---|---|
| 1 | | 1.329–1.463 |
| 3 | | 1.194–1.328 |
| 60 | | 1.059–1.193 |
| 106 | | 0.924–1.058 |
| 2 | | 0.789–0.923 |
| 0 | | 0.654–0.788 |
| 0 | | 0.519–0.653 |
| 0 | | 0.384–0.518 |
| 0 | | 0.249–0.383 |
| 0 | | 0.114–0.246 |
| 0 | | -0.025–0.113 |
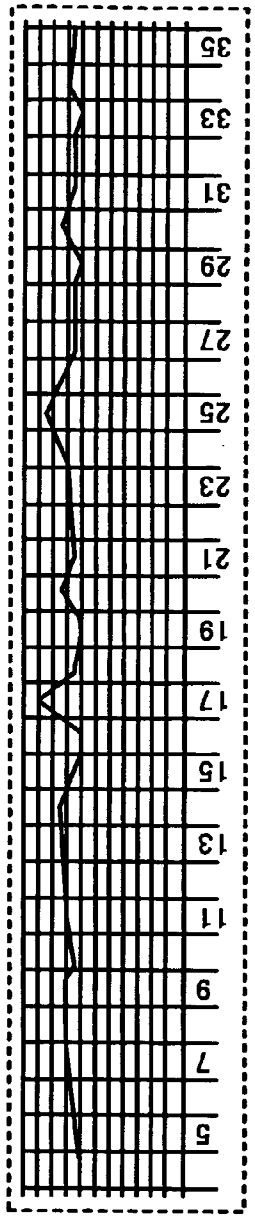
FIG. 51C
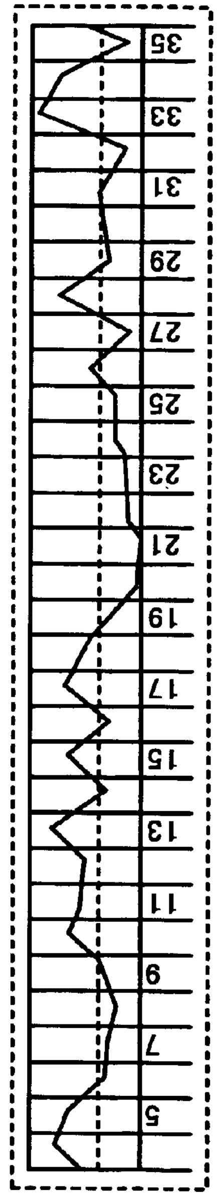
FIG. 51D

FIG. 51E

| NO | ASSEMBLING SERIAL NUMBER | LEFT MEASUREMENT | RIGHT MEASUREMENT | DIFFERENCE BETWEEN LEFT AND RIGHT | MEAN VALUE | R | DATE OF MEASUREMENT | REGISTERED |
|---|---|---|---|---|---|---|---|---|
| 1 | 9807-00579 | 1.031 | 1.024 | .007 | 1.023 | .007 | 980727 | ○ |
| 2 | 9807-00579 | 0.917 | 0.928 | -.011 | 0.923 | .001 | 980727 | ○ |
| 3 | 9807-00579 | 0.993 | 0.969 | .004 | 0.991 | .004 | 980727 | ○ |
| ... | ... | ... | ... | ... | ... | ... | ... | ... |
| ... | ... | ... | ... | ... | ... | ... | ... | ... |
| ... | ... | ... | ... | ... | ... | ... | ... | ... |
| ... | ... | ... | ... | ... | ... | ... | ... | ... |
| ... | ... | ... | ... | ... | ... | ... | ... | ... |
| ... | ... | ... | ... | ... | ... | ... | ... | ... |
| ... | ... | ... | ... | ... | ... | ... | ... | ... |
| ... | ... | ... | ... | ... | ... | ... | ... | ... |
| ... | ... | ... | ... | ... | ... | ... | ... | ... |
| ... | ... | ... | ... | ... | ... | ... | ... | ... |
| ... | ... | ... | ... | ... | ... | ... | ... | ... |

FIG. 51F

| GRAPH RENEWAL | |
|---|---|
| | 11 |
| | 0.135 |
| UPPER LIMIT OF SPECIFICATION | |
| LOWER LIMIT OF SPECIFICATION | |
| MIN | .917 |
| MAX | 1.337 |
| MEAN VALUE | 1.043 |
| R | 42 |
| δ | |
| 3δ | |
| CP | |
| CPK | |

| NO | NAME OF DATA ITEM | TOTAL | GRAPH | RATE(%) | 1H | 2H | 3H | 4H | 5H | 6H | 7H | 1DAY | 2DAY | 3DAY | 4DAY | 5DAY | 6DAY | 7DAY | 8DAY | 9DAY | 10DAY | ??DAY |
|---|---|---|---|---|---|---|---|---|---|---|---|---|---|---|---|---|---|---|---|---|---|---|
| 1 | ALL | 321 | | 100.0 | 4 | | | | | 1 | | 19 | 11 | | 15 | 12 | 9 | 17 | 17 | 16 | 192 | |
| 2 | PARTS | 49 | | 15.26 | | | | | | | | 10 | 5 | | 1 | 2 | 1 | 1 | 3 | 1 | 24 | |
| 3 | ASSEMBLING | 42 | | 13.08 | | | | | | | | | | 2 | 7 | 1 | 2 | 1 | 4 | | 17 | |
| 4 | TECHNOLOGY | 110 | | 34.27 | 2 | | | | | | | | 4 | 3 | 3 | 9 | 5 | 14 | 9 | 6 | 49 | |
| 5 | DESIGN | | | 0.00 | | | | | | | | | | | | | | | | | | |
| 6 | OTHERS | 120 | | 37.38 | 2 | | | | | | | 3 | 1 | 2 | 4 | | 1 | 1 | 2 | 2 | 102 | |

FIG. 55E

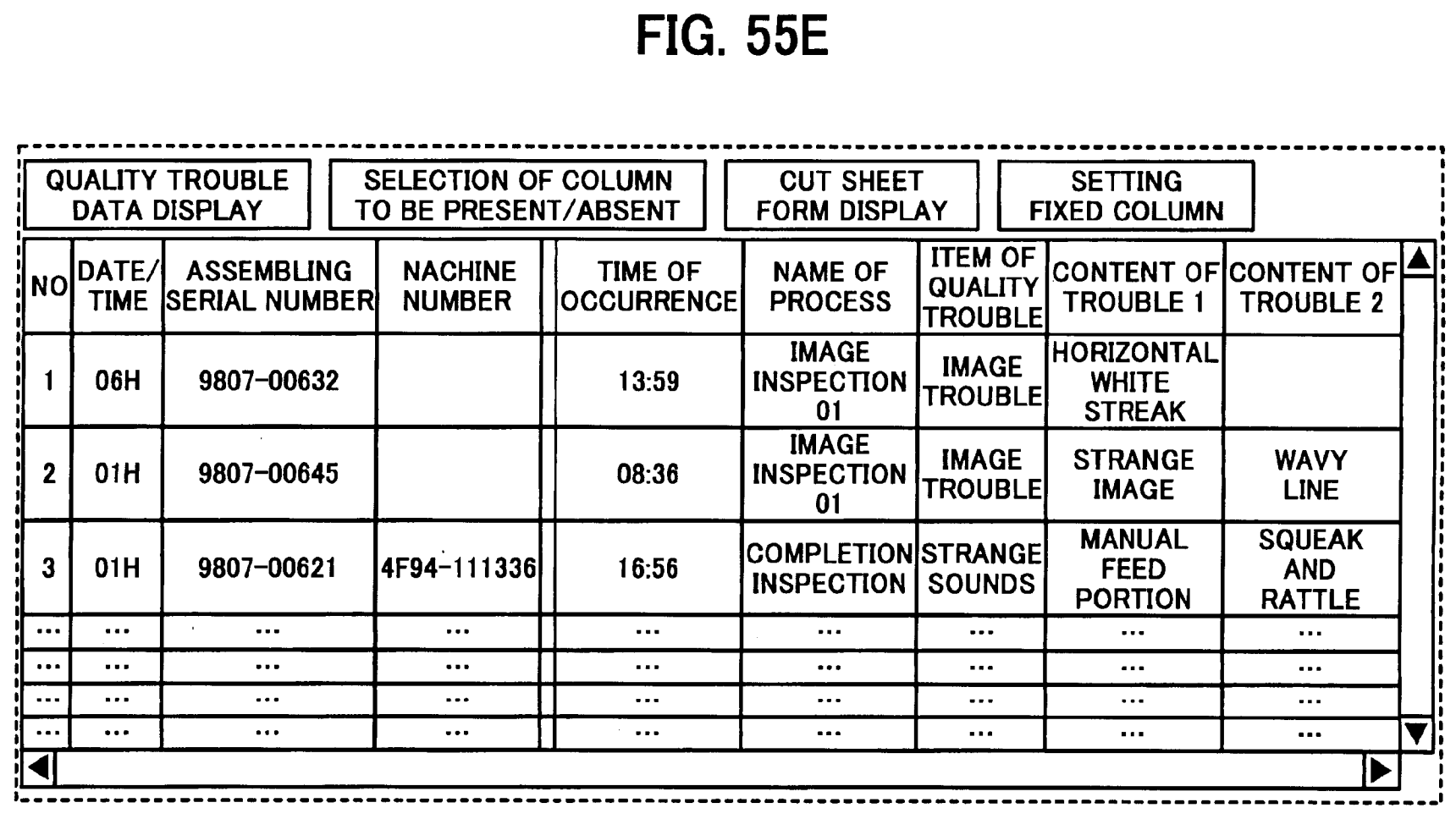

QUALITY TROUBLE DATA DISPLAY | SELECTION OF COLUMN TO BE PRESENT/ABSENT | CUT SHEET FORM DISPLAY | SETTING FIXED COLUMN

| NO | DATE/TIME | ASSEMBLING SERIAL NUMBER | NACHINE NUMBER | TIME OF OCCURRENCE | NAME OF PROCESS | ITEM OF QUALITY TROUBLE | CONTENT OF TROUBLE 1 | CONTENT OF TROUBLE 2 |
|---|---|---|---|---|---|---|---|---|
| 1 | 06H | 9807-00632 | | 13:59 | IMAGE INSPECTION 01 | IMAGE TROUBLE | HORIZONTAL WHITE STREAK | |
| 2 | 01H | 9807-00645 | | 08:36 | IMAGE INSPECTION 01 | IMAGE TROUBLE | STRANGE IMAGE | WAVY LINE |
| 3 | 01H | 9807-00621 | 4F94-111336 | 16:56 | COMPLETION INSPECTION | STRANGE SOUNDS | MANUAL FEED PORTION | SQUEAK AND RATTLE |
| ... | ... | ... | ... | ... | ... | ... | ... | ... |
| ... | ... | ... | ... | ... | ... | ... | ... | ... |
| ... | ... | ... | ... | ... | ... | ... | ... | ... |
| ... | ... | ... | ... | ... | ... | ... | ... | ... |

BASIC WORK OF INSPECTION PROCESS

FIG. 65

PRODUCT ITEM CODE NAME MASTER TABLE 3708a

| KEY | NAME OF ITEM | DATA | | | |
|---|---|---|---|---|---|
| | NUMBER | #01 | #02 | #03 | ··· |
| ◎ | PRODUCT ITEM CODE | A25700 | A25715 | A25717 | ··· |
| | PRODUCT ITEM BREVITY CODE | 3101 | 3B6 | H11 | ··· |
| | PRODUCT NAME | IMAGIOCOLOR 4000 | SAVINSDC 410 | AFICIOCOLOR 6010 | ··· |
| | VOLTAGE PRESENTATION | 100V 50/60HZ | 115V 50/60HZ | 115V 50/60HZ | ··· |
| | PRODUCT ITEM SYMBOL | A | B | C | ··· |

FIG. 66

FACTORY NAME MASTER TABLE 3708b

| KEY | NAME OF ITEM | DATA | | |
|---|---|---|---|---|
| | NUMBER | #01 | #02 | ··· |
| ◎ | FACTORY NAME | GOTEMBA | ATSUGI | ··· |
| | BREVITY CODE | GTB | ATG | ··· |

FIG. 67

FIELD OF PRODUCT MASTER TABLE 3708c

| KEY | NAME OF ITEM | DATA | |
|---|---|---|---|
| ◎ | FIELD OF PRODUCT | PPC | ... |

FIG. 68

STEP OF PRODUCTION MASTER TABLE 3708d

| KEY | NAME OF ITEM | DATA | | |
|---|---|---|---|---|
| | NUMBER | #01 | #02 | ... |
| ◎ | STEP OF PRODUCTION | MASS PRODUCTION | TRIAL MASS PRODUCTION | ... |

FIG. 69

LINE NUMBER MASTER TABLE 3708e

| KEY | NAME OF ITEM | DATA | | |
|---|---|---|---|---|
| ◎ | LINE NUMBER | A8031 | A8511 | ... |

FIG. 70

RANK MASTER TABLE 3708f

| KEY | NAME OF ITEM | DATA | | |
|---|---|---|---|---|
| ◎ | RANK | REQUEST FOR DISCUSSION | ENTREATMENT AS INFORMATION | ... |

FIG. 71

PERSON IN CHARGE FOR INPUT MASTER TABLE 3708g

| KEY | NAME OF ITEM | DATA | | | |
|---|---|---|---|---|---|
| ◎ | EMPLOYEE NUMBER | 091 | 111111 | 123456 | ... |
| | NAME | SAKAI | YAMADA | SUGIYAMA | ... |
| | PASSWORD | 091 | 111111 | 123456 | ... |

FIG. 72

RESPONSIBLE DEPARTMENT MASTER TABLE 3708h

| KEY | NAME OF ITEM | DATA | | | |
|---|---|---|---|---|---|
| ◎ | NUMBER | 01 | 06 | 99 | ··· |
| | RESPONSIBLE DEPARTMENT 1 | TECHNOLOGY | ASSEMBLING | OTHER | ··· |
| | RESPONSIBLE DEPARTMENT 2 | – | N-4: WRITING IN | – | ··· |
| | RESPONSIBLE DEPARTMENT 3 | – | – | – | ··· |

FIG. 73

CONTENT OF REPAIR MASTER TABLE 3708i

| KEY | NAME OF ITEM | DATA | | | |
|---|---|---|---|---|---|
| ◎ | NUMBER | 005 | 018 | 041 | ··· |
| | CONTENT OF REPAIR 1 | OK | SET | SET | ··· |
| | CONTENT OF REPAIR 2 | OK AT REMEASURING | COVER CLAW AFTER DF | POWER CABLE CLAMP OUT | ··· |
| | CONTENT OF REPAIR 3 | – | RH | NO4 | ··· |

FIG. 74

PERSON IN CHARGE FOR UNIT INSPECTION MASTER TABLE 3708j

| KEY | NAME OF ITEM | DATA | | | |
|---|---|---|---|---|---|
| ◎ | NUMBER | 01 | 02 | 03 | ··· |
| | NAME OF PERSON | USHIGOME | DOMOCHI | KATO | ··· |

FIG. 75

REPAIRING STUFF MASTER TABLE 3708k

| KEY | NAME OF ITEM | DATA | | | |
|---|---|---|---|---|---|
| | NUMBER | 01 | 02 | 03 | ··· |
| ◎ | NAME OF PERSON | USHIGOME | HASEGAWA | KATO | ··· |

FIG. 76

PERSON IN CHARGE FOR INSPECTION INSIDE PROCESS MASTER TABLE 3708l

| KEY | NAME OF ITEM | DATA | | | |
|---|---|---|---|---|---|
| | NUMBER | 01 | 02 | 03 | ··· |
| ◎ | NAME OF PERSON | SHIRASAKA | DOMOCHI | KATO | ··· |

FIG. 77

PERSON IN CHARGE FOR CORRECTIVE ACTION MASTER TABLE 3708m

| KEY | NAME OF ITEM | DATA | | |
|---|---|---|---|---|
| | NUMBER | 01 | 02 | ... |
| ◎ | NAME OF PERSON | USHIGOME | ASANO | ... |

FIG. 78

WORK SETTING FOR EVERY PRODUCTION PROCESS MASTER TABLE 3708n

| KEY | NAME OF ITEM | DATA | | | |
|---|---|---|---|---|---|
| ◎ | NUMBER | 01 | 43 | 45 | ... |
| | NAME OF PROCESS | BODY ASSEMBLING 01 | MECHANICAL INSPECTION 02 | ELECTRICAL INSPECTION 01 | ... |
| | DISPLAY PROCESS | BODY ASSEMBLING 01 | MECHANICAL INSPECTION 02 | ELECTRICAL INSPECTION 01 | ... |
| | PERSON IN CHARGE FOR INSPECTION | OHTA | MATSUMOTO | IWATA | ... |
| | TAB CONTROL | START | INSPECTION SHEET | INSPECTION SHEET + UNIT | ... |

FIG. 79

ALARM RECEIVER MASTER TABLE 3708o

| KEY | NAME OF ITEM | DATA | | | |
|---|---|---|---|---|---|
| | NUMBER | 001 | 029 | 041 | ... |
| | RESPONSIBLE DEPARTMENT 1 | ASSEMBLING | ASSEMBLING | ASSEMBLING | ... |
| | RESPONSIBLE DEPARTMENT 2 | A-4: AIO | P-5: 3 GROUP | T-4 FIXING | ... |
| | RESPONSIBLE DEPARTMENT 3 | - | - | 3G | ... |
| | NOTES ID | MISAKO KATSUMATA/ /R/RICOH | TSUTOM USHIGOME/ /R/RICOH | EIJIROH KATUSKI/ RICOH | ... |
| | KIND OF DISPATCH | TO | CC | CC | ... |

FIG. 80

INSPECTION SHEET ITEM MASTER TABLE 3708p

| KEY | NAME OF ITEM | DATA | | | |
|---|---|---|---|---|---|
| ◎ | PRODUCT ITEM CODE | A25000 | A25000 | A25000 | ... |
| ◎ | NUMBER | 02 | 03 | 04 | ... |
| ◎ | NAME OF PROCESS | MECHANICAL INSPECTION 02 | MECHANICAL INSPECTION 02 | MECHANICAL INSPECTION 02 | ... |
| | INSPECTION ITEM | FALLING OBJECT | ATTACHED WITH SCREW | CONFIRMATION OF WIRING | ... |
| | STANDARD | NOTHING | NO FLOATING | NO ERROR IN WIRING | ... |
| | TYPE OF INPUT | 2 | 2 | 2 | ... |

FIG. 81

UNIT NAME MASTER TABLE 3708q

| KEY | NAME OF ITEM | DATA | | | |
|---|---|---|---|---|---|
| ◎ | UNIT NUMBER | 1 | 2 | 3 | ··· |
| ◎ | UNIT SYMBOL | A | A | A | ··· |
| ◎ | UNIT NAME | OPERATION PORTION | OPERATION PORTION | OPERATION PORTION | ··· |
| ◎ | UNIT CLASSIFICATION | 01 | 02 | 03 | ··· |
| ◎ | PRODUCT ITEM CODE | A25000 | A28000 | A28100 | ··· |
| | UNIT PRODUCT ITEM CODE | A250.11 | A250.11 | A250.11 | ··· |
| | UNIT INSPECTION SHEET PRESENT OR ABSENT | PRESENT | ABSENT | PRESENT | ··· |

FIG. 82

PRODUCT ITEM NAME MASTER TABLE 3708r

| KEY | NAME OF ITEM | DATA | | |
|---|---|---|---|---|
| ◎ | PRODUCT ITEM NAME | | | ... |
| | FIELD OF PRODUCT | PPC | PPC | ... |
| | PRODUCTION SITE | GTB | GTB | ... |
| | DATE OF PRODUCTION BEGIN | 2000.01.01 | 2000.01.01 | ... |
| | SERVER NAME | PRQ GTB1 | PRQ GTB1 | ... |
| | ID ADDRESS | 133.139.104.147 | 133.139.104.147 | ... |
| | DB NAME | | | ... |
| | HEAD NO FLG | * | - | ... |
| | MAIL DISPATCH | * | - | ... |

FIG. 83

ALARM CONTROL MASTER TABLE 3708s

| KEY | NAME OF ITEM | DATA | |
|---|---|---|---|
| ◎ | CLASSIFICATION OF MANAGEMENT | A003 | ... |
| ◎ | ORGANIZATION | A003G | ... |
| | TARGET VALUE | 0 | ... |
| | ALARM VALUE | 2 | ... |

| |
|---|
| FIG. 84A |
| FIG. 84B |

ALARM CONTROL MASTER TABLE 3708t

| KEY | NAME OF ITEM | DATA | | | |
|---|---|---|---|---|---|
| ◎ | NUMBER | 02 | 03 | 04 | ··· |
| ◎ | CLASSIFICATION OF MANAGEMENT | IMPORTANT | – | RECURRENCE | ··· |
| | CLASSIFICATION OF TROUBLE | SAFETY SPECIFICATION | – | – | ··· |
| | NAME OF PROCESS | ELECTRICAL INSPECTION 01 | – | – | ··· |
| | ITEM OF TROUBLE | SAFETY SPECIFICATION | CAULKING TROUBLE | ROUND S TROUBLE | ··· |
| | CONTENT OF TROUBLE 1 | DAMAGE BY HEAT | – | – | ··· |
| | CONTENT OF TROUBLE 2 | IC2 | – | – | ··· |
| | CONTENT OF TROUBLE 3 | BEING TORRID | – | – | ··· |
| | OUT OF LINE | – | OUT OF LINE | – | ··· |
| | SOMETHING STRANGE | – | * | – | ··· |
| | RANK | – | REQUEST DISCUSSION | – | ··· |
| | RESPONSIBLE DEPARTMENT 1 | TECHNOLOGY | PARTS | PARTS | ··· |
| | RESPONSIBLE DEPARTMENT 2 | – | – | – | ··· |
| | RESPONSIBLE DEPARTMENT 3 | – | – | – | ··· |
| | NO RECURRENCE | * | – | – | ··· |

FIG. 84B

| | | | | | |
|---|---|---|---|---|---|
| | CAUSE OF TROUBLE | | – | – | ... |
| | CONTENT OF REPAIR 1 | EXCHANGE | – | – | ... |
| | CONTENT OF REPAIR 2 | BICU | – | – | ... |
| | CONTENT OF REPAIR 3 | SERIAL NUMBER 001205 | – | – | ... |
| | REPAIRING STUFF | TANAKA | – | – | ... |
| | CONTENT OF RECURRENCE PREVENTION | THOROUGHNESS OF PARTS CHECK | – | – | ... |
| | PERSON IN CHARGE FOR CORRECTIVE | YAMAGUCHI | – | – | ... |
| | ALARM VALUE | 1* | 1* | 1* | ... |
| | RESULT OF ALARM | 000707 7 | 000707 7 | 000707 7 | ... |
| | TIME OF ALARM | 10:15 | 12:30 | 09:28 | ... |
| | DATE OF MAIL DISPATCH | 000707 7 10:15 | 000707 7 12:30 | 000707 7 09:28 | ... |

FIG. 85

CONTENT OF QUALITY TROUBLE MASTER TABLE 3708u

| KEY | NAME OF ITEM | DATA | | | |
|---|---|---|---|---|---|
| ◎ | NAME OF PRODUCTION ITEM | | | | ... |
| ◎ | NAME OF PRECESS | MECHANICAL INSPECTION 01 | IMAGE INSPECTION 01 | IMAGE INSPECTION 02 | ... |
| ◎ | NUMBER | 0043 | 0054 | 0055 | ... |
| ◎ | ITEM OF TROUBLE | TROUBLE OF SC | TROUBLE OF IMAGE | TROUBLE IF IMAGE | ... |
| | CONTENT OF TROUBLE 1 | SC2001 | FALLING TONER | POCKING | ... |
| | CONTENT OF TROUBLE 2 | PRINTER ERROR | A3 | WHITE POCKING | ... |
| | CONTENT OF TROUBLE 3 | – | 200% | RIGHT 100% | ... |

FIG. 86

UNIT INSPECTION SHEET ITEM MASTER TABLE 3708v

| KEY | NAME OF ITEM | DATA | | | |
|---|---|---|---|---|---|
| ◎ | UNIT SYMBOL | K | S | S | ... |
| ◎ | CLASSIFICATION OF UNIT | 24 | 01 | 02 | ... |
| | NUMBER | 01 | 01 | 01 | ... |
| | CLASSIFICATION | WRITING UNIT | SCANNER | SCANNER | ... |
| | ITEM OF INSPECTION | CONFIRMATION OF LENS MIRROR | CONFIRMATION OF FLAME DRIVING AND ASSEMBLING | PAINTING ACURIDE GREASE | ... |
| | STANDARD | THERE ARE NO SCRATCH, STAIN AND DUST | 1.THERE ARE NO SCREW MISSING AND PARTS FLOATING | 1.THERE ARE NO FORGETTING PAINTING AND FLUSH OVER | ... |
| | METHOD OF INSPECTION | VISUAL INSPECTION | HAND | VISUAL INSPECTION | ... |

FIG. 87

INSPECTION SHEET DATA TABLE 3709a

| KEY | NAME OF ITEM | DATA | | | |
|---|---|---|---|---|---|
| ◎ | ASSEMBLING SERIAL NUMBER | 200004-00003 | 200004-00003 | 200004-00003 | ... |
| ◎ | PRODUCT ITEM CODE | A25019 | A25019 | A25019 | ... |
| ◎ | JOINT INSPECTION SHEET | 1 | 1 | 1 | ... |
| ◎ | NUMBER | 01 | 02 | 03 | ... |
| ◎ | STEP OF PRODUCTION | MASS PRODUCTION | MASS PRODUCTION | MASS PRODUCTION | ... |
| | NAME OF PROCESS | MECHANICAL INSPECTION 02 | MECHANICAL INSPECTION 02 | MECHANICAL INSPECTION 02 | ... |
| | ITEM OF INSPECTION | MISSING PARTS | FALLING OBJECT | SCREW ATTACHING | ... |
| | STANDARD | NOTHING | NOTHING | NO FLOATING PASSED | ... |
| | JUDGMENT COMPLETION | PASSED | PASSED | PASSED | ... |
| | SIGN OF RE-INSPECTION | YAMAGUCHI | YAMAGUCHI | - | ... |
| | TYPE OF INPUT | 2 | 2 | 2 | ... |

FIG. 88

HISTORY OF REVISION OF INSPECTION SHEET DATA TABLE 3709b

| KEY | NAME OF ITEM | DATA | |
|---|---|---|---|
| ◎ | PRODUCT ITEM CODE | A25700 | ... |
| ◎ | NUMBER | 01 | ... |
| | ITEM | MECHANICAL INSPECTION | ... |
| | CONTENT | MISSING PARTS | ... |
| | DATE OF MAKE | 20000416 | ... |
| | DATE OF EDITING | 20000417 | ... |
| | REORGANIZATION | KATO | ... |

FIG. 89

UNIT CONTROL NUMBER DATA TABLE 3709c

| KEY | NAME OF ITEM | DATA | | | |
|---|---|---|---|---|---|
| ◎ | ASSEMBLING SERIAL NUMBER | 200001-000034 | 200001-000034 | 200001-000034 | ... |
| ◎ | PRODUCT ITEM CODE | A25022 | A25022 | A25022 | ... |
| ◎ | UNIT NUMBER | 52 | 61 | 91 | ... |
| ◎ | UNIT SYMBOL | A | K | T | ... |
| ◎ | CLASSIFICATION OF UNIT | 12 | 24 | 12 | ... |
| ◎ | STEP OF PRODUCTION | MASS PRODUCTION | MASS PRODUCTION | MASS PRODUCTION | ... |
| | UNIT NAME | OPERATION PORTION | WRITING UNIT | FIXING UNIT | ... |
| | UNIT CONTROL NUMBER | A25022000A | A25022000S | A250220001T 00034 | ... |

MAIN DATA TABLE 3709d

| KEY | NAME OF ITEM | DATA | | | |
|---|---|---|---|---|---|
| | NAME OF FACTORY | GOTEMBA | GOTEMBA | GOTEMBA | ... |
| | FIELD OF PRODUCT | PPC | PPC | PPC | ... |
| | PRODUCT ITEM NAME | STRINGERC1 | STRINGERC1 | STRINGERC1 | ... |
| ◎ | STEP OF PRODUCTION | MASS PRODUCTION | MASS PRODUCTION | MASS PRODUCTION | ... |
| | LINE NUMBER | A8031 | A8031 | A8031 | ... |
| ◎ | PRODUCT ITEM CODE | A29100 | A29100 | B00115 | ... |
| ◎ | ASSEMBLING SERIAL NUMBER | 200001-00099 | 200001-00829 | 200002-00041 | ... |
| | MACHINE NUMBER | 3124-126011 | 3124-126931 | H4300200102 | ... |
| | DATE OF ASSEMBLING BEGIN | 20000417 | 20000420 | 2000324 | ... |
| | TIME OF ASSEMBLING BEGIN | 08:45 | 08:56 | 15:14 | ... |
| | DATE OF COMPLETION | 20000417 | 20000424 | 20000324 | ... |
| | TIME OF COMPLETION | 09:33 | 15:00 | 16:27 | ... |
| | LINE OUT FLAG | 1 | 2 | 3 | ... |
| | PROCESS INPUT HOLDING FLAG | – | * | * | ... |
| | PRODUCTION INSPECTION INPUT HOLDING FLAG | * | – | – | ... |

FIG. 90B

| | | | | | |
|---|---|---|---|---|---|
| | PRODUCTION INSPECTION SAMPLING FLAG | – | * | – | ... |
| | OCCURRENCE IN MARKET FLAG | – | – | – | ... |
| | DATE OF INPUT | 20000417 | 20000420 | 20000324 | ... |
| | COUNT OF TROUBLE | – | 01 | 01 | ... |
| | COUNT OF SOMETHING STRANGE | 01 | 02 | 01 | ... |
| | COUNT OF NO RECURRENCE | – | – | 01 | ... |
| | COUNT OF RE-INSPECTION | 01 | 02 | 03 | ... |
| | COUNT OF ENTREATMENT AS INFORMATION | 01 | 02 | 01 | ... |
| | REMARKS | MEMO | THERE IS CHANGE IN SUFFIX FROM A TO B | THERE IS CHANGE IN JIG | ... |
| | LATEST DATE OF REVISION | 00041/9:33:50 | 000420/8:57:43 | 7 | ... |

FIG. 91A

| FIG. 91 | |
|---|---|
| | FIG. 91A |
| | FIG. 91B |

TROUBLE INSIDE PROCESS DATA TABLE 3709f

| KEY | NAME OF ITEM | DATA | | | |
|---|---|---|---|---|---|
| | NAME OF FACTORY | GOTEMBA | GOTEMBA | GOTEMBA | .. |
| | FIELD OF PRODUCT | PPC | PPC | PPC | .. |
| | PRODUCT ITEM NAME | STRINGERC1 | STRINGERC1 | STRINGERC1 | .. |
| ◎ | STEP OF PRODUCTION | MASS PRODUCTION | MASS PRODUCTION | MASS PRODUCTION | .. |
| | LINE NUMBER | A8031 | A8031 | A8031 | .. |
| ◎ | PRODUCT ITEM CODE | A29100 | B00115 | B00115 | .. |
| ◎ | ASSEMBLING SERIAL NUMBER | 200001-00829 | 200002-00041 | 200002-00041 | .. |
| ◎ | TROUBLE SERIAL NUMBER | 01 | 01 | 02 | .. |
| | MACHINE NUMBER | H4300200111 | H4300200102 | H4300200102 | .. |
| | CLASSIFICATION OF TROUBLE | – | SAFETY SPECIFICATION NOT GOOD | – | .. |
| | COUNT OF RE-INSPECTION | – | 01 | – | .. |
| | DATE OF OCCURRENCE | 20000420 | 20000324 | 20000324 | .. |
| | TIME OF OCCURRENCE | 08:57 | 15:14 | 16:15 | .. |
| | NAME OF PROCESS | MECHANICAL INSPECTION 02 | IMAGE INSPECTION 02 | IMAGE INSPECTION 01 | .. |
| | ITEM OF TROUBLE | DISPLAY TROUBLE | SOUND TROUBLE | IMAGE TROUBLE | .. |
| | CONTENT OF TROUBLE 1 | NO DISPLAY IN A3 | NOISY OPERATING SOUND | VERTICAL WHITE STREAK | .. |
| | CONTENT OF TROUBLE 2 | – | – | J | .. |
| | CONTENT OF TROUBLE 3 | – | – | – | .. |

FIG. 91B

| | | | | | |
|---|---|---|---|---|---|
| | OUT OF LINE | – | 1 | 1 | .. |
| | SOMETHING STRANGE | – | * | * | .. |
| | RANK | – | – | – | .. |
| | RESPONSIBLE 1 | OTHER | PARTS | OTHER | .. |
| | RESPONSIBLE 2 | – | – | – | .. |
| | RESPONSIBLE 3 | – | – | – | .. |
| | NO REOCCURRENCE | – | – | * | .. |
| | CAUSE OF TROUBLE | – | – | – | .. |
| | CONTENT OF REPAIR 1 | EXCHANGE | EXCHANGE | EXCHANGE | .. |
| | CONTENT OF REPAIR 2 | PRINTER BOARD | HOUSING DRIVING | HOUSING DRIVING | .. |
| | CONTENT OF REPAIR 3 | – | – | – | .. |
| | DATE OF REPAIR | 20000420 | 20000324 | 20000324 | .. |
| | TIME OF REPAIR | – | – | – | .. |
| | REPAIRING STUFF | KATO | MOCHIDA | SUGIMOTO | .. |
| | CONTENT OF REOCCURRENCE PREVENTION | REVISION OF PROCEDURE | – | – | .. |
| | DATE OF CORRECTIVE | 20000705 | – | – | .. |
| | TIME OF CORRECTIVE | 15:30 | – | – | .. |
| | PERSON IN CHARGE FOR CORRECTIVE ACTION | TANAKA | – | – | .. |
| | LATEST DATE OF REVISION | 000420/ 8:57:44 | 000324/ 16:27:37 | 000324/ 16:27:37 | .. |
| | MAIL DISPATCH FLAG | 1 | – | – | .. |

MAIL DISPATCH [1] FLAG: DISPATCHED OBJECT
MAIL DISPATCH [2] FLAG: DISPATCHED

FIG. 92

TROUBLE OUTSIDE PROCESS DATA TABLE 3709g

| KEY | NAME OF ITEM | DATA | |
|---|---|---|---|
| | NAME OF FACTORY | GOTEMBA | ··· |
| | FIELD OF PRODUCT | PPC | ··· |
| | PRODUCT ITEM NAME | STINGERC1 | ··· |
| ◎ | STEP OF PRODUCTION | MASS PRODUCTION | ··· |
| ◎ | CONTROL NUMBER | – | ··· |
| ◎ | TROUBLE SERIAL NUMBER | 01 | ··· |
| | COUNT OF RE-INSPECTION | – | ··· |
| | DATE OF OCCURRENCE | 20000630 | ··· |
| | TIME OF OCCURRENCE | 01:30 | ··· |
| | NAME OF UNIT | – | ··· |
| | ITEM OF TROUBLE | DISPLAY TROUBLE | ··· |
| | CONTENT OF TROUBLE 1 | NO DISPLAY IN A3 | ··· |
| | CONTENT OF TROUBLE 2 | – | ··· |
| | CONTENT OF TROUBLE 3 | – | ··· |
| | OUT OF LINE | – | ··· |
| | SOMETHING STRANGE | – | ··· |
| | RANK | – | ··· |
| | RESPONSIBLE DEPARTMENT 1 | OTHER | ··· |
| | RESPONSIBLE DEPARTMENT 2 | – | ··· |
| | NO REOCCURRENCE | – | ··· |
| | CAUSE OF TROUBLE | – | ··· |
| | CONTENT OF REPAIR 1 | EXCHANGE | ··· |
| | CONTENT OF REPAIR 2 | PRINTER BOARD | ··· |
| | DATE OF REPAIR | 20000703 | ··· |
| | TIME OF REPAIR | – | ··· |
| | REPAIRING STUFF | KATO | ··· |
| | CONTENT OF REOCCURRENCE PREVENTION | REVISION OF PROCEDURE MANUAL | ··· |
| | DATE OF CORRECTIVE ACTION | 20000710 | ··· |
| | TIME OF CORRECTIVE ACTION | 15:30 | ··· |
| | PERSON IN CHARGE FOR CORRECTIVE ACTION | TANAKA | ··· |
| | LATEST DATE OF REVISION | – | ··· |

FIG. 93

UNIT MAIN DATA TABLE 3709e

| KEY | NAME OF ITEM | DATA | | | |
|---|---|---|---|---|---|
| | NAME OF FACTORY | GOTEMBA | GOTEMBA | GOTEMBA | ... |
| | FIELD OF PRODUCT | PPC | PPC | PPC | ... |
| | PRODUCT ITEM NAME | | | | ... |
| ◎ | STEP OF PRODUCTION | MASS PRODUCTION | MASS PRODUCTION | MASS PRODUCTION | ... |
| ◎ | UNIT SYMBOL | T | T | T | ... |
| ◎ | CLASSIFICATION OF UNIT | 01 | 01 | 01 | ... |
| ◎ | UNIT CONTROL NUMBER | A250000001T00001 | A250000001T00002 | A250000001T00003 | ... |
| ◎ | NAME OF UNIT | FIXING UNIT | FIXING UNIT | FIXING UNIT | ... |
| | DATE OF ASSEMBLING BEGIN | 20000124 | 20000124 | 20000124 | ... |
| | TIME OF ASSEMBLING BEGIN | 11:06 | 11:07 | 11:08 | ... |
| | DATE OF COMPLETION | 20000124 | 20000124 | 20000124 | ... |
| | TIME OF COMPLETION | 11:06 | 11:07 | 11:08 | ... |
| | DATE OF INPUT | 20000124 | 20000124 | 20000124 | ... |
| | COUNT OF TROUBLE | 01 | 02 | 03 | ... |
| | COUNT OF SOMETHING STRANGE | 01 | 02 | 03 | ... |
| | COUNT OF NO REOCCURRENCE | 01 | 02 | 03 | ... |
| | COUNT OF RE-INSPECTION | 01 | 02 | 03 | ... |
| | DATE AND TIME OF LATEST REVISION | 000124/11:06:03 | 000124/11:07:38 | 000124/11:08:37 | ... |

FIG. 94

UNIT INSPECTION SHEET DATA TABLE 3709j

| KEY | NAME OF ITEM | DATA | | | |
|---|---|---|---|---|---|
| ◎ | UNIT CONTROL NUMBER | A250000001T00001 | A250000001T00001 | A250000001T00001 | ... |
| ◎ | UNIT SYMBOL | T | T | T | ... |
| ◎ | CLASSIFICATION OF UNIT | 01 | 01 | 01 | ... |
| ◎ | STEP OF PRODUCTION | MASS PRODUCTION | MASS PRODUCTION | MASS PRODUCTION | ... |
| ◎ | NUMBER | 01 | 02 | 03 | ... |
| | CLASSIFICATION | FIXING UNIT | FIXING UNIT | FIXING UNIT | ... |
| | ITEM OF INSPECTION | CONFIRMATION OF DIFFERENCE BETWEEN PRODUCTS OF DIFFERENT FIXING | CONFIRMATION OF DIFFERENCE BETWEEN PRODUCTS OF DIFFERENT INFRARED | CONFIRMATION OF DIFFERENCE BETWEEN PRODUCTS OF DIFFERENT ABOLISHED | ... |
| | STANDARD | FIXING ROLLER MUST HAVE ENGRAVED MARK | "RED ENGRAVED MARK FOR DOMESTIC (120V), BLACK ENGRAVED MARK FOR INTERNATIONAL" | RADIUS OF ROLLERS ARE SMALLER AT TWO PORTIONS OF INNER SIDE | ... |
| | METHOD OF INSPECTION | VISUAL OBSERVATION | VISUAL OBSERVATION | VISUAL OBSERVATION | ... |
| | JUDGMENT | 1 | 1 | 1 | ... |
| | SIGN FOR RE-INSPECTION | TANAKA | WATANABE | YAMAGUCHI | ... |

FIG. 95

UNIT INSPECTION SHEET DATA TABLE 3709j

| KEY | NAME OF ITEM | DATA | | | |
|---|---|---|---|---|---|
| ◎ | UNIT CONTROL NUMBER | A250000001T00001 | A250000001T00002 | A250000001T00003 | ... |
| ◎ | UNIT SYMBOL | T | T | T | ... |
| ◎ | CLASSIFICATION OF UNIT | 01 | 01 | 01 | ... |
| ◎ | STEP OF PRODUCTION | MASS PRODUCTION | MASS PRODUCTION | MASS PRODUCTION | ... |
| | NAME OF UNIT | FIXING UNIT | FIXING UNIT | FIXING UNIT | ... |
| | DATE OF INSPECTION | 20000124 | 20000124 | 20000124 | ... |
| | TIME OF INSPECTION | 11:06 | 11:07 | 11:08 | ... |
| | SIGN FOR RE-INSPECTION | TANAKA | TANAKA | WATANABE | ... |
| | SIGN FOR PASSED | KASAI | KASAI | KASAI | ... |

FIG. 109

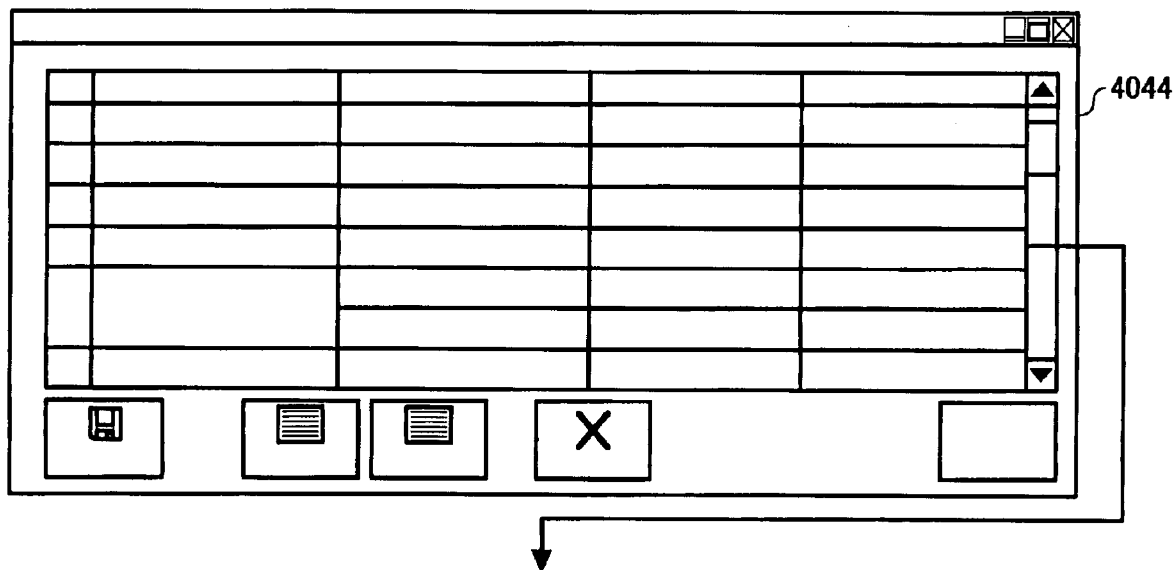

4050

| NO | NAME OF PROCESS | DISPLAY PROCESS | SPECIFICATION | SIGN OF JUDGE/ COMPLETION | SIGN FOR INSPECTION AGAIN |
|---|---|---|---|---|---|
| 01 | MECHANICAL INSPECTION 02 | MISSING PARTS | NOTHING PASSED | PASSED | |
| 02 | | FALLING OBJECT | NOTHING PASSED | PASSED | |
| 03 | | SCREW ATTACHMENT | NO FLOATING | PASSED | |
| 04 | | CONFIRMATION OF WIRING | NO MISS WIRING | PASSED | |
| 05 | | CN SET STATUS | NO FLOATING, UN SET | PASSED | |
| 06 | | APPEARANCE(SCRATCH STAIN) | NOTHING PASSED | NO | |
| 07 | | APPEARANCE(CHANGE COLOUR, DIFFERENT COLOUR) | NOTHING PASSED | PASSED | |
| 08 | | | | ONO | |

FIG. 110

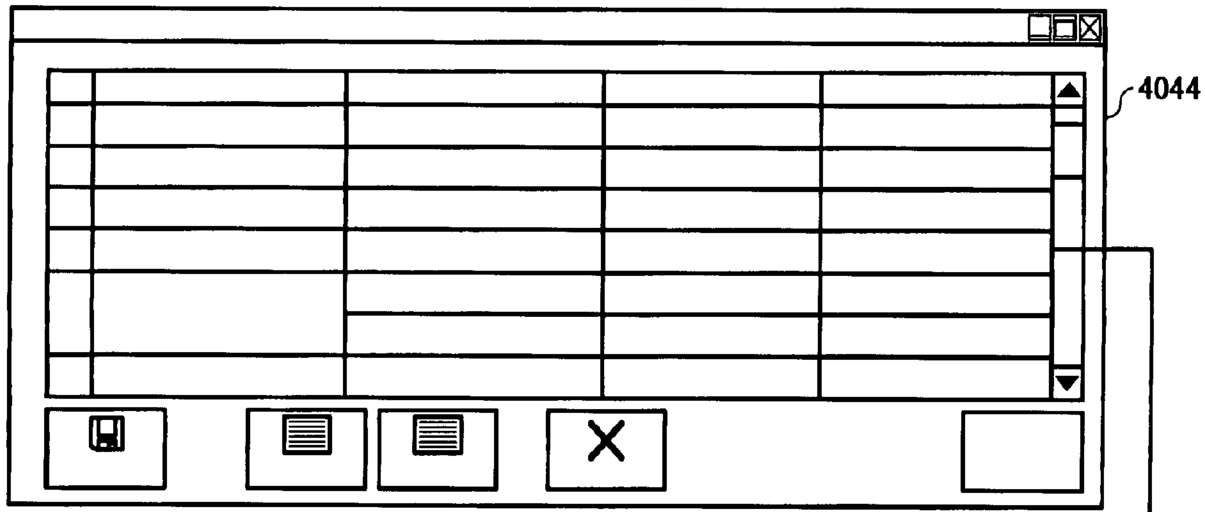

4050

| NO | NAME OF PROCESS | DISPLAY PROCESS | SPECIFICATION | SIGN OF JUDGE/ COMPLETION | SIGN FOR INSPECTION AGAIN |
|---|---|---|---|---|---|
| 01 | ELECTRICAL INSPECTION 02 | TONER END DETECTION | FLUSHING PASSED | PASSED | |
| 02 | | JIG AIO SET | NO DISPLAY OF SET PLEASE | PASSED | |
| 03 | | LED IN 1 BIN RIGHT ON | LIGHT ON AT 2 PORTIONS | PASSED | |
| 04 | | LEAK CURRENT | LESS THAN 1.0mA | PASSED | |
| 05 | | | | DOMOCHI | |
| 06 | ELECTRICAL INSPECTION 03 | LOOP BACK 1 BIN | MUST BE OK | PASSED | |
| 07 | | LOOP BACK 1DF | MUST BE OK | PASSED | |
| 08 | | LOOP BACK 1 PUNK | MUST BE OK | PASSED | |
| 09 | | | | KOBAYASHI | |

| NAME OF UNIT | CONTROL NUMBER |
|---|---|
| OPERATING STATION | |
| WRITING-IN UNIT | |
| SCANNER | |
| FIXER AIO | |
| FIXER AIO C | |
| SETTLEMENT UNIT | |
| SCANNER CCD | |
| DF | |

FIG. 113B

| | | | | | | |
|---|---|---|---|---|---|---|
| | | | | | | |
| DATE OF INSPECTION | 000606 | | | | | |
| TIME OF INSPECTION | 17:49 | | | | | |
| | | | | | | |
| NO | CLASSI-FICATION | ITEM OF INSPECTION | STANDARD | INSPECTION METHOD | JUDGMENT | RE-INSPECTION |
| 01 | WRITING UNIT | CONFIRMATION OF LENS MIRROR | NO SCRATCH/ STAIN/DUST | | PASSED | |
| 02 | | CONFIRMATION OF PRESSER BAR FOR LENS | FLOATING,BENDING, MISSING PARTS, OUT OF SPEC | | PASSED | |
| 03 | | CONFIRMATION OF SETTING CONDITION OF POLYGON LD | NO FLOATING, UNSET OF CONNECTOR | | PASSED | |
| 04 | | CONFIRMATION OF VALUES OF CHARACTERISTICS BY CHECKER | MUST BE WITHIN THE SPEC | | PASSED | |
| 05 | | CONFIRMATION OF APPEARANCE OF UNIT | NO FLOATING, MISSING PARTS | | PASSED | |

FIG. 118A
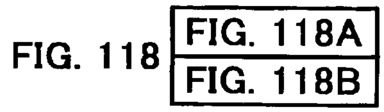
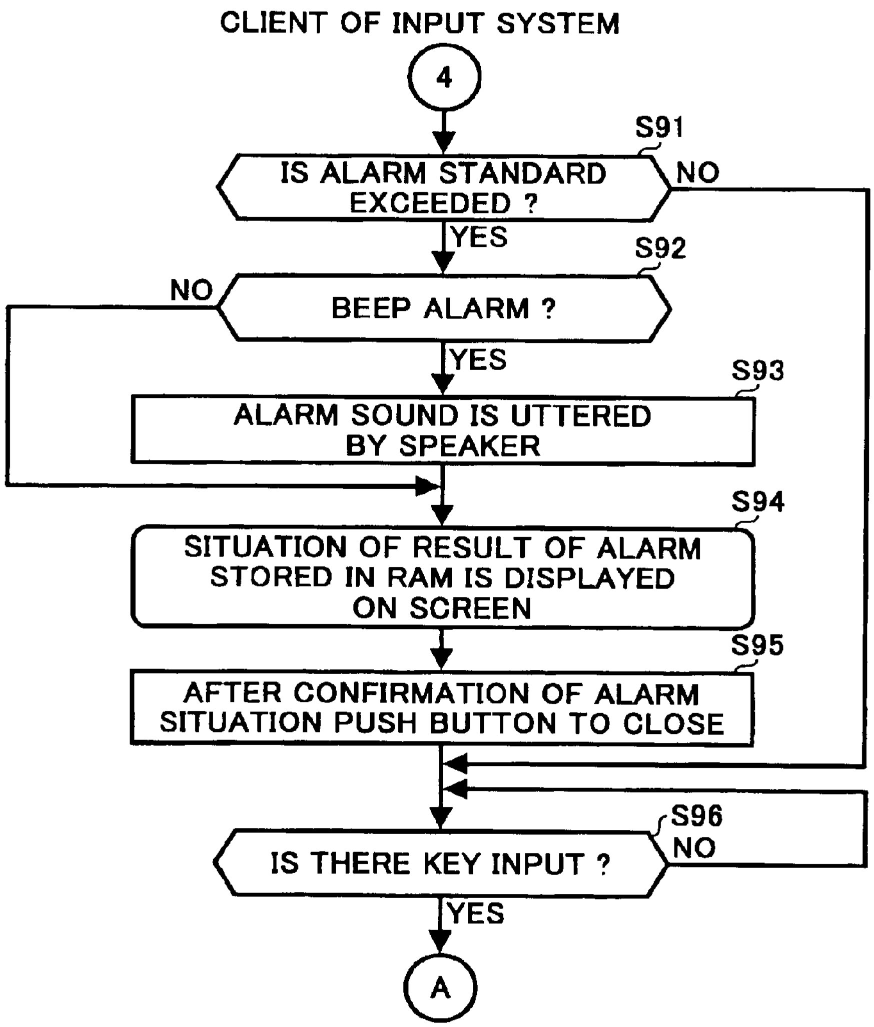

FIG. 125B

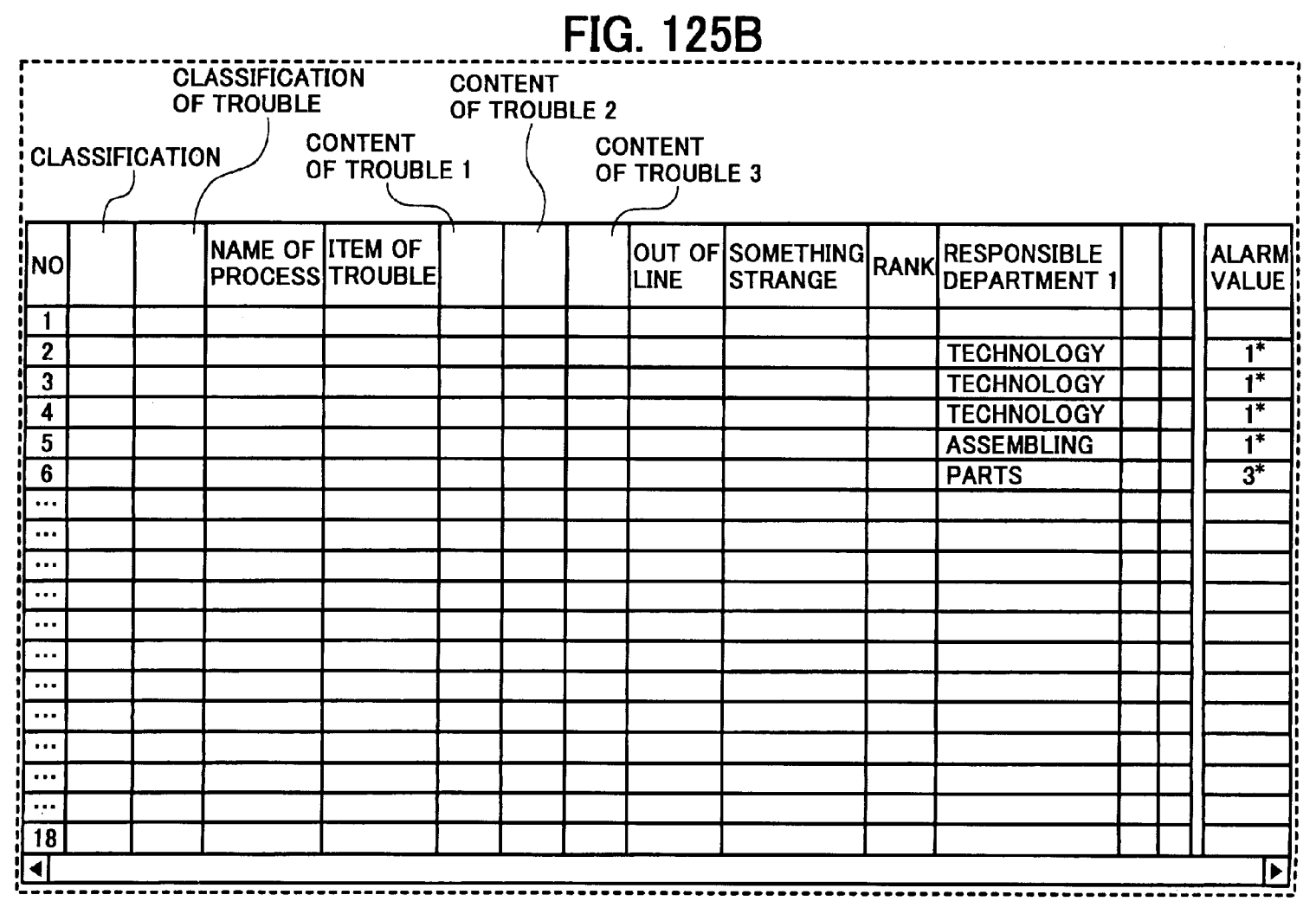

CLASSIFICATION
CLASSIFICATION OF TROUBLE
CONTENT OF TROUBLE 1
CONTENT OF TROUBLE 2
CONTENT OF TROUBLE 3

| NO | | | NAME OF PROCESS | ITEM OF TROUBLE | | | | OUT OF LINE | SOMETHING STRANGE | RANK | RESPONSIBLE DEPARTMENT 1 | | | ALARM VALUE |
|---|---|---|---|---|---|---|---|---|---|---|---|---|---|---|
| 1 | | | | | | | | | | | | | | |
| 2 | | | | | | | | | | | TECHNOLOGY | | | 1* |
| 3 | | | | | | | | | | | TECHNOLOGY | | | 1* |
| 4 | | | | | | | | | | | TECHNOLOGY | | | 1* |
| 5 | | | | | | | | | | | ASSEMBLING | | | 1* |
| 6 | | | | | | | | | | | PARTS | | | 3* |
| ... | | | | | | | | | | | | | | |
| ... | | | | | | | | | | | | | | |
| ... | | | | | | | | | | | | | | |
| ... | | | | | | | | | | | | | | |
| ... | | | | | | | | | | | | | | |
| ... | | | | | | | | | | | | | | |
| ... | | | | | | | | | | | | | | |
| ... | | | | | | | | | | | | | | |
| ... | | | | | | | | | | | | | | |
| ... | | | | | | | | | | | | | | |
| ... | | | | | | | | | | | | | | |
| 18 | | | | | | | | | | | | | | |

| NO | NAME OF DATA ITEMS | TOTAL | GRAPH | RATE(%) | 8 | 9 | 10 | 11 | 12 | 13 | 14 | 15 | 16 | 17 | 18 | 19 | 20- | |
|---|---|---|---|---|---|---|---|---|---|---|---|---|---|---|---|---|---|---|
| 1 | AMOUNT OF COMPLETION | 40 | | 100.0 | 2 | 5 | 4 | 5 | 2 | 5 | 5 | 4 | 7 | 1 | | | | |
| 2 | AMOUNT OF NO DEFECT | 21 | | 52.5 | 1 | 2 | 2 | 2 | 1 | 3 | 4 | 3 | 2 | 1 | | | | |
| 3 | AMOUNT OF DEFECT | 27 | | 67.5 | 2 | 4 | 2 | 3 | 2 | 2 | 2 | 1 | 9 | | | | | |
| 4 | RATE OF NO DEFECT | 52.50 | | 52.5 | 50.0 | 40.0 | 50.0 | 40.0 | 50.0 | 60.0 | 80.0 | 75.0 | 28.6 | 100.0 | | | | |
| 5 | COUNT OF DEFECT PER PIECE | 0.675 | | 0.675 | 1.000 | 0.800 | 0.500 | 0.600 | 1.000 | 0.400 | 0.400 | 0.250 | 1.286 | 0.000 | | | | |
| 6 | PQ VALUE | 1.025 | | 1.025 | 1.000 | 1.600 | 1.000 | 1.000 | 1.000 | 1.200 | 0.400 | 0.250 | 1.429 | 1.000 | | | | |
| 7 | AMOUNT OF OUT OF LINE | 1 | | 2.5 | | | | | 1 | | | | | | | | | |

| NO | NAME OF DATA ITEMS | TOTAL | GRAPH | RATE(%) | 8 | 9 | 10 | 11 | 12 | 13 | 14 | 15 | 16 | 17 | 18 | 19 | 20– |
|---|---|---|---|---|---|---|---|---|---|---|---|---|---|---|---|---|---|
| 1 | AMOUNT OF COMPLETION | 355 | | 100.0 | 15 | 43 | 49 | 39 | 22 | 57 | 54 | 61 | 15 | | | | |
| 2 | AMOUNT OF NO DEFECT | 346 | | 97.5 | 15 | 41 | 46 | 39 | 22 | 55 | 54 | 59 | 15 | | | | |
| 3 | AMOUNT OF DEFECT | 78 | | 22.0 | | 20 | 14 | 11 | 7 | 10 | 4 | 11 | 1 | | | | |
| 4 | RATE OF NO DEFECT | 97.46 | | 97.5 | 100.0 | 95.3 | 93.9 | 100.0 | 100.0 | 96.5 | 100.0 | 96.7 | 100.0 | | | | |
| 5 | COUNT OF DEFECT PER PIECE | 0.025 | | 0.025 | 0.000 | 0.047 | 0.061 | 0.000 | 0.000 | 0.035 | 0.000 | 0.033 | 0.000 | | | | |
| 6 | PQ VALUE | 0.220 | | 0.220 | 0.000 | 0.465 | 0.286 | 0.282 | 0.318 | 0.175 | 0.074 | 0.180 | 0.067 | | | | |
| 7 | AMOUNT OF OUT OF LINE | 58 | | 16.3 | | 17 | 12 | 8 | 6 | 7 | 2 | 5 | 1 | | | | |

| NO | NAME OF DATA ITEMS | COUNT | GRAPH | RATE(%) | 8 | 9 | 10 | 11 | 12 | 13 | 14 | 15 | 16 | 17 | 18 | 19 | 20– |
|---|---|---|---|---|---|---|---|---|---|---|---|---|---|---|---|---|---|
| 0 | TOTAL | 27 | | 100.0 | 2 | 4 | 2 | 3 | 2 | 2 | 2 | 1 | 9 | | | | |
| 1 | IMAGE INSPECTION 01 | 21 | | 77.8 | 2 | 3 | 1 | 3 | | 2 | 2 | 1 | 7 | | | | |
| 2 | COMPLETION INSPECTION 01 | 3 | | 11.1 | | | | | 1 | | | | 2 | | | | |
| 3 | ADJUSTING PROCESS 01 | 1 | | 3.7 | | | 1 | | | | | | | | | | |
| 4 | ADJUSTING PROCESS 02 | 1 | | 3.7 | | 1 | | | | | | | | | | | |
| 5 | ELECTRICAL INSPECTION 01 | 1 | | 3.7 | | | | | 1 | | | | | | | | |

| NO | NAME OF DATA ITEMS | COUNT | GRAPH | RATE(%) | 8 | 9 | 10 | 11 | 12 | 13 | 14 | 15 | 16 | 17 | 18 | 19 | 20– | |
|---|---|---|---|---|---|---|---|---|---|---|---|---|---|---|---|---|---|---|
| 0 | TOTAL | 27 | | 100.0 | 2 | 4 | 2 | 3 | 2 | 2 | 2 | 1 | 9 | | | | | |
| 1 | IMAGE TROUBLE | 21 | | 77.8 | 2 | 4 | 1 | 3 | | 2 | 2 | 1 | 6 | | | | | |
| 2 | APPEARANCE TROUBLE | 2 | | 7.4 | | | | | 1 | | | | 1 | | | | | |
| 3 | DISPLAY TROUBLE | 2 | | 7.4 | | | 1 | | 1 | | | | | | | | | |
| 4 | ASSEMBLING TROUBLE | 1 | | 3.7 | | | | | | | | | 1 | | | | | |
| 5 | STRANGE SOUND | 1 | | 3.7 | | | | | | | | | 1 | | | | | |

| NO | NAME OF DATA ITEMS | COUNT | GRAPH | RATE(%) | 8 | 9 | 10 | 11 | 12 | 13 | 14 | 15 | 16 | 17 | 18 | 19 | 20- | |
|---|---|---|---|---|---|---|---|---|---|---|---|---|---|---|---|---|---|---|
| 0 | TOTAL | 27 | | 100.0 | 2 | 4 | 2 | 3 | 2 | 2 | 2 | 1 | 9 | | | | | |
| 1 | DUST | 13 | | 48.1 | 2 | 2 | 1 | | | 1 | 1 | 1 | 5 | | | | | |
| 2 | ASSEMBLING | 6 | | 22.2 | | | | 2 | 2 | | | | 2 | | | | | |
| 3 | PARTS | 5 | | 18.5 | | 1 | 1 | 1 | | 1 | 1 | | | | | | | |
| 4 | TECHNOLOGY | 2 | | 7.4 | | | | | | | | | 2 | | | | | |
| 5 | UNKNOWN | 1 | | 3.7 | | 1 | | | | | | | | | | | | |

| NO | NAME OF DATA ITEMS | COUNT | GRAPH | RATE(%) | 8 | 9 | 10 | 11 | 12 | 13 | 14 | 15 | 16 | 17 | 18 | 19 | 20– | |
|---|---|---|---|---|---|---|---|---|---|---|---|---|---|---|---|---|---|---|
| 1 | AMOUNT OF COMPLETION PRODUCT | 40 | | 100.0 | 2 | 5 | 4 | 5 | 2 | 5 | 5 | 4 | 7 | 1 | | | | |
| 2 | AMOUNT OF OUT OF LINE | 1 | | 2.5 | | | | | 1 | | | | | | | | | |
| 3 | AMOUNT OF OUT OF LINE/RELEASE | 1 | | 100.0 | | | | | 1 | | | | | | | | | |

| NO | NAME OF CONTENT OF TROUBLE | COUNT | GRAPH | RATE(%) | 8 | 9 | 10 | 11 | 12 | 13 | 14 | 15 | 16 | 17 | 18 | 19 | 20- |
|---|---|---|---|---|---|---|---|---|---|---|---|---|---|---|---|---|---|
| 0 | TOTAL | 27 | | 100.0 | 2 | 4 | 2 | 3 | 2 | 2 | 2 | 1 | 9 | | | | |
| 1 | VERTICAL WHITE BELT | 8 | | 29.6 | 1 | 1 | 1 | | | 1 | 1 | 1 | 2 | | | | |
| 2 | SCRATCH | 2 | | 7.4 | | | | | 1 | | | | 1 | | | | |
| 3 | IRREGULAR PAINT (OPC) | 2 | | 7.4 | | | | 1 | | | 1 | | | | | | |
| 4 | COLOR TROUBLE | 2 | | 7.4 | | 1 | | 1 | | | | | | | | | |
| 5 | HORIZONTAL BLACK STREAK | 1 | | 3.7 | | | | | | | | | 1 | | | | |
| 6 | VERTICAL BLACK BELT | 1 | | 3.7 | | | | | | | | | 1 | | | | |
| 7 | OPERATION PORTION VERTICAL LINE | 1 | | 3.7 | | | 1 | | | | | | | | | | |
| 8 | VERTICAL WHITE/ BLACK BELT | 1 | | 3.7 | | 1 | | | | | | | | | | | |
| 9 | VERTICAL WHITE STREAK | 1 | | 3.7 | 1 | | | | | | | | | | | | |
| 10 | VERTICAL BLACK BELT | 1 | | 3.7 | | | | | | | | | 1 | | | | |

| NO | NAME OF CONTENT OF REPAIR | COUNT | GRAPH | RATE(%) | 8 | 9 | 10 | 11 | 12 | 13 | 14 | 15 | 16 | 17 | 18 | 19 | 20– | |
|---|---|---|---|---|---|---|---|---|---|---|---|---|---|---|---|---|---|---|
| 0 | TOTAL | 27 | | 100.0 | 2 | 4 | 2 | 3 | 2 | 2 | 2 | 1 | 9 | | | | | |
| 1 | CLEANING | 13 | | 48.1 | 2 | 2 | 1 | | | 1 | 1 | 1 | 5 | | | | | |
| 2 | CHANGE | 10 | | 37.0 | | 2 | 1 | 3 | | 1 | 1 | | 2 | | | | | |
| 3 | REPAIR | 2 | | 7.4 | | | | | 1 | | | | 1 | | | | | |
| 4 | GREASE PAINT | 1 | | 3.7 | | | | | | | | | 1 | | | | | |
| 5 | SET | 1 | | 3.7 | | | | | 1 | | | | | | | | | |

| NO | NAME OF PROCESS | COUNT | GRAPH | RATE(%) | 8 | 9 | 10 | 11 | 12 | 13 | 14 | 15 | 16 | 17 | 18 | 19 | 20– | |
|---|---|---|---|---|---|---|---|---|---|---|---|---|---|---|---|---|---|---|
| 0 | TOTAL | 28 | | 100.0 | | 4 | 3 | 5 | | 2 | 3 | 4 | 2 | 1 | 2 | 2 | | |
| 1 | ELECTRICAL INSPECTION 01 | 1 | | 3.6 | | | 1 | | | | | | | | | | | |
| 2 | ADJUSTING PROCESS 01 | 3 | | 10.7 | | | | 1 | | | 1 | | 1 | | | | | |
| 3 | MACHINE INSPECTION 01 | | | | | | | | | | | | | | | | | |
| 4 | IMAGE INSPECTION 01 | 21 | | 75.0 | | 4 | 2 | 3 | | 2 | 2 | 2 | 1 | 1 | 2 | 2 | | |
| 5 | COMPLETION INSPECTION 01 | 3 | | 10.7 | | | | 1 | | | | 2 | | | | | | |

| NO | NAME OF PROCESS | COUNT | GRAPH | RATE(%) | 8 | 9 | 10 | 11 | 12 | 13 | 14 | 15 | 16 | 17 | 18 | 19 | 20- | |
|---|---|---|---|---|---|---|---|---|---|---|---|---|---|---|---|---|---|---|
| 0 | TOTAL | 218 | | 100.0 | 9 | 30 | 26 | 26 | 10 | 25 | 25 | 22 | 29 | 7 | 5 | 4 | | |
| 1 | ELECTRICAL INSPECTION 01 | 46 | | 21.1 | 2 | 8 | 5 | 5 | 2 | 5 | 6 | 5 | 7 | 1 | | | | |
| 2 | ADJUSTING PROCESS 01 | 44 | | 20.2 | 2 | 4 | 6 | 5 | 2 | 5 | 4 | 4 | 5 | 2 | 3 | 2 | | |
| 3 | MACHINE INSPECTION 01 | 44 | | 20.2 | 1 | 8 | 6 | 5 | 2 | 5 | 5 | 5 | 6 | 1 | | | | |
| 4 | IMAGE INSPECTION 01 | 43 | | 19.7 | 2 | 5 | 5 | 5 | 2 | 5 | 5 | 4 | 4 | 2 | 2 | 2 | | |
| 5 | COMPLETION INSPECTION 01 | 41 | | 18.8 | 2 | 5 | 4 | 6 | 2 | 5 | 5 | 4 | 7 | 1 | | | | |

DEFECTIVE AMOUNT/PIECE RATE(%)

| NO | NAME OF PROCESS | | GRAPH | | 8 | 9 | 10 | 11 | 12 | 13 | 14 | 15 | 16 | 17 | 18 | 19 | 20– |
|---|---|---|---|---|---|---|---|---|---|---|---|---|---|---|---|---|---|
| 0 | TOTAL | 0.128 | | 100.0 | 0.000 | 0.133 | 0.115 | 0.192 | 0.000 | 0.080 | 0.120 | 0.182 | 0.069 | 0.143 | 0.400 | 0.500 | |
| 1 | ELECTRICAL INSPECTION 01 | 0.022 | | 3.6 | 0.000 | 0.000 | 0.200 | 0.000 | 0.000 | 0.000 | 0.000 | 0.000 | 0.000 | 0.000 | | | |
| 2 | ADJUSTING PROCESS 01 | 0.068 | | 10.7 | 0.000 | 0.000 | 0.000 | 0.200 | 0.000 | 0.000 | 0.250 | 0.000 | 0.200 | 0.000 | 0.000 | 0.000 | |
| 3 | MACHINE INSPECTION 01 | | | | | | | | | | | | | | | | |
| 4 | IMAGE INSPECTION 01 | 0.488 | | 75.0 | 0.000 | 0.800 | 0.400 | 0.600 | 0.000 | 0.400 | 0.400 | 0.500 | 0.250 | 0.500 | 1.000 | 1.000 | |
| 5 | COMPLETION INSPECTION 01 | 0.073 | | 10.7 | 0.000 | 0.000 | 0.000 | 0.167 | 0.000 | 0.000 | 0.000 | 0.500 | 0.000 | 0.000 | | | |

| NO | NAME OF PROCESS | PQ VALUE | GRAPH | RATE(%) | 8 | 9 | 10 | 11 | 12 | 13 | 14 | 15 | 16 | 17 | 18 | 19 | 20– |
|---|---|---|---|---|---|---|---|---|---|---|---|---|---|---|---|---|---|
| 0 | TOTAL | 0.179 | | 100.0 | 0.000 | 0.200 | 0.231 | 0.231 | 0.000 | 0.080 | 0.120 | 0.227 | 0.138 | 0.285 | 0.400 | 0.750 | |
| 1 | ELECTRICAL INSPECTION 01 | 0.022 | | 2.6 | 0.000 | 0.000 | 0.200 | 0.000 | 0.000 | 0.000 | 0.000 | 0.000 | 0.000 | 0.000 | | | |
| 2 | ADJUSTING PROCESS 01 | 0.114 | | 12.8 | 0.000 | 0.250 | 0.167 | 0.200 | 0.000 | 0.000 | 0.250 | 0.000 | 0.200 | 0.000 | 0.000 | 0.000 | |
| 3 | MACHINE INSPECTION 01 | | | | | | | | | | | | | | | | |
| 4 | IMAGE INSPECTION 01 | 0.698 | | 76.9 | 0.000 | 1.000 | 0.800 | 0.800 | 0.000 | 0.400 | 0.400 | 0.750 | 0.750 | 1.000 | 1.000 | 1.500 | |
| 5 | COMPLETION INSPECTION 01 | 0.073 | | 7.7 | 0.000 | 0.000 | 0.000 | 0.167 | 0.000 | 0.000 | 0.000 | 0.500 | 0.000 | 0.000 | | | |

ALARM GENERATION SITUATION NOTICE DIALOG

| NO | CLASSIFICATION | CLASSIFICATION OF TROUBLE | NAME OF PROCESS | ITEM OF TROUBLE | CONTENT OF TROUBLE 1 | CONTENT OF TROUBLE 2 |
|---|---|---|---|---|---|---|
| 2 | | | | SAME TROUBLE | | |

| NO | ASSEMBLING SERIAL NUMBER | MACHINE NUMBER | PRODUCT ITEM CODE | CLASSIFICATION OF TROUBLE | DATE OF OCCURRENCE | TIME OF OCCURRENCE |
|---|---|---|---|---|---|---|
| 1 | 0005-00321 | | B00117 | | 000522 | 09:41 |
| 2 | 0005-00025 | | B00110 | | 000522 | 10:44 |
| 3 | 0005-00330 | H4300500464 | B00117 | | 000522 | 09:49 |
| 4 | 0005-00319 | H4300500454 | B00117 | | 000522 | 19:40 |
| 5 | 0005-00296 | H4300500430 | B00117 | | 000522 | 09:15 |
| 6 | 0005-00346 | | B00117 | | 000522 | 10:18 |
| 7 | 0005-00010 | H4300500010 | B00110 | | 000522 | 10:35 |
| 8 | 0005-00009 | H4300500009 | B00110 | | 000522 | 10:34 |
| 9 | 0005-00349 | H4300500482 | B00117 | | 000522 | 10:23 |
| 10 | 0005-00348 | H4300500481 | B00117 | | 000522 | 10:21 |
| 11 | 0005-00347 | H4300500479 | B00117 | | 000522 | 10:19 |

FIG. 139B

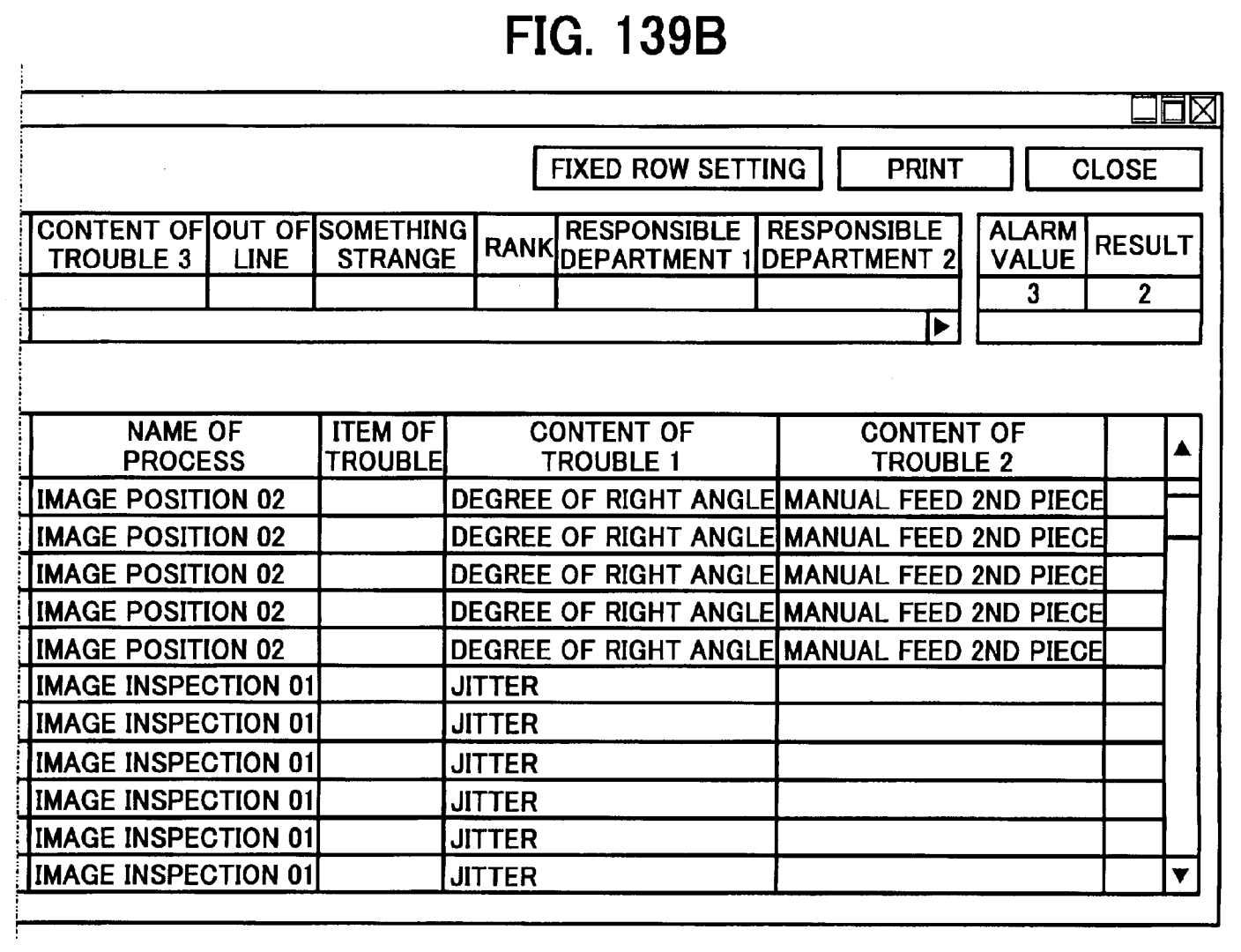

FIXED ROW SETTING | PRINT | CLOSE

| CONTENT OF TROUBLE 3 | OUT OF LINE | SOMETHING STRANGE | RANK | RESPONSIBLE DEPARTMENT 1 | RESPONSIBLE DEPARTMENT 2 |
|---|---|---|---|---|---|
| | | | | | |

| ALARM VALUE | RESULT |
|---|---|
| 3 | 2 |

| NAME OF PROCESS | ITEM OF TROUBLE | CONTENT OF TROUBLE 1 | CONTENT OF TROUBLE 2 | |
|---|---|---|---|---|
| IMAGE POSITION 02 | | DEGREE OF RIGHT ANGLE | MANUAL FEED 2ND PIECE | |
| IMAGE POSITION 02 | | DEGREE OF RIGHT ANGLE | MANUAL FEED 2ND PIECE | |
| IMAGE POSITION 02 | | DEGREE OF RIGHT ANGLE | MANUAL FEED 2ND PIECE | |
| IMAGE POSITION 02 | | DEGREE OF RIGHT ANGLE | MANUAL FEED 2ND PIECE | |
| IMAGE POSITION 02 | | DEGREE OF RIGHT ANGLE | MANUAL FEED 2ND PIECE | |
| IMAGE INSPECTION 01 | | JITTER | | |
| IMAGE INSPECTION 01 | | JITTER | | |
| IMAGE INSPECTION 01 | | JITTER | | |
| IMAGE INSPECTION 01 | | JITTER | | |
| IMAGE INSPECTION 01 | | JITTER | | |
| IMAGE INSPECTION 01 | | JITTER | | |

Figures 140, 140A:
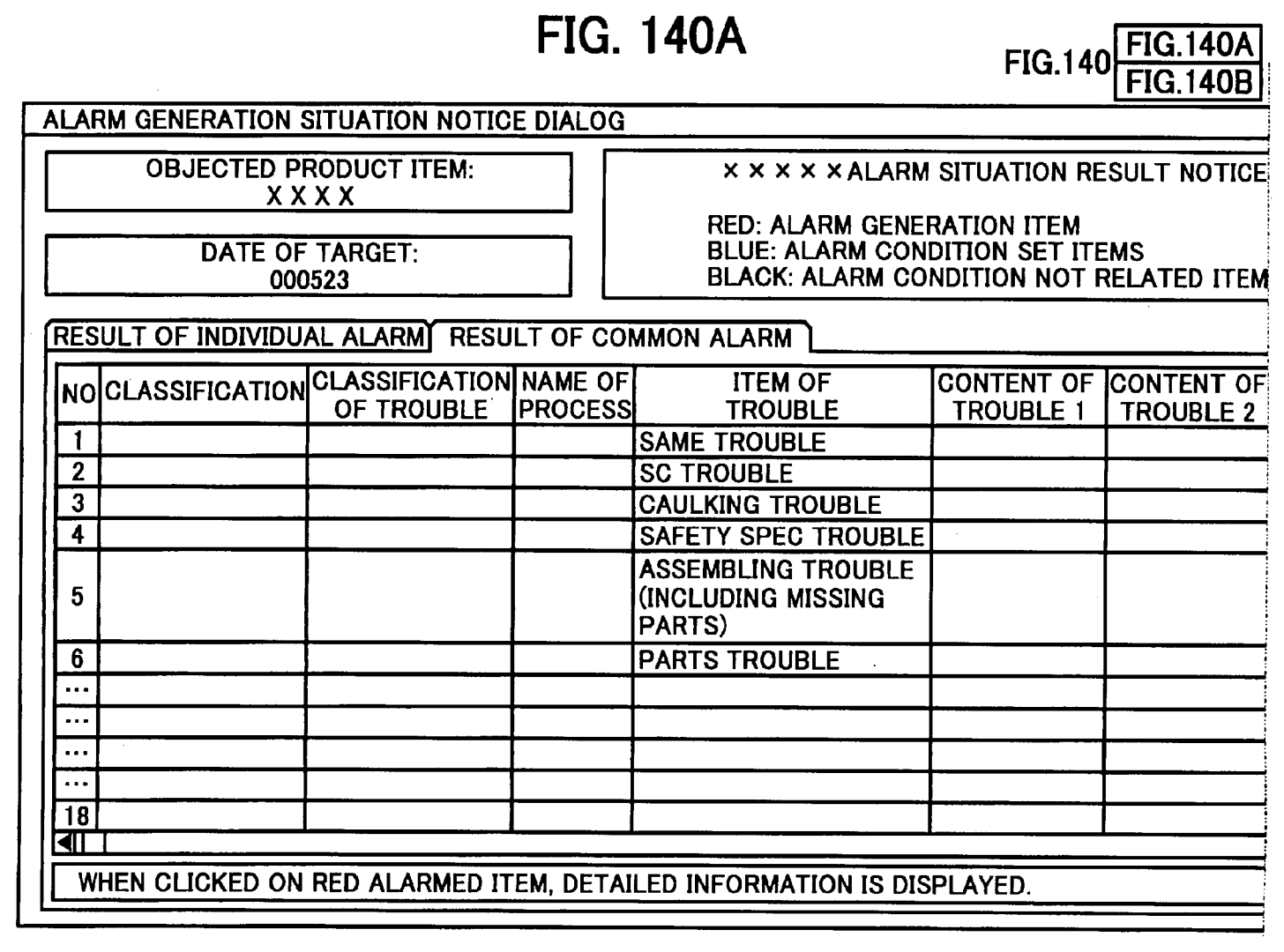

ALARM GENERATION SITUATION NOTICE DIALOG

OBJECTED PRODUCT ITEM:
XXXX

DATE OF TARGET:
000523

× × × × × ALARM SITUATION RESULT NOTICE

RED: ALARM GENERATION ITEM
BLUE: ALARM CONDITION SET ITEMS
BLACK: ALARM CONDITION NOT RELATED ITEM

RESULT OF INDIVIDUAL ALARM | RESULT OF COMMON ALARM

| NO | CLASSIFICATION | CLASSIFICATION OF TROUBLE | NAME OF PROCESS | ITEM OF TROUBLE | CONTENT OF TROUBLE 1 | CONTENT OF TROUBLE 2 |
|---|---|---|---|---|---|---|
| 1 | | | | SAME TROUBLE | | |
| 2 | | | | SC TROUBLE | | |
| 3 | | | | CAULKING TROUBLE | | |
| 4 | | | | SAFETY SPEC TROUBLE | | |
| 5 | | | | ASSEMBLING TROUBLE (INCLUDING MISSING PARTS) | | |
| 6 | | | | PARTS TROUBLE | | |
| ... | | | | | | |
| ... | | | | | | |
| ... | | | | | | |
| ... | | | | | | |
| 18 | | | | | | |

WHEN CLICKED ON RED ALARMED ITEM, DETAILED INFORMATION IS DISPLAYED.

| FIG. 142A |
| --- |
| FIG. 142B |

FIG. 146C

ALARM SETTING SITUATION/RESULT | SITUATION OF REQUEST FOR DISCUSSION MAIL | ALARM MAIL ADDRESS

| NO | ITEM OF TROUBLE | RANK | RESPONSIBLE DEPARTMENT 1 | RESPONSIBLE DEPARTMENT 2 | ALARM VALUE | RESULT |
|---|---|---|---|---|---|---|
| 1 | ROUND S TROUBLE | | TECHNOLOGY | | 1* | 0 |
| 2 | SAFETY SPECIFICATION TROUBLE | | TECHNOLOGY | | 1* | 0 |
| 3 | CAULKING TROUBLE | | PARTS | | 1* | 0 |
| 4 | ROUND S TROUBLE | | PARTS | | 1* | 0 |
| 5 | WELDING TROUBLE | | PARTS | | 1* | 0 |
| 6 | SAFETY SPECIFICATION TROUBLE | | PARTS | | 1* | 0 |
| 7 | ASSEMBLING TROUBLE (INCLUDING DEFECT) | | ASSEMBLING | P-5 | 1* | 0 |
| 8 | ASSEMBLING TROUBLE (INCLUDING DEFECT) | | ASSEMBLING | A-4: AIO | 1* | 0 |
| 9 | ASSEMBLING TROUBLE (INCLUDING DEFECT) | | ASSEMBLING | L-4: SCANNER | 1* | 0 |
| 10 | ASSEMBLING TROUBLE (INCLUDING DEFECT) | | ASSEMBLING | N-4: WRITING | 1* | 0 |
| 11 | ASSEMBLING TROUBLE (INCLUDING DEFECT) | | ASSEMBLING | T-4: FIXING | 1* | 0 |
| ... | | | | | | |
| ... | | | | | | |
| 18 | | | | | | |

FIG. 147B

| NO | ASSEMBLING SERIAL NUMBER | TIME OF DISPATCH | NAME OF PROCESS | ITEM OF TROUBLE | CONTENT OF TROUBLE 1 | CONTENT OF TROUBLE 2 |
|---|---|---|---|---|---|---|
| 1 | 0005-00530 | 15:50 | INITIAL SETTING OF PRODUCTION 01 | DISPLAY TROUBLE | NOT PRINT PAPER END | |
| 2 | 0005-00544 | 13:38 | IMAGE INSPECTION 01 | IMAGE TROUBLE | VERTICAL WHITE STREAK | A1 |
| 3 | 0005-00338 | 11:24 | IMAGE POSITION 01 | IMAGE TROUBLE | STRANGE IMAGE | |
| 4 | 0005-00455 | 10:58 | INITIAL SETTING OF PRODUCTION 01 | DISPLAY TROUBLE | NOT PRINT PAPER END | |
| 5 | 0005-00377 | 09:27 | ELECTRICAL INSPECTION 01 | SC TROUBLE | SC 547 | |
| 6 | 0005-00348 | 09:23 | IMAGE INSPECTION 02 | IMAGE TROUBLE | VERTICAL WHITE STREAK | OR |
| 7 | 0005-00348 | 09:15 | IMAGE INSPECTION 01 | IMAGE TROUBLE | VERTICAL WHITE STREAK | A1 |
| 8 | 0005-00164 | 09:06 | ELECTRICAL INSPECTION 01 | SC TROUBLE | 547 | |
| 9 | 0005-00381 | 17:05 | IMAGE POSITION 02 | | DEGREE OF RIGHT ANGLE | 2ND SHEET IN MANUAL FEED |
| 10 | 0005-00500 | 11:41 | IMAGE POSITION 02 | DEGREE OF RIGHT ANGLE | DEGREE OF RIGHT ANGLE | 2ND SHEET IN MANUAL FEED |

FIG. 147C

| CONTENT OF REPAIR 1 | CONTENT OF REPAIR 2 | CONTENT OF REPAIR 3 | RESPONSIBLE DEPARTMENT 1 |
|---|---|---|---|
| EXCHANGE | BKT | | PARTS |
| EXCHANGE | CCD U | | PARTS |
| EXCHANGE | WRITING UNIT | | PARTS |
| ADJUST | BKT | | PARTS |
| EXCHANGE | PSU | | PARTS |
| EXCHANGE | ROLLER FOR DISCHARGING PAPER | | PARTS |
| EXCHANGE | ROLLER FOR DISCHARGING PAPER | | PARTS |
| EXCHANGE | PSU | | PARTS |
| EXCHANGE | AFTER RESIST SP | | TECHNOLOGY |
| EXCHANGE | AFTER RESIST SP | | TECHNOLOGY |

FIG. 148B

ALARM MAIL ADDRESS

| NO | RESPONSIBLE DEPARTMENT 1 | RESPONSIBLE DEPARTMENT 2 | RESPONSIBLE DEPARTMENT 3 | NOTES_ID | KIND OF DISPATCH |
|---|---|---|---|---|---|
| 55 | ASSEMBLING | T-4 FIXER | | TSUTOMU USHIGOME/R/RICO | CC |
| 56 | ASSEMBLING | T-4 FIXER | | ISAO IDENO/R/RICO | CC |
| 57 | ASSEMBLING | T-4 FIXER | | MASAAKI TAKI/R/RICO | CC |
| 58 | ASSEMBLING | T-4 FIXER | | HIROSHI KURASAWA/R/RICO | CC |
| 59 | ASSEMBLING | T-4 FIXER | | TATSUYA SAKIYAMA/R/RICO | CC |
| 60 | ASSEMBLING | T-4 FIXER | | NOBORU KASHIMA/R/RICO | CC |
| 61 | ASSEMBLING | T-4 FIXER | | KATSUHIRO INOUE/R/RICO | CC |
| 62 | ASSEMBLING | T-4 FIXER | | TOSHIHIRO OHTA/R/RICO | CC |
| 63 | TECHNOLOGY | | | SOHICHIROH FUJINAGA/R/RICO | CC |
| 64 | TECHNOLOGY | | | MINEYO TAKAHASHI/R/RICO | CC |
| 65 | TECHNOLOGY | | | HAJIME ASANO/R/RICO | CC |
| 66 | · | | | · | · |
| 67 | · | | | · | · |
| 68 | · | | | · | · |
| 69 | · | | | · | · |
| 70 | · | | | · | · |
| 71 | · | | | · | · |
| 72 | · | | | · | · |
| 73 | · | | | · | · |
| 74 | · | | | · | · |
| 75 | · | | | · | · |
| 76 | · | | | · | · |

Figure 150:
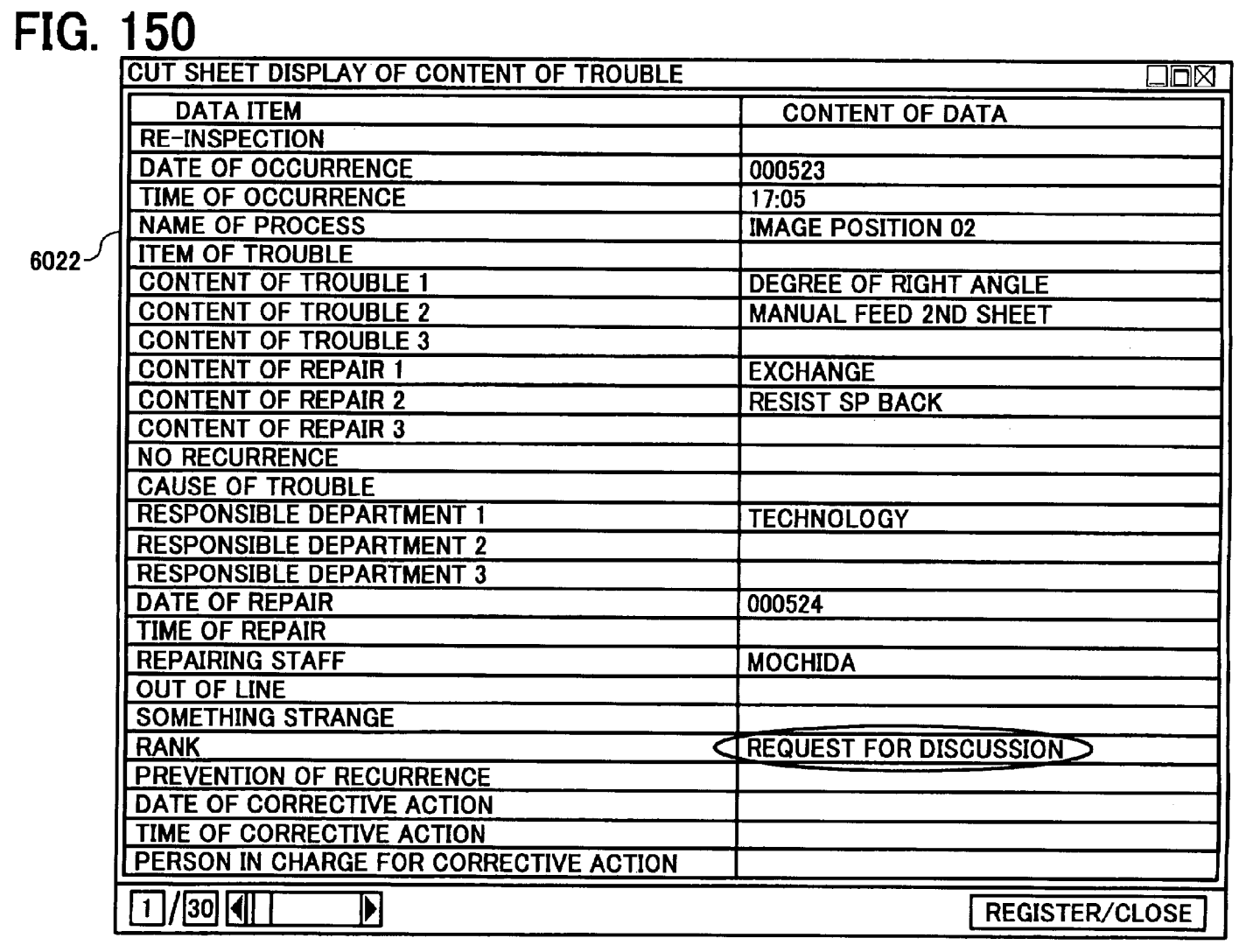

CUT SHEET DISPLAY OF CONTENT OF TROUBLE

| DATA ITEM | CONTENT OF DATA |
|---|---|
| RE-INSPECTION | |
| DATE OF OCCURRENCE | 000523 |
| TIME OF OCCURRENCE | 17:05 |
| NAME OF PROCESS | IMAGE POSITION 02 |
| ITEM OF TROUBLE | |
| CONTENT OF TROUBLE 1 | DEGREE OF RIGHT ANGLE |
| CONTENT OF TROUBLE 2 | MANUAL FEED 2ND SHEET |
| CONTENT OF TROUBLE 3 | |
| CONTENT OF REPAIR 1 | EXCHANGE |
| CONTENT OF REPAIR 2 | RESIST SP BACK |
| CONTENT OF REPAIR 3 | |
| NO RECURRENCE | |
| CAUSE OF TROUBLE | |
| RESPONSIBLE DEPARTMENT 1 | TECHNOLOGY |
| RESPONSIBLE DEPARTMENT 2 | |
| RESPONSIBLE DEPARTMENT 3 | |
| DATE OF REPAIR | 000524 |
| TIME OF REPAIR | |
| REPAIRING STAFF | MOCHIDA |
| OUT OF LINE | |
| SOMETHING STRANGE | |
| RANK | REQUEST FOR DISCUSSION |
| PREVENTION OF RECURRENCE | |
| DATE OF CORRECTIVE ACTION | |
| TIME OF CORRECTIVE ACTION | |
| PERSON IN CHARGE FOR CORRECTIVE ACTION | |

1 / 30

REGISTER/CLOSE

FIG. 151B

| DATA ITEM | CONTENT OF DATA |
|---|---|
| RE-INSPECTION | |
| DATE OF OCCURRENCE | 000532 |
| TIME OF OCCURRENCE | 15:50 |
| NAME OF PROCESS | INITIAL SETTING OF PRODUCTION 01 |
| ITEM OF TROUBLE | DISPLAY TROUBLE |
| CONTENT OF TROUBLE 1 | NOT PRINT PAPER END |
| CONTENT OF TROUBLE 2 | |
| CONTENT OF TROUBLE 3 | |
| CONTENT OF REPAIR 1 | EXCHANGE |
| CONTENT OF REPAIR 2 | BKT |
| CONTENT OF REPAIR 3 | |
| NO RECURRENCE | |
| CAUSE OF TROUBLE | |
| RESPONSIBLE DEPARTMENT 1 | PARTS |
| RESPONSIBLE DEPARTMENT 2 | |
| RESPONSIBLE DEPARTMENT 3 | |
| DATE OF REPAIR | 000523 |
| TIME OF REPAIR | |
| REPAIRING STAFF | HASEGAWA |
| OUT OF LINE | |
| SOMETHING STRANGE | |
| RANK | REQUEST FOR DISCUSSION |
| PREVENTION OF RECURRENCE | |
| DATE OF CORRECTIVE ACTION | |
| TIME OF CORRECTIVE ACTION | |
| PERSON IN CHARGE FOR CORRECTIVE ACTION | |

PRODUCT MARKET QUALITY INFORMATION ANALYZING BACK UP APPARATUS, PRODUCT MARKET QUALITY INFORMATION ANALYZING BACK UP SYSTEM AND PROGRAM FOR PRODUCT MARKET QUALITY INFORMATION ANALYZING BACK UP

BACKGROUND OF THE INVENTION

1. Field of the Invention

The present invention relates to a product market quality analyzing back up apparatus which is used to back up an improvement of a product quality, a product market quality analyzing back up system and a program for product market quality analyzing back up which is utilized thereof.

2. Description of the Prior Art

Hitherto, a data base construction by which management of maintenance record about products that has been delivered to customers is performed, has been made. On a maintenance record list which is made based on the data base, for example, information of the product such as a brevity code of kind of the product, product number, date of maintenance, date of delivery, classification of reason for visit, counter 1, counter 2, comment on maintenance, year and month of production, symptom of the trouble, detailed symptom at the site, cause of trouble, corrective action, detailed portion of corrective action, result, replaced parts are listed (see FIG. 4 which will be explained later).

A service personnel for maintenance (maintenance staff) carries out the maintenance, an inspection, a repairing and so on, and at the same time input results of the above listed items on a screen of handheld personal computer, the input information on the above items are stored in the data base as an information of maintenance record.

At this point, a market quality information such as a quality trouble information of the product at a market, a repairing information as a result to cope with an occurrence of quality trouble of the product are included in the maintenance record. If these market quality information is reflected to the product which should be made after the date of maintenance and the product quality can be amended, it is preferable that an improvement and betterment of the market quality about the product at the actual market, an early closure of problem on quality at the market, a prevention of recurrence and thereby a prevention of occurrence of the quality problem in advance, has been achieved.

On the other hand, in the manufacturing side, various kind of control item, control specification, inspection item and inspection specification are established in order to reduce the quality trouble after the product has been accomplished. In a case when at an occurrence that these various kind of items and specifications are not satisfied, it is established that the item name, specification, symptom of trouble and so on are recorded and input at every production process, and at the same time a result of corrective action for the trouble is recorded and input to manage these production history information on each serial number (brevity code of kind of the product and product number) for respective products at each production process.

At this point, it is difficult to predict what kind of quality problem will happen after the product is ultimately delivered to customer in actual operation, it is preferable that quick feed back of the quality information to the production process can be realized if the production history of at the production process and quality trouble that has happened at the site the product has delivered are associated together, it becomes some help for design engineers and production managers rapidly to get determined in which production process the cause of trouble is in existence.

However, the aforementioned maintenance record list is originally made to manage an actual performance on maintenance of respective service personnel, and it is not intended to manage market quality information for product. For this reason, it has not been made to easily manage market quality information of the product, in the past the maintenance record list is summed up once a month and it is sent to production manager or to design engineer, then the market quality information is extracted for each product from the maintenance record list and it is analyzed by manual procedure to make an analysis table.

Accordingly, it requires over one month from the date of maintenance to complete analysis result as the analysis table, and in actual operation it is difficult to reflect quickly the analysis table to the production process of the product.

At the same time, because in the analysis table of product any specific corresponding relation is given between the market quality information of product and the production history of product, it is impossible to understand by what reason in which production process the trouble is caused in actual operation.

SUMMARY OF THE INVENTION

The present invention is made in view of the above described circumstances and one object of the invention is to provide a product market quality information analyzing back up apparatus, product market quality analyzing back up system and a program for product market quality analyzing back up thereof which can contribute to realize the improvement and betterment of the market quality about the product at the actual market, the early closure of problem on quality at the market and the prevention of recurrence and thereby a prevention in before happens of the quality problem.

Generally, the present invention is characterized by a product market quality information analyzing back up apparatus comprising a maintenance record information storing device in which the maintenance record information on the product delivered to customers is stored and means for accessing to said maintenance record information storing device and for extracting, storing and analyzing an information from said maintenance record information storing device.

More specifically, according to the first aspect of the present invention, a product market quality information analyzing back up apparatus characterized by: accessing to a maintenance record information storing device in which the maintenance record information on the product delivered to customers are stored; extracting a market quality information which relates to the market quality of the product in the predetermined period of term from the maintenance record information based on a product item of the product; processing the extracted result of market quality information to analyze; and displaying a market quality transition situation on a display screen, is provided.

In accordance with the first aspect of the present invention a trend of market quality of product can be comprehended in real time.

According to the second aspect of the present invention, the product market quality analyzing back up apparatus in that the market quality information is quality trouble information that represents a product item including product item brevity code and a developing code name which is given when the product was developed, a maintenance carried out date item which represents when maintenance are carried out, a year and month item which represents when the product was manufactured, a date of delivery item which represents when the product was delivered to customer, a comment on the maintenance item which represents comments when the maintenance was carried out, a symptom of trouble which represents a content of the quality trouble of the product occurred in the market, a detailed portion which represent where the symptom occurred in the product, a reason of trouble which represents the reason by which the trouble seems to happen, a corrective action which represents a countermeasure for the trouble, a detailed portion of corrective action, a result which represents whether the trouble of product is solved by the corrective action or not, and item which represents whether the trouble of product is solved by a replacement of parts or not, is provided.

In accordance with the second aspect of the present invention quality trouble about the product can be comprehended in relation to the year and month of production.

According to the third aspect of the present invention the product market quality analyzing back up apparatus further characterized by: classifying the quality trouble based on the product item; summing up a count of the quality troubles occurred during one month from a date of the delivery to the customer based on the product item in every year and month of production and defining it as an initial operation quality, and displaying it on the display screen by means of a graph whose vertical axis is the count of quality trouble of every the product item and horizontal axis is the year and month of production, is provided.

In accordance with the third aspect of the present invention it is easy to comprehend the trend of quality just after the delivery to the customer.

According to the 4th aspect of the present invention, the product market quality analyzing back up apparatus further characterized by: taking the year and month of production of the product item as a parameter; summing up a count of the quality trouble occurred based on month since the year and month of delivery till the quality trouble happens about the products which are made in the year and month of the production and defining it as an elapsed operation quality; and displaying it as the market quality transition situation on the display screen by means of a graph whose vertical axis is the count of quality trouble of every the product item and horizontal axis is the year and month of production, is provided.

In accordance with the 4th aspect of the present invention it is easy to comprehend a trend of the elapsed operation quality.

According to the 5th aspect of the present invention, the product market quality analyzing back up apparatus further characterized by displaying the result substantially in three dimensional graph with a third axis of the parameter in which the vertical axis, the horizontal axis and the third axis are respectively crossing perpendicularly, is provided.

In accordance with the 5th aspect of the present invention the initial operation quality and the elapsed operation quality can be comprehended at the same time.

According to the 6th aspect of the present invention the product market quality analyzing back up apparatus further characterized by: calculating a count of the maintenance record occurred within a month from date of delivery based on the year and month of production utilizing the maintenance record information; subtracting the overlapping count caused by the same product item; defining the subtracted result as a count of operating machines of the product item in the market about the year and month of production; calculating a rate of the quality trouble occurrence by division process of the count of the maintenance record by the count of operating machines; and displaying the calculated result of every the product item as the market quality transition situation on the display screen by means of a line chart whose vertical axis is the rate of occurrence and horizontal axis is the year and month of production, is provided.

In accordance with the 6th aspect of the present invention a ratio of quality trouble occurrence of the initial operation quality of product can be comprehended on the basis of the year and month of production.

According to the 7th aspect of the present invention the product market quality analyzing back up apparatus further characterized by: counting the maintenance record of products which belong to the month of elapsed operation quality based on month since the year and month of delivery till the quality trouble happens utilizing the maintenance record information based on the month of elapsed operation quality; subtracting the overlapping count caused by the same product item; defining the subtracted result as a count of operating machines of the product item which belong the month of elapsed operation quality in the market about the year and month of production; calculating a rate of the quality trouble occurrence by division process of the count of the maintenance record by the count of operating machines; and displaying the calculated result of every the product item as the market quality transition situation on the display screen by means of a line chart whose vertical axis is the rate of occurrence and horizontal axis is the year and month of production, is provided.

In accordance with the 7th aspect of the present invention a ratio of quality trouble occurrence of the elapsed operation quality of product can be comprehended on the basis of the year and month of production.

According to the 8th aspect of the present invention. The product market quality analyzing back up apparatus further characterized by: classifying the maintenance record about a symptom of trouble based on the symptom of trouble in the market quality information; making a list one of whose axes is the year and month of production and another of whose axes is the count of quality trouble which is classified on the basis of every the symptom of quality trouble based on the year and month of production; and displaying the list on the display screen, is provided.

According to the 9th aspect of the present invention the product market quality analyzing back up apparatus further characterized by: classifying the maintenance record about a reason of trouble based on the reason of trouble in the market quality information; making a list one of whose axes is the year and month of production and another of whose axes is the count of quality trouble which is classified on the basis of every the reason of quality trouble based on the year and month of production; and displaying the list on the display screen, is provided.

According to the 10th aspect of the present invention the product market quality analyzing back up apparatus further characterized by: classifying the maintenance record about a corrective action of trouble based on the corrective action of trouble in the market quality information; making a list one of whose axes is the year and month of production and another of whose axes is the count of quality trouble which is classified on the basis of every the corrective action of quality trouble based on the year and month of production; and displaying the list on the display screen, is provided.

According to the 11th aspect of the present invention the product market quality analyzing back up apparatus further characterized by: classifying the maintenance record about a result of trouble based on the result of trouble in the market quality information; making a list one of whose axes is the year and month of production and another of whose axes is the count of quality trouble which is classified on the basis of every the result of quality trouble based on the year and month of production; and displaying the list on the display screen, is provided.

According to the 12th aspect of the present invention the product market quality analyzing back up apparatus further characterized by: classifying the maintenance record about a comment on maintenance of trouble based on the comment on maintenance of trouble in the market quality information; making a list one of whose axes is the year and month of production and another of whose axes is the count of quality trouble which is classified on the basis of every the comment on maintenance of quality trouble based on the year and month of production; and displaying the list on the display screen, is provided.

In accordance with the 8th to 12th aspects of the present invention the count of quality trouble can be comprehended in relation to the contents of them.

According to the 13th aspect of the present invention the product market quality analyzing back up apparatus in that when a portion of the list where a count is displayed, designated by a year and month of production and any one of the items chosen as a target on the display screen, is selected and executed, a list in which the identification numbers are written to specify a product which relates to the item chosen as the target, is displayed on the display screen, is provided.

According to the 14th aspect of the present invention the product market quality analyzing back up apparatus in that when any one of the identification numbers where the identification numbers are listed is selected and executed on the display screen, the apparatus is linked to a production history data base for a factory side in which the production history at production processes for respective products is stored, and production history information of the production, defect and characteristics which relate to the identification number are displayed on the display screen, is provided.

In accordance with the 13th and 14th aspects of the present invention the contents of quality trouble -which happen in the customers side can be comprehended in relation to the trouble in production which happened when those product were manufactured, accordingly it becomes easy for design engineers and factory managers to rapidly follow out in which process of the production line the cause of trouble lies, and thereby a quick feed back to production line can be realized.

According to the 15th aspect of the present invention the product market quality analyzing back up apparatus in that electronic mails which alarm an occurrence of quality trouble of product are automatically sent to terminals in the related department if items of any one of the market quality information to be watched are selected and criteria of them are specified where the respective criteria specified are exceeded, is provided.

In accordance with the 15th aspect of the present invention because the electronic mails are automatically sent to the related departments about the quality item of trouble is on which especially monitoring is required, the related department can rapidly be noticed on abnormal quality trouble of items to be monitored.

According to the 16th aspect of the present invention a product market quality analyzing back up system including: a maintenance record data base in which the maintenance record information about the product delivered to customers are stored; a data base for manufacturing side which periodically or irregularly accesses to the maintenance record data base, obtains the quality information and stores the market quality information in order to obtain and process a market quality information related to the market quality of product from the maintenance record information; a processing means which accesses to the data base for manufacturing side and extracts the market quality information to process and to analyze; and a terminal with a display means which displays a processed and analyzed result processed by the processing means as a market quality transition situation in a form of graph, is provided.

In accordance with the 16th aspect of the present invention the same effect as that of the first aspect of the invention can be realized.

According to the 17th aspect of the present invention the product market quality analyzing back up system in that said market quality information at least includes a product item, a maintenance carried out date item, a year and month of production item, a date of delivery item and a quality trouble related items which relate the trouble of quality of the product, said system asks a count of the quality troubles about the product occurred during one month from a date of the delivery to the customer based on the product item in every year and mouth of production and defines it as an initial operation quality; and said display means displays a relation between the count of quality trouble of every the product item and the year and month of production of the product by means of a graph as the market quality transition situation, is provided.

In accordance with the 17th aspect of the present invention the same effect as that of the third aspect of the invention can be realized.

According to the 18th aspect of the present invention the product market quality analyzing back up system in that said processing means takes the year and month of production of the product item as a parameter, and asks a count of the quality trouble occurred based on elapsed month since the year and month of delivery till the quality trouble happens about the products which are made in the year and month of the production and defines it as an elapsed operation quality; and said display means displays a transition situation of the count of quality trouble based on the elapsed month as the market quality transition situation on the display screen, is provided.

In accordance with the 18th aspect of the present invention the same effect as that of the 4th aspect of the invention can be realized.

According to the 19th aspect of the present invention the product market quality analyzing back up system in that said processing means asks a count of quality trouble of the product item based on the year and month of production, and said display means displays the count of the quality trouble in a form of three dimensional view utilizing the year and month of production and the elapsed month, is provided.

In accordance with the 19th aspect of the present invention the same effect as that of the 5th aspect of the invention can be realized.

According to the 20th aspect of the present invention the product market quality analyzing back up system in that the processing means calculates a count of the quality trouble about the product within a month from date of the delivery based on the year and month of production utilizing the maintenance record information; subtracting the overlapping count caused by the same product item; defining the subtracted result as a count of operating machines of the product item in the market about the year and month of production; calculating a rate of the quality trouble occurrence by division process of the count of the quality trouble by the count of operating machines; and displaying the calculated result of every the product item as the market quality transition situation on the display screen by means of a line chart whose vertical axis is the rate of occurrence and horizontal axis is the year and month of production is provided.

In accordance with the 20th aspect of the present invention the same effect as that of the 6th aspect of the invention can be realized.

According to the 21st aspect of the present invention the product market quality analyzing back up system in that said processing means asks the maintenance record of products which belong to the month of elapsed operation quality based on month since the year and month of delivery till the quality trouble happens utilizing the maintenance record information based on the month of elapsed operation quality; subtracting the overlapping count caused by the same product item; defining the subtracted result as a count of operating machines of the product item which belong the month of elapsed operation quality in the market about the year and month of production; calculating a rate of the quality trouble occurrence by division process of the count of the quality trouble by the count of operating machines; and displaying the calculated result of every the product item as the market quality transition situation on the display screen by means of a line chart whose vertical axis is the rate of occurrence and horizontal axis it the year and month of production is provided.

In accordance with the 21st aspect of the present invention the same effect as that of the 7th aspect of the invention can be realized.

According to the 22nd aspect of the present invention the product market quality analyzing back up system in that said market quality information at least includes quality trouble related items which relate a product item, a maintenance carried out date item, a year and month item, a date of delivery item, a quality trouble related item which relate to quality trouble and symptom of item of trouble and said display means classifying the maintenance record about a reason of trouble based on the reason of trouble in the market quality information; making a list one of whose axes is the year and mouth of production and another of whose axes is the count of quality trouble which is classified on the basis of every the reason of quality trouble based on the year and month of production; and displaying the list on the display screen is provided.

According to the 23rd aspect of the present invention the product market quality analyzing back up system in that said market quality information at least includes quality trouble related items which relate a product item, a maintenance carried out date item, a year and month item, a date of delivery item, a quality trouble related item which relate to quality trouble and symptom of item of trouble and said display means classifying the maintenance record about a reason of trouble based on the reason of trouble in the market quality information; making a list one of whose axis is the year and month of production and another of whose axes is the count of quality trouble which is classified on the basis of every the reason of quality trouble based on the year and month of production; and displaying the list on the display screen is provided.

According to the 24th aspect of the present invention the product market quality analyzing back up system in that said market quality information at least includes quality trouble related items which relate a product item, a maintenance carried out date item, a year and month item, a date of delivery item, a quality trouble related item which relate to quality trouble and symptom of item of trouble and said display means classifying the maintenance record about a reason of trouble based on the reason of trouble in the market quality information; making a list one of whose axes is the year and month of production and another of whose axes is the count of quality trouble which is classified on the basis of every the reason of quality trouble based on the year and month of production; and displaying the list on the display screen is provided.

In accordance with the 22nd to 24th aspects of the present invention the same effect as that of the 8th to 12th aspects of the invention can be realized.

According to the 25th aspect of the present invention the product market quality analyzing back up system in that when a specified portion designated by a year and month of production and any one of the items chosen as a target, on a display screen when the list is displayed by the display means, is selected, the processing means causes the display means to display the identification numbers to specify a product which relates to the item chosen as the target is provided.

According to the 26th aspect of the present invention the product market quality analyzing back up system in that when any one of the identification numbers is selected on the display screen when the identification numbers are listed, the apparatus is linked to a production history data base for a factory side in which the production history at production processes for respective products is stored, and production history which relate to the identification number are displayed on the display screen is provided.

In accordance with the 25th and 26th aspects of the present invention the same effect as that of the 13th and 14th aspects of the invention can be realized.

According to the 27th aspect of the present invention a product market quality analyzing back up system including: a maintenance record data base in which the maintenance record information about the product delivered to customers are stored; a data base for manufacturing side which periodically or irregularly accesses to the maintenance record data base, obtains the quality information and stores the market quality information in order to obtain and process a market quality information related to the market quality of product from the maintenance record information; a processing means which accesses to the data base for manufacturing side and extracts the market quality information to process and to analyze; a terminal with a display means which displays a processed and analyzed result processed by the processing means as a market quality transition situation in a form of graph; and a production history data base for a factory side in which the production history at production processes for respective products are stored; characterized by that said terminal can access to production history information in said production history data base, is provide.

According to the 28th aspect of the present invention the product market quality analyzing back up system in that when a specified portion designated by a year and month of production and any one of the items chosen as a target, on a display screen when the list is displayed by the display means, is selected, the processing means causes the display means to display the identification numbers to specify a product which relates to tale item chosen as the target, is provided.

In accordance with the 27th and 28th aspects of the present invention, the person related to quality trouble such as design engineers, manufacturing engineers, factory managers and so on, are made to be possible to directly access to the market quality information and the production history information through their own terminal, and a current movement of market quality of the product can be comprehended in relation to a production history of the product, thereby a quick feed back to the production process as the corrective action can be realized.

According to the 29th aspect of the present invention a product market quality information analyzing back up program including contents of: accessing to a maintenance record information storing device in which the maintenance record information on the product delivered to customers are stored; extracting a market quality information which relates to the market quality of the product in the predetermined period of term from the maintenance record information based on a product item of the product; process the extracted result of market quality information to analyze; and displaying a market quality transition situation on a display screen in a form of graph, is provided.

In accordance with the 29th aspect of the present invention, the same effect as that of the first aspect of the invention can be realized.

According to the 30th aspect of the present invention the product market quality analyzing back up program in that said market quality information at least includes a product item, a maintenance carried out date item, a year and month of production item, a date of delivery item and a symptom of item of trouble, said program further includes content of asking a count of the quality troubles about the product occurred during one month from a date of the delivery to the customer based on the product item in every year and month of production and causes the display means to display it as an initial operation quality in a form of graph based on the year and month of production of the product, is provided.

In accordance with the 30th aspect of the present invention the same effect as that of the third aspect of the invention can be realized.

According to the 31st aspect of the present invention the product market quality analyzing back up program further includes contents of: taking the year and month of production of the product item as a parameter; asking a count of the quality trouble occurred based on elapsed month since the year and month of delivery till the quality trouble happens about the products which are made in the year and month of the production and defining it as an elapsed operation quality; and displaying it as the market quality transition situation of quality trouble, is provided.

In accordance with the 31st aspect of the present invention the same effect as that of the 4th aspect of the invention can be realized.

According to the 32nd aspect of the present invention the product market quality analyzing back up program further includes contents of: asking a count of quality trouble of the product item based on the year and month of production and at the same time the elapsed months; and displaying the count of the quality trouble in a form of three dimensional view utilizing the year and month of production and the elapsed months, is provided.

In accordance with the 32nd aspect of the present invention the same effect as that of the 5th aspect of the invention can be realized.

According to the 33rd aspect of the present invention the product market quality analyzing back up program characterized by displaying the count of quality trouble as a list one of whose axes is the year and month of production and another of whose axes is the count of quality trouble related information based on the year and month of production, is provided.

According to the 34th aspect of the present invention the product market quality analyzing back up program in that in a state that the list is displayed when a portion designated by a year and month of production and any one of the items chosen as a target is selected, the program causes the display means to display the identification numbers of the product which relates to the item chosen as the target, is provided.

According to the 35th aspect of the present invention the product market quality analyzing back up program further includes contents when any one of the identification numbers is selected, the program causes to link to a production history data base for a factory side in which the production history at production processes for respective products is stored, and to display production history which relate to the identification number, is provided.

In accordance with the 34th and 35th aspects of the present invention the some effect as that of the 13th and 14th aspects of the invention can be realized.

According to the 36th aspect of the present invention the product market quality analyzing back up program further includes contents of causing that electronic mails are automatically sent to terminals in the related department if items of any one of the detailed items of market quality information to be watched are selected and criteria of them are specified when the respective criteria specified are exceeded, is provided.

In accordance with the 36th aspect of the present invention the same effect as that of the 15th aspect of the invention can be realized.

BRIEF DESCRIPTION OF THE DRAWINGS

FIG. 3 is an explanatory diagram of to show one example of production history which is stored in a production history data base in the factory side in the system shown in FIG. 1 to show a state the production history is output.

FIG. 4 is a diagram to show one example of information list which is stored in a maintenance record data base shown in FIG. 1.

FIG. 30 is a diagram to show a display screen of inspection process.

FIG. 42 is a diagram to show a display screen of the monitoring process, and is a diagram to show one example of the production history shown in FIG. 3.

FIG. 47 is a diagram to show a display screen of the process for product quality.

FIG. 65 is a diagram to show one example of a format of the master table of product item code name shown in FIG. 63.

FIG. 66 is a diagram to show one example of a format of the master table of a factory name shown in FIG. 63.

FIG. 67 is a diagram to show one example of a format of the master table of field of product shown in FIG. 63.

FIG. 68 is a diagram to show one example of a format of the master table of step of production shown in FIG. 63.

FIG. 69 is a diagram to show one example of a format of the master table of a line number shown in FIG. 63.

FIG. 70 is a diagram to show one example of a format of the master table of a rank shown in FIG. 63.

FIG. 71 is a diagram to show one example of a format of the master table of input operator shown in FIG. 63.

FIG. 72 is a diagram to show one example of a format of the master table of product item code name shown responsible department shown in FIG. 63.

FIG. 73 is a diagram to show one example of a format of the master table of content of repairing shown in FIG. 63.

FIG. 74 is a diagram to show one example of a format of the master table of Unit check sheet operator shown in FIG. 63.

FIG. 75 is a diagram to show one example of a format of the master table of repairing operator shown in FIG. 63.

FIG. 76 is a diagram to show one example of a format of the master table of examining staff in the process shown in FIG. 63.

FIG. 77 is a diagram to show one example of a format of the master table of person in charge corrective action shown in FIG. 63.

FIG. 78 is a diagram to show one example of a format of the master table of repairing staff shown in FIG. 63.

FIG. 79 is a diagram to show one example of a format of the master table of alarm receiver shown in FIG. 63.

FIG. 80 is a diagram to show one example of a format of the master table of check sheet item shown in FIG. 63.

FIG. 81 is a diagram to show one example of a format of the master table of Unit name shown in FIG. 63.

FIG. 82 is a diagram to show one example of a format of the master table of product name shown in FIG. 63.

FIG. 83 is a diagram to show one example of a format of the master table of alarm management shown in FIG. 63.

FIG. 84 is a diagram to show one example of a format of the master table of alarm value shown in FIG. 63.

FIG. 85 is a diagram to show one example of a format of the master table of content of trouble shown in FIG. 63.

FIG. 86 is a diagram to show one example of a format of the master table of Unit check sheet shown in FIG. 63.

FIG. 87 is a diagram to show one example of a format of the data table of check sheet shown in FIG. 64.

FIG. 88 is a diagram to show one example of a format of the data table of check sheet version up history shown in FIG. 64.

FIG. 89 is a diagram to show one example of a format of the data table of Unit management shown in FIG. 64.

FIG. 90 is a diagram to show one example of a format of the data table of Main shown in FIG. 64.

FIG. 91 is a diagram to show one example of a format of the data table of trouble inside the process data table shown in FIG. 64.

FIG. 92 is a diagram to show one example of a format of the data table of trouble inside the process data table shown in FIG. 64.

FIG. 93 is a diagram to show one example of a format of the data table of Unit main shown in FIG. 64.

FIG. 94 is a diagram to show one example of a format of the data table of Unit check sheet shown in FIG. 64.

FIG. 95 is a diagram to show one example of a format of the data table of Unit shown in FIG. 64.

FIG. 109 is a diagram to explain an example of screen display in inside the process data input process.

FIG. 110 is a diagram to explain an example of screen display in inside the process data input process.

FIG. 120 is a diagram to explain an example of screen display of process monitoring/alarm process.

FIG. 121 is a diagram to explain an example of screen display of process monitoring/alarm process.

FIG. 122 is a diagram to explain an example of screen display of process monitoring/alarm process.

FIG. 123 is a diagram to explain an example of screen display of process monitoring/alarm process.

FIG. 124 is a diagram to explain an example of screen display of process monitoring/alarm process.

FIG. 125 is a diagram to explain an example of screen display of process monitoring/alarm process.

FIG. 126 is a diagram to explain an example of screen display of process monitoring/alarm process.

FIG. 127 is a diagram to explain an example of screen display of process monitoring/alarm process.

FIG. 128 is a diagram to explain an example of screen display of process monitoring/alarm process.

FIG. 129 is a diagram to explain an example of screen display of process monitoring/alarm process.

FIG. 130 is a diagram to explain an example of screen display of process monitoring/alarm process.

FIG. 131 is a diagram to explain an example of screen display of process monitoring/alarm process.

Figure 132A:
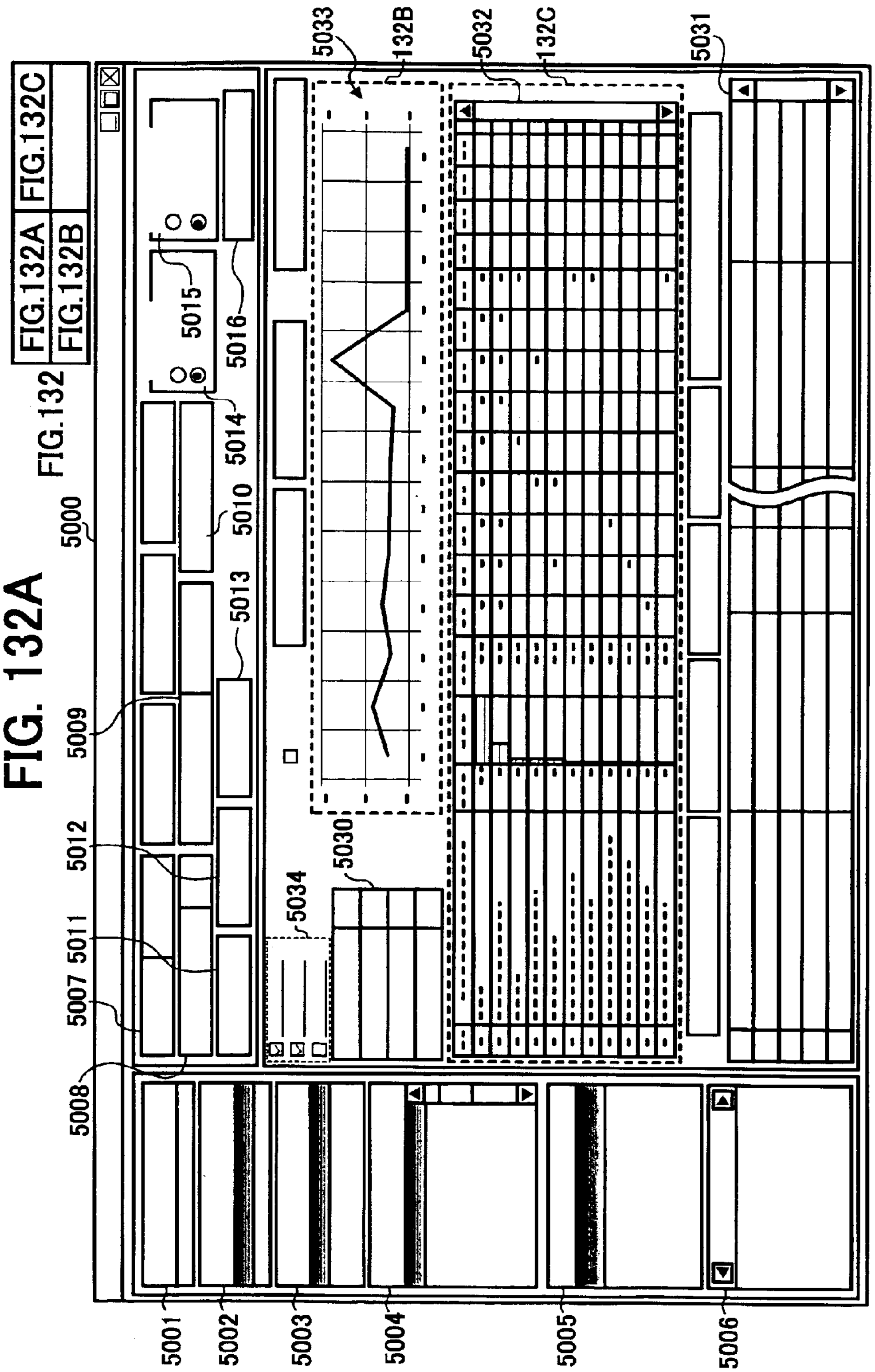
Figures 132B, 132C:
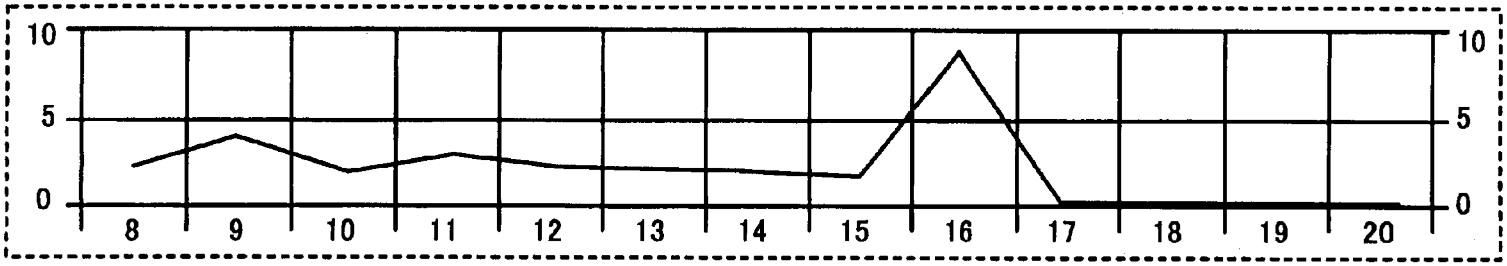

FIG. 132 is a diagram to explain an example of screen display of process monitoring/alarm process.

Figure 133A:
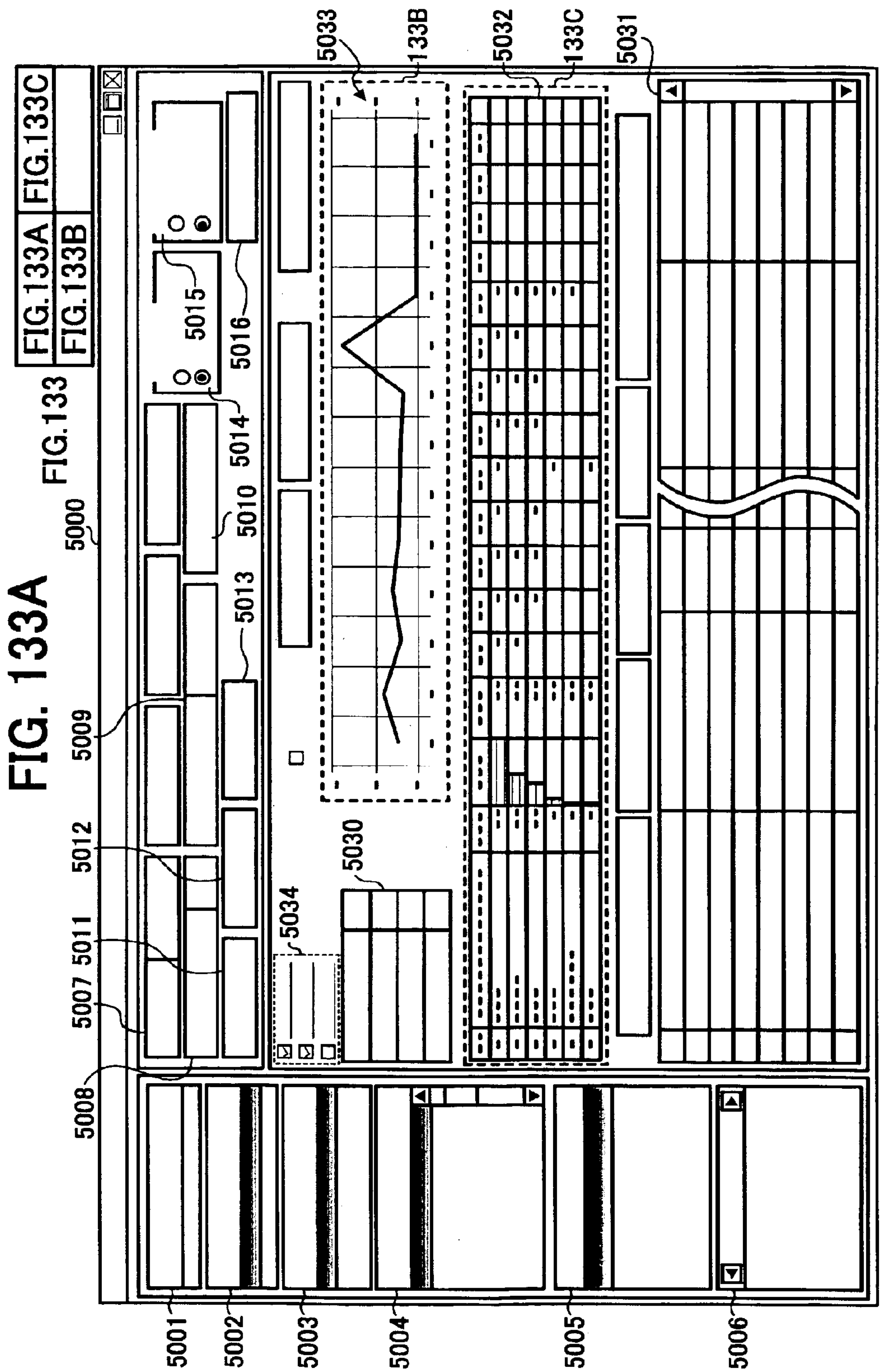
Figures 133B, 133C:
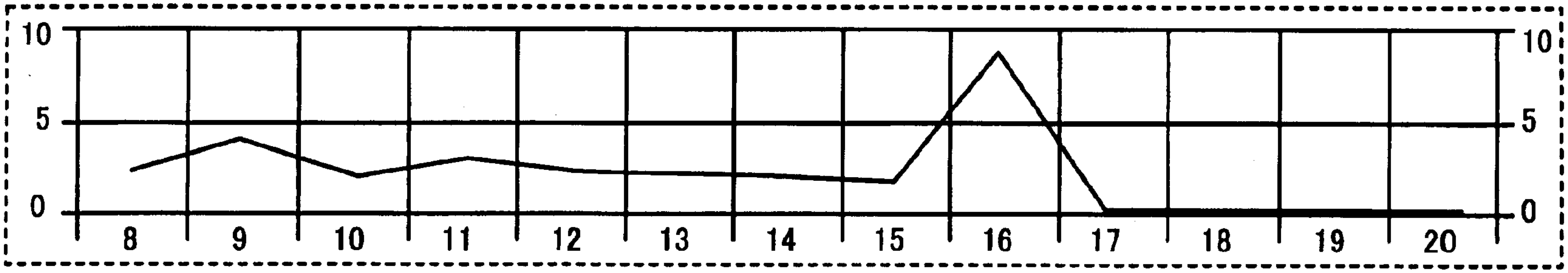

FIG. 133 is a diagram to explain an example of screen display of process monitoring/alarm process.

Figure 134A:
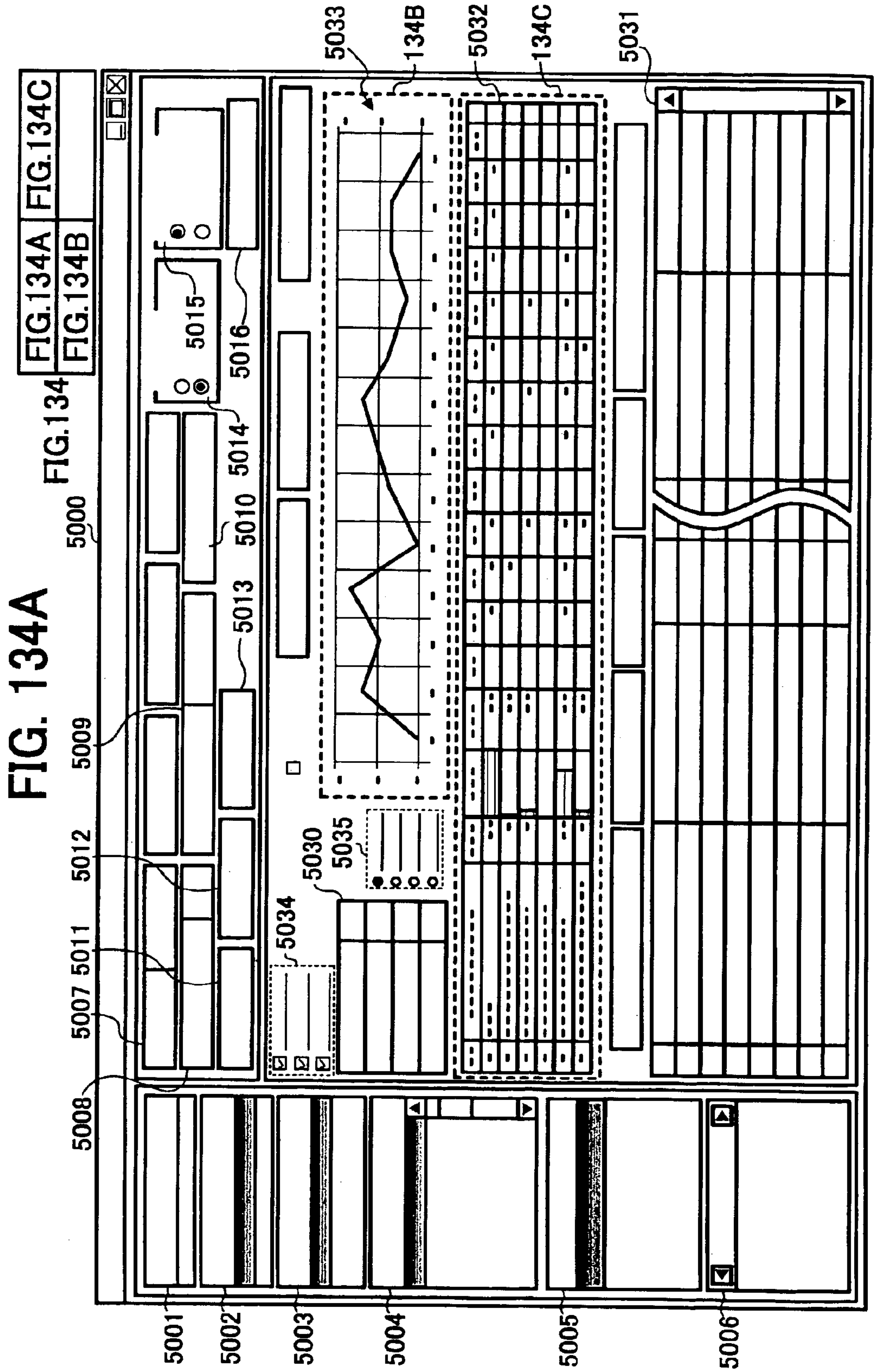
Figures 134B, 134C:
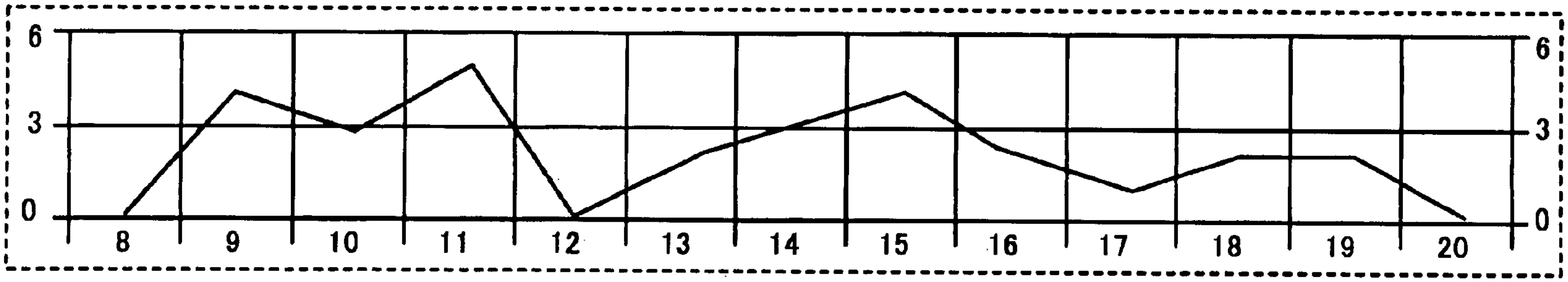

FIG. 134 is a diagram to explain an example of screen display of process monitoring/alarm process.

Figure 135A:
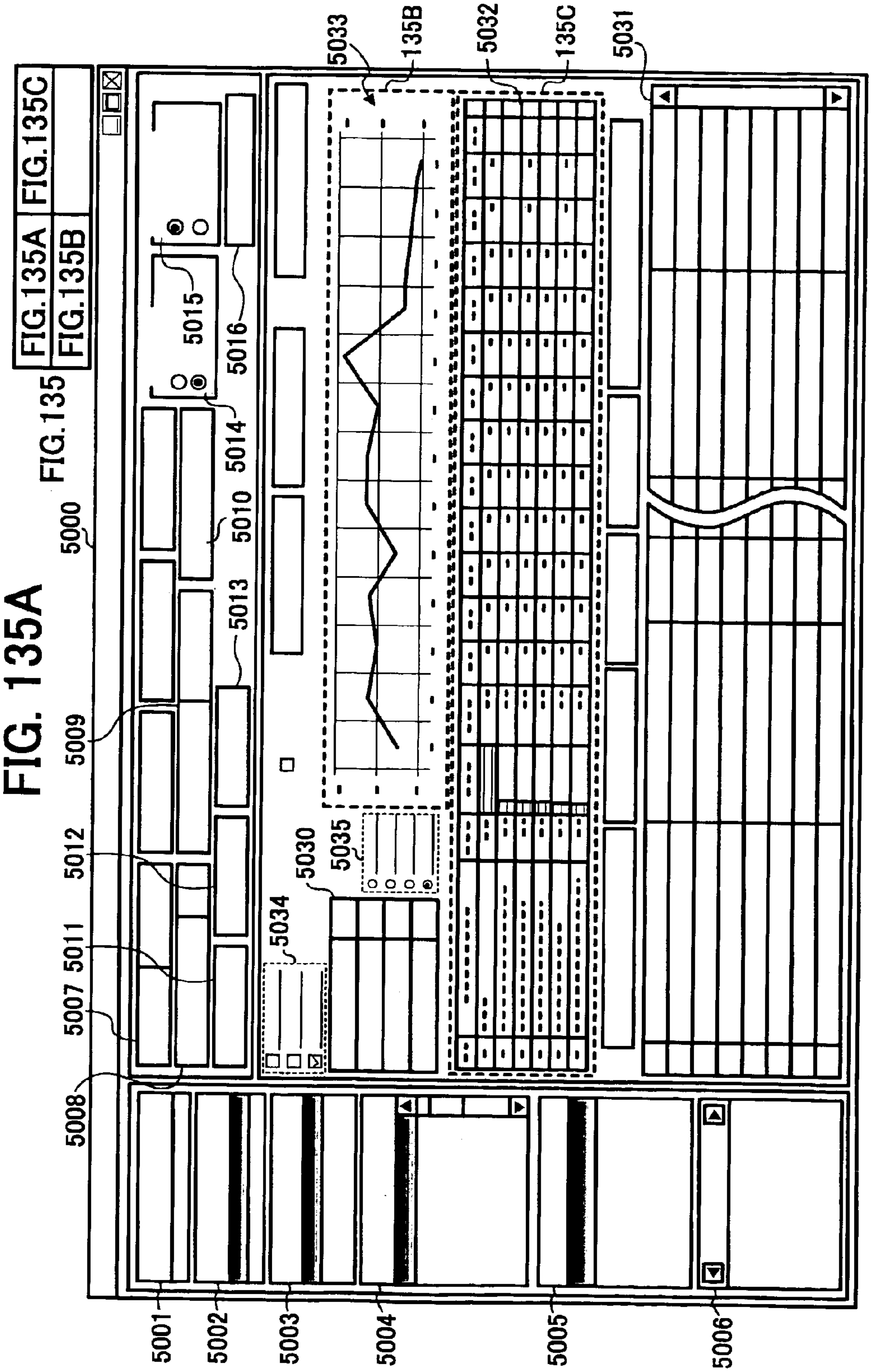
Figures 135B, 135C:
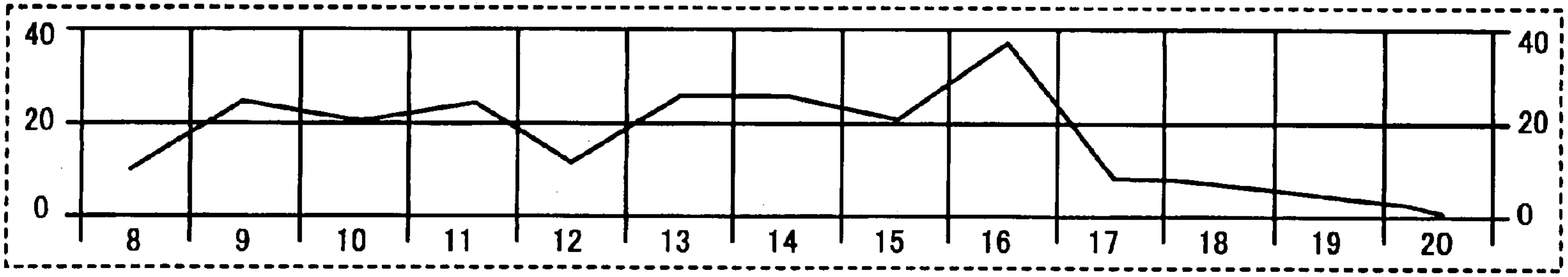

FIG. 135 is a diagram to explain an example of screen display of process monitoring/alarm process.

Figure 136A:
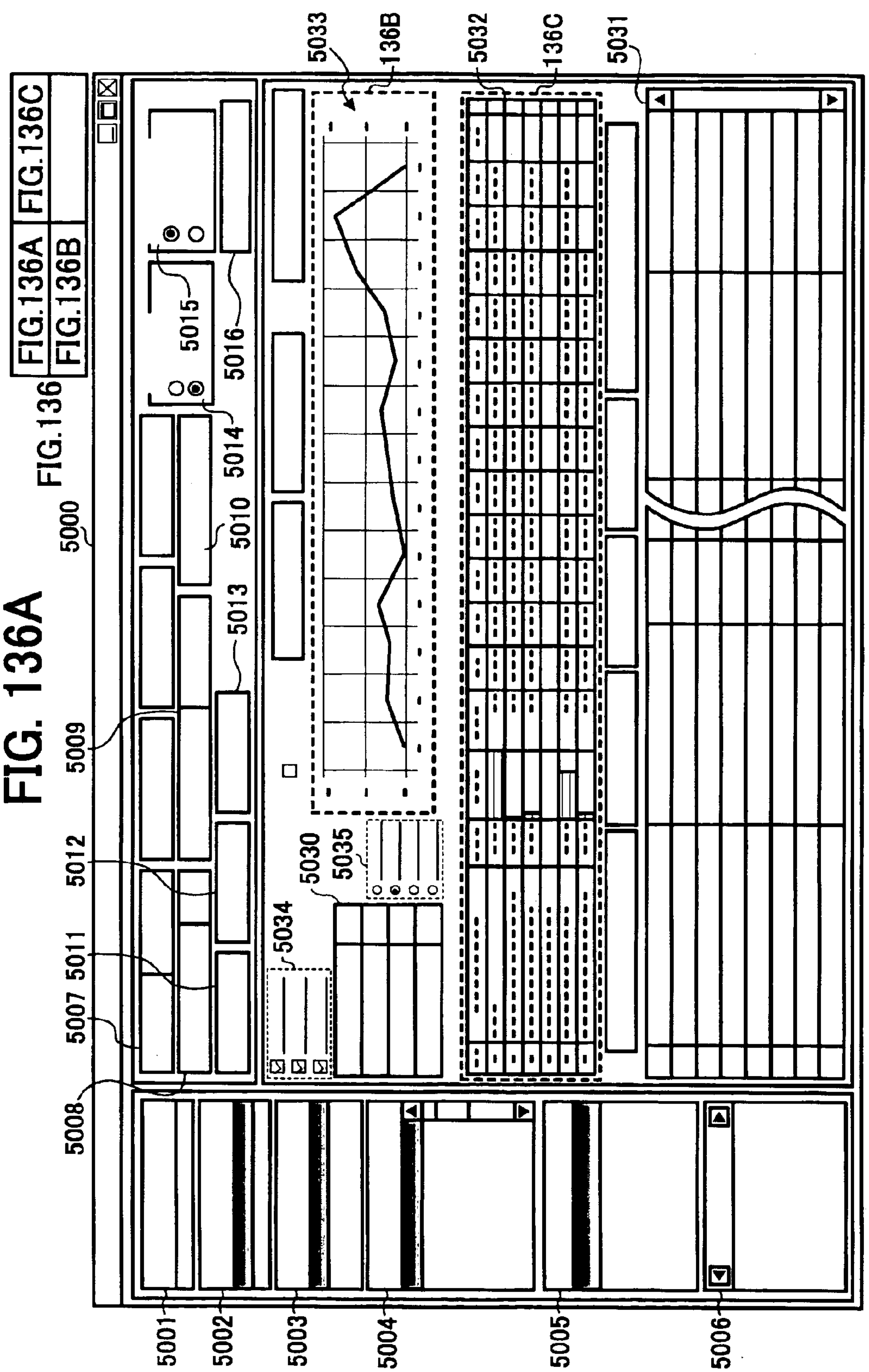
Figures 136B, 136C:
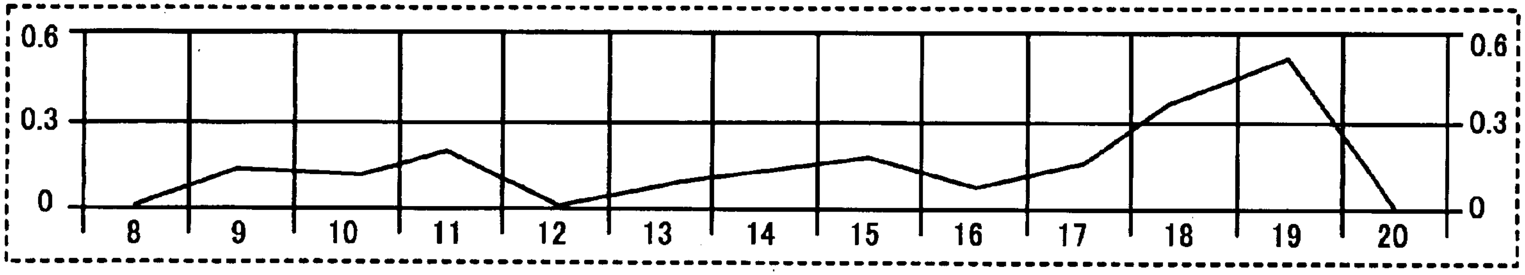

FIG. 136 is a diagram to explain an example of screen display of process monitoring/alarm process.

Figure 137A:
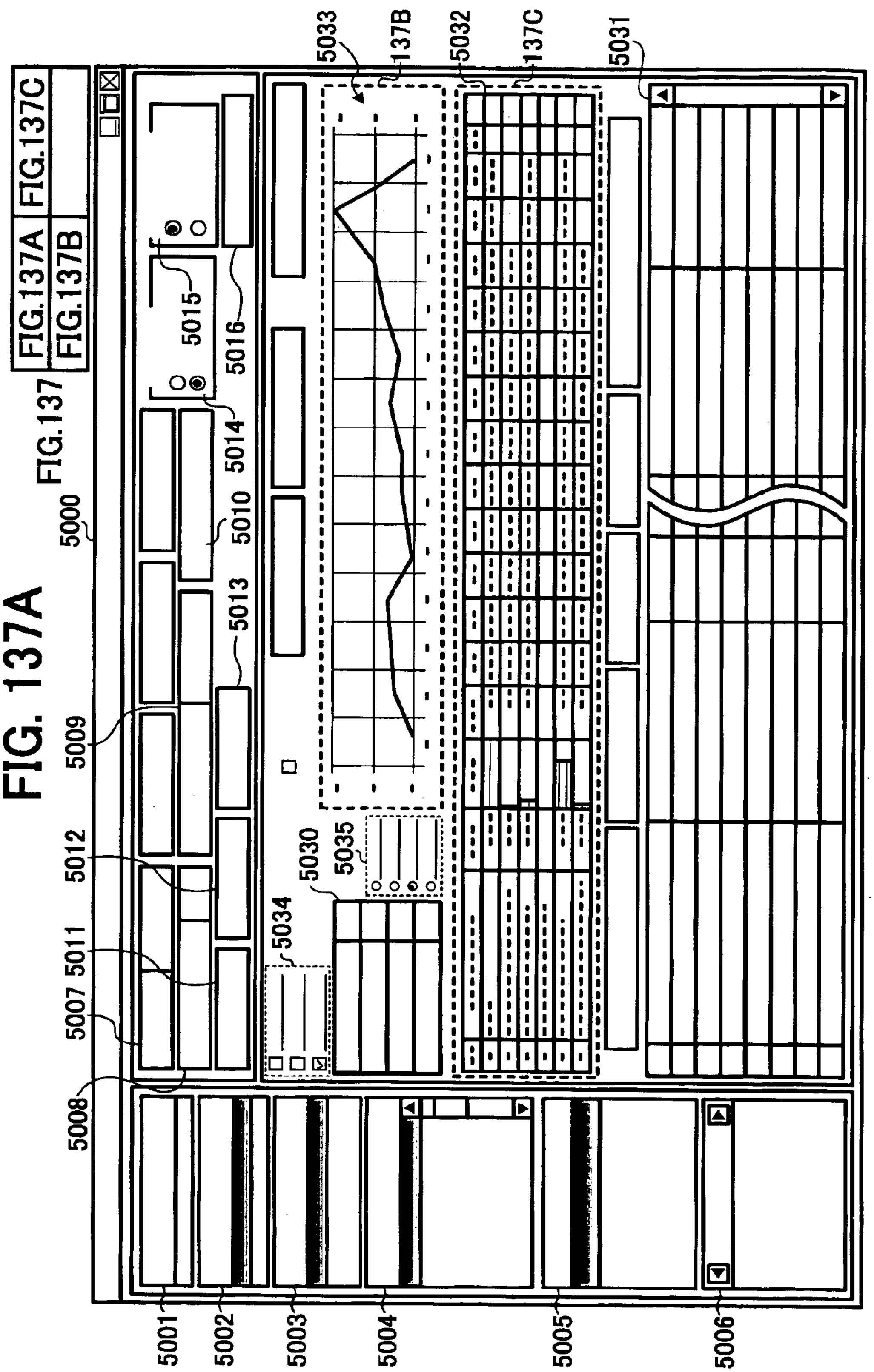
Figures 137B, 137C:
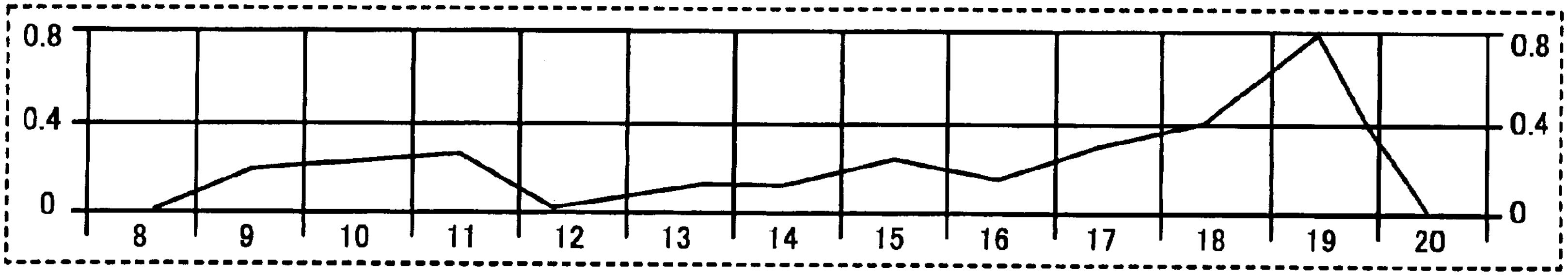

FIG. 137 is a diagram to explain an example of screen display of process monitoring/alarm process.

Figures 138, 138A, 138B:
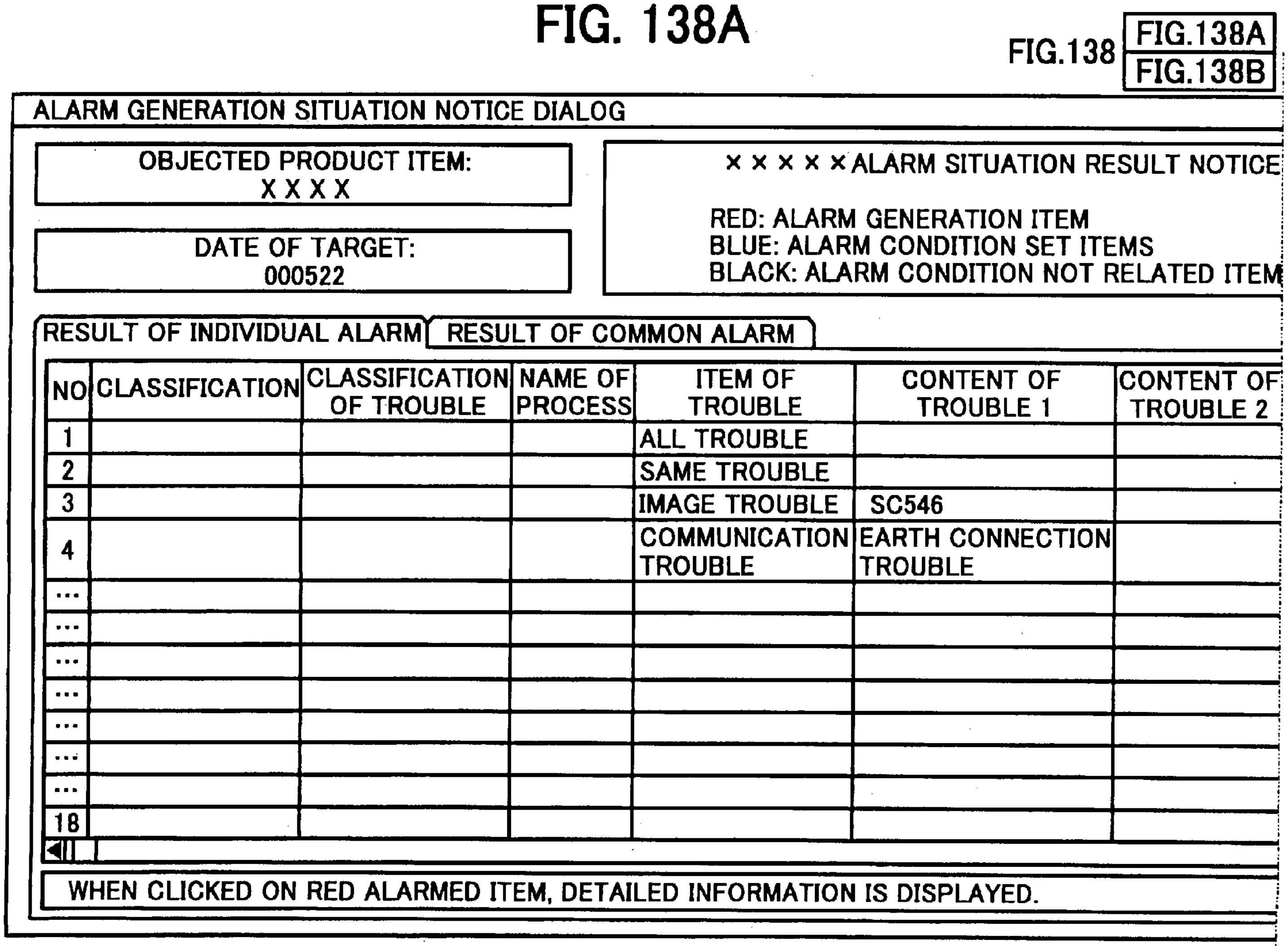
Figure 138B:
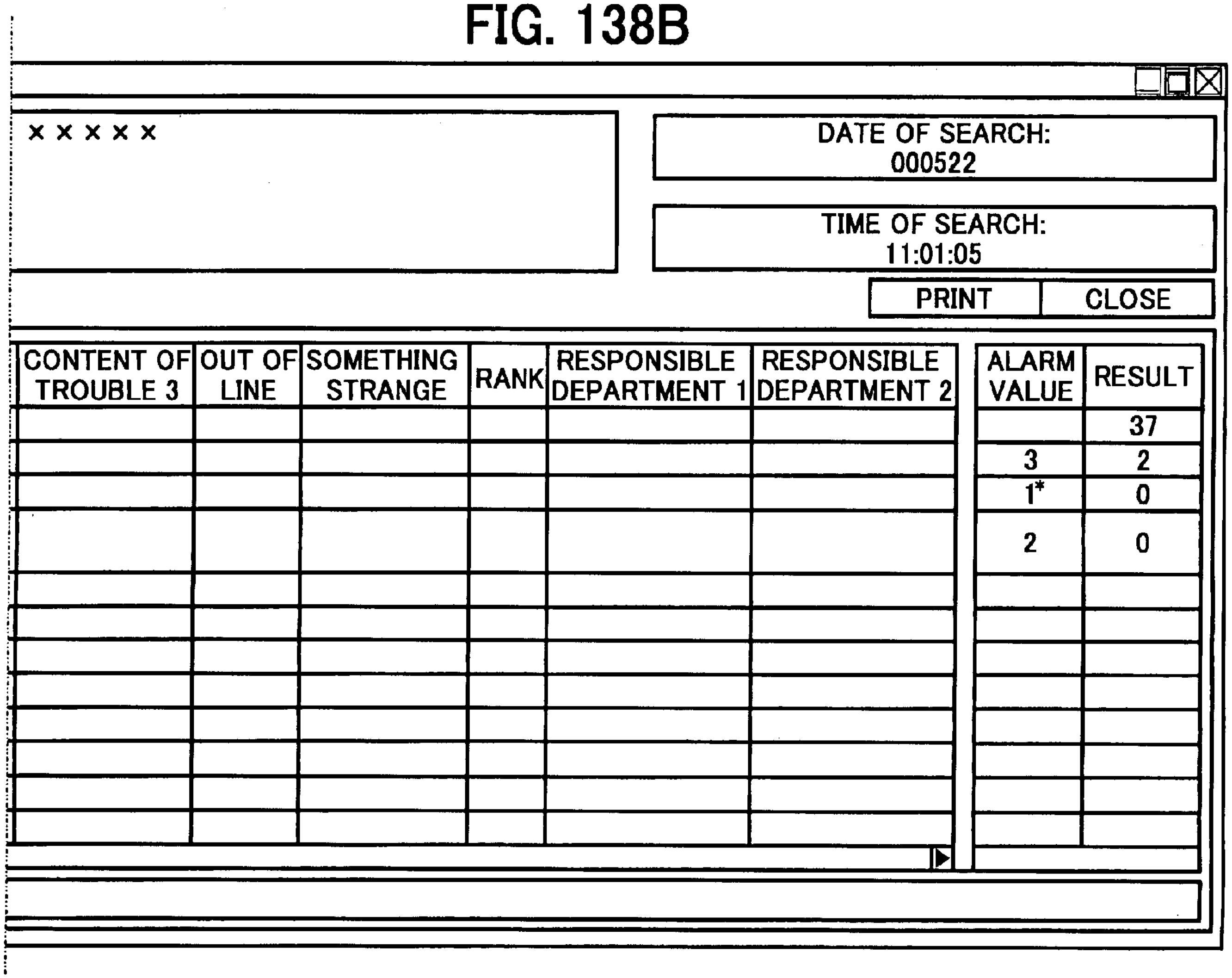

FIG. 138 is a diagram to explain an example of screen display of process monitoring/alarm process.

FIG. 139 is a flow chart to explain a process of alarm mail dispatch of the client of management system.

Figure 140B:
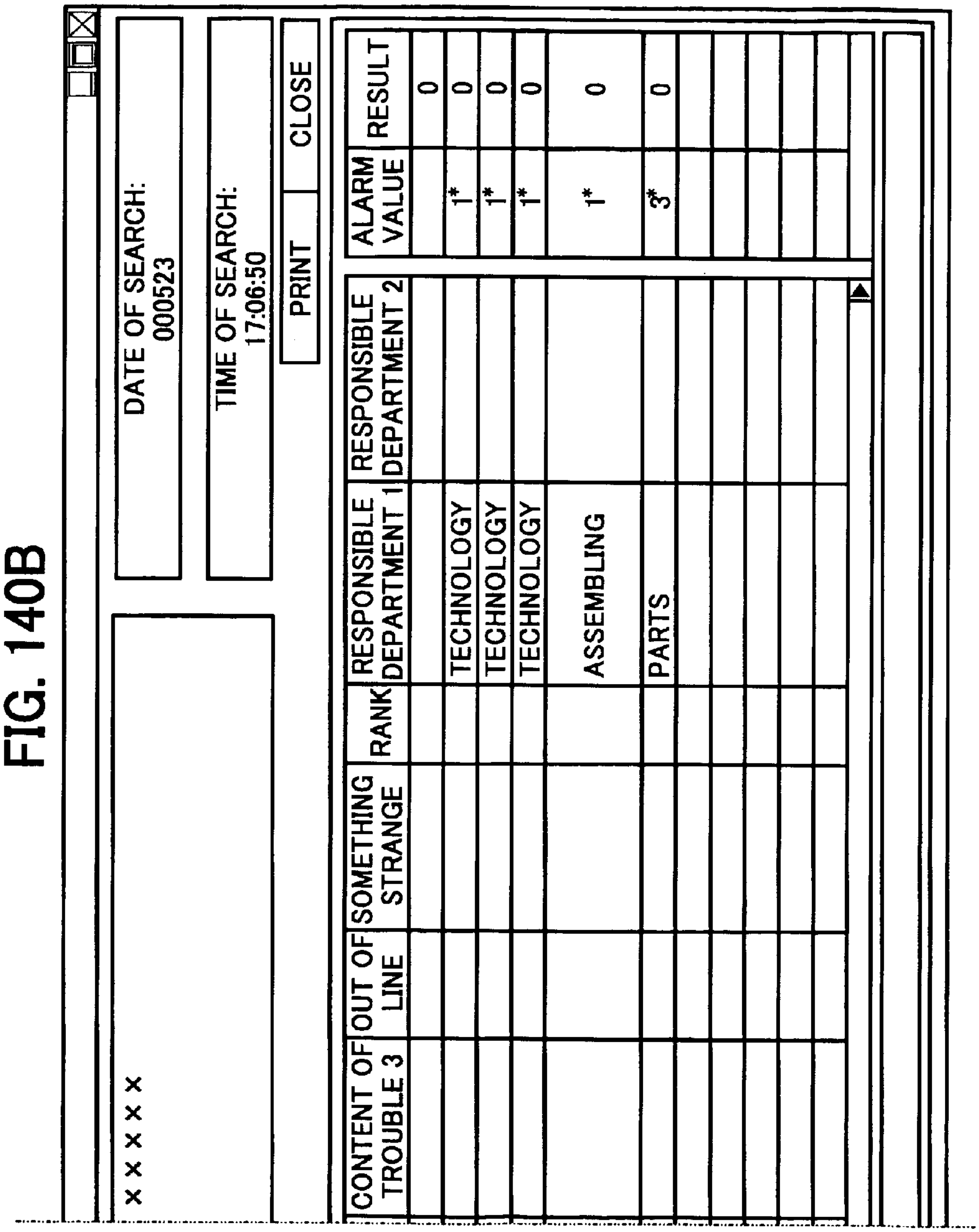

FIG. 140 is a flow chart to explain a process of alarm mail dispatch of the client of management system.

Figure 141A:
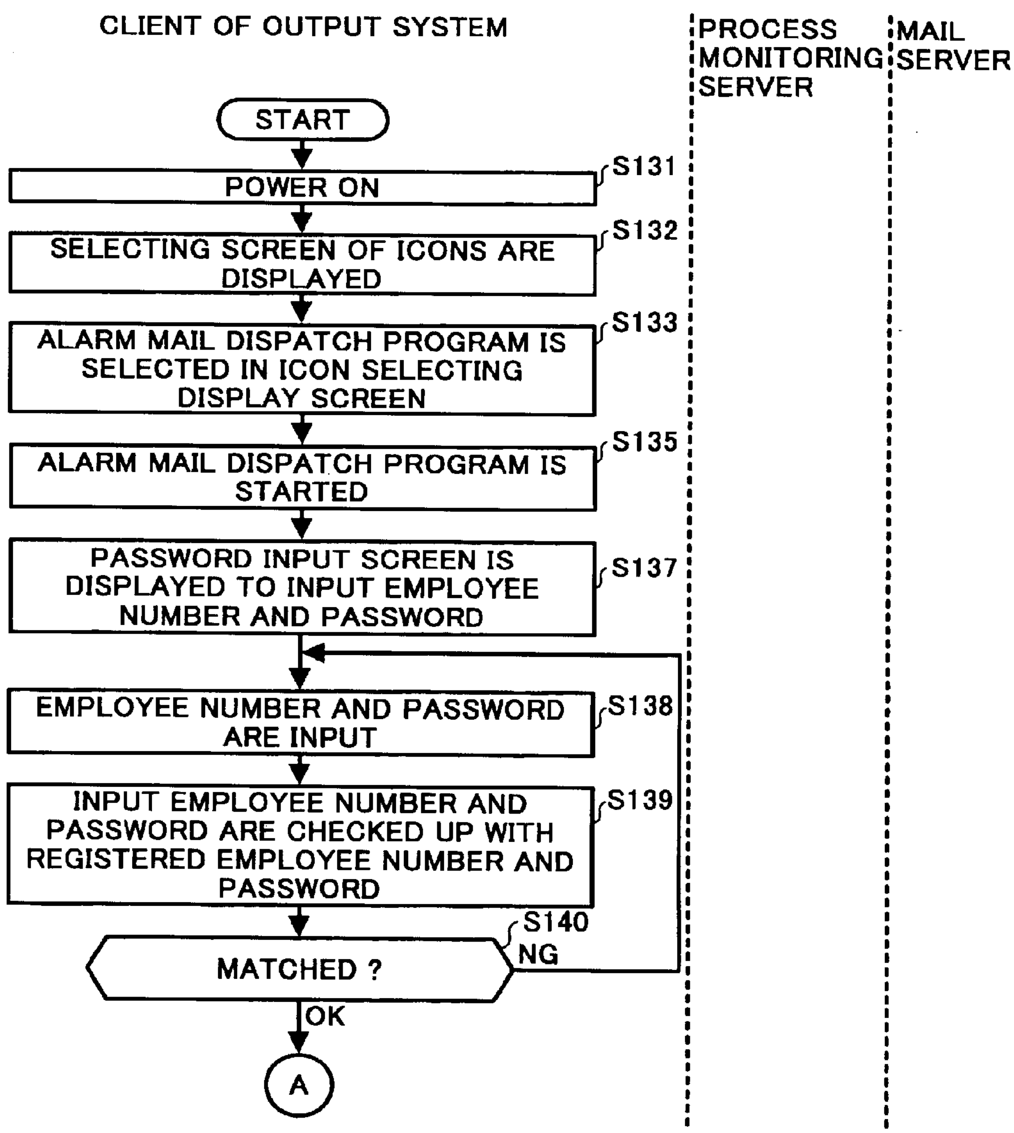
Figure 141B:
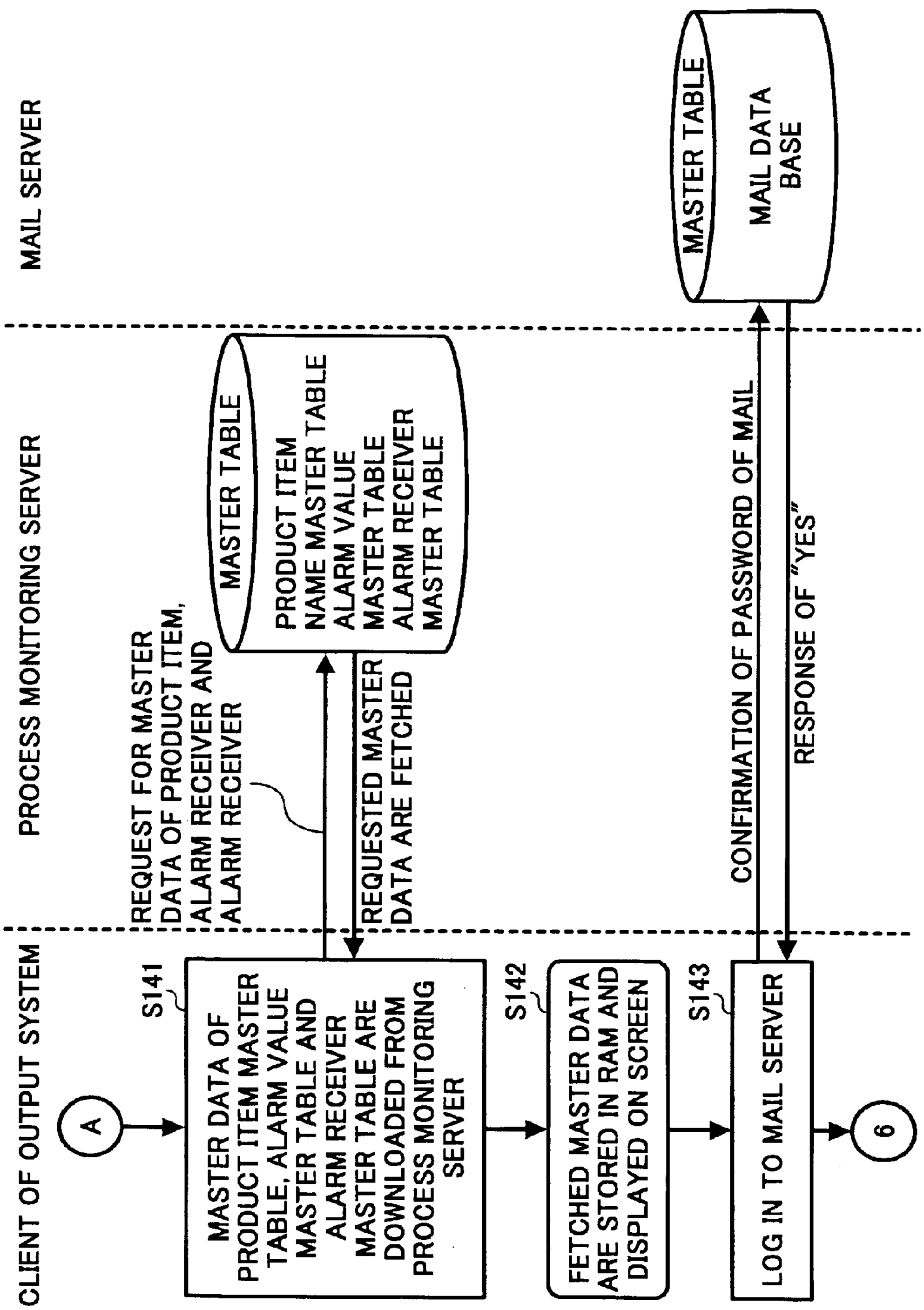

FIG. 141 is a flow chart to explain a process of alarm mail dispatch of the client of management system.

Figures 142, 142A:
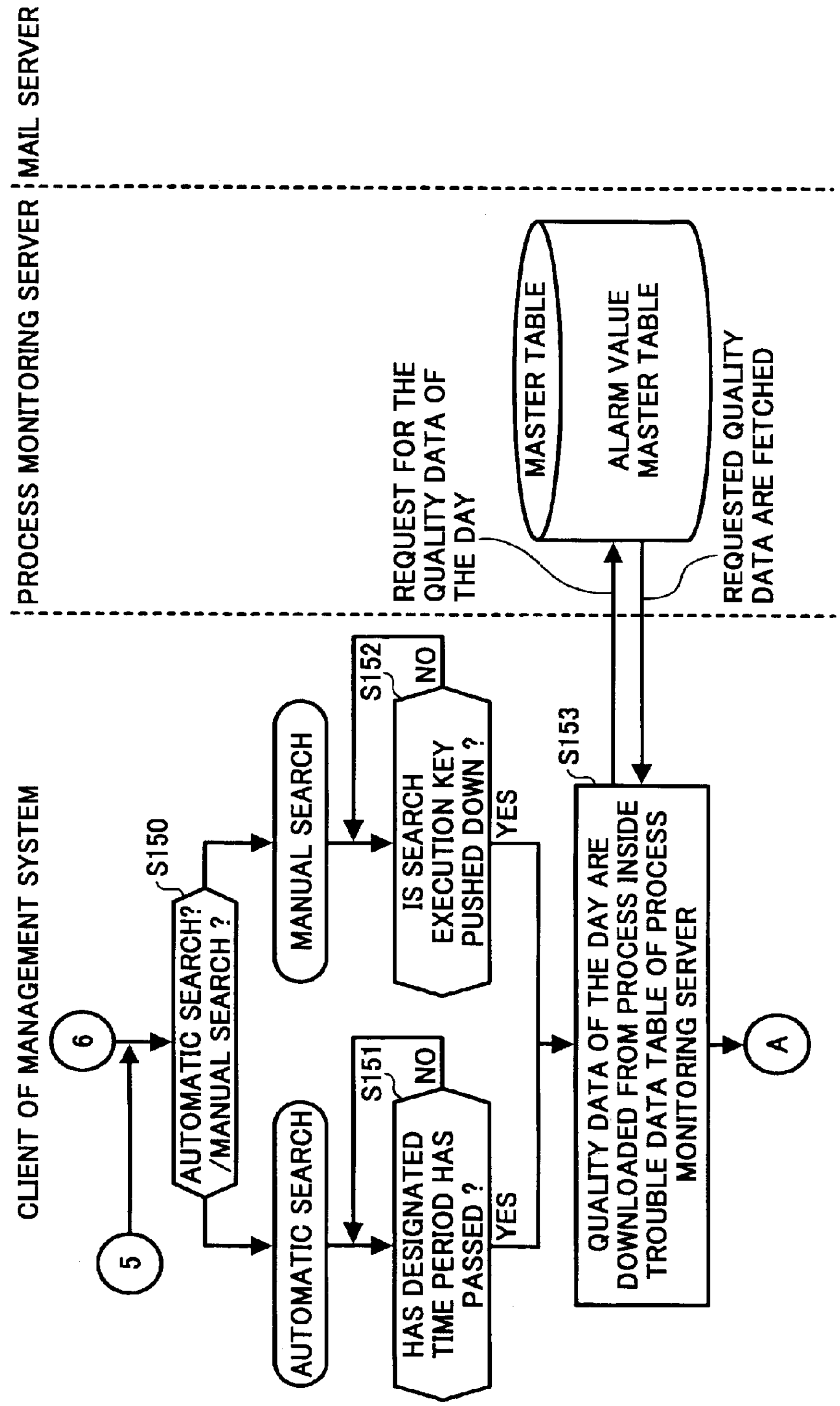
Figure 142B:
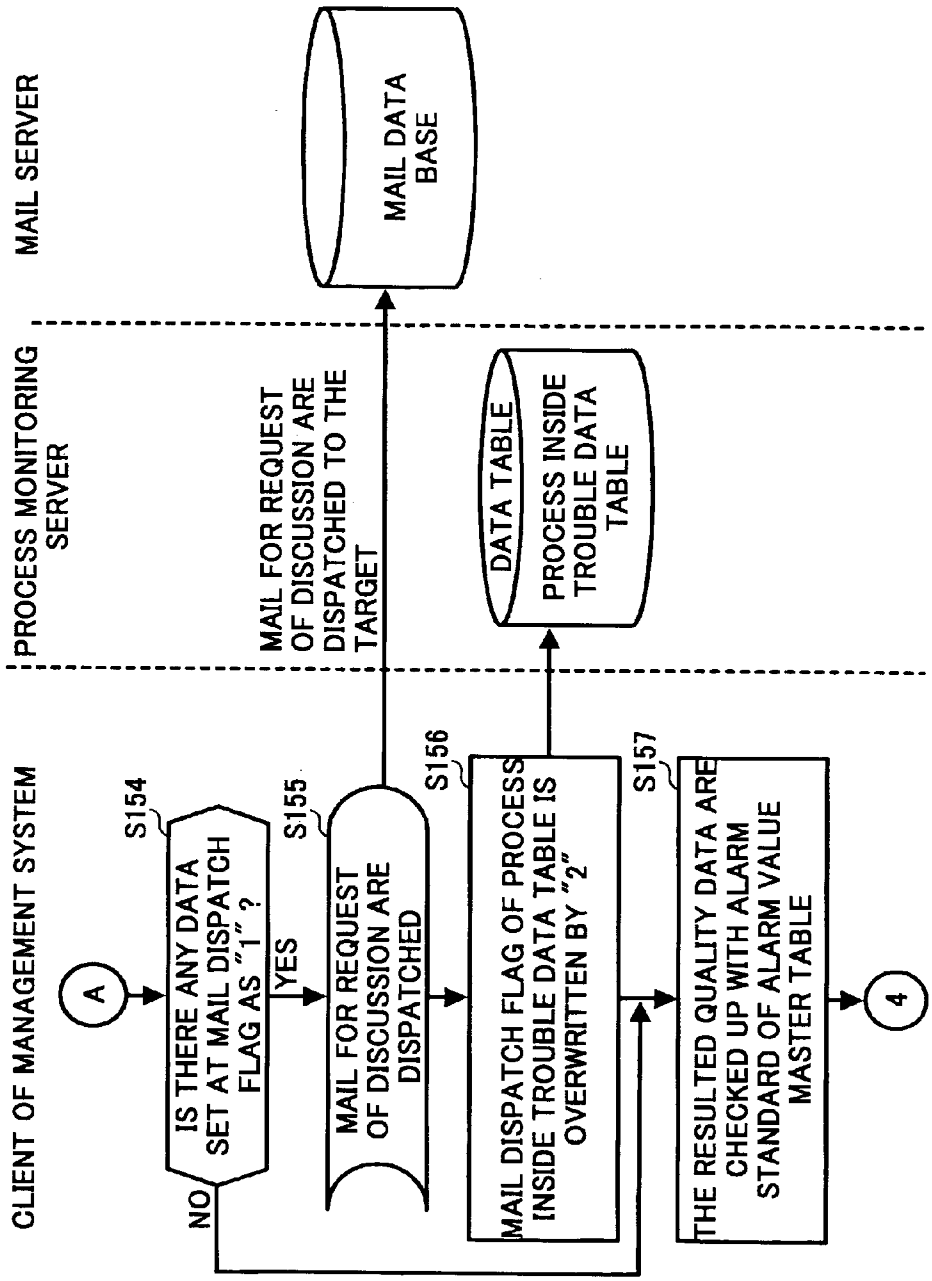

FIG. 142 is a flow chart to explain a process of alarm mail dispatch of the client of management system.

Figure 143:
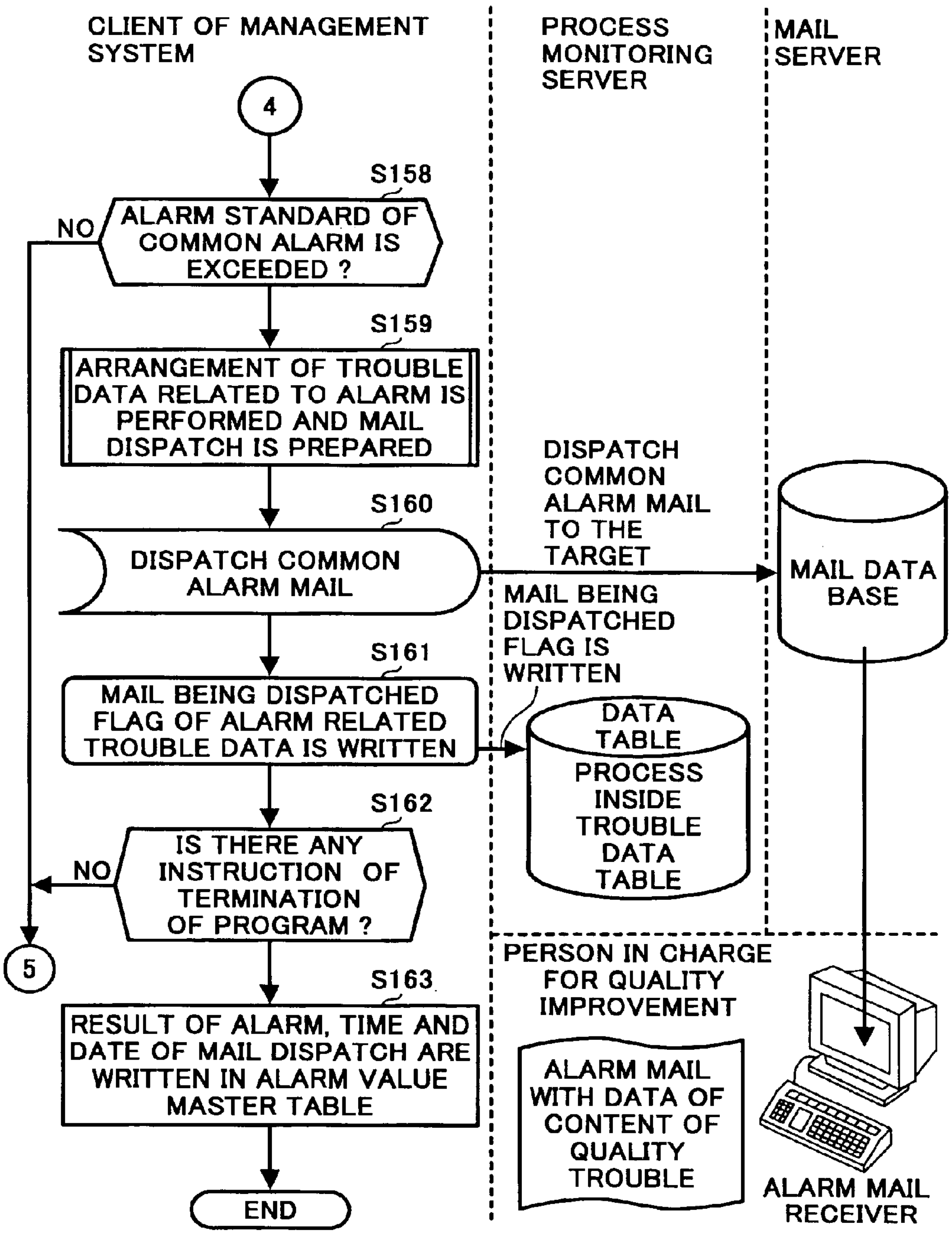

FIG. 143 is a flow chart to explain a process of alarm mail dispatch of the client of management system.

Figure 144:
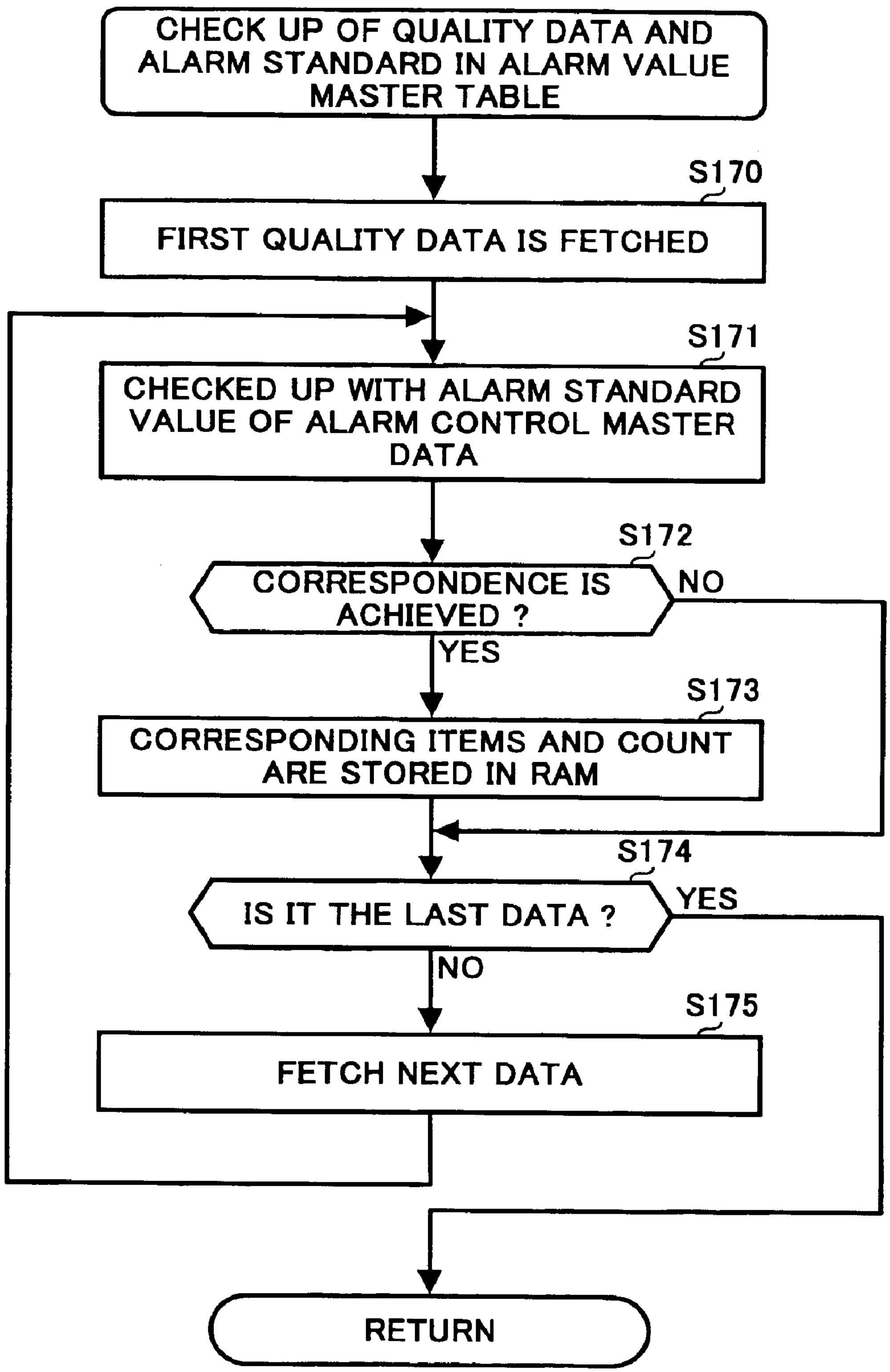

FIG. 144 is a diagram to explain an example of screen display of alarm mail dispatch process.

Figure 145:
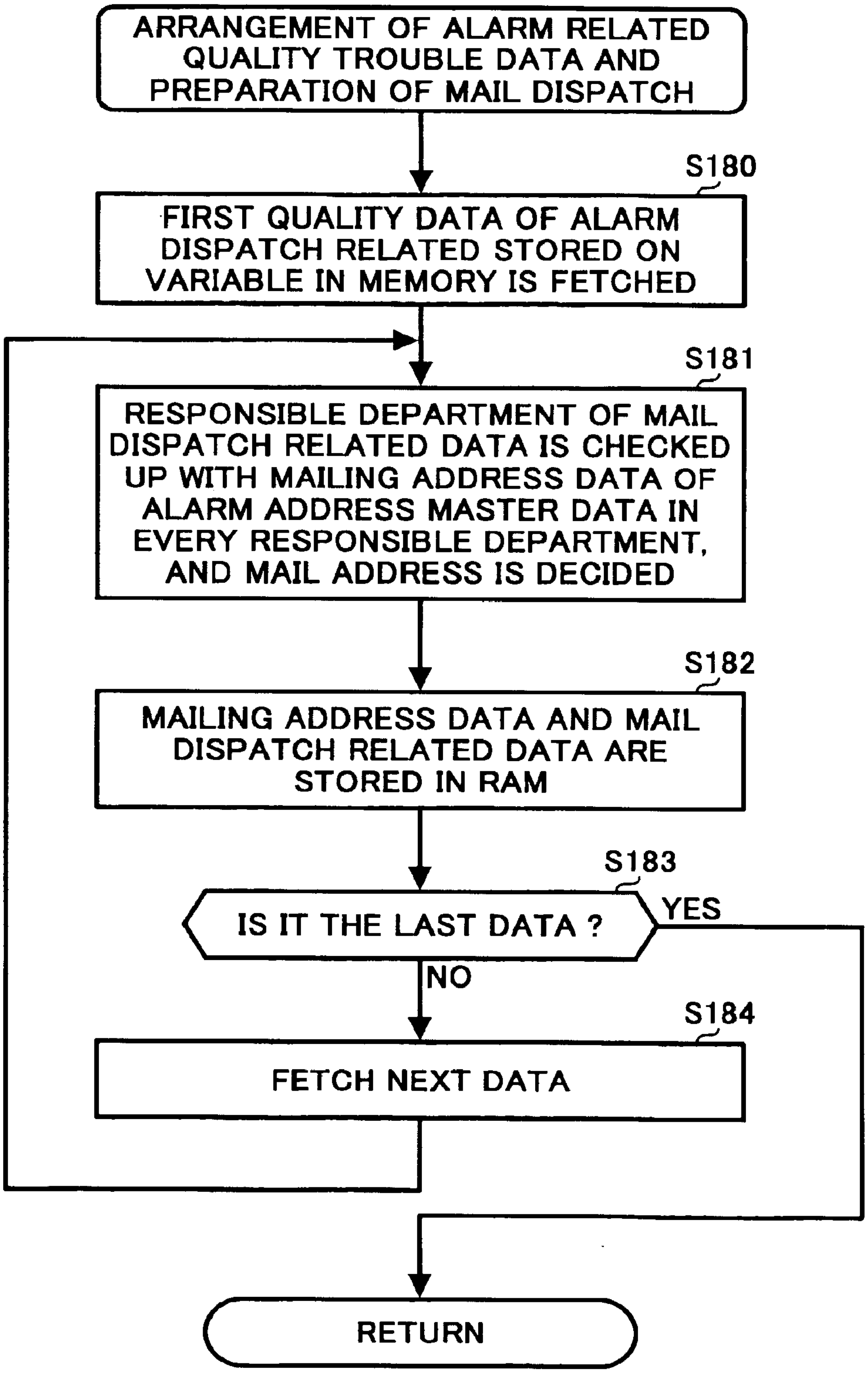

FIG. 145 is a diagram to explain an example of screen display of alarm mail dispatch process.

Figure 146A:
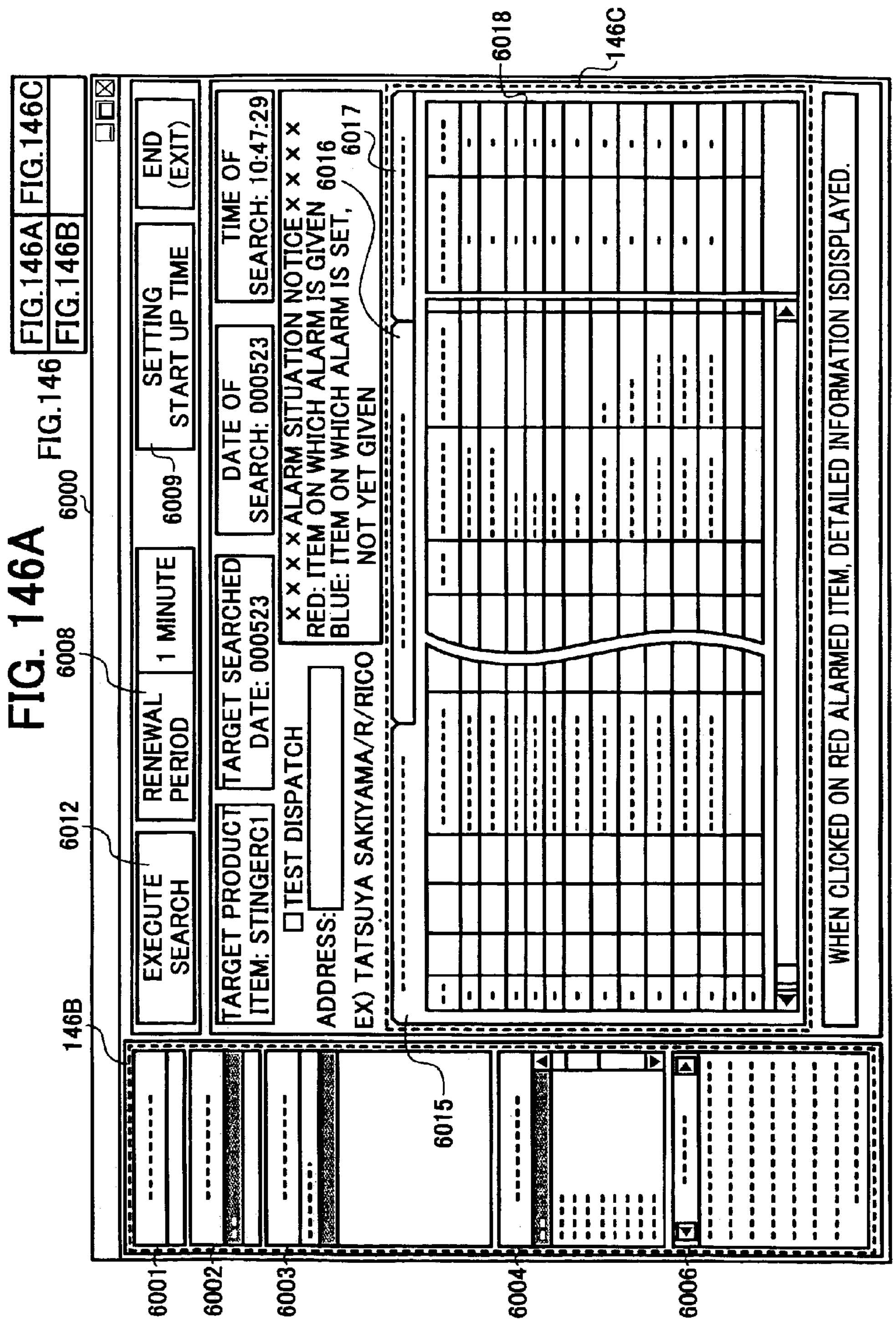
Figure 146B:
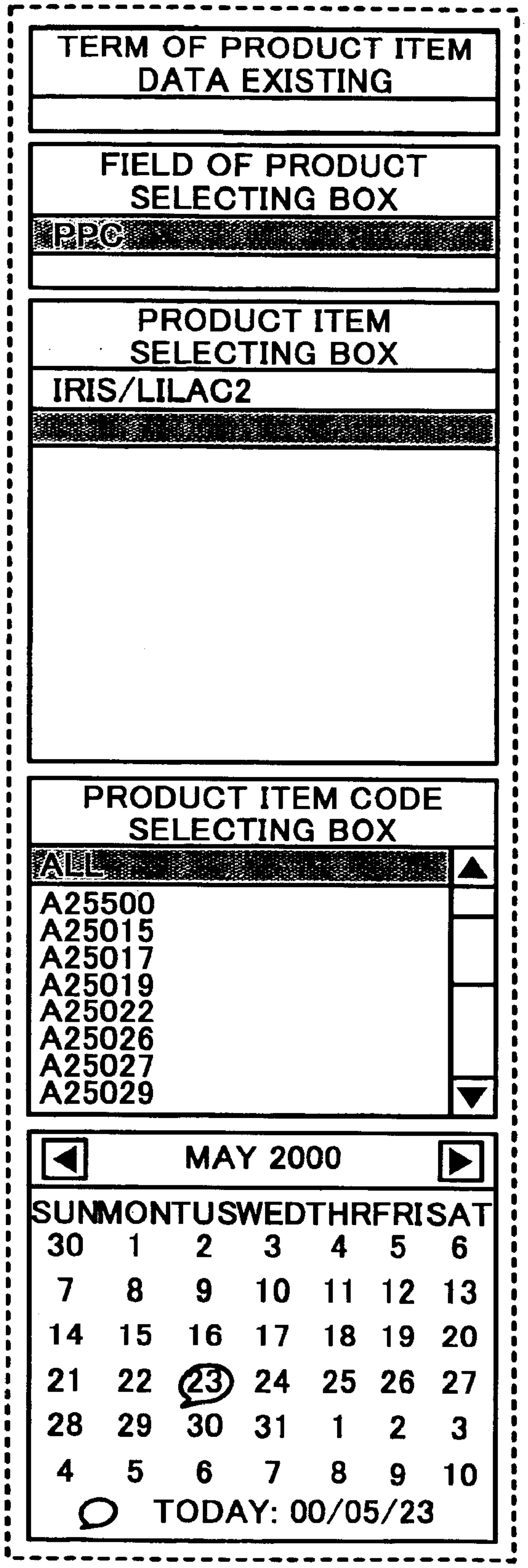

FIG. 146 is a diagram to explain an example of screen display of alarm mail dispatch process.

Figure 147A:
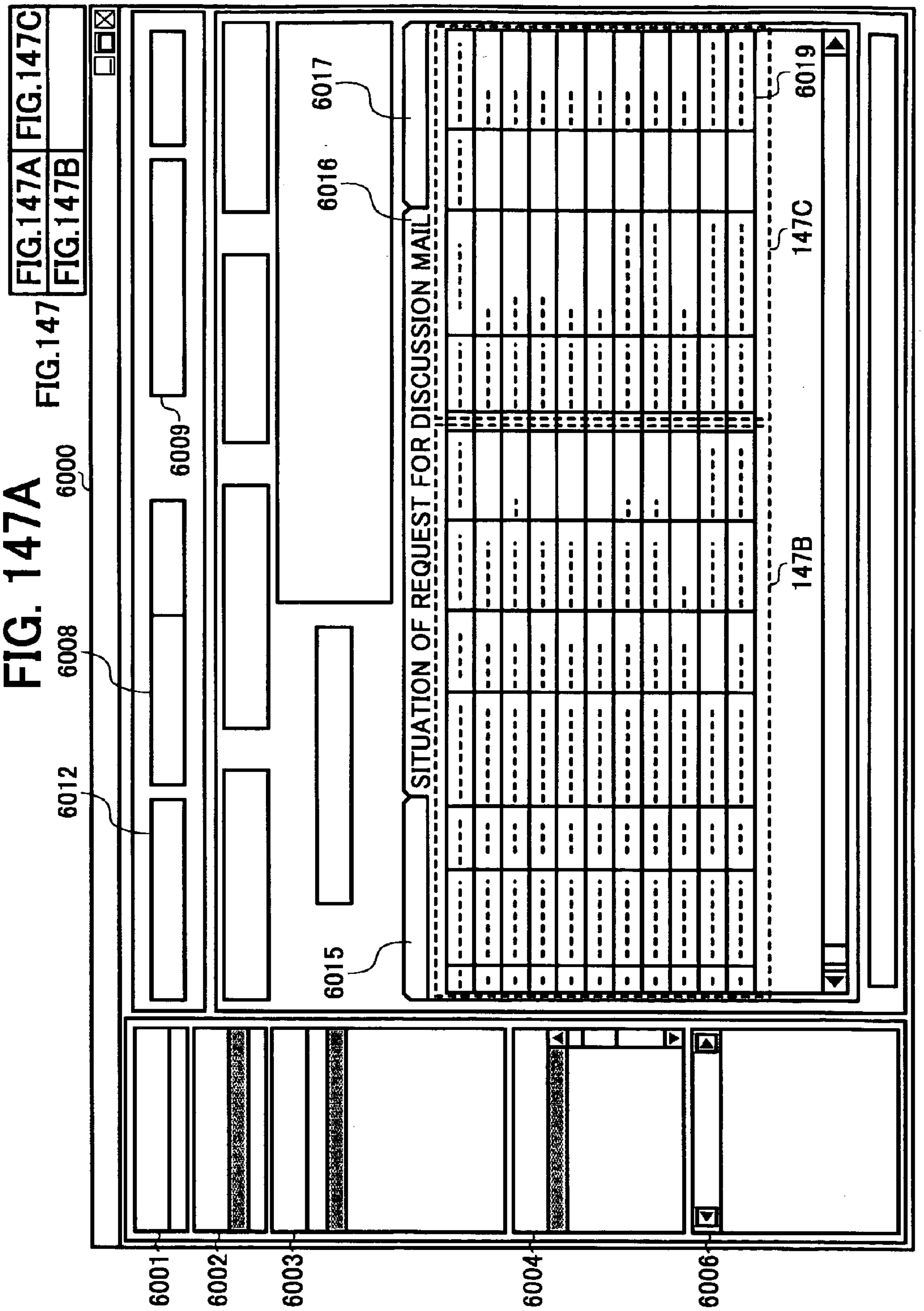

FIG. 147 is a diagram to explain an example of screen display of alarm mail dispatch process.

Figure 148A:
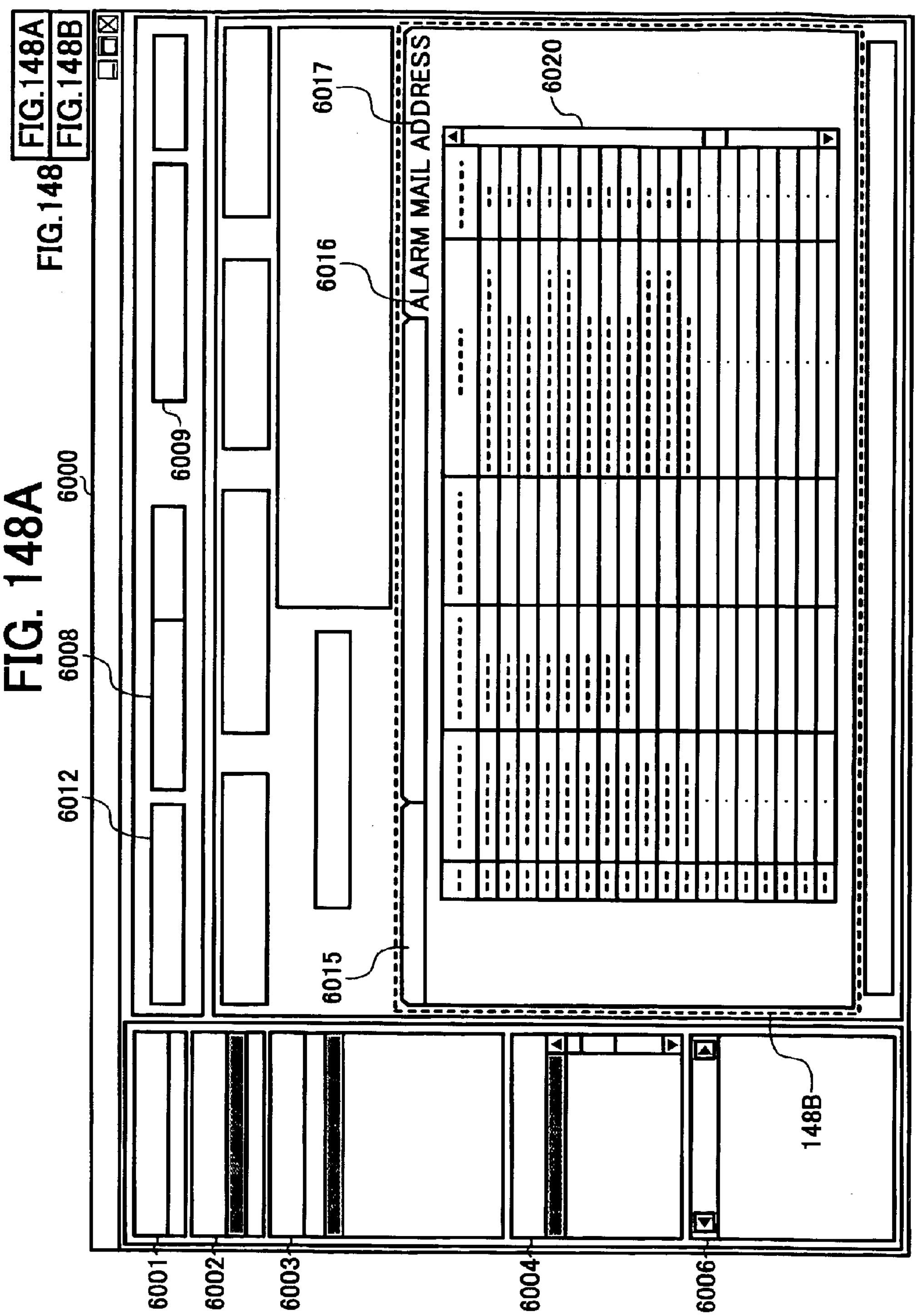

FIG. 148 is a diagram to explain an example of screen display of alarm mail dispatch process.

Figure 149:
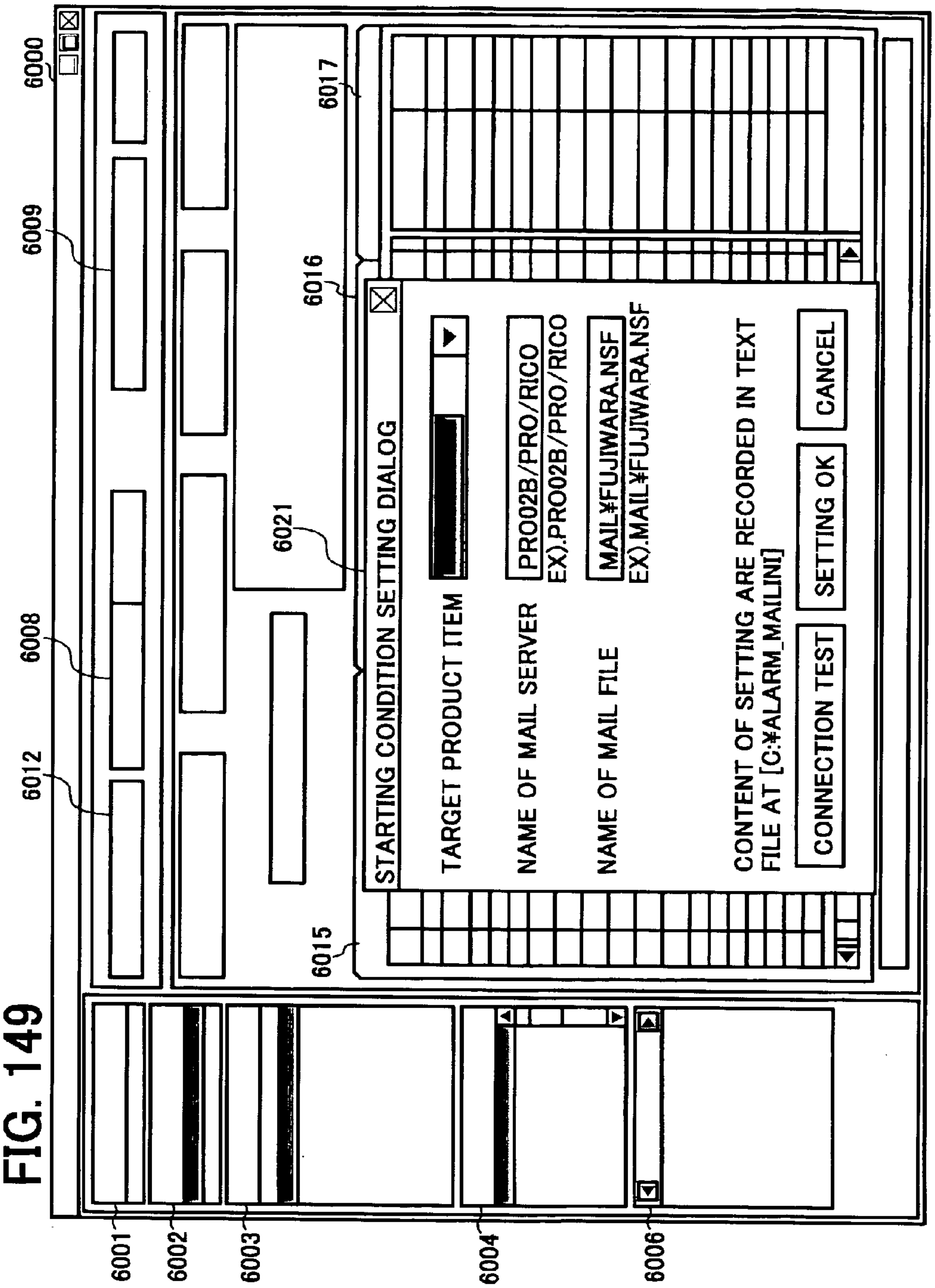

FIG. 149 is a diagram to explain an example of screen display of alarm mail dispatch process.

FIG. 150 is a diagram to explain an example of screen display of alarm mail dispatch process.

Figure 151A:
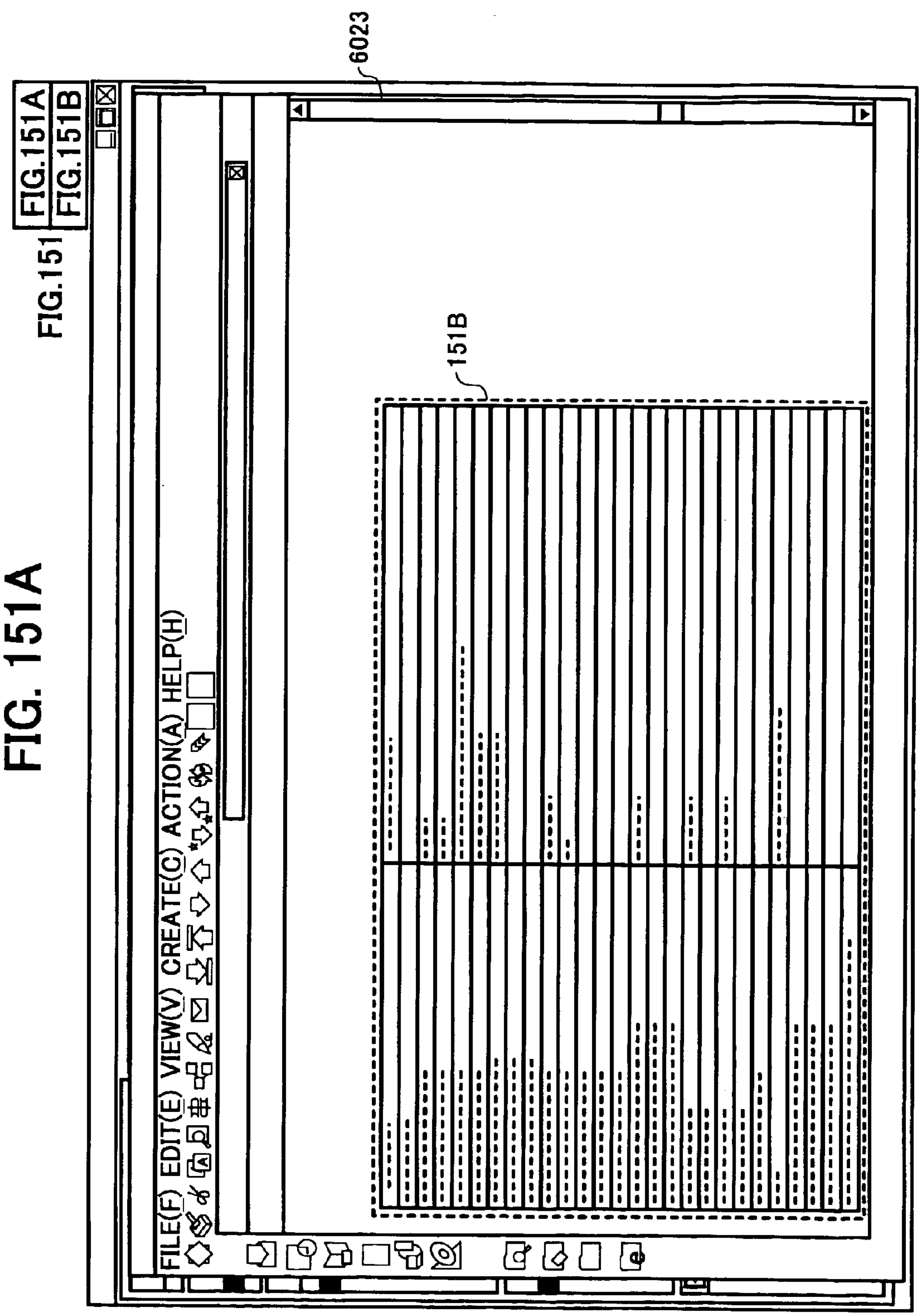

FIG. 151 is a diagram to explain an example of screen display of alarm mail dispatch process.

DETAILED DESCRIPTION OF PREFERRED EMBODIMENTS

Hereinafter preferred embodiments of the present invention will be described with reference to the accompanied drawings.

Figure 1:
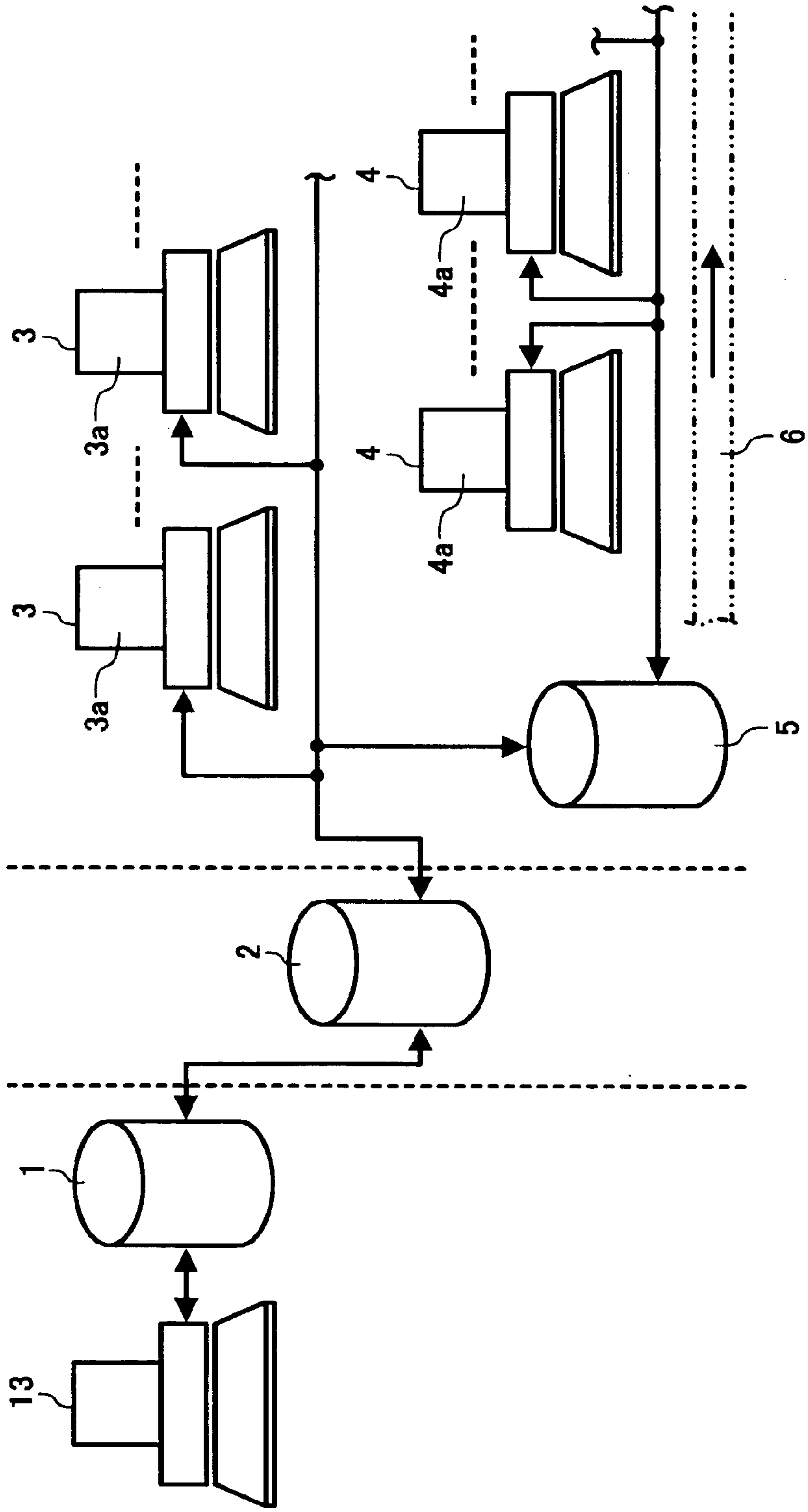
FIG. 1 is a schematic diagram of a product market quality information analyzing back up system according to the present invention.

FIG. 1 is a schematic diagram of a product market quality information analyzing back up system according to the present invention.

This system is provided to use for an analysis of market quality of a product (copying machine in this example), and includes a maintenance record data base 1 as a maintenance record information storing apparatus, a SQL server 2, a computer (processing means) 3 as a product market quality analyzing back up apparatus installed in a factory in which copy machines are manufactured, a computer 4 which is installed in the factory and a production history data base 5.

In the explanation below it will be given that data are processed by the computer 4, however, the SQL server 2 can be utilized as the data base of a processing side.

Figure 2:
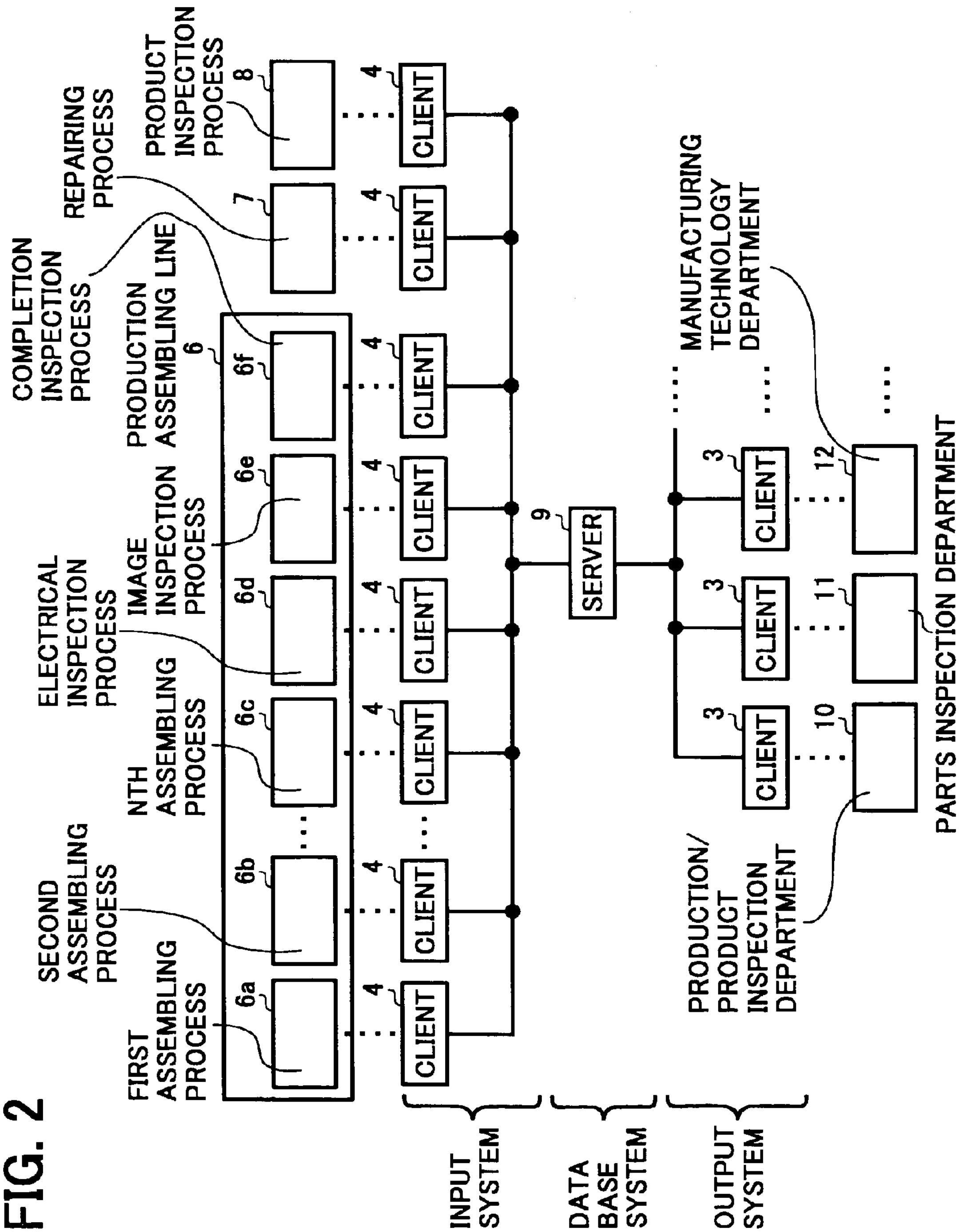
FIG. 2 is a schematic diagram to show one example of assembly process in a factory side in the system shown in FIG. 1.

The computers 4, as shown in FIG. 2, are used respectively and independently in a 1st assembly process 6*a*, a 2nd assembly process 6*b*, . . . , Nth assembly process 6*c*, an electrical inspection process 6*d*, an image inspection processed 6*e* and a completion inspection 6*f* of a manufacturing assembly line 6 of a copy machine, and at the same time it is used in subsequent repairing process 7 and product inspection process 8. The respective computers 4 are connected to a server 9 through LAN and so on. And the production history data base 5 is connected to the server 9 or housed therein.

The computer 3 is installed in the production/product inspection department 10, the parts inspection department 11, the manufacturing technology department 12 and so on, and are connected to the server 9 through LAN and so on. At the same time the computer 3 is connected to the SQL server 2 through WAN (Wide Area Network), LAN (Local Area Network) (See FIG. 1).

In respective production processes 6*a* to 6*f* of the production assembly line 6, the repairing process 7 and the product inspection process 8, the items such as the product item brevity code, the product number, name of operator, various items of the control items, the control specification, the item of inspection, the inspection specification, the symptom of trouble, the corrective action, the result of corrective action, the year and month of production, and so on are displayed on the display screens on respective computers 4. To the corresponding item of the display screen, information is input when the assembling process and so on at the production process are performed by operator of the respective production processes.

At the 1st assembling process 6*a* which is the first stage of production process in the manufacturing assembly line 6, an assembling serial number is given to specify the intermediate goods which are now on being assembled, and this assembling serial number is substituted by the product item brevity code and the product number after completion, it allows for the product to be identified even after the product has been shipped. (About the product item brevity code and product number, the explanation will be given later.) The date of production is input at the product inspection process 8 which is the last production process, and the information input at the respective production processes are sent to the production history data base 5 and stored therein.

A content of the production history information stored in the production history data base 5 can be referred to by the computer 3 at the related department such as the production/inspection department 10, the inspection department 11, manufacturing technology department 12 and so on. That is to say, the server 9 outputs a list of the reports such as a situation of trouble occurrence in various format such as based on the production process, the item of trouble or the content of trouble, as shown if FIG. 3 to the computer 3 installed in the related department from which the demand for output is performed in compliance with a demand for output from the computer 3. By this arrangement report persons in charge at the respective related departments can monitor the situation in the production process of the product in a real time, and can cope rapidly with the trouble when it happens, for example, during its assembly, however, it will be described later in detail as a production management system In the maintenance record data base 1, the maintenance record information of the copy machines which are made at the above described factory and delivered to the customer, are stored. The maintenance record information is input periodically or occasionally from the computer 13 which are allocated in various locations. As the input items of maintenance record, items such as listed below are included as shown in FIG. 4.

Product item brevity code (product item): number to specify the product item

Item Name content of the product item brevity code (abbreviated name of product correspondingly defined by the product item brevity code)

Product Number (Product Item Number)

identification number of the product to distinguish products designated by the same product item brevity code, which composes product identification number (product inherent number (product ID) integrate with the product item brevity code Date of Maintenance Carried Out year, month, date when the maintenance is carried out, herein the term "maintenance" means maintenance of broad meaning which includes such as the delivery of product Classification of Visit number to designate a reason (cause) for a maintenance staff to visit the customer Item Name 1 content of classification of reason for visit (reason correspondingly defined by the classification of visit)

Counter 1 total amount of black and white copy when the maintenance is carried out (time of visit)

Counter 2 total amount of colour copy when the maintenance is carried out (time of visit) (input only for colour applicable copy machine)

ACV mean amount of black and white copy per month

ACV2 mean amount of colour copy per month (input only for colour applicable copy machine)

Date of Delivery year and month when the product is delivered to the customer

Date of Production year and month when the product is manufactured

Operating Month elapsed months from date of delivery when maintenance is carried out Comment on Maintenance 1 remarks for maintenance staff to write freely

Trouble Symptom 1 number to designate trouble on product

Item Name 2 content of symptom 1 (trouble decided correspondingly to symptom 1)

Detailed Portion Symptom 1 number to designate concrete portion where trouble happened with the symptom 1

Item Name 3 content of detailed portion symptom 1 (concrete portion defined correspondingly to detailed portion symptom 1)

Cause of Trouble 1 number to designate cause of trouble by which trouble of symptom 1 occur

Item Name 4 content of cause of trouble 1 (cause defined correspondingly to cause of trouble 1)

Corrective Action 1 number to designate corrective action carried by the maintenance staff

Item Name 5 content of corrective action 1 (number defined correspondingly to corrective action 1)

Detailed Portion Corrected 1 number to designate concrete portion where corrective action is made

Item Name 6 content of detailed portion corrected 1 (concrete portion defined correspondingly to detailed portion corrected 1)

Result 1 number to designate result of corrective action 1

Item Name 7 content of result 1 (number defied correspondingly to result 1

At this point, the maintenance record table shown in FIG. 4 is written down in two columns divided between the comment on maintenance 1 and the symptom 1, however this is only for convenience of notation used for patent application. In one actual example of the record, all items are written in only one single column which is extending in one line from the product item brevity code to the item 7, item name, product number, date of maintenance carried out, classification of visit, item name 1, counter 1, counter 2, ACV, ACV2, date of delivery, year and month of production, operating month, comment on maintenance 1, symptom 1, item name 2, detailed portion symptom 1, item name 3, cause of trouble 1, item name 4, corrective action 1, item name 5, detailed portion corrected 1, item name 6, result 1, item name 7 are straightly dispose according to product item brevity code. By this arrangement when it is viewed in horizontal direction from left most to right most, all features can be comprehended at a glance, and market information of product which is specified by product item brevity code and product number, can be clearly understood.

The maintenance record information which is input to the maintenance record data base 1, are sent periodically, for example, once a day from the maintenance record data base 1 to the SQL server 2 through WAN (Wide Area Network) or LAN (Local Area Network). At this time they are stored in the computer 3 so that the information is easily utilized by the computer 3 for purposes as described below.

The computer 3 is available to display the production history on the screen 3*a* as described above and at the same time it is available to extract adequately information of product about market quality (market quality information)

among the maintenance record information stored in the SQL server 2 to process and to analyze on in order to display a transition situation of market quality of the product on the screen 3*a*.

Figure 5:
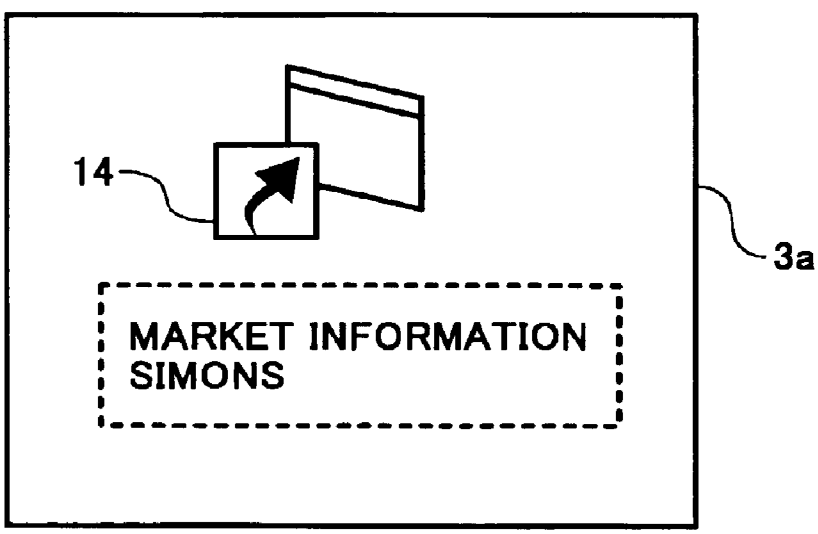
FIG. 5 is an explanatory diagram of initial screen of the monitor of personal computer shown in FIG. 1.
Figure 6:
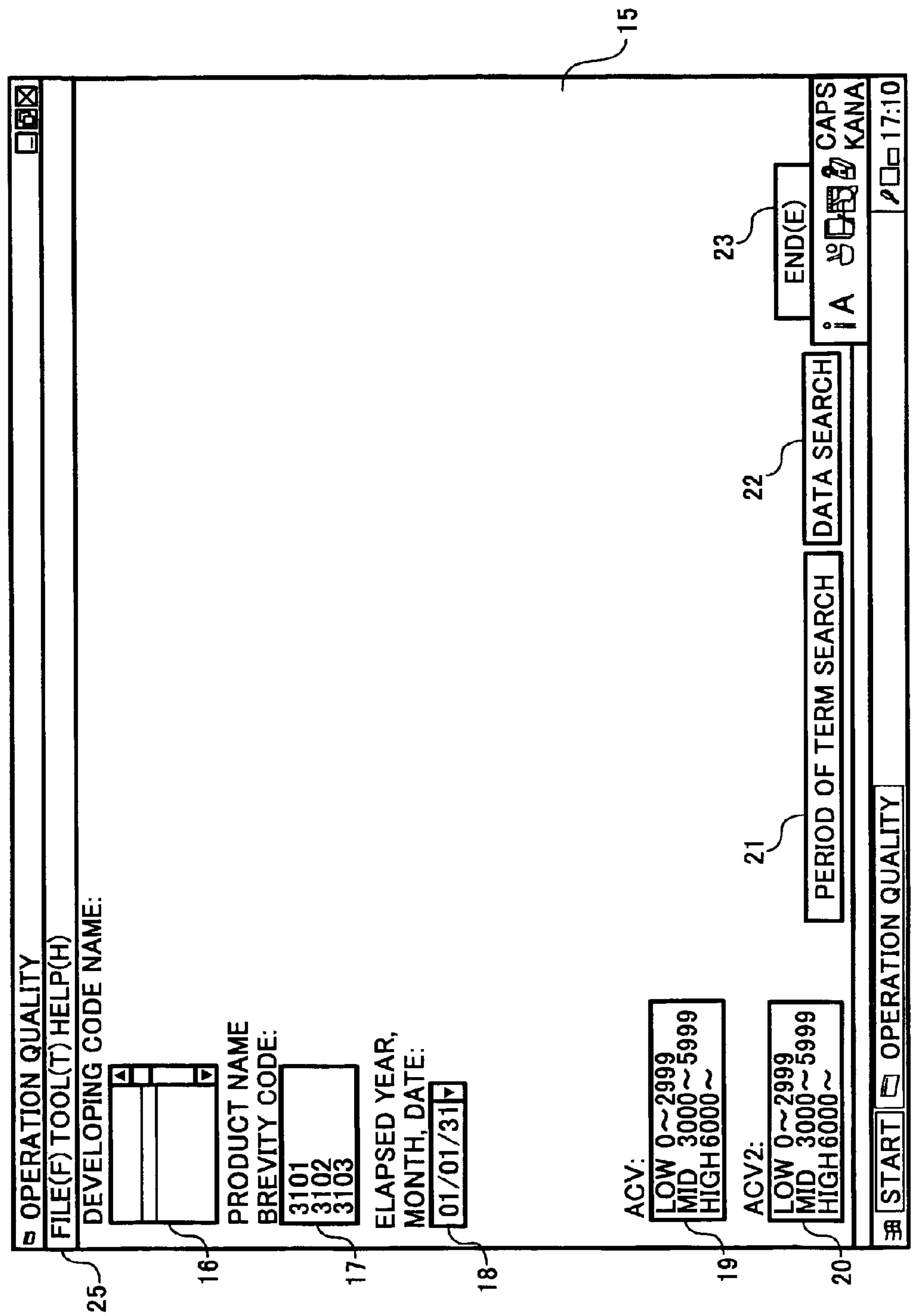
FIG. 6 is an explanatory diagram of search condition setting screen of the monitor of personal computer shown in FIG. 1.

On the desktop screen of the computer 3 as shown in FIG. 5 an icon 14 by which the processing and analyzing are started, is displayed. When the icon 14 is clicked the display of screen (screen of the monitor device as a display means) 3*a* is changed to a search condition setting screen 15 as shown in FIG. 6. On the search condition setting screen 15 a developing code name list box 16, the product item brevity code list box 17, an input box for passed period after delivery 18, the ACV label 19, the ACV2 label 20, a search on period button 21, a search on data button 22, a button to terminate 23 and so on are displayed.

Figure 7:
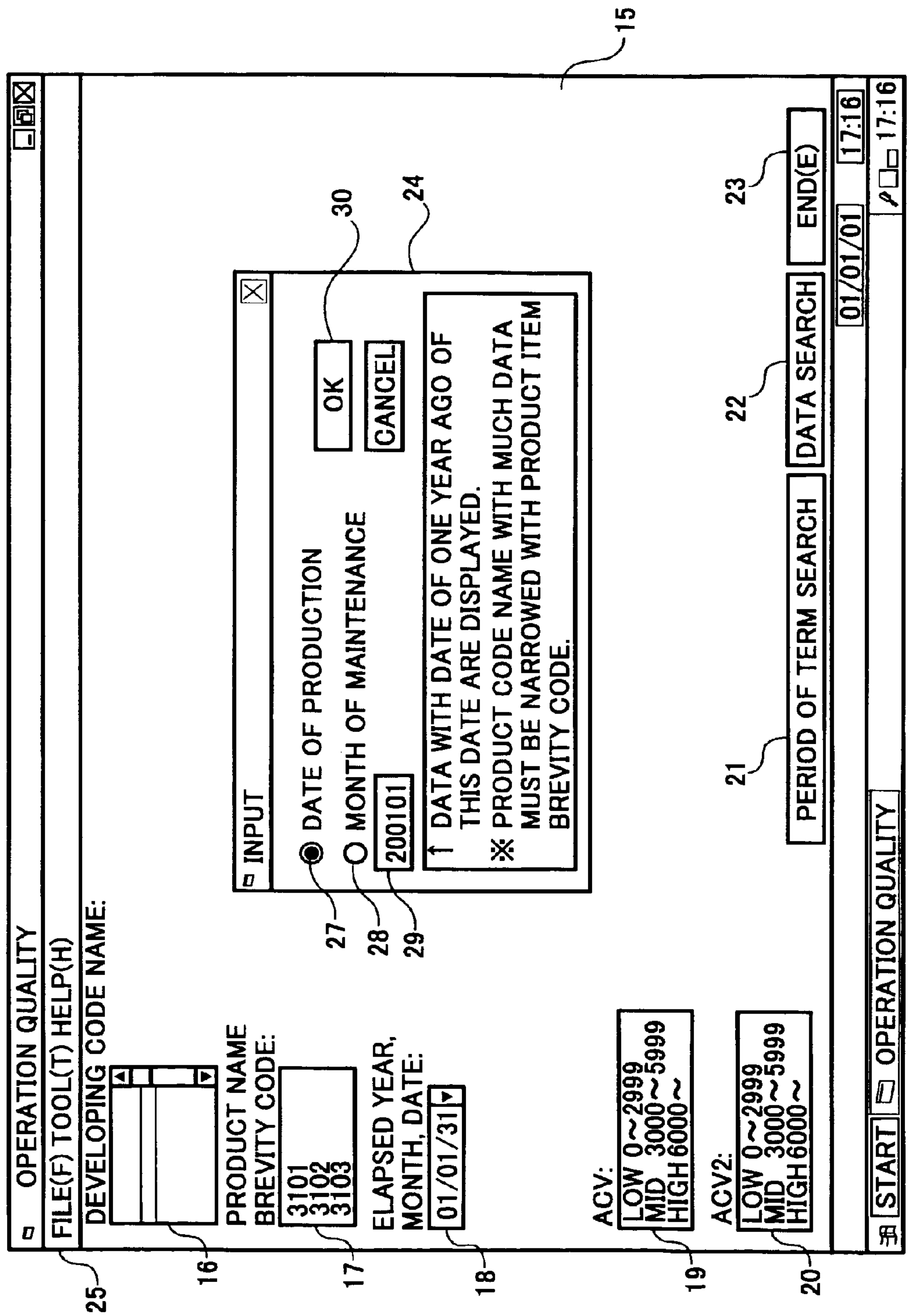
FIG. 7 is an explanatory diagram to show a state that a dialog box is displayed on the search condition setting screen of the monitor of personal computer shown in FIG.6.

When the developing code name of the copy machine is selected in the developing code name list box 16 of the search condition setting screen 15, a picking of the product item brevity code corresponding to the selected developing code is displayed in the product item brevity code list box 17. (The product item brevity code are made different even when the product developing code are the same at copy machines operated in different power supply voltages.) When the product item brevity code is selected in the product item brevity code list box 17 and the search for period button 21 is clicked, a dialog box 24 shown in FIG. 7 is displayed. Though in FIGS. 6 and 7 the picking in the product item brevity code box 17 is not especially selected, in such case it is supposed and processed that all of the pickings are selected.

At this point, the input box for passed period after delivery 18 is arranged to specify a search period that how long period the machine is operated when the market quality information is extracted by the computer 3 from the SQL server 2, and only information about the machines that are operated longer than the period input are made to be extracted. When there is no specific date which is input in the input box for passed period after delivery 18, the date on which the search is made is automatically input.

Figure 8:
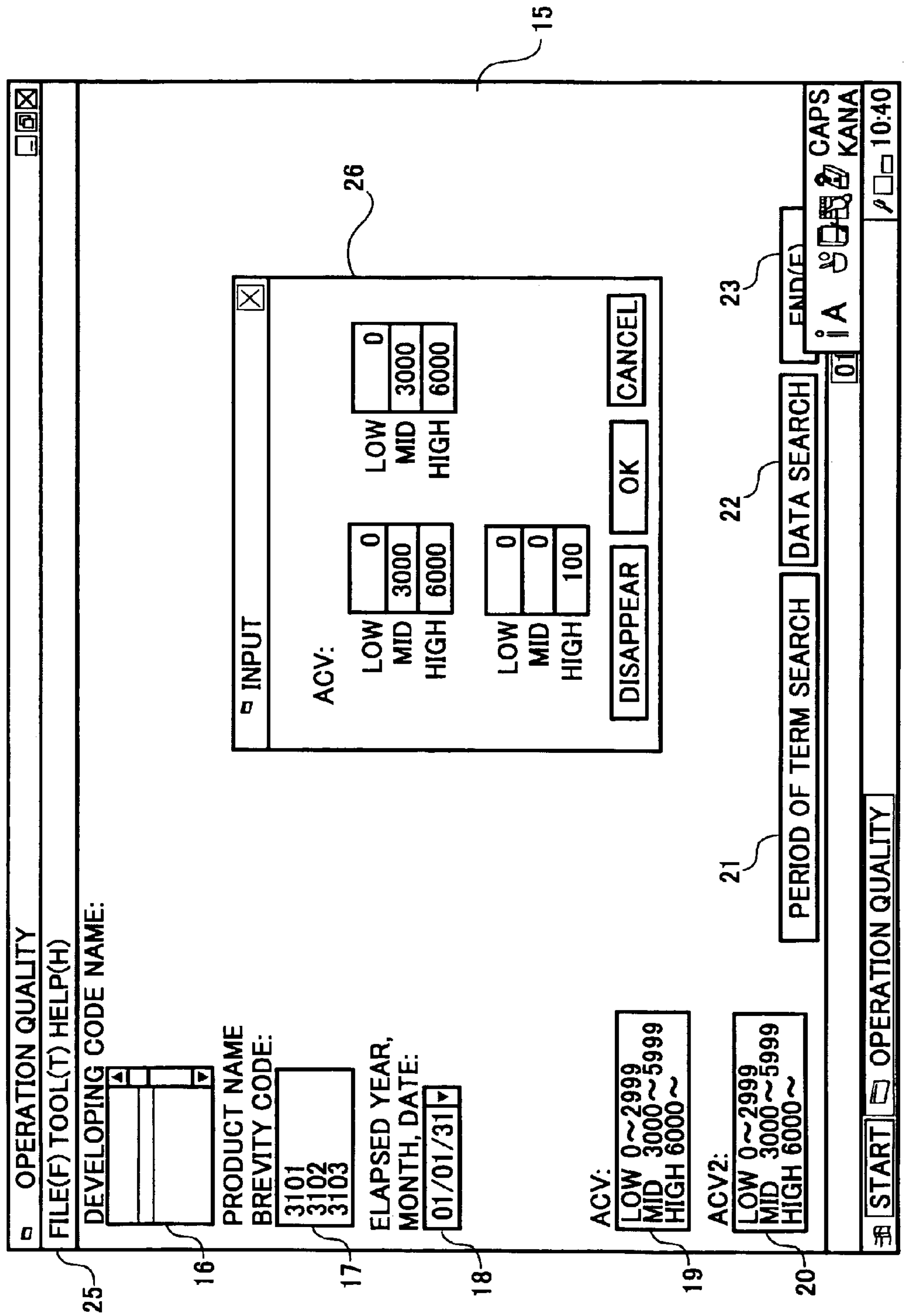
FIG. 8 is an explanatory diagram to show a state that an option is displayed on the search condition setting screen of the monitor of personal computer shown in FIG. 6.

Because an option setting box 26 shown in FIG. 8 is displayed when "Tool"—"Option" are selected at the menu bar 25 in top of the screen, the respective values displayed in the ACV label 19 and ACV2 label 20 can be set or changed in the option setting box 26. For example, when the ACV is set as low: 0, mid: 3000, high: 6000, for a machine whose the average copy quantity of black and white per one month is between 0 to 2999 as shown in the ACV label 19, the ACV is judged "low", for a machine whose the average copy-quantity of black and white per one month is between 3000 to 5999, the ACV is judged "mid" and for a machine whose the average copy quantity of black and white per one month is over 6000, the ACV is judged "high". And for ACV2 it is set as low: 0, mid: 3000, high: 6000, a judgment for "low", "mid" and "high" can be achieved.

At this point, the termination button 23 is arranged to terminate the application.

In the dialog box 24 a radio button 27 to specify a "term of year and month of production", a radio button 28 to specify a "term of maintenance record", a period input box 29 to input arbitrary year month and date and an OK button 30 are displayed. When the OK button 30 is clicked in a state that the radio button 27 is checked, one year's worth of the market quality information with the date from one year before the date specified in the period input box 29 are input from the SQL server 2 to the computer 3 and temporally stored. At this point, because the period input box 29 is input as 2001, 01, only information about machines whose year and month of production input at the item of "year and month of production" are between 2000, February and 2001, January, are extracted by the computer 3. The computer 3 works only on the extracted information for analysis, and displays a market quality transition situation display screen 31 shown in FIG. 9 on the screen 3*a*.

In the market quality transition situation display screen 31 the table 32 shows a count of call, the count of operating machine and a rate of call about the product manufactured in the month of year which are shown in the upper most of table. In this embodiment, a period 2000, February to 2001, January is shown in the upper most of the table, the "count of call" belongs to the respective month of year is calculated by counting the information whose "classification of reason for visit" or "Item name 1" of the input item shown in FIG. 4, is "6" or "call".

The "count of operating machine" is calculated based on the "product item brevity code" and the "product number" in the same input items, because there is a possibility that a plurality of maintenance record (for example, "delivery", "periodic check up" and so on) exist about the machines having the same "product item brevity code" and "product number" that is to say the same product, if a plurality of the maintenance information about the product having the same "product item brevity code" and the same "product number" exist, they are collectively counted as one in order not to be counted redundantly.

The "rate of call" is calculated by a division process of the above described "count of call" by the "count of operating machine" in respective month of year and it designates a rate of calls from customers about a products which are made in the respective month of year. As above described, though a redundant counting for the same product is prohibited in the count for the "count of operating machines", because a counting for the "count of call" is performed without consideration whether the information is on the same product or not, the "count of call" can be larger than the "count of operating machines" and the "rate of call" may exceed 100%. Due to this fact, the "rate of call" is not utilized as a strict value but utilized to comprehend a degree of quality trouble as a rough standard.

In an upper portion of the table 32 a graph 33 is shown, which designates the content of the table 32. In the graph 33 X axis shows the "year and month of production" and Y axis shows the "count of call" and the "rate of call", and the "count of call" and the "rate of call" are designated by a bar chart and a line chart respectively.

In the upper portion of market quality transition situation display screen 31, a plurality of characters strings and radio buttons 34*a* to 34*z* which correspond to the character strings are disposed. At this point, the radio button 34*a* which is corresponding to the character strings "sum" is checked and a result of summation about all the information whose "item name 1" is related to "call" stored temporally in the computer 3, is displayed. (Hereinafter the information with the "item name 1" related to the "call" is referred to as "call information") when the radio button 34*b* to 34*z* which are corresponding to the other character strings, are selected, information is displayed as below listed.

Operation 3D

Figure 16A:
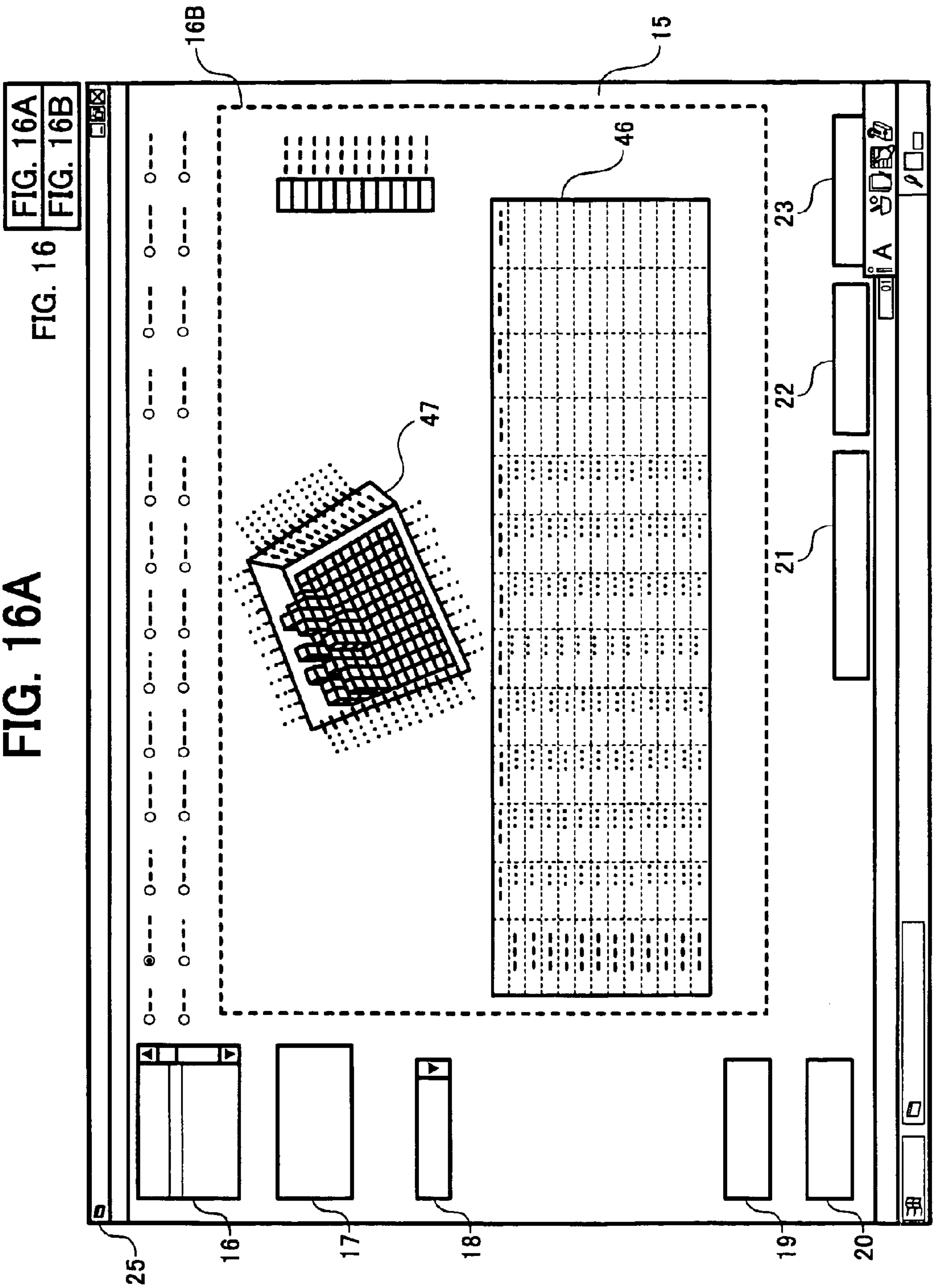
FIG. 16 is a diagram to show a state that market quality situation is stereoscopic displayed on the display monitor of personal computer shown in FIG. 1.
Figure 16B:
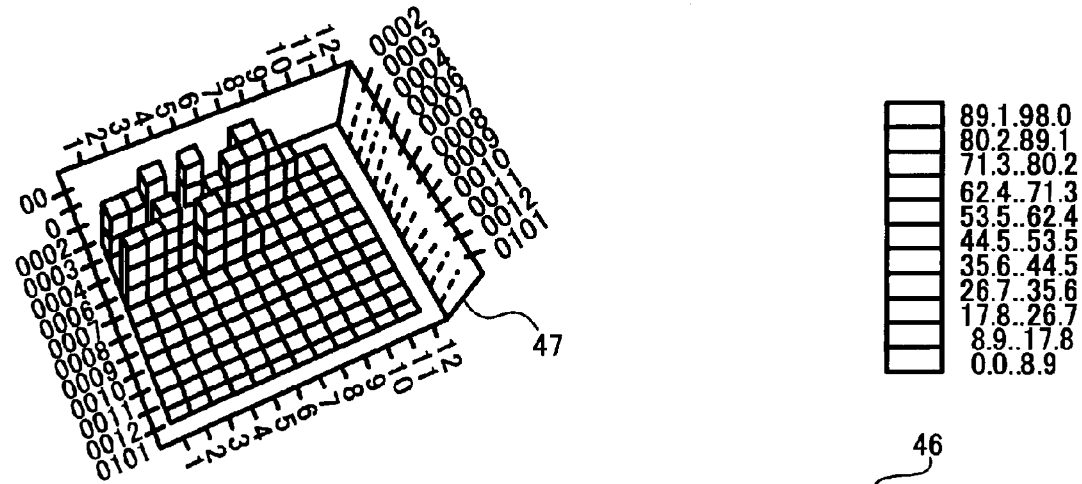

About all the call information extracted the count of call is displayed in three dimension with both of parameters of elapsed months and year and month of production (See FIG. 16).

A "low" 3D

About the call information of product which has the ACV "low" (in this case about the call information which has the mean value of amount of black and white copy 0 to 2999 per month), the count of call is displayed in three dimension with both of parameters of elapsed months and year and month of production.

A "mid" 3D

About the call information of product which has the ACV "mid" (in this case about the call information which has the mean value of amount of black and white copies 3000 to 5999 per month), the count of call is displayed in three dimension with both of parameters of elapsed months and year and month of production.

A "high" 3D

About the call information of product which has the ACV "high" (in this case about the call information which has the mean value of amount of black and white copy over 6000 per month), the count of call is displayed in three dimension with both of parameters of elapsed months and year and month of production.

A2 "low" 3D

About the call information of product which has the ACV2 "low" (in this case about the call information which has the mean value of amount of color copies 0 to 2999 per month), the count of call is displayed in three dimension with both of parameters of elapsed months and year and month of production.

A2 "mid" 3D

About the call information of product which has the ACV2 "mid" (in this case about the call information which has the mean value of amount of color copies 3000 to 5999 per month), the count of call is displayed in three dimension with both of parameters of elapsed months and year and month of production.

A2 "high" 3D

About the call information of product which has the ACV2 "high" (in this case about the call information which has the mean value of amount of color copies over 6000 per month), the count of call is displayed in three dimension with both of parameters of elapsed months and year and month of production.

Counter 1 3D

About all the call information extracted the count of call is displayed in three dimensions with both of parameters of the counter 1 and the year and month of production. At this time the axis of counter 1 is defined such that a difference between the maximum value of the counter 1 and the minimum value of the counter 1 is divided in 12 regions, and the count of calls are compiled on the basis of every regions.

Counter 2 3D

About all the call information extracted the count of call is displayed in three dimensions with both of parameters of the counter 2 and the year and month of production. At this time the axis of counter 2 is defined such that a difference between the maximum value of the counter 2 and the minimum value of the counter 2 is divided in 12 regions, and the count of calls are compiled on the basis of every regions.

Initial

About the call information of product which has elapsed months less than one, the count of calls is displayed with parameter of the year and month of production.

Elapsed

About the call information of product which has a specific year and month of production, the count of calls is displayed with parameter of the elapsed months from production.

A "low"

About the call information of product which has the ACV "low", the count of calls is displayed with parameter of the year and month of production.

A "mid"

About the call information of product which has the ACV "mid" the count of calls is displayed with parameter of the year and month of production.

A "high"

About the call information of product which has the ACV "high" the count of calls is displayed with parameter of the year and month of production.

A2 "low"

About the call information of product which has the ACV2 "low", the count of calls is displayed with parameter of the year and month of production.

A2 "mid"

About the call information of product which has the ACV2 "mid" the count of calls is displayed with parameter of the year and month of production.

A2 "high"

About the call information which has the ACV2 "high" the count of calls is displayed with parameter of the year and month of production.

Counter 1

About the call information of product which has a specified year and month of production, the count of calls is displayed with parameter of the value of counter 1. At this time the axis of counter 1 is defined such that a difference between the maximum value of the counter 1 and the minimum value of the counter 1 is divided in 12 regions, and the count of calls are compiled on the basis of every regions.

Counter 2

About the call information of product which has a specified year and month of production, the count of calls is displayed with parameter of the value of counter 2. At this time, the axis of counter 2 is defined such that a difference between the maximum value of the counter 2 and the minimum value of the counter 2 is divided in 12 regions, and the count of calls are compiled on the basis of every regions.

Figure 10A:
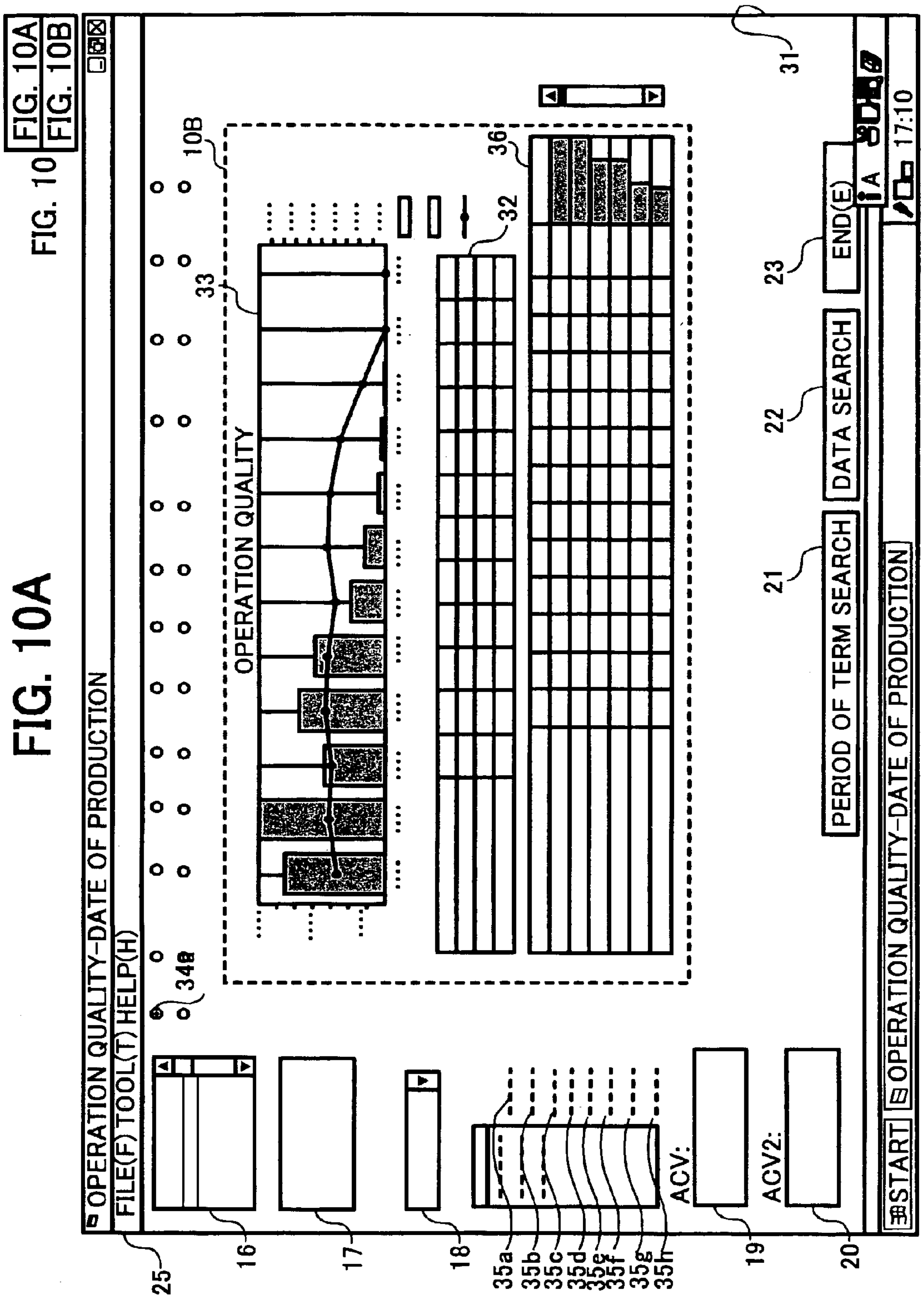
FIG. 10 is a diagram to show a state that a maintenance comment list is displayed as a synoptic table on the market quality transition situation display screen sown in FIG. 9.
Figure 10B:
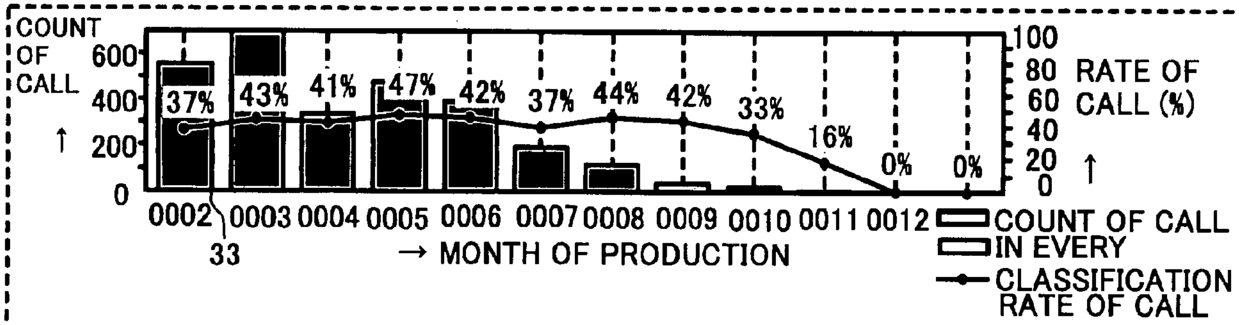

In the market quality transition situation display screen 31, the item based information display buttons 35*a* to 35*h* are disposed in order to designate the content of input items of the "comment on maintenance 1", "symptom 1", "detailed symptom at the site 1", "cause of trouble 1", "corrective action 1", "detailed portion of corrective action 1" and "result 1" shown in FIG. 4. For example, when the item based information display button 35*a* is clicked to display the content of "comment on maintenance 1", a comment on maintenance information synoptic table 36 shown in FIG. 10 is displayed on the screen 3*a*. In the comment on maintenance information synoptic table 36, a count of the call information with certain comment is displayed on the basis of year and month of production, for example, in FIG. 10 the call with a comment "Jam at Fixer" (paper jamming at fixing portion) happened twice in February 2000 and the summation from February 2000 to January 2001 is 26. The bar chart disposed in right of the comment on maintenance information synoptic table 86 shows a rate the count of call that is related to other comment when the count of call with the most frequent comment in summation is 100.

Figure 11A:
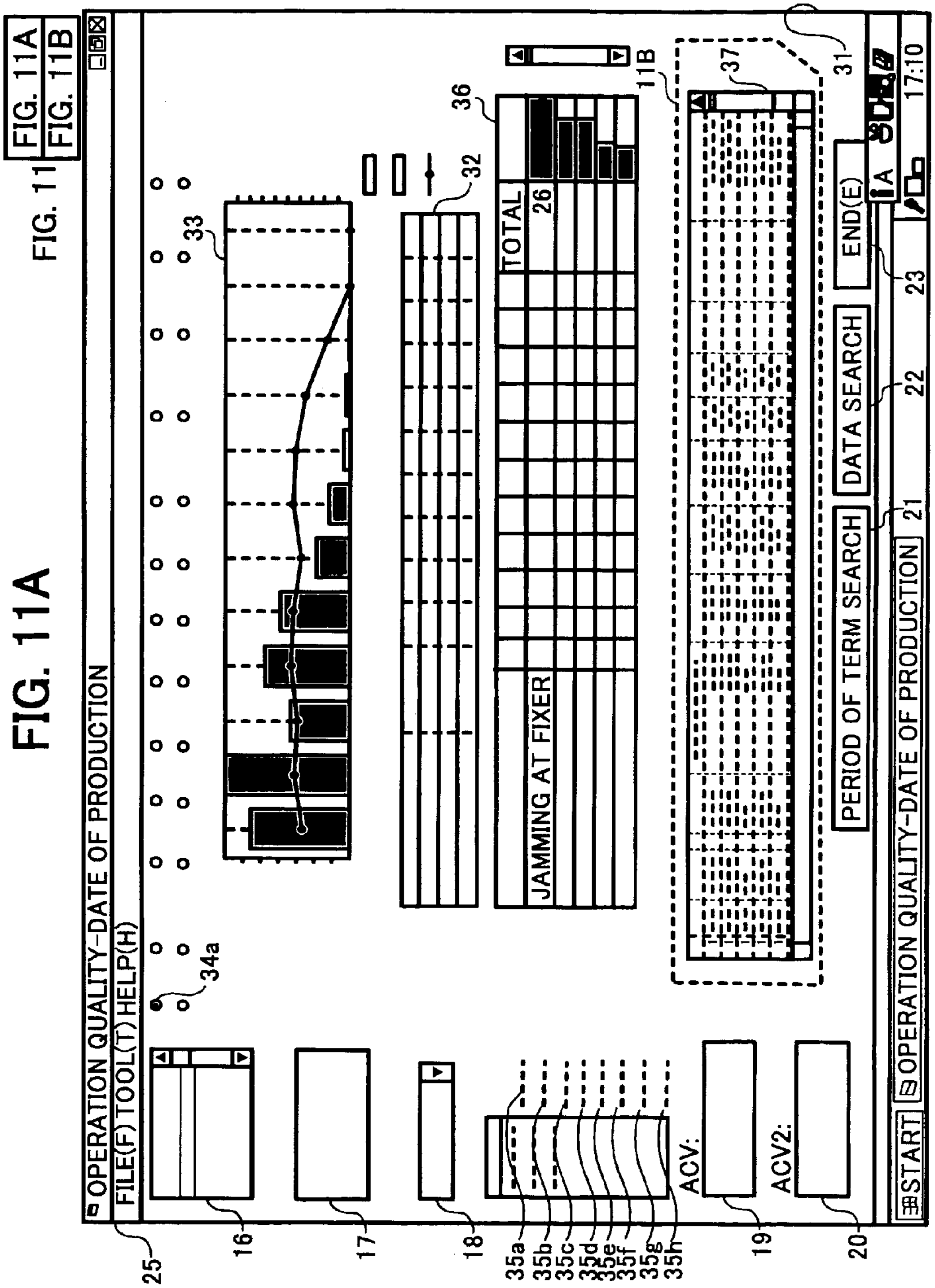
FIG. 11 is a diagram to show a state that an individual information list is displayed on the market quality transition situation display screen shown in FIG. 9.
Figure 11B:
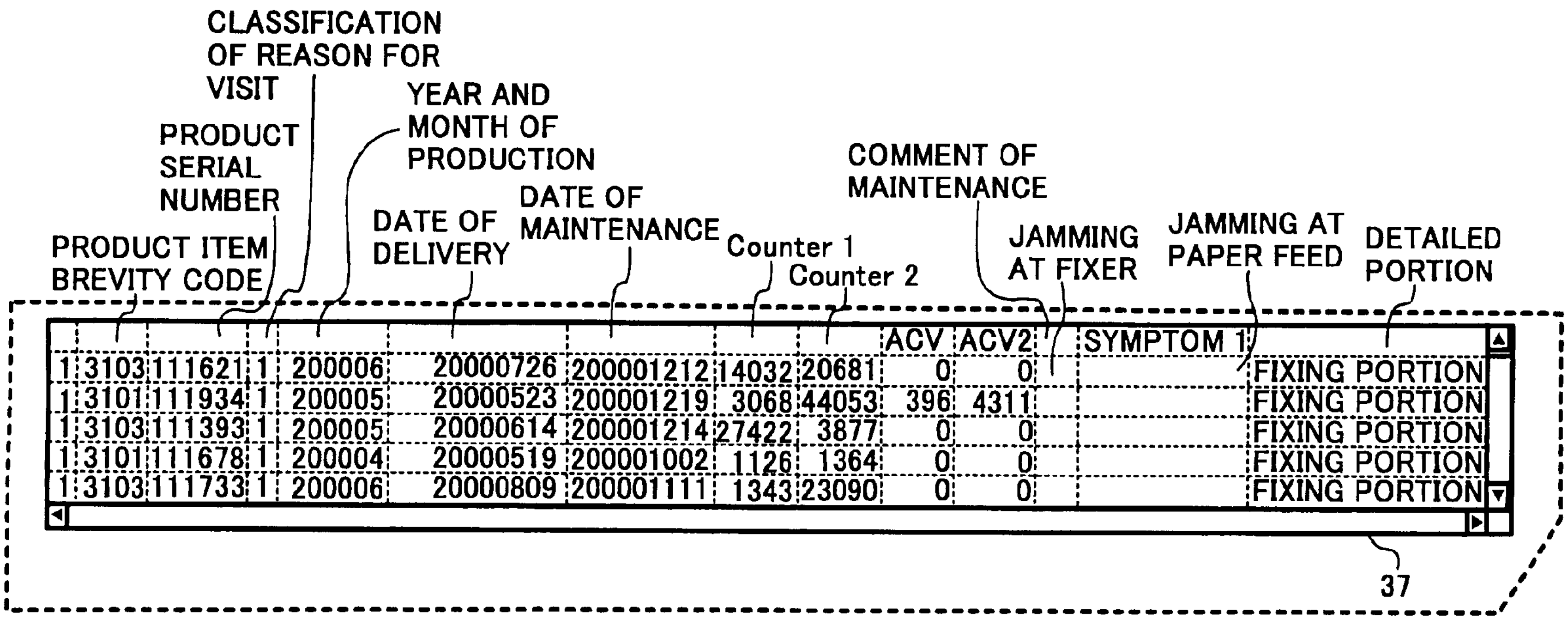

When an arbitrary count of call is clicked in the comment on maintenance information synoptic table 36, a detailed information of the call information which composes the count clicked is displayed on the display screen 3*a* of computer 3. For example, when the count "26" which is the yearly summation of "Jam at Fixer" is clicked, the call information included in the count is displayed in the individual information display column 37 as shown in FIG. 11 and contents of all the items related to the call information can be seen.

Figures 12, 12A:
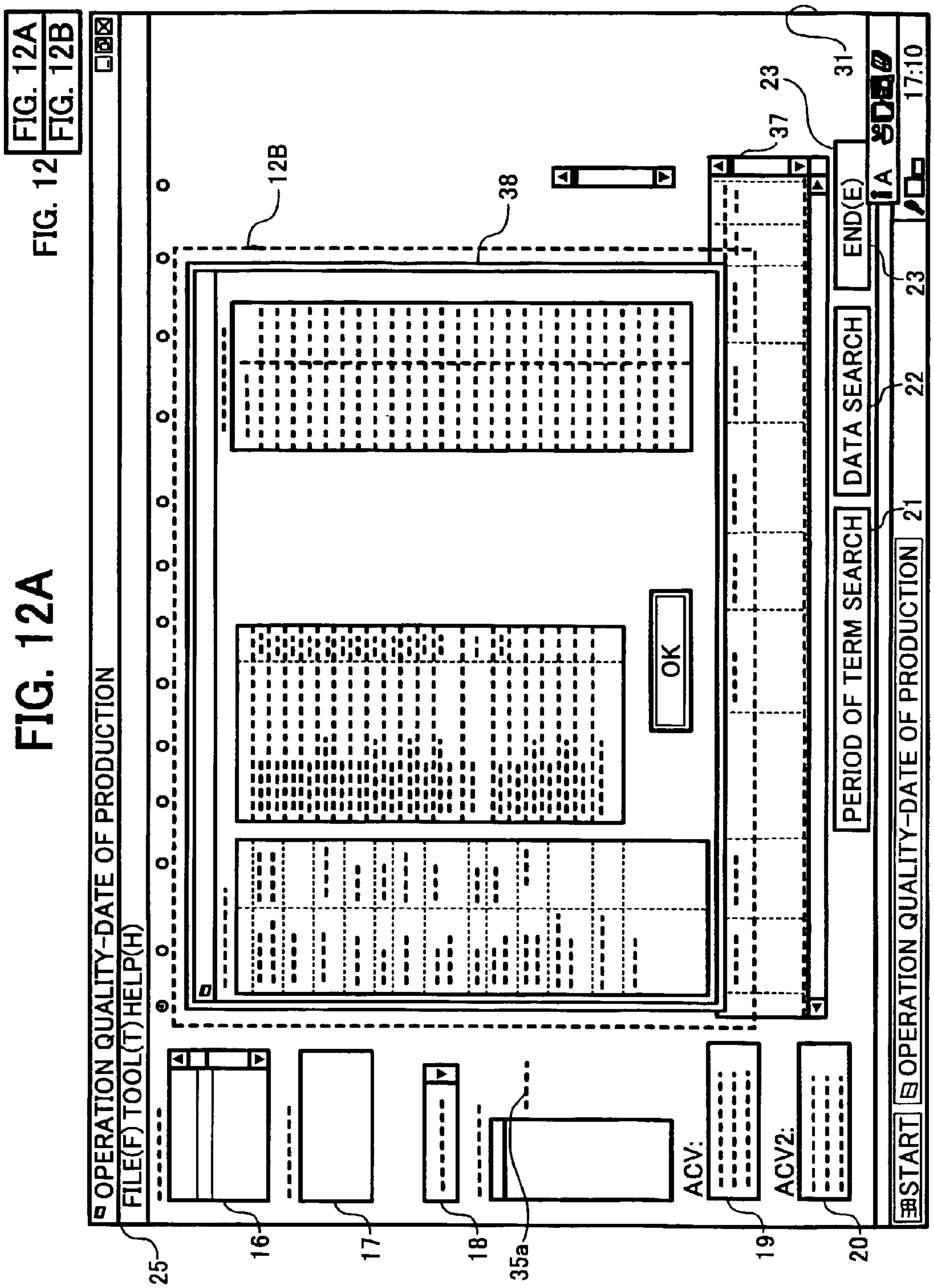
FIG. 12 is an explanatory diagram to show a state that a production history information display screen is displayed on the display monitor screen of personal computer shown in FIG. 1.

And when any one of the product number in the individual information display column 37, for example, the product number "111621" (of the product item brevity code 3103) is clicked, the production history information of a copy machine which has the product number (individual number 3103-111621) is displayed on the production history information display screen 38 as shown in FIG. 12.

That is to say, it is realized that the content of quality trouble which happens at customers can be comprehended in associate with the production trouble which happened when the product was manufactured, accordingly it is realized that the design engineers and the production managers can find rapidly out the cause of trouble where it happens in the product process, and quick feed back to the production process can be achieved.

Figure 13A:
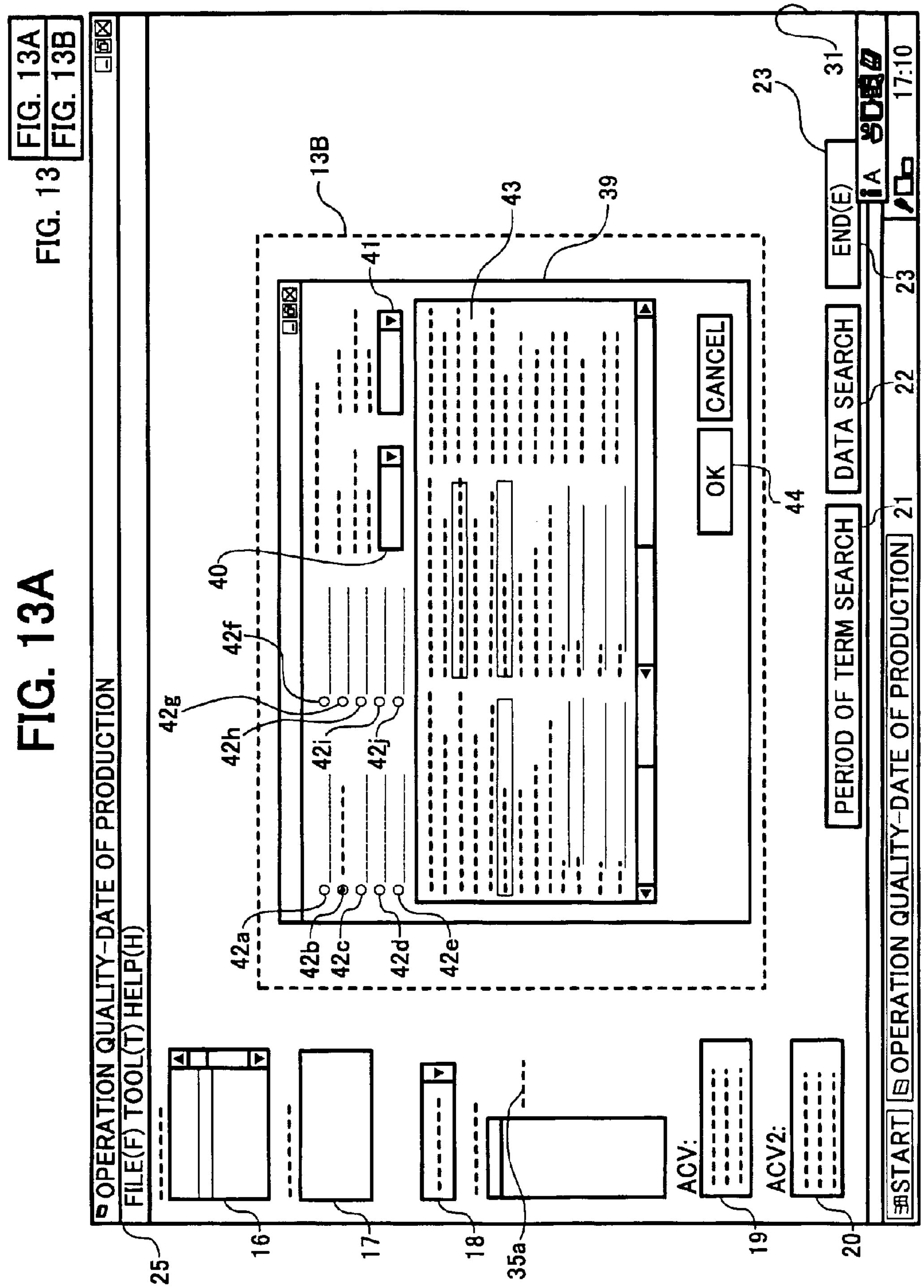
FIG. 13 is an explanatory diagram to show a dialog box which is displayed when a data search button is clicked on the search condition setting screen shown in FIG. 6.
Figure 13B:
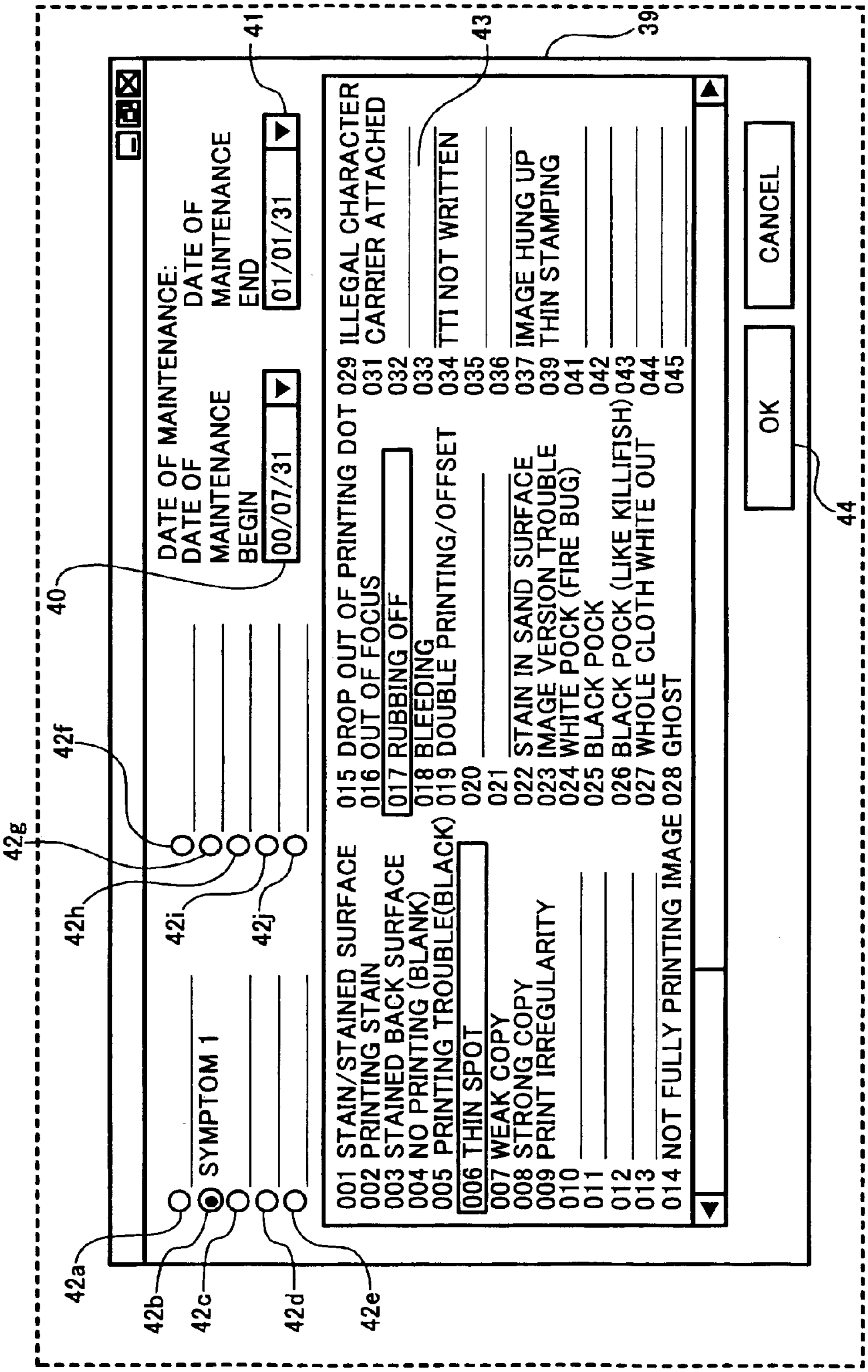

FIG. 13 shows a dialog box in the display screen 3*a* which is displayed when a data search button 22 is clicked on the search condition setting screen 15 shown in FIG. 6. When the data search button 22 is clicked, a dialog box 39 which is arranged to search the required information with condition is displayed on the display screen 3*a*. In the dialog box 39, starting date input box 40 and ending date input box 41 which are arranged to input the dates when the maintenance is started and the maintenance is ended are displayed in order to narrow down the maintenance record information by an item that designates a "date of maintenance carried out" which means when the maintenance is carried out, in addition to the radio buttons 42*a* to 42*j* which are corresponding to the character strings of respective input item shown in FIG. 4, and the search condition setting input box 43 and OK button 44.

For example, when the radio button 42*b* which is corresponding to the "symptom 1" is checked as shown in FIG. 13, the pickings which are input as the "symptom 1" are displayed in the search condition input box 43. When the search conditions are selected from the pickings and the OK button 44 is clicked, a synoptic table in which the corresponding information is listed on the display screen 3*a*. In this embodiment, because "006 thin spot" and "017 rubbing off" are selected as the pickings in FIG. 13, the call information into which "006" or "017" is input in the item of "symptom 1" are displayed in the search information synoptic table 45 in FIG. 14.

Figure 14A:
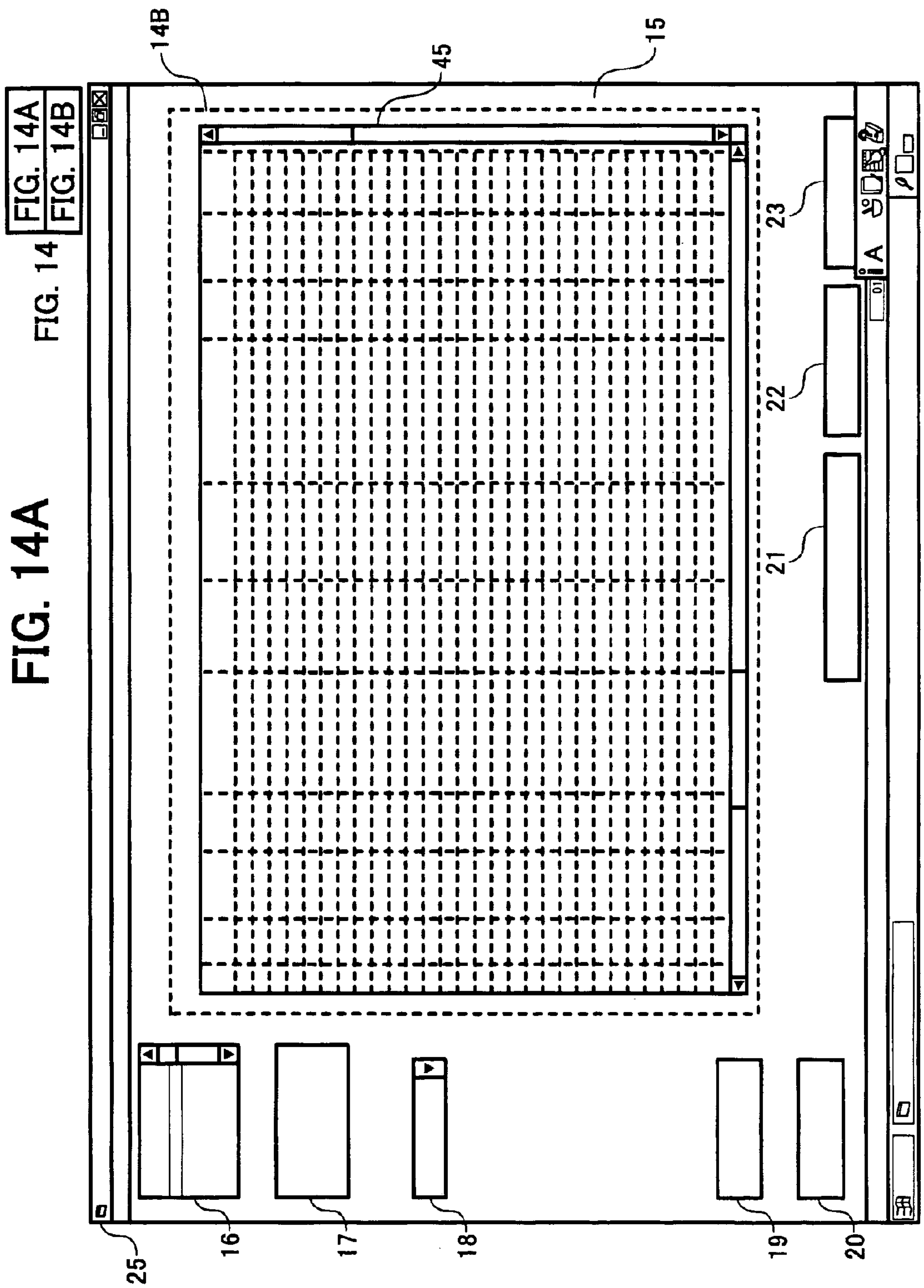
FIG. 14 is a display screen of search information synoptic table that is displayed when a search condition is designated on a screen on which the dialog box shown in FIG. 13 is displayed.
Figure 15:
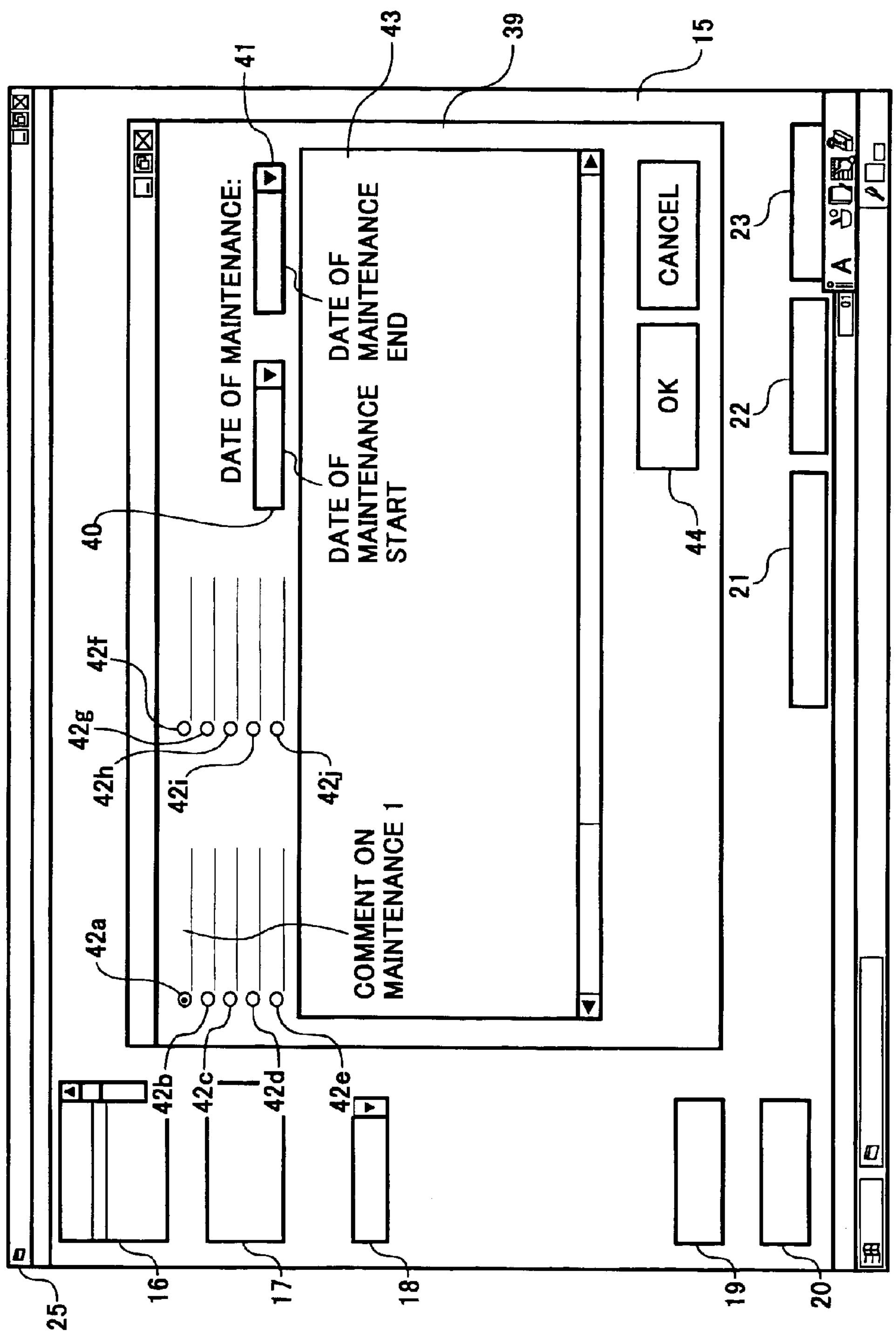
FIG. 15 is a display screen of synoptic table of search information which is displayed when maintenance comment shown in FIG. 13 is selected.

And as shown in FIG. 15, when the radio button 42*a* which is corresponding to the "comment on maintenance 1" is checked, because an input to the "comment on maintenance 1" is optional as described above, nothing is displayed on the search condition input box 43, and when a search key word is input to the search condition input box 43 and the OK button 44 is clicked, call information into which the character strings including the search key word are input in the item "comment of maintenance 1", are displayed in the same manner as FIG. 14.

Figure 9:
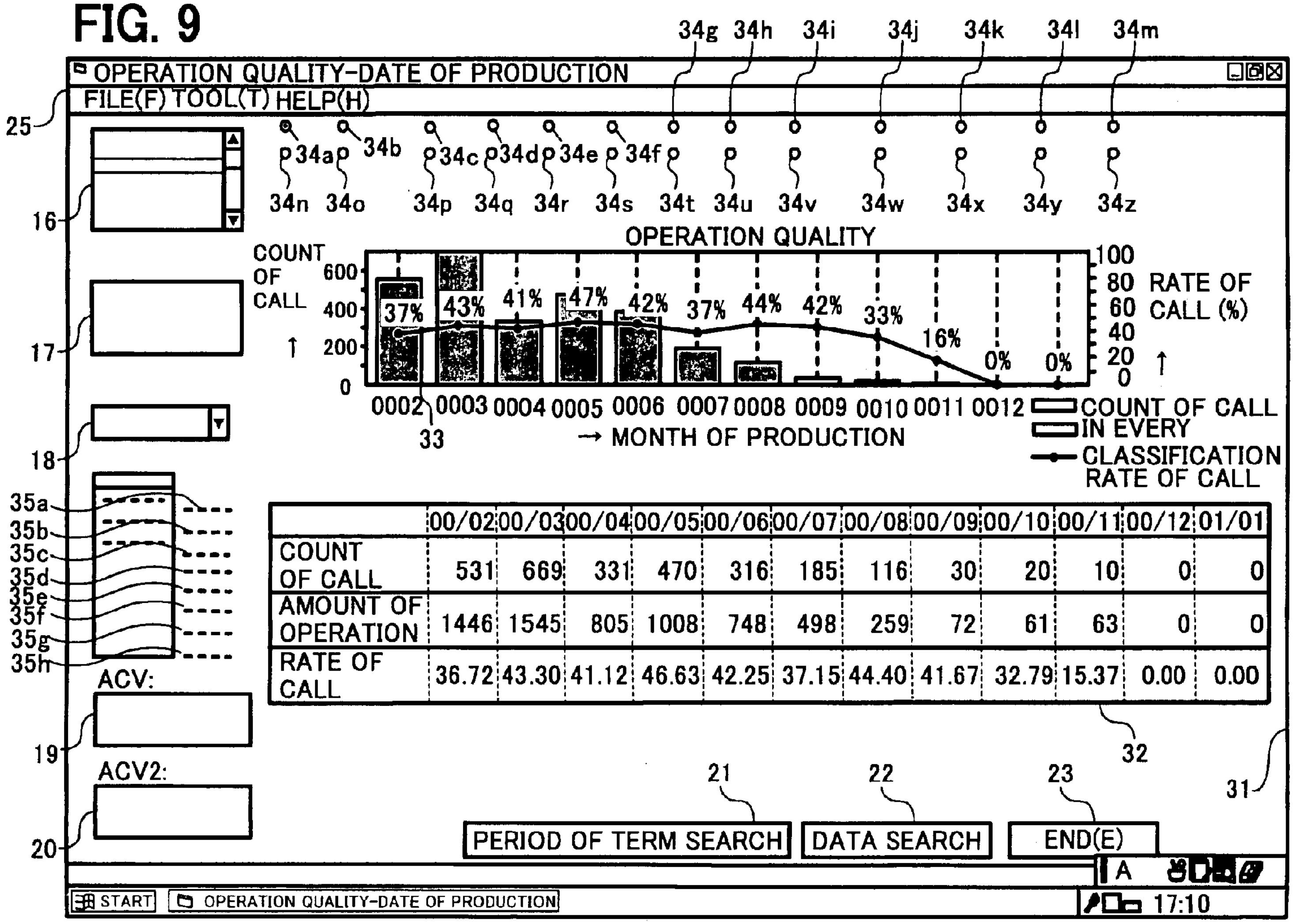
FIG. 9 is an explanatory diagram to show a state that a market quality transition situation display screen is displayed on the display monitor screen of personal computer shown in FIG. 1.

FIG. 16 shows a display of the display screen 3*a* in the market quality transition display screen 31 shown in FIG. 9 when the radio button 34*b* which is corresponding to the "operation 3D" is checked. In this case the count of calls are displayed in two dimension utilizing the year and month of production and the running months as the parameters about all the extracted call information on the Table 46 and at the same time, the contents of Table 46 are displayed in three dimension in the graph 47.

At this point, the data base 2 can be constructed so that electronic mails are automatically sent to the computers 4 as the respective terminals of interested departments if items to be watched are selected and criteria of them are specified when the respective criteria specified are exceeded.

Hereinafter the production management system will be described.

At first, the terminology for this production management system will be explained.

Assembling Serial Number a control number in the factory side

Something Strange a discovered trouble which is noticed something strange other than the inspection items Information to be Stored regards to be stored as an information No Recurrence trouble which is happened but not confirmed in the repairing process Amount of Finished Goods amount of product the production processes am completed and product is accomplished Amount of Directly Delivered amount of product with no defect in the amount of product the production processes are completed and product is accomplished Count of Defect count of happening of trouble (defect) at the inspection point (in checking process)

Rate of Direct Delivery value=amount of directly delivered/amount of finished goods 100

Count of Defect per Product value=count of trouble/amount of finished goods

PQ Value value=(count of defect other than something strange, no recurrence, inspection inside production process and defect other than inspecting point)/amount of product inspected Amount of Defect on Line amount of product with defect happened in assembly line and deleted Responsible Department department where the happening of trouble is caused (parts department, assembling department, technical department and designing department). For example, when a purchased part has the cause of trouble and it is responsible for the trouble, the responsible department is the "parts department". When the assembly process has a cause of trouble and makes the trouble happened, the responsible department is the "assembly department". When a trouble is made happen because of the defected product though the parts are OK in the specification, the responsible department is the "technical department". When a defected product is made because of trouble in designing, the responsible department is the "designing department".

Hereinafter [entire structure of the production management system], [application structure of the production management system], [structure of client in the input system], [structure of server], [structure of client in the output system], [schematic gross operation of the production management system], [data input process] and [search request/output process] will be described in detail in this order with reference to the FIG. 17 to FIG. 55. In the description below, the production management system for manufacturing assembly line of colour copy machine is employed as an example.

Figure 17:
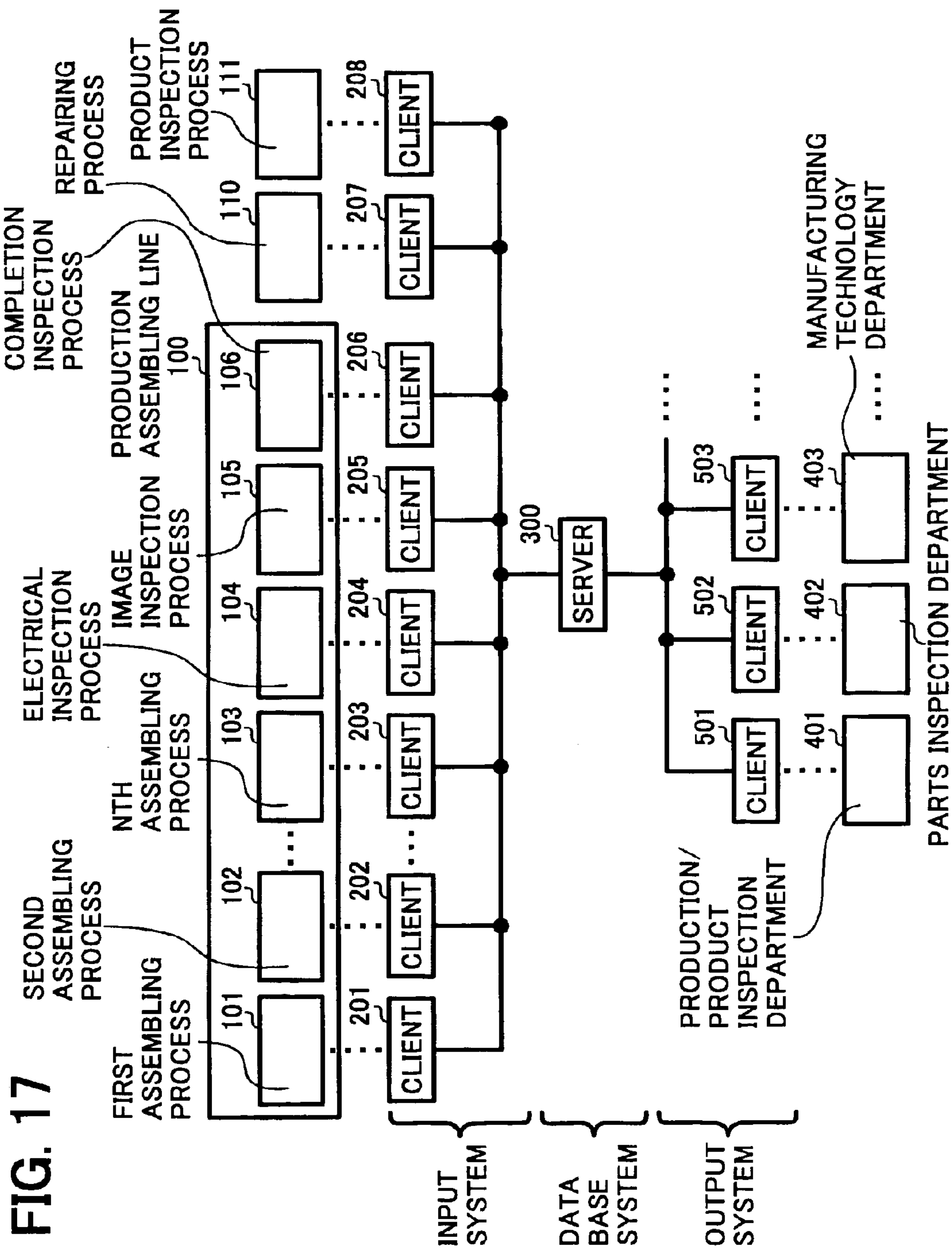
FIG. 17 is a schematic block diagram to show one example of a production management system which is corresponding to the assembling process in factory side shown in FIG. 1.

FIG. 17 is a schematic block diagram to show one example of a production management system. In FIG. 17, reference numeral 100 designates the manufacturing assembly line of colour copy machine, and the manufacturing assembly line 100 includes and 1st assembling process 101, 2nd assembling process 102, . . . Nth assembling process 103, electrical inspection process 104, image inspection process 105 and completion inspection process 106. As the process not included in the line, reference numeral 110 designates a repairing process and 111 designates a product inspection process.

Reference numerals 201 to 203 designate clients by which data of production process at the 1st assembling process 101, 2nd assembling process 102, . . . Nth assembling process 103 are input. To the client 201 to 203, the data for content of production/assembling are respectively input by the operators on the basis of respective parts/units assembled in the production processes, and the input data are forwarded to the server 300 as the data base 5 in the factory side.

Reference numerals 204 to 206 designate clients by which data of production process at the electrical inspection process 104, the image inspection process 105 and the completion inspection process 106 are input. To the clients 204 to 206, the data of content/result inspected and confirmed about the product assembled in the production processes 101 to 103 are respectively input by the operators, and the input data are forwarded to the server 300 as the production history data base 5.

Reference numeral 207 designates a client by which data of the repairing process 110 is input. To the client 207, the data at repairing process 110 are input by the operator and the input data are forwarded to the server 300 as the data base 5 in the factory side.

Reference numeral 208 designates a client by which the input data by the respective process from the 1st assembling process 101 to the repairing process 110 are checked. The aforementioned clients 201 to 208 compose the input system. In this embodiment, the assembly line for a main body, that is to say, the manufacturing assembly line for main body of color copy machine is employed as the manufacturing assembly line 100, but, the present invention is not understood to be restricted to the main body, and it is applicable also to the manufacturing assembly line for parts or unit.

Reference numeral 300 designates a server to manage the gross system of production management system. The server 300 is arranged so that the data which are forwarded from the clients 201 to 208 are stored in the data base. The server 300 is, also, arranged to search the data corresponding to the request from the data base and send them back to the clients 501 to 503 in accordance with a search request transferred from the clients 501 to 502 which are described later. The server 300 composes the data base system.

Reference numeral 401 designates a production/product inspection department, 402 designates a parts inspection department and 403 designates a manufacturing technology department. Reference numerals 501 to 503 designate the clients which are installed in the inspection department 401, the parts inspection department 402 and the manufacturing technology department 403 respectively. These clients 501 to 503 output the search request based on the search condition which are set for the request to the server 300, and process the searched results which are sent back from the server 300 in response to the above request to display and so on.

[Application Structure of the Production Management System]

Figure 18B:
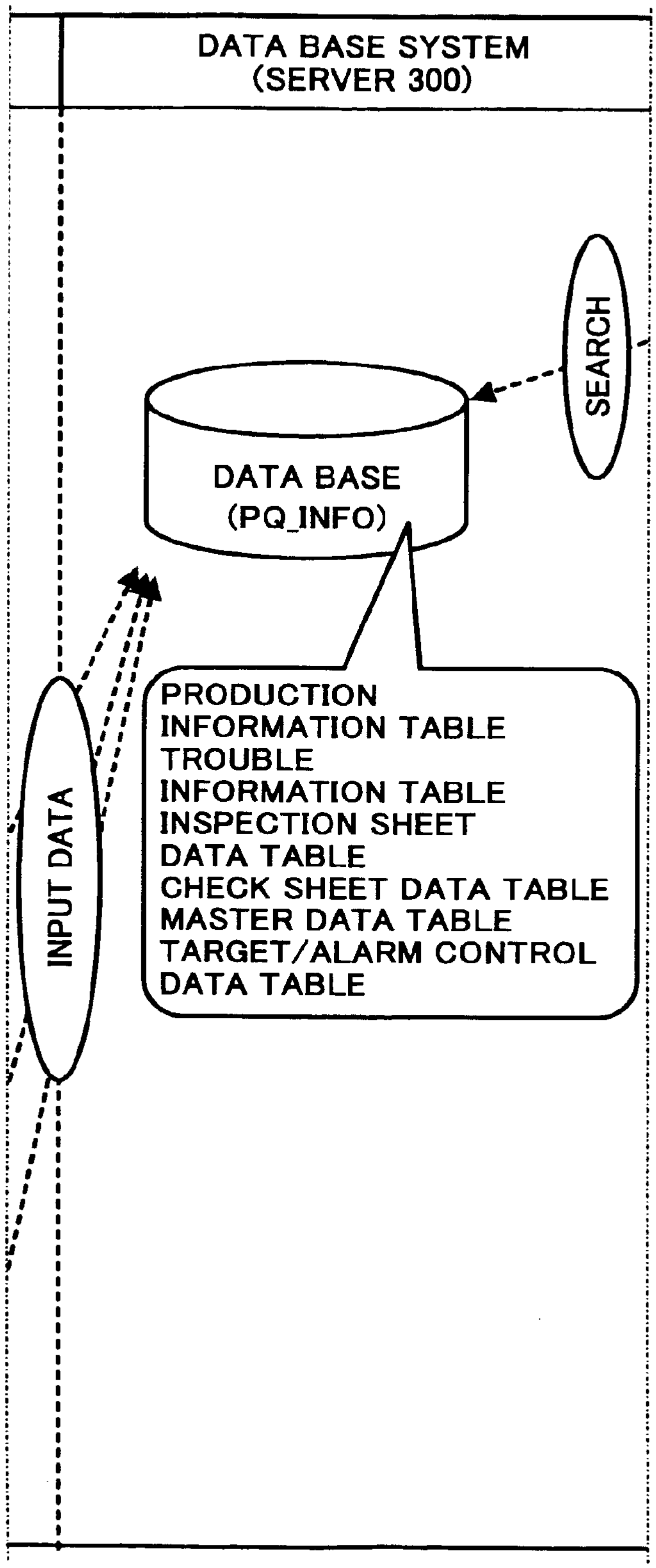
FIG. 18 is a schematic block diagram to show an application system of the production management system shown in FIG. 17.
Figure 18C:
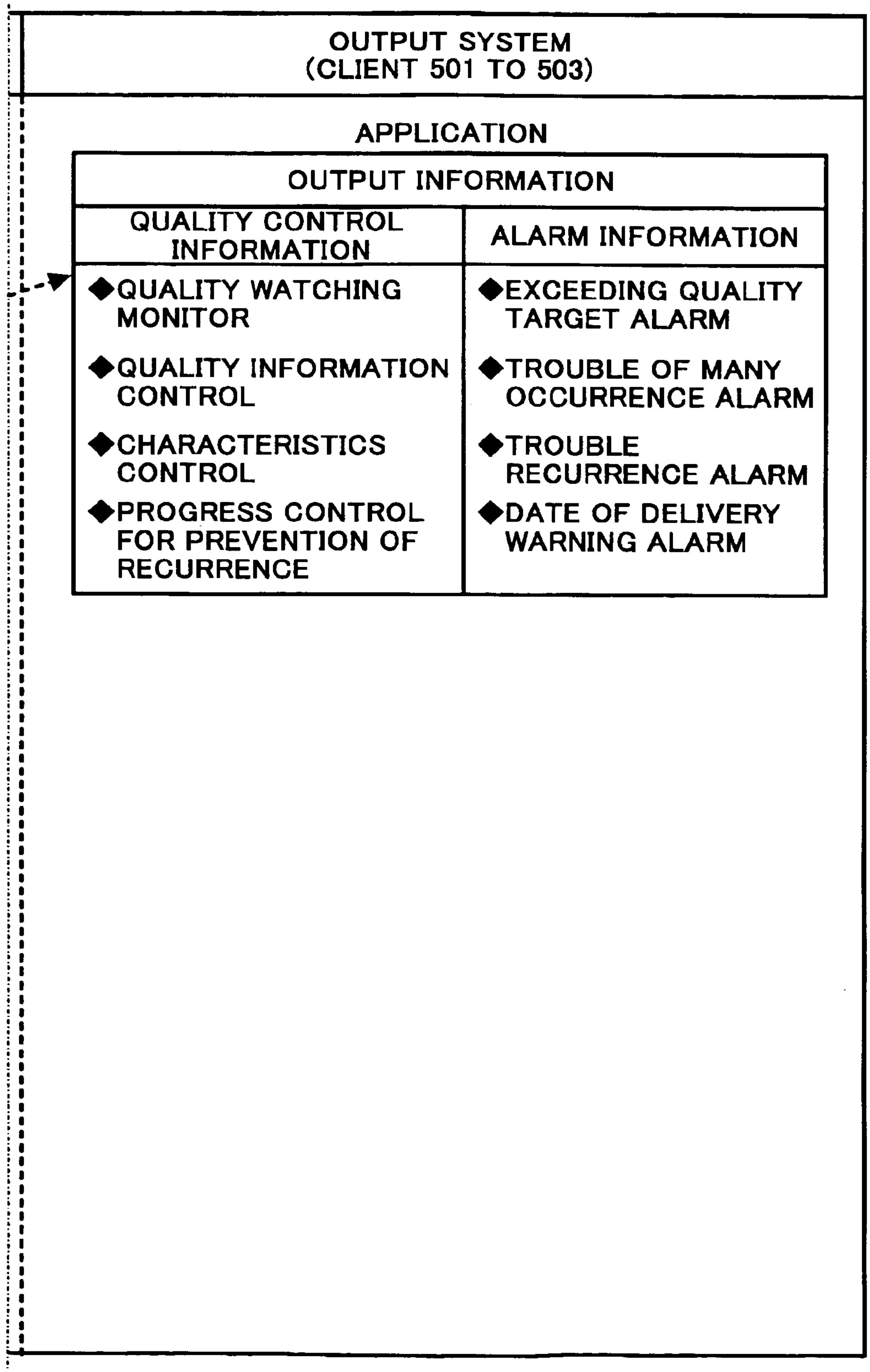

FIG. 18 is a schematic block diagram to show an application system of the production management system shown in FIG. 17. The application of input system (clients 201 to 208) includes an input function, an update function, a registration function, a delete function, a selection function, a guidance function, a automatic input function, a pop-up function, a bar code corresponding function, a print out preview function, a document input function and a input error prevention function.

As input information for the input system (clients 201 to 208), production information (factory name, field of product, product item, step of production, line number, date of assembling, date of completion, and so on) and trouble information (date of occurrence, time of occurrence, production process of occurrence, item of trouble, content of trouble, rank, responsible department, cause of trouble, content of repairing, name of repairing operator, content of corrective action, date of corrective action and so on) are input. As the other data except above, inspection data for inspection sheet, check data for check sheet, name of inspection operator and result of passing status, are input. These input information is transferred to the data base system (server 300).

The data base system (server 300) has various kind of tables to manage the input information which are input at the input system, to be more precise, for example, a production information table, a trouble information table, a data of inspection sheet table, a data of check sheet table, a master data table and an objective/alarm oriented management table, are included. The data base system (server 300) searches data corresponding to and in accordance with the search requests which are forwarded from the output system (clients 501 to 503), and outputs to the output system (clients 501 to 503).

As the output information of output system (clients 501 to 503), quality management information (monitor of quality surveillance, quality information management, characteristic value management, progress of prevention of recurrence management and so on) and alarm information (exceeding quality target alarm repetition trouble alarm, trouble recurrence alarm, alarm for delay in delivery and so on) are included. The output system (clients 501 to 503) outputs the search request based on the set search conditions to the server 300, and process in time—series on the searched results which are sent back from the server 300 in response to the above request to output the aforementioned output information.

[Structure of Clients in the Input System]

Figure 19:
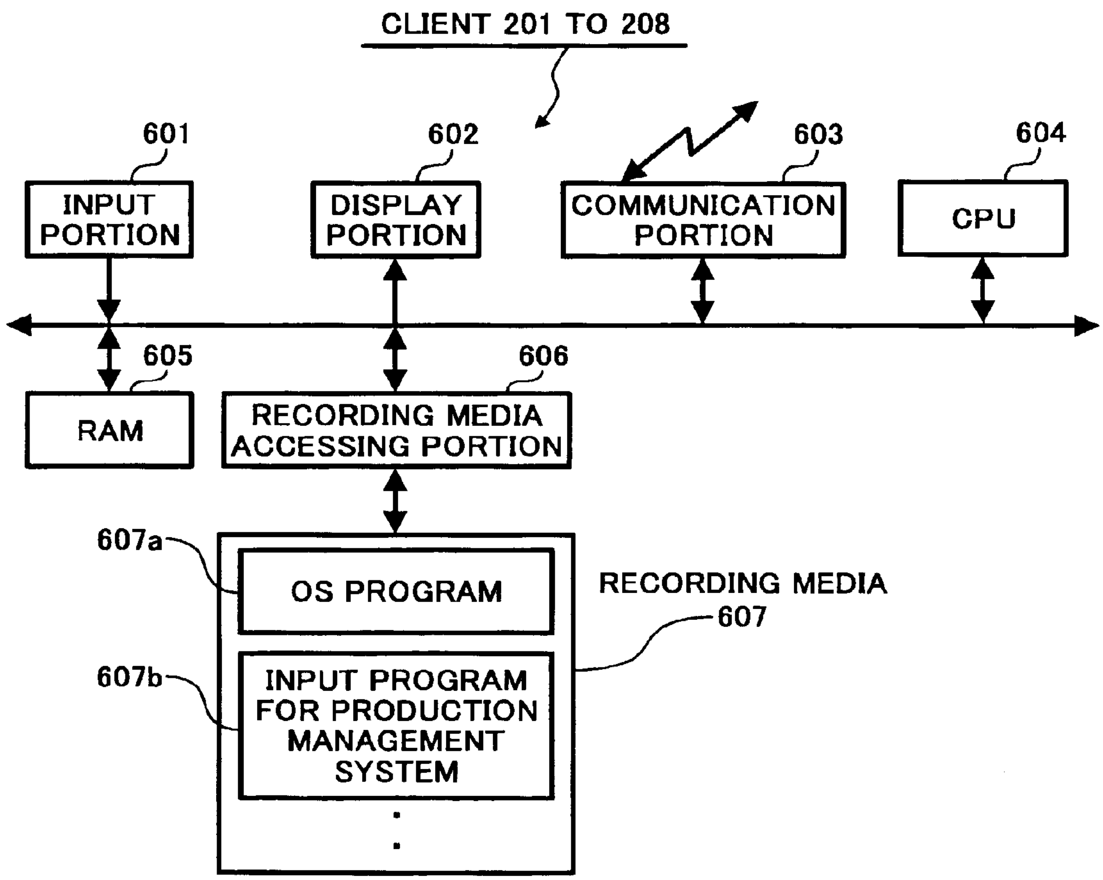
FIG. 19 is a schematic block diagram to show a client side of input system shown in FIG. 17.

FIG. 19 is a schematic block diagram to show client side input systems 201 to 208 shown in FIG. 17. The respective structure of the clients 201 to 208 in the input system is arranged to be quite the same with each other. As shown in FIG. 19, the clients 201 to 208 are composed with an input portion 601 in order to input data, a display portion 602, a communication portion 603 to perform data communication, a CPU 604 to control whole operation of the system as well as to manage the whole production management system, a RAM 605 to be utilized as a work area of the CPU 604, a recording media accessing unit 606 to perform read/write data from/to a recording media 607 and the recording media 607 in which various kind of programs are recorded in order to operate the CPU 604.

The input portion 601 is composed of a key board which includes cursor keys, ten keys and various kind of function keys, a mouse, a bar code reader and so on, as an user interface for an operator to give operating command to the CPU 604 and to input data.

The display portion 602 is composed of a CRT or a LCD and so on, on which a display in accordance with the display data input from the CPU 604 is performed. The communication portion 603 is connected to a Net Work, and through which the data communication with the server 300 or with other clients are performed.

The aforementioned CPU 604 is a central processing unit to control the whole apparatus in accordance with the program stored in the recording media 607, and to the CPU 604 the input portion 601, the display portion 602, the communication portion 603, the RAM 605 and the recording media accessing unit 606 are connected, to control the data communication, the read out of the application program through access to the memory, and the read/write of various kind of data, the input of data/command, the display and so on.

The above described RAM 605 includes a work memory in which the designated program, the request for input, the input data, the result of processing and so on are stored, and a display memory in which the display data to be displayed on the display screen of display portion 602 is temporally stored.

In the above described recording media 607 the data and the various kind of programs such as an OS program 607*a* (for example, WINDOWS 95 or WINDOWS NT) which can be executed by the CPU 604 and application programs, are stored. As the application programs, for example, input program 607*b* for the production management system and so on are included. As the recording media, for example, optical recording media, magnetic recording media and electrical recording media such as floppy disks, hard disks, CD-ROM, DVD-ROM, MO, PC card and so on are included. The above described various kind of programs are stored in the recording media 607 with a recording format which can be readable by the CPU 604. Also there are the cases that the above described various kind of programs are stored in the recording media in advance, or the programs are down loaded to be stored in the recording media through a communication line.

[Structure of the Server]

Figure 20:
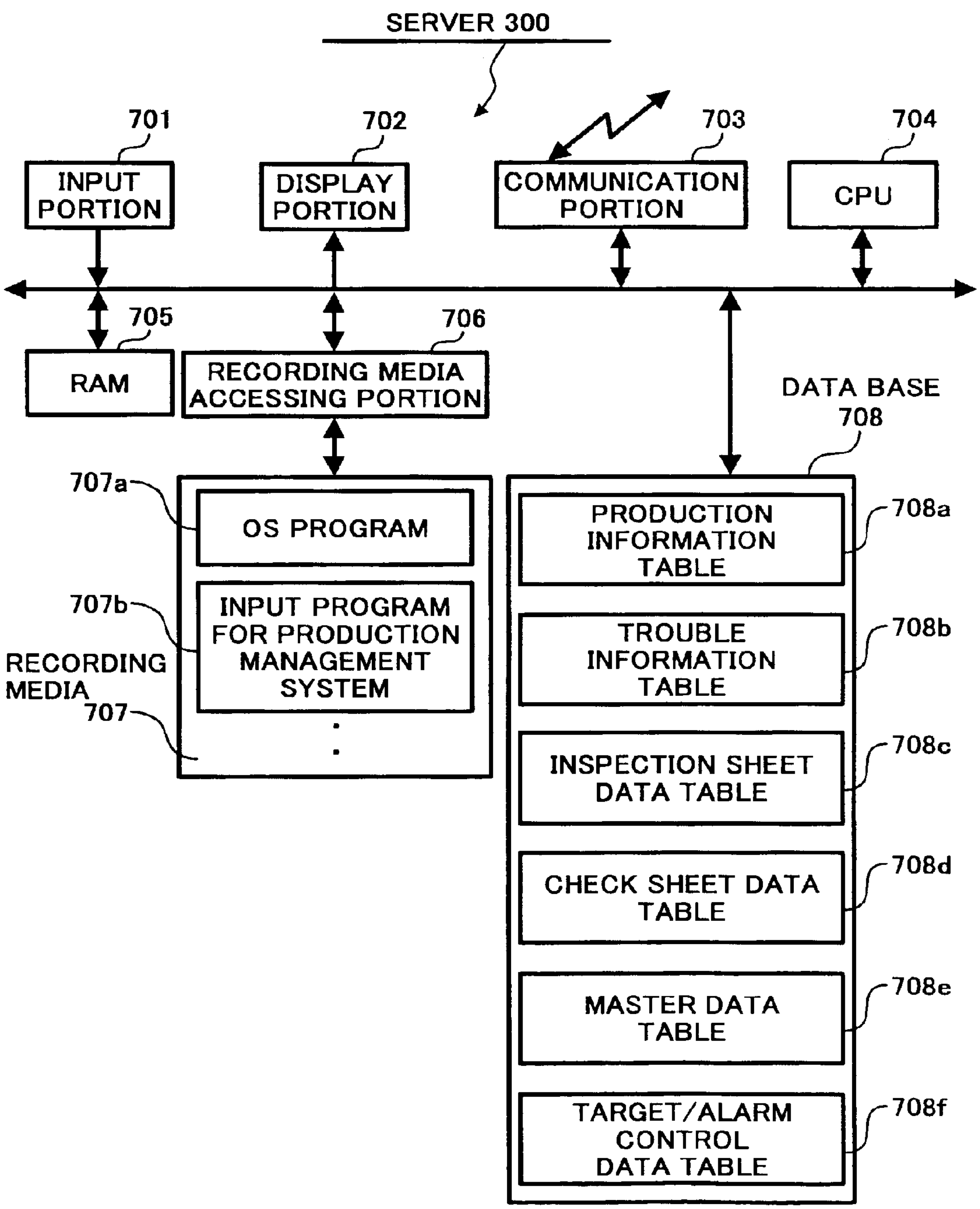
FIG. 20 is a schematic block diagram to show a server shown in FIG. 17.

FIG. 20 is a schematic block diagram to show a server 300 shown in FIG. 17. As shown in FIG. 20, the server 300 is composed with an input portion 701 in order to input data, a display portion 702, a communication portion 703 to perform data communication, a CPU 704 to control whole operation of the system as well as to manage the whole production management system, a RAM 705 to be utilized as a work area of the CPU 704, a recording media accessing unit 706 to perform read/write data from/to a recording media 707, the recording media 707 in which various kind of programs are recorded in order to operate the CPU 704 and a data base 708 in which the data sent from the clients are stored.

The input portion 701 is composed of a key board which includes cursor keys, ten keys and various kind of function keys, a mouse and so on, as an user interface for an operator to give operating command to the CPU 704 and to input data.

The display portion 702 is composed of a CRT or a LCD and so on, on which a display in accordance with the display data input from the CPU 704 is performed. The communication portion 703 is connected to a Net Work, and through which the data communication with the clients 201 to 208 of input system and the clients 501 to 508 are performed.

The above described CPU 704 is a central processing unit to control the whole apparatus in accordance with the program stored in the recording media 707 and so on, and to the CPU 704 the input portion 701, the display portion 702, the communication portion 703, the RAM 705, the recording media accessing unit 706 and the data base 708 are connected, to control the data communication, the read out of the program through access to the recording media 707, and the read/write of various kind of data, the input of data/command, the display and so on.

The above described RAM 705 includes a work memory in which the designated program, the request for input, the input data, the result of processing and so on are stored, and a display memory in which the display data to be displayed on the display screen of display portion 702 is temporally stored.

In the above described recording media 707 the data and the various kind of programs such as an OS program 707*a* (for example, WINDOWS NT Server V4.0) which can be executed by the CPU 704 and application programs, are stored. As the application programs, for example, data base program 707*b* for the production management system and so on are included. As the recording media, for example, optical recording media, magnetic recording media and electrical recording media such as floppy disks, hard disks, CD-ROM, DVD-ROM, MO, PC card and so on are included. The above described various kind of programs are stored in the recording media 707 with a recording format which can be readable by the CPU 704. Also, there are the cases that the above described various kind of programs are stored in the recording media 707 in advance, or the programs are down loaded to be stored in the recording media 707 through a communication line.

The above described data base 708 is composed of the production information table 708*a*, the trouble information table 708*b*, the data table of inspection sheet 708*c*, the data table of check sheet 708*d*, the master data table 708*e*, the objective/alarm oriented management table 708*f* and so on.

[Structure of Clients in the Output System]

Figure 21:
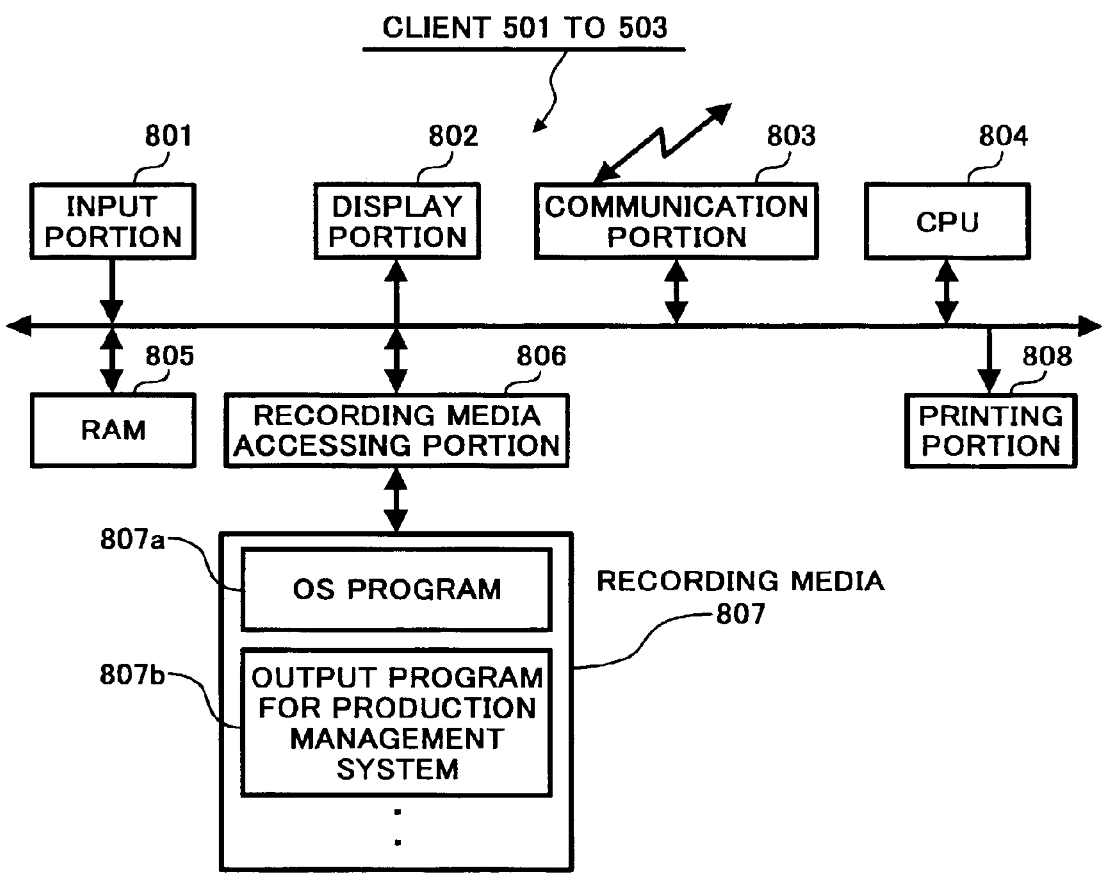
FIG. 21 is a schematic block diagram to show a client side of output system shown in FIG. 17.

FIG. 21 is a schematic block diagram to show a client side of output systems 501 to 503 as shown in FIG. 17. The respective structure of the clients 501 to 503 in the output system are arranged to be quite the same with each other. As shown in FIG. 21, the clients 501 to 503 are composed with an input portion 801 in order to input data, a display portion 802, a communication portion 803 to perform data communication, a CPU 804 to control whole operation of the system as well as to manage the whole production management system, a RAM 805 to be utilized as a work area of the CPU 804, a recording media accessing unit 806 to perform read/write data from/to a recording media 807 and the recording media 807 in which various kind of programs are recorded in order to operate the CPU 804.

The input portion 801 is composed of a key board which includes cursor keys, ten keys and various kind of function keys, a mouse and so on, as an user interface for an operator to give operating command to the CPU 804 and to input data.

The display portion 802 is composed of a CRT or a LCD and so on, on which a display in accordance with the display data input from the CPU 804 is performed. The communication portion 803 is connected to a Net Work, and through which the data communication with the server 300 or with other clients are performed.

The above described CPU 804 is a central processing unit to control the whole apparatus in accordance with the program stored in the recording media 807, and to the CPU 804 the input portion 801, the display portion 802, the communication portion 803, the RAM 805, the recording media accessing unit 806 and a printing portion 808 are connected, to control the data communication, the read out of the application program through access to the memory, and the read/write of various kind of data, the input of data/command, the display and so on.

The above described RAM 805 includes a work memory in which the designated program, the request for input, the input data, the result of processing and so on are stored, and a display memory in which the display data to be displayed on the display screen of display portion 802 is temporally stored.

In the above described recording media 807 the data and the various kind of programs such as an OS program 807*a* (for example, WIDOWS 95 or WINDOWS NT) which can be executed by the CPU 804 and application programs, are stored. As the application programs, for example, input program 807*b* for the production management system and so on are included. As the recording media 807, for example, optical recording media, magnetic recording media and electrical recording media such as floppy disks, hard disks, CD-ROM, DVD-ROM, MO, PC card and so on are included. The above described various kind of programs are stored in the recording media 807 with a recording format which can be readable by the CPU 804. Also there are the cases that the above described various kind of programs are stored in the recording media in advance, or the programs are down loaded to be stored in the recording media through a communication line.

The above described printing portion 808 is composed of, for example, a laser printer to print out the data and so on which are displayed on the display portion 802 under control of the CPU 804.

Hereinafter an operation of the above described production management system will be described with detail about and in an order of [Outline of whole operation of the production management system], [Data input process], [Request for search/output process].

Outline of Whole Operation of the Production Management System

Figure 22:
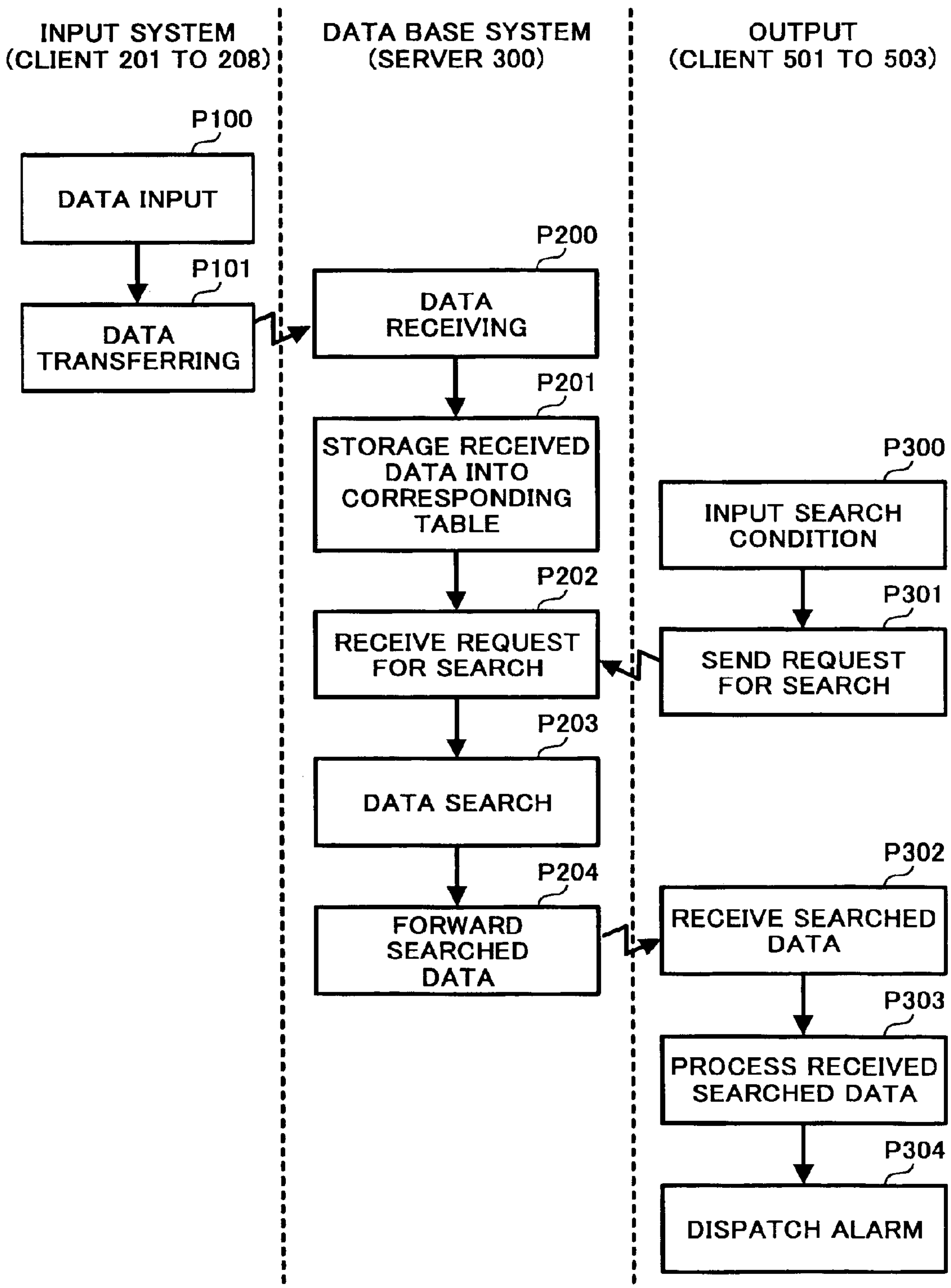
FIG. 22 is a flow chart to explain an outline of whole operation of the production management system shown in FIG. 17.

FIG. 22 is a flow chart to explain an outline of whole operation of the production management system shown in FIG. 17. In FIG. 22, the data from the 1st assembling process 101, the 2nd assembling process 102, . . . the Nth assembling process 103, the electrical inspection process 104, the image inspection process 105, the completion inspection process 106, the repairing process 110 and the product inspection process 111 are input to the input system (clients 201 to 208) (step P100), and the input data are forwarded to the data base system (server 300) (step P101).

In the data base system (server 300), the data transferred from the input system (clients 201 to 208) are received (step P200) to store them in the corresponding tables of the data base 708 (step P201).

On the other hand, to the output system (clients 501 to 503) the search condition are input (step P300) and the request for search which is based on the search condition being input, is forwarded to the data base system (server 300) (step P301). The server 300 receives the request for search transferred from the output system (clients 501 to 508) (step P202), searches the data from the corresponding tables in the data base 708 in accordance with the request for search (step P203) and outputs and forwards the data of result of search to the output system (clients 501 to 503) (step P204).

The data transferred from the server 300 are received by the output system (clients 501 to 503) (step P302), and are worked on to be in time sequence and output in accordance with the object to be output which is set in advance (step P303). At this point, an alarm is sent to the related department if the resulted searched data exceeds the predetermined criterion to initiate a corrective action (step P304). As for the criterion to initiate the corrective action, items of PQ value, IQ value, the same item of trouble, occurrence of pocking, trouble in product inspection are included and set for the corrective action.

Data Input Process

The data input process by the clients 201 to 206 of input system will be described about and in an order of 1: Assembling serial number registration process (data input to the clients 201 to 203 in the respective process of the 1st assembling process 101, the 2nd assembling process 102, . . . the Nth assembling process 103), 2: Inspection process (data input to the clients 204 to 206 in the respective process of the electrical inspection process 104, the image inspection process 105 and the completion inspection process 106).

1: Assembling Serial Number Registration Process

The assembling serial number registration process is a process to input the data to the clients 201 to 203 in the respective process of the 1st assembling process 101, the 2nd assembling process 102, . . . the Nth assembling process 103. The assembling serial number registration process will be described in accordance with the flow chart shown in FIG. 23.

Figure 23:
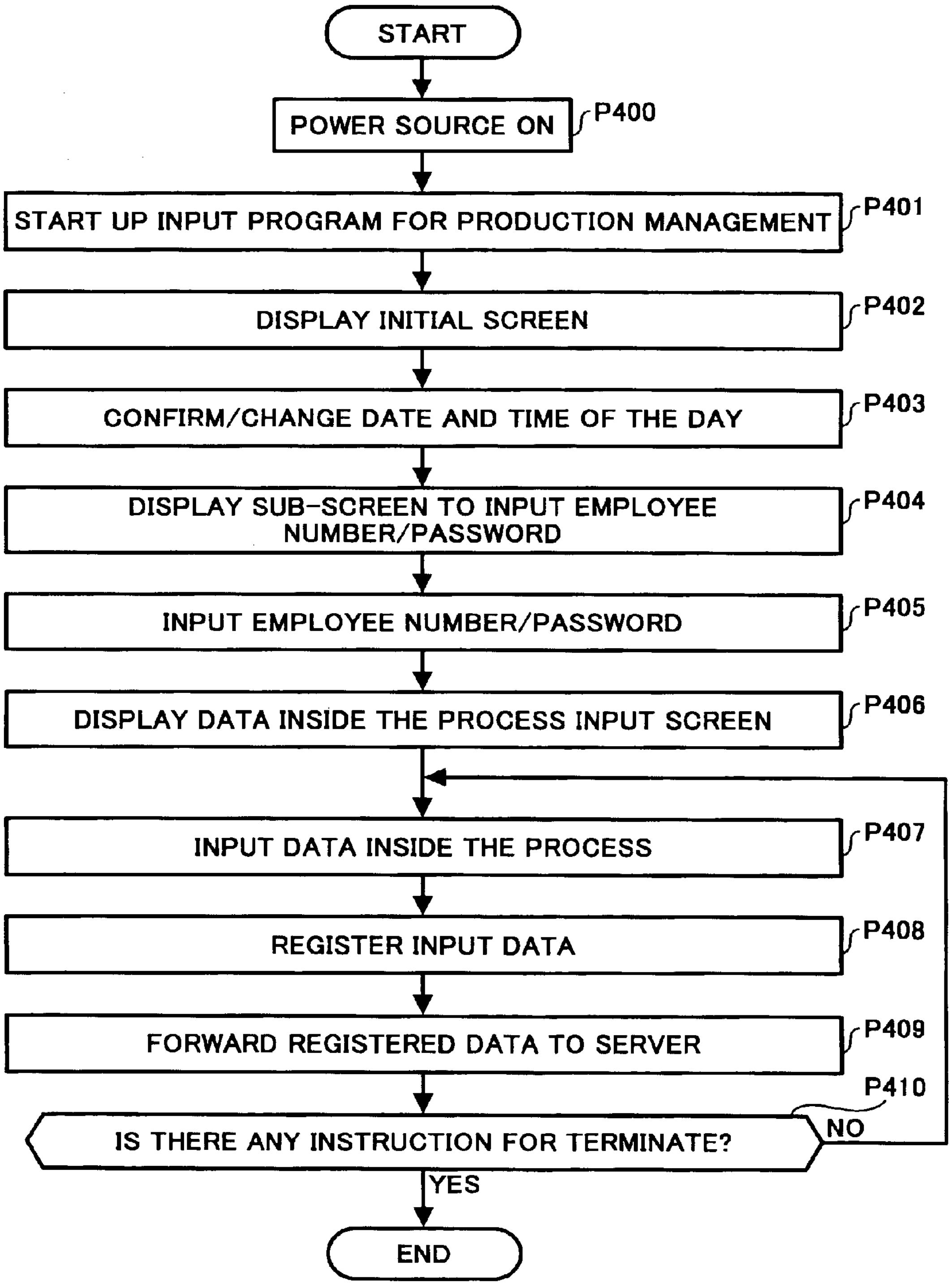
FIG. 23 is a flow chart to explain a data input at assembling serial number registration process.
Figure 24:
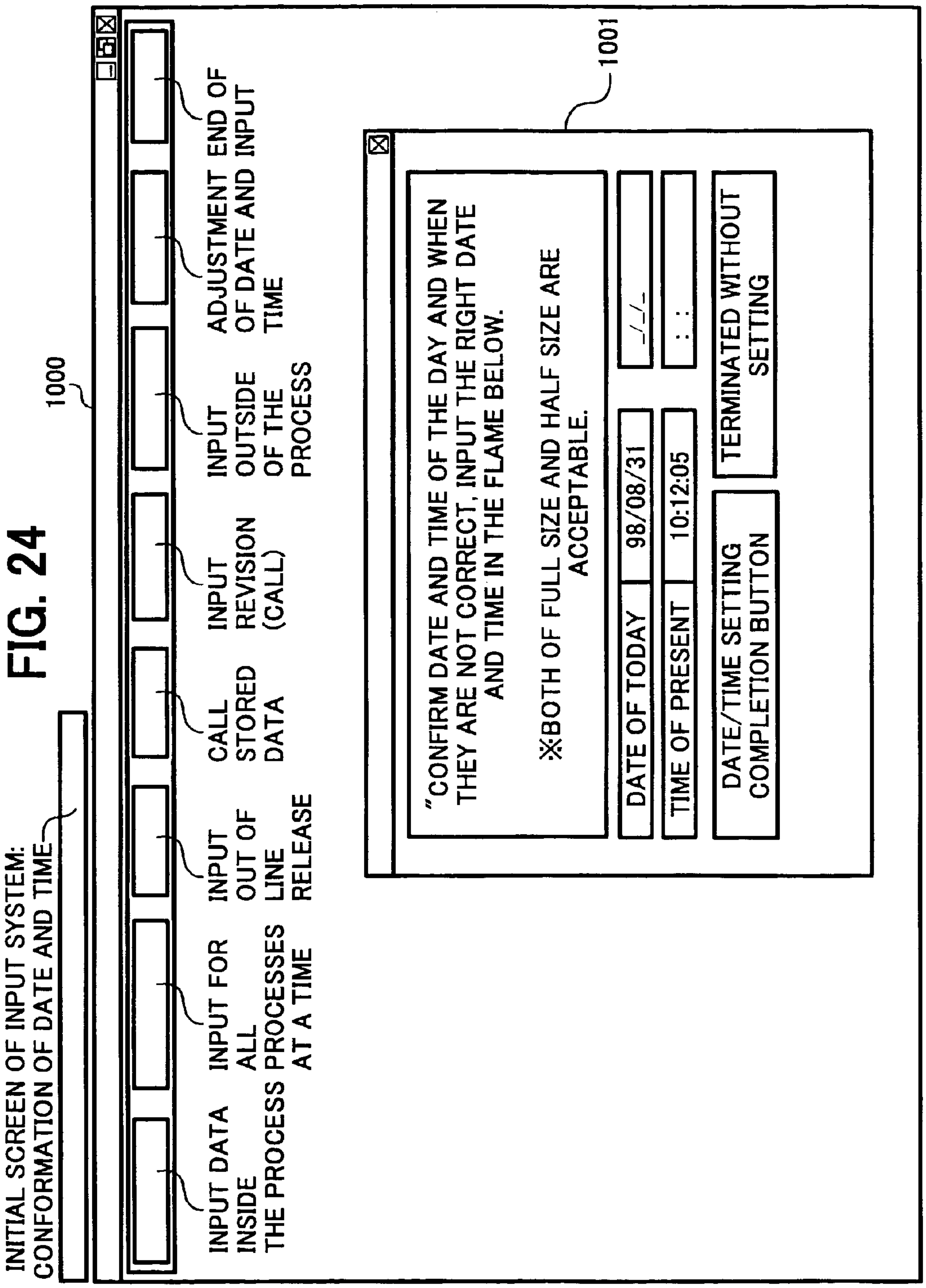
FIG. 24 is a diagram to show a display screen of the assembling serial number registration process.
Figure 25:
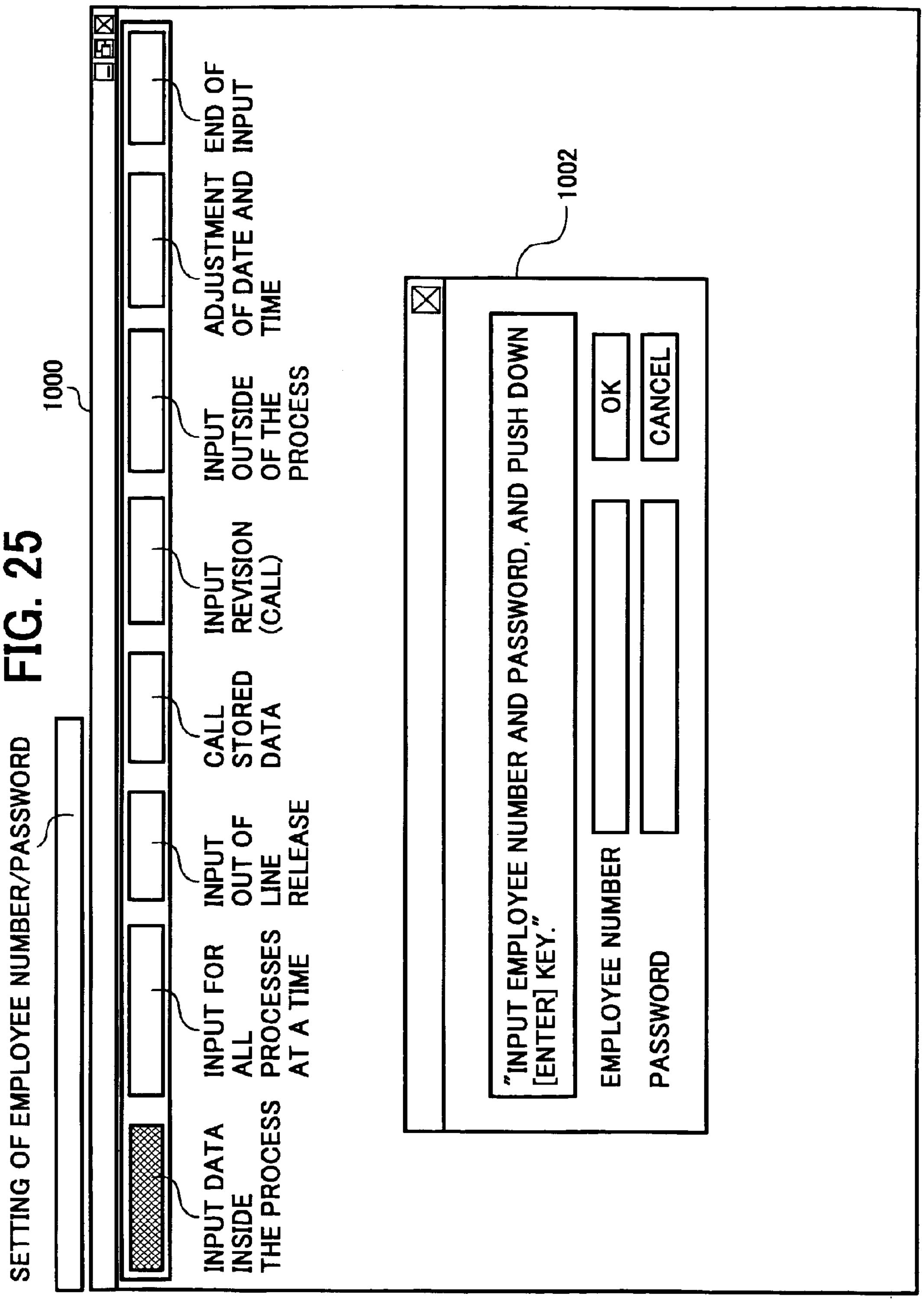
FIG. 25 is a diagram to show a display screen of the assembling serial number registration process.
Figure 26:
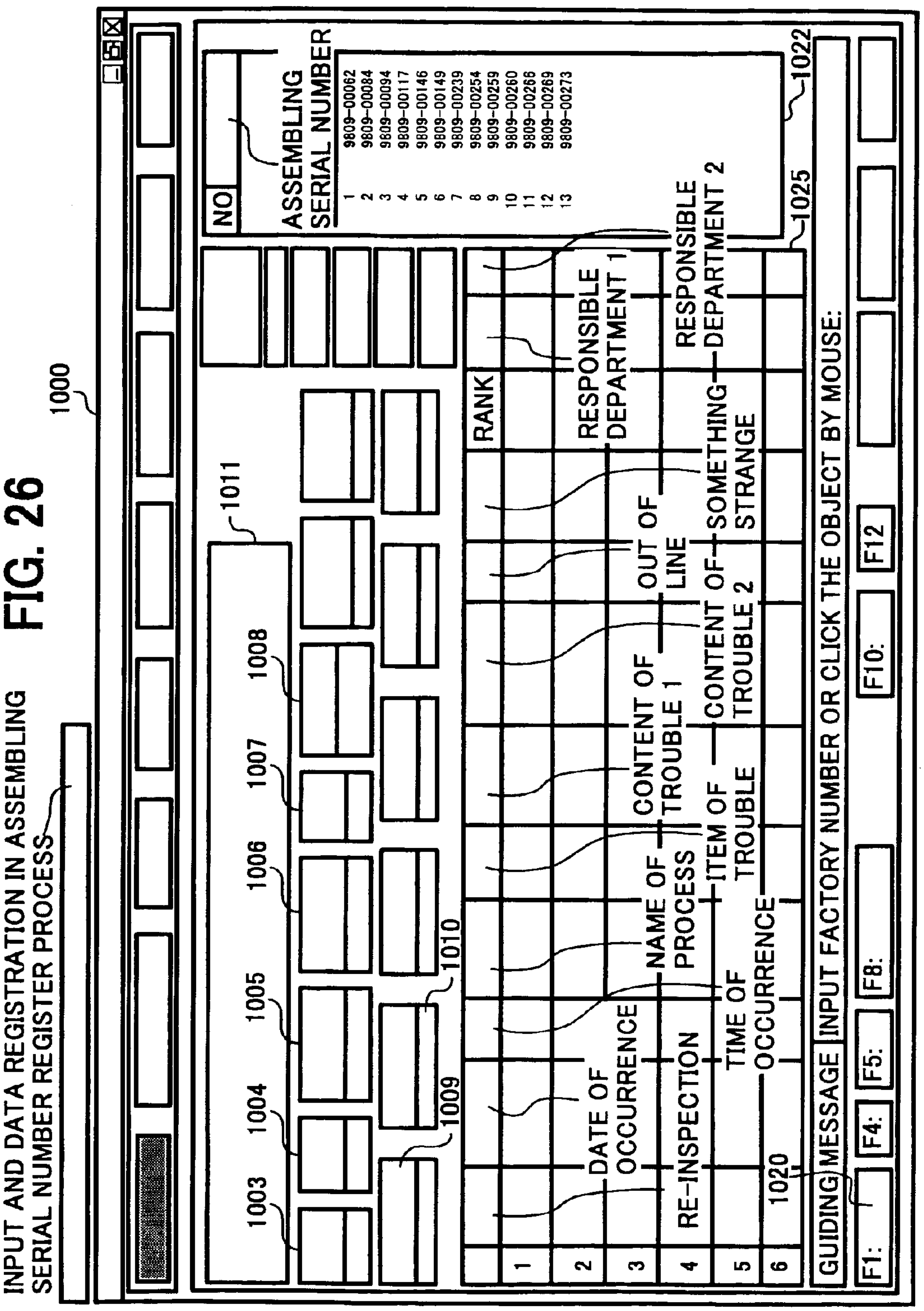
FIG. 26 is a diagram to show a display screen of the assembling serial number registration process.

FIG. 23 is a flow chart to explain a data input at assembling serial number registration process, and FIG. 24 to FIG. 26 are diagrams to show a display screen of the assembling serial number registration process.

In FIG. 23, at first, by the respective operators of the 1st assembling process 101, the 2nd assembling process 102, . . . the Nth assembling process 103, the respective power sources of clients 201 to 203 are turned on for power to be supplied (step P400), the production management system input program 607*b* is selected to start up the production management system input program 607*b* (step P401), an initial screen 1000 is displayed as shown in FIG. 24 (step P402). In a portion of the initial screen shown in FIG. 24, a sub screen 1001 is displayed to show, confirm and alter what is the date of today and what is the time of the operation.

The operators confirm the date of today and time of the operation which are displayed and in case when no alteration is required then push the enter key, or in case when alteration is required input the corrected date and time of the operation then push the enter key (step P403). After confirmation and alteration of the date of today and the time of operation are completed, a sub screen 1002 is displayed to input employee serial number and password as shown in FIG. 25 (step P404). The respective operators input their own employee serial number and the password (step P405). When the above described steps are completed, a data input screen for respective processes are displayed (step P406) as shown in FIG. 26.

In the data input screen for respective processes shown in FIG. 26, reference numeral 1003 designates the factory in the input item and 1004 designates the field of product, 1005 designates the name of product item, 1006 designates the step of production, 1007 designates the line number, 1008 designates the name of production process, 1009 designates the product code and 1010 designates the assembling serial number. At the same time, reference numeral 1011 designates a column of the input guidance in which the corresponding data items are automatically displayed on the basis of respective input items 1003 to 1009.

The respective operators input the data for the input items 1003 to 1010 according to the progress of assembling work of the assembling process of which the operator is in charge (step P407). In further detail, one of the input items displayed in the column of input guidance 1011 is selected and clicked by the mouse to be shown automatically in the respective corresponding flames of input items 1003 to 1009. At this point, the assembling serial number 1010 is input by that a bar code designating the assembling serial number the which is glued on the product or unit to be assembled, is read out by the bar code reader.

Then, the respective operators push down the registration key 1020 to register the input data (step P408). The registered data are forwarded to the server 300 (step P409). At this point, the data for day and present time are also transferred to the server 300 as well. Until an instruction of the completion is given (step P410), the operation on the consecutive steps P407 to P409 is repeated performed. The data with the assembling serial number 1010 are made to be registered with a serial number corresponding to the machine which is utilized in the line.

2: Data Input in the Inspection Process

Figure 27A:
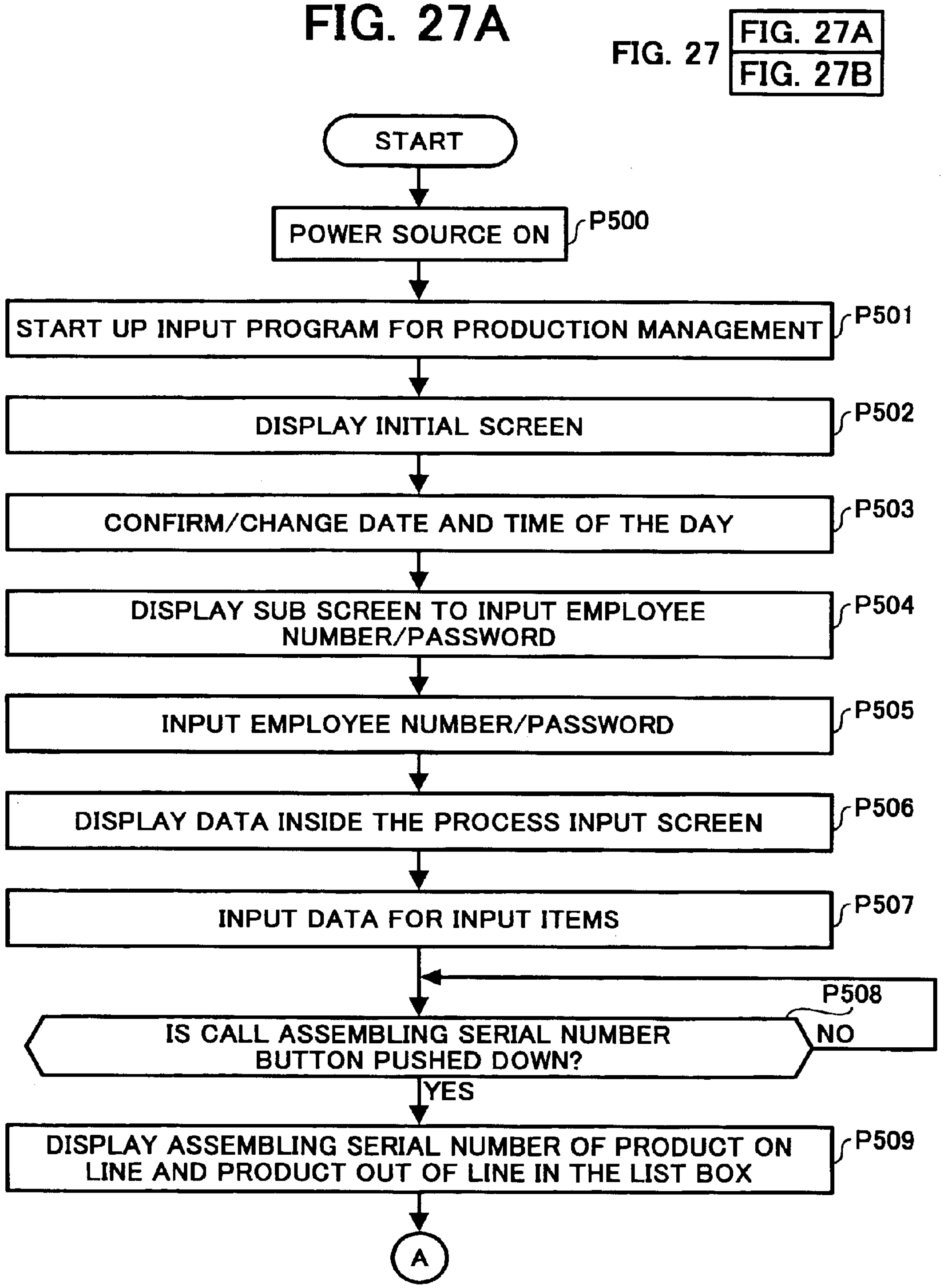
FIG. 27 is a flow chart to explain a data input at inspection process.
Figure 27B:
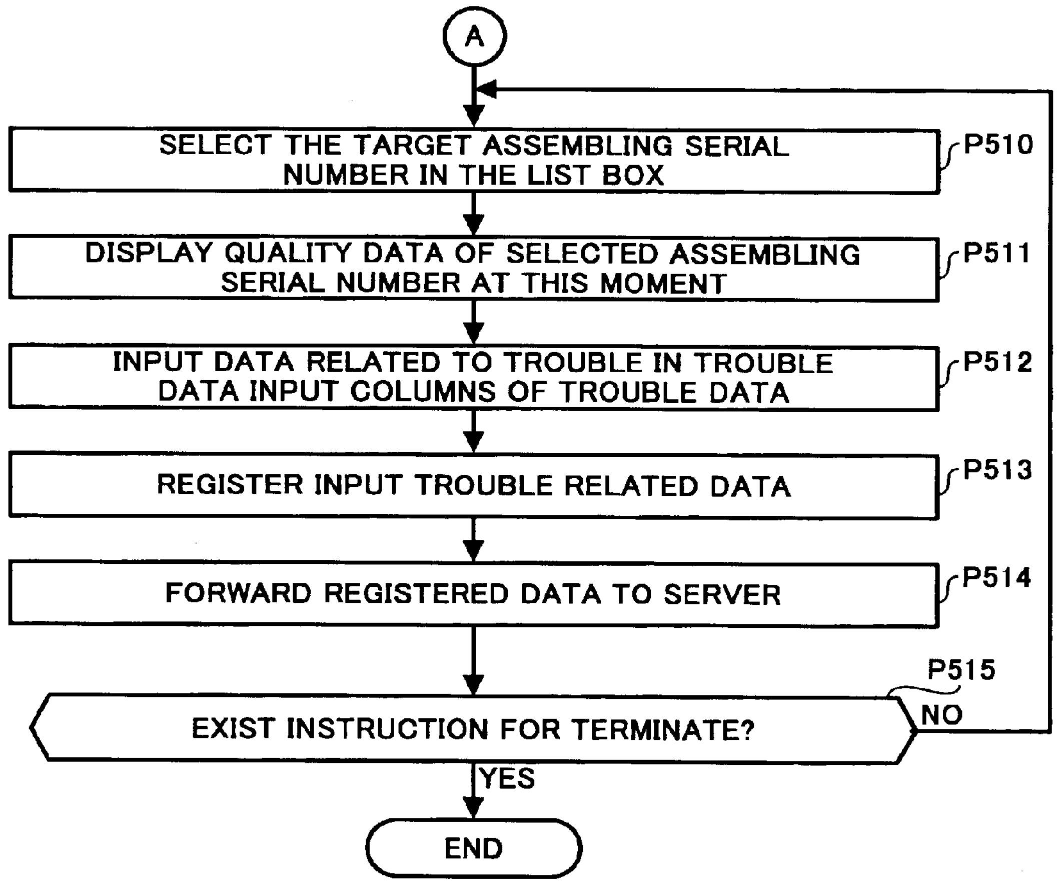

This inspection process is the process to input data to the clients 204 to 206 in the respective electrical inspection process 104, the image inspection process 105 and the completion inspection process 106. The inspection process will be described based on the flow chart shown in FIG. 27 with reference to FIG. 24, FIG. 25 and FIGS. 28 to 30. FIG. 27 is a flow chart to explain a data input at inspection process, FIG. 24, FIG. 25, FIGS. 28 to 30 are the diagram to show a data input display screen of the inspection process.

In FIG. 27 at first by the respective operators of the electrical inspection process 104, the image inspection process 105 and the completion inspection process 106, the respective power sources of clients 204 to 206 are turned on for power to be supplied (step P500), the production management system input program 607*b* is selected to start up the production management system input program 607*b* (step P501), an initial screen 1000 is displayed as shown in FIG. 24 (step P502). In a portion of the initial screen shown in FIG. 24, a sub screen 1001 is displayed to show, confirm and alter what is the date of today and what is the time of the operation.

The operators confirm the date of today and time of the operation which are displayed and in case when no alteration is required then push the enter key, or in case when alteration is required input the corrected date and time of the operation then push the enter key (step P503).

After confirmation and alteration of the date of today and the time of operation are completed, a sub screen 1002 is displayed to input employee serial number and password as shown in FIG. 25 (step P504). The respective operators input their own employee serial number and the password (step P505). When the above described steps are completed, a data input screen for respective processes are displayed (step P506) as shown in FIG. 28.

Figure 28:
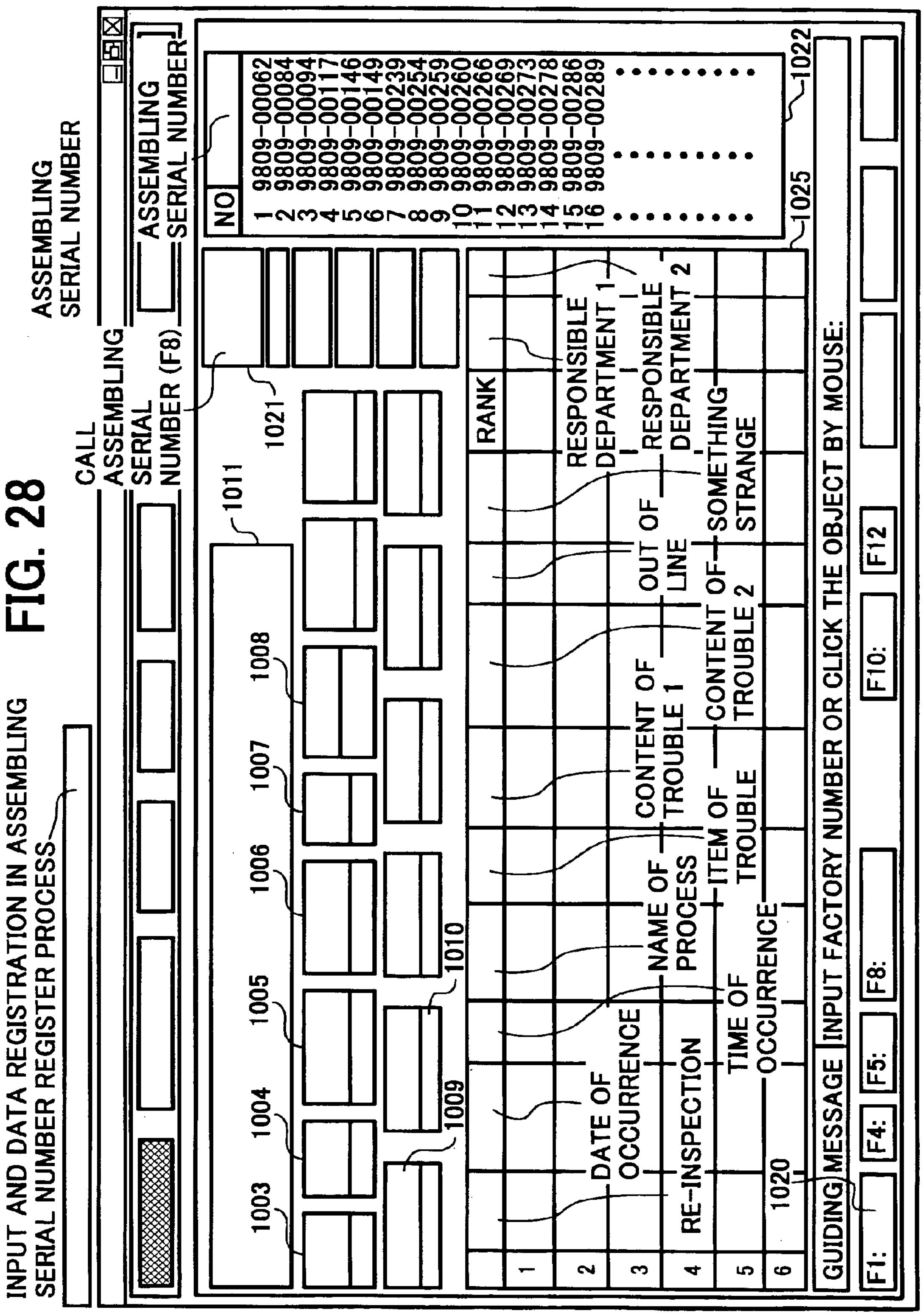
FIG. 28 is a diagram to show a display screen of inspection process.

In the data input screen for respective processes shown in FIG. 28, reference numeral 1003 designates the factory in the input item and 1004 designates the field of product, 1005 designates the name of product item, 1006 designates the step of production, 1007 designates the line number, 1008 designates the name of production process, 1009 designates the product code and 1010 designates the assembling serial number. At the same time, reference numeral 1011 designates a column of the input guidance in which the corresponding data items are automatically displayed on the basis of respective input items 1003 to 1009.

The respective operators input the data for the input items 1003 to 1009 according to the progress of assembling work of the assembling process of which the operator is in charge (step P507). In further detail, one of the input items displayed in the column of input guidance 1011 is selected and clicked by the mouse to be shown automatically in the respective corresponding flames of input items 1003 to 1009.

When the respective operators push down a "call assembling serial number" button 1021 in order to read out the data of assembling serial number of a machine on which he is in charge and which is now targeted in the inspection process (step P508), according to this operation the assembling serial numbers of the machine which are now on the line and are line out, are displayed in the list box 1022 (step P509).

Figure 29:
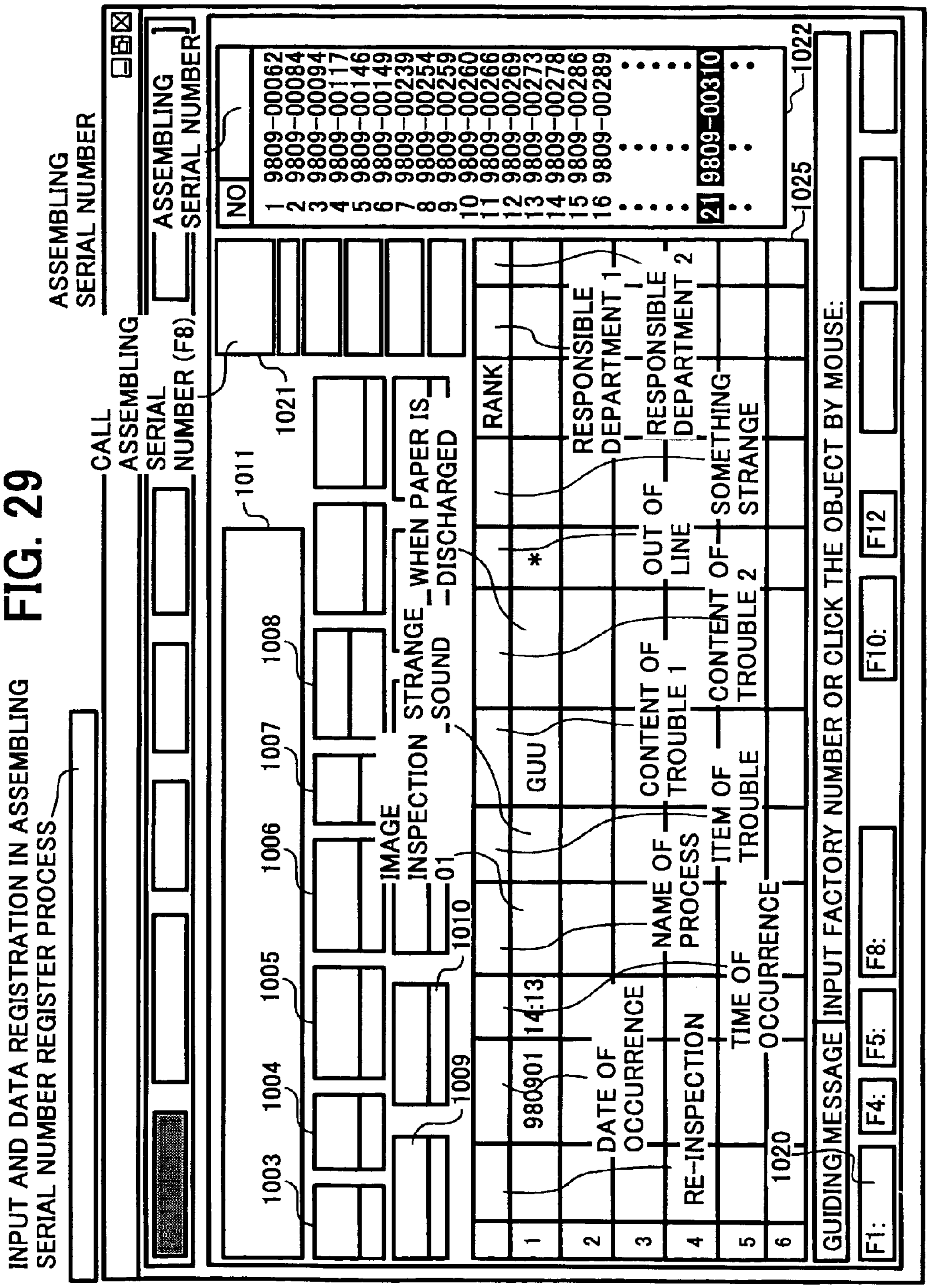
FIG. 29 is a diagram to show a display screen of inspection process.

When the targeted assembling serial number is selected among the list box 1022 and clicked by the respective operators (step P510), the data on quality of the assembling serial number at that time is displayed on the screen (step P511) as shown in FIG. 29. The assembling serial number and the data of quality of the assembling serial number displayed in the list box 1022 are read out from the server 300 to be displayed. In further detail, the data which have been input till the moment, are displayed in the input item and at the same time the data which is decided as fault (quality data) are displayed in a fault data input item column 1025 as shown in FIG. 29. At this point when there are no fault data, nothing is displayed.

When a trouble happens caused by the targeted assembling serial number in the targeted production process, the data related to the trouble are input in the fault data input item column 1025 (step P512). The respective operators input the trouble related data in the column in a case that the trouble of the targeted assembling serial number is made to happen in the targeted assembling serial number in the targeted production process. Firstly when "item of trouble" is input, data on "date of happening", "time of happening" and "name of production process" are automatically input. At the same time, it is possible to input this trouble related data in a format of single sheet. When a column for the number is clicked in the trouble data input item column 1025 shown in FIG. 29, the input screen for single sheet is displayed as shown in FIG. 30.

Then the respective operators push down the registration key 1020 to register the input data (step P513). The registered trouble related data are forwarded to the server 300 (step P514). The transferred trouble related data are stored in the corresponding table of the data base 708 by the server 300. Until an instruction of the completion is given (step P515), the operation on the consecutive steps P510 to P514 is repeatedly performed.

Request of Search/Output Process

Hereinafter the request for search/output process by the clients 501 to 503 of output system will be described with reference to FIG. 31 to FIG. 55. The request for search/output process is a process in that a request for search is output to the server 300 from the clients 501 to 503 of the respective departments of production/product inspection department 401, parts inspection department 402 and the manufacturing technology department 403, and the resulted searched data transferred from the server 300 are processed in time series form and displayed.

Figure 31A:
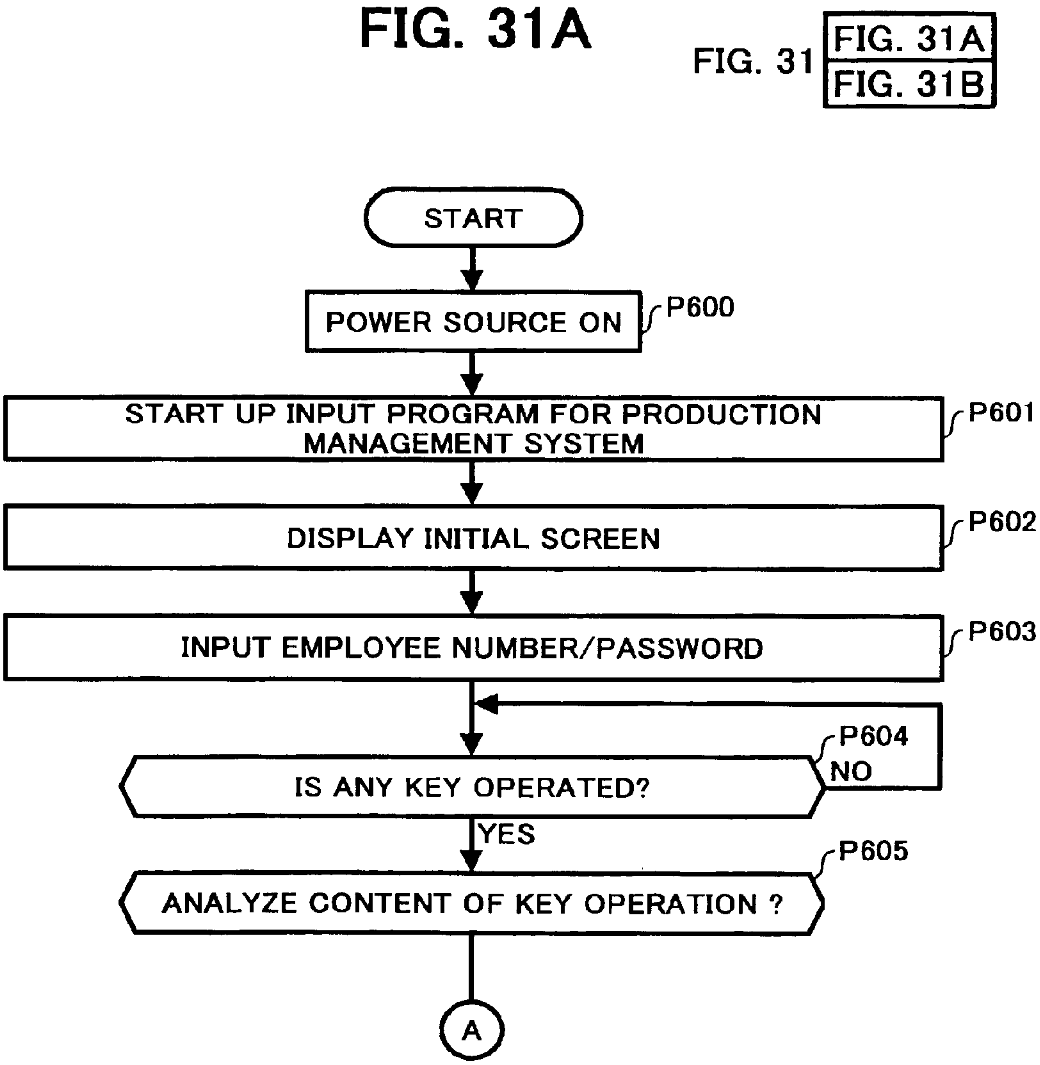
FIG. 31 is a flow chart to explain an outline of whole operation of the client of output system shown in FIG. 17.
Figure 31B:
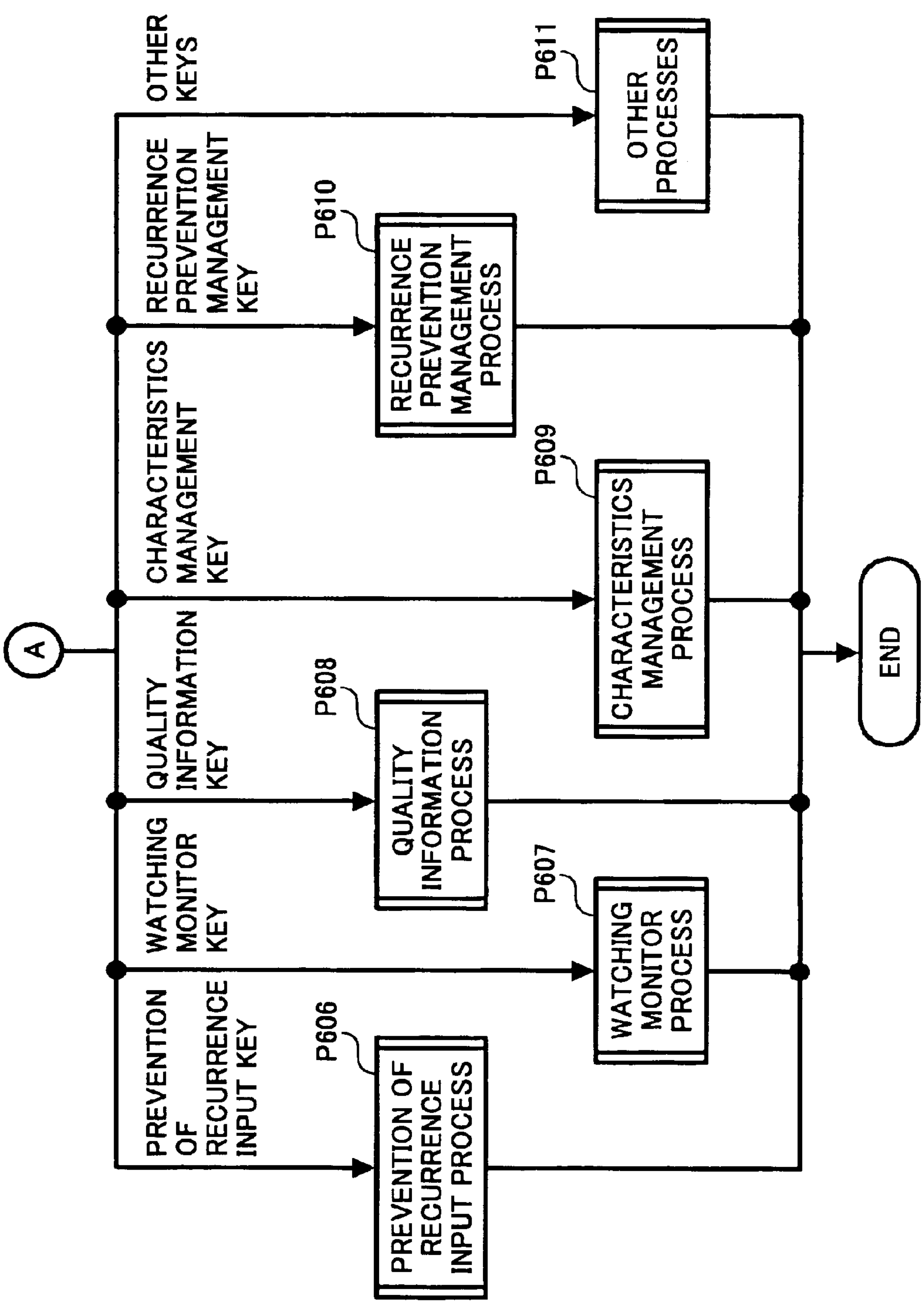
Figure 32:
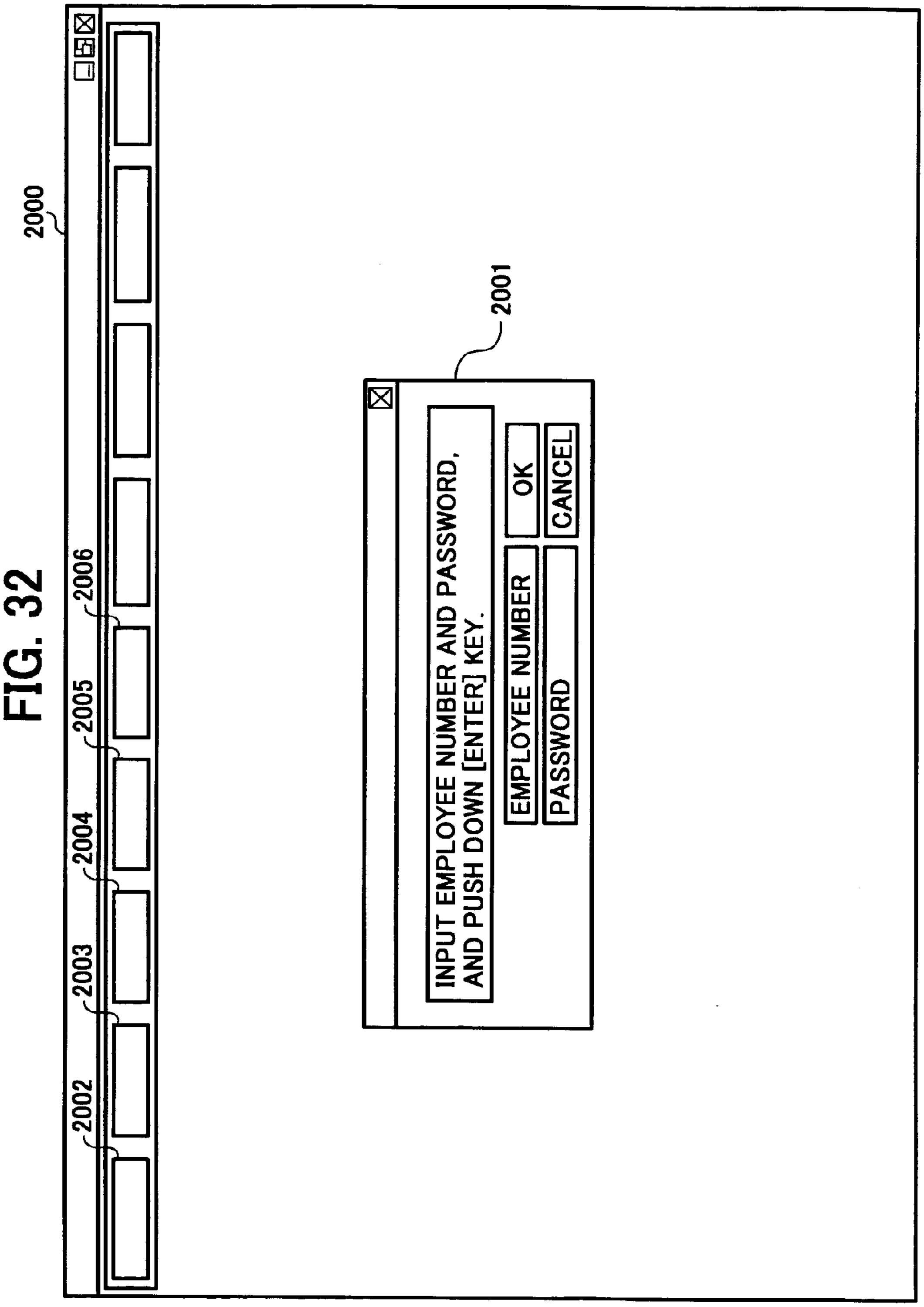
FIG. 32 is a diagram to show an initial screen of the client of output system.

FIG. 31 is a flow chart to explain an outline of whole operation of the clients 501 to 503 of output system. In FIG. 31 at first by the respective managers of the production product inspection department 401, the parts inspection department 402 and the manufacturing technology department 403, the respective power sources of clients 501 to 503 are turned on for power to be supplied (step P600), the production management system input program 807*b* is selected to start up the production management system input program 807*b* (step P601), an initial screen 2000 is displayed as shown in FIG. 32 (step P602). In a portion of the initial screen, a sub screen 2001 is displayed to input the employee number and password by the manager (step P603). When the above described steps are completed, the key input to the screen is made to be possible.

When any key is operated by the manager (step P604), the content of key operation is analyzed (step P605). When the prevention of recurrence input key 2002 is selected, 1: an input process for prevention of recurrence (step P606) is performed. When the watching monitor key 2003 is selected, 2: a watching monitor process (step P607) is performed. When the quality information key 2004 is selected, 3: a quality information process (step P608) is performed. When the characteristics management key 2005 is selected, 4: a characteristics management process (step P609) is performed. When the recurrence prevention management key 2006 is selected 5: a management process for prevention of recurrence (step P610) is performed When the other key is selected, the other process (step P611) is performed.

Hereinafter, a description will be given on 1: an input process for prevention of recurrence (the above described step P606), 2: a watching monitor process (the above described step P607), 3: a quality information process (the above described step P608), 4: a characteristics management process (the above described step P609) and 5: a management process for prevention of recurrence (the above described step P610).

1: Input Process for Prevention of Recurrence

Figure 33A:
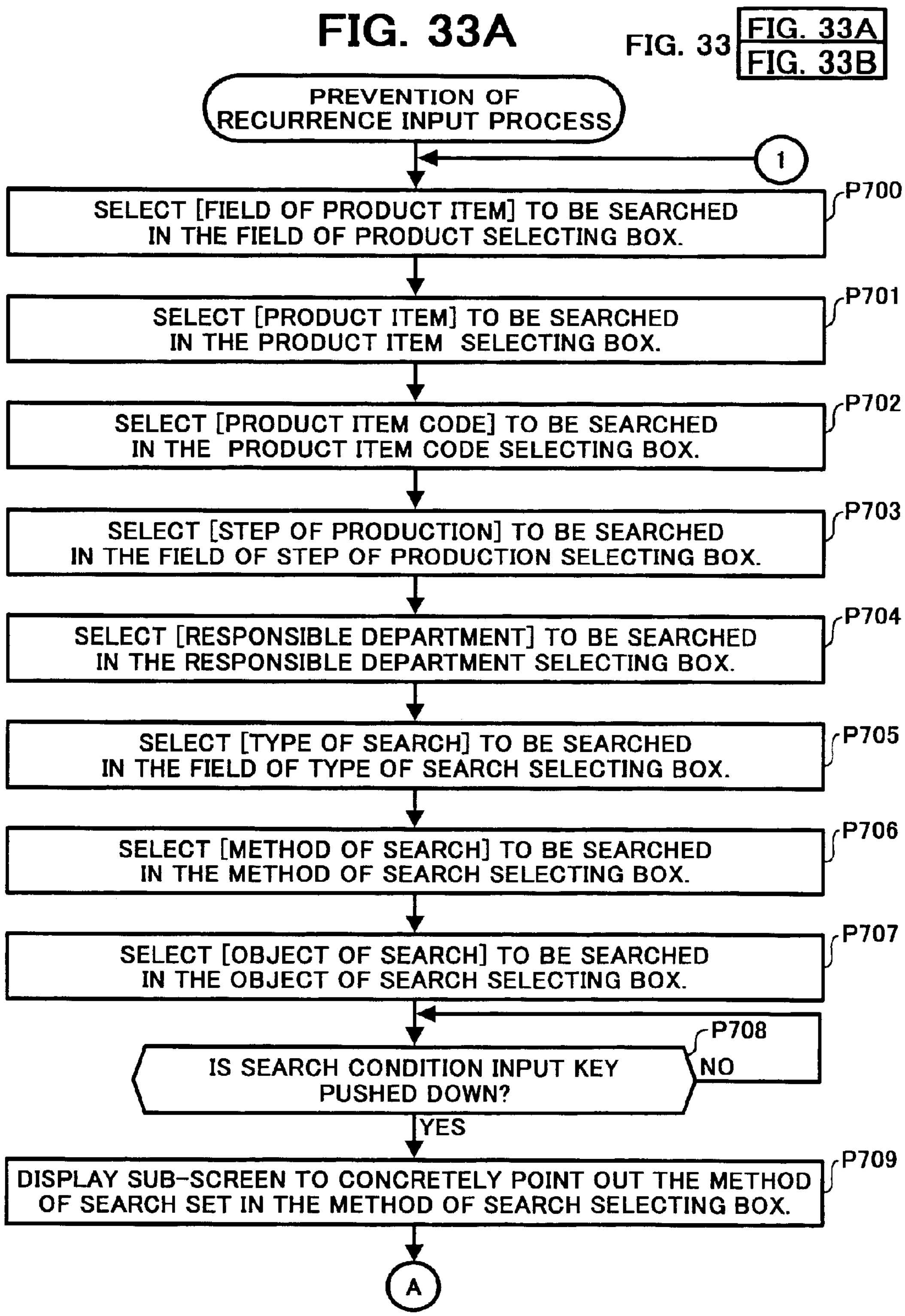
FIG. 33 is a flow chart to explain an input process for prevention of recurrence in detail shown in FIG. 31.
Figure 33B:
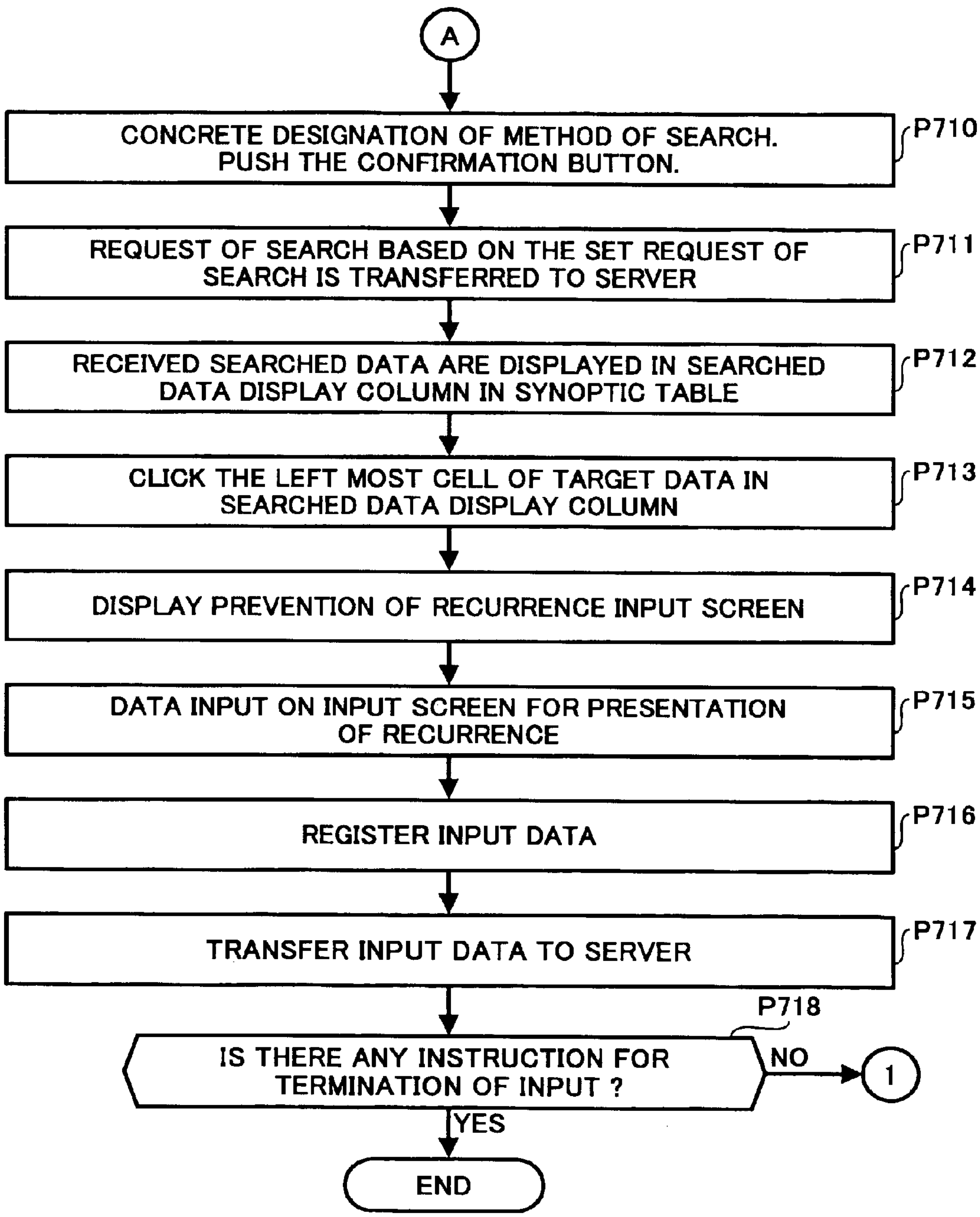

The input process for prevention of recurrence will be described with reference to FIGS. 34 to 37 in accordance with the flow chart shown in FIG. 33. FIG. 33 is a flow chart to explain the input process for prevention of recurrence, and FIG. 34 to FIG. 37 are diagrams to show a display screen of the input process for prevention of recurrence.

Figure 34:
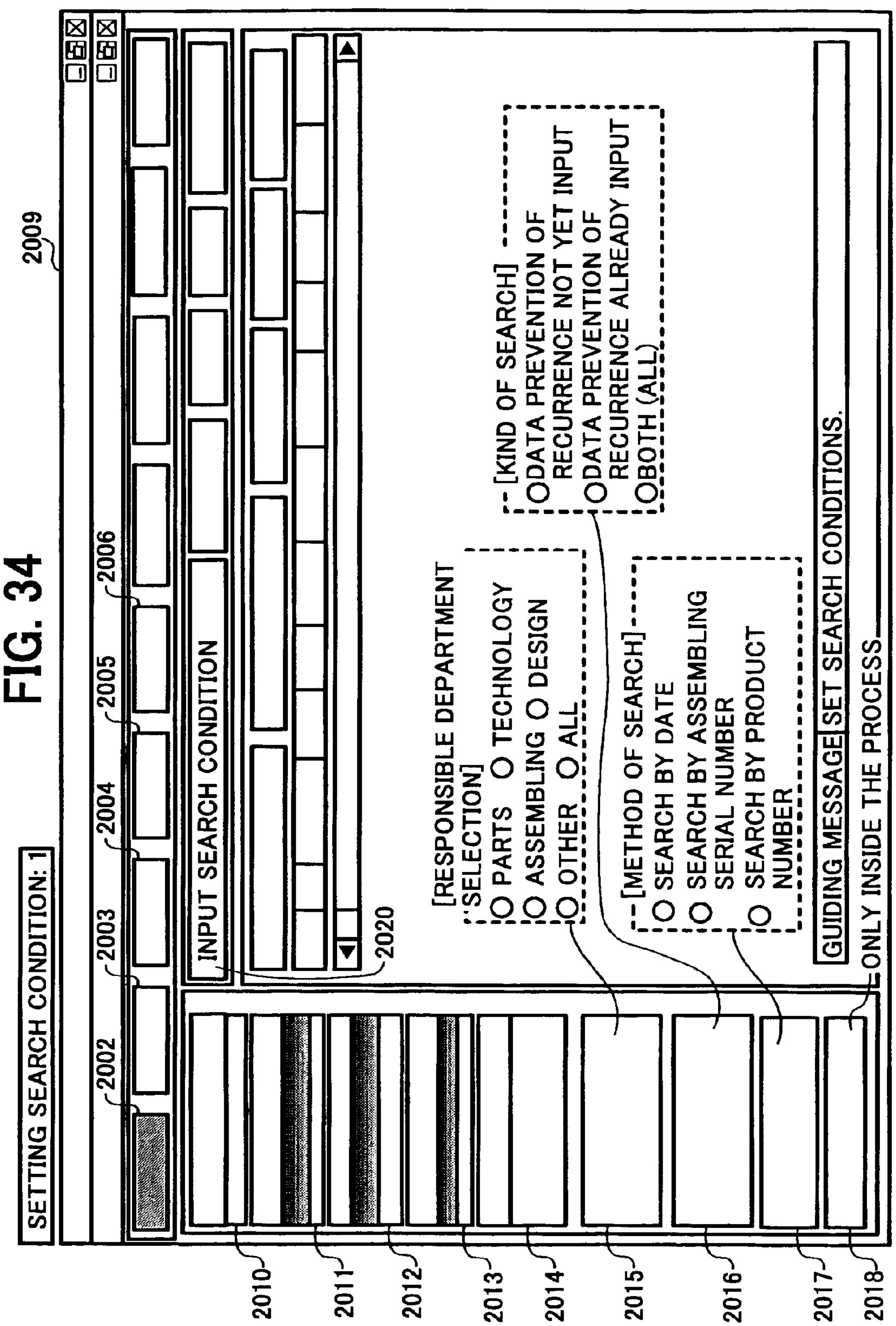
FIG. 34 is a diagram to show a display screen of the process for prevention of recurrence.

FIG. 34 shows an initial screen 2009 of the input process for prevention of recurrence which is shown when the prevention of recurrence input key 2002 is selected. In the drawing, reference numeral 2010 designates a key to display a period in which the data of selected product item exist. When the key 2010 is pushed down, the period of data existing of the selected product item is displayed. Reference numeral 2011 designates a field of product selecting box to select [field of product] to be searched, 2012 designates a product item selecting box to select [product item] to be searched, 2013 designates a product item code selecting box to select [product item code] to be searched, 2014 designates a step of production selecting box to select [step of production] to be searched.

Reference numeral 2051 designates a responsible department selecting column to select [responsible department] to be searched. In the responsible department column 2015 any one of "parts", "technology", "assembling", "deign", "other" and "all" is selected. Reference numeral 2016 designates a kind of search selecting column to select "kind of search" to be searched. In the kind of search column 2016 any one of "data not yet input prevention of recurrence", "data already input prevention of recurrence" and "all" is selected. Reference numeral 2017 designates a method of search selecting column to select [method of search] to be searched. In the method of search column 2017 any one of "search by date", "search by assembling serial number" and "search by product number" can be selected. Reference numeral 2018 designates an object of search selecting column to select [object of search] to be searched. In the object of search column 2018 any one of "only within production process" or "only out of production process" is selected.

In the flow chart shown in FIG. 33, at first a selection of [field of product] to be searched is performed in the field of product selecting box 2011 by the manager at the initial screen 2009 shown in FIG. 34 (step P700), then a selection of [product item] to be searched is performed in the product item selecting box 2012 (step P701). A selection of [product item code] to be searched is performed in the product item code selecting box 2013 (step P702), then a selection of [step of production] to be searched is performed in the step of production selecting box 2014 (step P703).

In the responsible department selecting column 2015 a selection of [responsible department] to be searched is performed (step P704), and in the kind of search selecting column 2016 a selection of [kind of search] to be searched is performed (step P705). Further in the method of search selecting column 2017 a selection of [method of search] to be searched is performed (step P706) and in the object of search selection column 2018 a selection of [object of search] to be searched is performed (step P707).

Figure 35A:
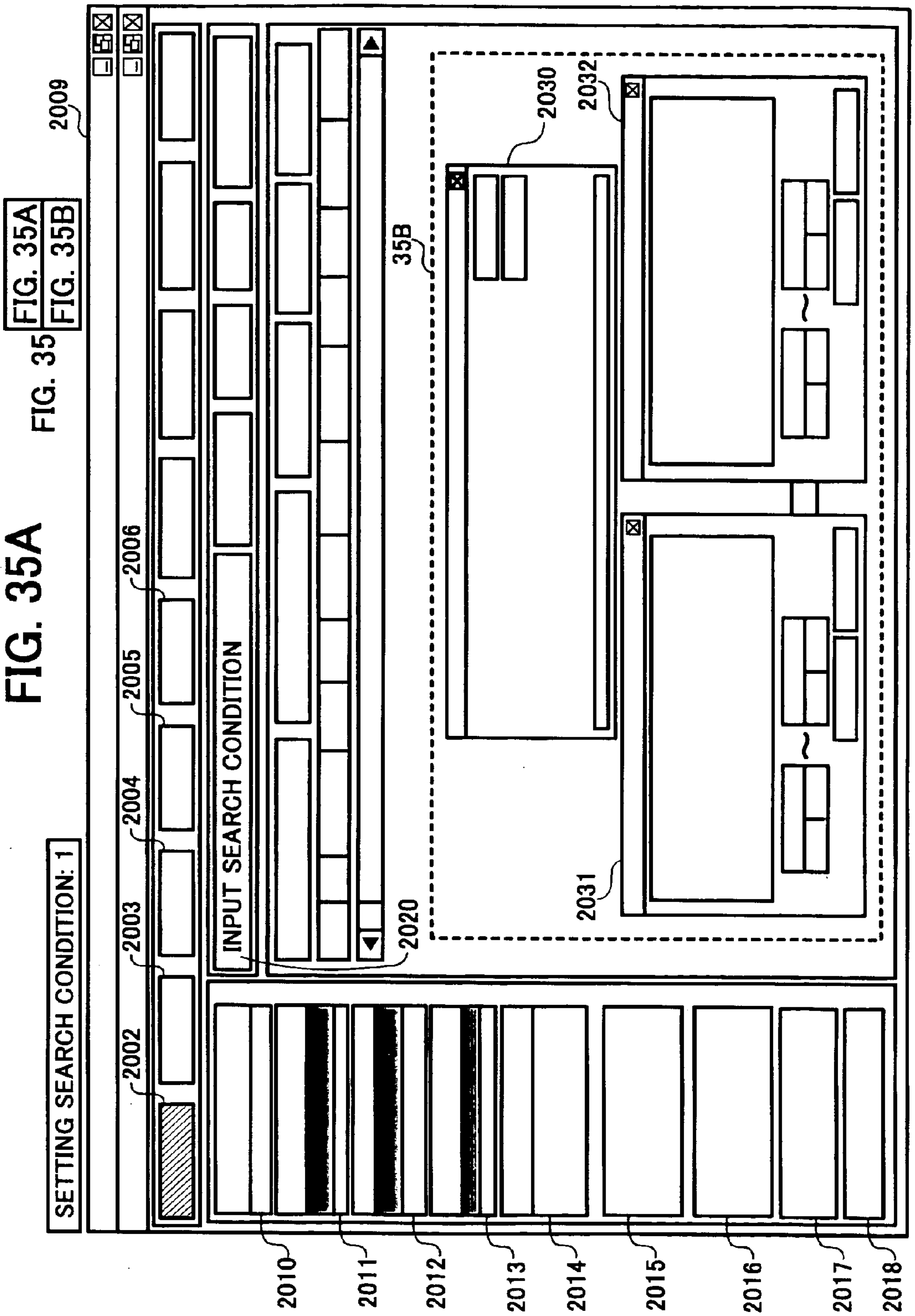
FIG. 35 is a diagram to show a display screen of the process for prevention of recurrence.
Figure 35B:
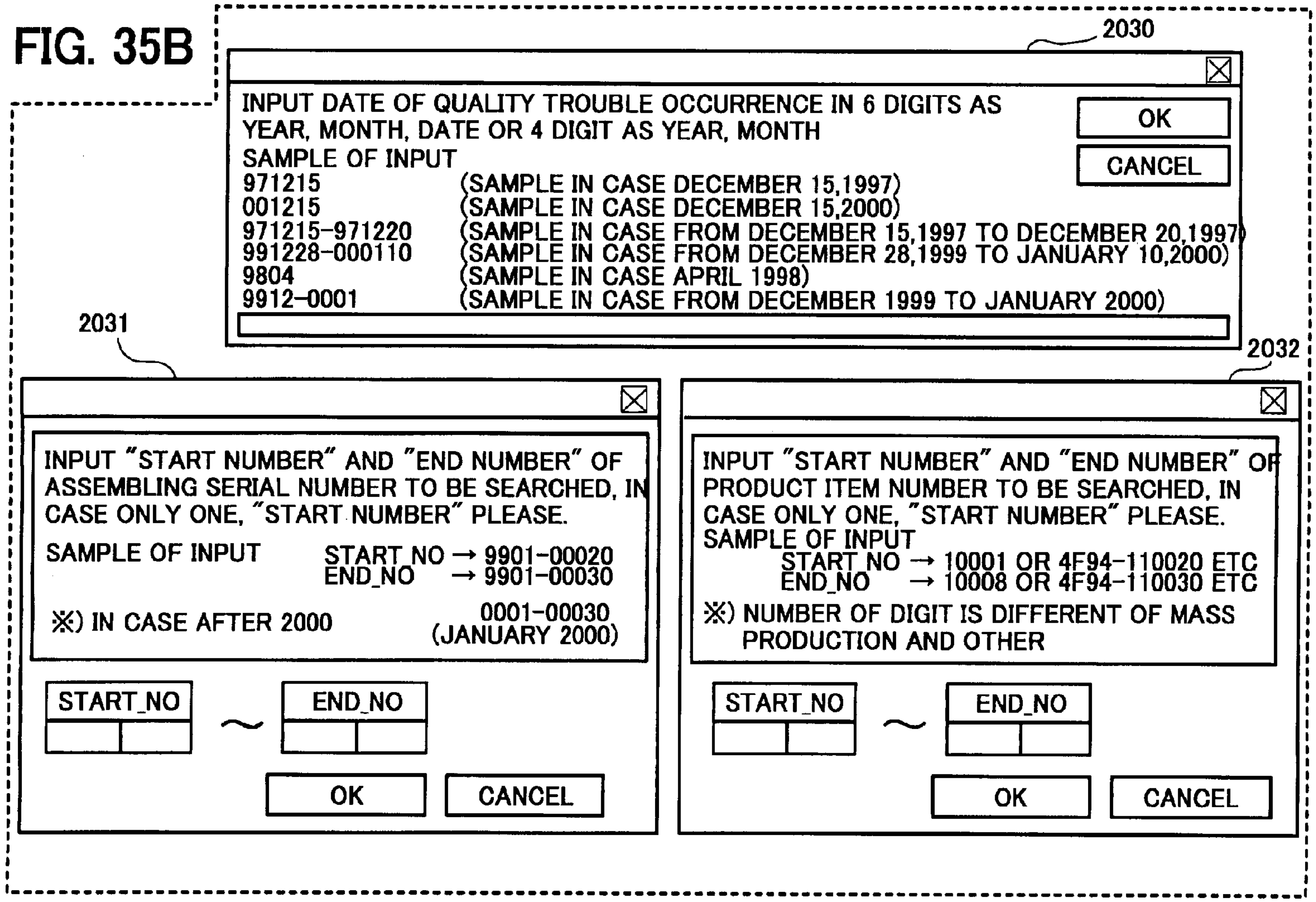

When the manager pushes down the search condition input key 2020 (step P708), a sub screen to specify concretely the method of search selected in the method of search selecting column 2017 (step P709). In further detail when "search by date" is selected in the method of search selecting column 2017 as shown in FIG. 35, a sub screen 2030 is displayed and a period of search is input by the manager, and when "search by assembling serial number" is selected, a sub screen 2031 is displayed and "START NO" and "END NO" of it are input by the manager, and further when "search by product number" is selected, a sub screen 2032 is displayed and "START NO" and "END NO" of it are input by the manager.

Figures 36, 36A, 36B:
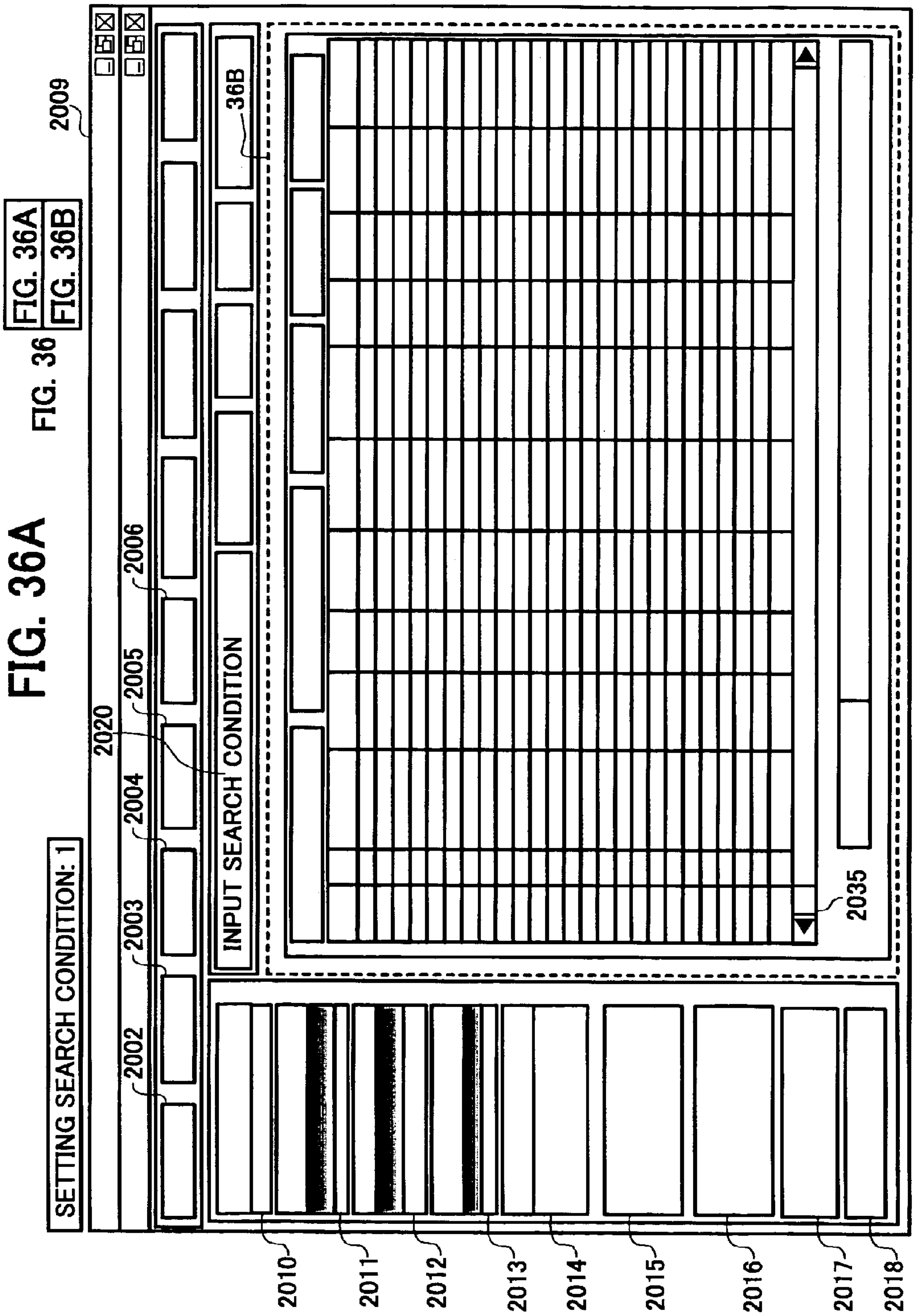
FIG. 36 is a diagram to show a display screen of the process for prevention of recurrence.
Figure 36B:
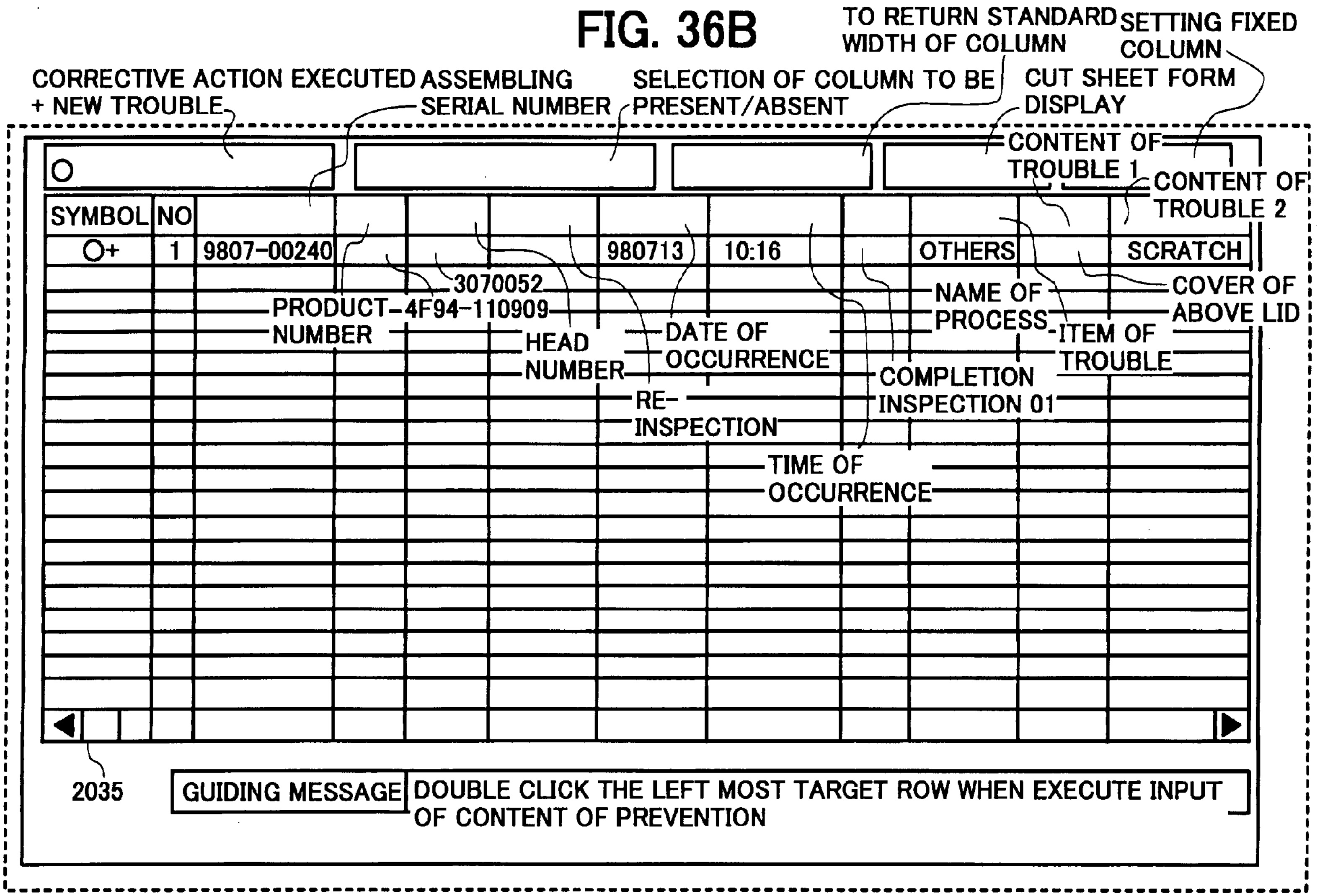

When the search condition is concretely specified by the manager and the confirmation button is pushed down (step P710), a request for search on the basis of the search conditions specified in the above described steps P700 to P710 is forwarded to the server 300 (step P711). A data search in accordance with the search conditions arc performed by the server 300 and the resulted searched data searched are transferred from the server 300. The resulted searched data searched (raw data) are listed in the resulted searched data display column 2035 in a form of synoptic table as shown in FIG. 36 (step P712).

The resulted searched data display column 2035 includes items of "number", "assembling serial number", "product serial number", "head number", "inspection again", "date of occurrence", "name of process", "item of trouble", "content of trouble", "out of line", "rank", "responsible department", "cause of trouble", "content of repairing", "date of repairing, "content of prevention for recurrence", "date of corrective action", "time of corrective action", "person in charge for corrective action"and so on, it is possible to decide freely by the operator that which items are selected and displayed in the resulted searched data display column 2035.

Figure 37A:
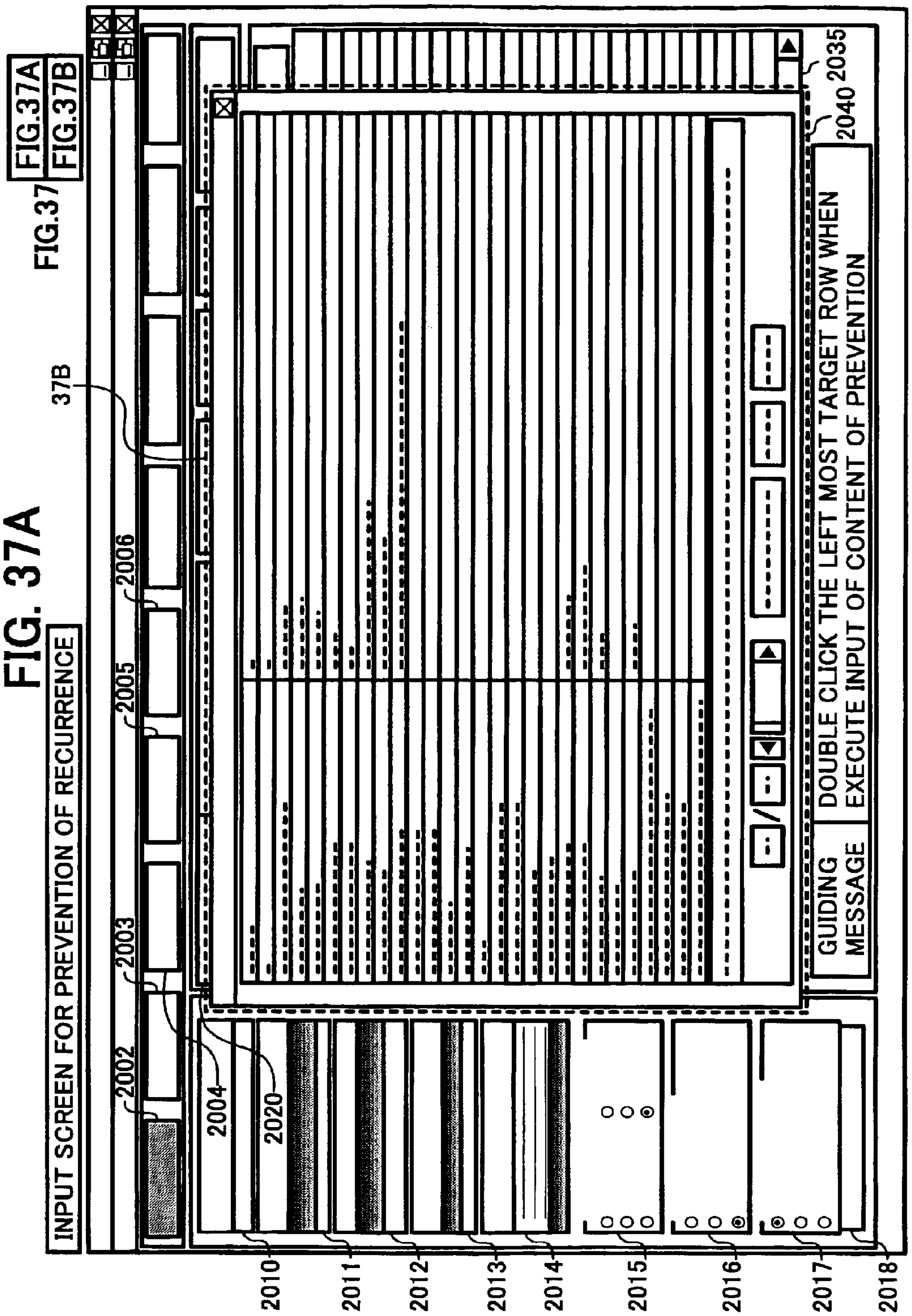
FIG. 37 is a diagram to show a display screen of the process for prevention of recurrence.

When the left most cell of the target data is clicked in the resulted searched data display column 2035 (step P713), a prevention of recurrence input screen 2040 is displayed as shown in FIG. 37 (step P714). The data items of "content of prevention of recurrence", "date of corrective action", time of corrective action" and "person in charge for corrective action" are input by the manager into the prevention of recurrence input screen 2040 (step P715), and the registration key is pushed down to register them (step P716). The registered prevention of recurrence data are forwarded to the server 300 (step P717). The transferred prevention of recurrence data are stored in the corresponding tables in the data base 708 of server 300 and until an instruction of the completion is given (step P718), the operation on the consecutive steps P700 to P717 is repeatedly performed.

2: Watching Monitor Process

Figure 38A:
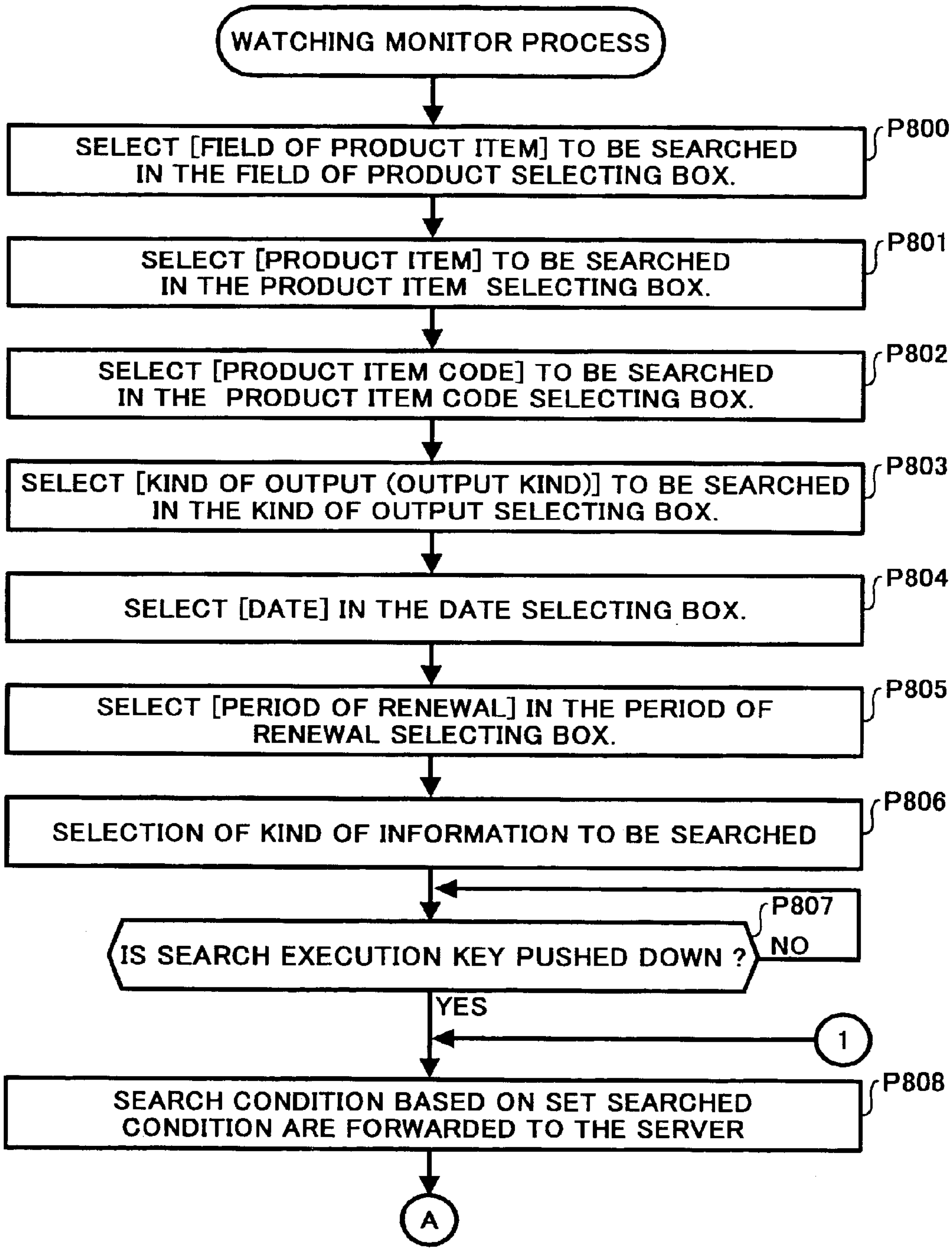
FIG. 38 is a flow chart to explain a monitoring process shown in FIG. 31.
Figure 38B:
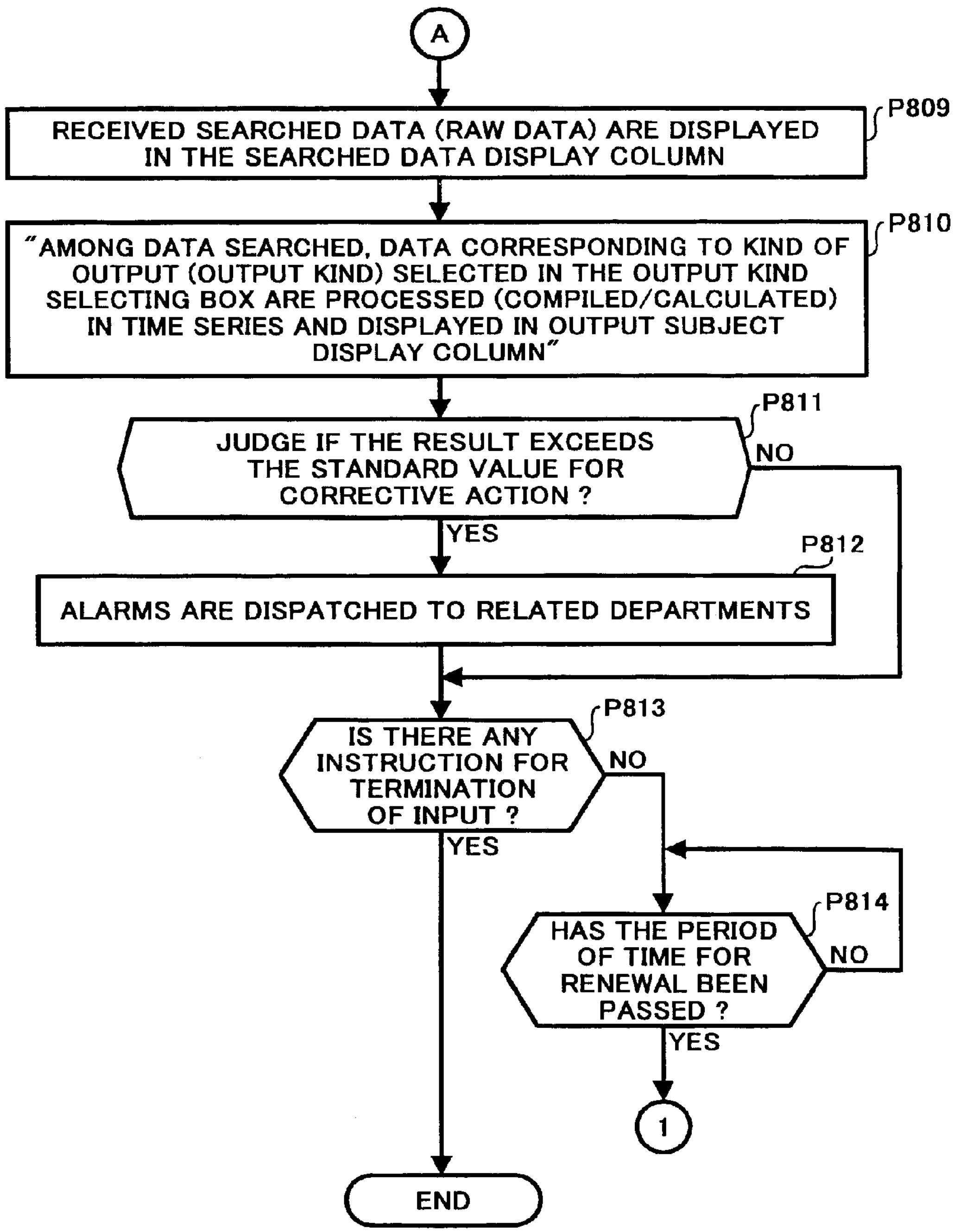

The watching monitor process will be described with reference to FIG. 39 to FIG. 42 in accordance with the flow char shown in FIG. 38. FIG. 38 is a flow chart to explain the watching monitor process and FIG. 39 to FIG. 42 are diagrams to show a display screen of the watching monitor process. This watching monitor process is been always performed while the manufacturing assemble line 100 is operated in at least one of the clients 501 to 503 of output system.

Figure 39:
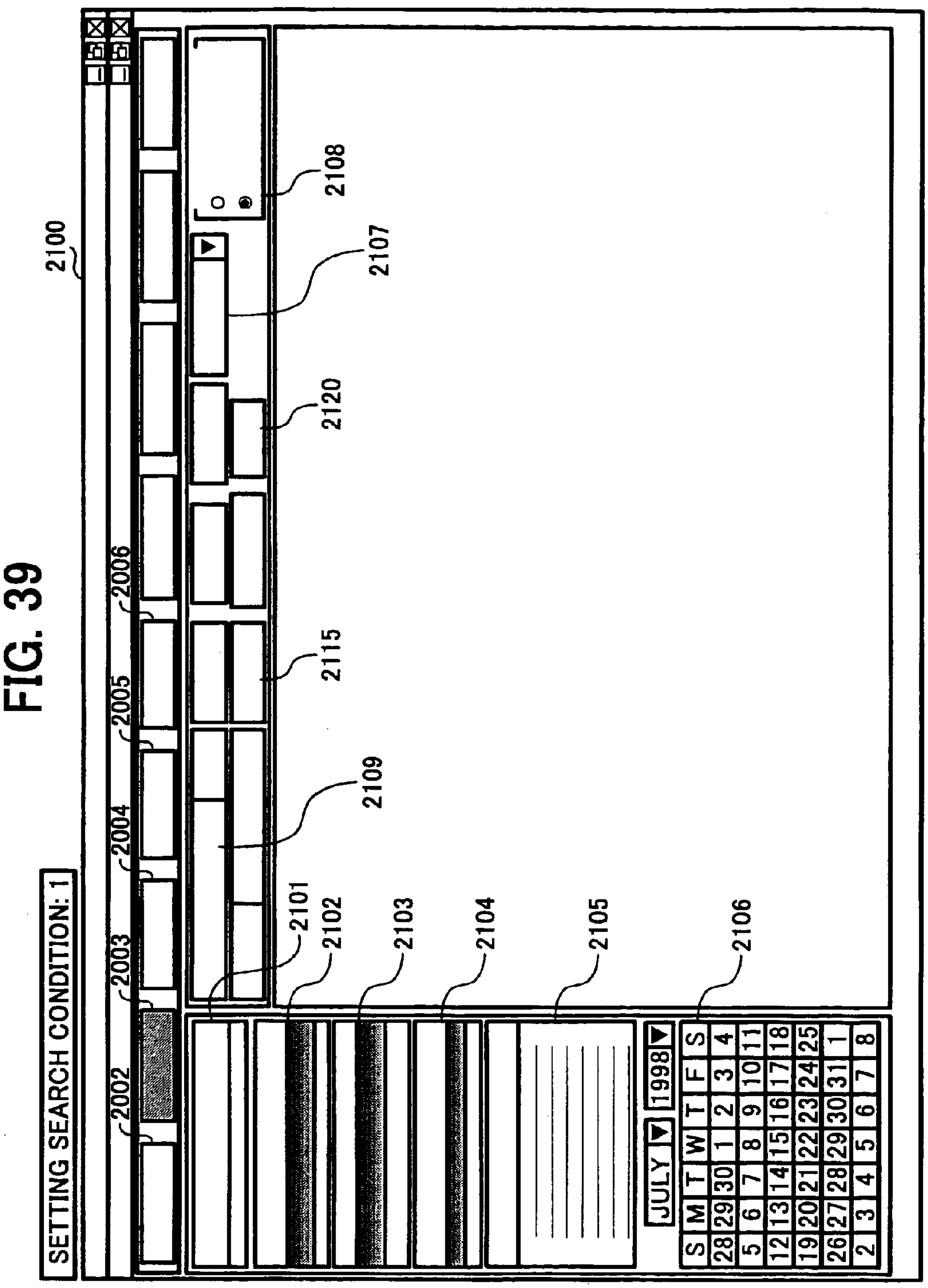
FIG. 39 is a diagram to show a display screen of the monitoring process.

FIG. 39 shows an initial screen 2100 of the watching monitor process which is shown when the watching monitor key 2003 is selected. In the drawing, reference numeral 2101 designates a key to display a period in which the data of selected product item exist. When the key 2101 is pushed down, the period of data existing of the selected product item is displayed. Reference numeral 2102 designates a field of product selecting box to select [field of product] to be searched, 2103 designates a product item selecting box to select [product item] to be searched, 2104 designates a product item code selecting box to select [product item code] to be searched, 2105 designates a kind of output selecting box to select the kind of output. The kind of output is selected from "quality record information of production of the day", "situation of occurrence by production process", "situation of occurrence by item of trouble", "situation of occurrence by responsible department", "situation of occurrence by rank", "situation of out of line/release", and "situation of occurrence by content of trouble" which are displayed in the kind of output selecting box 2105.

At this point, the "quality record information of production of the day" is an information to understand a quality record, a difference from the target value and a variation. The "situation of occurrence by production process" is an information to understand a transition and a tendency of situation of occurrence on the basis of respective production process. The "situation of occurrence by item of trouble" is an information to understand a transition and a tendency of situation of occurrence on the basis of respective item of trouble. The "situation of occurrence by rank" is an information to understand a transition and a tendency of situation of occurrence on the basis of respective rank. The "situation of out of line/release" is an information to understand a transition and a tendency of situation out of line and release of it. The "situation of occurrence by content of trouble" is an information to understand a transition and a tendency of situation of occurrence of trouble on the basis of respective content of trouble. This kind of output (object of output) item can be selected in any time before or after the data search has been performed.

Reference numeral 2106 designates a column to select "date" of the data to be searched. Reference numeral 2107 designates a column to select kind of information to be searched, and any one of "only within the production process", "only out of production process" and "in and out of production process" can be selected. Reference numeral 2108 designates criterion of display column and by which it is decided that display of information is performed on the basis of "date of trouble occurrence" or "date of product completion". The setting of this criterion of display 2108 can be achieved in any time before or after the data search has been performed.

Figure 40:
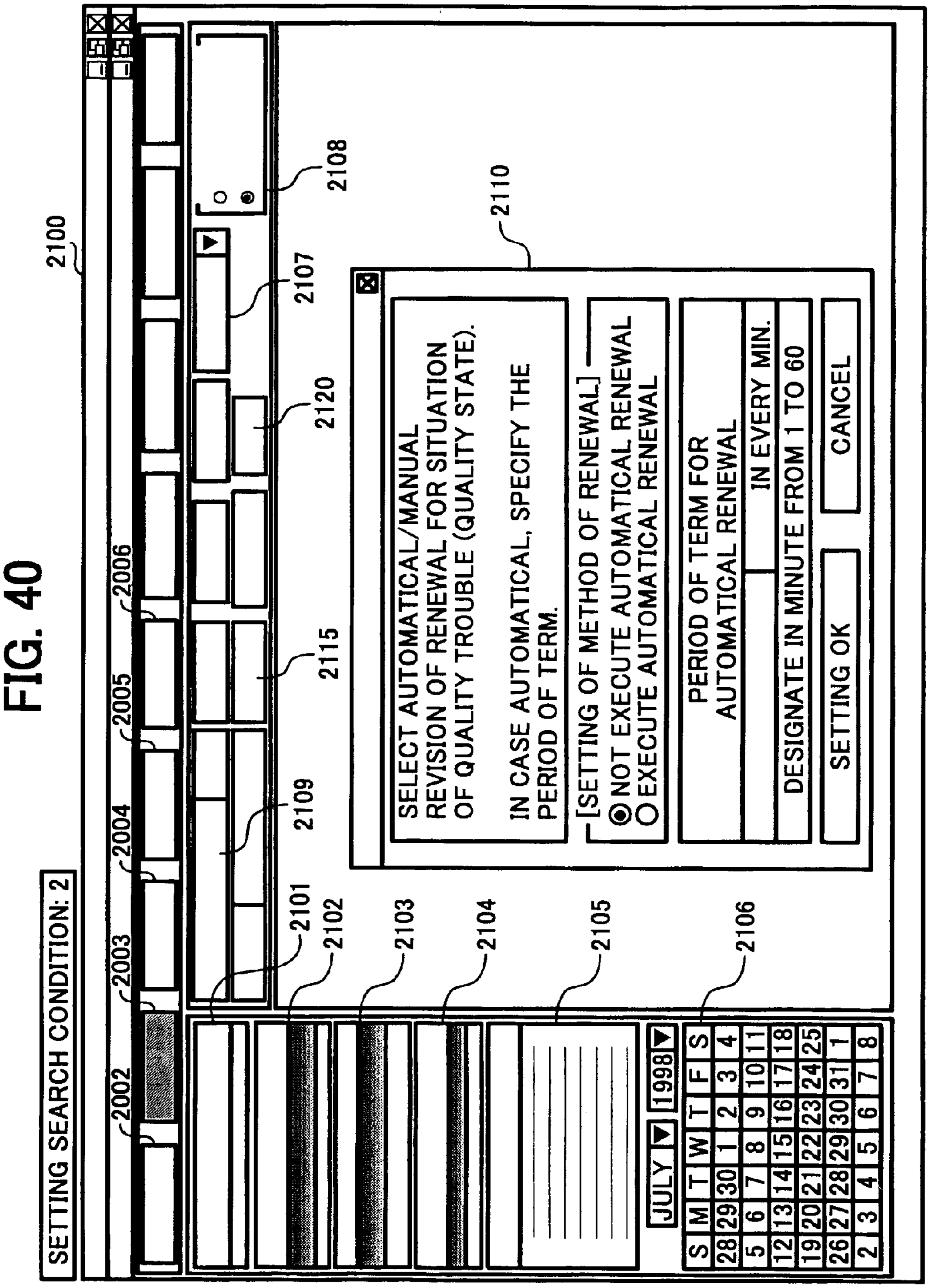
FIG. 40 is a diagram to show a display screen of the monitoring process.

Reference numeral 2109 designates [period of renewal] setting key, and when this [period of renewal] key 2109 is selected, a sub screen 2110 sown in FIG. 40 is displayed. In this sub screen 2110 it is selected if a search of information is automatically renewed, and it is selected how long period of time the renewal is achieved in minutes when in case the automatic renewal is performed. At this point, the term automatic renewal means a function that the system search information and displays the latest result on the screen automatically in every a predetermined period of time event though the execution of search button is not pushed down. Reference numeral 2115 designates the execution of search button. By pushing down this execution of search button 2115 the search of information in conformance with the search condition enables to be performed and result of information searched is displayed on the screen.

In the flow chart shown in FIG. 38, at first a selection of [field of product] to be searched is performed in the field of product selection box 2102 by the manager at the initial screen shown in FIG. 39 (step P800), then a selection of [product item] to be searched is performed in the product item selecting box 2103 (step P801). And a selection of [product item code] to be searched is performed in the product item code selecting box 2104 (step P802), then a selection of kind of output (object to be output) is selected in the kind of output selecting box 2105 (step P803). Additionally the period of renewal is set (step P805) and a kind of information to be searched is selected (step P806).

Figure 41A:
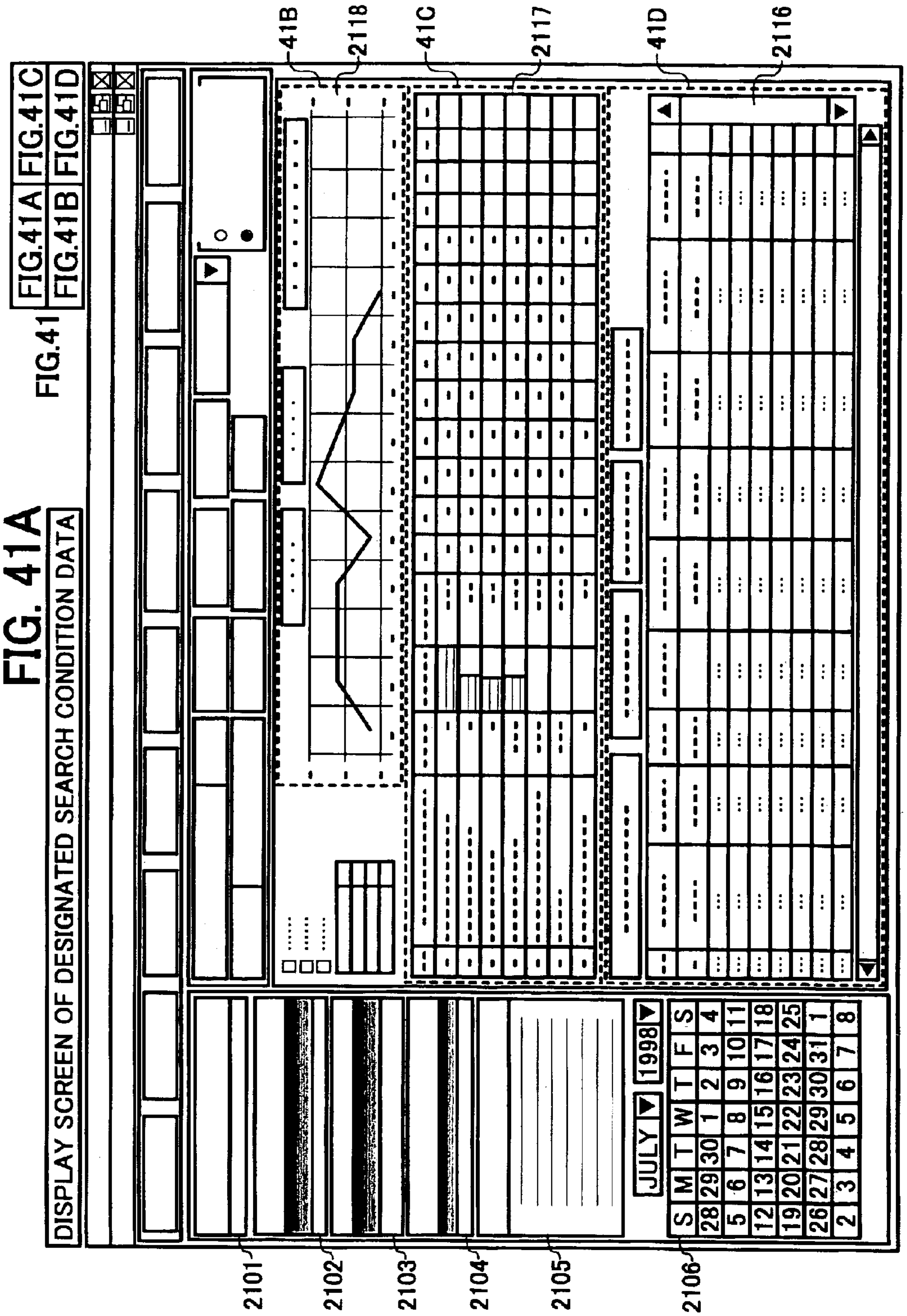
FIG. 41 is a diagram to show a display screen of the monitoring process.
Figures 41B, 41C:
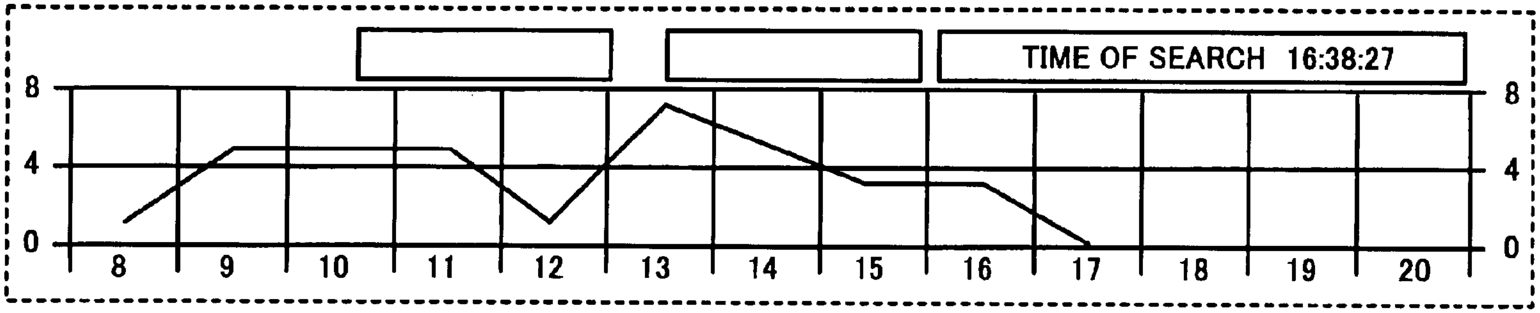

When by the manager the execution of search button 2115 is pushed down (step P807), a request for search on the basis of the search conditions specified in the above described steps P800 to P807 is forwarded to the server 300 (step P808). A data search in accordance with the search conditions are performed by the server 300 and the resulted searched data are transferred from the server 300. The resulted searched data (raw data) are listed in the resulted searched data display column 2116 in a form of synoptic table as shown in FIG. 41 (step P809). The resulted searched data display column 2116 includes items of "number", "assembling serial number", "product serial number", "head number", "inspection again", "date of occurrence", "name of process", "item of trouble", "content of trouble", "out of line", "rank", "responsible department", "cause of trouble", "content of repairing", "date of repairing", "content of prevention for recurrence", "date of corrective action", "time of corrective action", "person in charge for corrective action" and so on, it is possible to decide freely by the operator that which items are selected and displayed in the resulted searched data display column 2116.

Among the resulted searched data, the data of kind of output (object to be output) which is selected in the kind of output selecting box 2106 are processed for summation and calculation in time series and displayed in the resulted searched data display column 2117 as a synoptic table (step P810). At the same time the items of displayed resulted searched data can be further selected to be displayed in a graph displaying column 2118 in a form of graph. The items to be displayed in the form of graph can be selected arbitrary by the operator.

FIG. 41 shows the data which are displayed in the resulted searched data display column 2117 when the "quality record information of production of the day" is selected in the kind of output selecting box 2105. In the resulted searched data display column 2117 shown in FIG. 41 "TOTAL NO", "graph of TOTAL NO", "rate" and "occurrence in every hour (08:00–20:00)" are displayed corresponding to the data items (amount of production (completion), amount of production without defect, count of quality trouble, rate of no defect, count of defect per piece, PQ value, amount of out of line). A graph display column 2118 shown in FIG. 41 displays one sample of graph display when the amount of production (completion) is selected when the amount of production (completion) is selected in the resulted searched data display column 2117.

(A) to (F) in FIG. 42 show samples of the resulted searched data display column 2117 when "situation of occurrence by production process", "situation of occurrence by reason of trouble", "situation of occurrence by rank" and "situation of out of line/release" are respectively selected in the kind of output selecting box 2105.

The data displayed on the display screen can be output to be printed in the printing portion 808 by pushing down the print key 2120. The resulted searched data displayed in the resulted searched data display column 2117 are compared with the predetermined criteria to initiate the corrective actions (step P811), and alarms are sent to the related department (the responsible department or related assembly process which are registered in advance) when the resulted searched data exceed the criteria for corrective action (step P812). And it is decided if an instruction of the completion is given or not (step P813), and when the instruction is given the operation is terminated, on the other hand when the instruction is not given, the apparatus refers to the set renewal time (step P814), and operation is returned to the step P807 and the operation for renewal of data search are performed when the set renewal time has passed (step P808 to step P812). As above described, the judgement if the result exceed the criteria to initiate the corrective action, is always performed.

3: Quality Information Process

Figure 43B:
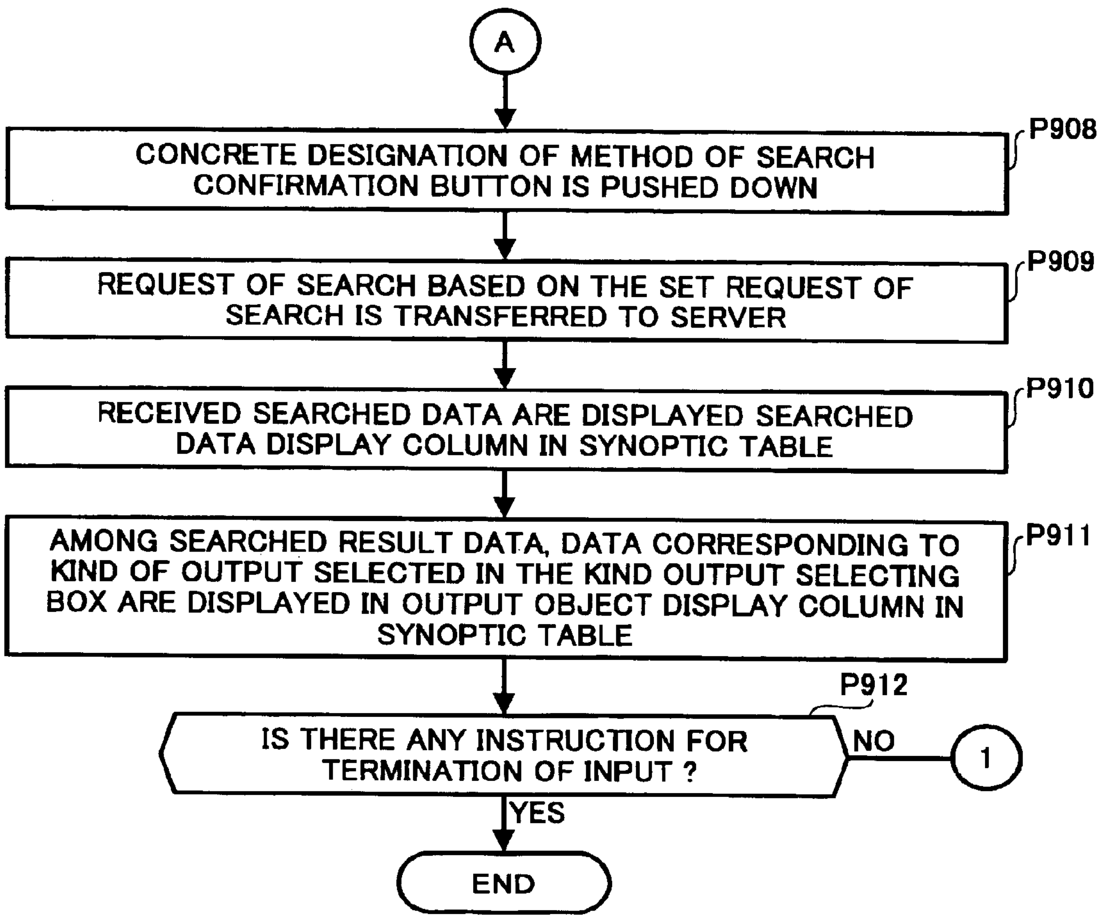
FIG. 43 is a flow chart to explain a process for product quality.

The quality information process will be described with reference to FIG. 44 to FIG. 47 in accordance with the flow char shown in FIG. 43. FIG. 43 is a flow chart to explain the quality information process and FIG. 44 to FIG. 47 are diagrams to show a display screen of the quality information process.

Figure 44:
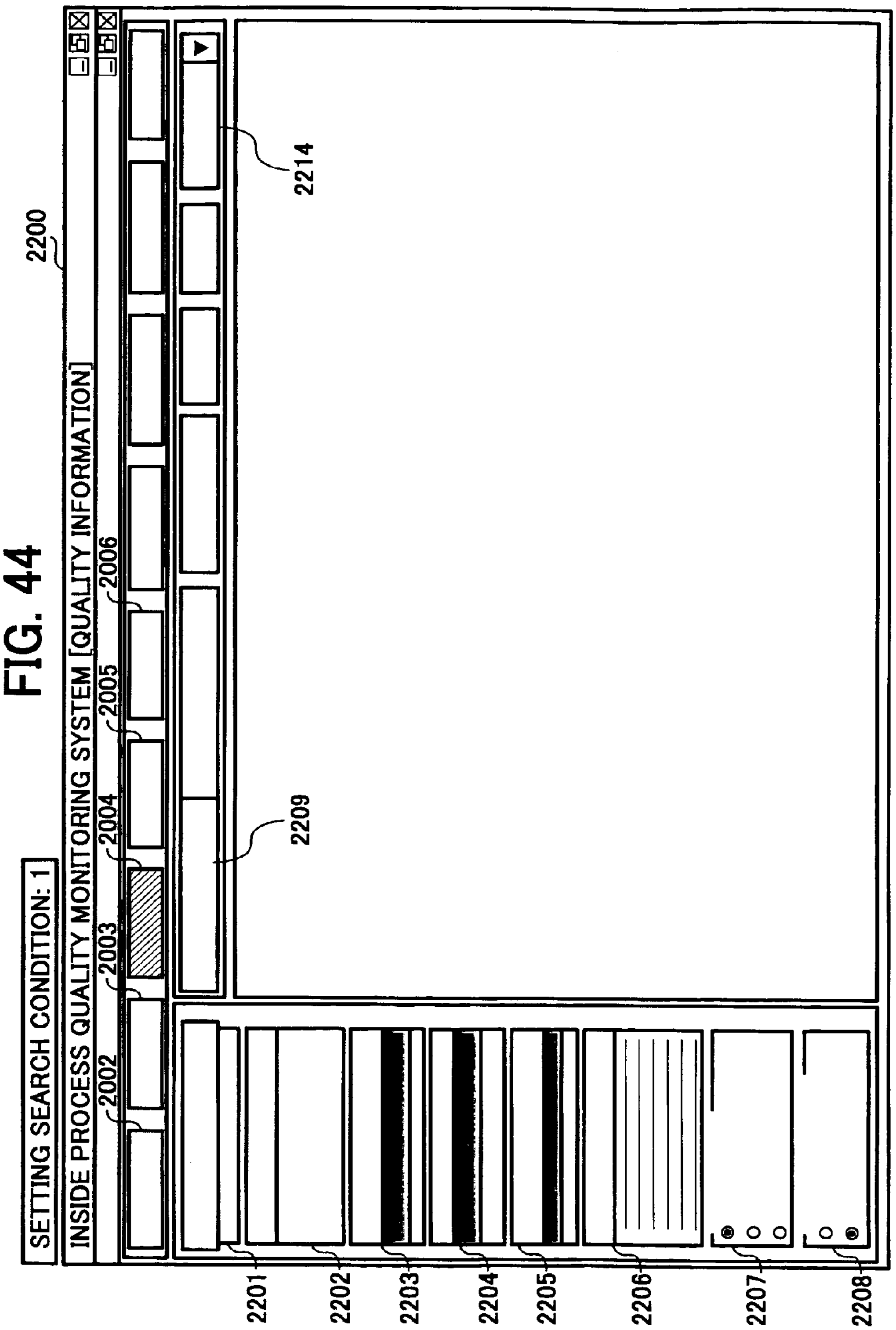
FIG. 44 is a diagram to show a display screen of the process for product quality.
Figure 45A:
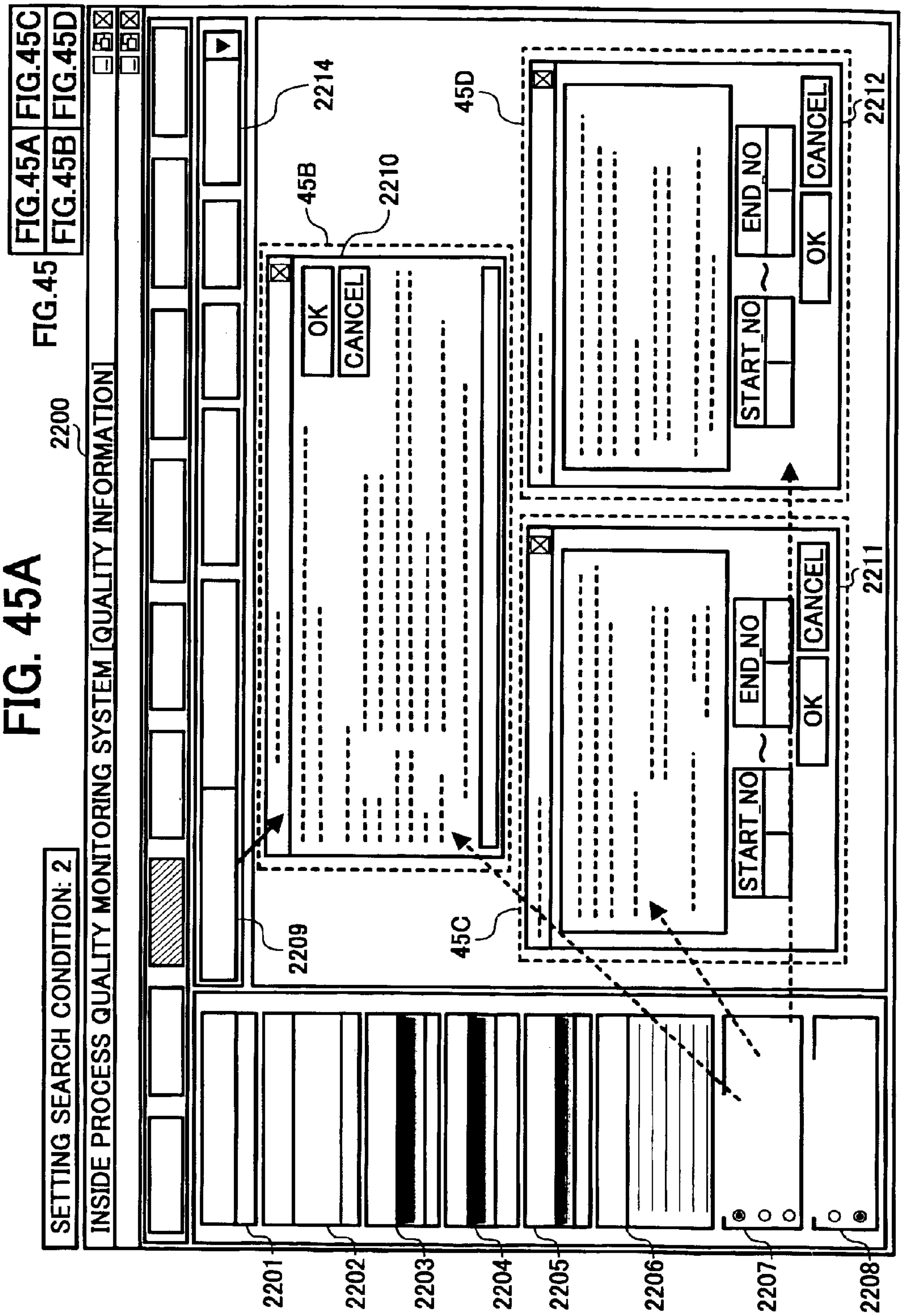
FIG. 45 is a diagram to show a display screen of the process for product quality.
Figure 45B:
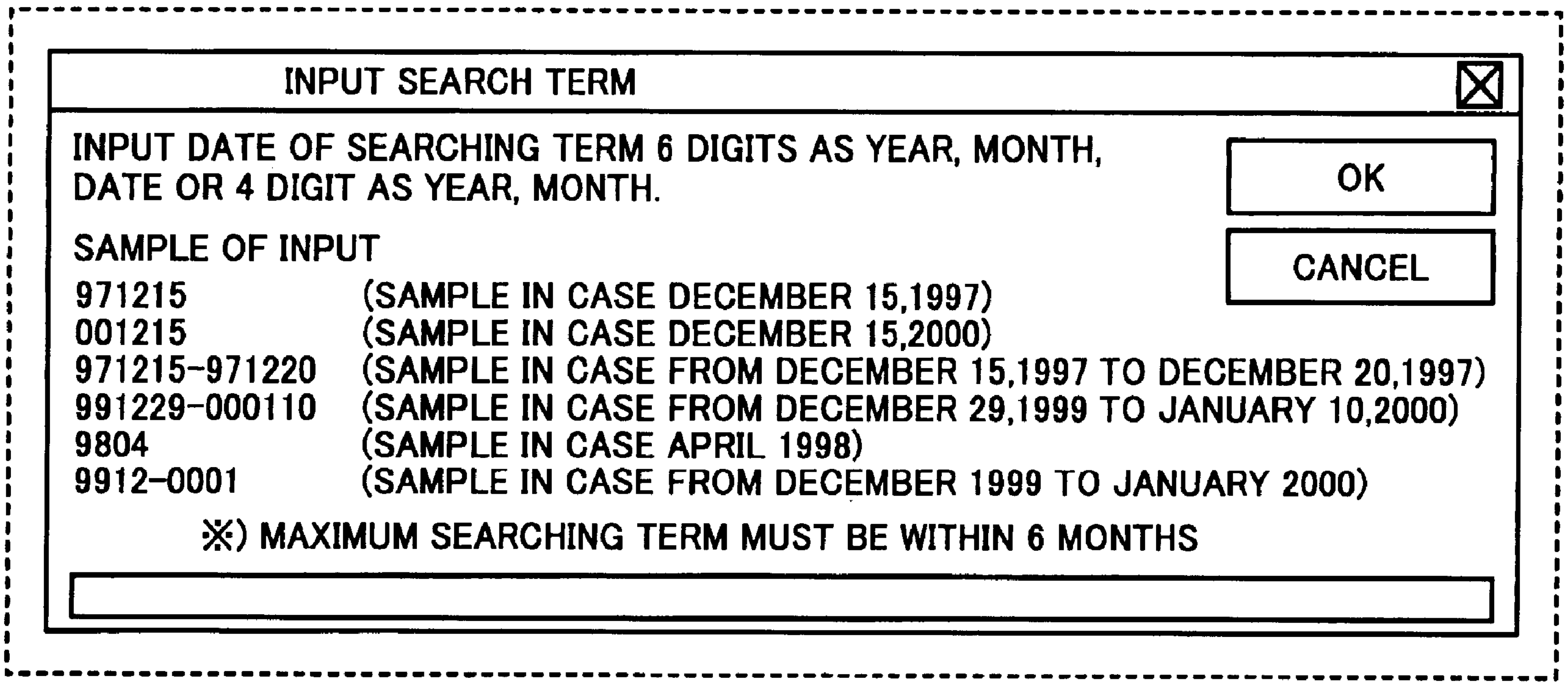
Figure 45C:
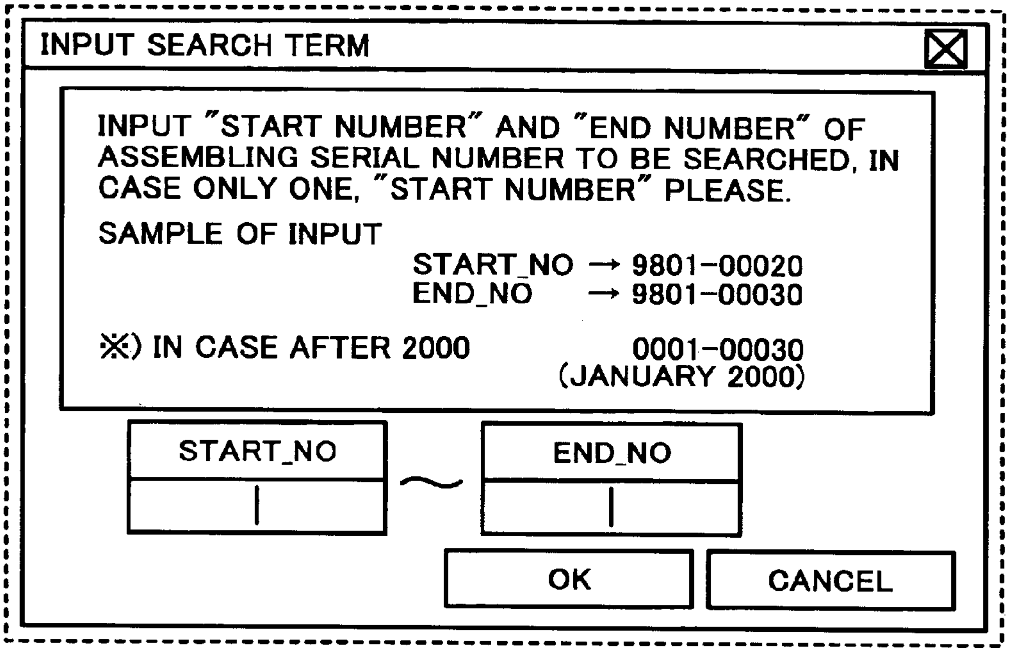
Figure 45D:
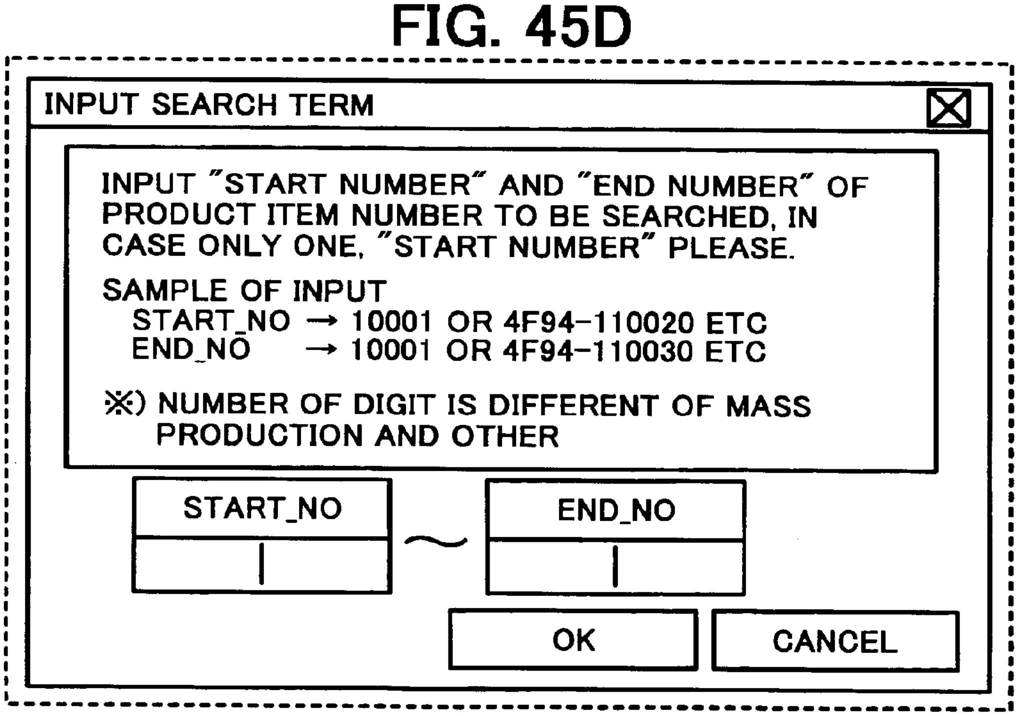

FIG. 44 shows an initial screen 2200 of the quality information process which is shown when the quality information key 2004 is selected. In the drawing, the reference numeral 2201 designates a key to display a period in which the data of selected product item exist. When the key 2201 is pushed down, the period of data existing of the selected product item is displayed. The reference numeral 2202 designates a step of production selecting box to select [step of production] to be searched, 2203 designates a field of product selecting box to select [field of product] to be searched, 2204 designates a product item selecting box to select [product item] to be searched, 2205 designates a product item code selecting box to select [product item code] to be searched, 2206 designates a kind of output selecting box to select the kind of output. The kind of output is selected from "trend of quality", "situation of occurrence by production process", "situation of occurrence by item of trouble", "situation of occurrence by rank", "situation of out of line/release", and "situation of occurrence by content of trouble" which are displayed in the kind of output selecting box 2206.

At this point, the "trend of quality" is an information to understand a quality record, a difference from the target value and a variation. The "situation of occurrence by production process" is an information to understand a transition and a tendency of situation of occurrence on the basis of respective production process. The "situation of occurrence by item of trouble" is an information to understand a transition and a tendency of situation of occurrence on the basis of respective item of trouble. The "situation of occurrence by rank" is an information to understand a transition and a tendency of situation of occurrence on the basis of respective rank. The "situation of out of line/release" is an information to understand a transition and a tendency of situation out of line and release of it. The "situation of occurrence by content of trouble" is an information to understand a transition and a tendency of situation of occurrence of trouble on the basis of respective content of trouble. This kind of output item can be selected in any time before or after the data search has been performed.

Reference numeral 2207 designates a method of search selecting column to select [method of search] of the data to be searched. In the method of search selecting column 2207 any one of "search by date", "search by assembling serial number" and "search by product number" can be selected. Reference numeral 2208 designates criterion of search selecting column to select [criteria of search] of the information which is subject to be searched. In the criteria of search selecting column 2208 any one of "on the basis of date of occurrence" and "on the basis of date of completion" can be selected. Reference numeral 2214 designates a column to select kind of information to be searched, and any one of "only within the production process", "only out of production process" and "in and out of production process" can be selected.

In the flow chart shown in FIG. 43, at first a selection of [step of production] to be searched is performed in the step of production selecting box 2202 (step P900), a selection of [field of product] to be searched is performed in the field of product selecting box 2203 by the manager at the initial screen shown in FIG. 44 (step P901), then a selection of [product item] to be searched is performed in the product item selecting box 2204 (step P902) and a selection of [product item code] to be searched is performed in the product item code selecting box 2205 (step P903). In addition, the item, kind of output (object of output) is selected in the kind of output selecting box 2206 (step P904), and then the kind of information to be searched is selected (step P905).

When the manager pushes down the search condition input key 2209 (step P906), a sub screen to specify concretely the method of search selected in the method of search selecting column 2207 (step P907). In further detail, when "search by date" is selected in the method of search selecting column 2207 as shown in FIG. 45, a sub screen 2210 is displayed and a period of search is input by the manager, and when "search by assembling serial number" is selected, a sub screen 2211 is displayed and "START NO" and "END NO" of it are input by the manager, and further when "search by product number" is selected, a sub screen 2212 is displayed and "START NO" and "END NO"of it are input by the manager.

Figure 46A:
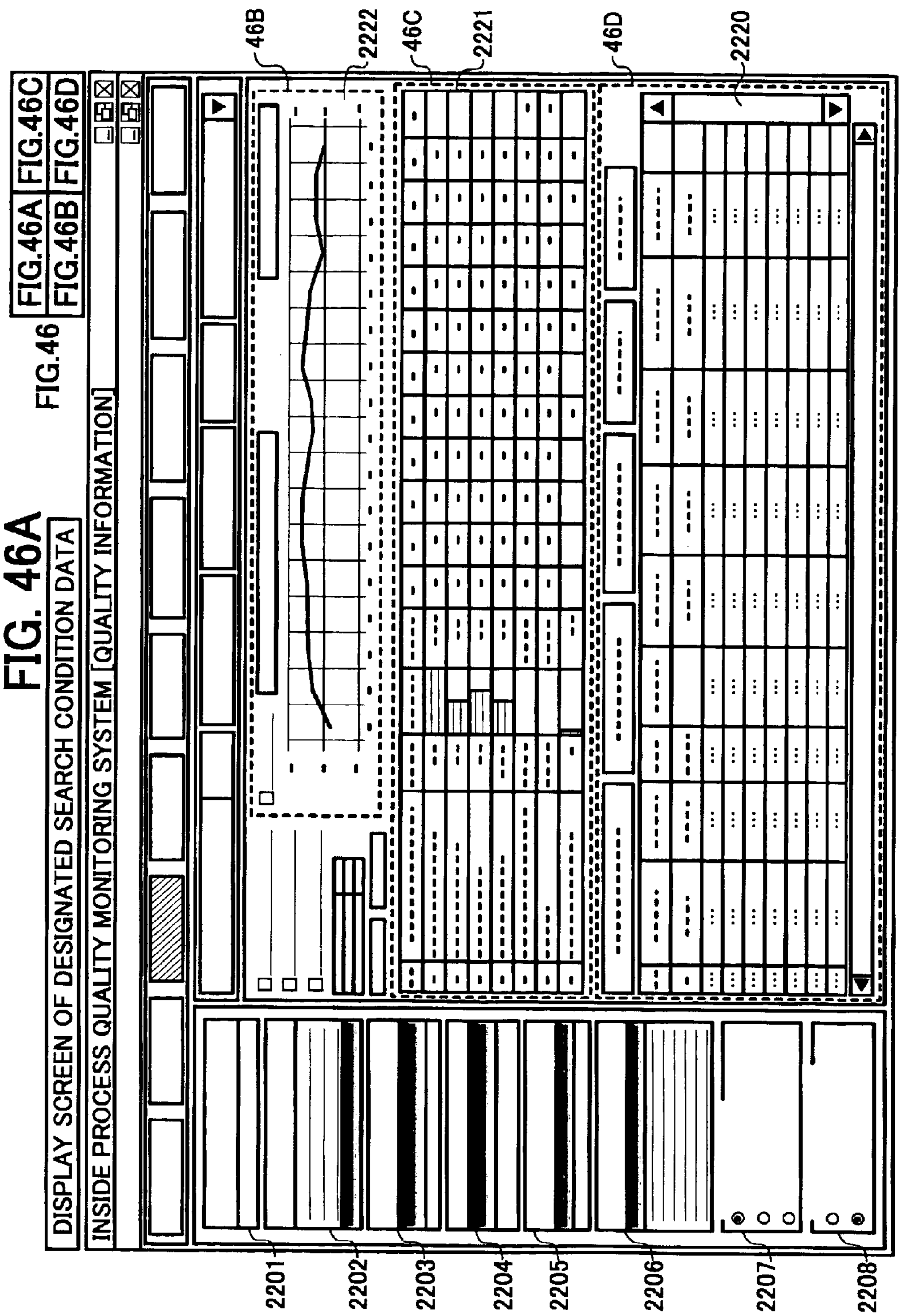
FIG. 46 is a diagram to show a display screen of the process for product quality.
Figures 46B, 46C:
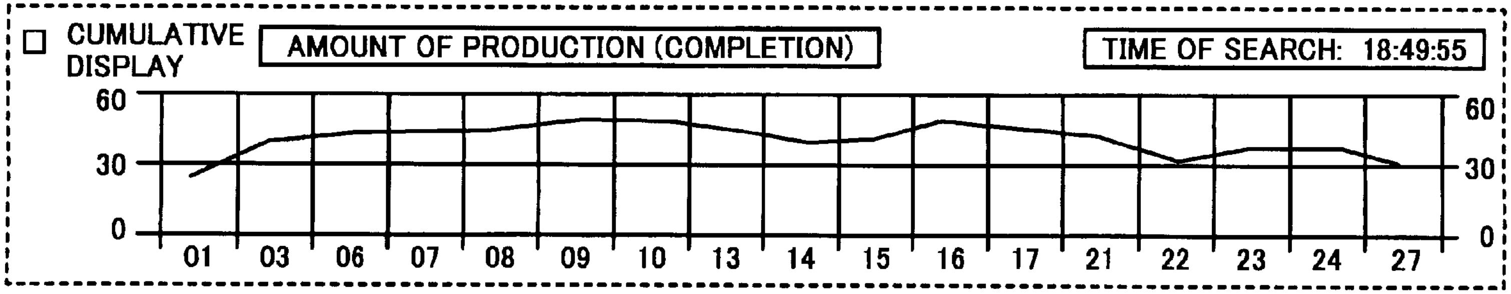

When the search condition is concretely specified by the manager and the confirmation button is pushed down (step P908), a request for search on the basis of the search conditions specified in the above described steps P900 to P907 is forwarded to the server 300 (step P909). A data search in accordance with the search conditions are performed by the server 300 and the resulted searched data searched are transferred from the server 300. The resulted searched data (raw data) are listed in the resulted searched data display column 2220 in a form of synoptic table as shown in FIG. 46 (step P910). The resulted searched data display column 2220 includes items of "number", "assembling serial number", "product serial number", "head number", "inspection again", "date of occurrence", "name of process", "item of trouble", "content of trouble", "out of line", "rank", "responsible department", "cause of trouble", "content of repairing", "date of repairing", "content of prevention for recurrence", "date of corrective action", "time of corrective action", "person in charge for corrective action" and so on, it is possible to decide freely by the operator that which items are selected and displayed in the resulted searched data display column 2220.

Among the resulted searched data, the data of kind of output (object to be output) which is selected in the kind of output selecting box 2206 are processed for summation and calculation in time series and displayed in the resulted searched data display column 2221 as a synoptic table (step P911). At the same time the items of displayed resulted searched data can be further selected to be displayed in a graph displaying column 2222 in a form of graph. The items to be displayed in the form of graph can be selected arbitrary by the operator.

At this point FIG. 46 shows the data which are displayed in the resulted searched data display column 2221 when the "trend of quality" is selected in the kind of output selecting box 2206. In the resulted searched data display column 2221 shown in FIG. 46 "TOTAL NO", "graph of TOTAL NO", "rate" and "occurrence in every hour" are displayed corresponding to the data items (amount of production (completion), amount of production without defect, count of quality trouble, rate of no defect, count of defect per piece, PQ value, amount of out of line). A graph display column 2222 shown in FIG. 46 displays one sample of graph display when the amount of production (completion) is selected in the resulted searched data display column 2221.

(A) to (F) in FIG. 47 show samples of the resulted searched data display column 2221 when "situation of occurrence by production process", "situation of occurrence by reason of trouble", "situation of occurrence by rank" and "situation of out of line/release" are respectively selected in the kind of output selecting box 2206.

And till an instruction of the completion is given (step P912) the operation on the consecutive steps P900 to step P911 is repeatedly performed.

4: Characteristics Management Process

Figure 48B:
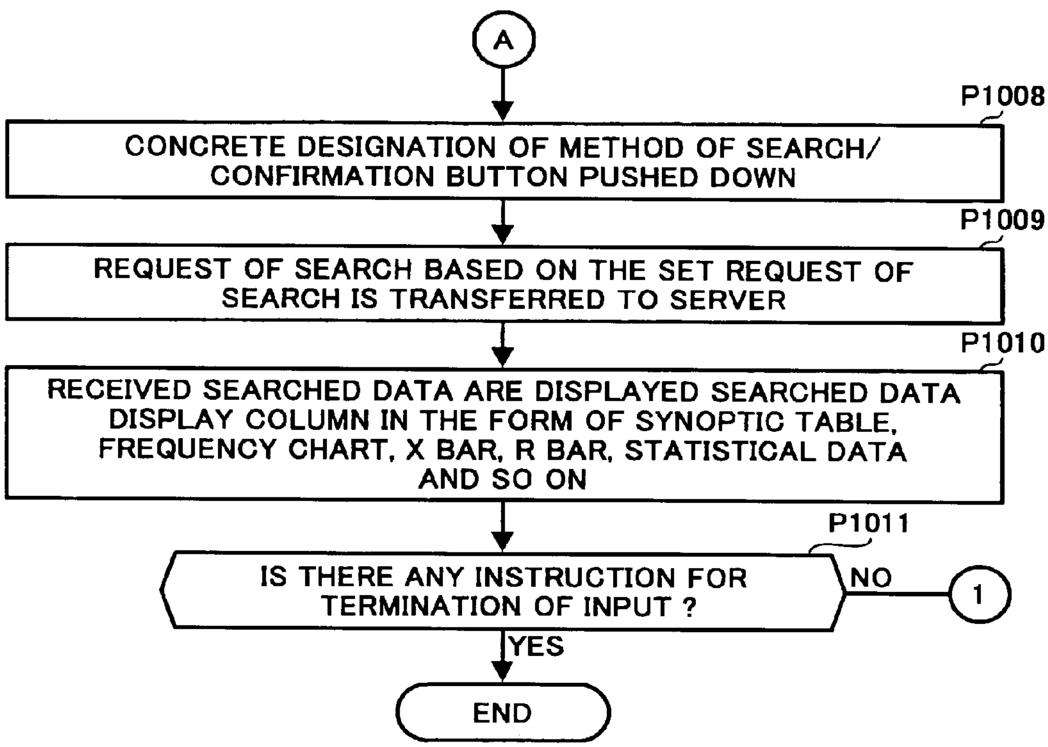
FIG. 48 is a flow chart to explain a process for management of characteristics.

The characteristics management process will be described with reference to FIG. 49 to FIG. 52 in accordance with the flow chart shown in FIG. 48. FIG. 48 is a flow chart to explain the characteristics management process and FIG. 48 to FIG. 52 are diagrams to show a display screen of the characteristics management process.

Figure 49:
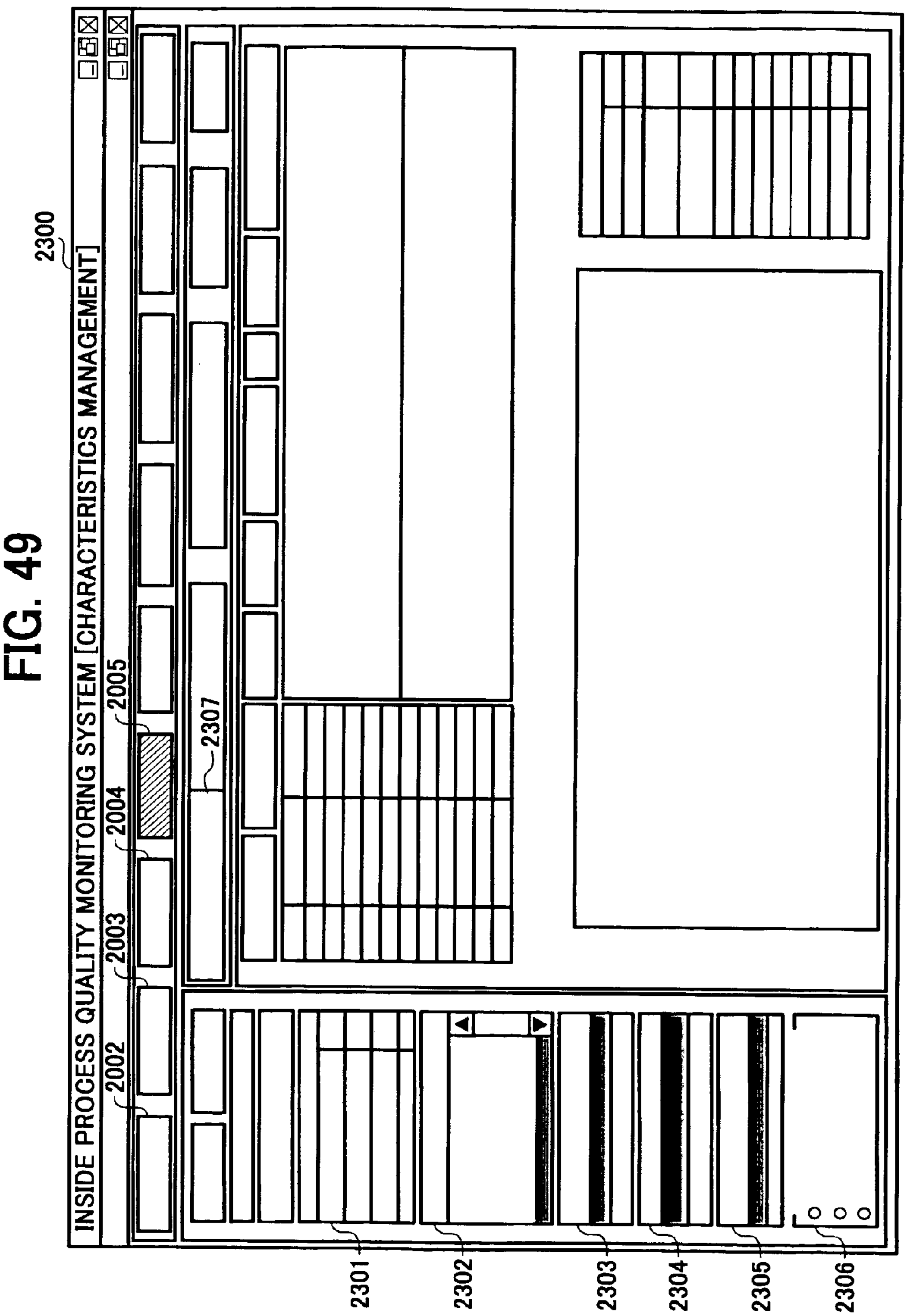
FIG. 49 is a diagram to show a display screen of the process management of characteristics.
Figure 50A:
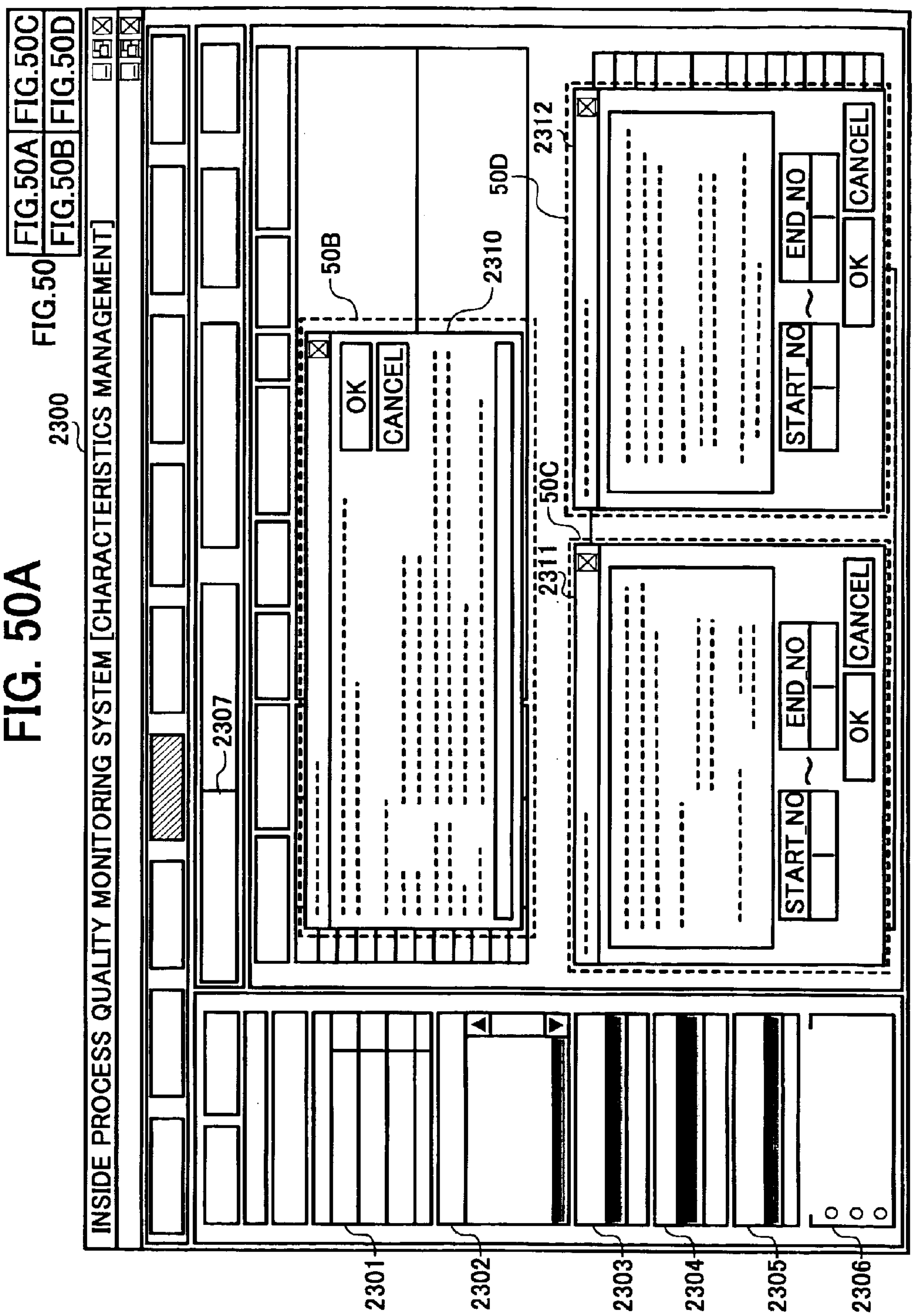
FIG. 50 is a diagram to show a display screen of the process management of characteristics.
Figure 50B:
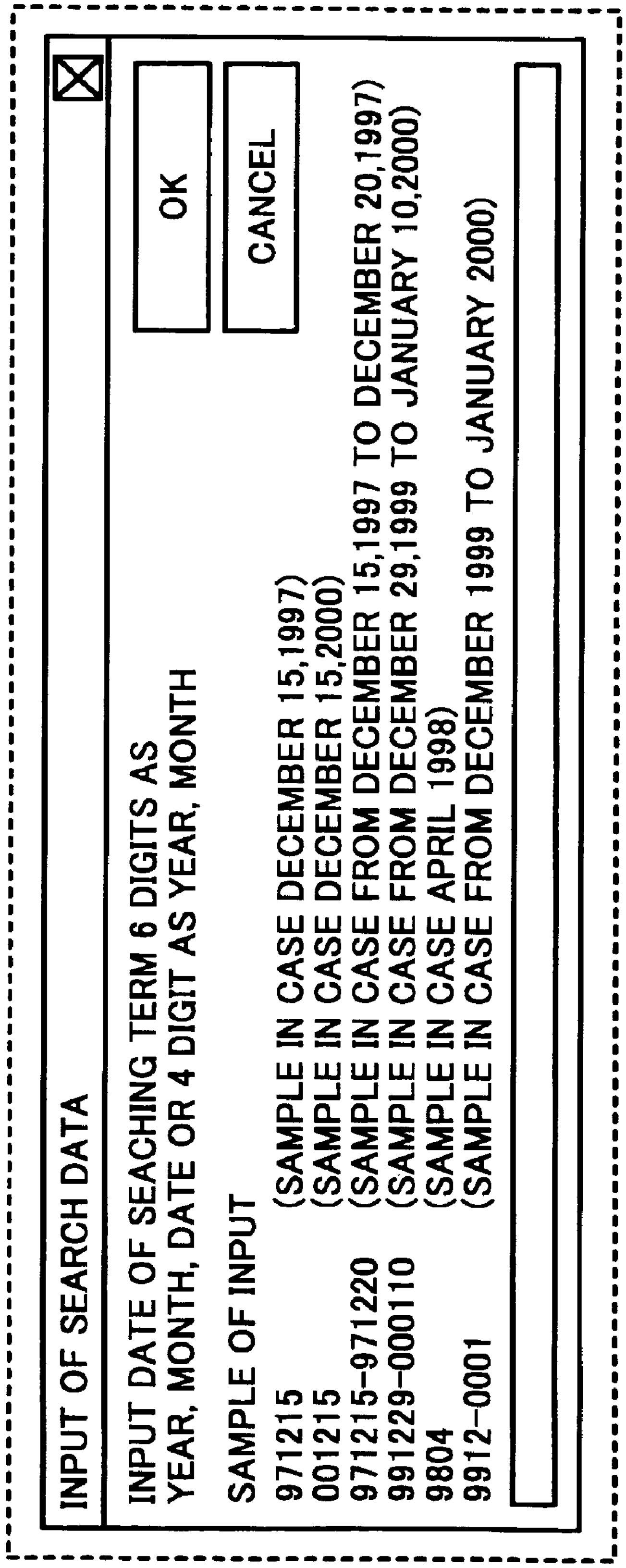
Figure 50C:
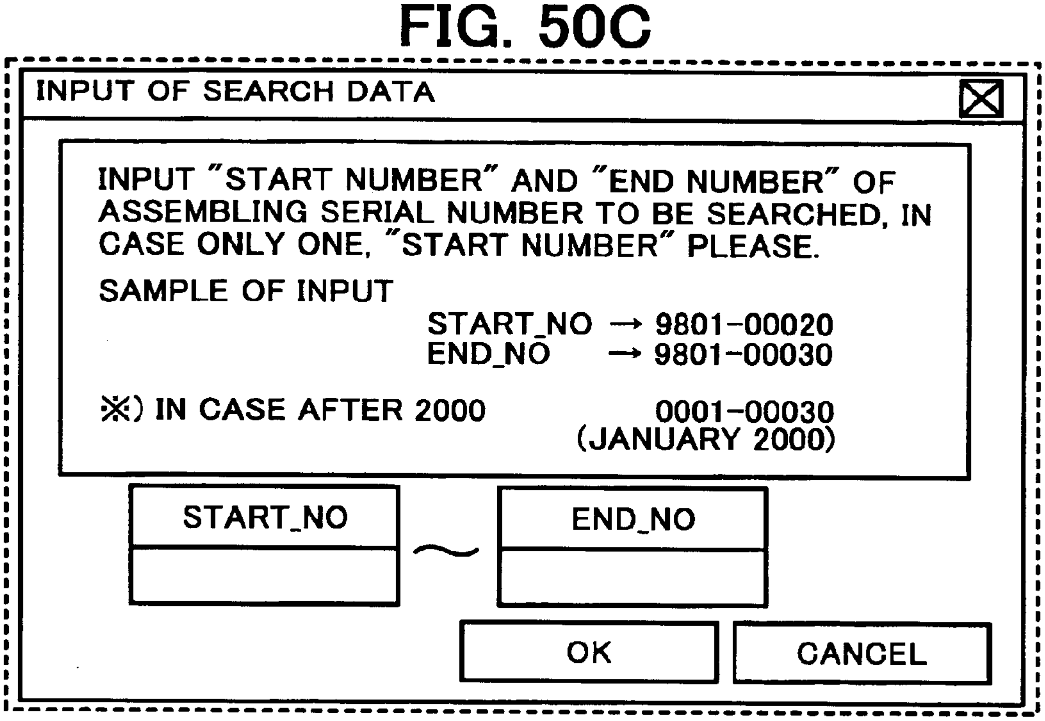
Figure 50D:
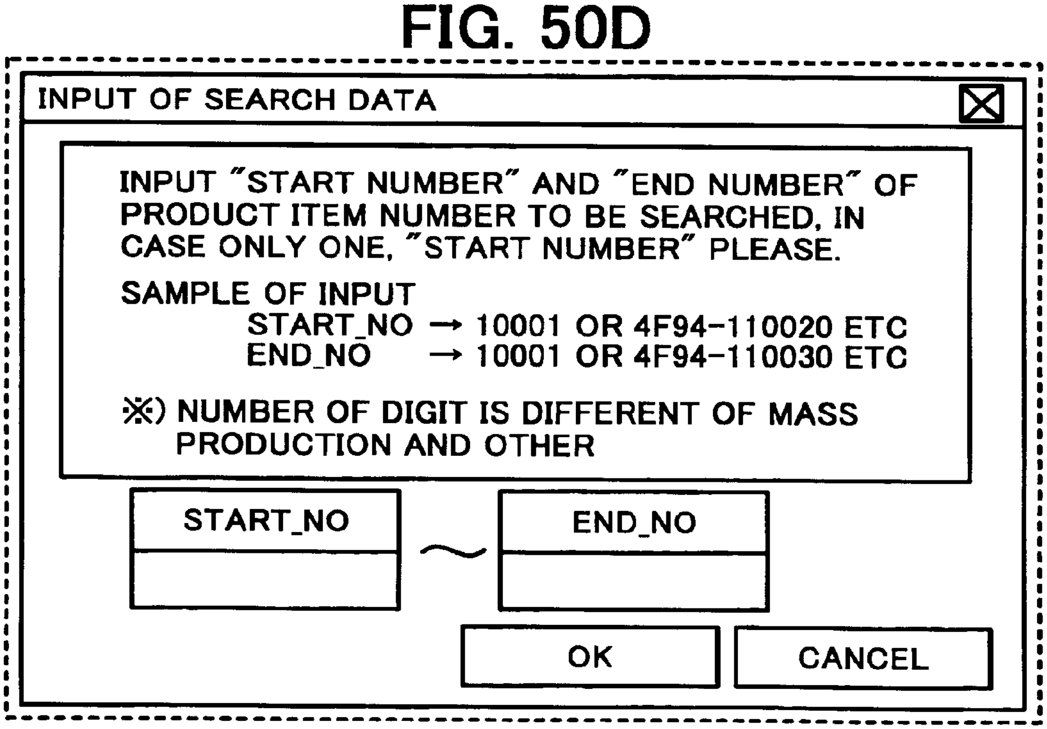

FIG. 49 shows an initial screen 2300 of the characteristics management process which is shown when the characteristics management key 2006 is selected. In the drawing, the reference numeral 2301 designates a key to display a period in which the data of selected product item exist. When the key 2301 is pushed down, the period of data existing of the selected product item is displayed. The reference numeral 2302 designates a step of production selecting box to select [step of production] to be searched, 2303 designates a field of product selecting box to select [kind of measurement] to be searched, 2304 designates a product item selecting box to select [product item] to be searched, 2305 designates a product item code selecting box to select [product item code] to be searched, 2306 designates a method of search selecting column to select [method of search]. In the method of search column 2306 any one of "search by date", "search by assembling serial number" and "search by product number" can be selected.

In the flow chart shown in FIG. 48, at first a selection of [step of production] to be searched is performed in the step of production selecting box 2302 (step P1001), and a selection of [kind of measurement] to be searched is performed in the field of product selecting box 2303 by the manager at the initial screen 2300 shown in FIG. 49 (step P1002). Then a selection of [product item] to be searched is performed in the product item selecting box 2304 (step P1003), then a selection of [product item code] to be searched is performed in the product item code selecting box 2305 (step P1004), and then the [method of search] is selected in the method of search selecting column 2303 (step P1005).

When the manager pushes down the search condition input key 2307 (step P1006), a sub screen to specify concretely the method of search selected in the method of search selecting column 2306 (step P1007). In further detail, when "search by date" is selected in the method of search selecting column 2306 as shown in FIG. 50, a sub screen 2310 is displayed and a period of search is input by the manager, and when "search by assembling serial number" is selected, a sub screen 2311 is displayed and "START NO" and "END NO" of it are input by the manager, and further when "search by product number" is selected, a sub screen 2312 is displayed and "START NO" and "END NO" of it are input by the manager.

Figure 51A:
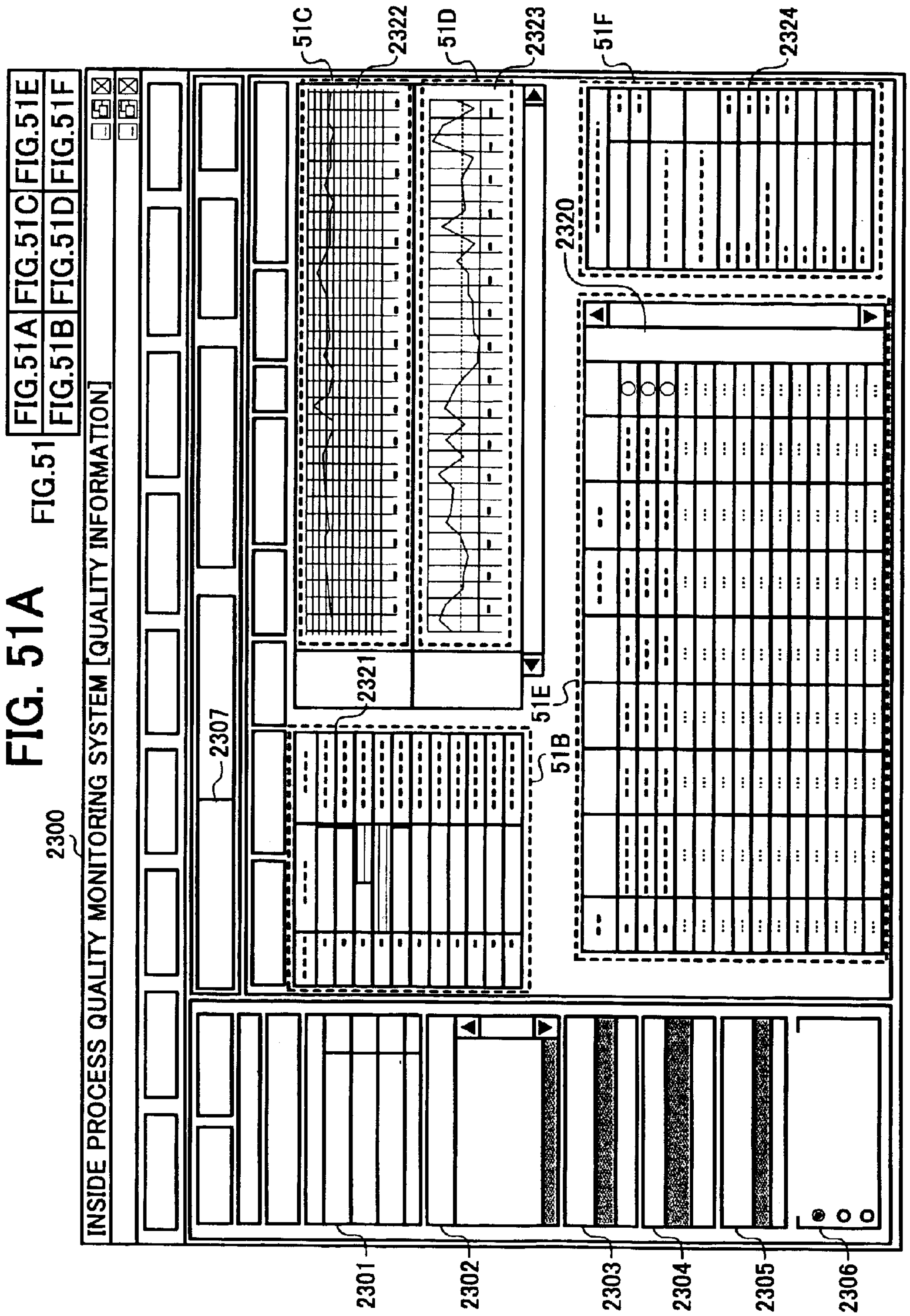
FIG. 51 is a diagram to show a display screen of the process management of characteristics.

When the search condition is concretely specified by the manager and the confirmation button is pushed down (step P1008), a request for search on the basis of the search conditions specified in the above described steps P1001 to P1007 is forwarded to the server 300 (step P1009). A data search in accordance with the search conditions are performed by the server 300 and the resulted searched data searched are transferred from the server 300. The resulted searched data searched are listed in the resulted searched data display column 2320 in a form of synoptic table, for example, as shown in FIG. 51 (step P1010), in a frequency histogram display column 2321 in a form of the frequency histogram, in the X bar display column 2322 in a form of the X bar, in the R bar display column 2323 in a form of R bar and in a statistical data display column 2324 in a form of statistical data.

And until an instruction of the completion is given (step P1011), the operation on the consecutive steps P1001 to P1010 are repeatedly performed.

5: Management Process for Prevention of Recurrence

Figure 52A:
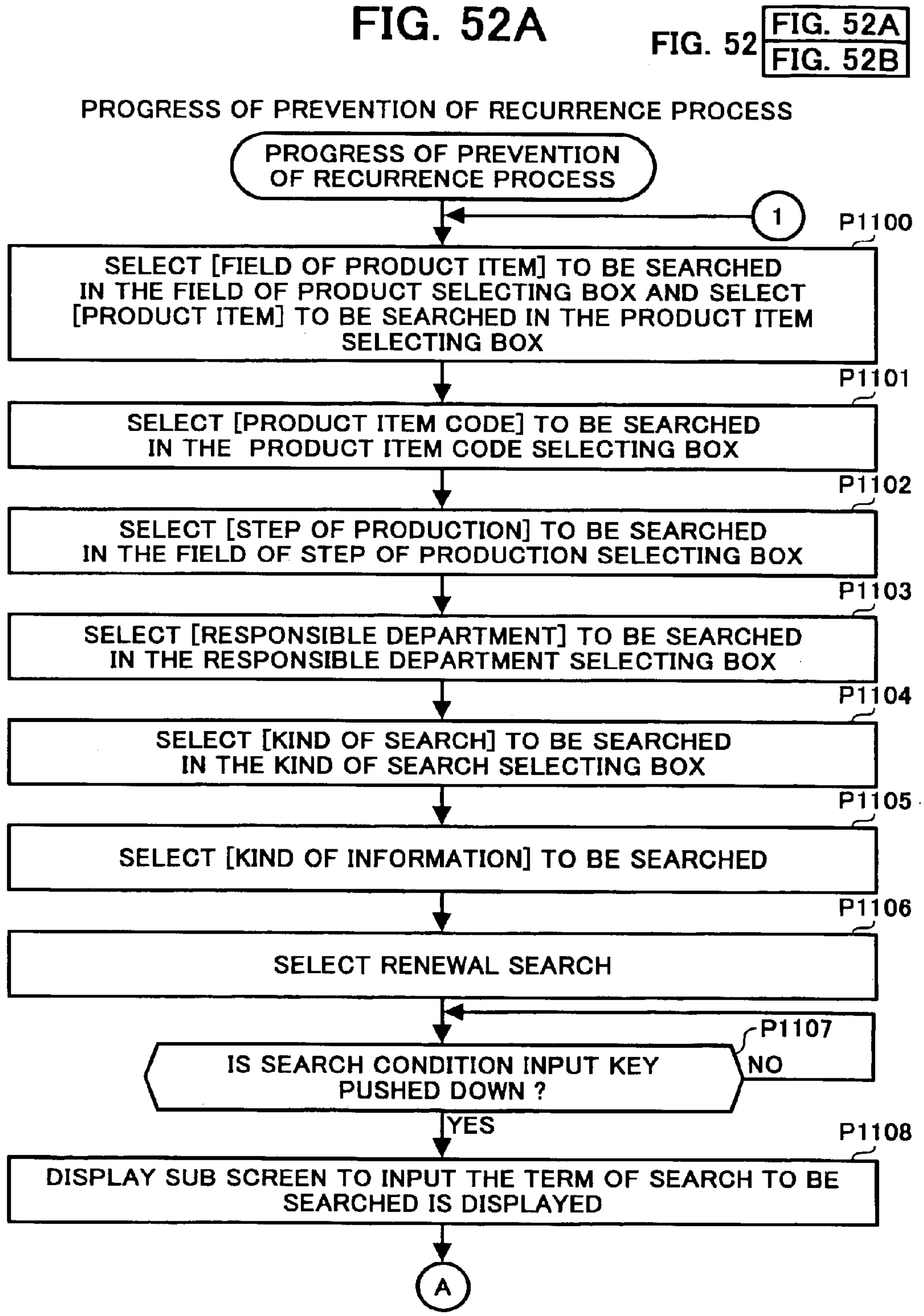
FIG. 52 is a flow chart to explain a process for management of progress of prevention recurrence.
Figure 52B:
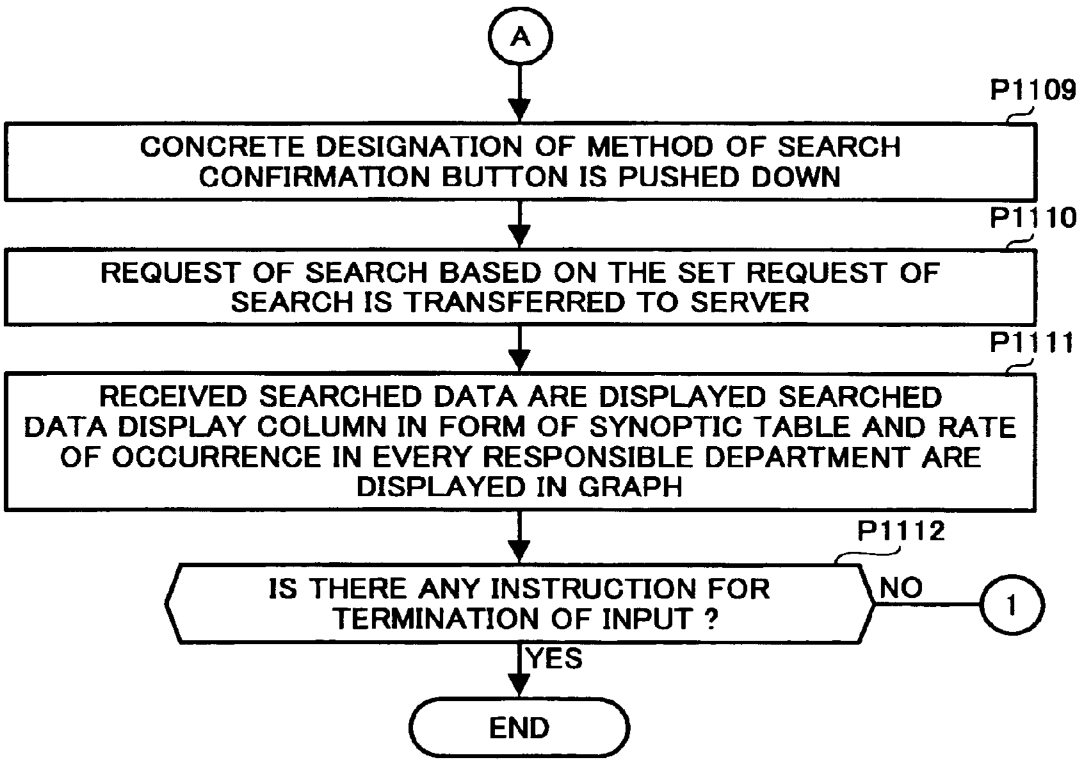

The management process for prevention of recurrence will be described with reference to FIG. 53 to FIG. 55 in accordance with the flow chart shown in FIG. 52. FIG. 52 is a flow chart to explain the management process for prevention of recurrence, and FIG. 53 to FIG. 55 are diagrams to show a display screen of the management process for prevention of recurrence.

Figure 53:
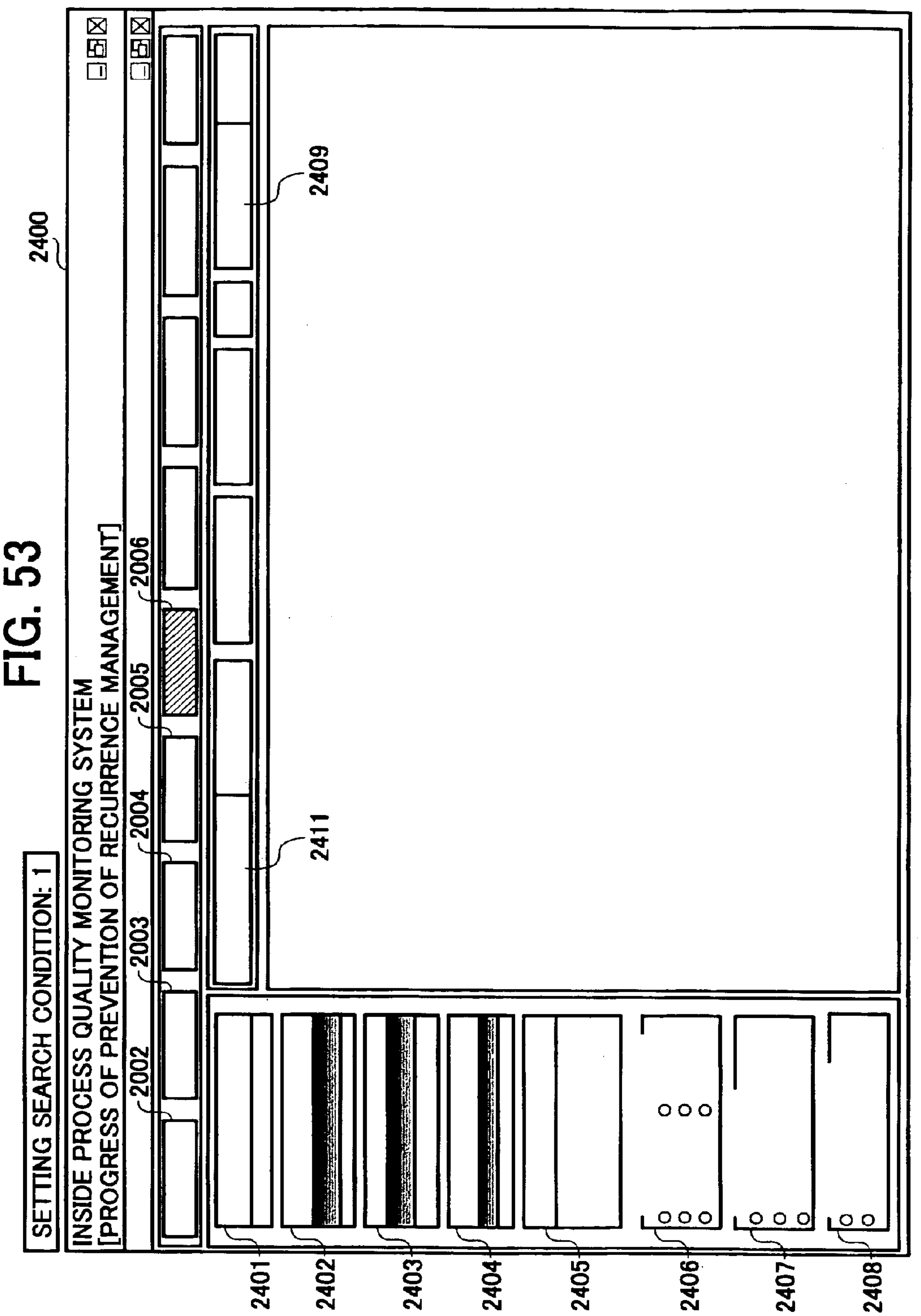
FIG. 53 is a diagram to show a display screen of the process for management of progress of prevention recurrence.

FIG. 53 shows an initial screen 2400 of the management process for prevention of recurrence which is shown when the prevention of recurrence management key 2006 is selected. In the drawing, the reference numeral 2401 designates a key to display a period in which the data of selected product item exist. When the key 2401 is pushed down, the period of data existing of the selected product item is displayed. The reference numeral 2402 designates a field of product selecting box to select [field of product] to be searched, 2403 designates a product item selecting box to select [product item] to be searched, 2404 designates a product item code selecting box to select [product item code] to be searched, 2405 designates a step of production selecting box to select [step of production] to be searched.

The reference numeral 2406 designates a responsible department selecting column to select [responsible department] to be searched. In the responsible department column 2406 any one of "parts", "technology", "assembling", "design", "other" and "all" is selected. The reference numeral 2407 designates a kind of search selecting column to select [kind of search] to be searched. In the kind of search selecting column 2407 any one of "data not yet input prevention of recurrence", "data already input prevention of recurrence" and "all" is selected. The reference numeral 2408 designates a kind of information selecting column to select [kind of information] to be searched. In the kind of information selecting column 2408 any one of "only inside of process" or "only outside of process" can be selected.

Figure 54A:
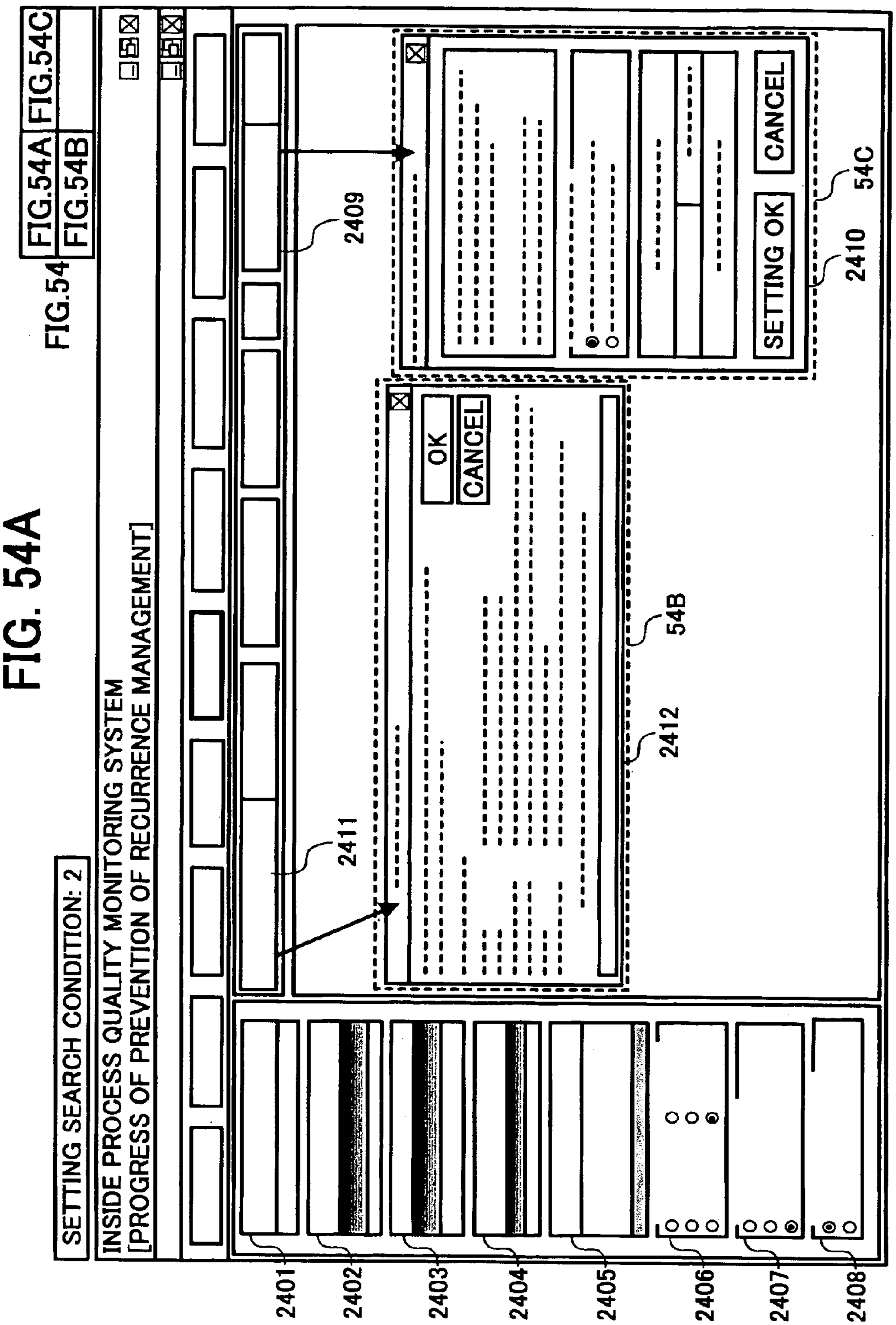
FIG. 54 is a diagram to show a display screen of the process for management of progress of prevention recurrence.
Figure 54B:
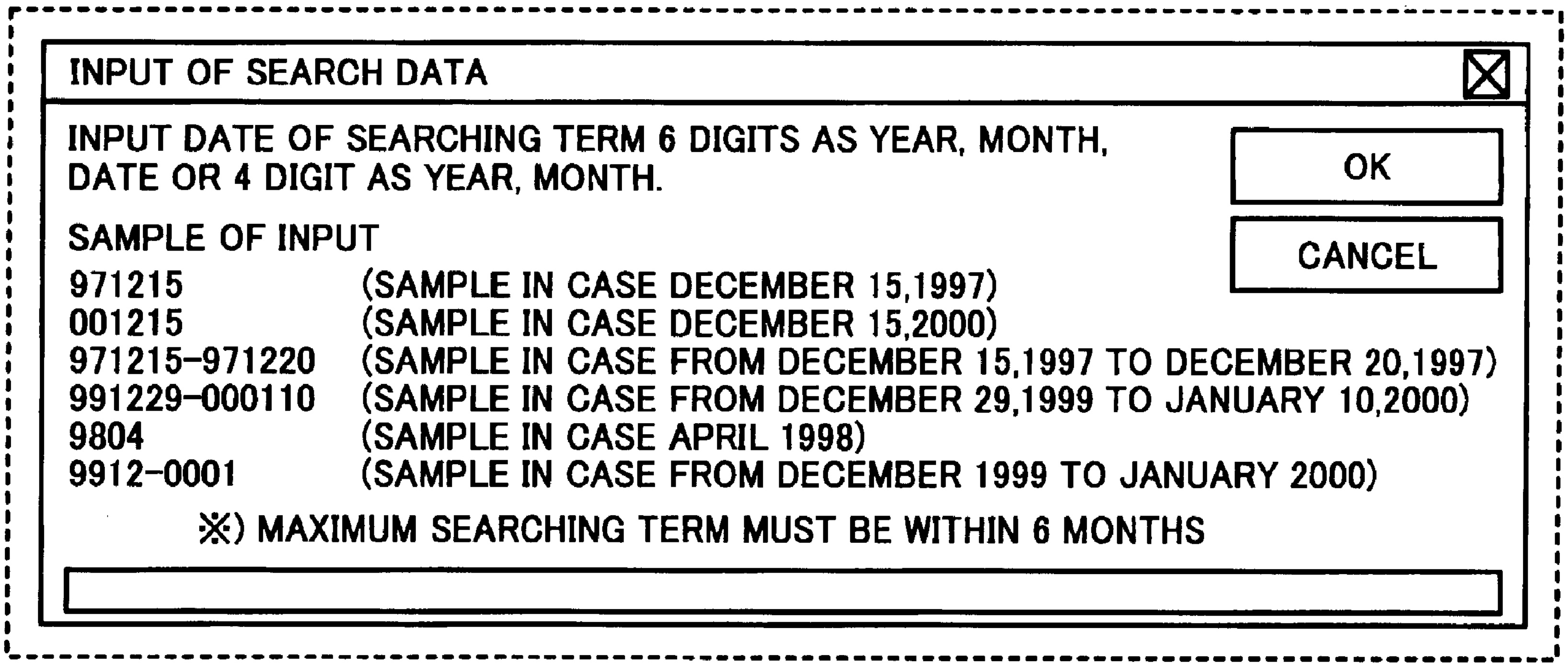
Figure 54C:
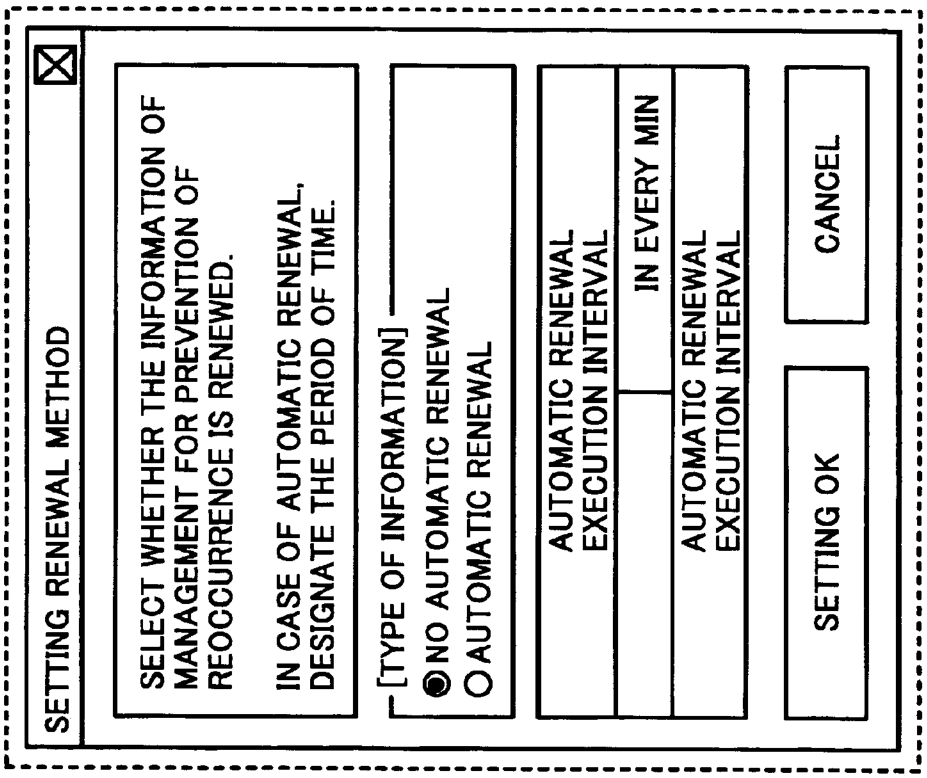
Figure 55A:
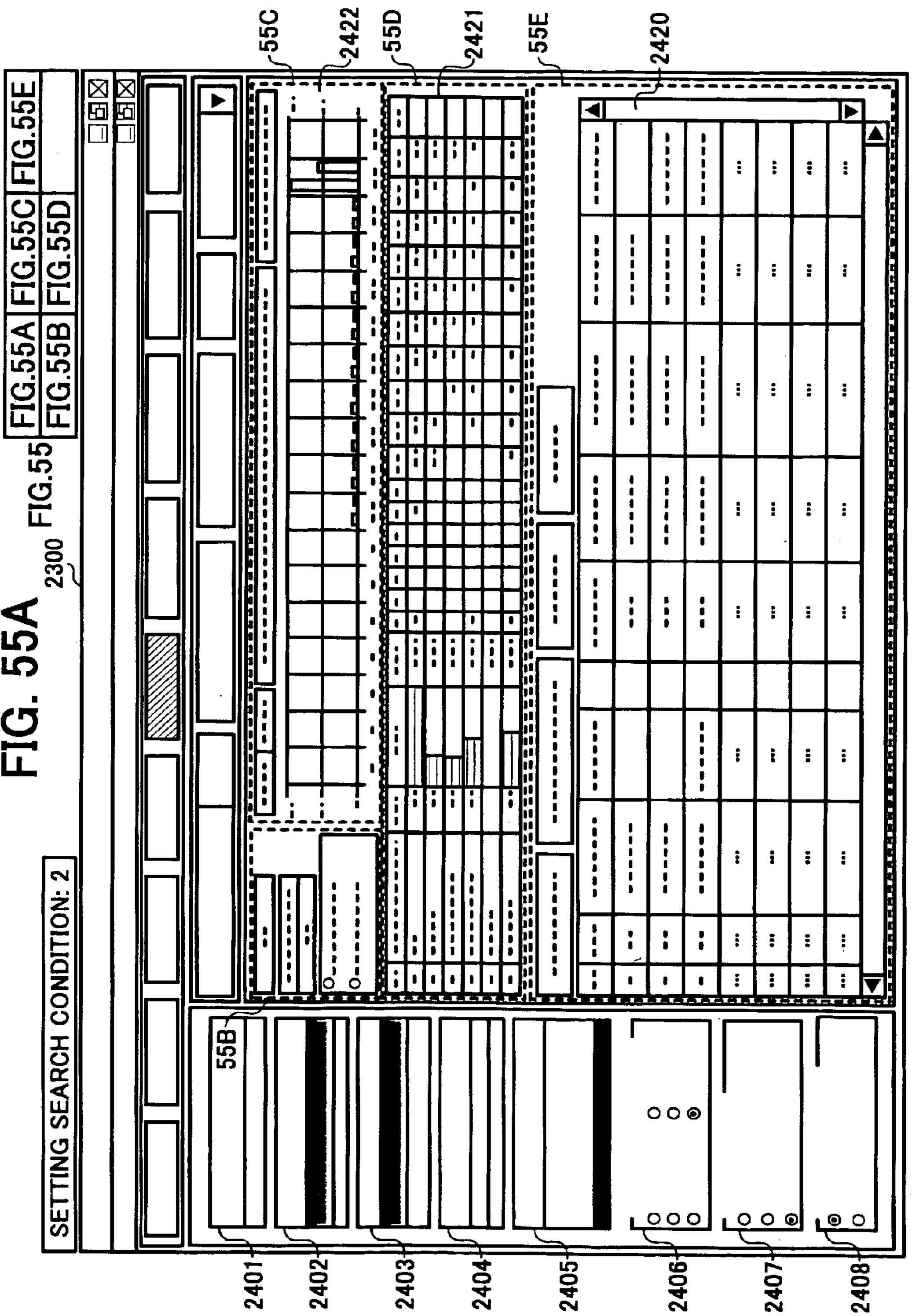
FIG. 55 is a diagram to show a display screen of the process for management of progress of prevention recurrence.
Figure 55B:
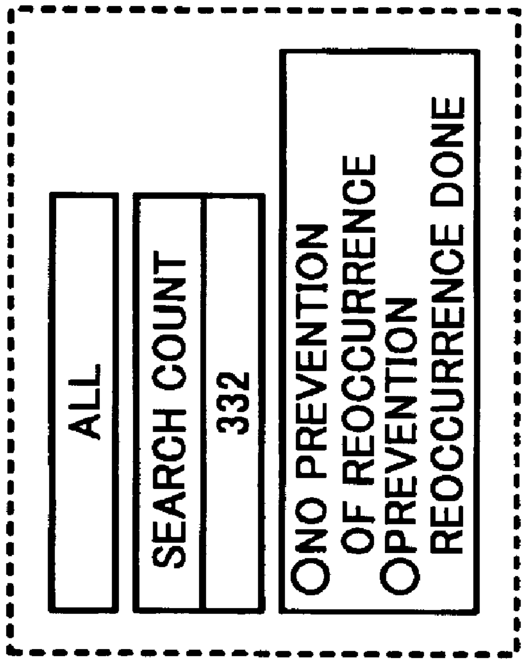
Figures 55C, 55D:
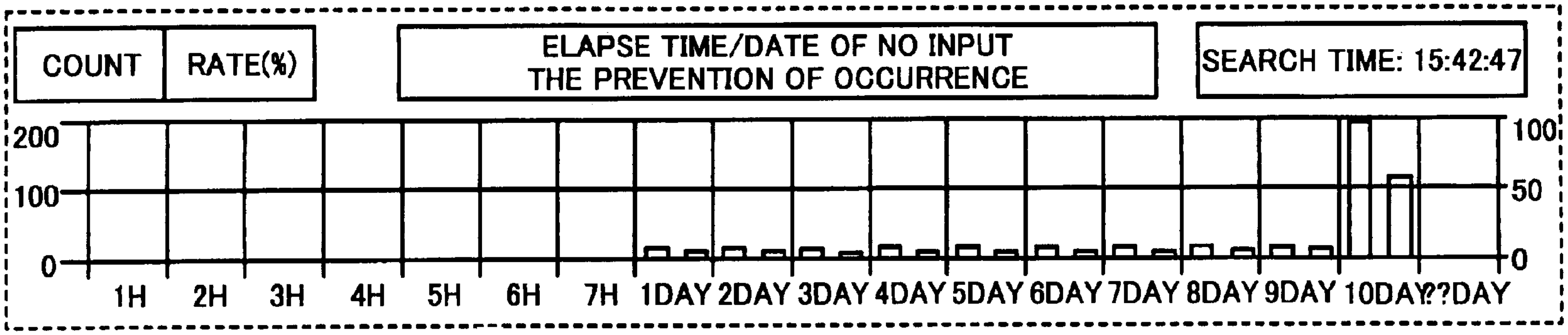

The reference numeral 2409 designates [period of renewal] setting key to set a period of renewal search, and when this [period of renewal] key 2409 is selected, a sub screen 2410 shown in FIG. 54 is displayed. In this sub screen 2410 it is selected if a search of information is automatically renewed or not, and at the same time it is selected how long period of time the renewal is achieved in minutes when in case the automatic renewal is performed.

In the flow chart shown in FIG. 52, at first a selection of [field of product] to be searched is performed in the field of product selecting box 2402 by the manager at the initial screen 2400 shown in FIG. 53, then a selection of [product item] to be searched is performed in the product item selecting box 2403 (step P1100). And a selection of [product item code] to be searched is performed in the product item code selecting box 2404 (step P1101), then a selection of [step of production] to be searched is performed in the step of production selecting box 2405 (step P1102).

And in the responsible department selecting column 2406 a selection of [responsible department] to be searched is performed (step P1103), in the kind of search selecting column 2407 a selection of [kind of search] to be searched is performed (step P1104), and in the kind of information selecting column 2408 a selection of [kind of information] to be searched is performed (step P1105). Further a time period of renewal search is set (step P1106).

When the manager pushes down the search condition input key 2411 (step P1107), a sub screen 2412 to input a time period of information to be searched as shown in FIG. 54 is displayed (step P1108). When the search condition is concretely specified by the manager and the confirmation button is pushed down (step P1109), a request for search on the basis of the search conditions specified in the above described steps P1100 to P1109 is forwarded to the server 300 (step P1110). A data search in accordance with the search conditions are performed by the server 300 and the resulted searched data searched are transferred from the server 300. The resulted searched data searched are listed in the resulted searched data display column 2420 in a form of synoptic table as shown in FIG. 55, a rate of occurrence on the basis of the responsible department in the display column by the responsible department 2421 and an elapsed time from an input of the latest prevention of recurrence shown in days and hours are displayed (step P1111). At this point the selected items of data which are displayed in the graph display column 2422 by the responsible department 2421 are displayed in a form of graph. The items to be displayed in the graph can be arbitrary selected by the operator.

Herein the example shown in FIG. 55 depicts examples of data displayed in the display column by the responsible department 2421 as a result when "all" is selected in the responsible department selecting column 2406. In the display column by the responsible department 2421 shown in FIG. 55, "count", "graph of count", "rate", "elapsed time (in case for never relapsed hours/days from occurrence of trouble, in case for ever relapsed hours/days from occurrence of trouble to input of prevention of recurrence) are displayed corresponding to the responsible department (all, parts, technology, assembling, design, other).

And until an instruction of the completion is given (step P1112), the operation on the consecutive steps P1100 to P1111 are repeatedly performed.

As above described the apparatus is arranged so that the data are input in the clients 201 to 203 which are related to the respective assembling process 101 to 103, and in the clients 204 to 208 which are related to the electrical inspection process 104, the image inspection process 105, the completion inspection process 106, the repairing process 110 and the product inspection process 111 are input, the server 300 stores the data which are input by the clients 201 to 208 to the data base 708, by the clients 501 to 503 of output system, the search conditions are specified and the request for search is forwarded to the server 300, and in response to this request, corresponding data are searched from the data base 708 by the server 300 and they are transferred to the output clients 501 to 503, in the clients 501 to 503 of the output system, the resulted searched data which are transferred are processed in time series and output (display or print out) based on the specified output device, it is made possible to effectively and rapidly to manage products which are manufactured in the assembling lines. Further because the resulted searched data are processed in time series in the target of output, it is made possible to manage the production lines in every time zone.

In the present embodiment the clients 501 to 603 are arranged in the watching monitoring process and so on, so that the resulted searched data are processed in time series and output in a form of table or graph, it is made possible for the assembly line to be managed in time series.

Because the clients 501 to 503 are made to output the quality information of the watching monitoring process and so on so as to output the quality information on the basis of respective quality record, process, item of trouble or responsible department, it is made possible to comprehend the quality information on the basis of respective quality record, process, item of trouble or responsible department.

Also the clients 501 to 503 are arranged in the watching monitoring process and so on, so that alarms are sent to the responsible department of quality information or to the assembling process related to the quality information when the resulted quality information exceeds the predetermined value to initiate the corrective action, it is made possible for the related department rapidly to comprehend the quality trouble, the quality corrective action can be taken to the problem.

The production management system can be composed in a structure which will be described below.

Hereinafter [Entire structure of the production management system], [Structure of client of the input system and output system], [Structure of process monitoring server], [Structure of client of the management system], [Data input process within process by client of input system], [Process monitoring process/alarm process by clients if output system] and [Alarm mail mailing process by client of management system] will be described in detail in this order with reference to the FIG. 56 to FIG. 151.

In the description below, the production management system for manufacturing assembly line of colour copy machine is employed as an example.

[Entire Structure of Production Management System]

Figure 56:
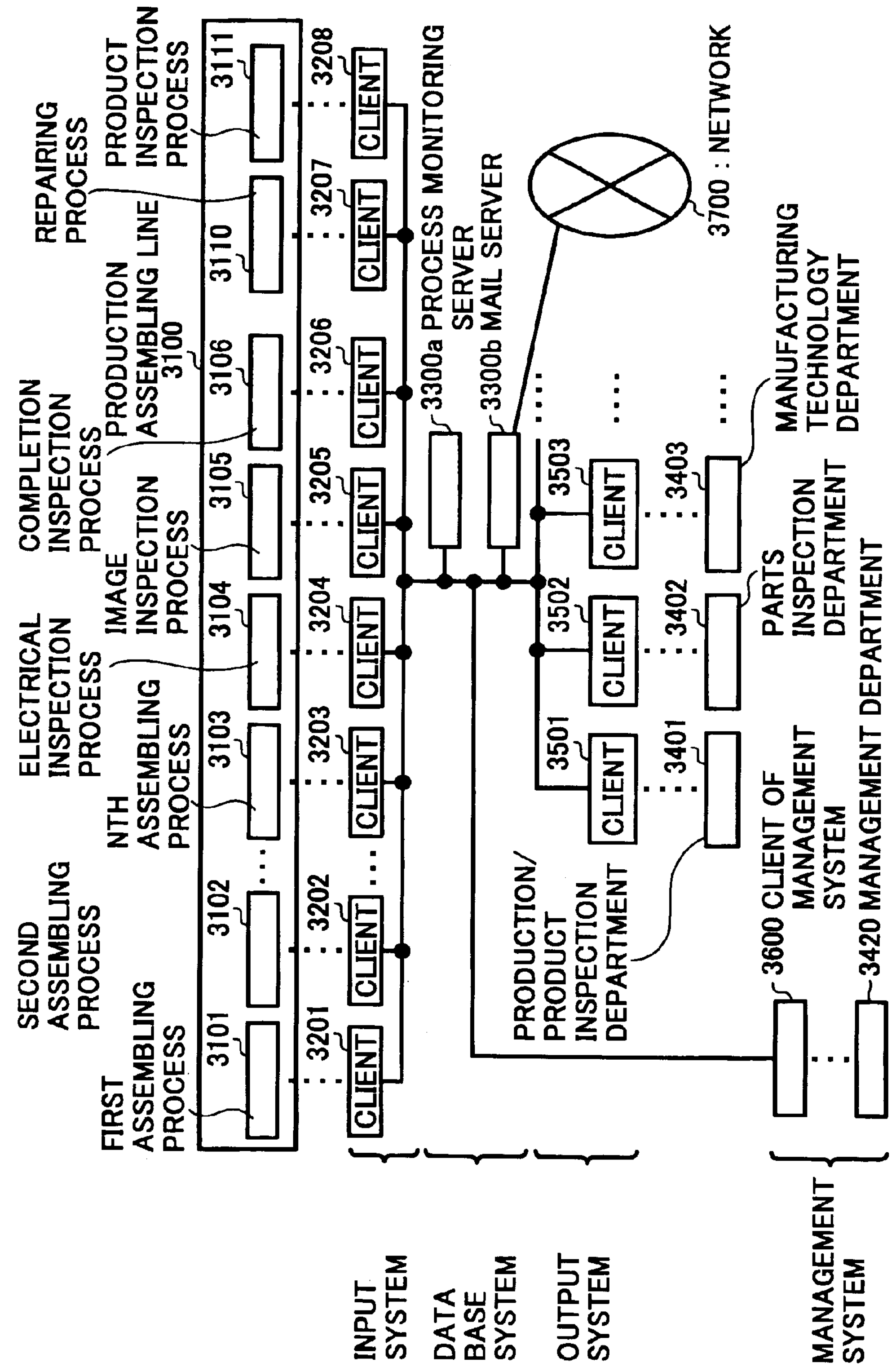
FIG. 56 is a schematic block diagram to show another example of the production management system.

FIG. 56 is a schematic block diagram to show one example of a production management system. In FIG. 56 reference numeral 3100 designates the manufacturing assembly line of colour copy machine, and the manufacturing assembly line 3100 includes an 1st assembling process 3101, 2nd assembling process 3102, . . . Nth assembling process 3103, electrical inspection process 3104, image inspection process 3105 and completion inspection process 3106, repairing process 3110 and product inspection process 3111.

The reference numerals 3201 to 3203 designate clients by which data of production process at the 1st assembling process 3101, 2nd assembling process 3102, . . . Nth assembling process 3103 are input. To the client 3201 to 3203, the data for content of production/assembling are respectively input by the operators on the basis of respective parts/units assembled in the production processes, and the input data are forwarded to the server 3300 which will be described latter in detail.

The reference numerals 3204 to 3206 designate clients by which data of production process at the electrical inspection process 3104, the image inspection process 3105 and the completion inspection process 3106 are input. To the client 3204 to 3206, the data of content/result inspected and confirmed about the product assembled in the production processes 3101 to 3103 are respectively input by the operators, and the input data are forwarded to the server 3300 which will be described latter in detail.

The reference numeral 3207 designates a client by which data of the repairing process 3110 is input. To the client 3207, the data at repairing process 3110 are input by the operator and the input data are forwarded to the process monitoring server 3300 which will be described latter in detail The reference numeral 3208 designates a client of a product inspection process 3111 by which the input data by the respective process from the 1st assembling process 3101 to the repairing process 3110 are checked. The above described clients 3201 to 3208 compose the input system. In this embodiment the assembly line is made for a main body, that is to say, the manufacturing assembly line for main body of color copy machine is employed as the manufacturing assembly line 3100, however, the present invention is not understood to be restricted for the main body, and it is applicable also to the manufacturing assembly line for parts or unit.

The reference numeral **3300*a* designates a process monitoring server to manage the entire system of production management system. The process monitoring server 3300*a* is arranged so that the data which are forwarded from the clients 3201 to 3208 are stored in the data base by the process monitoring server 3300*a*. The process monitoring server 3300*a* also is arranged to search the data corresponding to the request from the data base and send them back to the clients 3501 to 3503 in accordance with a search request transferred from the clients 3501 to 3503 which are described later. The reference numeral 3300*b* designates a mail server 3300*b* to perform an alarm mail. The mail server 3300*b* is connected to the production management system and at the same time it is connected to the external network 3700. The mail server 3300*b* is arranged to send the alarm mails sent from the client of management system 3600 to the specified terminals (terminal which are located in the production management system or which are connected to the network 3700). The process monitoring server 300*a* and the mail server 3300*b*** compose the data base system.

Reference numeral 3401 designates an inspection department, 3402 designates a parts inspection department and 3403 designates a manufacturing technology department. Reference numerals 3501 to 3503 designate the clients which are installed in the inspection department 3401, the parts inspection department 3402 and the manufacturing technology department 3403, respectively. These clients 3501 to 3503 output the search request based on the search condition which are set for the request to the process monitoring server 3300, and process the searched results which are sent back from the process monitoring server 3300 in response to the above request to display and so on. The clients 3501 to 3503 compose the output system.

Reference numeral 3420 designates a management department, 3600 designates a client of management system which is installed in the management department. The client of management system 3600 sends alarm mails to the predetermined addresses when the quality data of assembled product stored in the data base of the process monitoring server **3300*a* exceeds the criterion to initiate the corrective action and a trouble of quality happens. The client of management system 3600** constitutes the management system.

Figure 57:
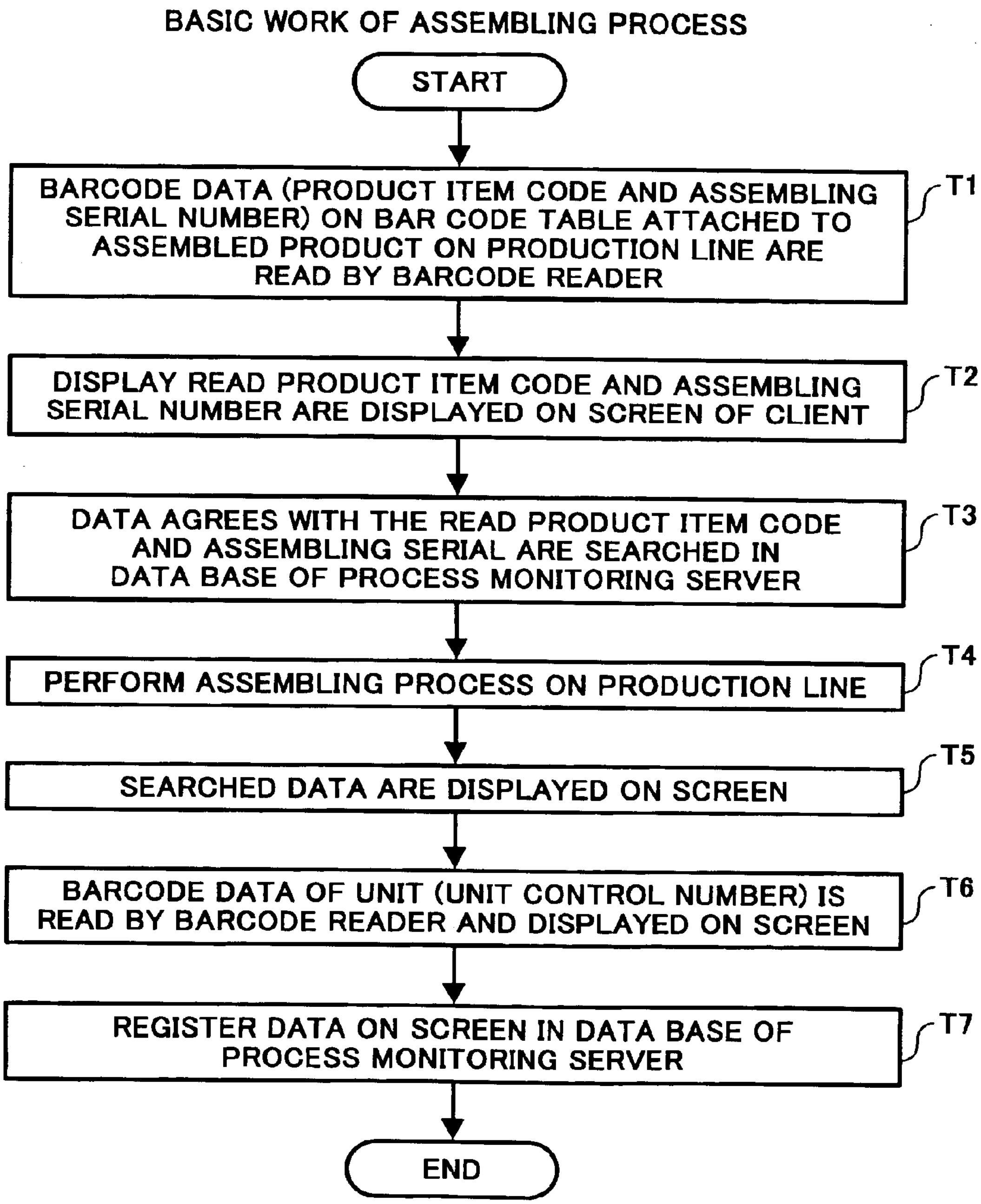
FIG. 57 is a flow chart to explain a basic operation of the input system (assembling process).

Hereinafter, a basic work of the assembling processes 3101 to 3103 will be described with reference to a flow chart shown in FIG. 57. FIG. 57 is a flow chart to explain a basic work of the assembling processes 3101 to 3103. In the flow chart shown in FIG. 57, respective operators of assembling processes 3101 to 3103 read out a bar code data of the target product (product item and assembling serial number) on a bar code table which is attached to a product on the assembling line by the clients 3201 to 3203 of the input system (step T1). The product item code and the assembling serial number which are read out are displayed on a screen of the clients 3201 to 3203 of the input system (step T2). Data (unit data, inspection sheet data, quality trouble data and so on) which agree with the product item code and the assembling serial number are searched from the data base of process monitoring server **3300*a* (step T3). The respective operators of assembling processes 3101 to 3103 achieve the assembling work on the line while the data are searched from the process monitoring server 3300*a* (step T4). After the search of process monitoring server 3300*a* has been completed, the resulted searched data are displayed on the screen of clients 3201 to 3203 (step T5). The operators input required data on this screen. Also when in a case the process includes a unit fixing work, a bar code data (unit control number) of the unit is read out by the bar code reader, and the data read out is displayed on the screen (step T6). The respective operators input the required data through the screen. When the operator gives an instruction to register the input data, the data displayed on the screen are registered in the data base of process monitoring server 3300*a* according to the instruction (step T7**).

Figure 58:
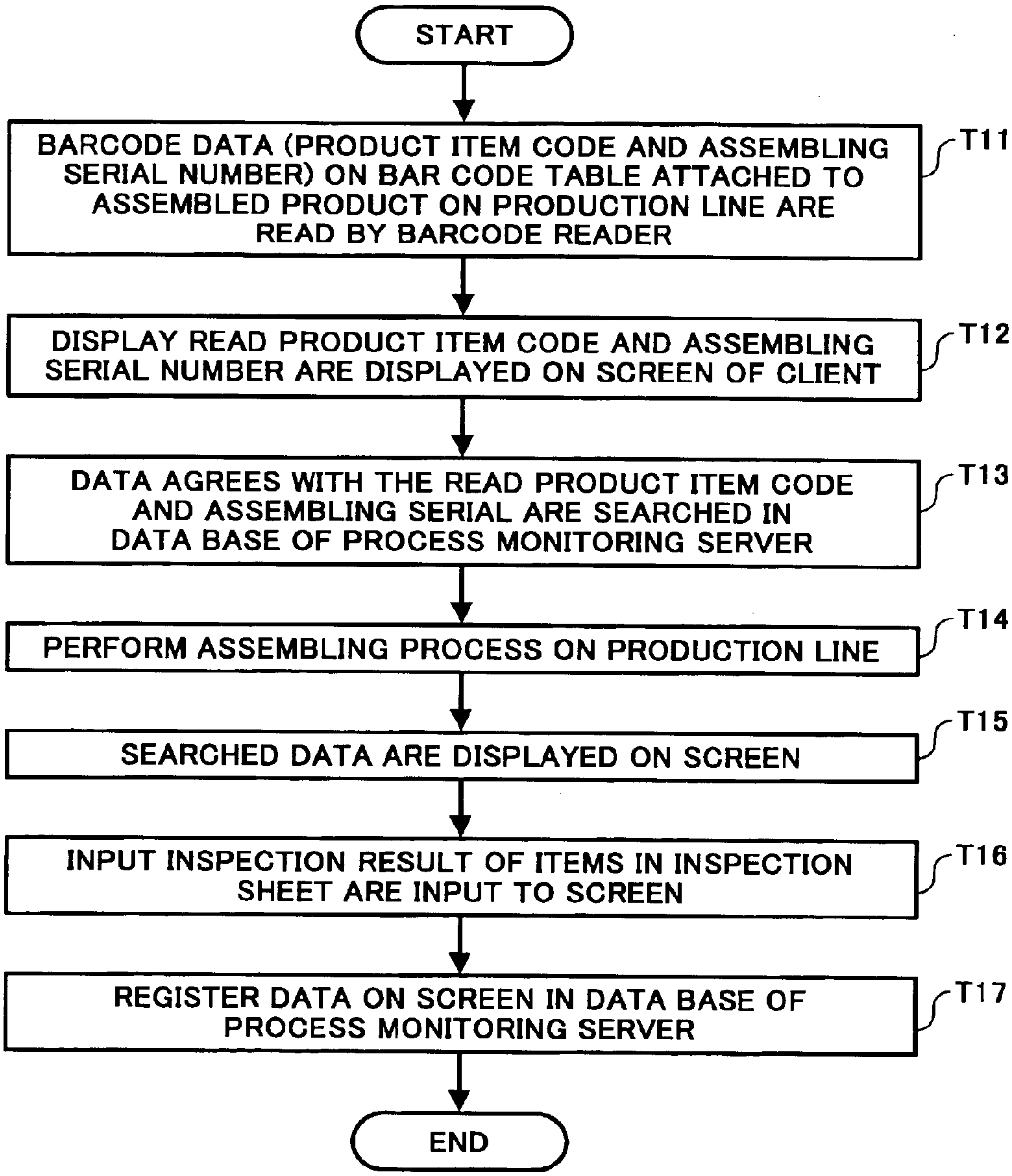
FIG. 58 is a flow chart to explain a basic operation of the input system (inspection process).

Hereinafter, a basic work of the inspection processes 3104 to 3106 will be described with reference to a flow chart shown in FIG. 58. FIG. 58 is a flow chart to explain a basic work of the inspection process 3104 to 3106. In the flow chart shown in FIG. 58, respective operators (examining staff) of inspection processes 3101 to 3103 read out a bar code data of the target product (product item and assembling serial number) on a bar code table which is attached to a product on the assembling line by the clients 3204 to 3206 of the input system (step T11).

The product item code and the assembling serial number which are read out are displayed on a screen of the clients 8204 to 3206 of the input system (step T12). Data (unit data, inspection sheet data, quality trouble data and so on) which agree with the product item code and the assembling serial number are searched from the data base of process monitoring server **3300*a* (step T13). The respective operators of inspection processes 3101 to 3103 achieve the inspection work on the line while the data are searched from the process monitoring server 3300*a* (step T14). After the search of process monitoring server 3300*a* has been completed, the resulted searched data are displayed on the screen of clients 3204 to 3206 (step T15). The respective operators input the result of inspection on the items of inspection sheet on the screen (step T16). When the operator gives an instruction to register the input data, the data displayed on the screen are registered in the data base of process monitoring server 3300*a* according to the instruction (step T17**).

At this point, in this embodiment, the bar code data (product item code and assembling serial number) are arranged to be read out from the bar code table, however, it may also be employable that the bar code is attached to the assembled product and the bar code is read out from the product through the attached bar code.

Figure 59:
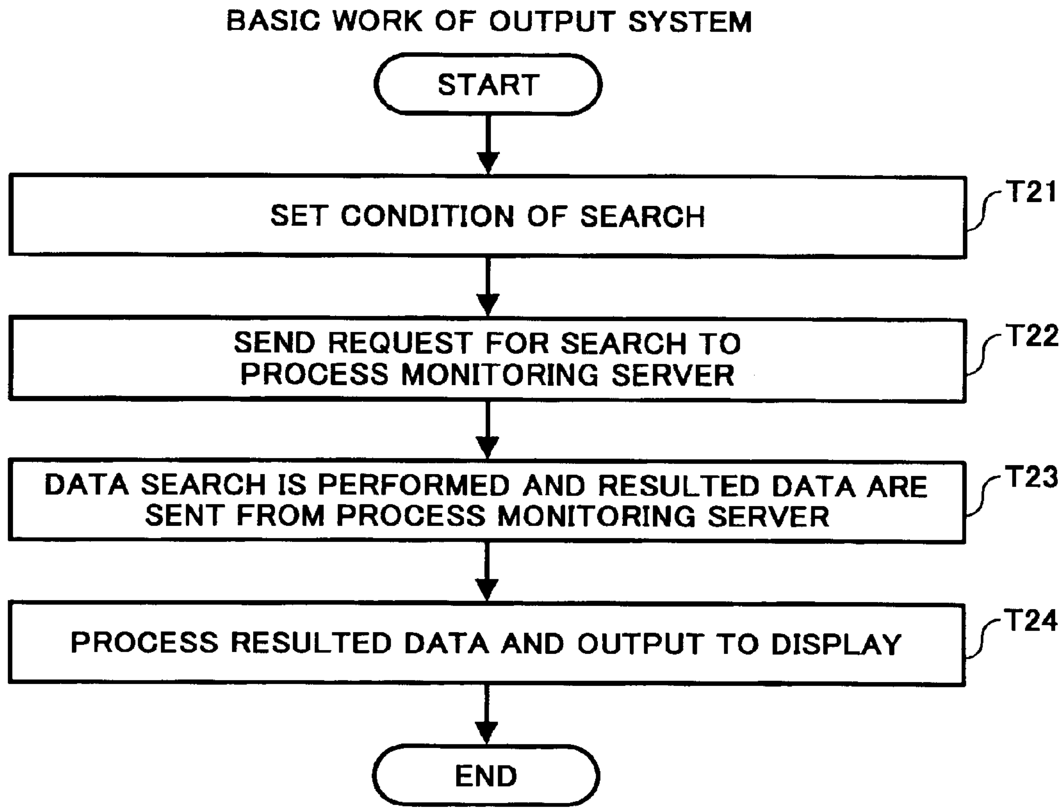
FIG. 59 is a flow chart to explain a basic operation of the output system.

Hereinafter, a basic work of the production/product inspection department 3401, the parts inspection department 3402 and the manufacturing technology department 3403 will be described with reference to a flow chart shown in FIG. 59. FIG. 59 is a flow chart to explain a basic work of the production/product inspection department 3401, the parts inspection department 3402 and the manufacturing technology department 3403.

In the flow chart shown in FIG. 59, respective persons in charge of the production/product inspection department 3401, the parts inspection department 3402 and the manufacturing technology department 3403 set the search conditions to make the search on the data stored in the data base of process monitoring server 300*a* in order to comprehend a situation of product in the production management system of the day, by day, by month and so on by the clients 3501 to 3503 of the output system (step T21). A request for search is sent to the process monitoring server 3300*a* (step T22), and the resulted searched data which are corresponding to the search condition, are received from the process monitoring server 3300*a* (step T23). The resulted searched data are further processed to be in time series and so on and they are displayed on the screen of clients 3501 to 3503 (step T24).

Figure 60:
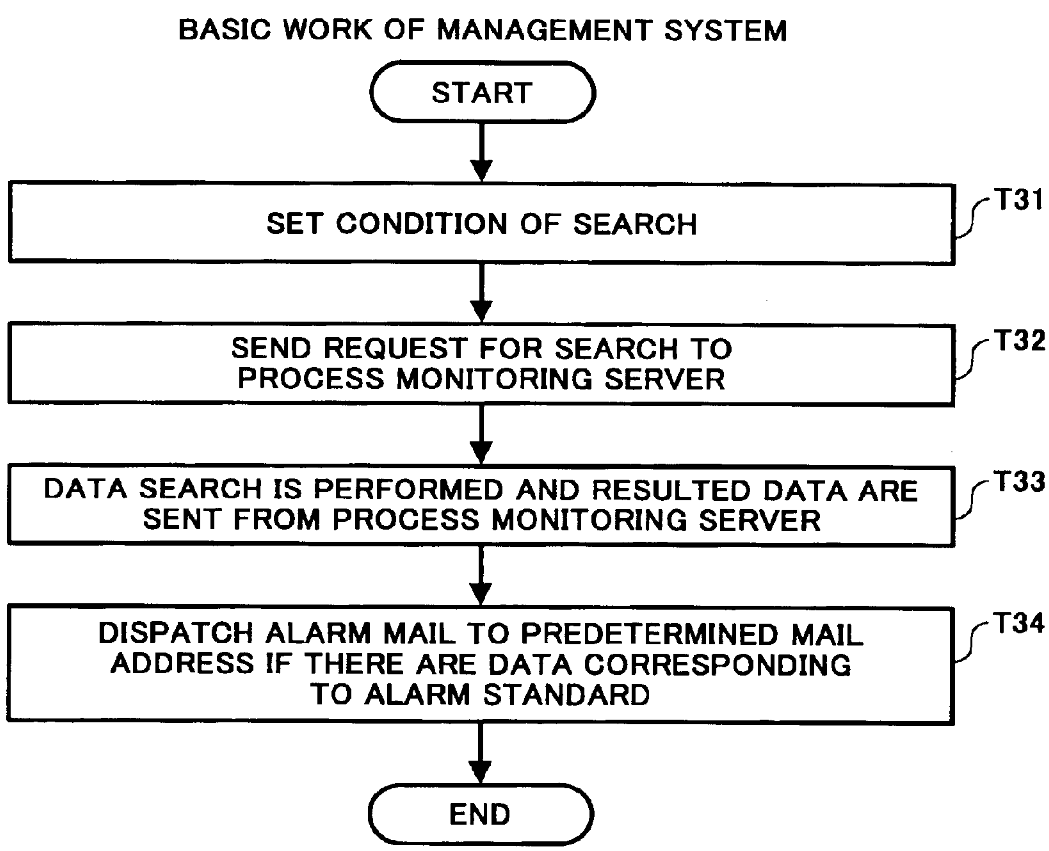
FIG. 60 is a flow chart to explain a basic operation of a management system.

Hereinafter, a basic work of the management department 3420 will be described with reference to a flow chart shown in FIG. 60. FIG. 60 is a flow chart to explain a basic work of the management department 3420. In the flow chart shown in FIG. 60, a manager of the management department 3420 set the search conditions to make the search on the data stored in the data base of process monitoring server 3300*a* in order to comprehend if any quality trouble happens in the production of product and so on by the client of the management system 3600 (step T31). A request for search is sent to the process monitoring server 3300*a* (step T32), and the resulted searched data which are corresponding to the search condition, are received from the process monitoring server 3300*a* (step T33). If in a case that the resulted searched data includes data that exceeds a criterion to initiate a corrective action, alarm mails are sent to notice the trouble occurs to terminals with the registered mail address (step T34).

Structure of Clients of Input System and Output System

Figure 61:
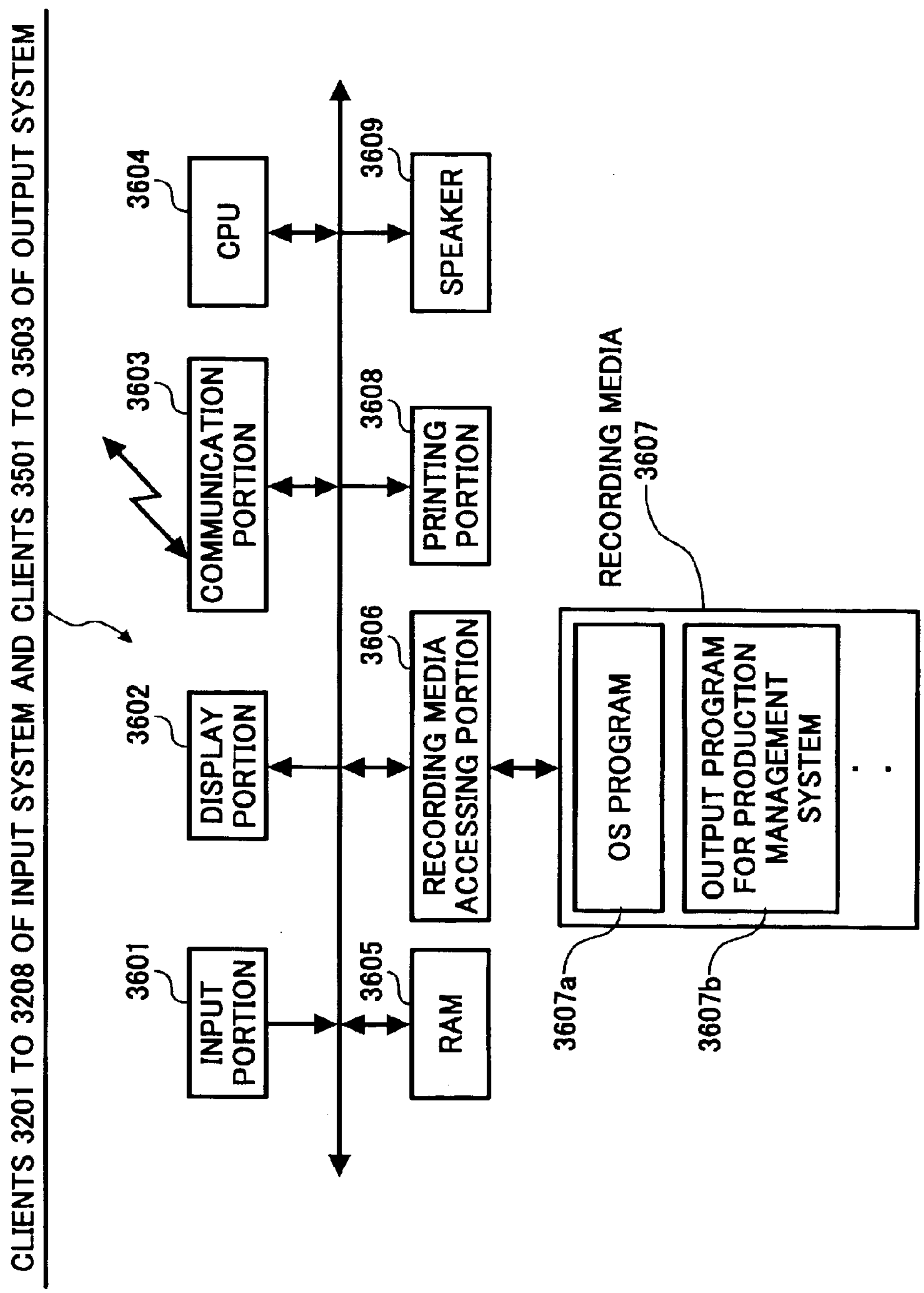
FIG. 61 is a schematic block diagram to show a client of the input system and the output system shown in FIG. 56.

FIG. 61 is a schematic black diagram to show the clients 3201 to 3208 of the input system and the clients 3501 to 3503 of output system shown in FIG. 56. The structure of the respective clients 3201 to 3208 of input system and the respective clients 3501 to 3503 are quite the same. The clients 3201 to 3208 of input system and the clients 3501 to 3503 include an input portion 3601 in order to input data, a display portion 3602, a communication portion 3603 to perform a data communication, a CPU 3604 to control whole operation of the apparatus, a RAM 3605 to be utilized as a work area of the CPU 3604, a recording media accessing unit 3606 to perform read/write data from/to a recording media 3607 and the recording media 3607 in which various kind of programs are recorded in order to operate the CPU 3604, printing portion 3608 and a speaker 3609.

The input portion 3601 is composed of a key board which includes cursor keys, ten keys and various kind of function keys, a mouse, bar code reader and so on, as an user interface for an operator to give operating command to the CPU 3604 and to input data.

The display portion 3602 is composed of a CRT or a LCD and so on, on which a display in accordance with the display data input from the CPU 3604 is performed. The communication portion 3603 is connected to the Net Work, and through which the data communication with the server 3300 or with other clients are performed.

The above described CPU 3604 is a central processing unit to control the whole apparatus in accordance with the program stored in the recording media 3607, and to the CPU 3604 the input portion 3601, the display portion 3602, the communication portion 3603, the RAM 3605 and the recording media accessing unit 3606, printing portion 3608 and speaker 3609 are connected, to control the data communication, the read out of the application program through access to the memory, and the read/write of various kind of data, the input of data/command, the display and so on.

The above described RAM 3605 includes a work memory in which the designated program, the request for input, the input data the result of processing and so on are stored, and a display memory in which the display data to be displayed on the display screen of display portion 3602 is temporally stored.

In the above described recording media 3607 the data and the various kind of programs such as an OS program 3607*a* (for example WINDOWS 95 or WINDOWS NT) which can be executed by the CPU 3604 and application programs, are stored. As the application programs, for example, input program 3607*b* for the production management system and so on are included. As the recording media 3607, for example, optical recording media, magnetic recording media and electrical recording media such as floppy disks, hard disks, CD-ROM DVD-ROM, MO, PC card and so on are included The above described various kind of programs are stored in the recording media 3607 with a recording format which can be readable by the CPU 8604. Also, there are cases that the above described various kind of programs are stored in the recording media in advance, or the programs are down loaded to be stored in the recording media through a communication line.

The printing portion 3608 is composed of, for example, a laser printer to print out the data and so on which are displayed on the display portion 3602 by a control of the CPU 3604. The speaker 3609 sounds alarm and so on by a control of the CPU 3604.

In the clients 3201 to 3208 of input system, an input program for inside the process 3707*c* (See FIG. 62) is downloaded from the process monitoring server 3300*a* in order for the CPU 3604 to execute the data input process according to the input program for inside of the process 3707*c* which will be described later.

In the clients 3501 to 3503 of output system, a process monitoring/alarm program 3707*d* (See FIG. 62) is downloaded from the process monitoring server 3300*a* in order for the CPU 3604 to execute the process monitoring/alarm process which will be described later according to the process monitoring/alarm program 3707*d*.

Also in the clients 3501 to 3503 of output system, a process monitoring quality program 3707*e* is downloaded from the process monitoring server 3300*a* in order for the CPU 3604 to execute the process monitoring quality process according to the process monitoring quality program 3707*e*.

Also in the clients 3501 to 3503 of output system, a daily/monthly report program 3707*f* (See FIG. 62) is downloaded from the process monitoring server 3300*a* in order for the CPU 3604 to execute the daily/monthly report process according to the daily/monthly report program 3703*f*.

Also in the clients 3501 to 3603 of output system, a free search program 3707*g* (See FIG. 62) is downloaded from the process monitoring server 3300*a* in order for the CPU 3604 to execute the free search process according to the free search program 3703*g*. As described above the arrangement utilizing the programs by downloading from the process monitoring server 3300*a*, because an installation of program is not necessary even when the program is revised, the revised program can be applicable rapidly.

[Structure of the Process Monitoring Server]

Figure 62:
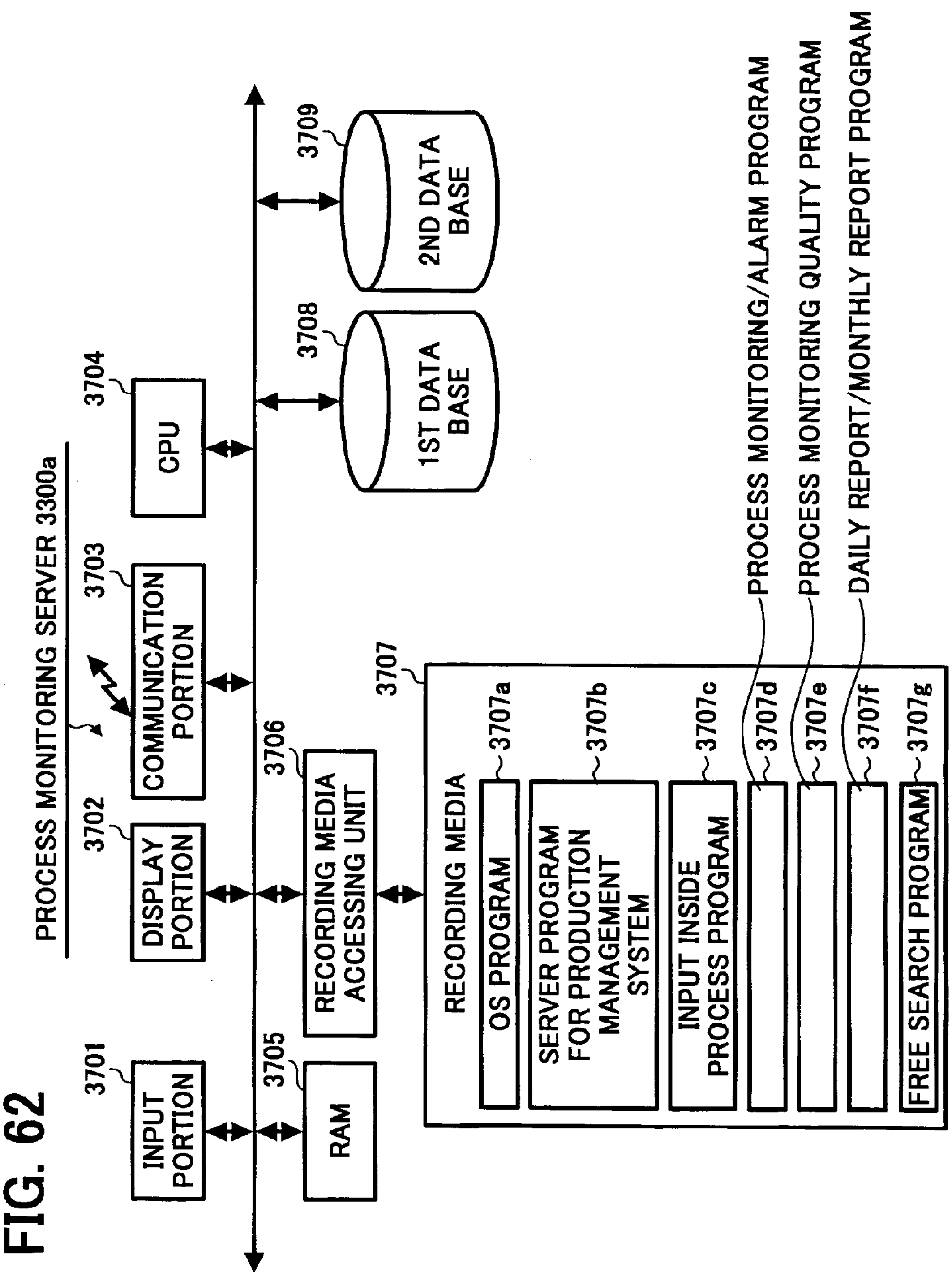
FIG. 62 is a schematic block diagram to show a process monitoring server shown in FIG. 56.

FIG. 62 is a schematic block diagram to show a process monitoring server 3300*a* shown in FIG. 56. As shown in FIG. 62, the process monitoring server 3300*a* is composed with an input portion 3701 in order to input data, a display portion 3702, a communication portion 3703 to perform data communication, a CPU 3704 to control whole operation of the system as well as to manage the whole production management system, a RAM 3705 to be utilized as a work area of the CPU 3704, a recording media accessing unit 3706 to perform read/write data from/to a recording media 3707, the recording media 3707 in which various kind of programs are recorded in order to operate the CPU 3704, a first data base 3708 in which a various kind of master tables are stored and a second data base 3709 in which a various kind of data tables are stored.

The input portion 3701 is composed of a key board which includes cursor keys, ten keys and various kind of function keys, a mouse and so on, as an user interface for an operator to give operating command to the CPU 3704 and to input data.

The display portion 3702 is composed of a CRT or a LCD and so on, on which a display in accordance with the display data input from the CPU 3704 is performed. The communication portion 3703 is connected to a Net Work, and through which the data communication with the clients 3201 to 3208 of input system and the clients 3501 to 3503 are performed.

The above described CPU 3704 is a central processing unit to control the whole apparatus in accordance with the program stored in the recording media 3707 and so on, and to the CPU 3704 the input portion 3701, the display portion 3702, the communication portion 3708, the RAM 3705, the recording media accessing unit 3706 and the data base 3708 are connected, to control the data communication, the read out of the program through access to the recording media 3707, and the read/write of various kind of data, the input of data/command, the display and so on.

The above described RAM 3705 includes a work memory in which the designated program, the request for input, the input data, the result of processing and so on are stored, and a display memory in which the display data to be displayed on the display screen of display portion 3702 is temporally stored.

In the aforementioned recording media 3707 the data and the various kind of programs such as an OS program 3707*a* (for example, WINDOWS NT Server V4.0) which can be executed by the CPU 3704 and application programs, are stored. As the application programs, for example, the data base program 3707*b* for the production management system, the input program for inside the process 3707*c*, the process monitoring/alarm program 3707*d*, the process monitoring quality program 3707*e*, the daily/monthly report program 3707*f*, the free search program 3707*g* and so on are included. As the recording media, for example, optical recording media, magnetic recording media and electrical recording media such as floppy disks, hard disks, CD-ROM, DVD-ROM, MO, PC card and so on are included. The above described various kind of programs are stored in the recording media 3707 with a recording format which can be readable by the CPU 3704. There are cases that the above described various kind of programs are stored in the recording media 3707 in advance, or the programs are down loaded to be stored in the recording media 3707 through a communication line. Further the programs stored in the recording media 3707 can be delivered through a communication line.

Figure 63:
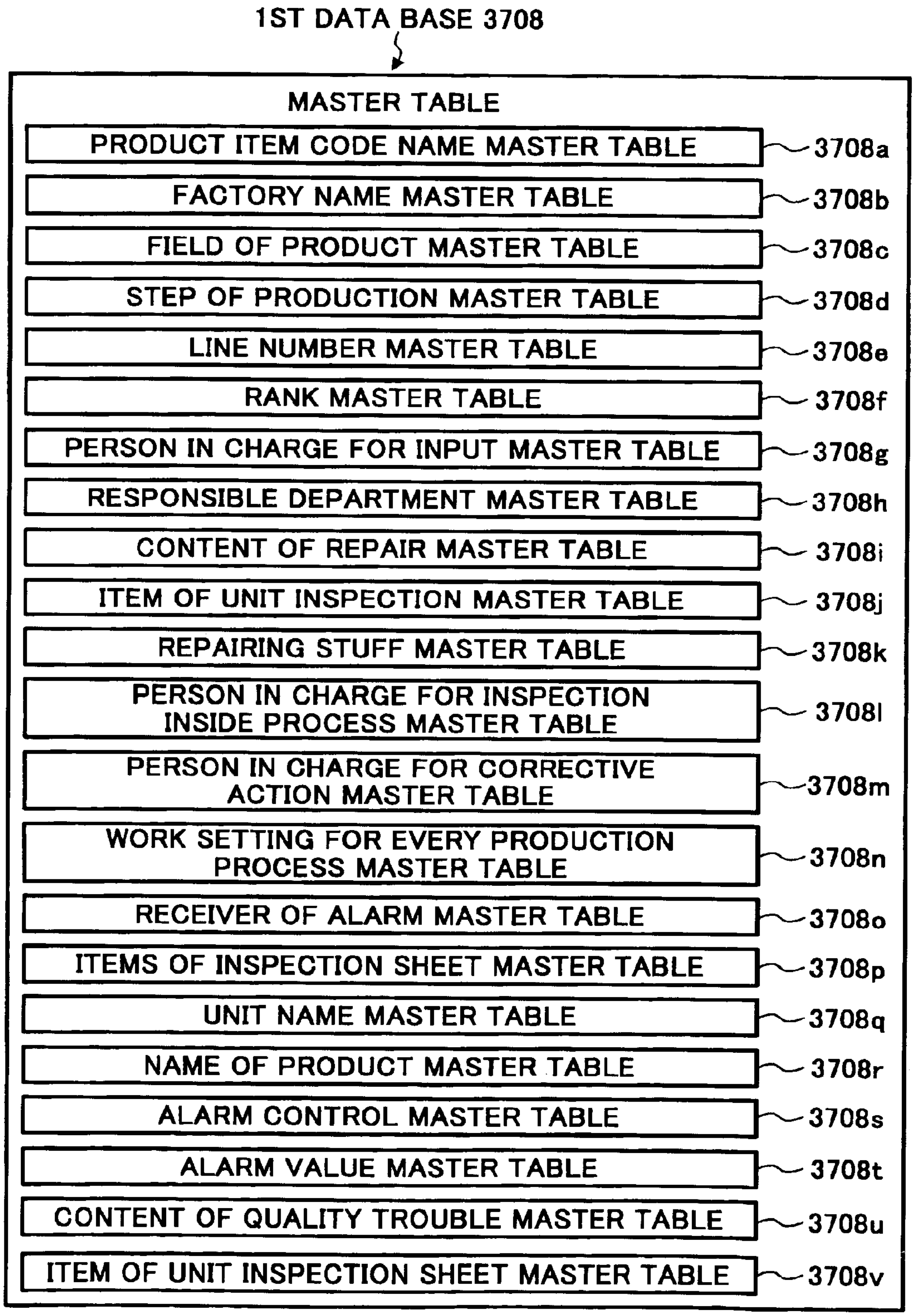
FIG. 63 is a diagram to show a master table which is stored in a first data base shown in FIG. 62.

FIG. 63 is a diagram to show one example of a format of the first data base 3708 shown in FIG. 62. As shown in the drawing, a various kind of master tables are stored in tie first data base 3708. As shown in the drawing, the master tables included an product item code name master table 3708*a*, a factory name master table 3708*b*, a field of product master table 3708*c*, a step of production master table 3708*d*, a line number master table 3708*e*, a rank master table 3708*f*, a person in charge for input master table 3708*g*, responsible department master table 3708*h*, a content of repairing master table 3708*i*, a unit inspection item master table 3708*j*, a person in charge for repairing master table 3708*k*, an inspection item inside of the process master table 3708*l*, a person in charge for corrective action master table 3708*m*, a specified work for respective process master table 3708*n*, a receiver of alarm master table 3708*o*, an item of inspection sheet master table 3708*p*, a name of unit master table 3708*q*, a product item name master table 3708*r*, an alarm control master table 3708*s*, an alarm values master table 3708*t*, a content of trouble master table 3708*u* and an item of unit inspection sheet master table 3708*v*.

Figure 64:
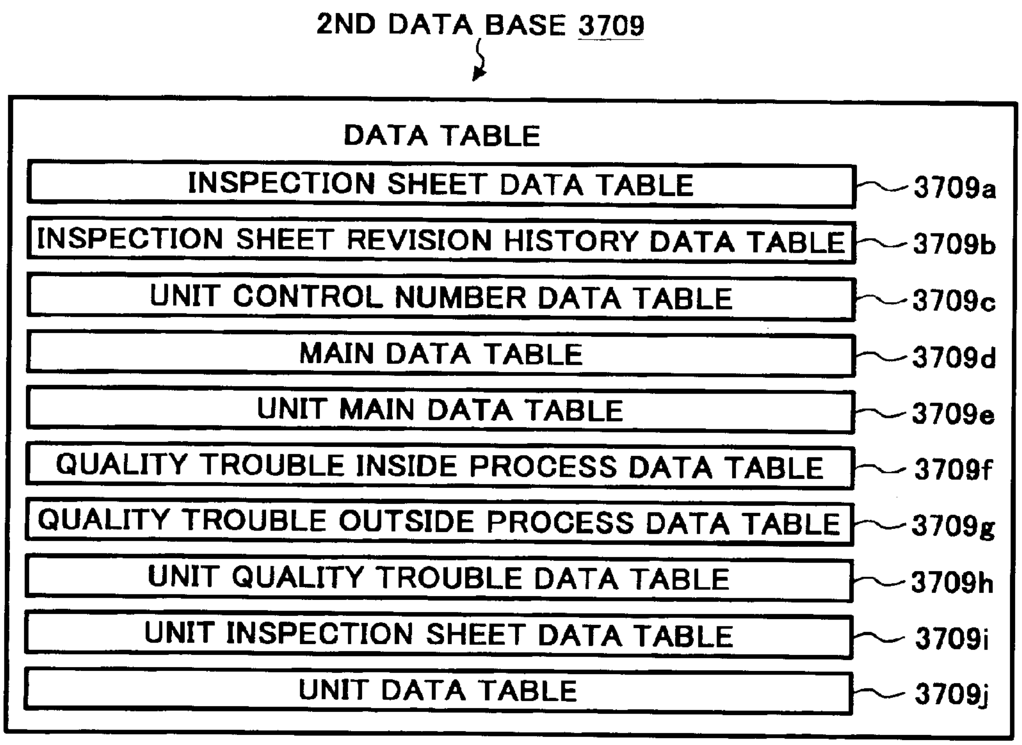
FIG. 64 is a diagram to show a master table which is stored in a second data base shown in FIG. 62.

FIG. 64 is a diagram to show one example of a format of the second data base 3709 shown in FIG. 56. As shown in the drawing, a various kind of data tables are stored in the second data base 3709. As shown in the drawing, the data tables includes an inspection sheet data table 3709*a*, a history of revision on inspection sheet data table 3709*b*, a number of unit control data table 3709*c*, a main data table 3709*d*, a unit main data table 3709*e*, a quality trouble inside of the process data table 3709*f*, a quality trouble outside of the process data table 3709*g*, an unit quality trouble data table 3709*h*, an unit inspection sheet data table 3709*i* and a unit inspection item data table 3709*j*.

One example of data format which is applicable to the above described master tables 3708*a* to 3708*v* is shown in FIG. 65 to FIG. 86. In the drawings, the items with a mark "◎" are used as the keys for search.

FIG. 65 is a diagram to show one example of a format of the product item code name master table 3708*a*. As shown in the drawing data of "number", "product item code", "product item brevity code", "product name", "voltage presentation" and "product item symbol" are stored in a manner corresponded each other in the product item code mane master table 3708*a*. This product item code name master table 3708*a* is prepared every each product item.

FIG. 66 is a diagram to show one example of format of a factory name master table 3708*b*. As shown in the drawing data of "number", "factory name" and "brevity code" are stored in a manner corresponded each other in the factory name master table 3708*b*.

FIG. 67 is a diagram to show one example of format of a field of product master table 3708*c*. As shown in the drawing data of "field of product" are stored in a corresponded manner to each other in the field of product master table 3708*c*.

FIG. 68 is a diagram to show one example of format of a step of production master table 3708*d*. As shown in the drawing data of "number" and "stop of production" are stored in a corresponded manner to each other in the step of production master table 3708*d*.

FIG. 69 is a diagram to show one example of format of a line number master table 3708*e*. As shown in the drawing, data of "line number" are stored in a manner corresponded each other in the line number master table 3708*e*.

FIG. 70 is a diagram to show one example of format of a rank master table 3708*f*. As shown in the drawing data of "rank" (discussion request, entreatement as information) are stored in a manner corresponded to each other in the rank master table 3708*f*.

FIG. 71 is a diagram showing one example of format of a person in charge for input master table 3708*g*. As shown in the drawing data of "employee number", "name " and "password" are stored in a manner corresponded each other in the person in charge for input master table 3708*g*.

FIG. 72 is a diagram showing one example of format of a responsible department master table 3708*h*. As shown in the drawing data of "number", "responsible department 1", "responsible department 2" and "responsible department 3" are stored in a manner corresponded each other in the responsible department master table 3708*h*.

FIG. 73 is a diagram showing one example of format of a content of repairing master table 3708*i*. An shown in the drawing data of "number", "content of repairing 1", "content of repairing 2" and "content of repairing 3" are stored in a manner corresponded each other in the content of repairing master table 3708*i*.

FIG. 74 is a diagram Owing one example of format of a person in charge for unit inspection sheet master table 3708*j*. As shown in the drawing data of "number" and "name of person in charge" are stored in a manner corresponded each other in the person in charge for unit inspection sheet 3708*j*.

FIG. 75 is a diagram showing one example of format of a person in charge for repairing master table 3708*k*. As shown in the drawing data of "number" and "name of person in charge" are stored in a manner corresponded each other in the person in charge for repairing master table 3708*k*.

FIG. 76 is a diagram showing one example of format of a person in charge for inspection inside the process master table 3708*l*. As shown in the drawing data of "name of person in charge" of the person in charge inside the process are stored in a manner corresponded each other in the person in charge for inspection inside the process master table 3708*l*.

FIG. 77 is a diagram showing one example of format of a person in charge for corrective action master table 370*m*. As shown in the drawing data of "number" and "name of person in charge" are stored in a manner corresponded each other in the person in charge for corrective action master table 3708*m*.

FIG. 78 is a diagram showing one example of format of a specified work for respective process master table 3708*n*. As shown in the drawing data of "number", "name of process", "display process", "person in charge for inspection" and "tab control" are stored in a manner corresponded each other in the specified work for respective process master table 3708*n*.

FIG. 79 is a diagram showing one example of format of an alarm receiver master table 3708*o*. As shown in the drawing data of "number", "responsible department 1", "responsible department 2", "responsible department 3", "note ID" and "kind of mailing" are stored in a manner corresponded each other in the alarm receiver master table 3708*o*.

FIG. 80 is a diagram showing one example of a format of the item of inspection sheet master table 3708*p*. As shown in the drawing data of "product item code", "number", "name of process", "item of inspection", "specification", and "type of input" are stored in a manner corresponded each other in the item of inspection master table 3708*p*. This item of inspection sheet master table 3708*p* is prepared to each product item. At this point sign "1" in the type of input designates "direct input", sign "2" designates "on/off input".

FIG. 81 is a diagram showing one example of a format of the name of unit master table 3708*q*. As shown in the drawing data of "number", "unit number", "unit symbol", "name of unit", "unit division", "product item code", "unit product item code" and "presence or absence of unit inspection sheet" are stored in a manner corresponded each other in the name of unit master table 3708*q*. This name of unit master table 3708*q* is prepared to each product name.

FIG. 82 is a diagram showing one example of a format of the item name master table 3708*r*. As shown in the drawing data of "item name", "field of product", "site of production", "date of production begins", "server name", "IP address", "DB name", "head number flag" and "mail dispatch" are stored in a manner corresponded each other in the item name master table 3708*r*.

FIG. 83 is a diagram showing one example of a format of the alarm control master table 3708*s*. As shown in the drawing data of "classification of control", "organization", "criterion" and "alarm value" are stored in a manner corresponded each other in the item name master table 3708*s*.

FIG. 84 is a diagram showing one example of a format of the alarm value master table 3708*t*. As shown in the drawing data of "number", "classification of control", "classification of trouble", "name of process", "item of trouble", "content of trouble 1", "content of trouble 2", "content of trouble 3", "tout of line", "something strange", "responsible department 1", "responsible department 2", "responsible department 3", "no recurrence", "content of repairing 1", "content of repairing 2", "content of repairing 3", "person in charge for repairing", "content of prevention of recurrence", "person in charge for corrective action", "alarm value", "result of alarm", "time of alarm" and "date of mail dispatch".

FIG. 85 is a diagram showing one example of a format of the content of trouble master table 3708*u*. As shown in the drawing data of "product item name", "number", "item of trouble", content of trouble 1", "content of trouble 2" and "content of trouble 3" are stored in a manner corresponded each other in the item name master table 3708*u*.

FIG. 86 is a diagram showing one example of a format of the item of the unit inspection sheet master table 3708*v*. As shown in the drawing data of "unit symbol", "classification of unit", "number", "class", "item of inspection", "specification" and "method of inspection" are stored in a manner corresponded each other in the name of unit master table 3708*v*. This item of unit inspection sheet master table 3708*v* is prepared to each product name.

One example of data format which is applicable to the above described data tables 3709*a* to 3709*j* is shown in FIG. 87 to FIG. 95. In the drawings, the items with a mark "◎" are used as the keys for search.

FIG. 87 is a diagram showing one example of a format of the item of the inspection sheet data table 3709*a*. As shown in the drawing data of "assembling serial number", "product item code", "connection of inspection sheet", "number", "step of production", "name of process", "item of inspection", "specification", "judgement completion", "sign of inspection again" and "type of input" are stored in a manner corresponded each other in the name of unit master table 3709*a*. At this point, sign "1" in the type of input designates "direct input", sign "2" designates "on/off input". The data transferred from the clients 3201 to 3208 of input system are sequentially added to the inspection sheet data table 3709*a*. This inspection sheet data table 3709*a* is prepared to each product item name.

FIG. 88 is a diagram showing one example of a format of the history of inspection sheet revision data table 3709*b*. As shown in the drawing data of "product item code", "number", "item", "content", "date of creation", "date of edit" and "approval" are stored in a manner corresponded each other in the name of unit master table 3709*b*.

FIG. 89 is a diagram showing one example of a format of the unit control number data table 3709*c*. As shown in the drawing data of "assembling serial number", "product item code", "unit number", "unit symbol", "classification of unit", "step of production", "name of unit" and "unit control number" are stored in a manner corresponded each other in the unit control number data table 3709*c*. This unit control number data table 3709*c* is prepared every each product name.

FIG. 90 is a diagram showing one example of a format of the main data table 3709*d*. As shown in the drawing data (quality data) of "name of factory", "field of product", "product item name", "step of production", "line number", "product item code", "assembling serial number", "product serial number", "date of assembling begin", "time of assembling begin", "date of completion", "time of completion", "out of line flag", "market occurrence flag", "date of input", "count of trouble", "count of something strange", "count of no recurrence", "count of inspection again", "count of entreatement as information", "remarks" and "latest date of revision" are stored in a manner corresponded each other in the main data table 3709*d*. This main data table 3709*d* is prepared every each product name. In the main data table 3709*d* data which are made up in the clients 3201 to 3208 are overwritten with the product item code and the assembling serial number as keys.

FIG. 91 is a diagram showing one example of a format of the trouble inside the process data table 3709*f*. As shown in the drawing data (quality data) of "name of factory", "field of product", "product item", "step of production", "line number", "product item code", "assembling serial number", "serial number of trouble", "product serial number", "classification of trouble" "count of recurrence", "date of occurrence", "time of occurrence", "name of process", "item of trouble", "content of trouble 1", "content of trouble 2", "content of trouble 3", "out of line", "rank", "something strange", "responsible department 1", "responsible department 2", "responsible department 3", "no recurrence", "cause of trouble", "content of repairing 1", "content of repairing 2", "content of repairing 3", "date of repairing", "time of repairing", "person in charge for repairing", "content of prevention for recurrence", "date of corrective action", "time of corrective action", "person in charge for corrective action", "latest date of revision" and "flag for mail dispatch" are stored in a manner corresponded each other in the trouble inside the process data table 3709*f*. At this point sign "1" in the flag for mail dispatch designates "not yet sent", sign "2" designates "already sent". The data (raw data) transferred from the clients 3201 to 3208 of input system are sequentially added to the trouble inside the process data table 3709*f*. This trouble inside the process data table 3709*f* is prepared to each product name.

FIG. 92 is a diagram showing one example of a format of the trouble outside the process data table 3709*g*. As shown in the drawing data of "name of factory", "field of product", "product item", "step of production", "number of control", "serial number of trouble", "count of inspection again", "date of occurrence", "time of occurrence", "name of unit", "item of trouble", "content of trouble 1", "content of trouble 2", "content of trouble 3", "out of line", "something strange", "rank", "responsible department 1", "responsible department 2", "no recurrence", "cause of trouble", "content of repairing 1", "content of repairing 2", "date of repairing", "time of repairing", "person in charge for repairing", "content of prevention for recurrence", "date of corrective action", "time of corrective action", "person in charge for corrective action" and "latest date of revision" are stored in a manner corresponded each other in the trouble outside the process data table 3709*g*. This trouble outside the process data table 3709*g* is prepared to each product name.

FIG. 93 is a diagram showing one example of a format of the unit main data table 3709*h*. As shown in the drawing data of "name of factory", "field of product", "product item", "step of production", "unit symbol", "classification of unit", "unit control number", "name of unit", "date of assembling begin", "date of completion", "time of completion", "date of input", "count of trouble", "count of something strange", "count of no recurrence", "count of inspection again" and "latest date of revision" are stored in a manner corresponded each other in the unit main data table 3709*h*. This unit main data table 3709*h* is prepared every each product name.

FIG. 94 is a diagram showing one example of a format of the unit inspection sheet data table 3709*i*. As shown in the drawing data of "unit control number", "unit symbol", "classification of unit", "step of production", "number", "class", "item of inspection", "specification", "method of inspection", "judgement" and "sign of inspection again" are stored in a manner corresponded each other in the unit inspection sheet data table 3709*i*. This unit inspection sheet data table 3709*i* is prepared to each product name.

FIG. 95 is a diagram to show one example of a format of the unit data table 3709*j*. As shown in the drawing data of "unit control number", "unit symbol", "classification of unit", "step of production", "name of unit", "date of inspection", "time of inspection", "sign of inspection again" and "proof of acceptance" are stored in a manner corresponded each other in the unit data table 3709*j*. The data (raw data) transferred from the clients 3201 to 3208 of input system are sequentially added to the unit data table 3709*j*. This unit data table 3709*j* is prepared to each product name.

[Structure of Clients in the Management System]

Figure 96:
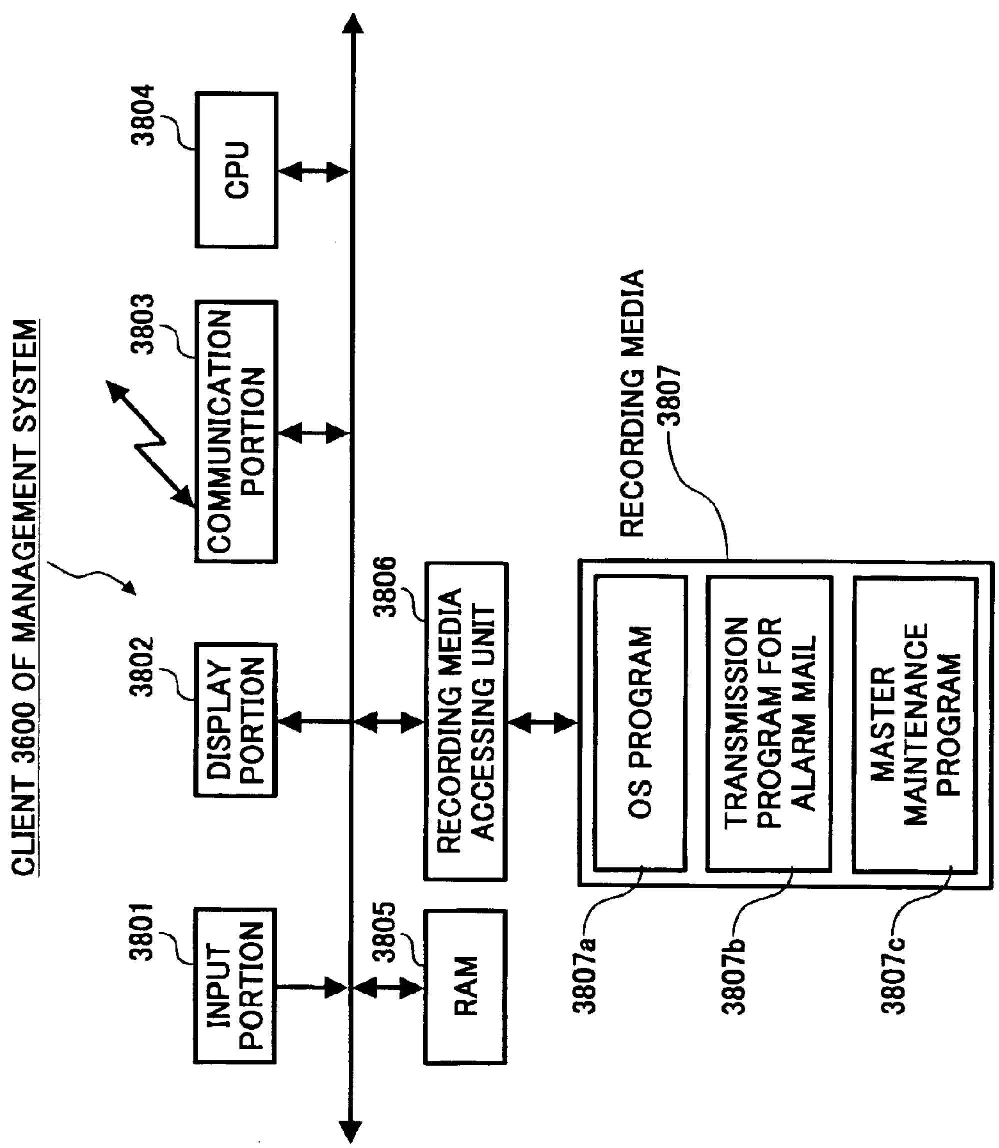
FIG. 96 is a schematic block diagram to show a client of management system shown in FIG. 56.

FIG. 96 is a schematic block diagram to show a client of management system 3600 shown in FIG. 56. As shown in FIG. 96, the client of management system 3600 is composed with an input portion 3801 in order to input data, a display portion 3802, a communication portion 3803 to perform data communication, a CPU 3804 to control whole operation of the system, a RAM 3805 to be utilized as a work area of the CPU 3804, a recording media accessing unit 3806 to perform read/write data from/to a recording media 3807 and the recording media 3807 in which various kind of programs are recorded in order to operate the CPU 3804.

The input portion 3801 is composed of a key board which includes cursor keys, ten keys and various kind of function keys, a mouse and so on, as an user interface for an operator to give operating command to the CPU 3804 and to input data.

The display portion 3802 is composed of a CRT or a LCD and so on, on which a display in accordance with the display data input from the CPU 3804 is performed. The communication portion 3803 is connected to a Net Work, and through which the data communication with the process monitoring server 3300*a* and the mail server 3300*b* or with other clients are performed.

The above described CPU 3804 is a central processing unit to control the whole apparatus in accordance with the program stored in the recording media 3807, and to the CPU 3804 the input portion 3801, the display portion 3802, the communication portion 3803, the RAM 3805 and the recording media accessing unit 3806 are connected, to control the data communication, the read out of the application program through access to the memory, and the read/write of various kind of data, the input of data/command, the display and so on.

The above described RAM 3805 includes a work memory in which the designated program, the request for input, the input data, the result of processing and so on arc stored, and a display memory in which the display data to be displayed on the display screen of display portion 3802 is temporally stored.

In the above described recording media 3807, the data and the various kind of programs such as an OS program 3807*a* (for example WINDOWS 95 or WINDOWS NT) which can be executed by the CPU 3804 and application programs, are stored. As the application programs, for example, an alarm mail dispatch program 3807*b*, a master maintenance program 3807*c* and so on are included. As the recording media 3807, for example, optical recording media, magnetic recording media and electrical recording media such as floppy disks, hard disks, CD-ROM, DVD-ROM, MO, PC card and so on are included. The above described various kind of programs are stored in the recording media 3807 with a recording format which can be readable by the CPU 3804. There are cases that the above described various kind of programs are stored in the recording media in advance, or the programs are down loaded to be stored in the recording media through a communication line. At the same time, the above described various kind of programs can be sent through the communication line.

In the client 3600 of management system, the CPU 3804 performs an alarm mail dispatch process which will be described later in accordance with an alarm mail dispatch program 3807*b*. Also in the client 3600 of management system, the CPU 3804 performs to input, to append, to change, to delete and so on the data of respective master tables in the process monitoring server 3300*a* in accordance with a master maintenance program 3807*c*. In further detail, the client 3600 of management system performs to input, to append, to change, to delete and so on the data of the product item code name master table 3708*a*, the specified work for respective process master table 3708*n*, the person in charge for repairing master table 3708*k*, the content of trouble master table 3708*u*, the person in charge for corrective action master table 3708*m*, the item of inspection sheet master table 3708*p*, the inspection item inside of the process master table 3708*l*, the name of unit master table 3708*q*, the unit inspection item master table 3708*j*, the item of unit inspection sheet master table 3708*v*, the receiver of alarm master table 3708*o* and the alarm values master table 3708*t*.

[Data Input Process Inside the Process by Client of Input System]

An input process inside the process by the client 3201 to 3208 will be described with reference to the examples of screens shown in FIG. 101 to FIG. 115 in accordance with the flow charts shown in FIG. 97 to FIG. 100. FIG. 97 to FIG. 100 are flow charts to explain the data input process inside the process by client 3201 to 3208 of the input system, FIG. 101 to FIG. 115 are examples of screen display in the data input process inside the process.

Figure 103:
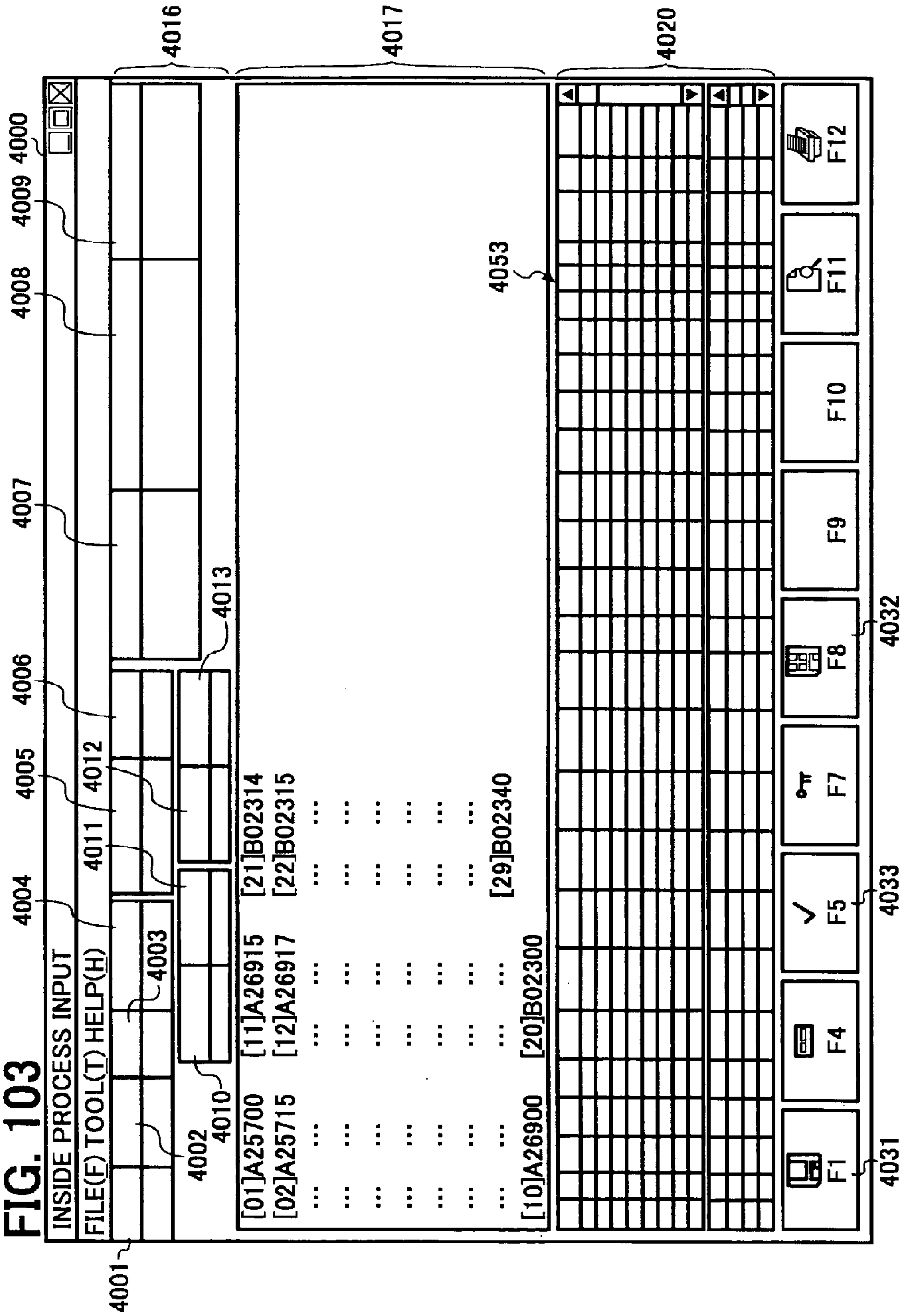
FIG. 103 is a diagram to explain an example of screen display in inside the process data input process.

FIG. 103 is a diagram explaining an example of screen display 1000 when the input program for inside of the process 3707*c* is begun to start. In the display screen of data input for inside of the process shown in FIG. 103, reference numerals designate input columns such as reference numeral 4001 designates "factory", 4002 designates "step of production", 4003 designates "line number", 4004 designates "product item name", 4005 designates "name of process", 4006 designates "operator", 4007 designates "product item code", 4008 designates "assembling serial number", 4009 designates "product number", 4010 designates "date of assembling", 4011 designates "time of assembling", 4012 designates "date of completion", 4013 designates "time of completion". A main data input block 4016 is composed by these input columns, "factory 4001", "step of production 4002", "line number 4003", "product item name 4004", "name of process 4005", "operator 4006", "product item code 4007", "assembling serial number 4008", "product number 4009", "date of assembling 4010", "time of assembling 4011", "date of completion 4012" and "time of completion 4013".

Reference numeral 4020 designates a content of trouble data input block to input a content of trouble. In the content of trouble data input block 4020 "count of recurrence", "date of occurrence", "time of occurrence", "name of process", "item of trouble", "content of trouble 1", "content of trouble 2", "content of trouble 3", "content of repairing 1", "content of repairing 2", "content of repairing 3", "no recurrence", "cause of trouble", "responsible department 1", "responsible department 2", "responsible department 3", "date of repairing", "time of repairing", "person in charge for repairing", "out of line", "something strange", "rank ", "content of prevention for recurrence", "date of corrective action", "time of corrective action" and "person in charge for corrective action" are displayed and data for them are input by an operator when a quality trouble happens.

Reference numeral 4017 designates a selecting list block in which items (data) to be input the content of trouble data input block 4020 are displayed. Reference numeral 4031 designates a "registration F1" key to register the input data in the process monitoring server 3300*a*, 4032 designates "automatic registration F8" key to register automatically the input data in the process monitoring server 3300*a*. Reference numeral 4033 designates a "completion F5"key.

Figure 112A:
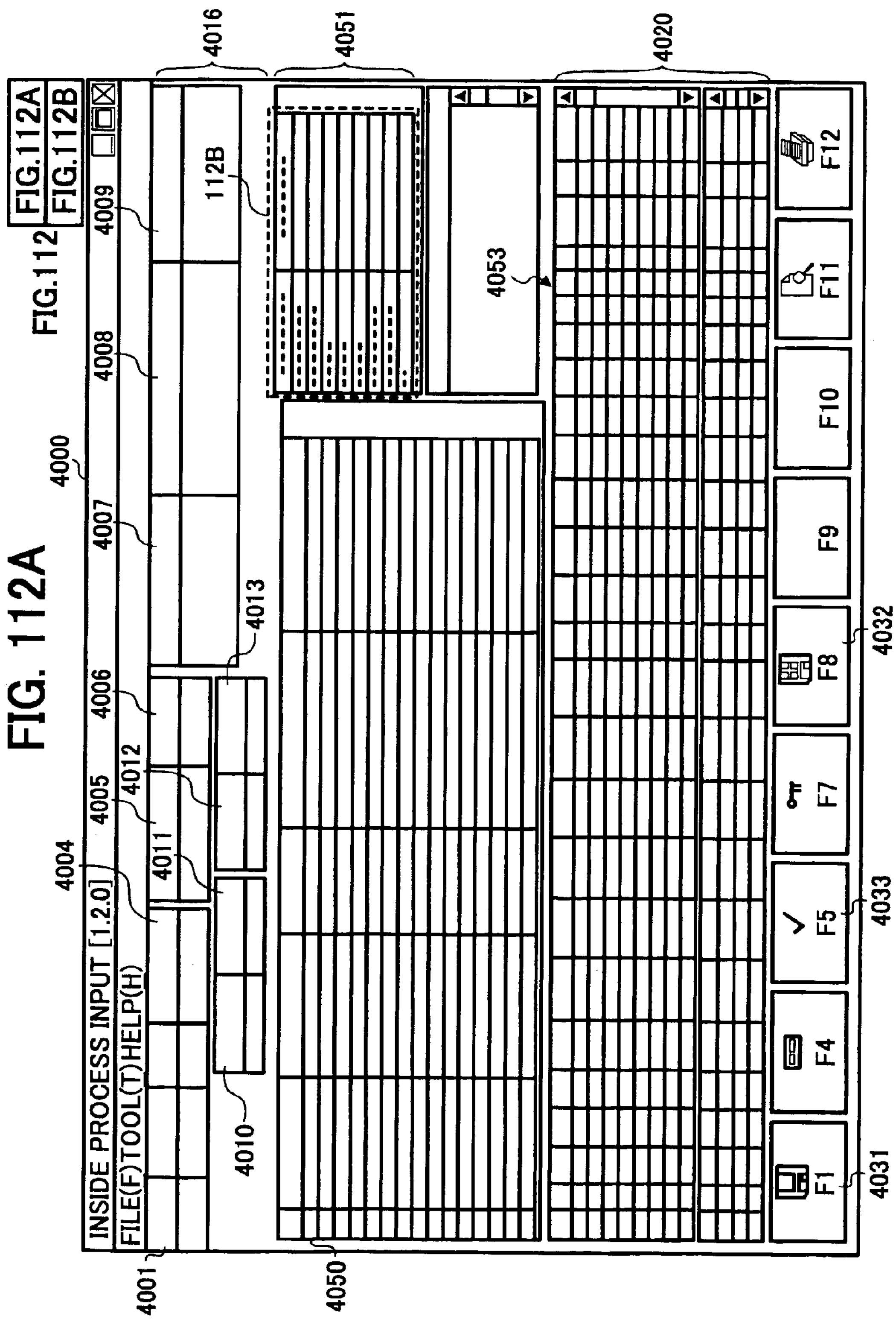
FIG. 112 is a diagram to explain an example of screen display in inside the process data input process.

FIG. 112 shows a case when the inspection sheet data input block 4051 and the unit data input block 4051 are displayed and overlaid on the selecting list input block 4051. The switching of display and non display of the inspection sheet data input block 4061 and the unit data input block 4051 are decided by a data of "tab control" of a specified work for respective process master table 3708*n* which will described later. A unit inspection sheet and the content of unit trouble can be displayed when a unit data in unit item of the unit data input block 4051 is double clicked.

Figure 113A:
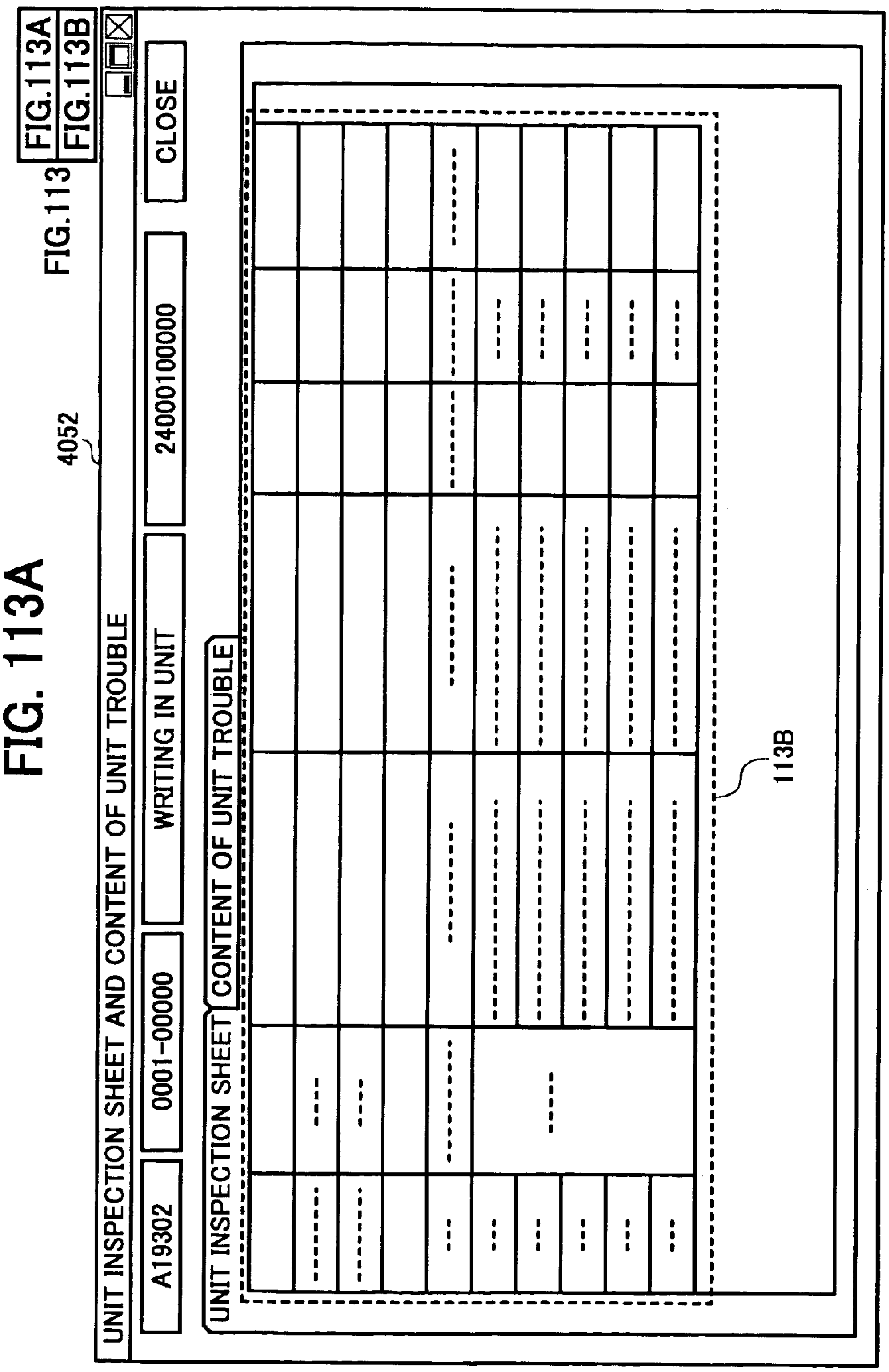
FIG. 113 is a diagram to explain an example of screen display in inside the process data input process.

FIG. 113 shows one example of display screen 4052 in which the unit inspection sheet and the content of unit trouble.

Figure 104A:
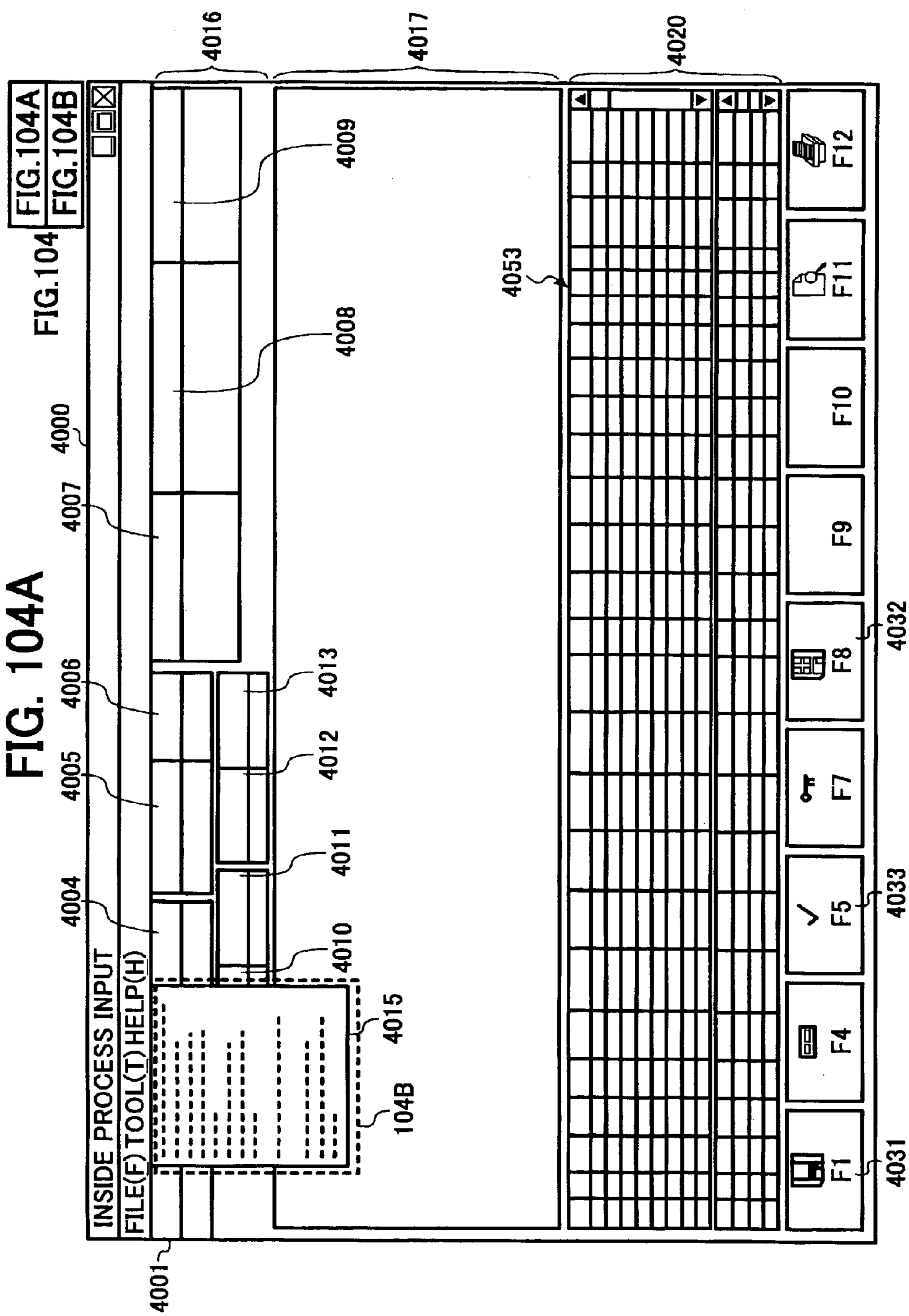
FIG. 104 is a diagram to explain an example of screen display in inside the process data input process.
Figure 104B:
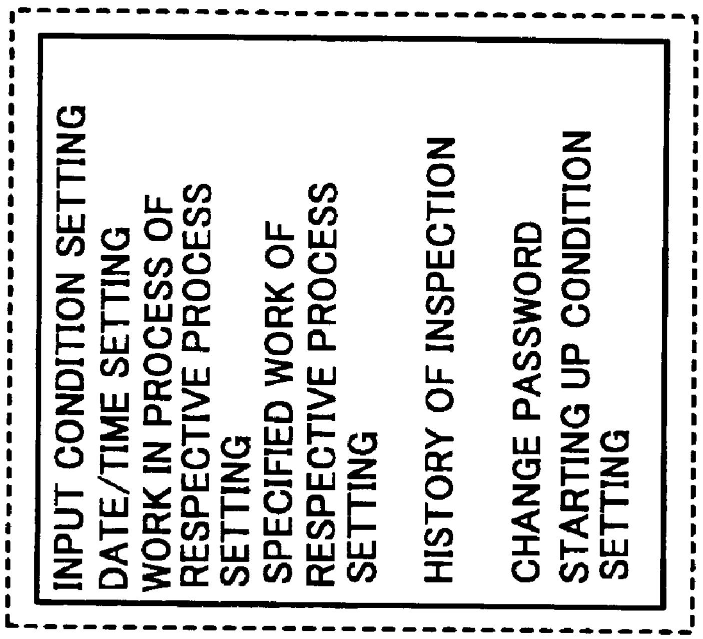

At first in the respective clients 3201 to 3208, a setting of starting condition is performed. When a tool (T) is selected in data input screen inside the process shown in FIG. 103, a pull down menu 4015 to set the starting condition is displayed as shown in FIG. 104. The settings of starting condition are respectively performed in the respective clients 3201 to 3208. In the pull down menu 4015, "setting of input condition", "setting of date and time", "setting of specified work for respective process", "history of inspection sheet", "change password" and "setting of stag condition" are displayed.

The reason why setting of starting condition is set in this situation is because there may be too many input misses and it is trouble some to input the same content in every starting time when the initial conditions (factory, step of production, line number, product item, name of process) must be input at the staring up of respective clients of the input system, automatic function to input initial conditions is utilized in order to prevent input miss and to improve the efficiency of input.

Figure 105:
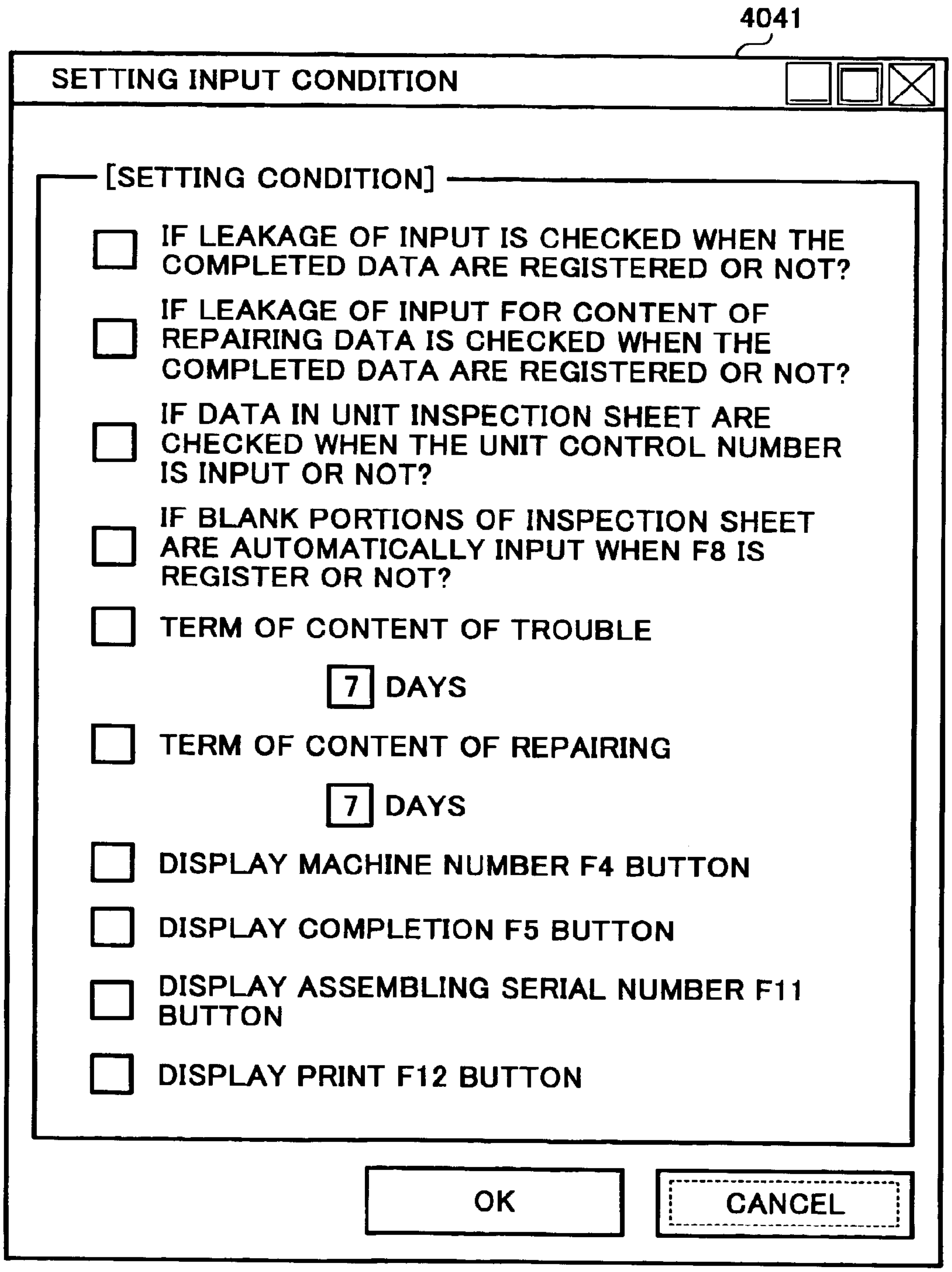
FIG. 105 is a diagram to explain an example of screen display in inside the process data input process.

When "setting of input condition" is selected in the pull down menu 4015, a dialog box 4041 as shown in FIG. 105 is displayed and overlaid on the screen shown in FIG. 104. The setting of input condition is performed in the dialog box 4041. In the dialog box 4041, "if leakage of input is checked when the completed data are registered or not?", "if leakage of input for content of repairing data is checked when the completed data are registered or not?", "if data in unit inspection sheet are checked when the unit control number is input or not?", "if blank portions of inspection sheet are automatically input when F8 is register or not?", "term of content of trouble", "term of content of repairing" and so on are set, and set contents (data) are respectively registered in the recording media 3607 in every client of input system 3201 to 3208. At the point "term of content of trouble" and "term of content of repairing" are set on the basis of a day.

Figure 106:
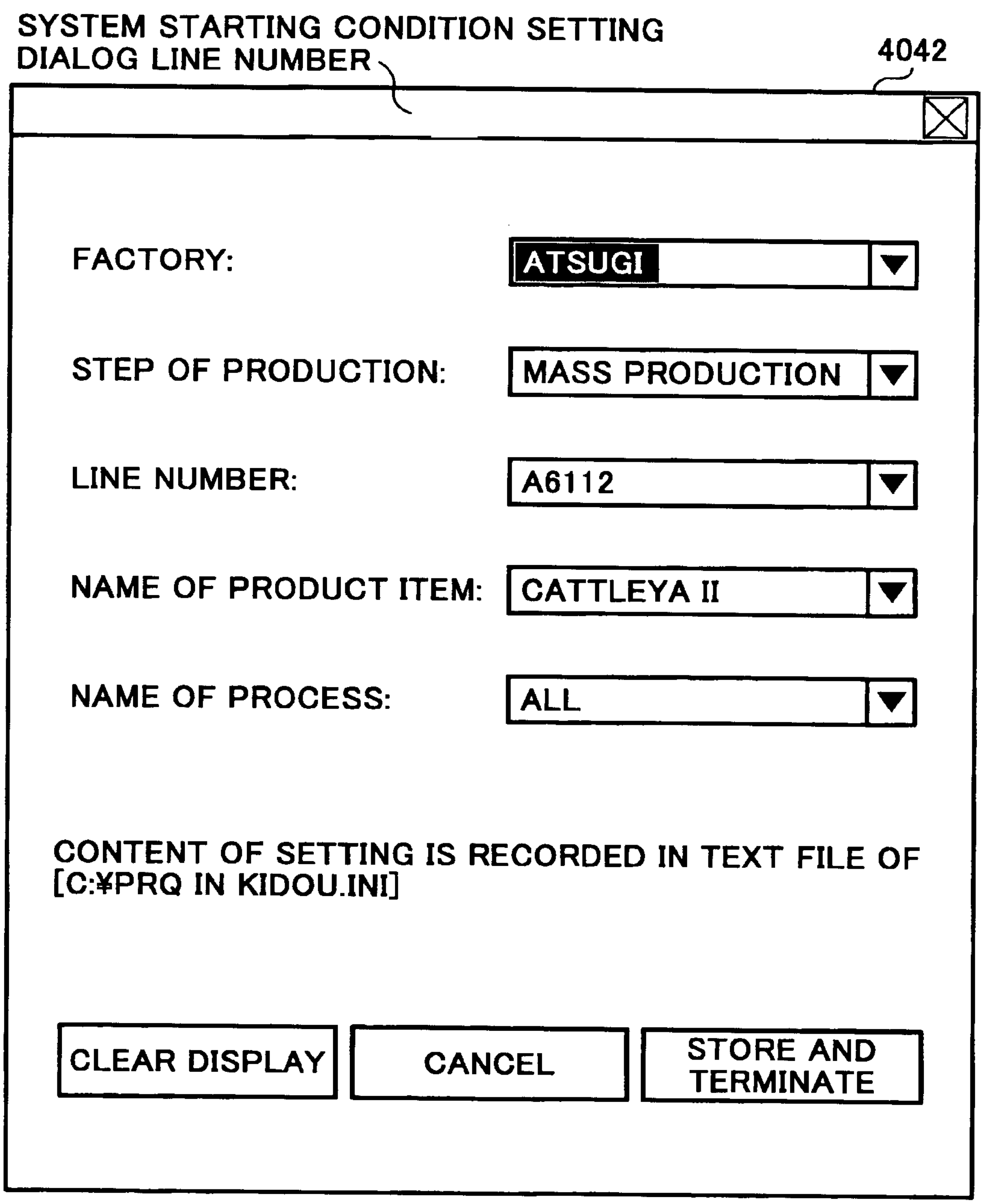
FIG. 106 is a diagram to explain an example of screen display in inside the process data input process.

When "setting of starting condition" is selected in the pull down menu 4015 shown in FIG. 104, a dialog box 4042 as shown in FIG. 106 is displayed and overlaid on the screen shown in FIG. 104. The settings of input condition in the dialog box 4042 are performed in every client 3201 to 3208 of the input system respectively. In the dialog box 4042, setting of data "factory", "step of production", "line number", "product item name" and "name of process" are performed. The contents (data) which have been set are stored respectively in the recording media 3607 of the clients 3201 to 3208 of input system". Because the initial values are different in respective clients 3201 to 3208, the set data of starting condition are recorded and the starting condition data are read out respectively and displayed in the respective display columns of above described "factory 4001", "step of production 4002", "line number 4003", "product item mane 4004" and "name of process 4005" when they are started.

In this embodiment shown in FIG. 106, "factory" is set in as "Atsugi", "step of production" is set in as "mass production", "line number" is set in as "A6112", "product item name" is set in as "Cattleya II" and "name of process" is set in as "All".

Figure 107:
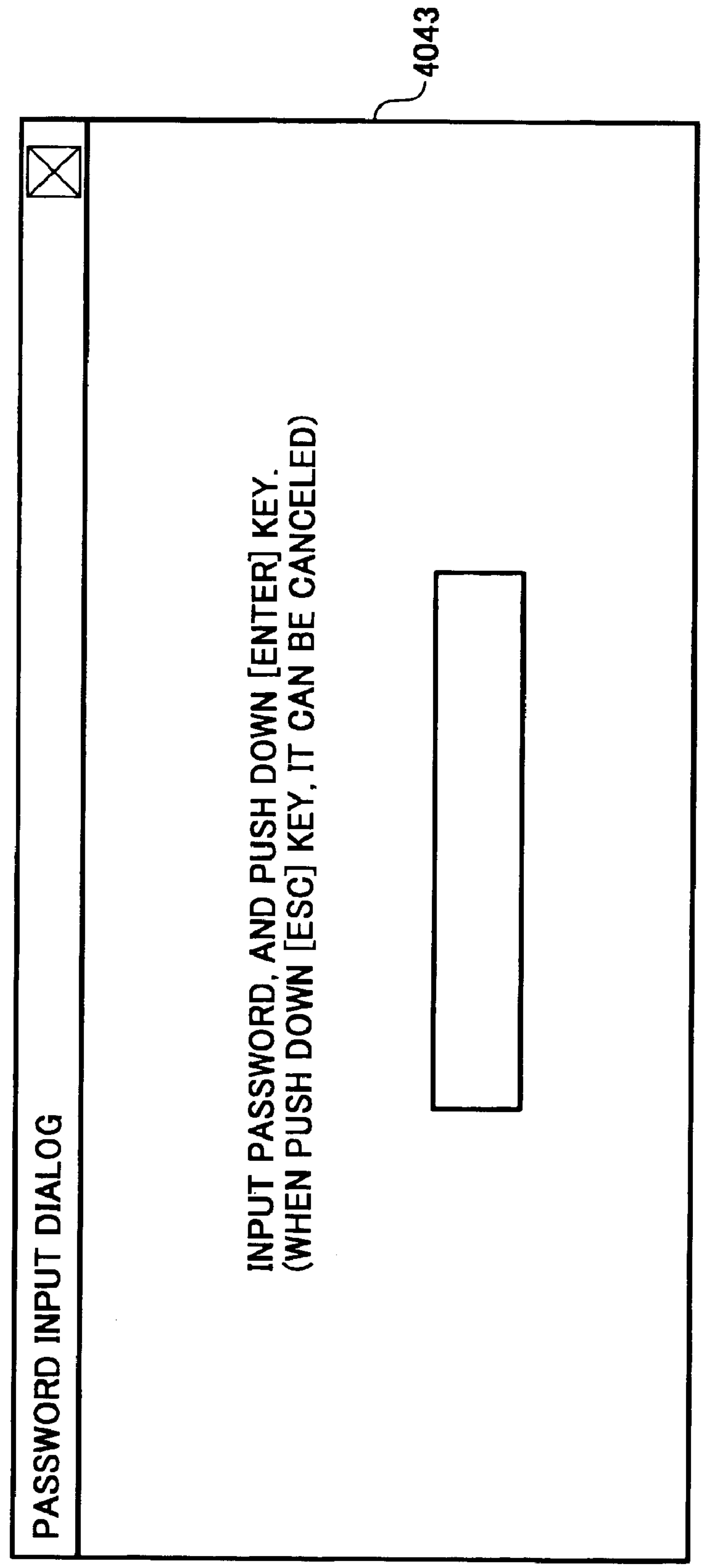
FIG. 107 is a diagram to explain an example of screen display in inside the process data input process.
Figure 108:
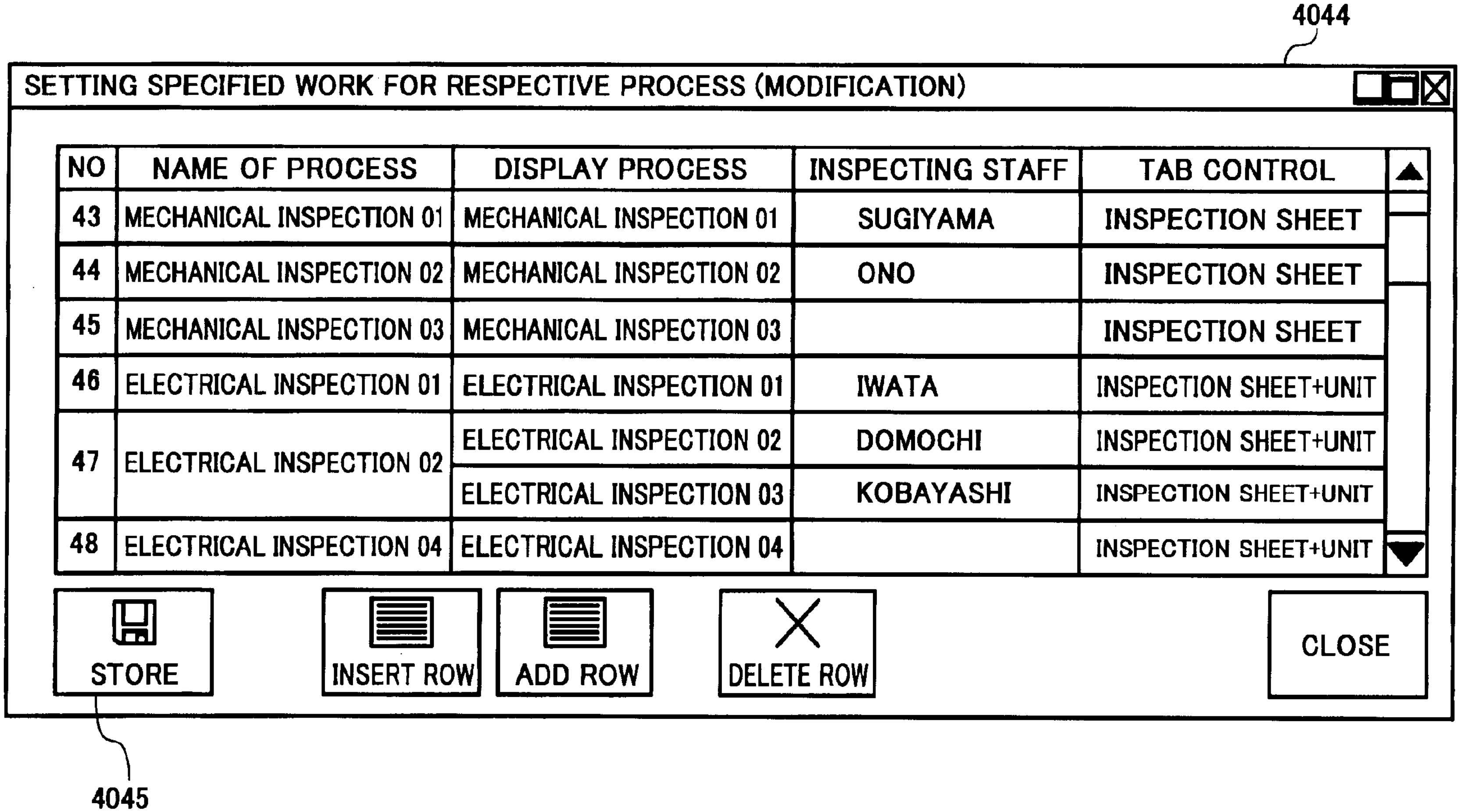
FIG. 108 is a diagram to explain an example of screen display in inside the process data input process.

When "setting of specified work for respective process" is selected in the pull down menu 4015 shown in FIG. 104, an input screen of password as shown in FIG. 107 is displayed and overlaid on the screen shown in FIG. 105, and when the correct password is input, a dialog box 4044 to set the work specified for every production process as shown in FIG. 108 is displayed and overlaid on the display screen shown in FIG. 105. At this point the reason why input of the password is required is because the setting of specified work for respective process is made not to be changed arbitrarily by operators, and any person in charge only who knows the password can perform the setting of specified work for respective processes.

In the dialog box 4044 setting of specified work for respective process is performed and set data are registered in the setting of specified work for respective process master table 3708*n* of process monitoring server 3300*a*. In the dialog box 4044 "number", "name of process", "displaying name of process", "examining staff" and "tab control" are set with corresponding each other.

At this point "displaying process" means a function that the process set in the displaying process, is made to be displayed on the inspection sheet according to the name of process, it enables the displaying of every process and the group indication of a plurality of processes. Because of change in the production, a division of production process becomes frequently necessary and the method of management with unit of the production process in the past can not deal with the situation, organization in a production block of process can be realized by the function of setting of specified work for respective process. Also "examining staff" is a data for control to automatically display or to register the "examining staff" in the inspection sheet according to the "displaying process" by the "automatic registration F8" key 4032.

At this time "tab control" means a function to set how a presentation (such as inspection sheet or name of unit) is performed in every production process. For example, when "inspection sheet" is set in the column for "tab control" in a name of production process, the data of "inspection sheet" are displayed in the client 3201 to 3208 of input system in which the production process is performed. By this arrangement the switching of display and non display of the "inspection sheet" or "name of unit" data can be realized.

The data which are set in this dialog box 4044 are registered in the setting of specified work for respective process master table 3708*n* of the process monitoring server 3300*a* by pushing down of the "registration" key 4044.

For example as shown in FIG. 109 when in a case "name of process" is "machine inspection 02" and "displaying process" of the specified work for respective process" which is corresponding to the "machine inspection 02" is "machine inspection 01", "examining staff" is "Ono" and "tab control" is the inspection sheet, the inspection sheet for machine inspection 01 (examining staff is "Ono") is displayed in the inspection sheet data input block 4050. And as shown in FIG. 110 when in a case "name of process" is "electrical inspection 02" and "displaying process" of the specified work for respective process" which is corresponding to the "electrical inspection 02" is "electrical inspection 02" and "electrical inspection 03", "examining staff" is "Domochi, Kobayashi" and "tab control" is the inspection sheet + unit, the inspection sheet for electrical inspection 02 and electrical inspection 03 (examining staff is "Domochi, Kobayashi") are displayed in the inspection sheet data input blow 4050 and at the same time the unit data input block is also displayed. When in a case "name of process" is "all", all the inspection sheet of inspection process arc displayed.

When in a case a item "start" is input in the "tab control" column, a production process which is assigned the "start" is recognized as the first production process and the data of "inspection sheet" is automatically displayed in the all screen display. That is to say the item "start" is made to be assigned to the first production process of the assembling process.

Figure 111:
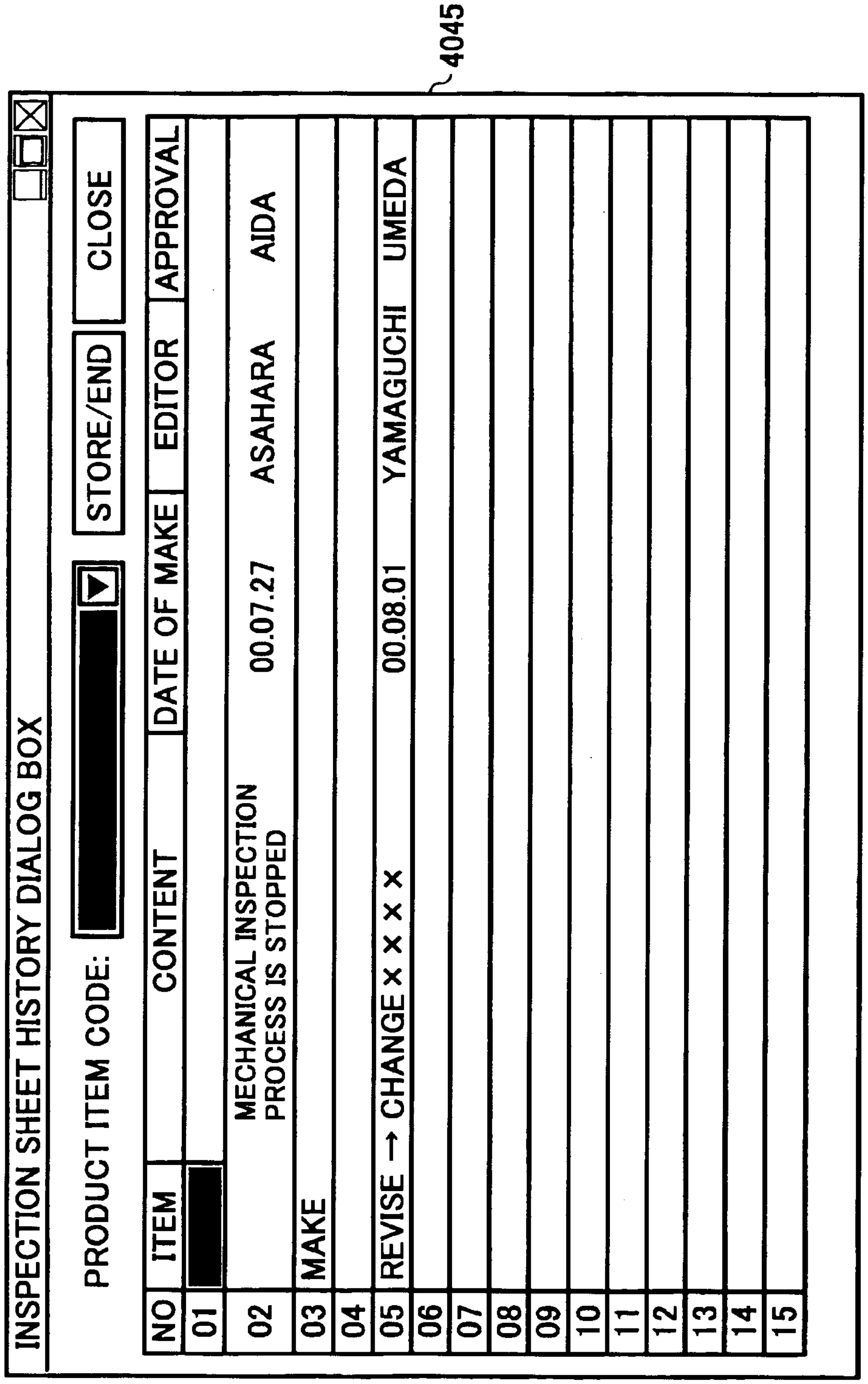
FIG. 111 is a diagram to explain an example of screen display in a inside the process data input process.

When an item "history of inspection sheet" is selected in the pull down menu 4015 shown in FIG. 104, the data history of inspection sheet in the history of revision of inspection sheet data table 3709*b* in the process monitoring server 3300*a* is downloaded And the read out data history of inspection sheet is displayed in a dialog box 4045 to confirm the history of revision for the inspection sheet as shown in FIG. 111.

Figure 97A:
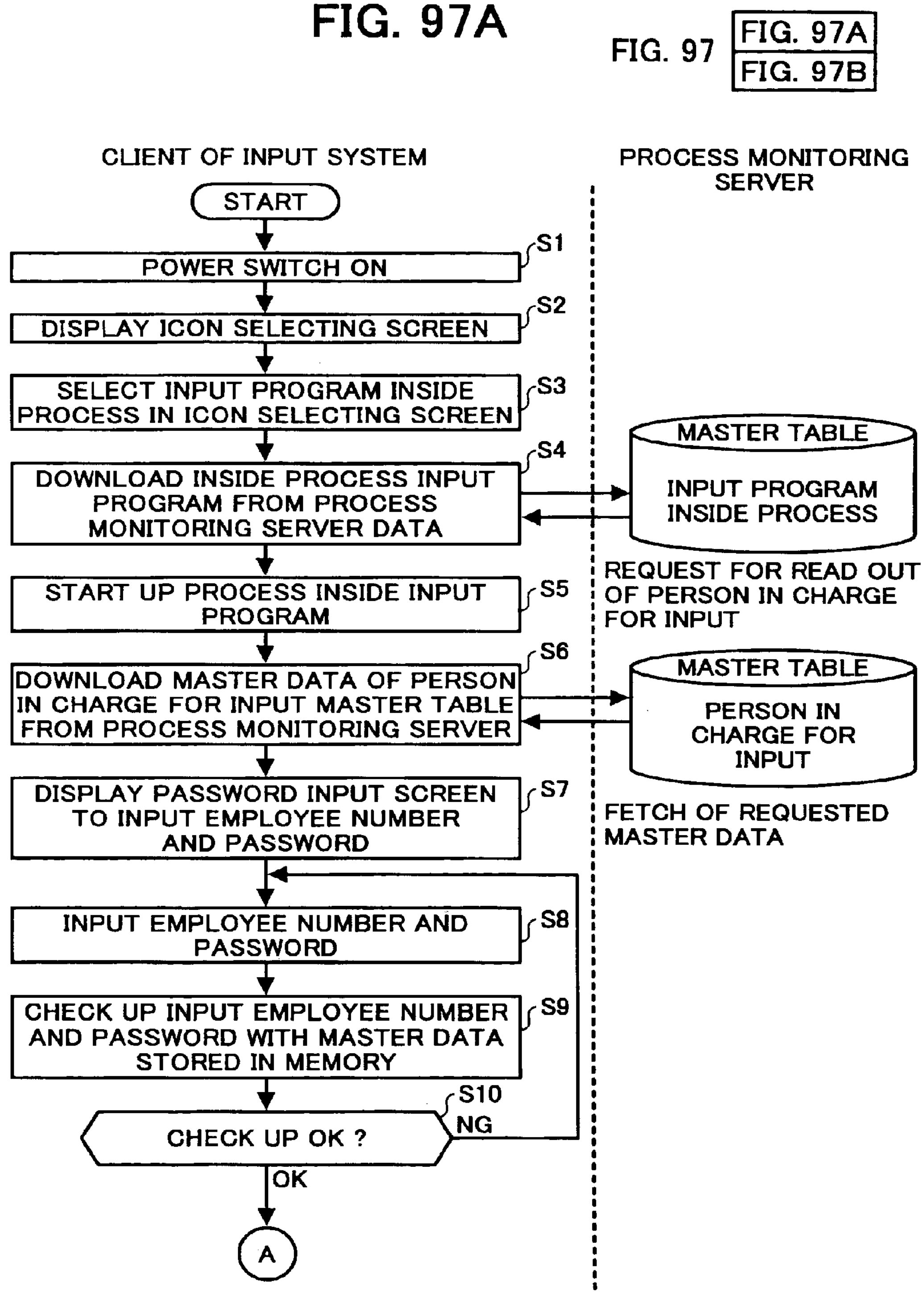
FIG. 97 is a flow chart to explain a process of data input inside the process of the client of input system.
Figure 97B:
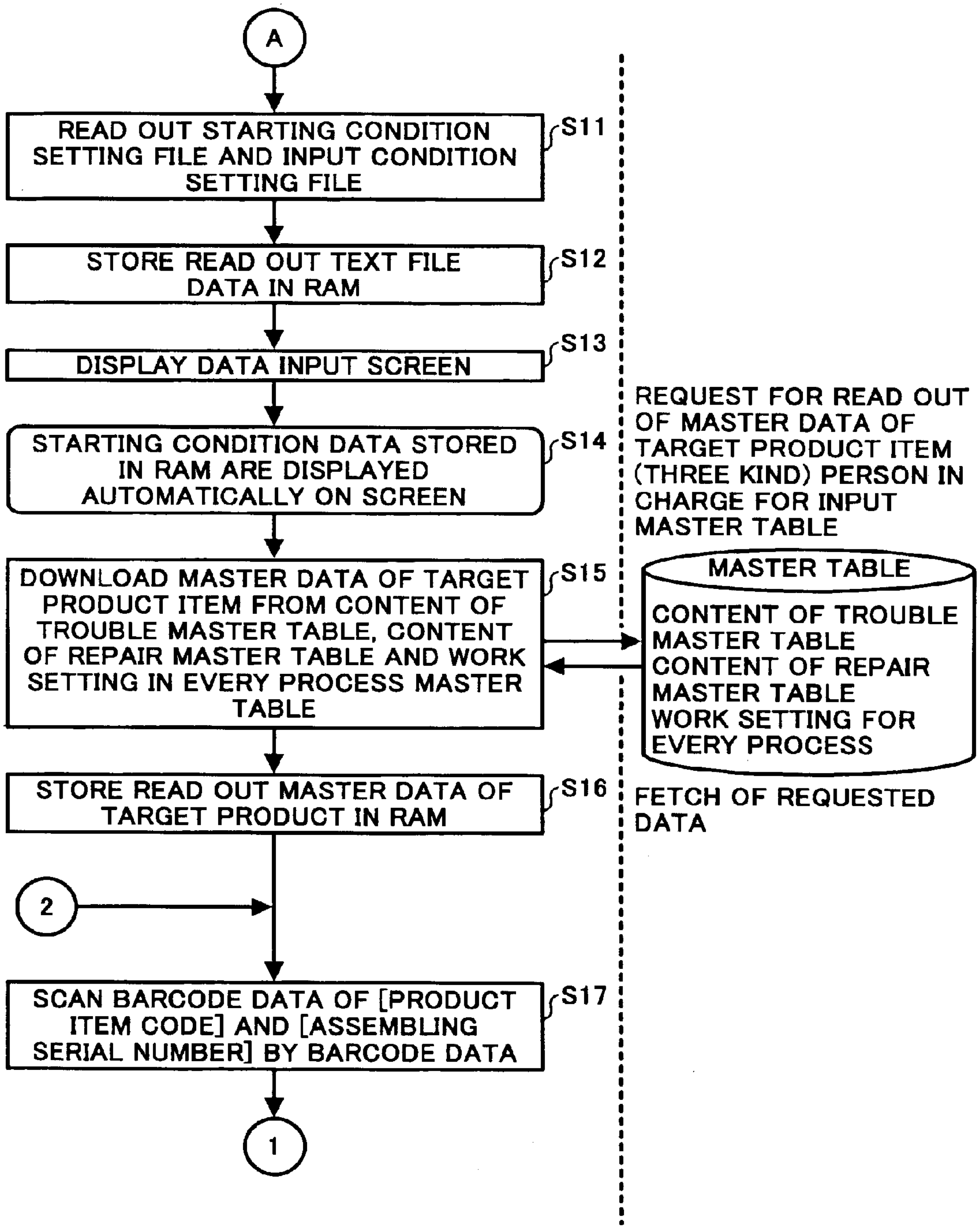
Figure 100:
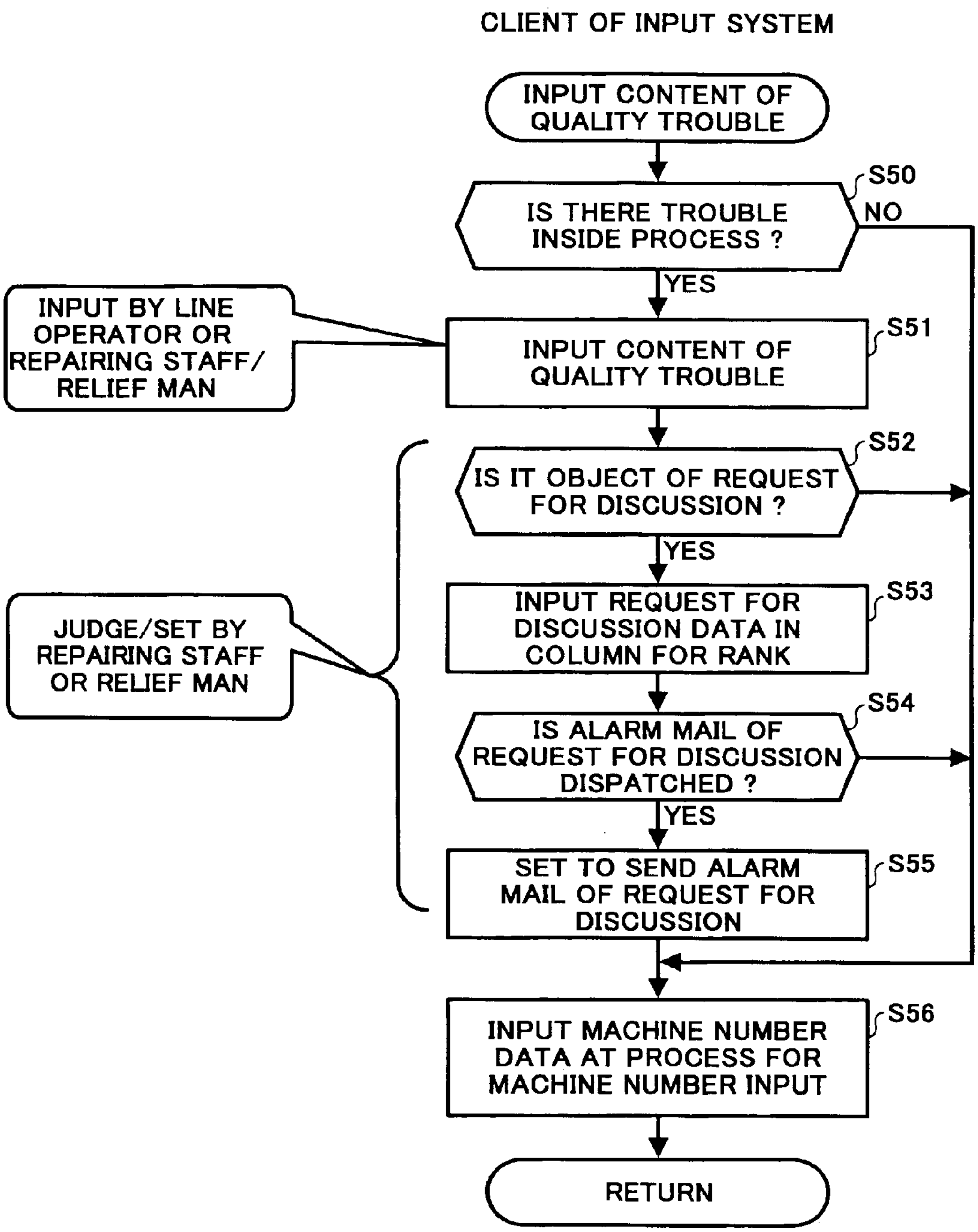
FIG. 100 is a flow chart to explain a process of data input inside the process of the client of input system.
Figure 101:
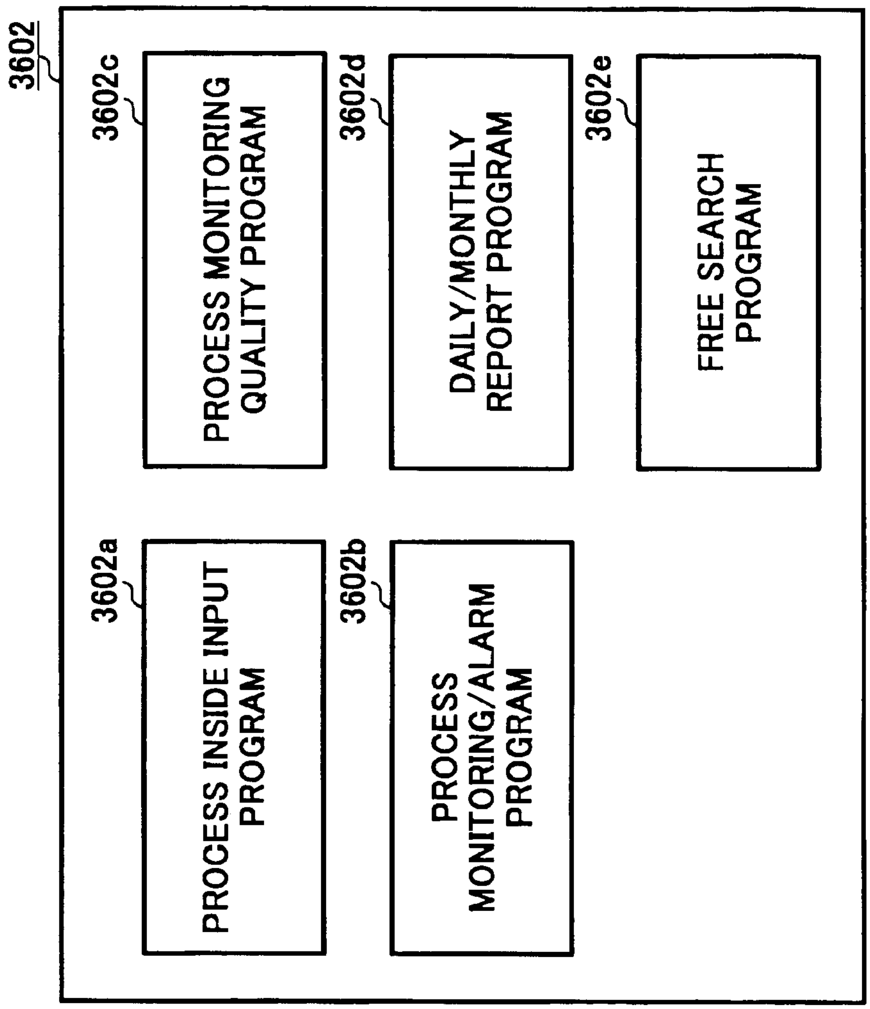
FIG. 101 is a diagram to explain an example of screen display in inside the process data input process.

Hereinafter the input process inside the process by the clients 3201 to 3208 will be described with reference to the flow chart shown in FIG. 97 to FIG. 100. In FIG. 97 respective operators of the input system (assembling processes 3101 to 3103, inspection processes 3104 to 3106, repairing process 3110, product inspection process 3111) turn on the power source for the respective clients 3201 to 3208 in the input system (step S1), the production management system client program 3707*b* stored in the recording media 3607 is fetched in the RAM 3605 and they are started to display on the display portion 3602 a selecting screen for icons such as shown in FIG. 101 (step S2). When the input program for inside the process 3707*c* is selected (step S3), the input program for inside the process 3707*c* is downloaded from the process monitoring Server 3300*a* to be stored in the RAM 3605 (step S4).

Figure 102:
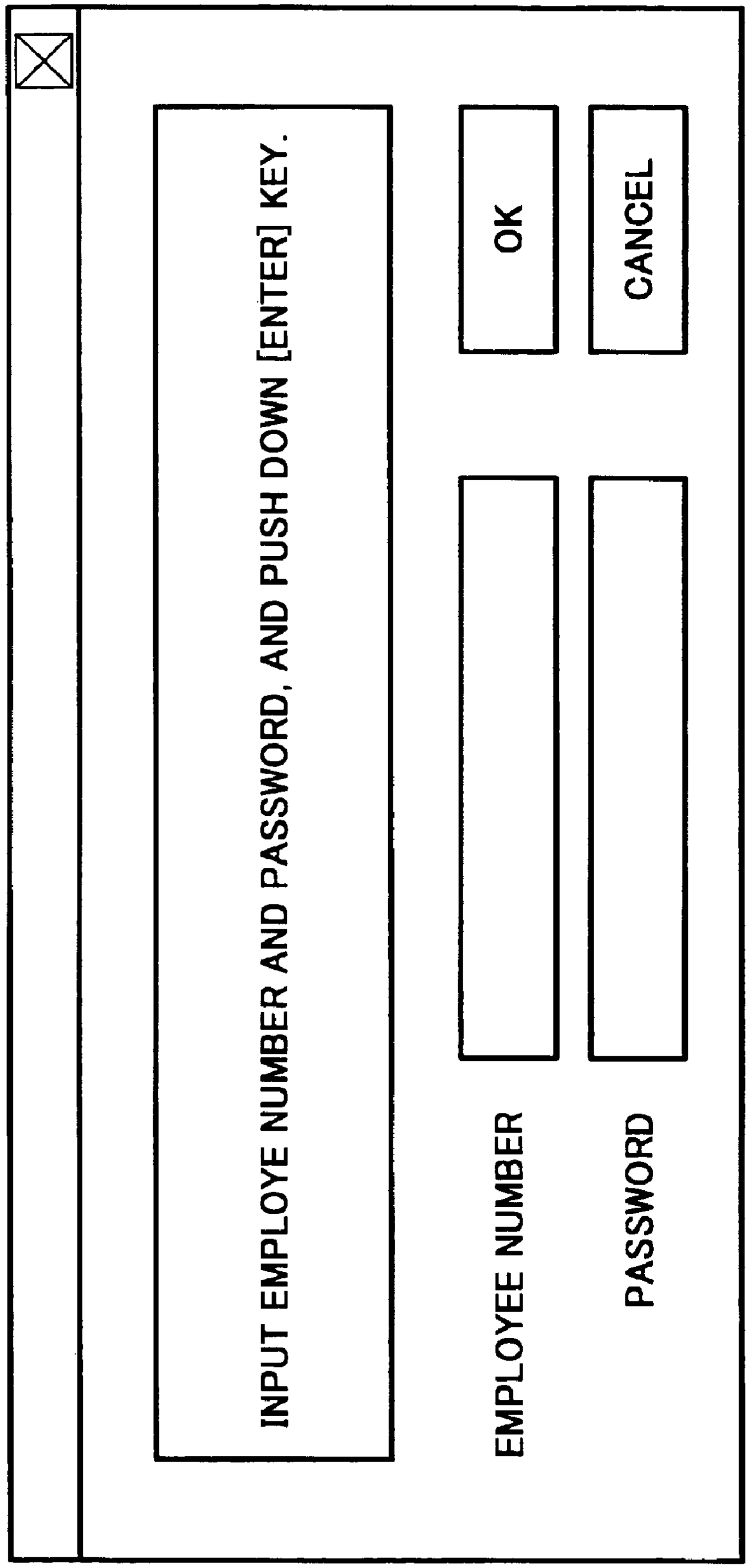
FIG. 102 is a diagram to explain an example of screen display in inside the process data input process.

And when the input program for inside the process 3707*c* stored in the RAM 3605 is started (step S5), a master data of a person in charge for input master table 3708*g* (employee number, name, password) is downloaded from the process monitoring server 3300*a* to be stored in the RAM 3605 (step S6). Then a password input screen is displayed in the display portion 3602 such as shown in FIG. 102 (step S7). In the password input screen shown in the same drawing, the columns to be input "employee number" and "password" are displayed. And the password and employee number are input by the operator (step S8).

The employee number and the password which are input by the operator are compared with the master data (password and employee number) of the "a person in charge for input" master table 3708*g* stored in the RAM 3605 (step 39), and the input employee number and password are judged if they are correct or not (step S10), when input employee number and password are correct, process is moved to the subsequent step S11 or when they are not correct process is moved back to step S8 to be input the employee number and password correctly.

In step S11 text file data (starting condition data, input condition data) of a starting condition setting file and an input condition setting file stored in the recording media 3607 are read out to be stored in the RAM 3605 (step S12). And a data input screen is displayed as shown in above described FIG. 103 (step S13), and at the same time the starting condition data of starting condition file which is stored in the RAM 3605, are displayed in columns of "factory name 4001", "step of production 4002", "line number 4003", product item name 4004" and "production process name 4005" respectively (step S14).

Then a master data of the target product item of the following master tables, the content of trouble master table 3708*u* (product item name, name of production process, number, item of trouble, content of trouble 1, content of trouble 2, content of trouble 3), the content of repairing master table 3708*i* (number, content of repairing 1, content of repairing 2, content of repairing 3) and the specified work for respective process master table 3708*n* (number, name of production process, displaying process, examining staff, tab control) are downloaded from the production process monitoring server 3300*a* (step S15), and the master data of the target product item which are downloaded, are stored in the RAM 3605 (step S16). After this a bar code data (product item code and assembling serial number) is read out from the bar code table which is attached to the assembled product by a bar code reader, to input in the display columns of "product item code 4007" and "assembling serial number 4008" (step S17).

Figure 98:
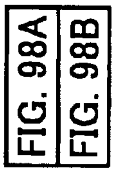
FIG. 98 is a flow chart to explain a process of data input inside the process of the client of input system.
Figure 98A:
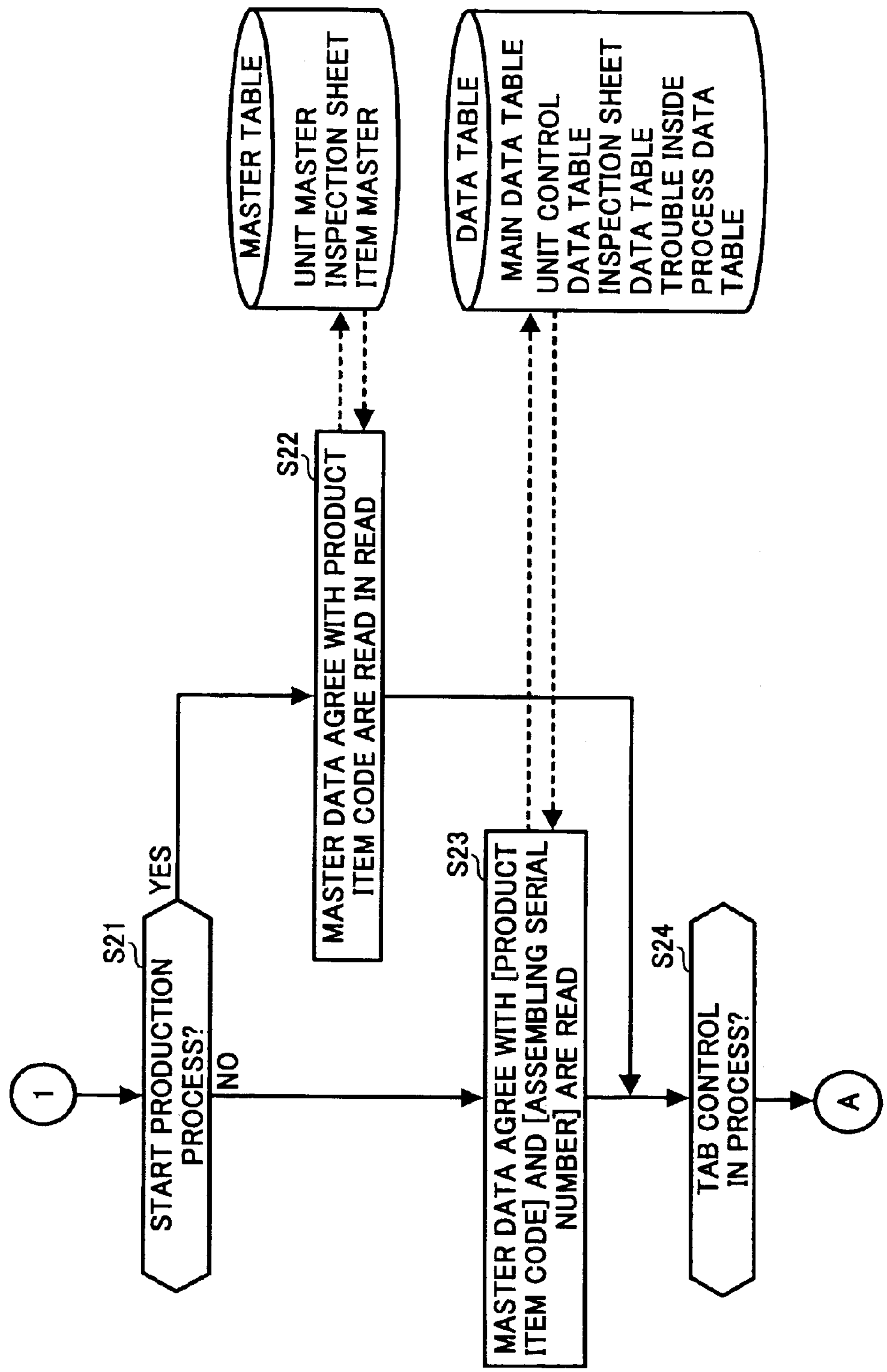
Figure 98B:
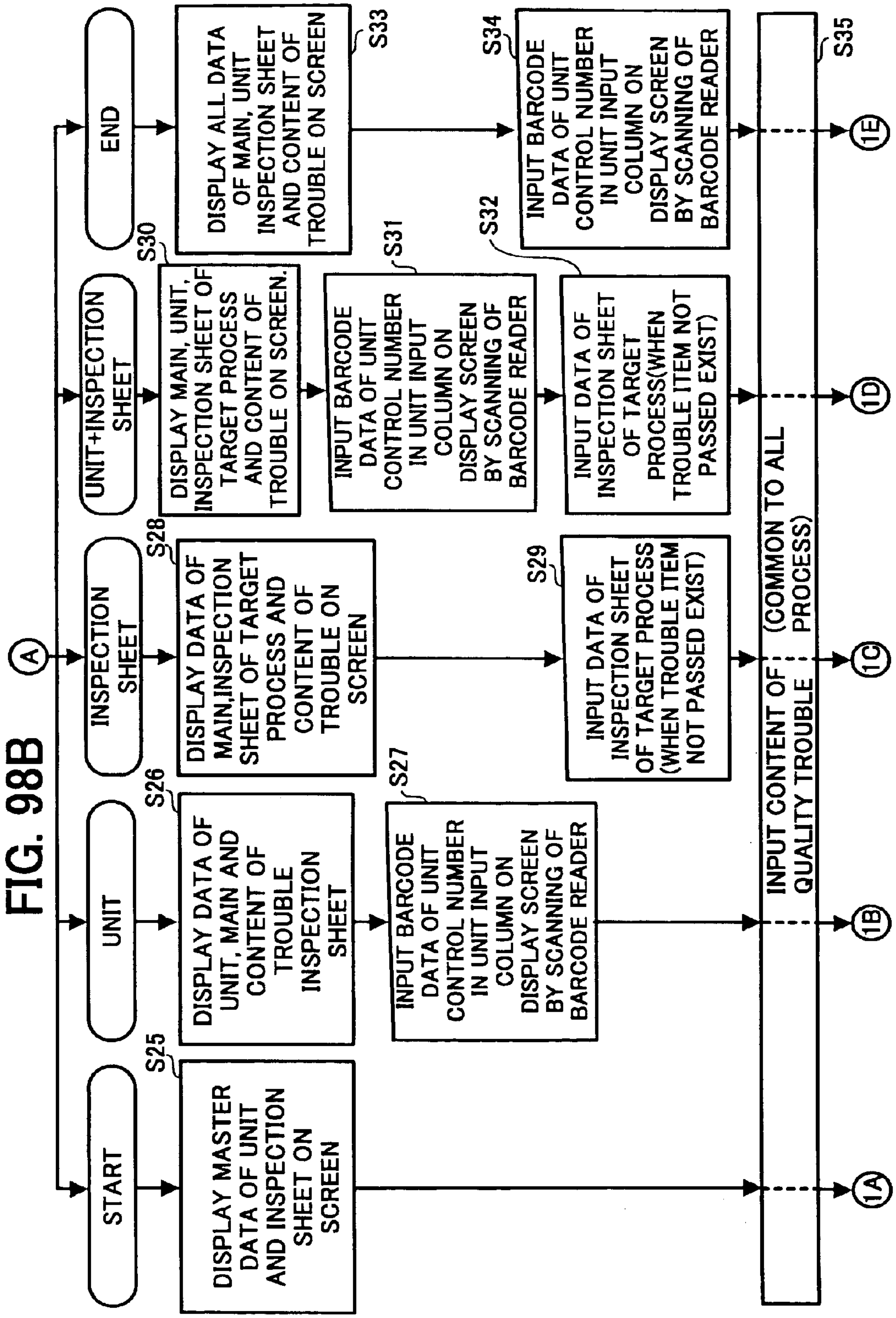
Figure 99A:
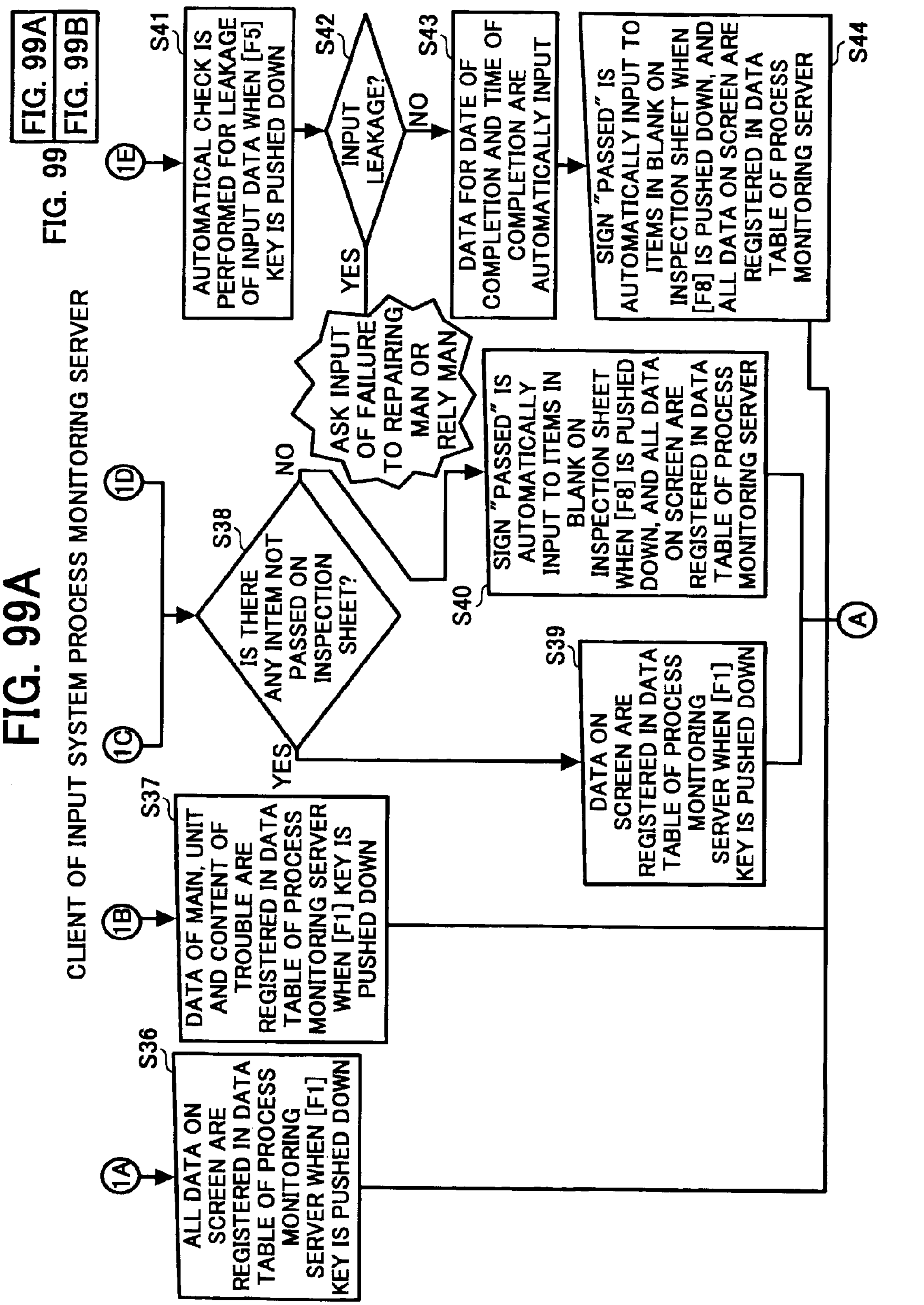
FIG. 99 is a flow chart to explain a process of data input inside the process of the client of input systems.
Figure 99B:
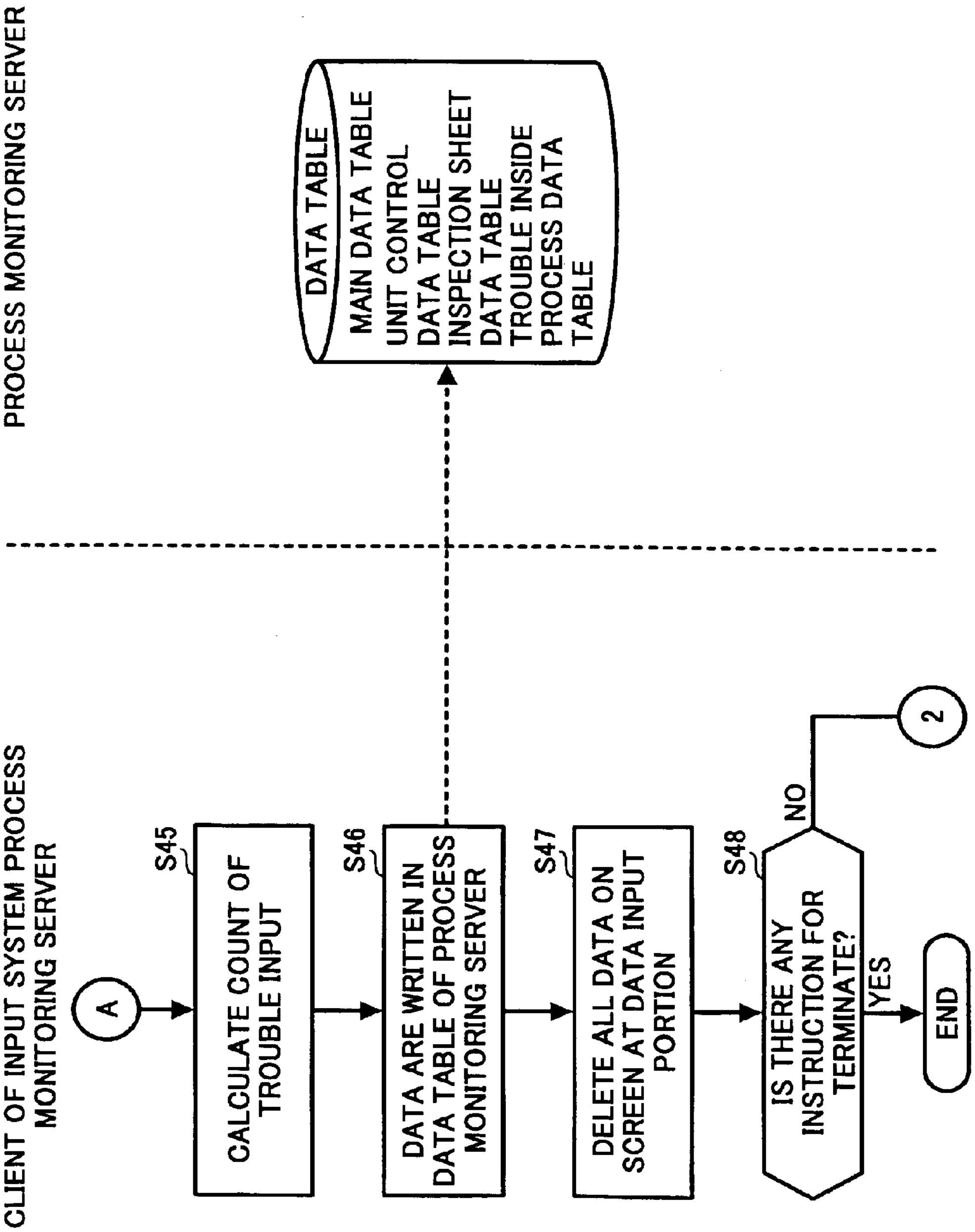

Then, in FIG. 98, a decision whether it is a start process or not with reference to the data "tab control" which is corresponding to the production process of their own machine (which is registered as the starting condition data of starting condition file) in the specified work for respective process master table 3708*n* which is stored in the RAM 3605 (step S21). As a result of this judgement, when in a case it is the start process, the master data which agrees with the product item code read from the unit master table 3708*q* (unit number, unit symbol, name of unit, classification of unit, product item code, presence of absence of unit inspection sheet) and item of inspection sheet master table 3708*p* (product item code, number, name of production process, inspection item, specification, type of input) of the process monitoring server 3300*a*, are downloaded to be stored in the RAM 3605 (step 322), and then system goes to step S24.

On the other hand, when in a case it is not the start process in the step S21, the master data which agrees with the "product item code" and "assembling serial number" input from the main data table 3709*d* (factory name, field of product, product item name, step of production, line number, product item code, assembling serial number, head number, product number, starting date of assembling, starting time of assembling, date of completion, time of completion, out of line flag, occurrence in market flag, date of input, count of quality trouble, count of something strange, count of no recurrence, remarks, date of latest revision), unit control number data table 3709*c* (assembling serial number, product item code, unit number, unit symbol, classification of unit, step of production process, unit name and unit control number), the inspection sheet data table 3709*i* (assembling serial number, product item code, inspection sheet connection, number, step of production process, name of production process, item of inspection, specification, judgement to completion, sign of re to inspection, type of input), and the quality trouble inside of the process data table 3709*f* (factory name, field of product, product item name, step of production, line number, product item code, assembling serial number, quality trouble serial number, product number, classification of trouble, count of recurrence, date of occurrence, time of occurrence, name of production process, item of trouble, content of trouble 1, content of trouble 2, content of trouble 3, out of line, something strange, responsible department 1, responsible department 2, responsible department 3, no recurrence, cause of trouble, content of repairing 1, content of repairing 2, content of repairing 3, date of repairing, time of repairing, person in charge for repairing, content of prevention of recurrence, date of corrective action, time of corrective action, person in charge for corrective action, date of latest revision) of the process monitoring server 3300*a*, are downloaded to be stored in the RAM 3605 (step S23), and then system goes to step S24.

In step S24 data of "tab control" in the specified work for respective process master table 3708*n* stored in the RAM 3605 corresponding to the production process which is set to their own machine, is judged. When in a case the "tab control" is the "start process", the system moves to step S25, the master data of item of inspection sheet master table 3708*p* which are stored in the RAM 3605 are displayed in the inspection sheet data input block 4050, and at the same time the master data of unit name master table 3708*q* stored in the RAM 3605 are displayed in the unit data input block 4051 (step S25). Then a content of quality trouble is input to the content of trouble data input block 4020 (step S35), the "registration F1" key 4031 is pushed down to register all the input data which are displayed on the display screen to a corresponding data table of process monitoring server 3300*a* (step S36), and the system moves to step S45. To be more precise the data input in the main data input block 4011 and content of trouble data input block 4020 are registered in the content of trouble master table 3708*u*.

Figure 114:
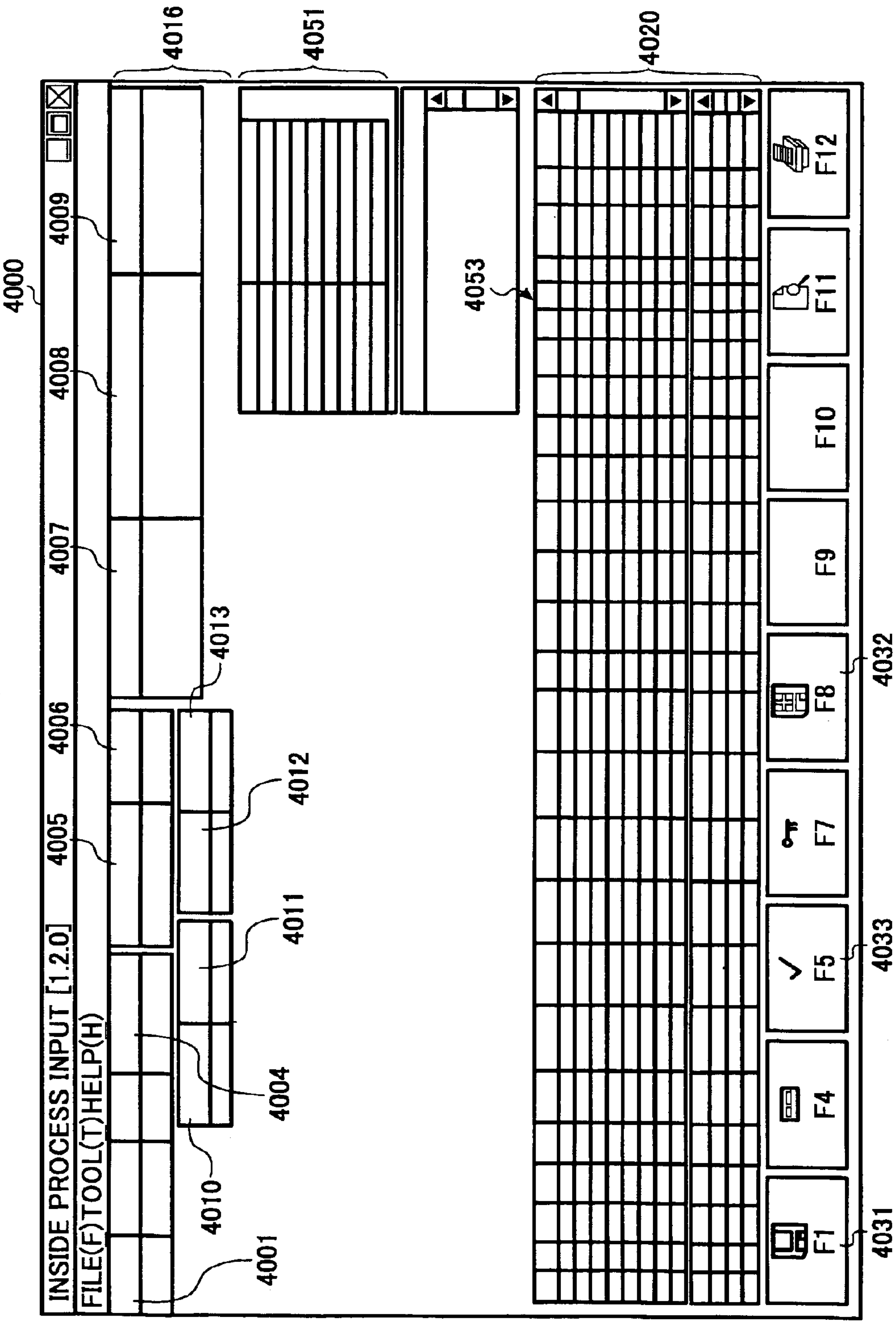
FIG. 114 is a diagram to explain an example of screen display in inside the process data input process.

At this point when in a case the "tab control" is "unit", the master data of main data table 3709*d* stored in the RAM 3605 are displayed in the main data input block 4016, the master data of unit data table 3709*k* stored in the RAM 3605 are displayed in the unit data input block 4051 and the master data of quality trouble inside of the process data table 3709*f* stored in the RAM 3605 are displayed in the content of trouble data input block 4020, respectively (step S26). FIG. 114 shows the sample of screen display of this case, and in the drawing the unit data input block 4051 is displayed Then the bar code data of "unit control number" which is attached to the unit is read out at the item code input column of unit data input block 4501 on the screen by the bar code reader to be input (step S27).

Next the content of trouble is input on the content of trouble input block 1020 (step S35). In the next place "F1" key is pushed down to register the data which are displayed in the all of main data block 4016, the unit data input block 4051 and the content of trouble data input block 4020 in the corresponding data tables of process monitoring server 3300*a* (step S37), the system moves to step S44. To be more precise the data which are input on the main data input block 4016 and the unit data input block 4051 are registered in the unit data table 3709*k*, and the data which are input on the main data input block 4016 and the content of trouble data input block 4020 are registered in the content of trouble master table 3708*u*.

Figure 115:
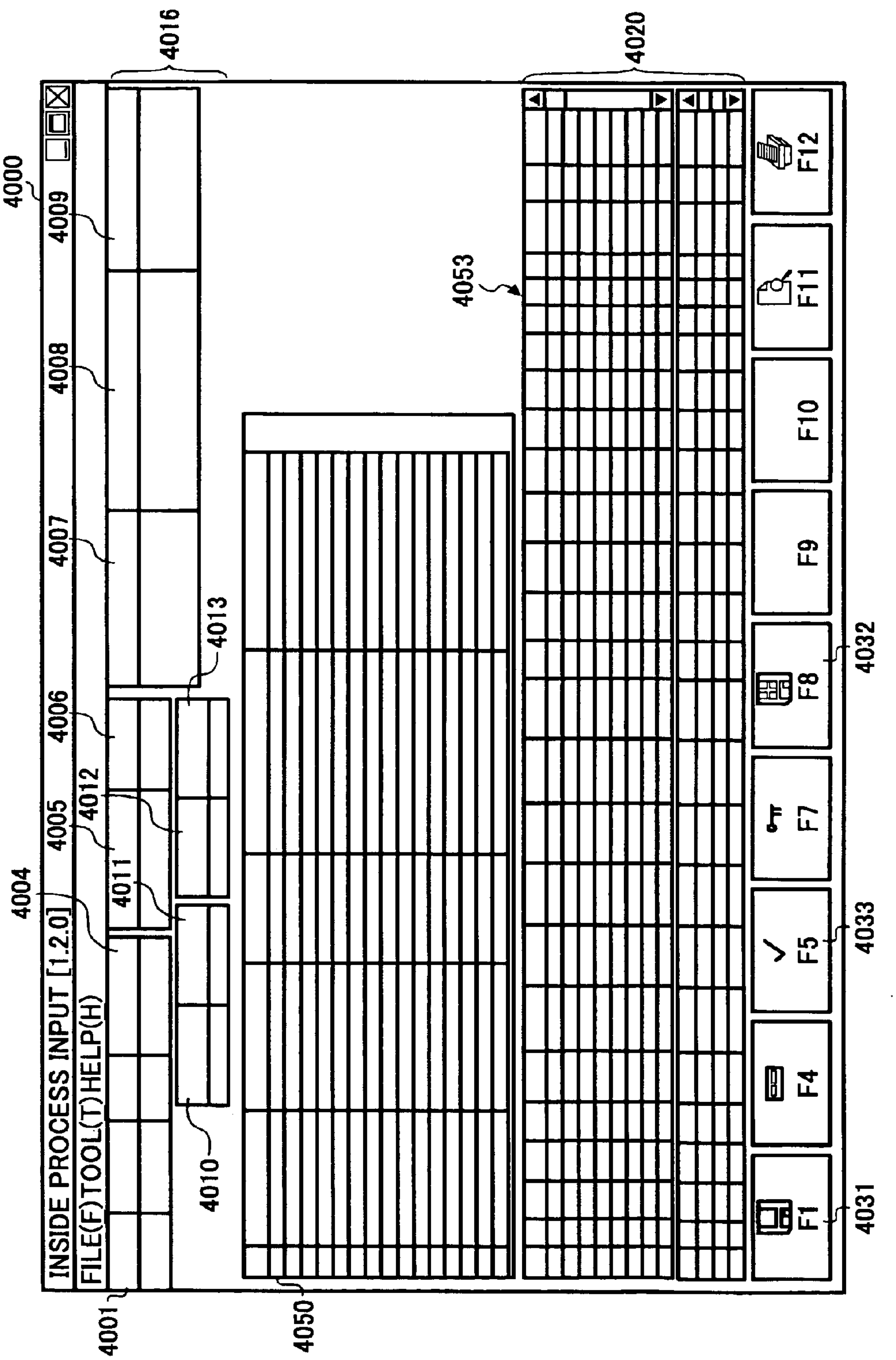
FIG. 115 is a diagram to explain an example of screen display in inside the process data input process.

At this point when in a case the "tab control" is "inspection sheet" in the step S24, the master data fetched from the main data table 3709*d* are displayed in the main data input block 4016, the data of inspection sheet of the target process of inspection sheet data table 3709*i* stored in the RAM 3605 are displayed in the inspection sheet data input block 4050, and the data of quality trouble inside of the process data table 3709*f* stored in the RAM 3605 are displayed in the content of trouble data input block 4051, respectively (step S28). FIG. 115 shows the example of display screen of this case the inspection sheet data input block 1050 is displayed. At this point if there is any item which is not acceptable, the data for inspection sheet of the target process are input in this content of trouble data input block 4051. This inspection sheet is used only when any item of trouble exists, and if all data is acceptable no input is performed for the inspection sheet. As will be described later, "acceptable" is automatically input to the entire blank column.

In next, the data of content of trouble is input in the content of trouble data input block 4020 (step S35). Then a decision is made if there is any unacceptable item in the data of inspection sheet in the inspection sheet data input block 4050 (step S38), in case when unacceptable item is displayed "registration F1" key 4031 is pushed down to register the data displayed on the screen in the corresponding data table of the process monitoring server 3300*a* (step S39), and system moves to step S44. On the other hand in case when no unacceptable item is displayed in the step S38, "Automatic registration F8" key 4032 is pushed down to input "acceptable" in all items which have not yet been input, of the inspection sheet in the inspection sheet data input block to register all the data displayed in the screen to corresponding data table of process monitoring server 3300*a* (step S40), and the system moves to step S45. To be more precise the data input in the main data input block 4016 and the inspection sheet data input block 4050 are stored in the inspection sheet data table 3709*i*.

When "tab control" is "unit +inspection sheet" in the step S24, the data of main data table 3709*d* stored in the RAM 3605 are displayed in the main data input block 4016, the data of the target process of inspection sheet data table 3709*i* stored in the RAM 3605 are displayed in the inspection sheet data input block 4050, and the data of quality trouble inside of the process data table 3709*f* stored in the RAM 3605 are displayed in the content of trouble data input block 4051, respectively (step S30). FIG. 112 shows the example of display screen of this case, unit data input block 4051 and the inspection sheet data input block 4050 is displayed.

Then the bar code data of "unit control number" which is attached to the unit is read out at the item code input column of unit data input block 4051 on the screen by the bar code reader to be input (step S31). At this point if there is any unacceptable item, the data of inspection sheet for the target process of inspection sheet data input block 4050 are input (step S32). And then the content of trouble is input in the content of trouble data input block 4020 (step S35).

In the next a decision is made if there is any unacceptable item in the data of inspection sheet in the inspection sheet data input block 4050 (step S38), in case when unacceptable item is displayed "registration F1" key 4031 is pushed down to register the data displayed on the screen in the corresponding data table of the process monitoring server 3300*a* (step S39), and system moves to step S44. To be more precise the data which are input on the main data input block 4016 and the content of trouble data input block 4020 are registered in the content of trouble master table 3709*u*, and the data which are input on the main data input block 4016 and the inspection sheet data input block 4050 are registered in the inspection sheet data table 3709*i*, and further the data which are input on the main data input block 4016 and the unit data input block 4051 are registered in the unit data table 3709*k*.

On the other hand, when no unacceptable item is there in the inspection sheet data in the step S38, "Automatic registration F8" key 4032 is pushed down to input "acceptable" in all items which have not yet been input, of the inspection sheet in the inspection sheet data input block to register all the data displayed in the screen to corresponding data table of process monitoring server 3300*a* (step S40), and the system moves to step S45.

At this point, when in a case the "tab control" is "end" in the step S24, the main data of the main data table 3709*d* stored in the RAM 3605 are displayed in the main data input block 4016, the data of inspection sheet of the target process of inspection sheet data table 3709*i* stored in the RAM 3605 are displayed in the inspection sheet data input block 4050, and the master data of quality trouble inside of the process data table 3709*f* stored in the RAM 3605 are displayed in the content of trouble data input block 4051, respectively (step S33).

Data of inspection sheet for the target process are then input in the inspection sheet data input block 4050 (step S34). Next the content of trouble is input in the content of trouble data input block 4020. Then the "completion F5" key 4083 is pushed down (step S41) and a decision is made if there is any leakage of input (step S42), in case when there is any leakage of input a corrective action for leakage of input is requested to a repairing staff and a mending staff (person who takes care of trouble happened in the production process). On the other hand, when there is no leakage of input, the data of completion date is automatically input to the "date of completion 4012" and at the same time the data of completion time is automatically input to the "time of completion 4013" (step S43). And "automatic registration F8" key 4032 is pushed down to input "acceptable" in all items which have not yet been input, of the inspection sheet to register all the data displayed in the screen to corresponding data table of process monitoring server 3300*a* (step S44), and the system moves to step S45.

In step S45, the data related to the quality trouble input in the content of trouble data input block 4020 are counted in the content of quality trouble, for example, count of something strange, count of no recurrence, count of entreatement as information, count of all quality trouble and so on, are calculated and they are registered (overwritten) in the corresponding portion of main data table 3709*d* in the process motoring server 3300*a* utilizing items of the step of production, the item code and the assembling serial number as keys (step S45).

Then, the input data which are displayed on the display screen are erased and the system moves to step S48, and if there is no instruction for termination of the program, system goes back to the step S17 in FIG. 97, and operation of input for subsequent product to be assembled is continued to input the product item code and the assembling serial number.

Hereinafter, the input operation of content of trouble in the step S35 will be described in further detail with reference to the flow chart shown in FIG. 100. In FIG. 100 at first a decision if there is any quality trouble or not is made (step S50), and when in case there is no quality trouble the system moves to step S56. On the other hand, in case when there is any quality trouble the system moves to step 851, and the content of quality trouble is input to the content of trouble data input block 4020 by an operator of the line, repairing staff or mending staff (step S51). And a decision if the trouble is target to request corrective action or not by the operator, repairing staff or mending staff (step S32), and in case when the trouble seems to be not object the system moves to the step S56. On the other hand, in case when the trouble is an object to request the corrective action, the system moves to the step S53 and a data "request for corrective action" is input in the rank column 4053 of the content of trouble data input block 4020. A decision if request for the corrective action must be mailed in the alarm mail or not is made (step S54), and in case when the alarm mail is not sent the system moves to step S56. On the other hand when in case the alarm mail must be sent, the item "dispatch alarm mail" is set and moves to step S56. At this point when the item "dispatch alarm mail" is set, the mail dispatch flag in the quality trouble inside of the process data table 3709*f* is set as "1 (object to be sent)". In step S56 after the product item data in the process corresponding to the product item input, the system is returned and this subroutine is terminated.

At this point to append, to delete and to change items of inspection item, specification, type of input in the item of inspection sheet master table 3708*p* can be performed any time because of client 3600 of the management system. The history of revision for the item of inspection sheet master table 3708*p* is stored in the inspection sheet revision history data table 3709*d*. The content of data stored in the inspection sheet revision history data table 3709*d* can be confirmed by other respective clients.

As above described, when the "tab control" of the specified work for respective process master table 3708*m* is "start (first production process)", inspection items of the inspection sheet item master table 3708*p* are displayed as the inspection sheet (See step S22 and step S25). The inspection items and so on of displayed inspection sheet are stored in the inspection sheet item data table 3709*i* (See step S36), the data and the inspection items of the inspection sheet item data table 3709*i* are displayed in the inspection sheet in the subsequent process (See step S23 and S28), the inspection sheet into which data are input in the process is registered in the inspection sheet item data table 3709*i* (See step S39 and S40), the same process is repeated till the last process. In consequence, the same inspection items of the same inspection sheet item master table 3708*p* is used for an product to be assembled from the first production process to the last production process (until the completion). That is to say, the result of to append, to delete and to change the inspection items, specification and type of input in a inspection sheet item master table 3708*p*, will be reflected and effective to the next product to be assembled. By this arrangement, even when the inspection sheet item master table 3709*i* is revised at any time, any trouble does not happen in the next production process.

[Process Monitoring and Alarm Process by Client of Output System]

A process monitoring and alarm process by the clients 3501 to 3503 of the output system will be described with reference to the examples of screens shown in FIG. 122 to FIG. 140 in accordance with the flow charts shown in FIG. 116 to FIG. 121. FIG. 116 to FIG. 121 are flow charts to explain the process monitoring and the alarm process by clients 3501 to 3503 of the output system, FIG. 122 to FIG. 140 are examples of screen display in the process monitoring and the alarm process.

The process monitoring and alarm process are processes in those the request of search are output from the respective clients 3501 to 3503 to the process monitoring server 3300*a* in the respective inspection department 3401, parts inspection department 3402 and the manufacturing technology department 3403, and the resulted searched data from the process monitoring server 3300*a* are processed in time series to be displayed.

Figure 122:
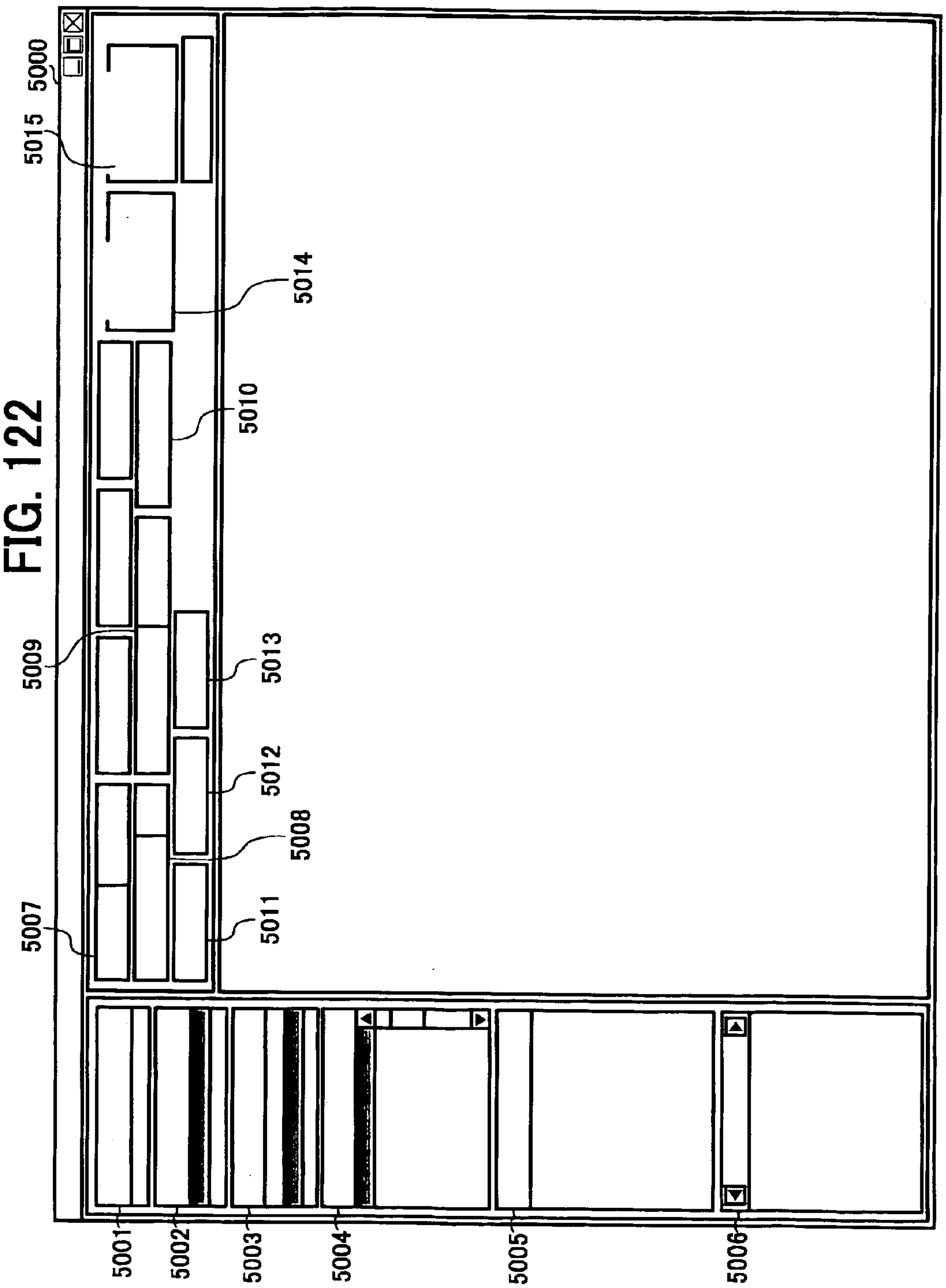

FIG. 122 shows one example of display screen 5000 when the process monitoring/alarm program 3707*d* is started. In the drawing, the reference numeral 5001 designates a key to display a period in which the data of selected product item exist. When the key 5001 is pushed down, the period of data existing of the selected product item is displayed The reference numeral 5002 designates a field of product selecting box to select [field of product] to be searched, 5003 designates a product item selecting box to select [product item] to be searched, 5004 designates a product item code selecting box to select [product item code] to be searched, 5005 designates a kind of output selecting box to select the kind of output. The kind of output is selected from "quality record information of production of the day", "situation of occurrence by production process", "situation of occurrence by item of trouble ", "situation of occurrence by responsible department", "situation of occurrence by rank", "situation of out of line/release", and "situation of occurrence by content of trouble" which are displayed in the kind of output selecting box 5105.

At this point, the "quality record information of production of the day" is an information to understand a quality record, a difference from the target value and a variation. The "situation of occurrence by production process" is an information to understand a transition and a tendency of situation of occurrence on the basis of respective production process. The "situation of occurrence by item of trouble "is an information to understand a transition and a tendency of situation of occurrence on the basis of respective item of trouble. The "situation of occurrence by rank" is an information to understand a transition and a tendency of situation of occurrence on the basis of respective rank The "situation of out of line/release" is an information to understand a transition and a tendency of situation out of line and release of it. The "situation of occurrence by content of trouble" is an information to understand a transition and a tendency of situation of occurrence of trouble on the basis of respective content of trouble. This kind of output (object of output) item can be selected in any time before or after the data search has been performed.

Reference numeral 5006 designates a calendar to select "date" of the data to be searched Reference numeral 5007 designates a column to select "date" of information to be searched. The designation of "date" for the information to be searched can be selected from any one of the calendar 5006 and the date designating column 5007. Reference numeral 5008 designates a [search period] key to select the search period of data, 5009 designate a [setting alarm condition] key to set the alarm condition, 5010 designates a alarm condition confirmation key to confirm the alarm condition, 5011 designates a [search condition] key to perform the search, 5012 designates a [spread sheet software expansion] key to expand the searched result in the spread sheet software, 5013 designates a [print] key to print the data displayed on the screen, 5014 designates an alarm setting column to select generation or no generation of the alarm. Reference numeral 5015 designates a criterion of display column and by which it is decided that display of information is performed on the basis of "date of trouble occurrence" or "date of product completion". The setting of this criterion of display 5015 can be achieved in any time before or after the data search has been performed.

Figure 123:
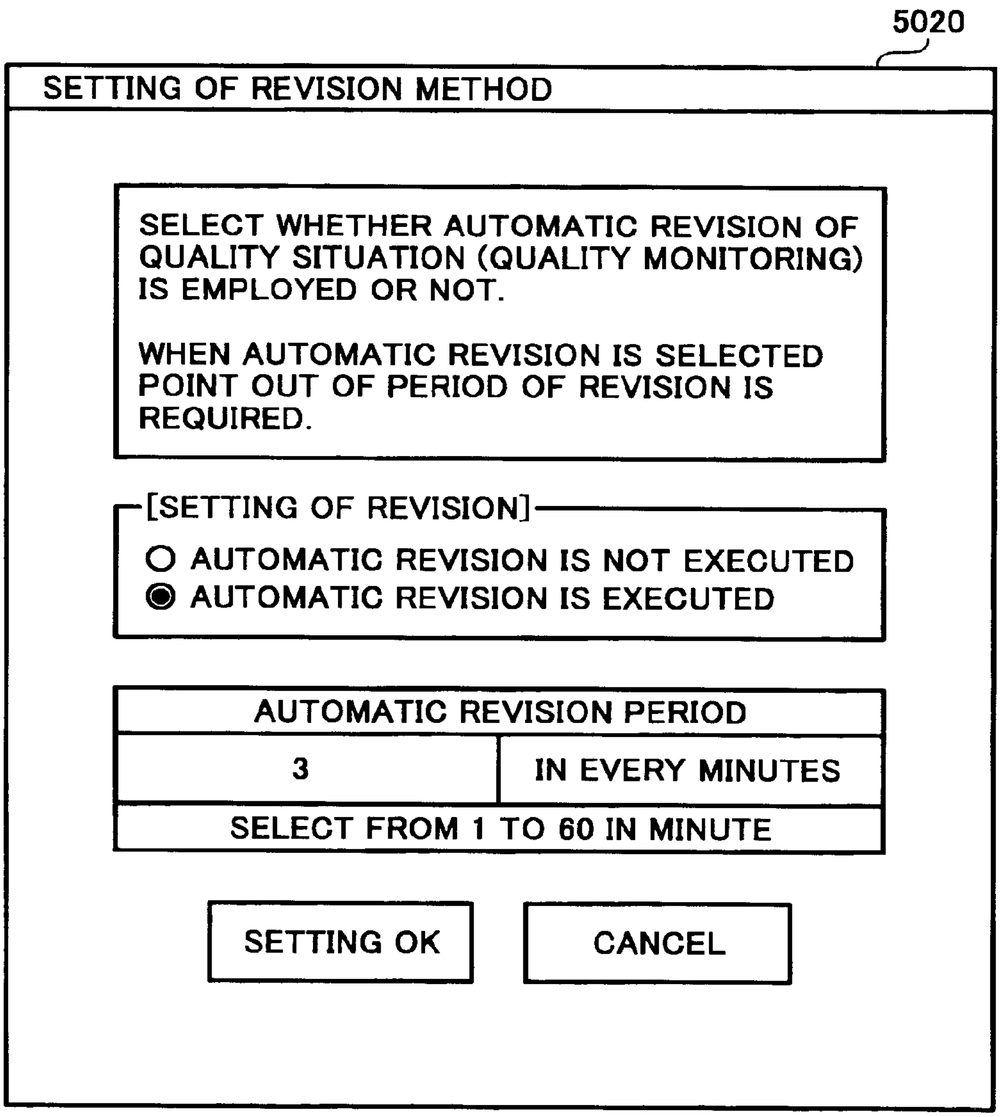

When the above described [search period] key 5008 is selected, a sub screen 5020 is displayed and overlaid on the screen shown in FIG. 122 to set a method of revision shown in FIG. 123. In this sub screen 5020 it is selected if a search of information is automatically renewed, and it is selected also how long period of time the renewal is achieved in minutes when in case the automatic renewal is performed. At this point the term automatic renewal means a function that the system searches information and displays the latest result on the screen automatically in every a predetermined period of time even though the execution of search key 5011 is not pushed down. In the example shown in the drawing "execute automatic renewal" is selected as the setting of renewal method, "in every minute" is selected as the period of renewal. As this example, when in a case tie automatic renewal in every minute is selected, the request for search of information is output in every minute from the clients 3501 to 3503 of the output system to the process monitoring server 3300*a*, and resulted searched data are transferred in every minute from the process monitoring server 3300*a* and the quality data are renewed.

Next a method to set the alarm will be described There are two kind of alarms as the alarm such as an individual alarm and a common alarm (for important problem). The common alarm is used to accelerate an improvement in a problem regarding to quality, and the individual alarm is used for the improvement of quality, the confirmation of quality, the confirmation of corrective action and the confirmation of effect of the improvement in quality in the respective department.

Figure 124A:
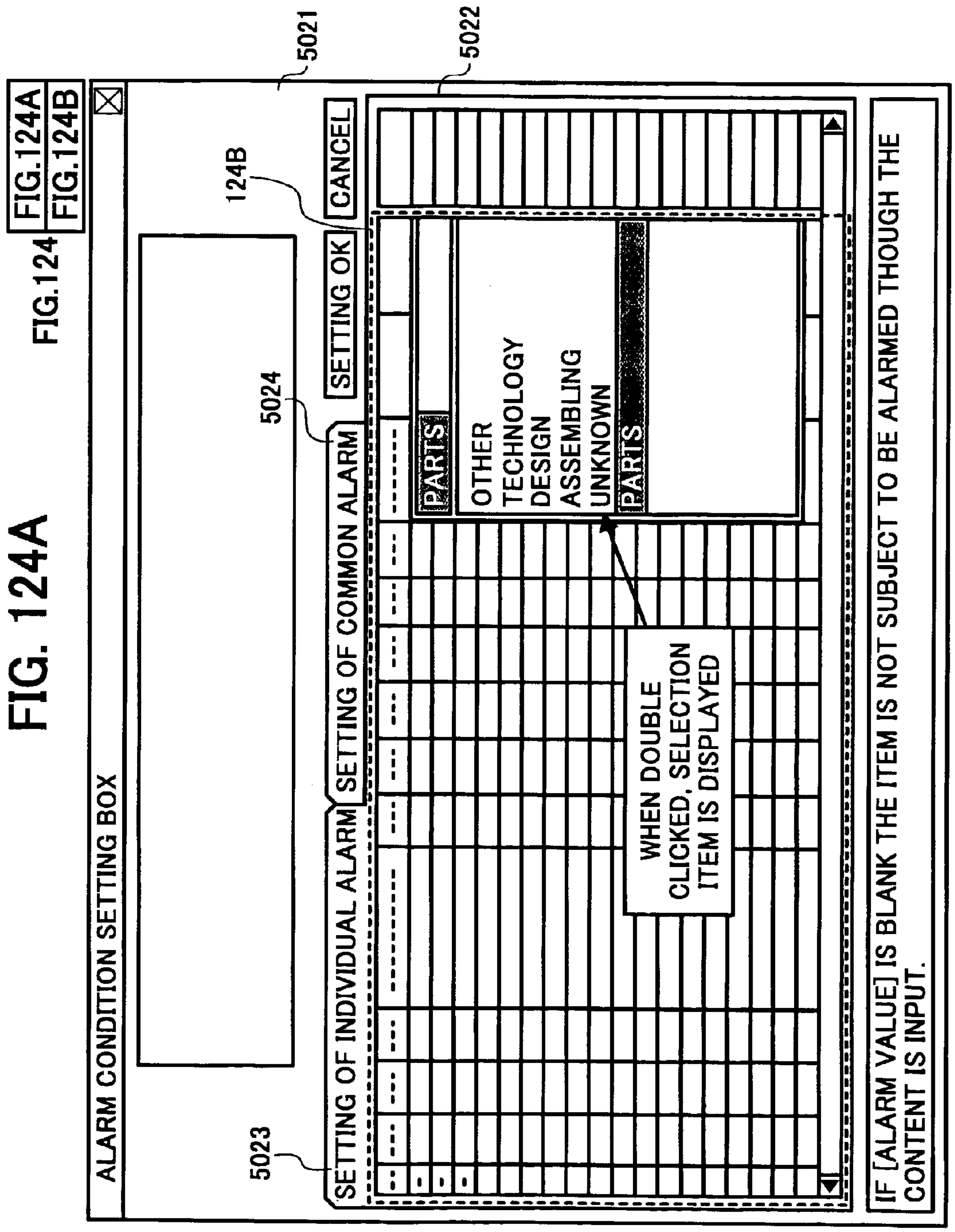
Figure 124B:
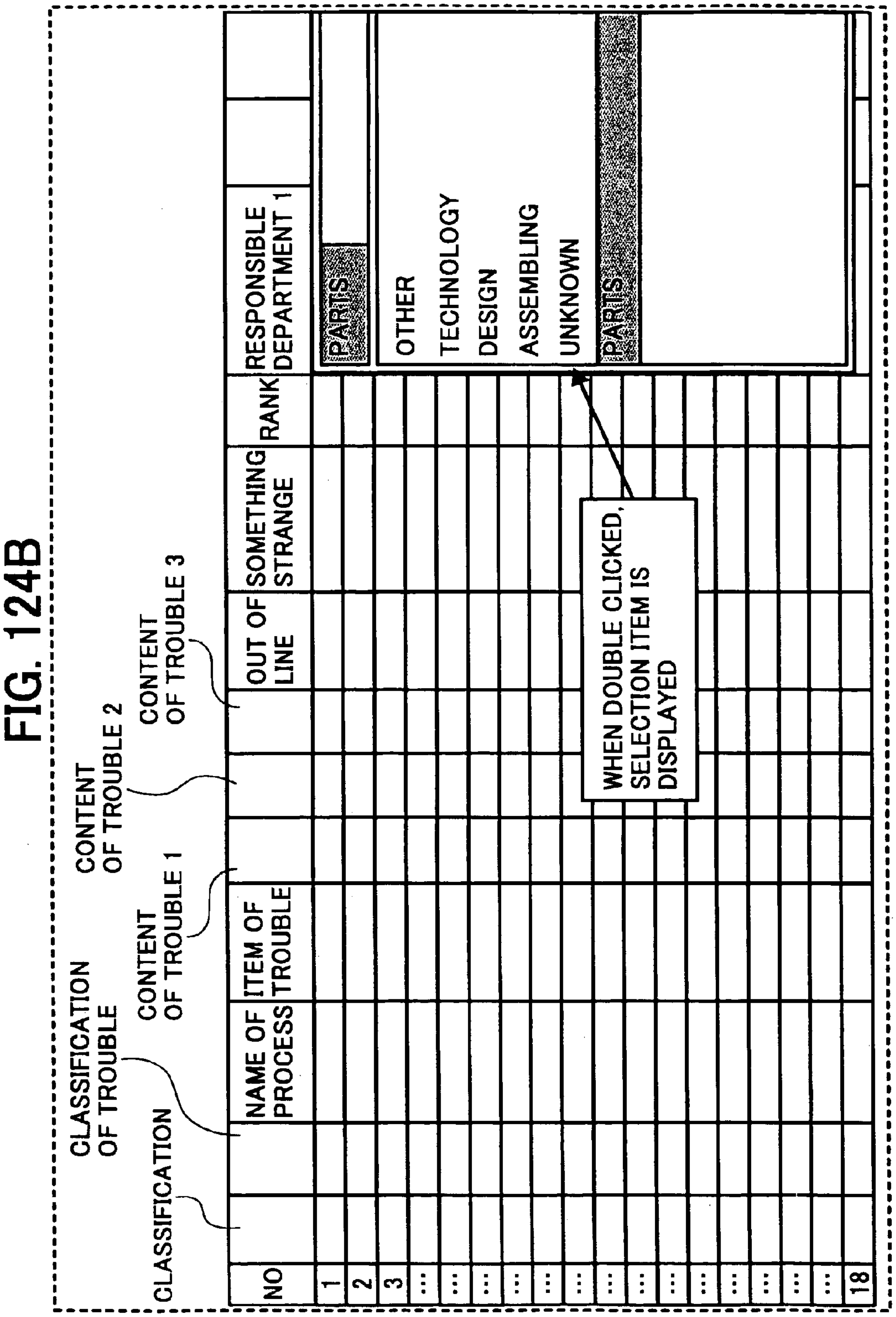

When the alarm condition setting key 5009 is selected in the screen shown in FIG. 122, for example, an alarm condition setting guidance screen 5021 shown in FIG. 124 is displayed. In the drawing the reference numeral 5023 designates the [individual alarm setting] key to set the individual alarm, 5024 designates the [common alarm setting] key to set the common alarm. In FIG. 124 a case is shown in that the [individual alarm setting] key 5023 is selected and a column 5022 to set the individual alarm is displayed When the alarm condition (item of alarm, standard for alarm) and the alarm value are input in the column 5022 to set the individual alarm and a "setting is OK" button is pushed down by the operator, the setting of individual alarm is completed, and the data which are set are stored in the recording media 3607.

Figure 125A:
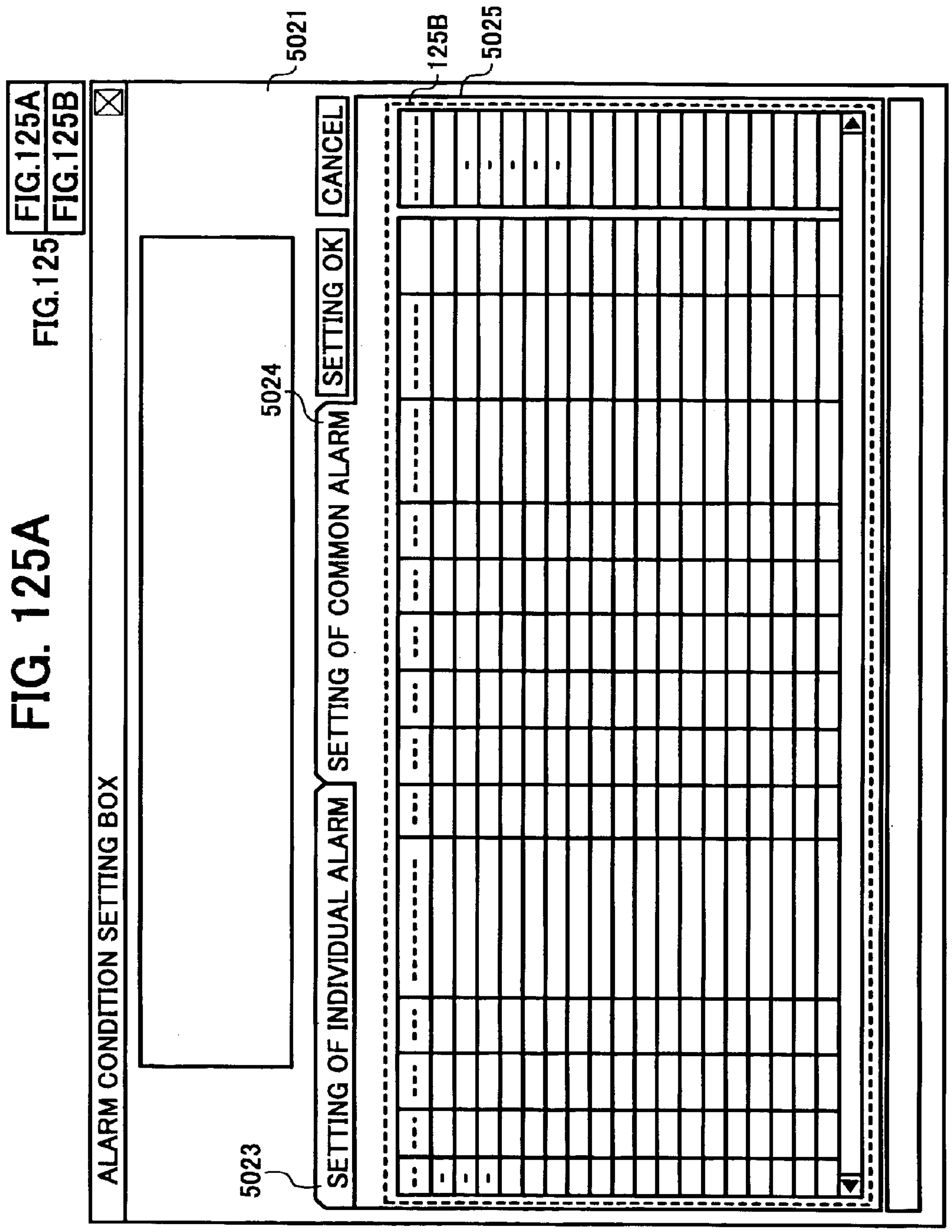

When the [common alarm setting] key 5023 is selected in the alarm setting guidance screen 5021, the password input screen shown in the above described FIG. 107 is displayed. In the display screen to input the password, when the correct password is input, a common alarm setting column 5025, for example, shown in FIG. 125 is displayed. When the alarm condition (item of alarm, standard for alarm) and the alarm value are input in the common alarm setting column 5025 and a "setting is OK" button is pushed down by the operator, the setting of common alarm is completed, and the data which are set are forwarded to the process monitoring server 3300*a*. In the process monitoring server 3300*a* the data for common alarm which are received are registered in the alarm value master table 3708*t*. At this point the reason why input of the password is required is because the setting of common alarm process is made not to be changed arbitrarily by operators, and any person in charge only who knows the password can perform the setting of common alarm process.

Hereinafter the method of setting of alarm will be described with more precise. The items in which the alarm must be utilized are selected from the items of [classification of trouble] to [person in charge for corrective action] in the above described alarm setting columns 5022 and 5025, and the count value at which the alarm is uttered is specified and input to the column for "alarm value" for respective selected items. When any one of the count of selected items becomes the specified "alarm value", the alarm is issued. If it is desired that the alarm is not issued based not only on the count of occurrence of selected items and the alarm have to be issued at any time when the occurrence of selected items is made, it is arranged to input a mark [*] in the column for [alarm value]. For example, when [3*] is input as the alarm value, the alarm is issued when the count becomes 3 at first and after that at any time when the selected alarm condition is fulfilled, the alarm is issued in every fulfillment.

Figure 116A:
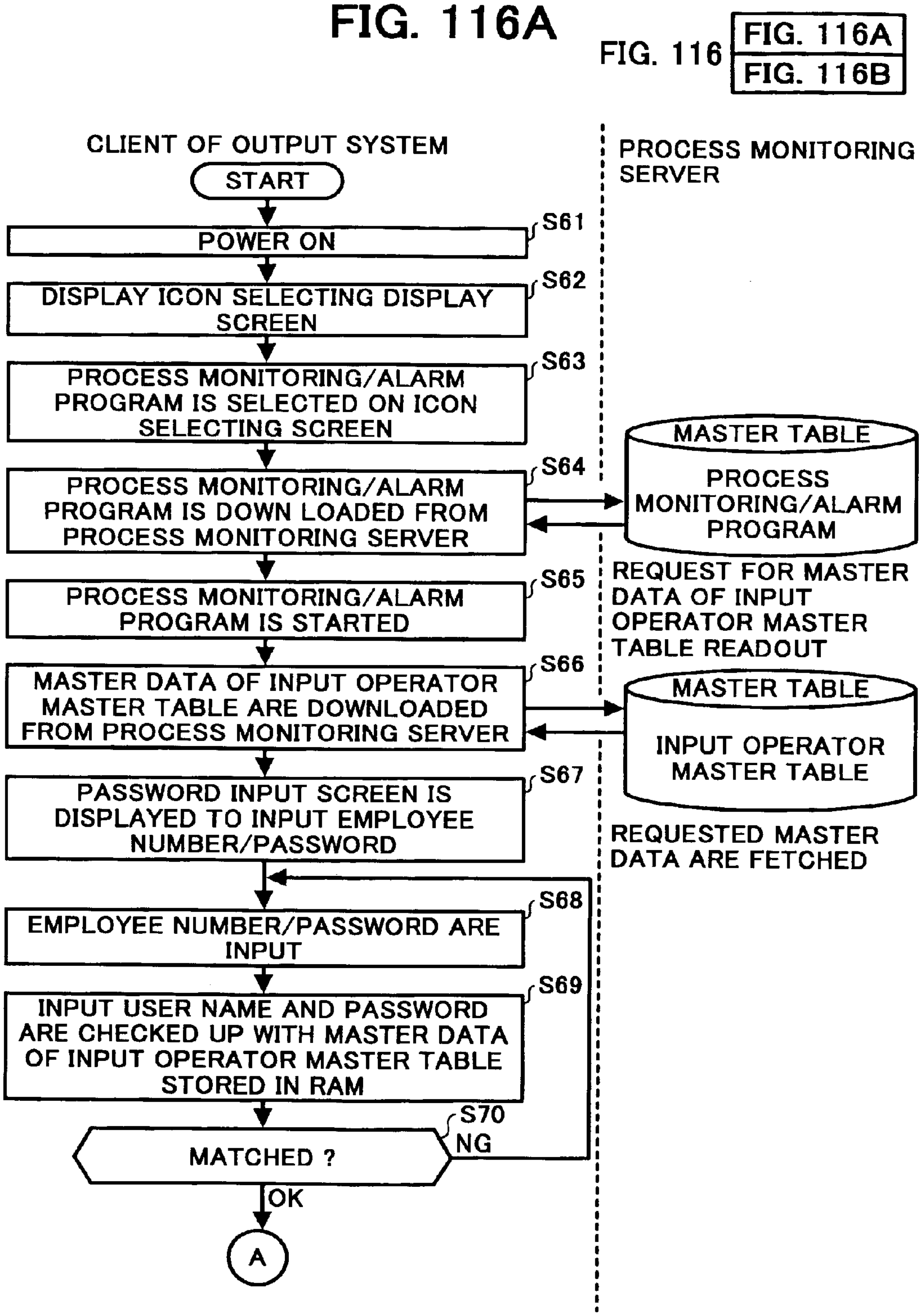
FIG. 116 is a flow chart to explain a process of process monitoring/alarm on the client of the output system.
Figure 116B:
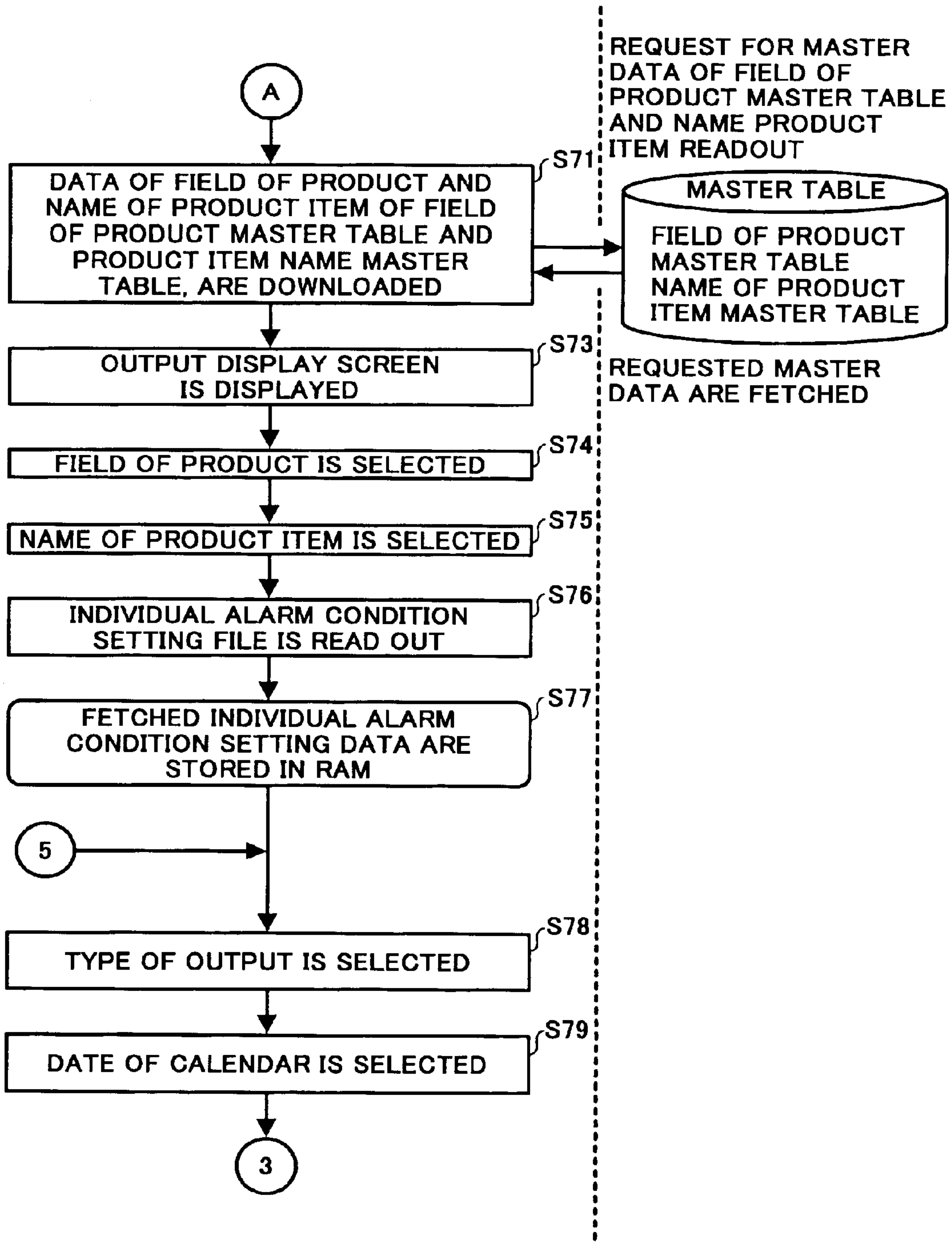

In next the process monitoring/alarm process will be described with reference to the flowcharts shown in FIG. 116 to FIG. 121. In FIG. 116 respective persons in charge of the production/product inspection department 3401, the parts inspection department 3402 and the manufacturing technology department 3403 turn on the power source for the respective clients 3501 to 3503 of output system (step S61), the production management system client program 3607*b* stored in the recording media 3607 is fetched and expanded in the RAM 3605 and they are started to display on the display portion 3602 a selecting screen for icons such as shown in FIG. 101 (step S62). When the process monitoring/alarm program 3602*b* is selected (step S63), the process monitoring/alarm program 3706*d* is downloaded from the process monitoring server 3300*a* to be stored in the RAM 8605 (step S64).

And when the process monitoring/alarm program 3708*c* stored in the RAM 3605 i started (step S65), a master data of a person in charge for input master table 3708*g* (employee number, name, password) is downloaded from the process monitoring server 3300*a* to be stored in the RAM 3605 (step 866). Then a password input screen is displayed in the display portion such as shown in FIG. 102 (step S67). In the password input screen shown in the same drawing, the columns to be input "employee number" and "password" are displayed. And the password and employee number are input by the operator (step S68).

The employee number and the password which are input by the operator are compared with the master data (password and employee number) of the "a person in charge for input" master table 3708*g* (name, password and employee number) stored in the RAM 3605 (step S69), and the input employee number and password are judged if they are correct or not (step S70), when input employee number and password are correct, process is moved to the subsequent step S71 on the other band when they are not, correct process is moved back to step S68 to be input the employee number and password correctly.

In step S71 the master data are downloaded from the field of product master table c (field of product) of the process monitoring server 3300*a* and product name master table 3708*r* (item name, field of product, site of production, date of production begins, server name, IP address, DB name, head number flag and mail dispatch) (step S71) and the data are stored in the RAM 3605 (step S72). And a data input screen is displayed as shown in above described FIG. 122 (step S73). And at the same time the master data of field of product of the field of product master table 3708*c* are displayed in the "field of product selecting box" 5002, the master data of product name of the product code name master table 3708*a* are displayed in the "product selecting box" 5003, and the data of product code of product code name master table 3708*a* are displayed in the "product code selecting box" 5004, respectively. Also the data of kind of output which is written in the process monitoring/alarm program 3707*c*, is displayed in the "kind of output selecting box" 5005.

And then the field of product in the "field of product selecting box" 5002 is selected (step S74), the product item name in the "product selecting box" 5003 is selected (step S75). Then, the individual alarm condition setting file which is stored in the recording media 3607 is read out (step S76), the data for individual alarm condition setting are stored in the RAM 3605 (step S77). And the kind of output is selected in the "kind of output selecting box" 5005 (step 878), then date of the very day is selected for calendar 6006 (step S79).

Figure 117A:
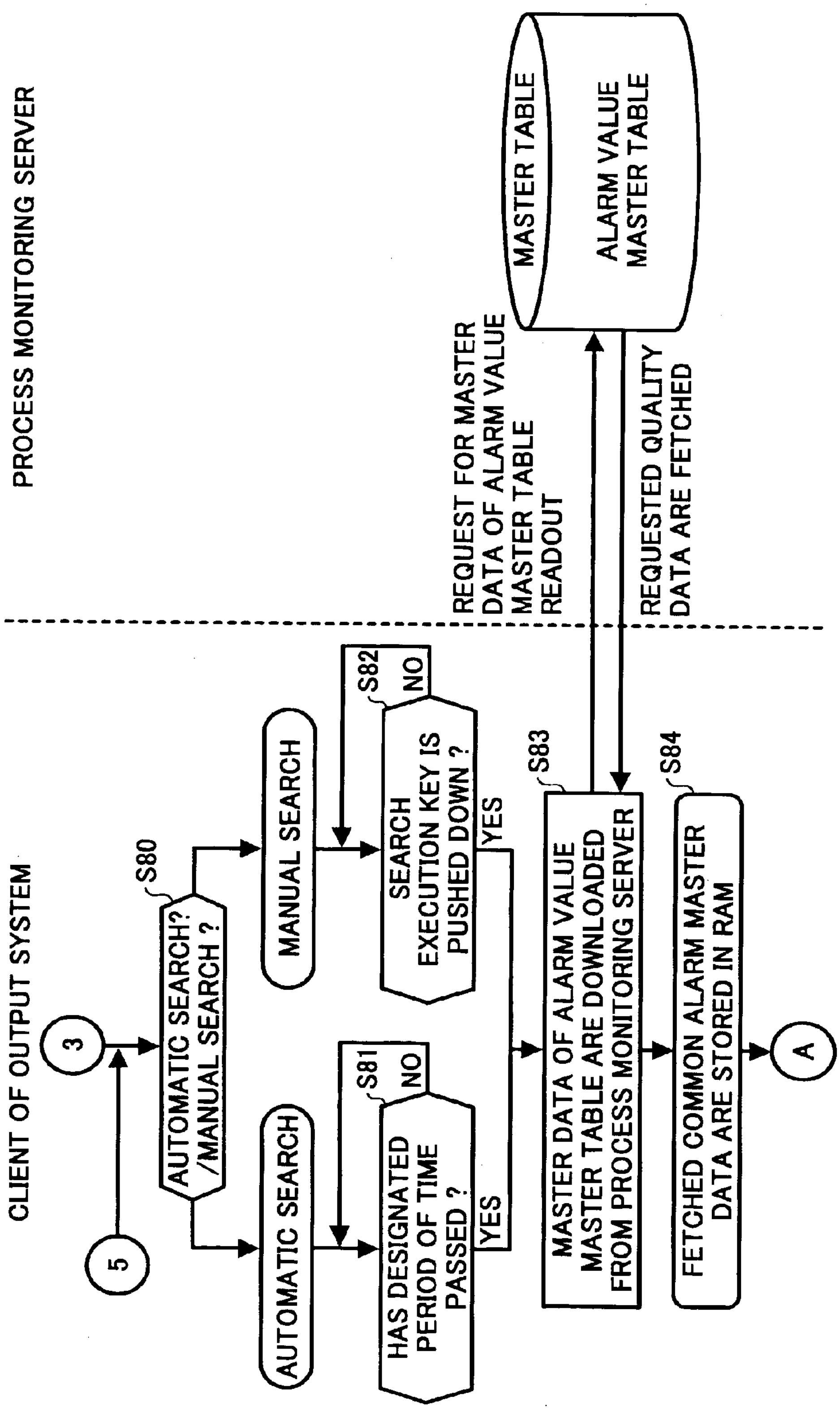
FIG. 117 is a flow chart to explain a process of process monitoring/alarm on the client of the output system.
Figure 117B:
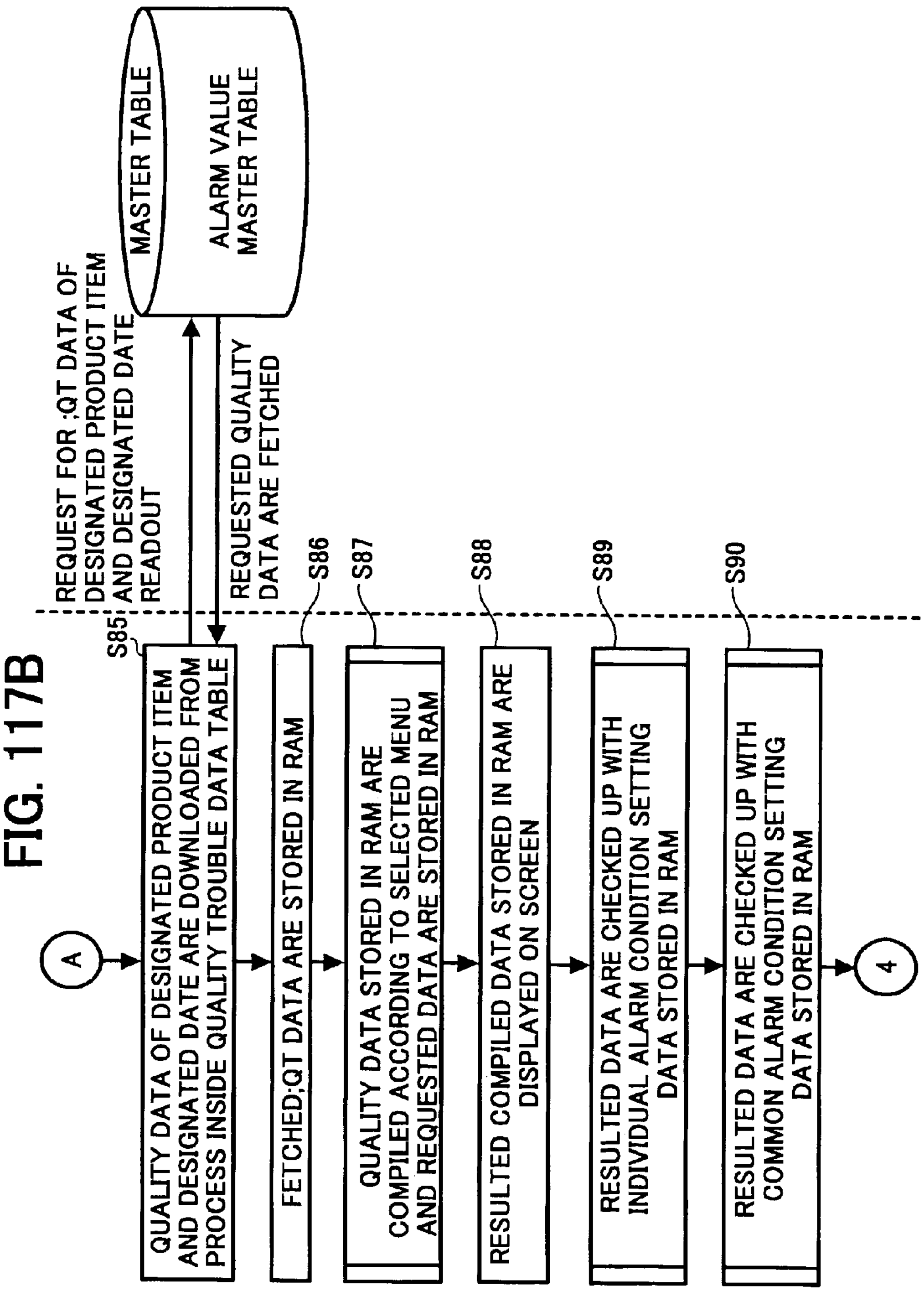

In succession in the step S80 a decision if the search condition which is set in the above described dialog box 6020 of [setting renewal method] (See FIG. 123), is an automatic search or a manual search, is made shown in FIG. 117 (step S80).

As a result of this decision when the automatic search is set, a judgement if the time period set has been passed or not (step S81), and when the item period set has been passed, the system goes to the step S83. On the other hand when the manual search is selected, a judgement if the execution of search key 5011 is pushed down or not, is made (step S82), and when in a case the execution of search key 5011 is pushed down, the system moves to the step S83.

In step S83, the master data of alarm value master table 3708*t* (number, classification of control, classification of trouble, name of process, item of trouble, content of trouble 1, content of trouble 2, content of trouble 3, out of line, something strange, responsible department 1, responsible department 2, responsible department 3, no recurrence, content of repairing 1, content of repairing 2, content of repairing 3, person in charge for repairing, content of prevention of recurrence, person in charge for corrective action, alarm value, result of alarm, time of alarm, date of mail dispatch) in the process monitoring server 3300*a*, are downloaded (step S83) and they arc stored in the RAM 3605 (step S87).

Then the quality data of designated date and designated product item which are specified in the preceding steps of S74, S75, S78 and S79 are downloaded from the main data table 3709*d* (name of factory, field of product, product item name, step of production, line number, product item code, assembling serial number, product serial number, date of assembling begin, time of assembling begin, date of completion, time of completion, out of line flag, market occurrence flag, date of input, count of trouble, count of something strange, count of no recurrence, count of inspection again, entreatement as information, remarks, latest date of revision) of the process monitoring server 3300*a* and the trouble inside the process data table 3709*f* (name of factory, field of product, product item, step of production, line number, product item code, assembling serial number, serial number of trouble, product serial number, classification of trouble, count of recurrence, date of occurrence, time of occurrence, name of process, item of trouble, content of trouble 1, content of trouble 2, content of trouble 3, out of line, rank, something strange, responsible department 1, responsible department 2, responsible department 3, no recurrence, cause of trouble, content of repairing 1, content of repairing 2, content of repairing 3, date of repairing, time of repairing, person in charge fir repairing, content of prevention for recurrence, date of corrective action, time of corrective action, person in charge for corrective action, latest date of revision, flag for mail dispatch) of the process monitoring server 3300*a* (step S85), and they are stored in the RAM 3605 (step S86). And the quality data which are stored in the RAM 3605 are compiled in accordance with the kind of output specified in the "kind of output selecting box" 5005 (step S87).

Figure 119:
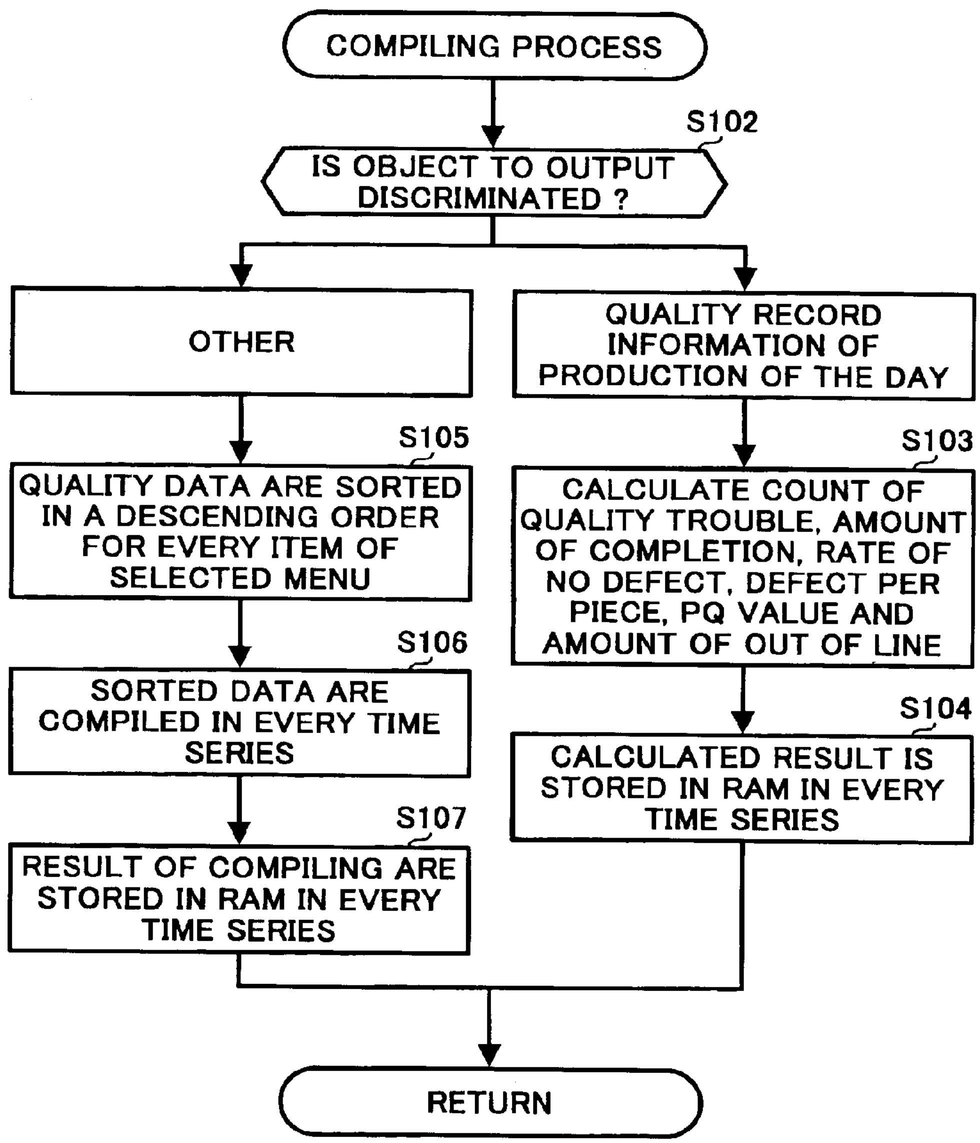
FIG. 119 is a flow chart to explain a process of process monitoring/alarm on the client of the output system.

Hereinafter the concrete content of the above described step S87 will be described with reference to the flowchart shown in FIG. 119. In FIG. 119, at first the kind of output specified in the "kind of output selecting box" 5005 is recognized (step S102), when the specified kind of output is "quality record information of production of the day", the compiled data of count of trouble, amount of completion, rate of no defect, count of defect per piece, PQ value and amount of out of line, are calculated (step S103). The calculated compiled values are stored in the RAM 3605 on the basis of time series (step S104).

On the other hand, when in a case the kind of output selected in the "kind of output selecting box" 5005 is "other", the calculated quality data are sorted in a descending order for every item of kind of output (step S105), and the sorted data are compiled for every time series (step S106). The compiled result are stored in the RAM 3605 on the basis of time series (step S107). In step S88 shown in FIG. 117, the quality data stored in the RAM 3605 and the compiled result on the time series based are displayed on the screen (step S88).

Figure 126A:
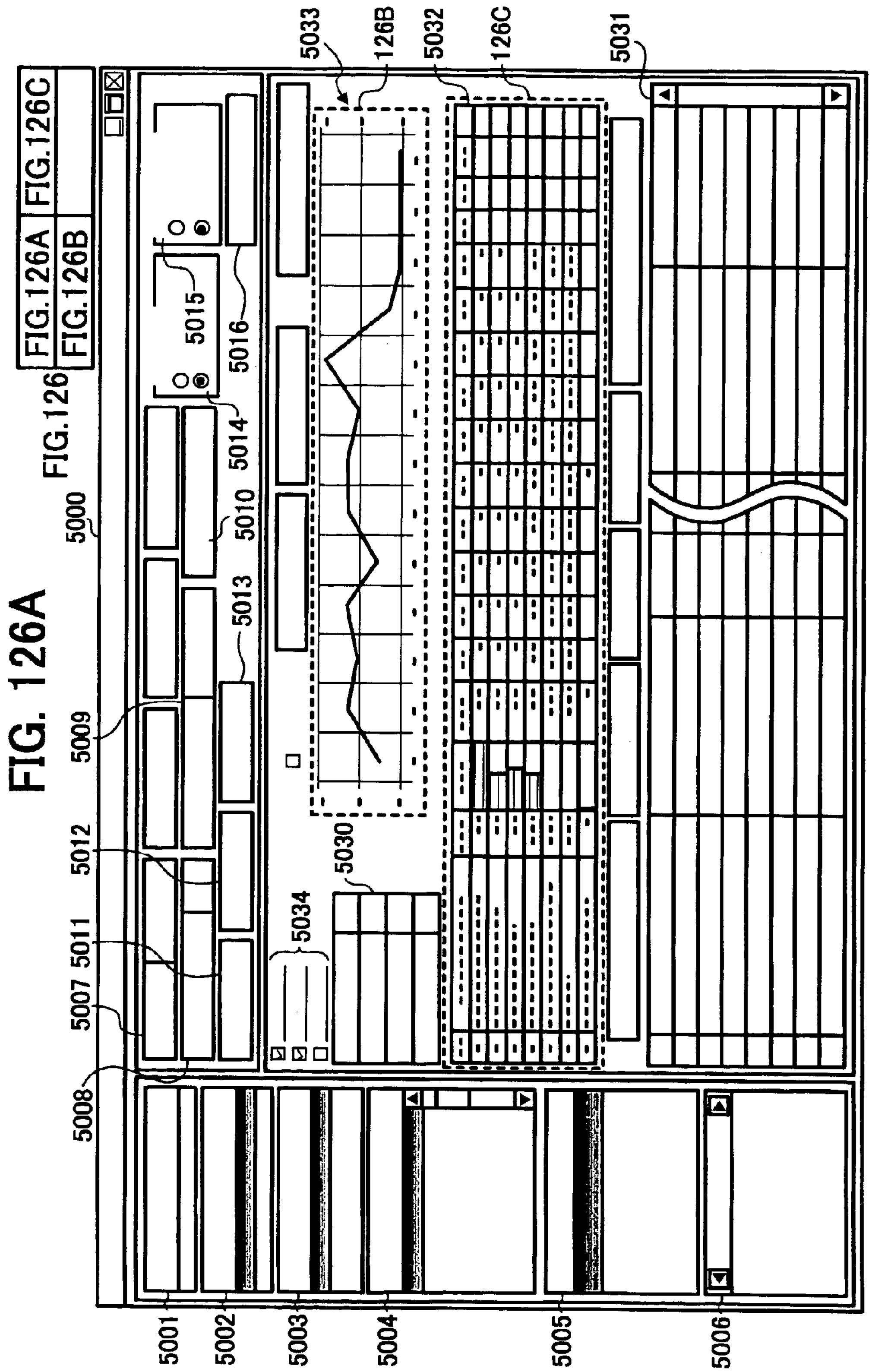
Figures 126B, 126C:
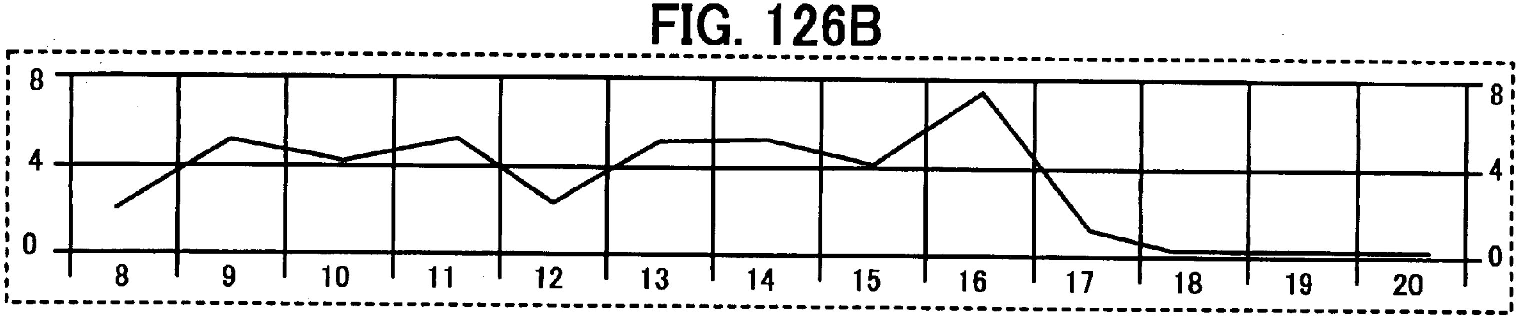

FIG. 126 shows an example of screen display of quality data and the compiled result on the basis of time series. In the example shown in the drawing, the quality data (searched result, raw data) which are corresponding to the specified "product name, product code, and date", are displayed as an synoptic table in the searched data display column 2031. The searched data display column 5031 is composed of items such as "number", "assembling serial number", "machine number", "head number", "inspection again", "name of process", "item of trouble", "content of trouble", "out of line", "rank", "responsible department", "cause of trouble", "content of repairing", "date of repairing", "content of prevention for recurrence", "date of corrective action", "time of corrective action", "person in charge for corrective action" and so on and it is made possible to decide freely by the operator that which items are selected and displayed in the searched data display column 5031. At the same time arbitrary specified column or row of the synoptic table can be chosen to be present or absent by a key operation of "presence or absence" of "row or column" 3203 specified in the resulted searched data display column 5031.

The resulted compiled data on the basis of time series are displayed in a synoptic table in the kind of output display column 5032. The compiling condition of count of trouble displayed in the kind of output display column 5032, is designated in the check box 5034. By selection of "excluding something strange" or "excluding something no recurrence" in the check box 5034, count of trouble can be made excluding the troubles due to those items as count of trouble. At the same time, the data in time series with the selected items among the items shown in the kind of output display column 5032, are displayed in the column for graph 5033 in the form of line chart. At this point the item displayed in the form of line chart is not limited in one, it is made so that a plurality of items displayed in the kind of output display column 5032 can be selected in order to compare the plurality of line chart in time series. Also in the count display column 5030 "count of something strange", "count of no recurrence", "count of inspection again" and "amount of product holding input" are displayed.

Figure 127A:
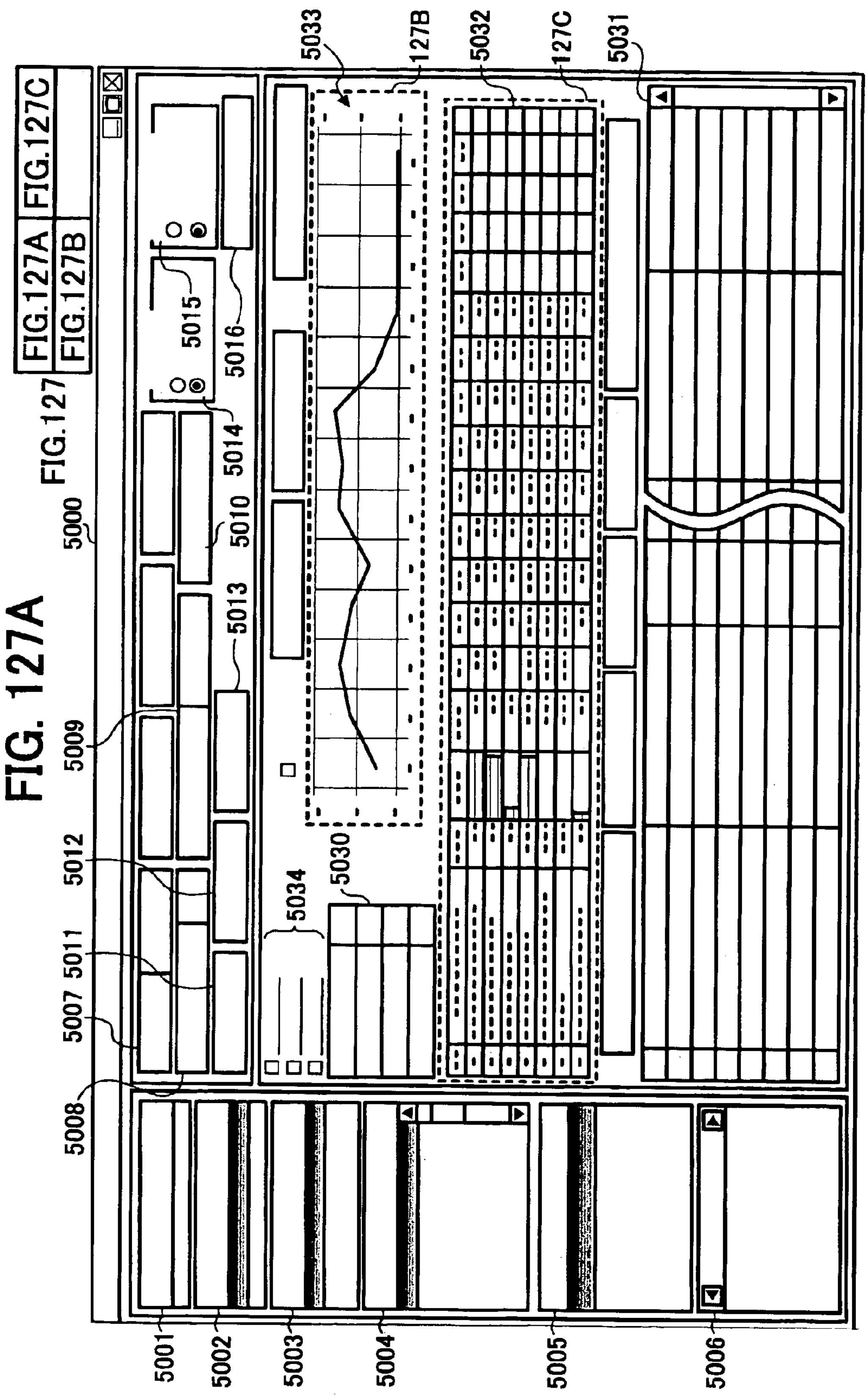
Figures 127B, 127C:
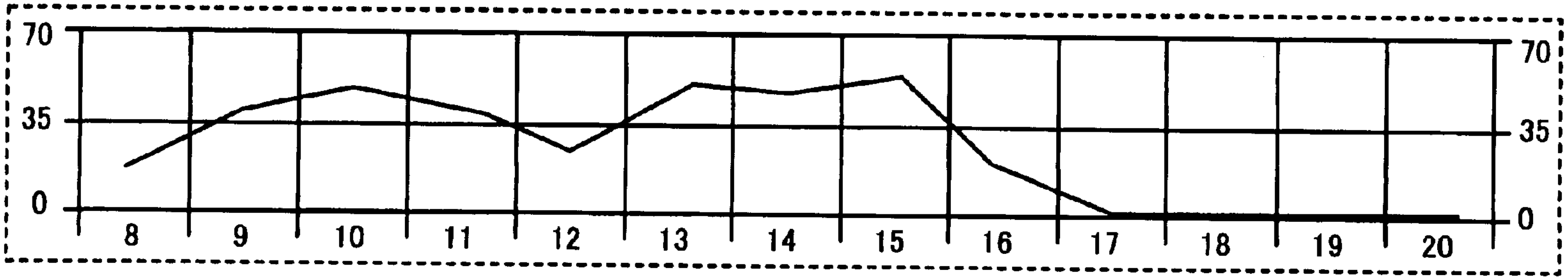

Herein, FIG. 127 shows a case that "all" is selected as the "product item", "May 1st" is selected as the "designated date", and "quality record information of production of the day" is selected as the "kind of output". In the kind of output display column 5032, "total amount", "rate", "bar chart", occurrence in every hour (08:00–20:00)" are displayed in correspondence with the data items "amount of production (completion)", "amount of no defect", count of trouble", "rate of no defect", "count of defect per piece", "PQ value", "amount of oat of line". The graph display column 5033 shown displays one sample of graph display when the amount of production (completion) is selected in the resulted searched data display column 5020.

Hereinafter the calculation method of data items (1: Amount of production (completion), 2: Amount of no defect, 3: Count of trouble, 4: Rate of no defect, 5: Count of defect per piece, 6: PQ value, 7: Amount of out of line) displayed in the kind of output display column 5032 when "quality record information of production of the day" is selected as the kind of output in "kind of output selecting box" 5005, will be described in detail 1: Amount of Production Completion A count of the item "date of completion" (or "time of completion") is input in the main data table 3709*d* is performed, the result is displayed in the item of "total". A calculation of the count of "total" of the amount of production completion/the count of "total" of the amount of production completion)*100 is performed and the result is displayed numerically as for "rate". As for "bar chart", the above described "rate" is displayed in form of bar chart Further as for "occurrence of every hour", the transition of count on the basis of hour of the designated date are displayed in numerical form. The time period of this can be altered with hour base or half hour base (the screen display is based on hour). This occurrence of every hour" is counted utilizing the "time of completion" in the main data table 3709*id*

2: Amount of No Defect

A calculation of ("total" of above described "amount of production completion" )—(counted value of items of "count of defect" in the main data table) is performed and the result is displayed in the "total". As for "rate" a calculation of ("amount of no defect"/"amount of production completion")* 100 is performed and the result is displayed numerically. As for "bar chart" the calculated result of above described "rate" is displayed in the form of bar chart. For the standard unit of length of the bar chart, the above described "amount of production completion" is utilize. As for "occurrence of every hour" the "amount of production completion" is displayed on the basis of every hour utilizing the "time of completion" of the main data table 3709*d*.

3: Amount of Defect

Figure 128A:
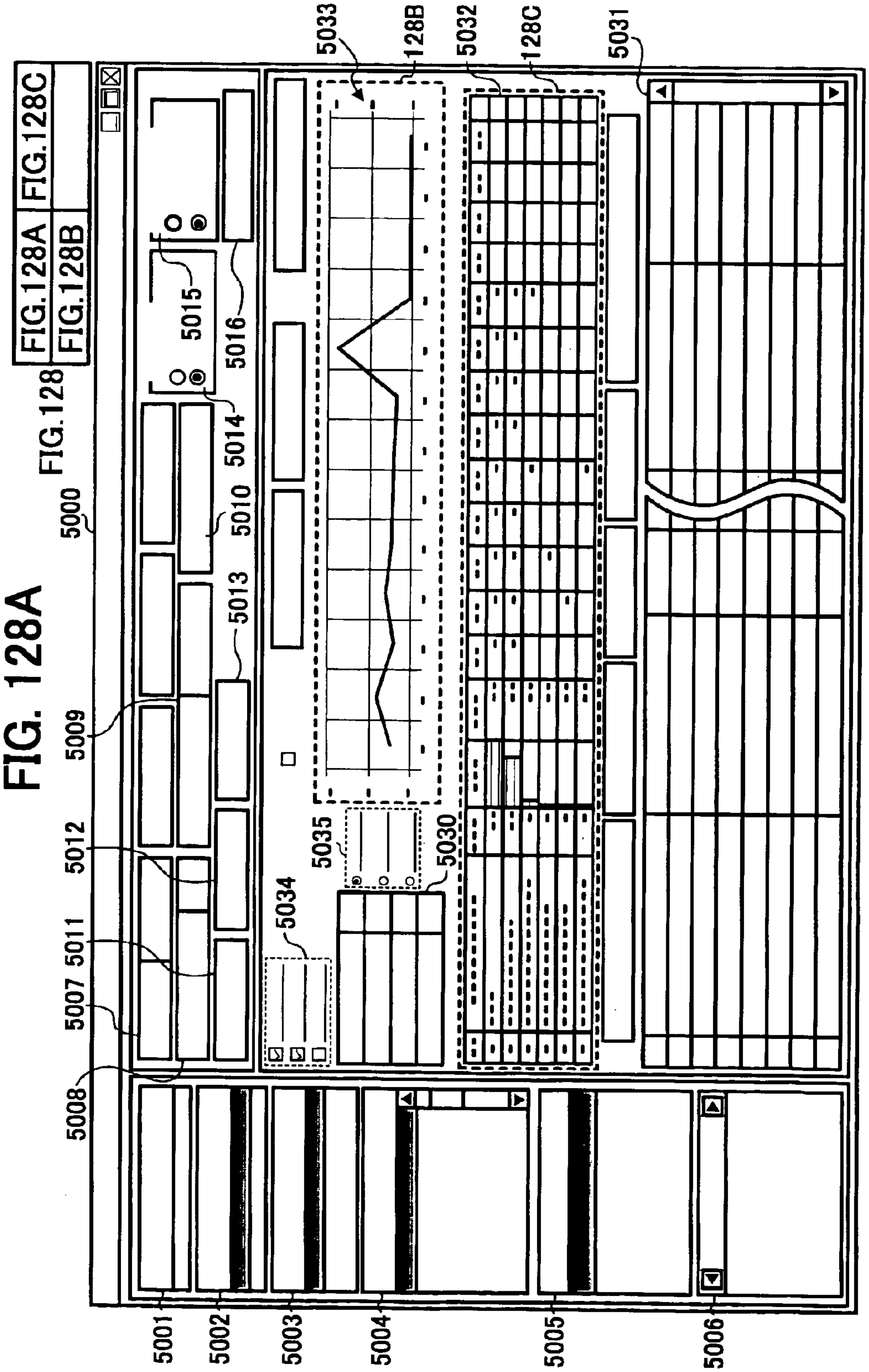
Figures 128B, 128C:
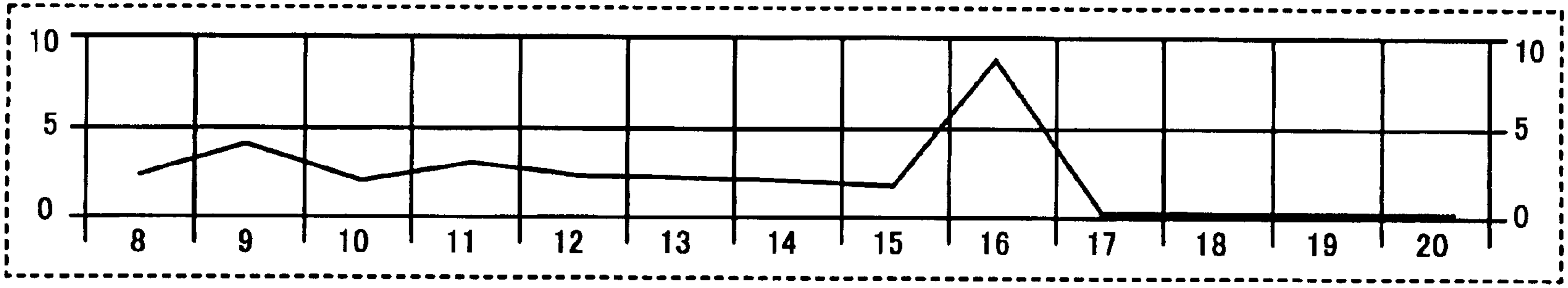

A calculation of (counted value of "item" of trouble in the quality trouble inside of the process data table 3709*f*)—(counted value of "something strange" or a flag of "no recurrence" of "item of trouble in the quality trouble inside of the process data table 3709*f*) is performed and the result is displayed in the "total" of the amount of defect In this embodiment as shown in FIG. 128 because "excluding something strange", and "excluding no recurrence" in the check box 5034 are checked when the system is started, the calculation becomes as above described. On the case when those check are not performed, calculation will be described later. As for "rate" a calculation of ("total" of above described "count of trouble"/"amount of production completion")*100 is performed and the result is displayed numerically. As for "bar chart" the calculated result of above described "rate" is displayed in the form of bar chart. As for "occurrence of every hour" the "count of trouble" is displayed on the basis of every hour utilizing the "time of occurrence" in the in the quality trouble inside of the process data table 3709*f*.

When in case the "excluding something strange" in the check box 5034 is not checked, the calculation is performed with "count of trouble" which is a result of the calculation "count of trouble" +"count of something strange" utilizing the "count of something strange" in the main data 3709*d*. When in a case the "excluding no recurrence" is not checked, the calculation is performed with "count of trouble" which is a result of the calculation "count of trouble"+"count of no recurrence" utilizing the "count of recurrence" in the main data table 3709*d*.

Also when in a case the "excluding inspection again" is not checked in the check box 5034, the calculation is performed with "count of trouble" which is a result of the calculation "count of trouble"+"count of inspection again" utilizing the "count of inspection again" in the main data table 3709*d*. At this point a plurality of items in the check box 5034 can be selected. In such a case the above second calculation is performed with "count of trouble" which is a result of the calculation "count of trouble"–"total sum of count of respective checked items". In FIG. 88, an example is displayed in which "excluding something strange", "excluding no recurrence" and "excluding re-inspection" are not checked in the check box 5034.

4: Rate of No Defect

A calculation of ("total" of above described "amount of no defect")/(total of "count of product completion)*100 is performed and the result is displayed in the "total" numerically. The "rate" is the same as above described "total". As for "bar chart" the calculated result of above described "rate" is displayed in the similar manner as the above description. As for "occurrence of every hour" a calculation is performed so that (above described "amount of no defect" on the basis of every hour)/("amount of production completion" on the basis of every hour)*100, and the result are displayed on the basis of every hour in the cells for every hour in numerical form.

5: Count of Defect Per Piece

A calculation of (total of above described "amount of trouble")/(total of "count of product completion) is performed and the rest is displayed in the "total" numerically. The "rate" is the me as above described "total". The "bar chart" is not displayed. As for "occurrence of every hour" a calculation is performed so that (above described "amount of trouble" on the basis of every hour)/("amount of production completion" on the basis of every hour), and the result are displayed on the basis of every hour in the cells for every hour in numerical form.

6: PQ Value

A calculation of (count of "item of trouble" in the trouble in the quality trouble inside of the process data table)/(total of "count of product completion) is performed and the result is displayed in the "total" numerically. The "rate" is the same as above described "total". The "bar chart" is not displayed. As for "occurrence of every hour" a calculation is performed so that (a value that count of "item of trouble" in the trouble in the quality trouble inside of the process data table is counted in every hour of every date basis utilizing "time of occurrence" (or "date of occurrence")/(above described "amount of production completion" in every hour of every date basis designated by the above hour and date, and the result are displayed on the basis of every hour of the date in the corresponding cells.

7: Amount of Out of Line

A counting of data with "out of line flag" is [1] (which means that the product is out of line" and [2] (which means that the product was out of line but returned to line after treatment), and the result is displayed in the "total" with numerical form. As for "rate" a calculation of ((amount of above described "total")/"total" of "amount of product completion")*100 is performed and the result is displayed numerically. As for "bar chart" the calculated result of above described "rate" is displayed in the form of bar chart. As for "occurrence of every hour", a counting is performed that above described "total" is compiled on the basis of every hour utilizing the "time of completion" (or "date of completion") in the main data table 3709*d* when the "out of line flag" is "1" and "2" in the main data table 3709*d* and the result are displayed in every hour of every date basis designated by the above hour and date.

FIG. 128 shows an example of output display screen when "quality trouble occurrence situation by every process" is selected in the kind of output selecting box 5005. As shown in the drawing when "quality trouble occurrence situation by every process" is selected, "count", "bar chart", "rate" and "count per every hour" are displayed on the basis on name of process (total, image inspection 01, adjusting process 02, electrical inspection 01, completion inspection 01) in the kind of output display column 5032.

At this point "name of process" is counted utilizing "name of process", "date of occurrence" and "time of occurrence" in the trouble in the quality trouble inside of the process data table 3709*f*. It is displayed in a form of respective occurrences at respective processes and grand total of them. In this embodiment, the count is performed with two keys of "name of process" and "date of occurrence". The "rate" is calculated in a form (occurrence by every process/total count)*100. Herein the "rate" for total is calculated in a form (total occurrence/total count)*100. The "bar chart" is displayed in a form of graph utilizing the above described "rate". The "occurrence of every hour" is counted utilizing "name of process", "date of occurrence" and "time of occurrence" on the basis of every hour of the date and displayed in the corresponding cells in numerical form.

As above described in the check box 5034 by means of checking to select "excluding something strange" and "excluding no recurrence", they can be omitted from the counting of quality trouble. In case when the "excluding inspection again" is selected in the check box 5034, count of "inspection again" can be omitted from the counting which is counted as "name of process" utilizing "count of inspection again" in the in the quality trouble inside of the process data table 3709*f*.

Also in FIG. 128 a radio button 5035 is disposed to select a kind of data to be displayed in the kind of output display column 5032, and the data with items which are selected by the radio button 5035 ("count", "shortage", "PQ value") are displayed in the kind of output display column 5032. The respective calculation equations for such case are quite the same as above described "quality record information of production of the day". At this point the example shown in FIG. 128 is in a case that "count" is selected by the radio button 6035.

Figure 129A:
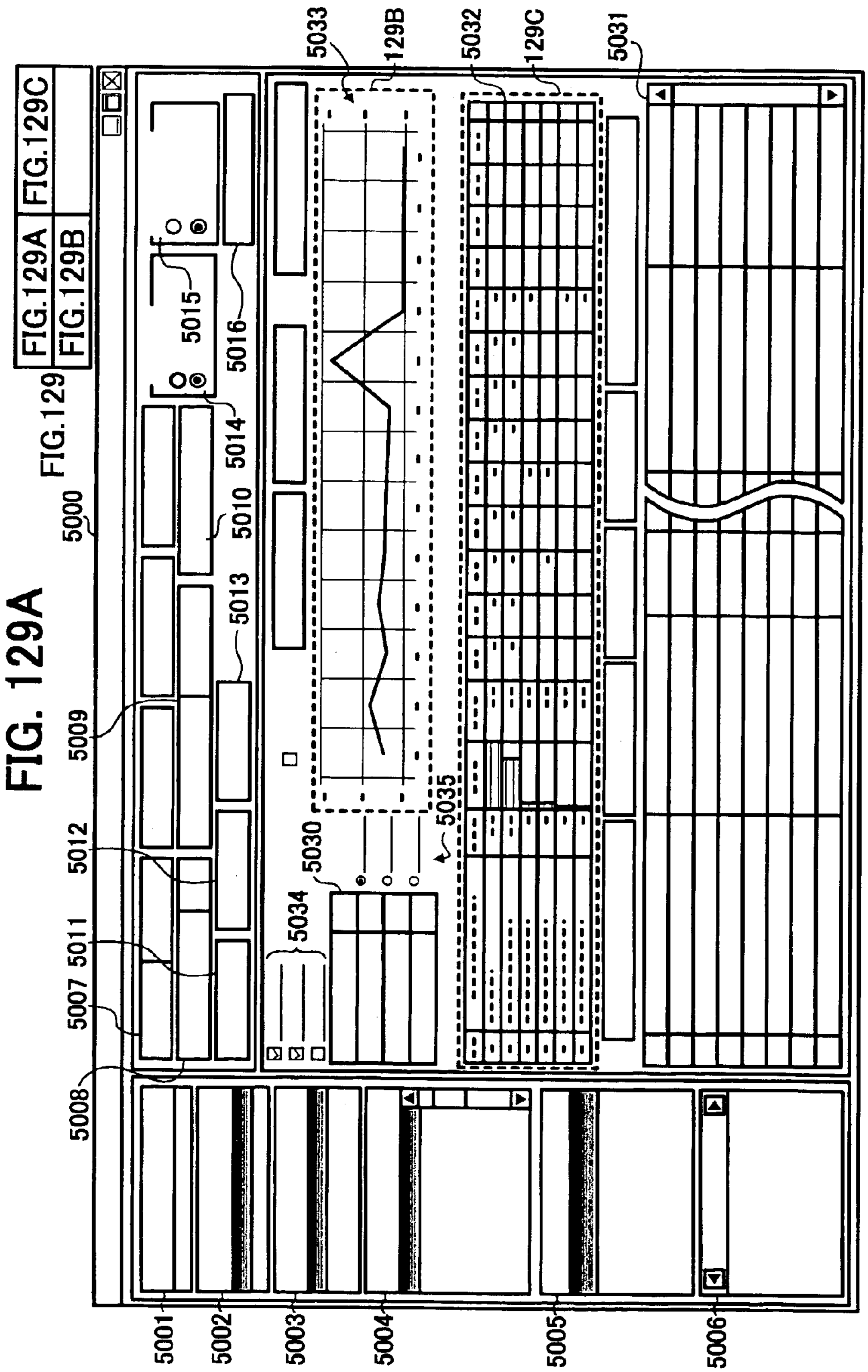
Figures 129B, 129C:
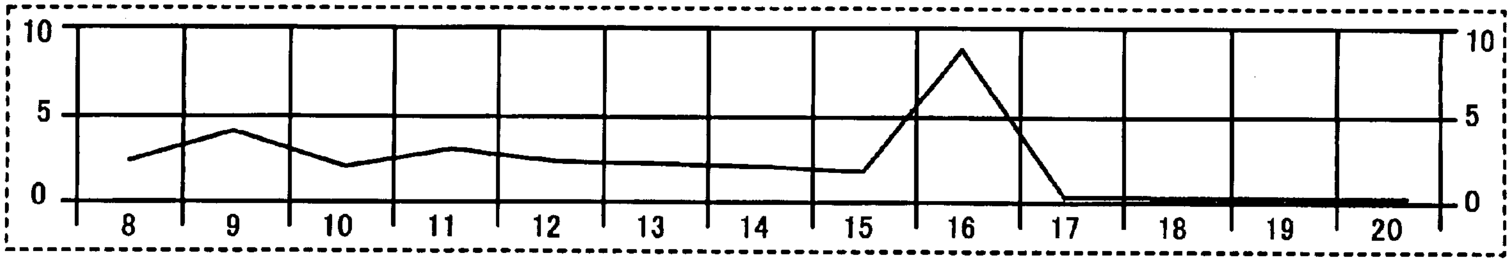

FIG. 129 shows an example of output display screen when "quality trouble occurrence situation in every item of trouble" is selected in the kind of output selecting box 5005. As shown in the drawing when "quality trouble occurrence situation in every item of trouble" is selected, "count", "bar chart", "rate" and "count per every hour" are displayed on the basis on item of trouble (total, image defect, operational defect, conveyance defect, assembling defect, strange sound, coordination defect) in the kind of output display column 5032.

At this point, "item of trouble" is counted utilizing "item of trouble", "date of occurrence" and "time of occurrence" in the trouble in the quality trouble inside of the process data table 3709*f*. It is displayed in a form of respective occurrences at respective processes and grand total of them. In this embodiment, the count is performed with two keys of "item of trouble" and "date of occurrence". The "rate" is calculated in a form (occurrence by every process/total count)*100. Herein the "rate" for total is calculated in a form (total occurrence/total count)*100. The "bar chart" is displayed in a form of graph utilizing the above described "rate". The "occurrence of every hour" is counted utilizing "item of trouble", "date of occurrence" and "time of occurrence" on the basis of every hour of the date and displayed in the corresponding cells in numerical form.

By a radio button 5035 when "count", "shortage (count of shortage)", "PQ value" are selected, contents of respective item of trouble are displayed as well as the selected information. The respective calculation equations for such case are quite the same as above described "quality record information of production of the day". At this point the example shown in FIG. 90 is in a case that "count" is selected by the radio button 5085.

As above described in the check box 5034 by means of checking to select "excluding something strange" and "excluding no recurrence", they can be omitted from the counting of quality trouble. The equations to omit them are quite the same as above. In case when the "excluding inspection again" is selected in the check box 5034, count of "inspection again" can be omitted from the counting which is not input "inspection again" utilizing "count of inspection again" in the in the quality trouble inside of the process data table 3709*f*.

Figure 130A:
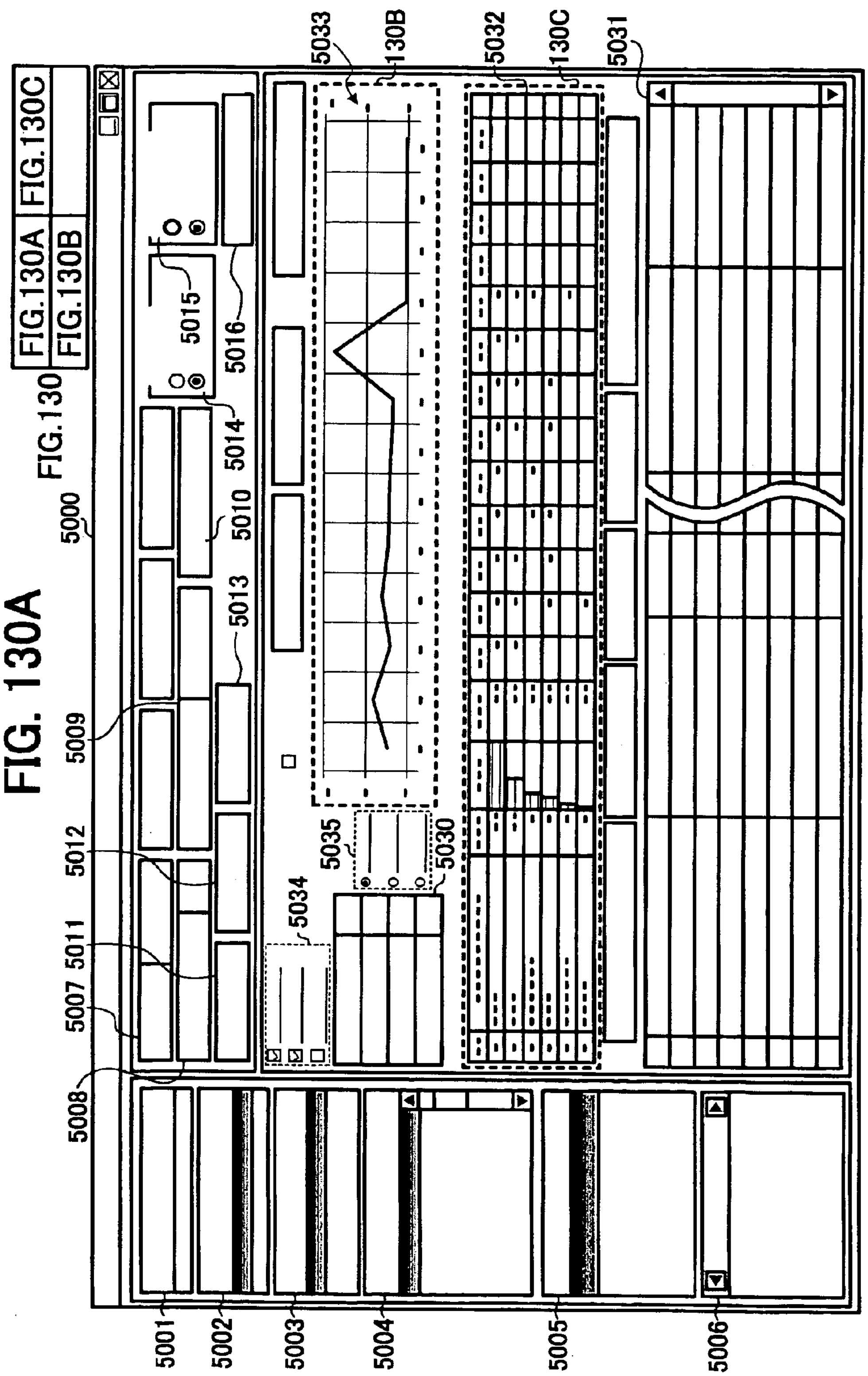
Figures 130B, 130C:
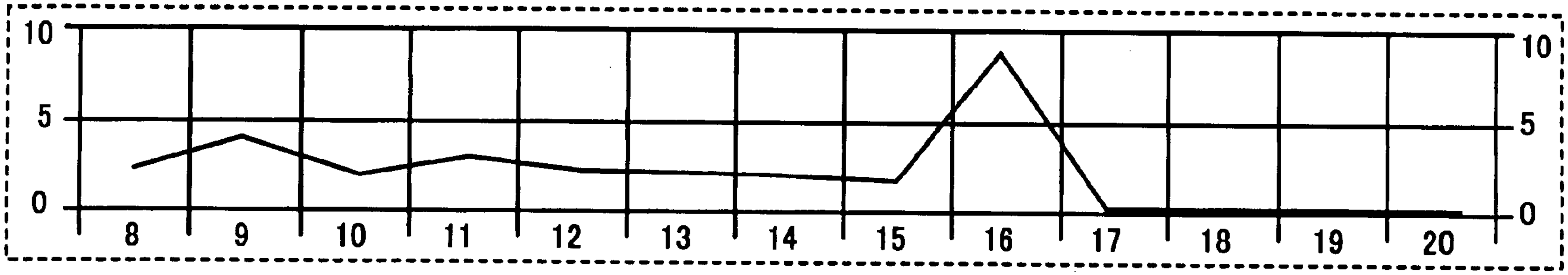

FIG. 130 shows an example of output display screen when "occurrence situation by every responsible department" is selected in the kind of output selecting box 5005. As shown in the drawing when "quality trouble occurrence situation by every responsible department" is selected, "count", "bar chart", "rate" and "count per every hour" are displayed on the basis on name of responsible department (total, dust, assembling, engineering, unknown, responsible department not yet input, parts) in the kind of output display column 5032.

At this point "total" and "each item" of the "responsible department" is counted utilizing "responsible department 1, 2, 3", "date of occurrence" and "time of occurrence" in the trouble in the quality trouble inside of the process data table 3709*f*. It is displayed in a form of respective occurrences at respective items and grand total of them as "total". In this embodiment the count is performed with two keys of "responsible department 1, 2, 3" and "date of occurrence". The "rate" is calculated in a form (occurrence by every responsible department/total count)*100. Herein the "rate" for total is calculated in a form (total count/total count)*100. The "bar chart" is displayed in a form of graph utilizing the above described "rate". The "occurrence of every hour" is counted utilizing "responsible department 1, 2, 3", "date of occurrence" and "time of occurrence" on the basis of every hour of the date and displayed in the corresponding cells in numerical form.

By a radio button 5035 when "count", "shortage (count of shortage)", "PQ value" are selected, contents of respective item with respective names of responsible department are displayed as well as the selected information. The respective calculation equations for such case are quite the same as above described "quality record information of production of the day". At this point the example shown in FIG. 130 is in a case that "count" is selected by the radio button 5035.

As above described in the check box 5034 by means of checking to select "excluding something strange" and "excluding no recurrence", they can be omitted from the counting of quality trouble. In case when the "excluding inspection again" is selected in the check box 5034, count of "inspection again" can be omitted from the counting which is counted as "name of process" utilizing "count of inspection again" in the in the quality trouble inside of the process data table 3709*f*.

Figure 131A:
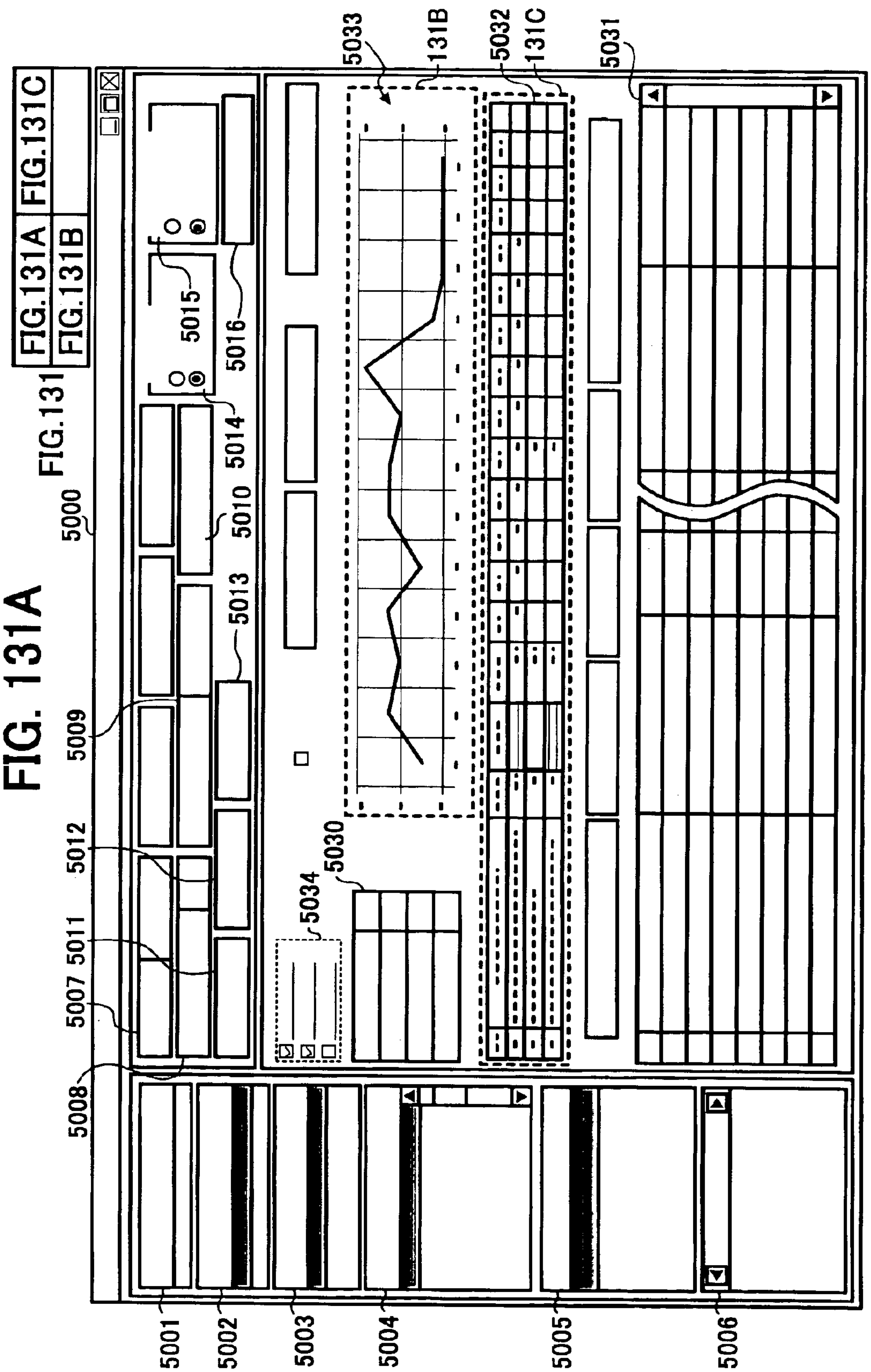
Figures 131B, 131C:
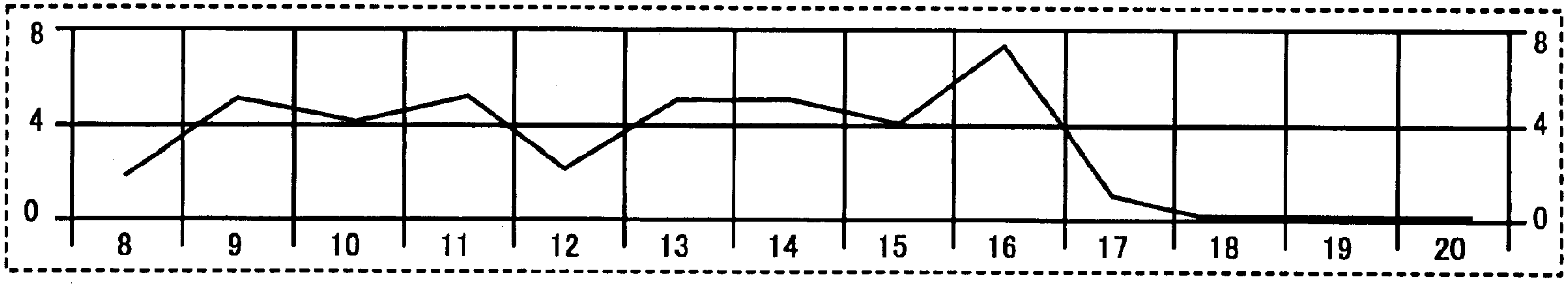

FIG. 131 shows an example of output display screen when "out of line/release situation" is selected in the kind of output selecting box 5005. As shown in the drawing when "out of line/release situation" is selected, "count", "bar chart", "rate" and "count per every hour" are displayed on the basis on data item name (amount production completion, amount out of line, amount out of line release) in the kind of output display column 5032.

At this point "amount of production completion", "amount of oat of line" and "amount of line out release" of "data item name" is counted utilizing "out of line flag", "date of assembling begin" and "time of assembling begin", "date of completion" and "time of completion" in the main data table 3709*d*. As for "count" of "amount of production completion" is defined as the count of "date of completion" in the main data table 3709*d*. The "rate" of "amount of production completion" is divided by the count of "date of completion" of main data table 3709*d* and displayed in a form of "%". The "occurrence of every hour" of "amount of production completion" is counted utilizing "time of completion" in main data table 3709*d*. The "count" of "amount of out of line" is made by counting ("out of line flag"* "date of assembling begin") in the main data table 3709*d*. As for the "rate" of "amount of out of line" (%), a result of calculation ("amount of out of line"/"amount of production completion)*100 is displayed in numerical form. The "occurrence of every hour" of "amount of out of line" is made by count utilizing "time of assembling begin" in the main data table 3709*d* and displayed in the cells on the basis of every hour in numerical form. The "count" of "amount of out of line release" is counted by "out of line flag"* "date of completion" in the main data table 3709*d*. The "rate" of "amount of out of line release" (%) is made by a calculation that (count of "amount of out of line release"/count of "amount of production completion)*100, and the result is displayed in numerical form. The "occurrence of every hour" of "out of line release" is counted by utilizing the "time of completion" in main data table 3709*d*, and they are displayed in sells on the basis of in every hour in numerical form.

As above described in the check box 5034 by means of checking to select "excluding something strange" and "excluding no recurrence", they can be omitted from the counting of quality trouble. In case when the "excluding inspection again" is selected in the check box 5034, count of "inspection again" can be omitted from the counting which is counted as "responsible department 1, 2, 3" which are not input "inspection again" utilizing "count of inspection again" in tie in the quality trouble inside of the process data table 3709*f*.

FIG. 132 shows an example of output display screen when "quality trouble occurrence situation by every content of trouble" is selected in the kind of output selecting box 5005. As shown in the drawing when "quality trouble occurrence situation by every content of trouble" is selected, "count", "bar chart", "rate" and "count per every hour" are displayed on the basis on name of content of trouble (total, vertical white belt, scratch, print irregularity (OPC), colour pock, horizontal black streak, operation side vertical belt, vertical black and white belt, vertical white streak, vertical black belt) in the kind of output display column 5032.

At this point "name of content of trouble" is counted utilizing "content of trouble 1, 2, 3", "date of occurrence" and "time of occurrence" in the trouble in the quality trouble inside of the process data table 3709*f*. It is displayed in a form of respective occurrences at respective items and grand total of them. The "rate" is calculated in a form (count of respective contents/total count)*100. Herein the "rate" for total is calculated in a form (total count/total count)*100. The "bar chart" is displayed in a form of graph utilizing the above described "rate". The "occurrence of every hour" is counted utilizing "content of trouble 1, 2, 3", "date of occurrence" and "time of occurrence" on the basis of every hour of the date and displayed in the corresponding cells in numerical form.

As above described in the check box 5034 by means of checking to select "excluding something strange" and "excluding no recurrence", they can be omitted from the counting of quality trouble. In case when the "excluding inspection again" is selected in the check box 5034, count of "inspection again" can be omitted from the counting which is counted as "responsible department 1, 2, 3" which are not input "inspection again" utilizing "count of inspection again" in the in the quality trouble inside of the process data table 3709*f*.

FIG. 133 shows an example of output display screen when "content of repairing situation" is selected in the kind of output selecting box 5005. As shown in the drawing when "content of repairing situation" is selected, "count", "bar chart", "rate" and "count per every hour" are displayed on the basis on name of content of repairing (total, cleaning, exchange, retouch, printing grease, set) in the kind of output display column 5032.

At this point "name of content of repairing" is counted utilizing "content of repairing 1, 2, 3", "date of occurrence"

and "time of occurrence" in the trouble in the quality trouble inside of the process data table 3709*f*. It is displayed in a form of respective occurrences at respective items and grand total. The "rate" is calculated in a form (occurrence by respective contents/total count)*100. Herein the "rate" for total is calculated in a form (total count/total count)*100. The "bar chart" is displayed in a form of graph utilizing the above described "rate". The "occurrence of every hour" is counted utilizing "content of repairing 1, 2, 3", "date of occurrence" and "time of occurrence" on the basis of every hour of the date and displayed in the corresponding cells in numerical form.

As above described in the check box 5034 by means of checking to select "excluding something strange" and "excluding no recurrence", they can be omitted from the counting of quality trouble. In case when the "excluding inspection again" is selected in the check box 5034, count of "inspection again" can be omitted from the counting which is counted as "responsible department 1, 2, 3" which are not input "inspection again" utilizing "count of inspection again" in the in the quality trouble inside of the process data table 3709*f*.

FIG. 134 to FIG. 137 show examples of output display screen when "quality trouble occurrence situation by every process" is selected in the kind of output selecting box 5005. As shown in FIG. 134 to FIG. 137 when "content of repairing situation" is selected, "count, shortage, PQ value or amount", "bar chart", "rate" and "count per every hour" are displayed on the basis on name of process (total, electrical inspection 01, adjusting process 01, mechanical inspection 01, image inspection 01, completion inspection 01) in the kind of output display column 6082. FIG. 134 shows an example of output display screen when "excluding something strange", "excluding no recurrence" and "excluding inspection again" are selected in the check box 5034, and "count" is selected by the radio button 5035. FIG. 135 shows an example of output display screen when "excluding inspection again" is selected in the check box 5034, and "amount" is selected by the radio button 5035. FIG. 136 shows an example of output display screen when "excluding something strange", "excluding no recurrence" and "excluding inspection again" are selected in the check box 5034, and "shortage" is selected by the radio button 5035. FIG. 137 shows an example of output display screen when "excluding inspection again" is selected in the check box 5084, and "PQ value" is selected by the radio button 5035.

Figure 120:
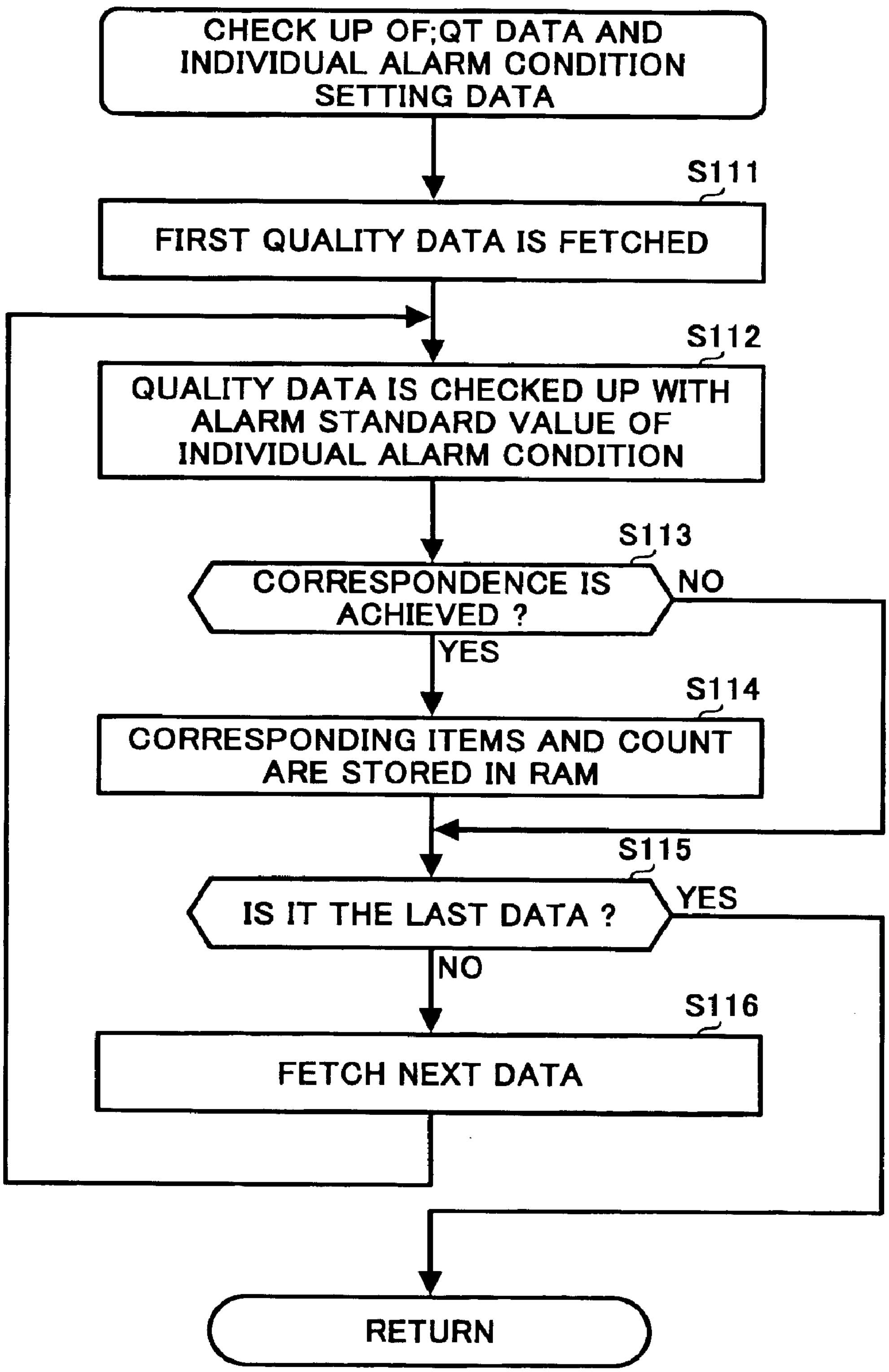

In the step S89 shown in FIG. 117 the individual alarm condition setting data which are stored in RAM 3605 are checked up with the quality data. Hereinafter concrete contents of process of the step S89 will be described with reference to the flow chart shown in FIG. 120. In FIG. 120 the first data of quality data is fetched (step S111), the quality data is checked up with the alarm standard of individual alarm condition data (step S112), a decision is made if the data is corresponding to the alarm standard (step S113). As a result of this check up, when the data is not corresponding to the alarm standard, process moves to step S115. On the other hand, when the data is corresponding to the alarm standard, after the corresponded item and the count are stored in the RAM 3605 (step S114), process moves to step S115.

In the step S115, a decision is made if it is the last data of the quality data, when in a case the data is the last data, this subroutine is terminated and returned. When in case the data is not the last data of quality data, after a next data is fetched (step S116), process moves back to step S112 and the same processes are repeated till all the quality data have been processed.

Figure 121:
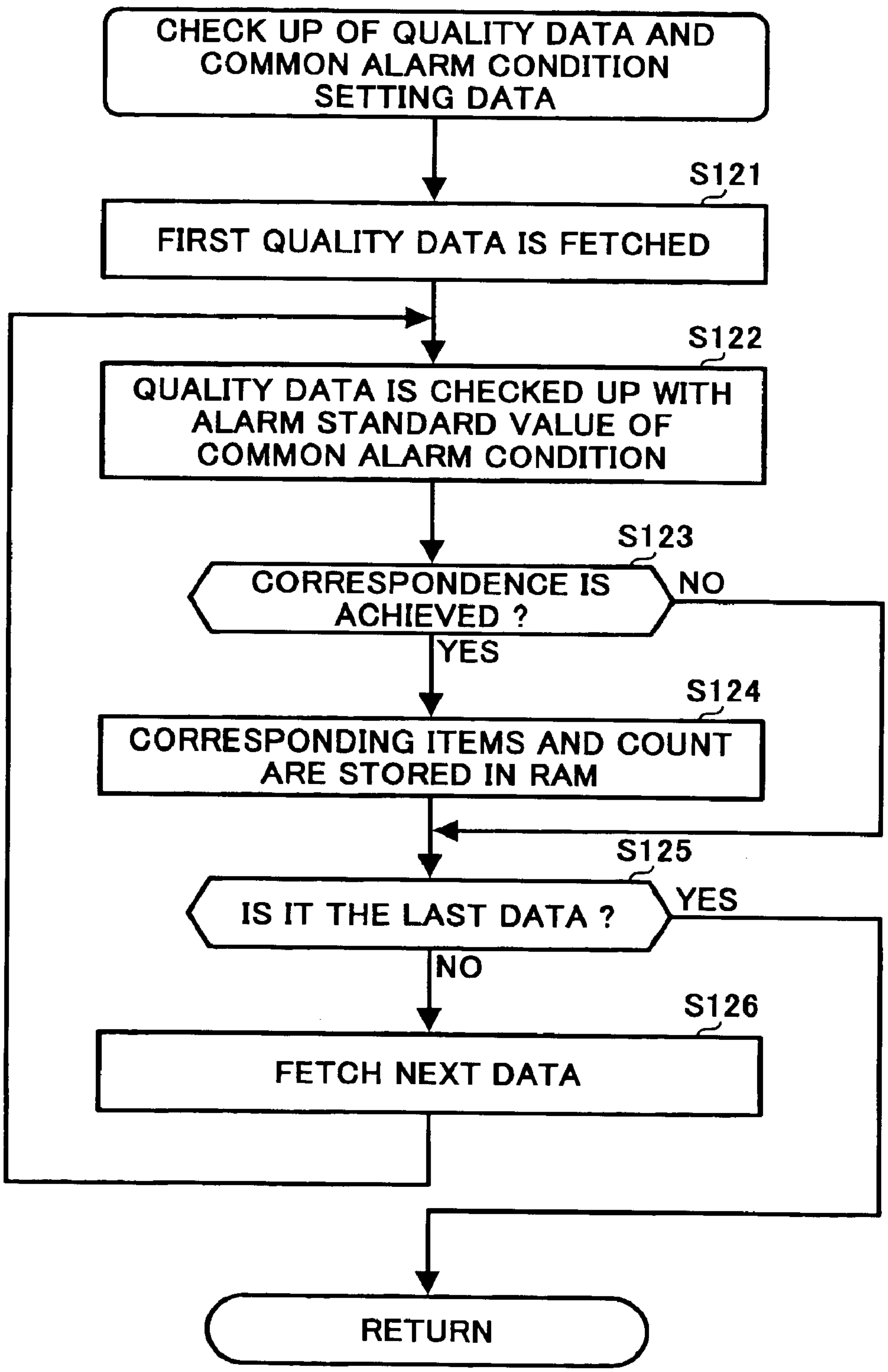

In the step S90 shown in FIG. 117 the common alarm condition setting data which are stored in RAM 3605 are checked up with the quality data (step S90). Hereinafter concrete contents of process of the step S90 will be described with reference to the flow chart shown in FIG. 121. In FIG. 121 the first data of quality data is fetched (step S121), the quality data is checked up with the alarm standard (alarm item) of common alarm condition data (step S122), a decision is made if the data is corresponding to the alarm standard (step S123). As a result of this check up, when the data is not corresponding to the alarm standard, process moves to step S125. On the other hand, when the data is corresponding to the alarm standard, after the corresponded item and the count are stored in the RAM 3605 (step S124), process moves to step S125. In step S125, a decision is made if it is the last data of the quality data, when in a case the data is the last data, this subroutine is terminated and returned When in case the data is not the last data of quality data, after a next data is fetched (step S126), process moves back to step S122 and the same processes are repeated till the all the quality data have been processed.

Figure 118B:
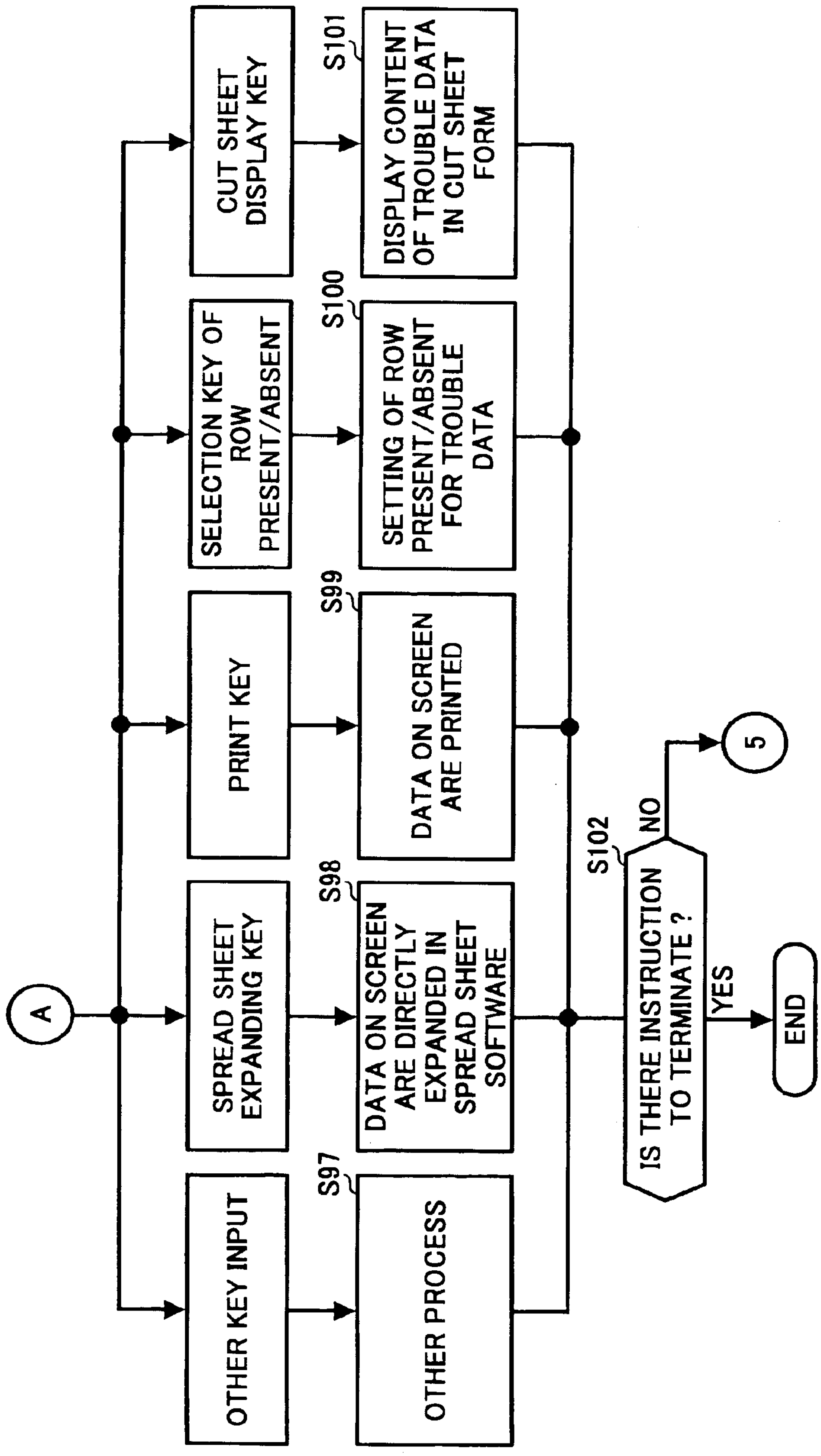
FIG. 118 is a flow chart to explain a process of process monitoring/alarm on the client of the output system.

Subsequently in the step S91 shown in FIG. 118 a decision is made if there is any quality data which exceed the alarm value with reference to an existence of data and its count whose item is corresponding to the alarm standard stored in the RAM 3605, when in a case there is no quality data which exceed the alarm value, the process moves to step S96. On the other hand, when there is any data which exceed the alarm value, a decision is made if "beep alarm" is set in the alarm sound setting column 5014 (step S92). When "beep alarm" is set in the alarm sound setting column, the process moves to step S93 and the alarm is uttered by a speaker and at the same time the items and their counts (result of alarm situation) which are corresponding to the alarm standard and are stored in the RAM 3605, are displayed on the display screen (step S94). In the mean time when in a case "beep alarm" is not set in the alarm sound setting column in step S92, the process moves to step S94 without beeping the alarm and the items and their counts (result of alarm situation) which are corresponding to the alarm standard and are stored in the RAM 3605, are displayed on the display screen (step S94).

FIG. 138 and FIG. 140 show examples of display screen of the result of alarm situation. FIG. 138 is a display example of screen of the result of individual alarm situation, FIG. 140 is a display example of screen of the result of common alarm situation. In FIG. 138 and FIG. 140, the count of occurrence is displayed in the columns of "result". When in a case there is any items which exceed the alarm value, the item is displayed in red to be distinguished. When any one of items are selected in this display screen a detailed content of the result of alarm situation as shown in FIG. 139 is displayed.

After the alarm situation is confirmed, a button to terminate this subroutine is pushed down (step S95), and the display screen which shows the result of alarm situation is closed The operation of system after the above described screen is closed is different according as the arbitrary operating situation of user of the system. In step S96 when a key input operation is performed, a decision is made what is a content of the key input operation, when the "spread sheet expanding" key 5012 is selected, the data displayed on the screen are expanded directly as they are to a sheet of spread sheet application (step S98). When a print key 5013 is selected, the data displayed on the screen are printed out directly as they are (step S99). When a "selection of column to be presence/absence" is pushed down, a display screen to set the presence/absence of columns of synoptic table of quality trouble data to select the items of trouble data on the screen (step S100). Also when in a case "select display in a form of document" key is pushed down, a content of the quality trouble data is displayed in the form of a document (step S101). And other keys are pushed down, other process will be performed (step S97).

Then a decision is made if there is an instruction to terminate the program (step S102), when there is the instruction to terminate the program, the program is terminated, for the meanwhile there is not instruction to terminate the program, the process moves back to step S78 shown in FIG. 116.

Alarm Mail Dispatch Process by Client of Management System

An alarm mail dispatch process by the client 3600 of the management system will be described with reference to the examples of display screens shown in FIG. 146 to FIG. 151 in accordance with the flow charts shown in FIG. 141 to FIG. 145. FIG. 141 to FIG. 145 are flow charts to explain the alarm mail dispatch process by client 3600 of the management system, FIG. 146 to FIG. 150 are examples of screen display in the alarm mail dispatch process. This alarm mail dispatch process is performed in the client 3600 of management system.

The alarm mail dispatch process is a process in those a real time monitoring by the system is performed if quality trouble occurs with data which is a target of request for quality trouble discussion, and data which is a target of alarm setting common to all department, when it occurs the situation is displayed on screen in real time and at the same time the content of quality trouble is informed to predetermined persons in charge of the alarm by electronic mail. By this arrangement the persons in charge who received the alarm mail are made to be able to solve rapidly the quality trouble.

FIG. 146 shows one example of display screen 5000 displayed in the display portion 3802 when the alarm mail dispatch program 3807*b* is started. In the drawing, reference numeral 6001 designates a key to display a period in which the data of selected product item exist. When the key 6001 is pushed down, the period of data existing of the selected product item is displayed. Reference numeral 6002 designates a field of product selecting box to select (field of product) to be searched, 6003 designates a product item selecting box to select [product item] to be searched, 6004 designates a product item code selecting box to select [product item code] to be searched and 6006 designates a calendar to select [date] to be searched.

Reference numeral 6008 designates a [search period] key to select the search period of data. When the [search period] key 6008 is selected, a sub screen is displayed to set a similar method of revision shown in FIG. 123. In this sub screen it is selected if a search of information is automatically renewed, and it is selected also how long period of time the renewal is achieved in minutes when in case the automatic renewal is performed. At this point, the term automatic renewal means a function that the system searches information and displays the latest result on the screen automatically in every a predetermined period of time even though the "execute search" key 6012 is not pushed down. By pushing down the above described "execute search" key 6012, search of information which is corresponding to the search conditions are executed, and resulted searched information can be displayed on the display screen.

Reference numeral 6009 designates a "start up setting" key to set conditions for starting up. When the "start up setting" key 6009 is selected, a sub screen 6021 is displayed to set the starting up condition as shown in FIG. 149. In this sub screen 6021, "target name of item", "mail server", and "mail file name" are input, and when "setting OK" is selected, "target name of item", "mail server" and "mail file name" are set to be stored in the recording media 3807. These "target name of item", "mail server" and "mail file name" are set only when the system initially begins to operate and when these item are changed.

Also in FIG. 146, reference numeral 6015 designates a "alarm setting situation/result" key to display a setting situation of the common alarm and to display a result of the common alarm, 6016 designates a "request discussion mail situation" key to display a situation of request discussion mail, 6017 designates a "alarm mail address" key to display the mailing addresses of alarm mails. By selecting any one of "alarm setting situation/result" key 6015, "request discussion mail situation" key 6016 and "alarm mail address" key 6017, it is arranged so that display screens of "alarm setting situation/result", "request discussion mail situation" and "alarm mail address" can be selected to be displayed.

FIG. 146 shows an example that "alarm setting situation/result" key 6015 is selected, and data of the alarm setting master table 3708*t* are displayed in the alarm setting situation/result display area 6018. When "request discussion mail situation" key 6016 is selected, data of the trouble inside the process data table 3709*f* are displayed in the request discussion mail situation display area 6019 as shown in FIG. 147. And when "alarm mail address" key 6017 is selected, data of the alarm receiver master table 3708*o* are displayed in the alarm mail address display area 6020 as shown in FIG. 198. The request discussion mail is dispatched from the client 3600 when "request discussion" is selected and input in the above described "input screen of repairing process". FIG. 150 shows an example of the document display screen 6022 which is used by the clients 3201 to 3208 of the input system. FIG. 151 shows an example of the request discussion mail.

Hereinafter the alarm mail dispatch process will be described with reference to the flow charts shown in FIG. 141 to FIG. 145. In FIG. 142 at first a manager of the management system turns on the power source for the client 3600 of the management system (step S131), an icon selecting display screen is displayed to select programs (step S132). And when in a case the alarm mail dispatch program is selected in this icon selecting display screen (step S133), the alarm mail dispatch program 3807*b* is read out from the recording media 3807 and after expanding it in the RAM 3805 the alarm mail dispatch program 3807*b* is started up (step S135). When the alarm mail dispatch program 3807*b* is started up, then a password input screen is displayed such as shown in FIG. 107 (step S187). And the employee number and the password are input by the manager (step S138).

The password input by the manager is compared with the password which is registered in advance (step S139), and the input password are judged if it is correct or not (step S140), when input password is correct, the process moves to the subsequent step S141, on the other hand, when the password is not correct, process moves back to step S138 to be input the password correctly.

Subsequently in step S141 master data of the product name master table 3708*r* (item name, field of product, site of production, date of production begins, server name, IP address, DB name, head number flag and mail dispatch), the alarm value master table 3708*t* (number, classification of control, classification of trouble, name of process, item of trouble, content of trouble 1, content of trouble 2, content of trouble 3, out of line, something strange, responsible department 1, responsible department 2, responsible department 3, no recurrence, content of repairing 1, content of repairing 2, content of repairing 3, person in charge for repairing, content of prevention of recurrence, person in charge for corrective action, alarm value, result of alarm, time of alarm, date of mail dispatch) and the alarm receiver master table 3708*o* (responsible department 1, responsible department 2, responsible department 3, notes ID, mail address) are downloaded to the process monitoring server 3300*a* to be stored in the RAM 3605 (step S141).

In subsequence, a display screen such as shown in FIG. 146 is displayed. At the time master data of the item name master table 3708*r*, the alarm value master table 3708*t* and the alarm receiver master table 3708*o* which are fetched, are displayed in the corresponding area in the display screen (step S142).

Then, log in to the mail server 3300*b* is performed (step S143). In this step, a confirmation of password of mail is achieved, and when in a case the password is correct, a positive response from the mail server 3300*b* is given.

And it is decided if the search condition set in the above described "setting revise method" dialog box, is automatic search or manual search (step S150). As a result of this decision, when in a case automatic search is set, the process moves to step S151 and it is decided if the specified period of time has passed. When the specified period of time has passed, the process moves to step S153. On the other hand, when an automatic search is set in step 8150, process moves to step S152, and it is judged if the search execution key is pushed down, when in a case the search execution key is pushed down, the process goes to step S153.

In step S153, the quality data of the day (master data) are downloaded from the quality trouble inside of the process data table 3709*f* (factory name, field of product, product item name, step of production, line number, product item code, assembling serial number, quality trouble serial number, product number, classification of trouble, count of recurrence, date of occurrence, time of occurrence, name of production process, item of trouble, content of trouble 1, content of trouble 2, content of trouble 3, out of line, something strange, responsible department 1, responsible department 2, responsible department 3, no recurrence, cause of trouble, content of repairing 1, content of repairing 2, content of repairing 3, date of repairing, time of repairing, person in charge for repairing, content of prevention of recurrence, date of corrective action, time of corrective action, person in charge for corrective action, date of latest revision, mail dispatch flag) of the process monitoring server 3300*a* to be stored in the RAM 3605 (step S153).

And it is judged if there is any quality data in which mail dispatch flag is set as "1 (it means to send mail to request a discussion)" (step S164), when in a case there are no quality data in which the mail dispatch flag is set as "1", system goes to step S157. On the other hand in case when there is quality data in which the mail dispatch flag is set as "1", the request for discussion mail are dispatched to the related receivers (person who are designated as receiver in the alarm receiver master table 3708*o*) (step S155). FIG. 151 as described above shows an example of the request discussion mail. Then, the mail dispatch flag of the quality trouble inside of the process data table 3709*f* in the process monitoring server 3300*a* is rewritten as "2" (step S156).

In step S157, the quality data are checked up with the alarm standard of alarm value master table. Hereinafter, the concrete content of process in the step S157 will be described with reference to the flow charts shown in FIG. 144. In FIG. 144, a first data of the quality data is read out (step S170), and it is checked up with the alarm standard (step S171), then it is decided if the data agrees with the alarm standard (step S172). As a result of this check up, when in case the data does not agree with the alarm standard, the process goes to step S174. On the other hand when in a case the data agrees with the alarm standard, the agreed item and, the count of the item are stored in the RAM 3605 (step S173), and process moves to step S174. In step S174, a decision is made if it is the last data of the quality data, when in a case the data is the last data, this subroutine is terminated and returned When in case the data is not the last data of quality data, after a next data is fetched (step S175), the process moves back to step S171 and the same processes are repeated till all the quality data have been processed.

Subsequently in step S158 shown in FIG. 148 a decision is made if there is any quality data which exceed the alarm value with reference to an existence of data and its count whose item is corresponding to the alarm standard stored in the RAM 3605, when in a case there is no quality data which exceed the alarm value, the process moves to step S150 shown in FIG. 142. On the other hand, when there is any data which exceed the alarm value, quality trouble data which are corresponding to the alarm, are organized to be sent by mail (step S160).

Hereinafter, the concrete content of process in the step S150 will be described with reference to the flow charts shown in FIG. 145. In FIG. 145 a first data of the quality data stored in the RAM 8605 is read out (step S180), and responsible department of the quality data which is subject to mail dispatch, is checked up with the mail address data on the basis of responsible department in the alarm receiver master data, then the mail addresses to be dispatched are decided (step S181). And the quality data which is subject to mail dispatch and the data of mail addresses to be dispatched are stored in the RAM 3605 (step S182). In subsecequence a decision is made if data is the last data subject to mail dispatch (step S183). When in a case it is the last data, the process is terminated and returned, on the other hand it is not the last data, the next data subject to mail dispatch is fetched from the RAM 3605 (step S184), the process goes back to step S181 and the same processes are repeated till all the quality data subject to mail dispatch have been processed.

Herein in step S160 shown in FIG. 143, the common alarm mail is sent to the mail server 3300*b* in order to dispatch the common alarm of quality trouble data to the receivers of the common alarm mail. After that the common alarm mail is dispatched from the mail server 3300*b* to the receivers.

Then, a decision is made if there is an instruction to terminate the program (step S162), when there is no instruction to terminate the program, the process moves back to step S150, on the other hand there is an instruction to terminate the program, the result of alarm, time of alarm and date of mail dispatch are written in the alarm setting master table 3708*t* of the process monitoring server 3300*a* (step S163) and the program is terminated.

As above described, because the present invention is arranged that in clients 3201 to 3208 of the input system, the item code and assembling serial number both of which are assigned to every assembled product and the data such as quality data or inspection sheet data, are forwarded to the process monitoring server 3300*a*, in the process monitoring server 3300*a* the transferred data from the clients 3201 to 3208 of the input system are stored in the corresponding tables (trouble inside the process data table 3709*f*, inspection sheet data table 3709*a*, main data table 3709*d* and so on), and in the clients 3401 to 3403 of the output system by setting a conditions of product item code or date the data to be corresponding to the condition are searched, resulted searched data are processed in time series and displayed on display screen in accordance with the output items which are defined by the elected kind of output, it is made possible that the management of product manufactured in the assembling production line is performed effectively and rapidly At the same time, because the data to be searched are processed in time series about the output items which are defined in the subjects to output which are to be specified, a management on the basis of time period is made possible.

Effect of the Invention

According to the present invention, as described above, a link of combining the market information with the production information in the factory can be formed to grip a quality trouble of the product in the market at the factory.

In accordance with the first aspect of the present invention a trend of market quality of product can be comprehended in real time.

In accordance with the second aspect of the present invention quality trouble about the product can be comprehended in relation to the year and month of production.

In accordance with the third aspect of the present invention it is easy to comprehend the trend of quality just after the delivery to the customer.

In accordance with the 4th aspect of the present invention it is easy to comprehend a trend of the elapsed operation quality.

In accordance with the 5th aspect of the present invention the initial operation quality and the elapsed operation quality can be comprehended at the same time.

In accordance with the 6th aspect of the present invention a ratio of quality trouble occurrence of the initial operation quality of product can be comprehended on the basis of the year and month of production.

In accordance with the 7th aspect of the present invention a ratio of quality trouble occurrence of the elapsed operation quality of product can be comprehended on the basis of the year and month of production.

In accordance with the 8th to 12th aspects of the present invention the count of quality trouble can be comprehended in relation to the contents of them.

In accordance with the 13th and 14th aspects of the present invention the contents of quality trouble which happen in the customers side can be comprehended in relation to the trouble in production which happened when those product were manufactured, accordingly it becomes easy for des engineers and factory managers to rapidly follow out in which process of the production line the cause of trouble lies, and thereby a quick feed back to production line can be realized.

In accordance with the 15th aspect of the present invention because the electronic mails are automatically dispatched to the related departments about the quality item of trouble s on which especially monitoring is required, the related department can rapidly be noticed on abnormal quality trouble of items to be monitored.

In accordance with the 16th aspect of the present invention the same effect as that of the first aspect of the invention can be realized.

In accordance with the 17th aspect of the present invention the same effect as that of the third aspect of the invention can be realized.

In accordance with the 18th aspect of the present invention the same effect as that of the 4th aspect of the invention can be realized.

In accordance with the 19th aspect of the present invention the same effect as that of the 5th aspect of the invention can be realized.

In accordance with the 20th aspect of the present invention the same effect as that of the 6th aspect of the invention can be realized.

In accordance with the 21st aspect of the present invention the same effect as that of the 7th aspect of the invention can be realized.

In accordance with the 22nd to 24th aspects of the present invention the same effect as that of the 8th to 12th aspects of the invention can be realized.

In accordance with the 25th and 26th aspects of the present invention the same effect as that of the 13th and 14th aspects of the invention can be realized.

In accordance with the 27th and 28th aspects of the present invention, the person related to quality trouble such as design engineer, manufacturing engineer, factory manager and so on, are made to be possible to directly access to the market quality information and the production history information through their own terminal, and a current movement of market quality of the product can be comprehended in relation to a production history of the product, thereby a quick feed back to the production process as the corrective action can be realized.

In accordance with the 29th aspect of the present invention, the same effect as that of the first aspect of the invention can be realized.

In accordance with the 30th aspect of the present invention the same effect as that of the third aspect of the invention can be realized.

In accordance with the 31st aspect of the present invention the same effect as that of the 4th aspect of the invention can be realized.

In accordance with the 32nd aspect of the present invention the same effect as that of the 5th aspect of the invention can be realized.

In accordance with the 34th and 35th aspects of the present invention the same effect as that of the 13th and 14th aspects of the invention can be realized.

In accordance with the 36th aspect of the present invention the same effect as that of the 15th aspect of the invention can be realized.

What is claimed is:

1. A product market quality information analyzing back up apparatus, comprising:

a maintenance record information storing device for storing maintenance record information related to a delivered product delivered to customers; and means for accessing said maintenance record information storing device, for extracting market quality information related to a quality of said delivered product in a market from said maintenance record information, storing and analyzing the extracted market quality information, wherein said market quality information includes at least a delivery condition of the product delivered to the customers, a quality trouble condition of the delivered product delivered to the customers, a countermeasure for the quality trouble condition, and a resolved result of the quality trouble.

2. The product market quality information analyzing back up apparatus according to claim 1, wherein said information in said maintenance record information storing device comprises a data base of said market quality information, and said means stores a data base of product quality information of a factory.

3. The product market quality information analyzing back up apparatus according to claim 1, wherein:

said means extracts said market quality information of said delivered product in a predetermined period of term from said maintenance record information based on a product item of said delivered product, processes and analyzes the extracted market quality information to produce a market quality transition situation, and displays said market quality transition situation on a display screen.

4. The product market quality information analyzing back up apparatus according to claim 2, wherein said means compares and analyzes said market quality information and said product quality information.

5. The product market quality analyzing back up apparatus according to claim 3, wherein said market quality information comprises at least one of or a combination of:

quality trouble information that represents a product item including a product item brevity code and a developing code name which is given when the product was developed;

a temporal parameter related to the delivered product;

a comment on a maintenance item which represents comments when maintenance was carried out;

a symptom of trouble item which represents a content of the quality trouble of the product occurred in the market;

a detailed portion which represents where said symptom occurred in the product;

cause of trouble which represents a cause by which the trouble seems to happen;

a corrective action which represents a countermeasure for said trouble;

a detailed portion of corrective action;

a result which represents whether the trouble of the product is solved by the corrective action or not; and an item which represents whether the trouble of product is solved by a replacement of parts or not, wherein the temporal parameter further comprises at least one of:

a maintenance carried out date item which represents when the maintenance was carried out;

a year and month item which represents when the product was manufactured;

a date of delivery item which represents when the product was delivered to customer, a year and month of delivery; and a month of elapsed operation quality.

6. The product market quality information analyzing back up apparatus according to claim 4, wherein said means includes an alarm for issuing a warning to the customers when quality trouble and so on of the delivered product occur.

7. The product market quality analyzing back up apparatus according to claim 5, wherein said quality trouble is classified based on the product item, a count of the quality troubles that has occurred during one month from the date of the delivery to the customer based on the product item is summed up in every year and month of production and defining the count as an initial operation quality; and said count of the quality trouble is displayed on said display screen by a graph in which a vertical axis is the count of quality trouble of every said product item and a horizontal axis is said year and month of production.

8. The product market quality analyzing back up apparatus according to claim 5, wherein the year and month of production of said product is taken as a selected of the at least one temporal parameter;

a count of the quality trouble that has occurred based on a number of months from the year and month of delivery until the quality trouble happens about the products which are made in the year and month of the production is summed up and defined as an elapsed operation quality; and said count of the quality trouble is displayed as said market quality transition situation on said display screen by a graph in which a vertical axis is the count of quality trouble of every said product item and a horizontal axis is said year and month of production.

9. The product market quality analyzing back up apparatus according to claim 5, wherein said means further:

calculates a count of the maintenance record that has occurred within a month from the date of the delivery based on said year and month of production utilizing said maintenance record information;

subtracts any overlapping count caused by a same product item;

defines the subtracted result as a count of operating machines of said product item in the market about the year and month of production;

calculates a rate of the quality trouble occurrence by division process of the count of said maintenance record by said count of operating machines; and displays the calculated result of every said product item as said market quality transition situation on said display screen by a line chart in which a vertical axis is rate of quality trouble occurrence and a horizontal axis is said year and month of production.

10. The product market quality analyzing back up apparatus according to claim 5, wherein said means further:

classifies the maintenance record information about a symptom of trouble based on the symptom of trouble in said market quality information;

makes a list in which a first axis is said year and month of production and a second axis is the count of quality trouble which is classified on the basis of every said symptom of trouble based on the year and month of production; and displays the list on said display screen.

11. The product market quality analyzing back up apparatus according to claim 5, wherein said means further:

classifies the maintenance record information about a cause of trouble based on the cause of trouble in said market quality information;

makes a list in which a first axis is said year and month of production and a second axis is the count of quality trouble which is classified on the basis of every said cause of trouble based on the year and month of production; and displays the list on said display screen.

12. The product market quality analyzing back up apparatus according to claim 5, wherein said means further:

classifies the maintenance record information about a corrective action of trouble based on the corrective action of trouble in said market quality information;

makes a list in which a first axis is said year and month of production and a second axis is the count of quality trouble which is classified on the basis of every said corrective action of trouble based on the year and month of production; and displays the list on said display screen.

13. The product market quality analyzing back up apparatus according to claim 5, wherein said means further:

classifies the maintenance record information about a result of trouble based on the result of trouble in said market quality information;

makes a list in which a first axis is said year and month of production and a second axis is the count of quality trouble which is classified on the basis of every said result of trouble based on the year and month of production; and displays the list on said display screen.

14. The product market quality analyzing back up apparatus according to claim 5, wherein said means further:

classifies the maintenance record information about a comment on maintenance of trouble based on the comment on maintenance of trouble in said market quality information;

makes a list in which a first axis is said year and month of production and a second axis is the count of quality trouble which is classified on the basis of every said comment on maintenance of trouble based on the year and month of production; and displays the list on said display screen.

15. The product market quality analyzing back up apparatus according to claim 5, wherein electronic mails which alarm an occurrence of quality trouble of the delivered product are automatically dispatched to terminals in a related department if items of any one of said market quality information to be watched are selected and criteria of the any one of said market quality information are specified when the respective criteria specified are exceeded.

16. The product market quality analyzing back up apparatus according to claim 8, wherein said graph is a substantially three dimensional graph with a third axis of the selected temporal parameter in which said vertical axis, said horizontal axis, and said third axis are respectively crossing perpendicularly.

17. The product market quality analyzing back up apparatus according to claim 8, wherein said means further:

counts the maintenance record of products which belong to the month of elapsed operation quality based on a number of months from the year and month of delivery until the quality trouble happens utilizing said maintenance record information based on said month of elapsed operation quality;

subtracts any overlapping count caused by a same product item;

defines the subtracted result as a count of operating machines of said product item which belong to said month of elapsed operation quality in the market about the year and month of production;

calculates a rate of the quality trouble occurrence by division process of the count of said maintenance record by said count of operating machines; and displays the calculated result of every said product item as said market quality transition situation on said display screen by a line chart in which a vertical axis is the rate of occurrence and a horizontal axis is said year and month of production.

18. The product market quality analyzing back up apparatus according to any one of claim 17, to claim 14, wherein when a portion of said list is selected and executed, where a count is displayed, designated by a year and month of production and any one of the items chosen as a target on the display screen, a list in which identification numbers are written to specify a product which relates to said item chosen as the target, is displayed on said display screen.

19. The product market quality analyzing back up apparatus according to claim 18, wherein when any one of said identification numbers in said list is selected and executed on the display screen, said apparatus is linked to a production history data base for a factory side in which production history at production processes for respective products is stored, and production history information of the production, defect and characteristics which relate to said identification number are displayed on the display screen.

20. A product market quality analyzing back up system, comprising:

a maintenance record data base for storing maintenance record information related to a delivered product delivered to customers, a data base for manufacturing side which periodically or irregularly accesses said maintenance record storing device to obtain said maintenance record information; and a terminal with a processing means and a display means, a said processing means accessing said data base for manufacturing side and extracting market quality information related to a quality of said delivered product in a market from said maintenance record information, processing, and analyzing said extracted market quality information to produce a market quality transition situation, and displaying said market quality transition situation in a graph as a processed and analyzed result of the market quality information on said display means, wherein the market quality information includes at least a delivery condition of the product delivered to the customers, a quality trouble condition of the delivered product delivered to the customers, a countermeasure for the quality trouble condition, and a resolved result of the quality trouble.

21. The product market quality analyzing back up system according to claim 20, wherein said market quality information at least includes a product item, a temporal parameter related to the delivered product, and a quality trouble related item which relates to a trouble of quality of the delivered product, said system calculates a count of quality troubles about the delivered product that occurred during one month from a date of delivery to the customer based on the product item in every year and month of production and defines the count as an initial operation quality, said processing means displays a relation between the count of quality trouble of every said product item and said year and month of production of the delivered product by a graph as said market quality transition situation on said display means, and said temporal parameter related to the delivered product includes at least one of a maintenance that has been carried out date item, a year and month of production item, a date of delivery item, and a year and month of delivery item.

22. The product market quality analyzing back up system according to claim 20, wherein said market quality information at least includes quality trouble related items which relate a product item, a temporal parameter related to the product, and a quality trouble related item which relates to quality trouble and symptom of trouble item, said temporal parameter related to the product includes at least one of a maintenance that has been carried out date item, a year and month of production item, a date of delivery item, and a year and month of delivery item, and said processing means classifies the maintenance record information about the symptom of trouble item based on the symptom of trouble item in said market quality information, makes a list in which a first axis is said year and month of production and a second axis is the count of quality trouble which is classified on the basis of every said symptom of trouble item based on the year and month of production, and displays the list on said display means.

23. The product market quality analyzing back up system according to claim 20, wherein said market quality information at least includes quality trouble related items which relate a product item, a temporal parameter related to the product, a quality trouble related item which relates to quality trouble and result of trouble item, said temporal parameter related to the product includes at least one of a maintenance that has been carried out date item, a year and month of production item, a date of delivery item, and a year and month of delivery item, and said processing means classifies the maintenance record information about the result of trouble item based on the result of trouble item in said market quality information, makes a list in which a first axis is said year and month of production and a second axis is the count of quality trouble which is classified on the basis of every said result of trouble item based on the year and month of production, and displays the list on said display means.

24. The product market quality analyzing back up system according to claim 20, wherein said market quality information at least includes quality trouble related items which relate a product item, a temporal parameter related to the product, a quality trouble related item which relates to quality trouble and comment on maintenance of trouble item, said temporal parameter related to the product includes at least one of a maintenance that has been carried out date item, a year and month of production item, a date of delivery item, and a year and month of delivery item, and said processing means classifies the maintenance record information about the comment on maintenance of trouble item based on the comment on maintenance of trouble item in said market quality information, makes a list in which a first axis is said year and month of production and a second axis is the count of quality trouble which is classified on the basis of every said comment on maintenance trouble item based on the year and month of production, and displays the list on said display means.

25. The product market quality analyzing back up system according to claim 21, wherein said processing means takes the year and month of production of said product item as a selected of the at least one temporal parameter, and calculates a count of the quality trouble that occurred based on a number of elapsed months from the year and month of delivery until the quality trouble happens about the products which are made in the year and month of the production and defines the count as an elapsed operation quality, and displays a transition situation of the count of quality trouble based on said elapsed month as said market quality transition situation on said display means.

26. The product market quality analyzing back up system according to claim 21, wherein said processing means further:

calculates a count of the quality trouble about the product within a month from the date of said delivery based on said year and month of production utilizing said maintenance record information;

subtracts any overlapping count caused by the same product item;

defines the subtracted result as a count of operating machines of said product item in the market about the year and month of production;

calculates a rate of the quality trouble occurrence by division process of the count of said quality trouble by said count of operating machines; and displays the calculated result of every said product item as said market quality transition situation on said display means by a line chart in which a vertical axis is the rate of occurrence and a horizontal axis is said year and month of production.

27. The product market quality analyzing back up system according to claim 25, wherein said processing means calculates a count of quality trouble of said product item based on the year and month of production, and displays said count of quality trouble in a three dimensional view utilizing said year and month of production and said elapsed month on said display means.

28. The product market quality analyzing back up system according to claim 25, wherein said processing means further:

calculates the maintenance record of products which belong to the month of elapsed operation quality based on a number of months from the year and month of delivery until the quality trouble happens utilizing said maintenance record information based on said month of elapsed operation quality;

subtracts any overlapping count caused by the same product item;

defines the subtracted result as a count of operating machines of said product item which belongs said month of elapsed operation quality in the market about the year and month of production;

calculates a rate of the quality trouble occurrence by division process of the count of said quality trouble by said count of operating machines; and displays the calculated result of every said product item as said market quality transition situation on said display means by a line chart in which a vertical axis is rate of occurrence and a horizontal axis is said year and month of production.

29. The product market quality analyzing back up system according to any one of claim 25, to claim 24, wherein when a specified portion is selected, designated by the year and month of production and any one of the items chosen as a target, on a display screen in a case said list is displayed by said display means, said processing means causes said display means to display identification numbers to specify a delivered product which relates to said item chosen as the target.

30. The product market quality analyzing back up system according to claim 29, wherein when any one of said identification numbers is selected on the display screen, said apparatus is linked to a production history data base for a factory side in which production history at production processes for respective products are stored, and production history which relate to said identification number are displayed on the display means.

31. A product market quality analyzing back up system comprising:

maintenance record data base for storing maintenance record information related to a delivered product delivered to customers;

a data base for manufacturing side which periodically or irregularly accesses maintenance record data base to obtain said maintenance record information; and a terminal with a processing means and a display means, said processing means accessing said data base for manufacturing side and extracting market quality information related to a quality of said delivered product in a market from said maintenance record information, processing, and analyzing said extracted market quality information related to the product to produce a market quality transition situation, and displaying said market quality transition situation in a graph as a processed and analyzed result of the market quality information on said display means; and a production history data base for a factory side in which information on production history at production processes for respective products are stored; wherein terminal is possible to access said production history information in said production history data base, and the market quality information includes at least a delivery condition of the product delivered to the customers, a quality trouble condition of the delivered product delivered to the customers, a countermeasure for the quality trouble condition, and a resolved result of the quality trouble.

32. The product market quality analyzing back up system according to claim 30, wherein when a specified portion is selected, designated by the year and month of production and any one of the items chosen as a target, on a display screen when said list is displayed by said display means, said processing means causes said display means to display the identification numbers to specify a product which relates to said item chosen as the target.

33. A product market quality information analyzing back up program configured to:

access a maintenance record data base in which maintenance record information related to a delivered product delivered to customers is stored;

extract market quality information which relates a quality of said delivered product in a market in a predetermined period of term from said maintenance record information based on a product item of said delivered product;

process and analyze the extracted market quality information to produce a market quality transition situation; and display said market quality transition situation on a display screen in a graph, wherein the market quality information includes at least a delivery condition of the product delivered to the customers, a quality trouble condition of the delivered product delivered to the customers, a countermeasure for the quality trouble condition, and a resolved result of the quality trouble.

34.The product market quality analyzing back up program according to claim 33, wherein said market quality information at least includes a product item, a temporal parameter related to said product, a date of delivery item and a symptom of trouble item, wherein the temporal parameter related to the product is at least one of a maintenance that has been carried out date item, a year and month of production item, a year and month of delivery, and a date of the delivery, and said program is further configured to calculate a count of the quality troubles about the product that have occurred during one month from the date of the delivery to the customer based on the product item in every year and month of production and causes said display screen to display the count as an initial operation quality in a graph based on the year and month of production of said delivered product.

35. The product market quality analyzing back up program according to claim 34, configured to:

take the year and month of production of said product item as a parameter;

calculate a count of the quality trouble that has occurred based on a number of elapsed months from the year and month of delivery until the quality trouble happens about the products which are made in the year and month of the production; and display the count as said market quality transition situation of quality trouble.

36. The product market quality analyzing back up program according to claim 34, further configured to:

calculate a count of quality trouble of said product item based on the year and month of production and said elapsed months; and display said count of the quality trouble as a three dimensional view utilizing said year and month of production and said elapsed months.

37. The product market quality analyzing back up program according to claim 34, further configured to display the count of quality trouble of said market quality information in every year and month of production and every item as a list in which a first axis is said year and month of production and a second axis is the item based on the year and month of production.

38. The product market quality analyzing back up program according to claim 37, wherein in a state that said list is displayed when a portion designated by a year and month of production and any one of the items chosen as a target is selected, said program causes said display screen to display identification numbers of the product which relates to said item chosen as the target.

39. The product market quality analyzing back up program according to claim 38, wherein when any one of said identification numbers is selected, said program causes to link to a production history data base for a factory side in which production history at production processes for respective products is stored, and to display information on said production history which relate to said identification number.

40. The product market quality analyzing back up program according to claim 39, wherein electronic mails are automatically dispatched to terminals in a related department if items of any one of said items to be watched are selected and criteria of the items are specified when the respective criteria specified are exceeded.

41. A product market quality information analyzing back up apparatus, comprising:

a maintenance record information storing device for storing maintenance record information related to a delivered product delivered to customers; and a device configured to access said maintenance record information storing device, to extract market quality information related to a quality of said delivered product in a market from said maintenance record information, store and analyze the extracted market quality information, wherein said market quality information includes at least a delivery condition of the product delivered to the customers, a quality trouble condition of the delivered product delivered to the customers, a countermeasure for the quality trouble condition, and a resolved result of the quality trouble.

42. The product market quality information analyzing back up apparatus according to claim 41, wherein said information in said maintenance record information storing device comprises a data base of said market quality information, and said device configured to access, store and analyze stores a data base of product quality information of a factory.

43. The product market quality information analyzing back up apparatus according to claim 41, wherein said device configured to access, store and analyze extracts said market quality information of said delivered product in a predetermined period of term from said maintenance record information based on a product item of said delivered product, processes and analyzes the extracted market quality information to produce a market quality transition situation, and displays said market quality transition situation on a display screen.

44. The product market quality information analyzing back up apparatus according to claim 42, wherein said device configured to access, store and analyze compares and analyzes said market quality information and said product quality information.

45. The product market quality analyzing back up apparatus according to claim 43, wherein said market quality information comprises at least one of or a combination of:

quality trouble information that represents a product item including a product item brevity code and a developing code name which is given when the product was developed;

a temporal parameter related to the delivered product;

a comment on a maintenance item which represents comments when maintenance was carried out;

a symptom of trouble item which represents a content of the quality trouble of the product occurred in the market;

a detailed portion which represents where said symptom occurred in the product;

a cause of trouble which represents a cause by which the trouble seems to happen;

a corrective action which represents a countermeasure for said trouble;

a detailed portion of corrective action;

a result which represents whether the trouble of the product is solved by the corrective action or not; and an item which represents whether the trouble of product is solved by a replacement of parts or not, wherein the temporal parameter further comprises at least one of:

a maintenance carried out date item which represents when the maintenance are carried out;

a year and month item which represents when the product was manufactured;

a date of delivery item which represents when the product was delivered to customer;

a year and month of delivery; and a month of elapsed operation quality.

46. The product market quality analyzing back up apparatus according to claim 43, wherein said device configured to access, store and analyze further:

classifies the maintenance record information about a corrective action of trouble based on the corrective action of trouble in said market quality information;

makes a list in which a first axis is said year and month of production and a second axis is the count of quality trouble which is classified on the basis of every said corrective action of trouble based on the year and month of production; and displays the list on said display screen.

47. The product market quality information analyzing back up apparatus according to claim 44, wherein said device configured to access, store and analyze includes an alarm for issuing a warning to the customers when quality trouble and so on of the delivered product occur.

48. The product market quality analyzing back up apparatus according claim 45, wherein said quality trouble is classified based on the product item, a count of the quality troubles that has occurred during one month from the date of the delivery to the customer based on the product item is summed up in every year and month of production and defining the count as an initial operation quality; and said count of the quality trouble is displayed on said display screen by a graph in which a vertical axis is the count of quality trouble of every said product item and a horizontal axis is said year and month of production.

49. The product market quality analyzing back up apparatus according to claim 45, wherein the year and month of production of said product is taken as a selected of the at least one temporal parameter;

a count of the quality trouble that has occurred based on a number of months from the year and month of delivery until the quality trouble happens about the products which are made in the year and month of the production is summed up and defined as an elapsed operation quality; and said count of the quality trouble is displayed as said market quality transition situation on said display screen by a graph in which a vertical axis is the count of quality trouble of every said product item and a horizontal axis is said year and month of production.

50. The product market quality analyzing back up apparatus according to claim 49, wherein said device configured to access, store and analyze further:

calculates a count of the maintenance record that has occurred within a month from the date of the delivery based on said year and month of production utilizing said maintenance record information;

subtracts any overlapping count caused by a same product item;

defines the subtracted result as a count of operating machines of said product item in the market about the year and month of production;

calculates a rate of the quality trouble occurrence by division process of the count of said maintenance record by said count of operating machines; and displays the calculated result of every said product item as said market quality transition situation on said display screen by a line chart in which a vertical axis is rate of quality trouble occurrence and a horizontal axis is said year and month of production.

51. The product market quality analyzing back up apparatus according to claim 45, device configured to access, store and analyze further:

classifies the maintenance record information about a symptom of trouble based on the symptom of trouble in said market quality information;

makes a list in which a first axis is said year and month of production and a second axis is the count of quality trouble which is classified on the basis of every said symptom of trouble based on the year and month of production; and displays the list on said display screen.

52. The product market quality analyzing back up apparatus according claim 45, wherein said device configured to access, store and analyze further:

classifies the maintenance record information about a cause of trouble based on the cause of trouble in said market quality information;

makes a list in which a first axis is said year and month of production and a second axis is the count of quality trouble which is classified on the basis of every said cause of trouble based on the year and month of production; and displays the list on said display screen.

53. The product market quality analyzing back up apparatus according to claim 45, wherein said device configured to access, store and analyze further:

classifies the maintenance record information about a result of trouble based on the result of trouble in said market quality information;

makes a list in which a first axis is said year and month of production and a second axis is the count of quality trouble which is classified on the basis of every said result of trouble based on the year and month of production; and displays the list on said display screen.

54. The product market quality analyzing back up apparatus according to claim 45, wherein said device configured to access, store and analyze further:

classifies the maintenance record information about a comment on maintenance of trouble based on the comment on maintenance of trouble in said market quality information;

makes a list in which a first axis is said year and month of production and a second axis is the count of quality trouble which is classified on the basis of every said comment on maintenance of trouble based on the year and month of production; and displays the list on said display screen.

55. The product market quality analyzing back up apparatus according to claim 45, wherein electronic mails which alarm an occurrence of quality trouble of the delivered product are automatically dispatched to terminals in a related department if items of any one of said market quality information to be watched are selected and criteria of the any one of said market quality information are specified when the respective criteria specified are exceeded.

56. The product market quality analyzing back up apparatus according to claim 49, wherein said graph is a substantially three dimensional graph with a third axis of the selected temporal parameter in which said vertical axis, said horizontal axis, and said third axis are respectively crossing perpendicularly.

57. The product market quality analyzing back up apparatus according to claim 49, wherein said device configured to access, store and analyze further:

counts the maintenance record of products which belong to the month of elapsed operation quality based on a number of months from the year and month of delivery until the quality trouble happens utilizing said maintenance record information based on said month of elapsed operation quality;

subtracts any overlapping count caused by a same product item;

defines the subtracted result as a count of operating machines of said product item which belong to said month of elapsed operation quality in the market about the year and month of production;

calculates a rate of the quality trouble occurrence by division process of the count of said maintenance record by said count of operating machines; and displays the calculated result of every said product item as said market quality transition situation on said display screen by a line chart in which a vertical axis is the rate of occurrence and a horizontal axis is said year and month of production.

58. The product market quality analyzing back up apparatus according to any one of claim 57 to claim 54,wherein when a portion of said list is selected and executed, where a count is displayed, designated by a year and month of production and any one of the items chosen as a target on the display screen, a list in which identification numbers are written to specify a product which relates to said item chosen as the target, is displayed on said display screen.

59. The product market quality analyzing back up apparatus according to claim 58, wherein when any one of said identification numbers in said list is selected and executed on the display screen, said apparatus is linked to a production history data base for a factory side in which production history at production processes for respective products is stored, and production history information of the production, defect and characteristics which relate to said identification number are displayed on the display screen.

60. A product market quality analyzing back up system comprising:

a maintenance record data base for storing maintenance record information related to a delivered product delivered to customers;

a data base for manufacturing side which periodically or irregularly accesses said maintenance record storing device to obtain said maintenance record information; and a terminal with a processing device and a display device, said processing device accessing said data base for manufacturing side and extracting market quality information related to a quality of said delivered product in a market from said maintenance record information, processing, and analyzing said extracted market quality information to produce a market quality transition situation, and displaying said market quality transition situation in a graph as a processed and analyzed result of the market quality information on said display device, wherein said market quality information includes at least a delivery condition of the product delivered to the customers, a quality trouble condition of the delivered product delivered to the customers, a countermeasure for the quality trouble condition, and a resolved result of the quality trouble.

61. The product market quality analyzing back up system according to claim 60, wherein said market quality information at least includes a product item, a temporal parameter related to the delivered product, and a quality trouble related item which relates to a trouble of quality of the delivered product, said system calculates a count of quality troubles about the delivered product that occurred during one month from a date of delivery to the customer based on the product item in every year and month of production and defines the count as an initial operation quality, said processing device displays a relation between the count of quality trouble of every said product item and said year and month of production of the delivered product by a graph as said market quality transition situation on said display device, and said temporal parameter related to the delivered product includes at least one of a maintenance that has been carried out date item, a year and month of production item, a date of delivery item, and a year and month of delivery item.

62. The product market quality analyzing back up system according to claim 60, wherein said market quality information at least includes quality trouble related items which relate a product item, a temporal parameter related to the product, and a quality trouble related item which relates to quality trouble and symptom of trouble item, said temporal parameter related to the product includes at least one of a maintenance that has been carried out date item, a year and month of production item, a date of delivery item, and a year and month of delivery item, and said processing device classifies the maintenance record information about the symptom of trouble item based on the symptom of trouble item in said market quality information, makes a list in which a first axis is said year and month of production and a second axis is the count of quality trouble which is classified on the basis of every said symptom of trouble item based on the year and month of production, and displays the list on said display device.

63. The product market quality analyzing back up system according to claim 60, wherein said market quality information at least includes quality trouble related items which relate a product item, a temporal parameter related to the product, a quality trouble related item which relates to quality trouble and comment on maintenance of trouble item, said temporal parameter related to the product includes at least one of a maintenance that has been carried out date item, a year and month of production item, a date of delivery item, and a year and month of delivery item, and said processing device classifies the maintenance record information about the comment on maintenance of trouble item based on the comment on maintenance of trouble item in said market quality information, makes a list in which a first axis is said year and month of production and a second axis is the count of quality trouble which is classified on the basis of every said comment on maintenance trouble item based on the year and month of production, and displays the list on said display device.

64. The product market quality analyzing back up system according to claim 61, wherein said processing device takes the year and month of production of said product item as a selected of the at least one temporal parameter, and calculates a count of the quality trouble that occurred based on a number of elapsed months from the year and month of delivery until the quality trouble happens about the products which are made in the year and month of the production and defines the count as an elapsed operation quality; and displays a transition situation of the count of quality trouble based on said elapsed month as said market quality transition situation on said display device.

65. The product market quality analyzing back up system according to claim 61, wherein said processing device further:

calculates a count of the quality trouble about the product within a month from the date of said delivery based on said year and month of production utilizing said maintenance record information;

subtracts any overlapping count caused by the same product item;

defines the subtracted result as a count of operating machines of said product item in the market about the year and month of production;

calculates a rate of the quality trouble occurrence by division process of the count of said quality trouble by said count of operating machines; and displays the calculated result of every said product item as said market quality transition situation on said display device by a line chart in which a vertical axis is the rate of occurrence and a horizontal axis is said year and month of production.

66. The product market quality analyzing back up system according to claim 60, wherein said market quality information at least includes quality trouble related items which relate a product item, a temporal parameter related to the product, a quality trouble related item which relates to quality trouble and result of trouble item, said temporal parameter related to the product includes at least one of a maintenance that has been carried out date item, a year and month of production item, a date of delivery item, and a year and month of delivery item, and said processing device classifies the maintenance record information about the result of trouble item based on the result of trouble item in said market quality information, makes a list in which a first axis is said year and mouth of production and a second axis is the count of quality trouble which is classified on the basis of every said result of trouble item based on the year and month of production, and displays the list on said display device.

67. The product market quality analyzing back up system according to claim 64, wherein said processing device calculates a count of quality trouble of said product item based on the year and month of production, and displays said count of quality trouble in a three dimensional view utilizing said year and month of production and said elapsed month on said display device.

68. The product market quality analyzing back up system according to claim 64, wherein said processing device further:

calculates the maintenance record of products which belong to the month of elapsed operation quality based on a number of months from the year and month of delivery until the quality trouble happens utilizing said maintenance record information based on said month of elapsed operation quality;

subtracts any overlapping count caused by the same product item;

defines the subtracted result as a count of operating machines of said product item which belongs said month of elapsed operation quality in the market about the year and month of production;

calculates a rate of the quality trouble occurrence by division process of the count of said quality trouble by said count of operating machines; and displays the calculated result of every said product item as said market quality transition situation on said display device by a line chart in which a vertical axis is rate of occurrence and a horizontal axis is said year and month of production.

69. The product market quality analyzing back up system according to any one of to claim 64 to claim 63, wherein when a specified portion is selected, designated by the year and month of production and any one of the items chosen as a target, on a display screen in a case said list is displayed by said display device, said processing device causes said display device to display identification numbers to specify a delivered product which relates to said item chosen as the target.

70. The product market quality analyzing back up system according to claim 69, wherein when any one of said identification numbers is selected on the display screen, said apparatus is linked to a production history data base for a factory side in which production history at production processes for respective products are store, and production history which relate to said identification number are displayed on the display device.

71. The product market quality analyzing back up system according to claim 70, wherein when a specified portion is selected, designated by the year and month of production and any one of the items chosen as a target, on a display screen when said list is displayed by said display device, said processing device causes said display device to display the identification numbers to specify a product which relates to said item chosen as the target.

72. A product market quality analyzing back up system comprising:

a maintenance record data base for storing maintenance record information related to a delivered product delivered to customers, a data base for manufacturing side which periodically or irregularly accesses said maintenance record storing device to obtain said maintenance record information; and a terminal with a processing device and a display device, said processing device accessing said data base for manufacturing side and extracting market quality information related to a quality of said delivered product in a market from said maintenance record information, processing, and analyzing said extracted market quality information to produce a market quality transition situation, and displaying said market quality transition situation in a graph as a processed and analyzed result of the market quality information on said display device, and a production history data base for a factory side in which information on production history at production processes for respective products are stored, wherein terminal is possible to access said production history information in said production history data base, and the market quality information includes at least a delivery condition of the product delivered to the customers, a quality trouble condition of the delivered product delivered to the customers, a countermeasure for the quality trouble condition, and a resolved result of the quality trouble.

73. A product market quality information analyzing back up program configured to:

access a maintenance record data base in which maintenance record information related to a delivered product delivered to customers is stored;

extract market quality information which relates to a quality of said delivered product in a market in a predetermined period of term from said maintenance record information based on a product item of said delivered product;

process and analyze the extracted market quality information to produce a market quality transition situation; and display said market quality transition situation on a display screen in a graph, wherein the market quality information includes at least a delivery condition of the product delivered to the customers, a quality trouble condition of the delivered product delivered to the customers, a countermeasure for the quality trouble condition, and a resolved result of the quality trouble.

74. The product market quality analyzing back up program according to claim 73, wherein said market quality information at least includes a product item, a temporal parameter related to said product, a date of delivery item and a symptom of trouble item, wherein the temporal parameter related to the product is at least one of a maintenance that has been carried out date item, a year and month of production item, a year and month of delivery, and a date of the delivery, and said program is further configured to calculate a count of the quality troubles about the product that have occurred during one month from the date of the delivery to the customer based on the product item in every year and month of production and causes said display screen to display the count as an initial operation quality in a graph based on the year and month of production of said delivered product.

75. The product market quality analyzing back up program according to claim 74, further configured to:

take the year and month of production of said product item as a parameter;

calculate a count of the quality trouble that has occurred based on a number of elapsed months from the year and month of delivery until the quality trouble happens about the products which are made in the year and month of the production; and display the count as said market quality transition situation of quality trouble.

76. The product market quality analyzing back up program according to claim 74, further configured to:

calculate a count of quality trouble of said product item based on the year and month of production and said elapsed months; and display said count of the quality trouble as a three dimensional view utilizing said year and month of production and said elapsed months.

77. The product market quality analyzing back up program according to claim 74, further configured to display the count of quality trouble of said market quality information in every year and month of production and every items as a list in which a first axis is said year and month of production and a second axis is the item based on the year and month of production.

78. The product market quality analyzing back up program according to claim 77, wherein in a state that said list is displayed when a portion designated by a year and month of production and any one of the items chosen as a target is selected, said program causes said display screen to display identification numbers of the product which relates to said item chosen as the target.

79. The product market quality analyzing back up program according to claim 78, wherein when any one of said identification numbers is selected, said program causes to link to a production history data base for a factory side in which production history at production processes for respective products is stored, and to display information on said production history which relate to said identification number.

80. The product market quality analyzing back up program according to claim 79, wherein electronic mails are automatically dispatched to terminals in a related department if items of any one of said items to be watched are selected and criteria of the items are specified when the respective criteria specified are exceeded.

* * * * *